(12) United States Patent
Yonezawa et al.

(10) Patent No.: US 12,282,143 B2
(45) Date of Patent: Apr. 22, 2025

(54) ZOOM LENS AND IMAGING APPARATUS

(71) Applicant: FUJIFILM Corporation, Tokyo (JP)

(72) Inventors: Masaru Yonezawa, Saitama (JP); Shinkichi Ikeda, Saitama (JP); Takashi Kunugise, Saitama (JP); Masanao Kawana, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 440 days.

(21) Appl. No.: 17/819,184

(22) Filed: Aug. 11, 2022

(65) Prior Publication Data
US 2023/0112183 A1    Apr. 13, 2023

(30) Foreign Application Priority Data

Aug. 27, 2021 (JP) ................... 2021-139216
Jun. 24, 2022 (JP) ................... 2022-102075

(51) Int. Cl.
| | | |
|---|---|---|
| G02B 15/167 | (2006.01) | |
| G02B 13/02 | (2006.01) | |
| G02B 13/18 | (2006.01) | |
| G02B 15/14 | (2006.01) | |
| G02B 15/20 | (2006.01) | |
| G02B 13/00 | (2006.01) | |

(52) U.S. Cl.
CPC ............. *G02B 15/145121* (2019.08); *G02B 15/145113* (2019.08); *G02B 15/145125* (2019.08); *G02B 15/1461* (2019.08); *G02B 15/20* (2013.01); *G02B 13/0045* (2013.01); *G02B 13/006* (2013.01)

(58) Field of Classification Search
CPC ............. G02B 13/006; G02B 13/0045; G02B 15/145113; G02B 15/145121; G02B 15/145125; G02B 15/1461
See application file for complete search history.

(56) References Cited

U.S. PATENT DOCUMENTS

| | | |
|---|---|---|
| 2018/0188510 A1 | 7/2018 | Yonezawa et al. |
| 2018/0299656 A1 | 10/2018 | Yonezawa et al. |

FOREIGN PATENT DOCUMENTS

| | | |
|---|---|---|
| JP | 2018-109709 A | 7/2018 |
| WO | 2017/130478 A1 | 8/2017 |

*Primary Examiner* — Jack Dinh
(74) *Attorney, Agent, or Firm* — Studebaker Brackett PLLC

(57) ABSTRACT

The zoom lens consists of a first lens group, a front group, a middle group, and a rear group, in order from an object side. The first lens group has a positive refractive power and includes a negative lens and a positive lens, successively in order from a position closest to the object side to an image side. The front group consists of one or more lens groups that move during zooming and has a negative refractive power as a whole throughout an entire zoom range. The middle group includes only one lens group as a lens group. The rear group consists of a plurality of lens groups. An aperture stop is disposed between a lens surface closest to the image side in the front group and a lens surface closest to the object side in the rear group. The zoom lens satisfies predetermined conditional expressions.

79 Claims, 80 Drawing Sheets

EXAMPLE 1

FIG.1 EXAMPLE 1

FIG.2
EXAMPLE 1
WIDE ANGLE END_INFINITY
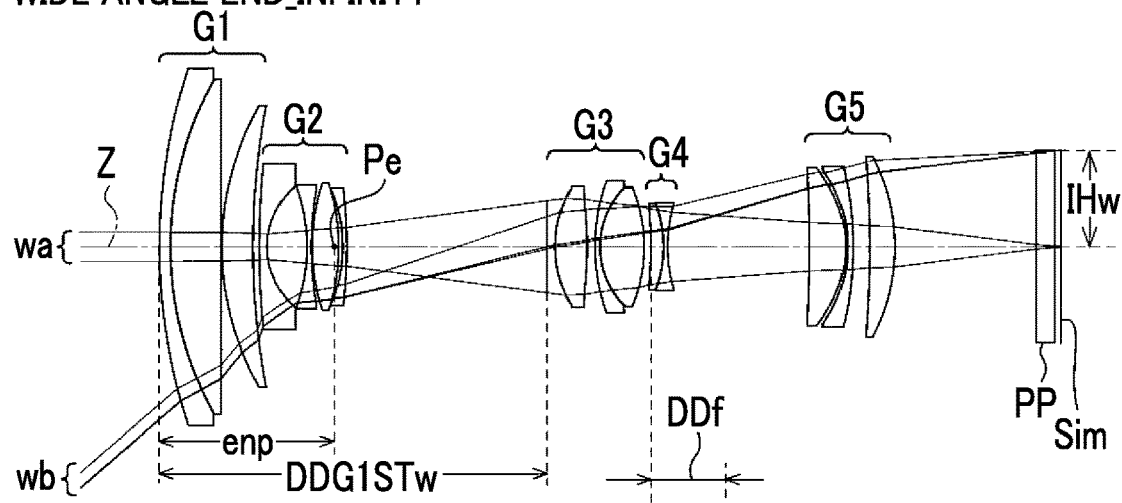
TELEPHOTO END_INFINITY
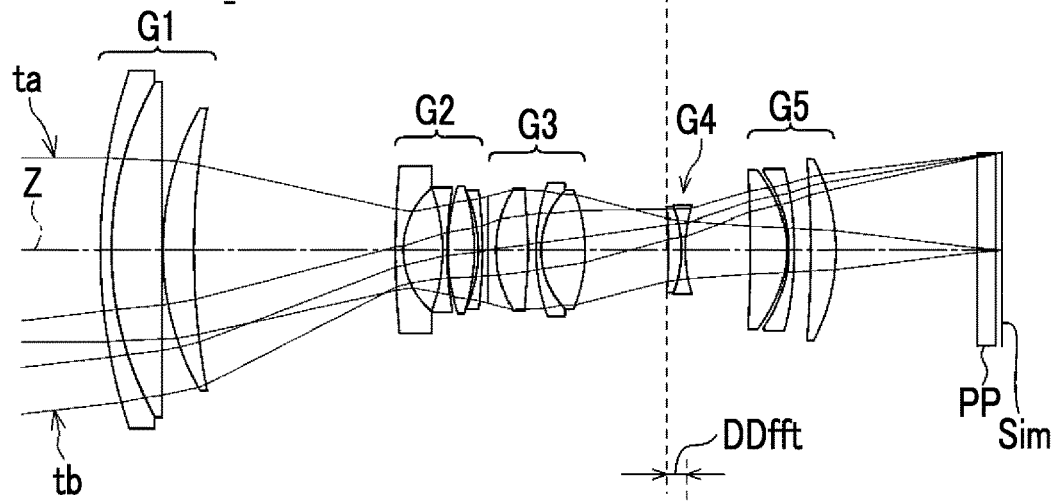
TELEPHOTO END_CLOSE RANGE
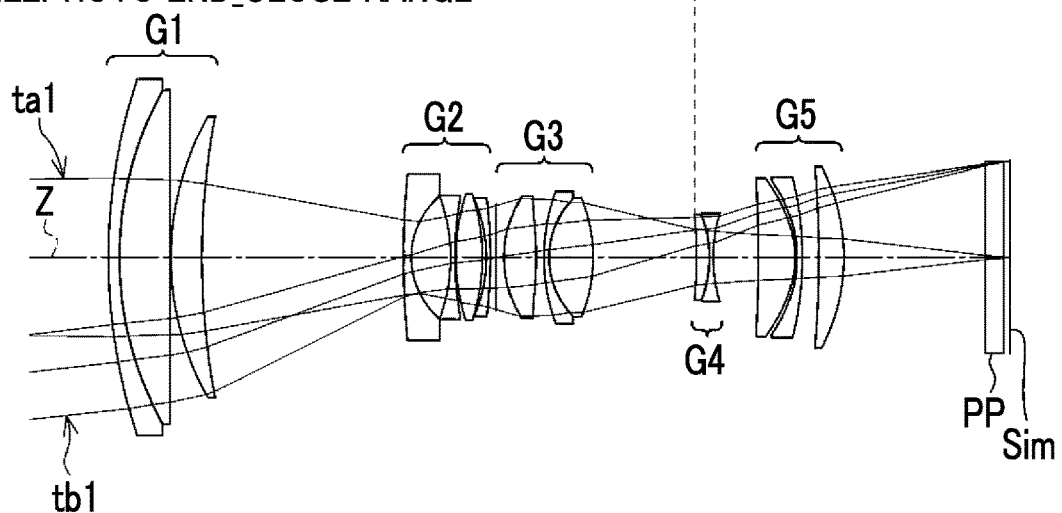

FIG.8
EXAMPLE 1
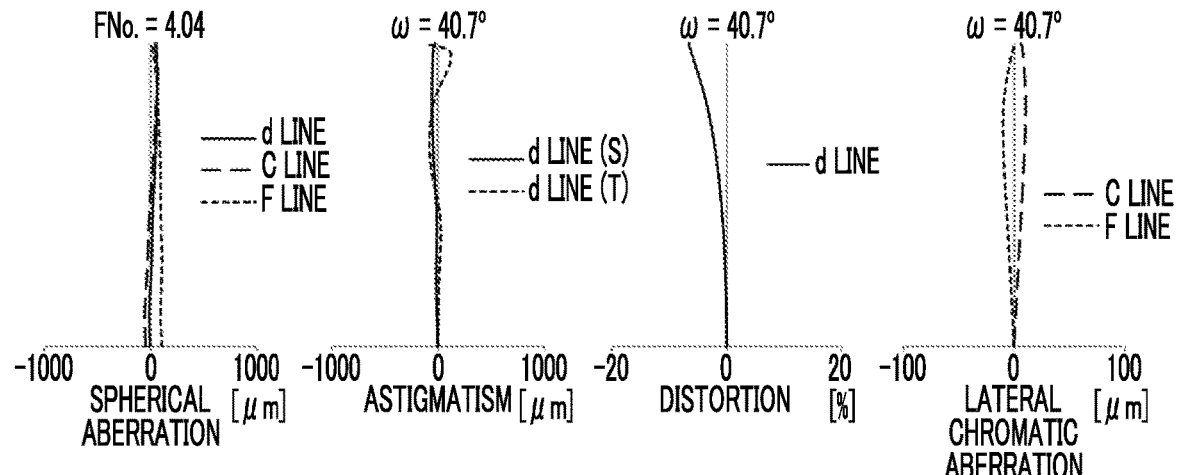
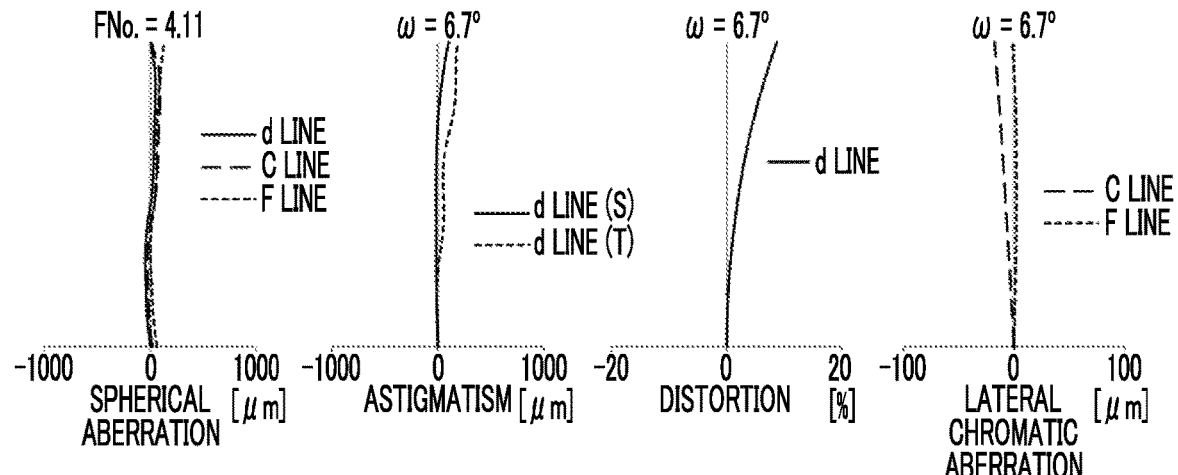
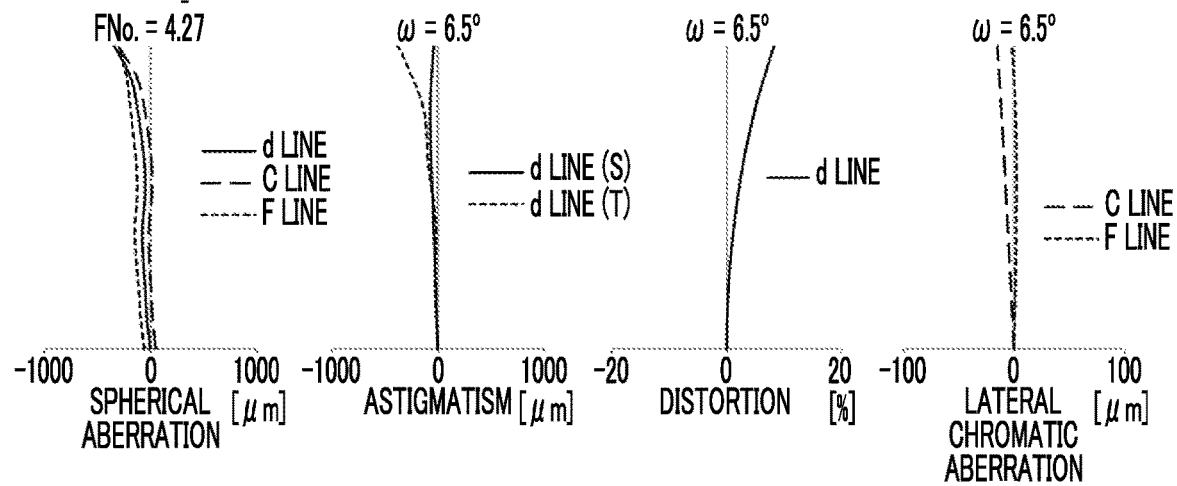

FIG.10
EXAMPLE 2
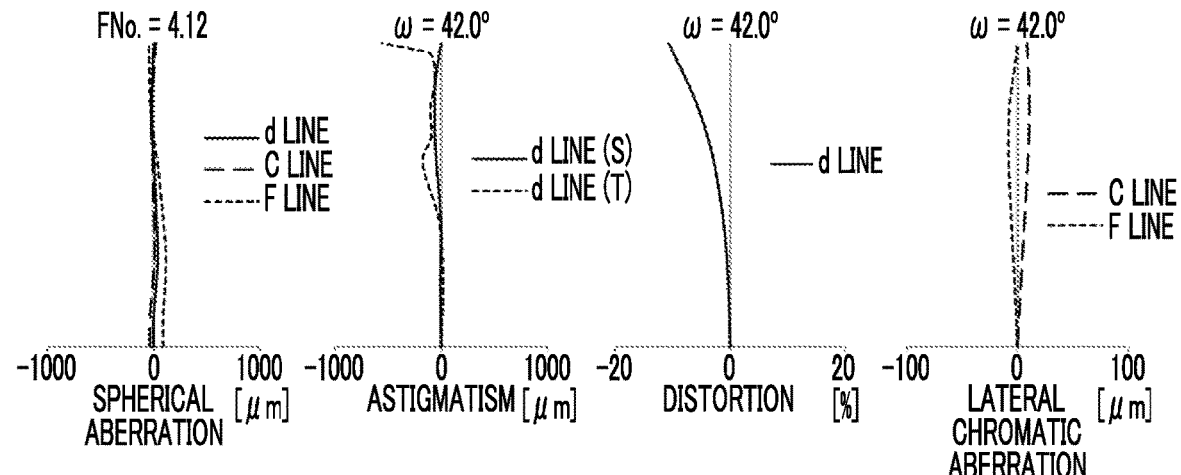
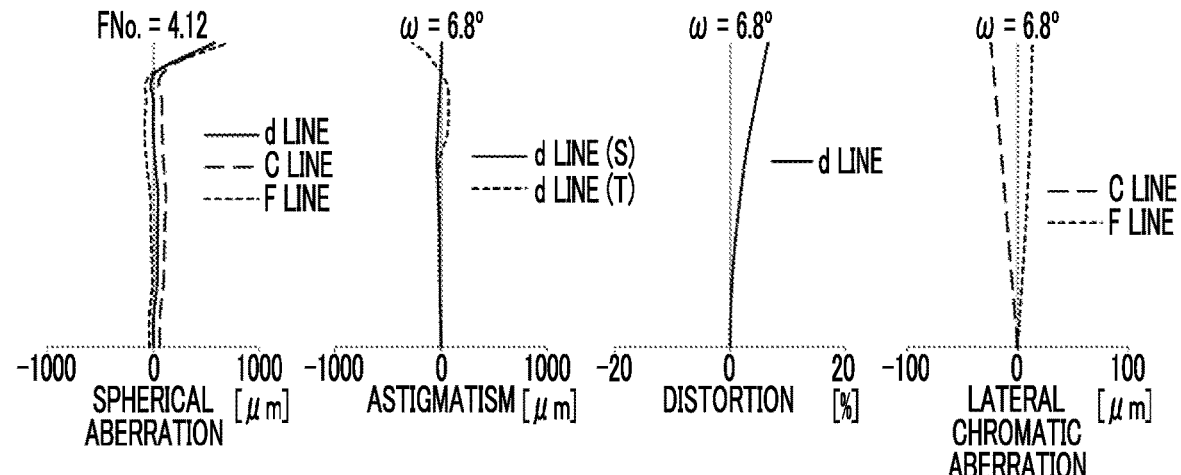
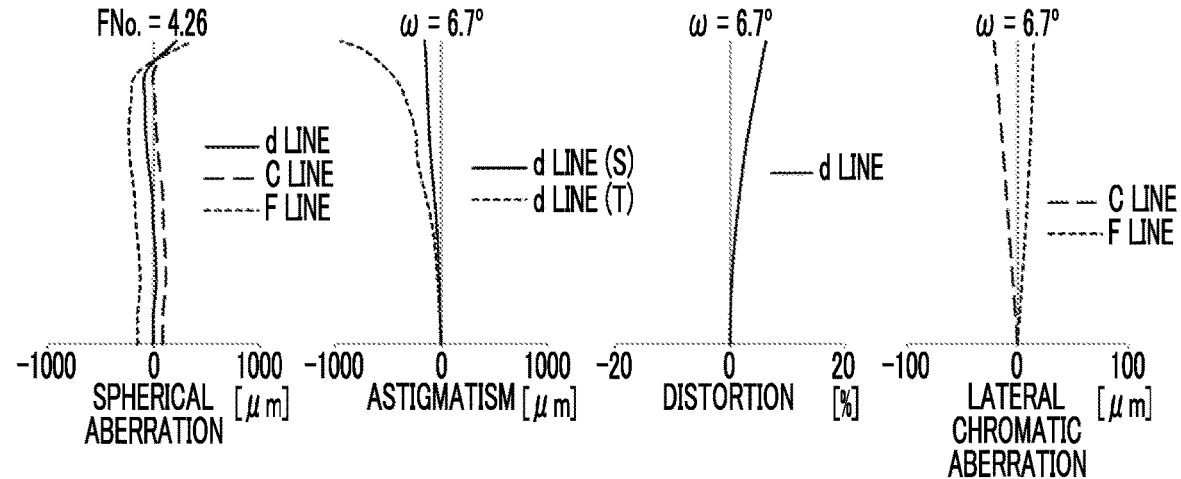

FIG.12
EXAMPLE 3
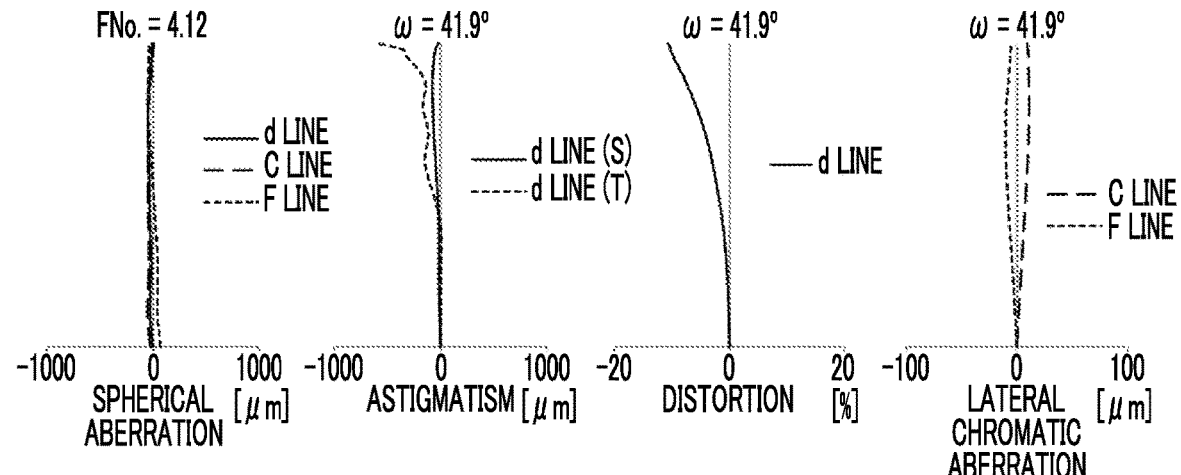
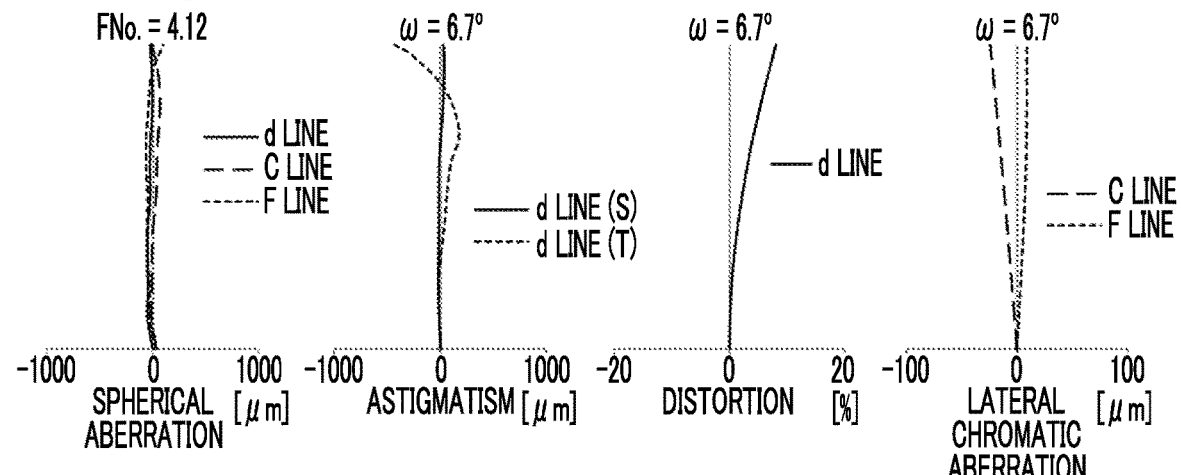
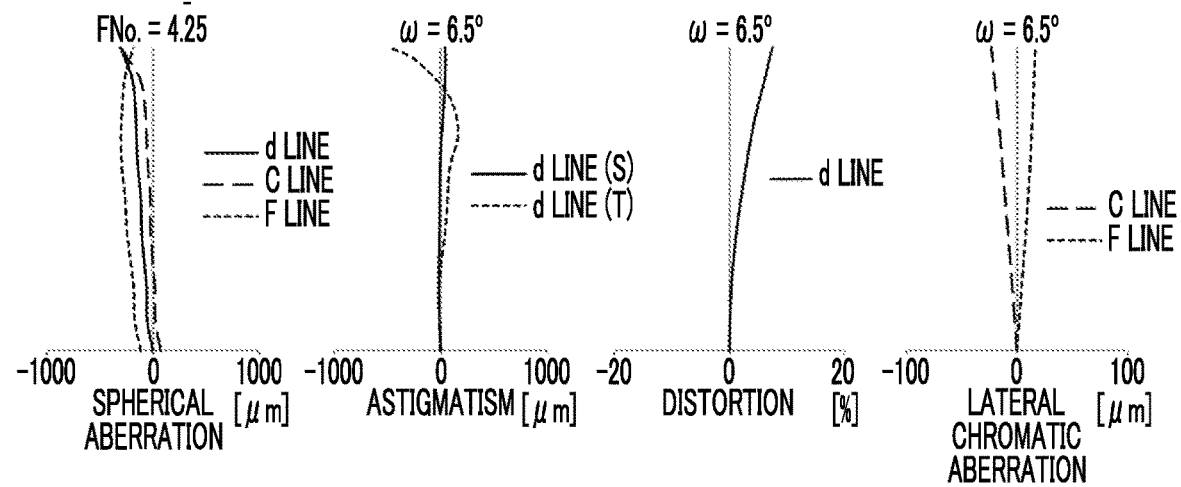

FIG.13 EXAMPLE 4

FIG.14
EXAMPLE 4
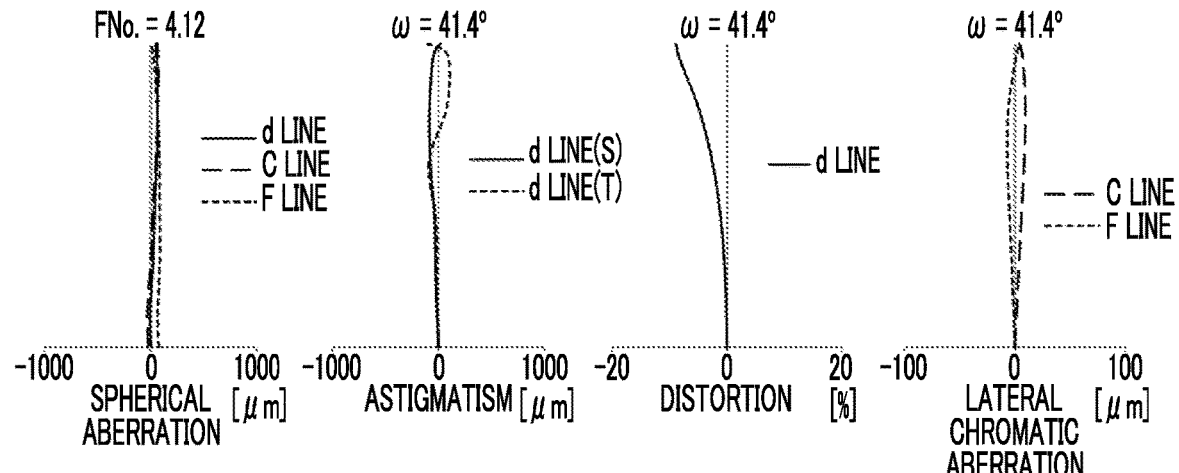
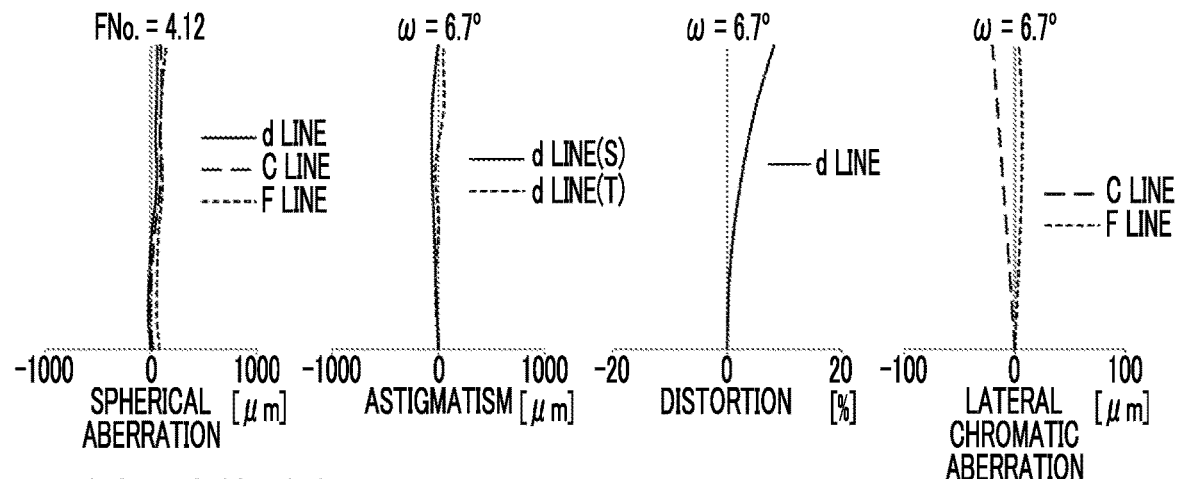
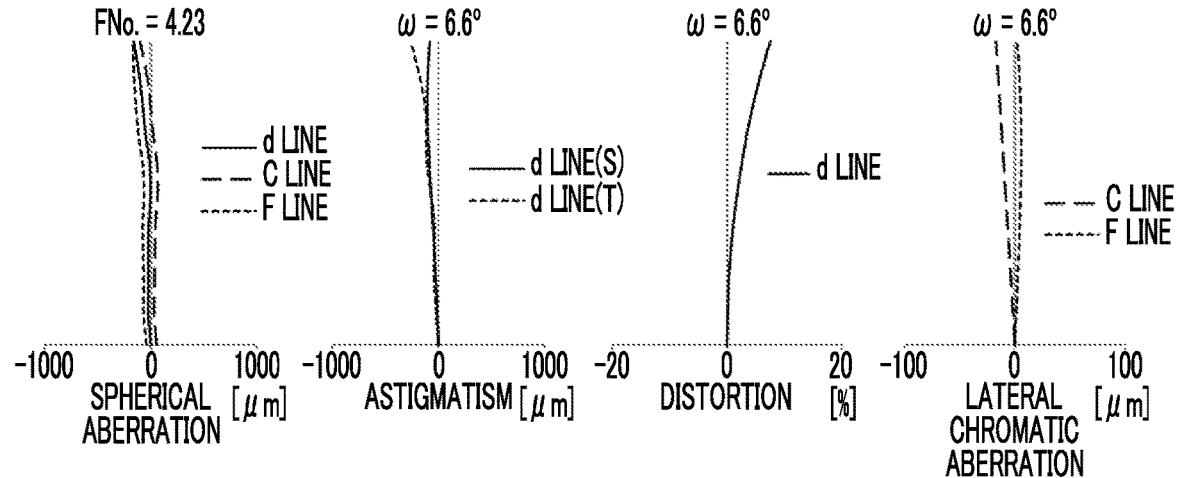

FIG.15 EXAMPLE 5

FIG.16
EXAMPLE 5
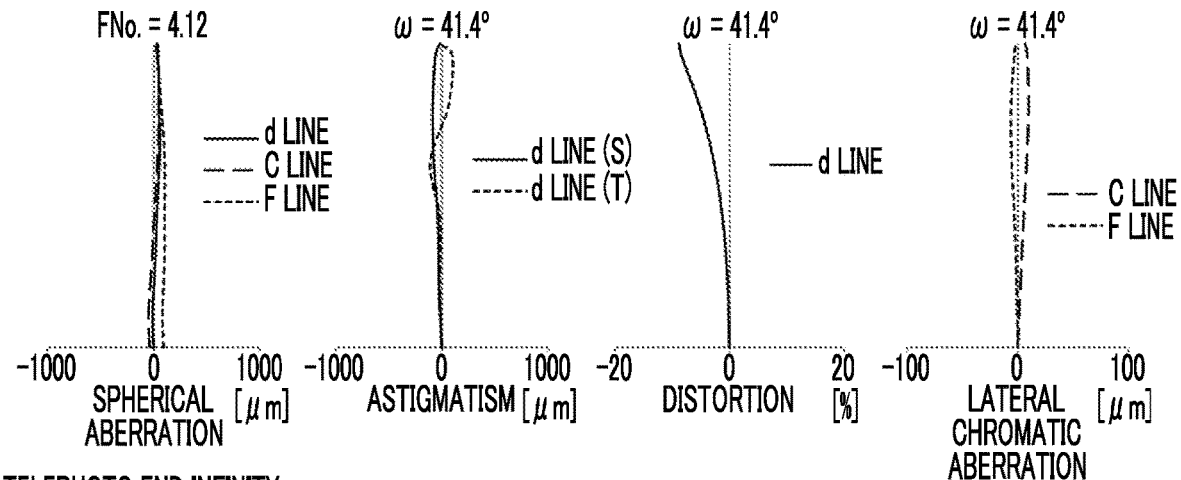
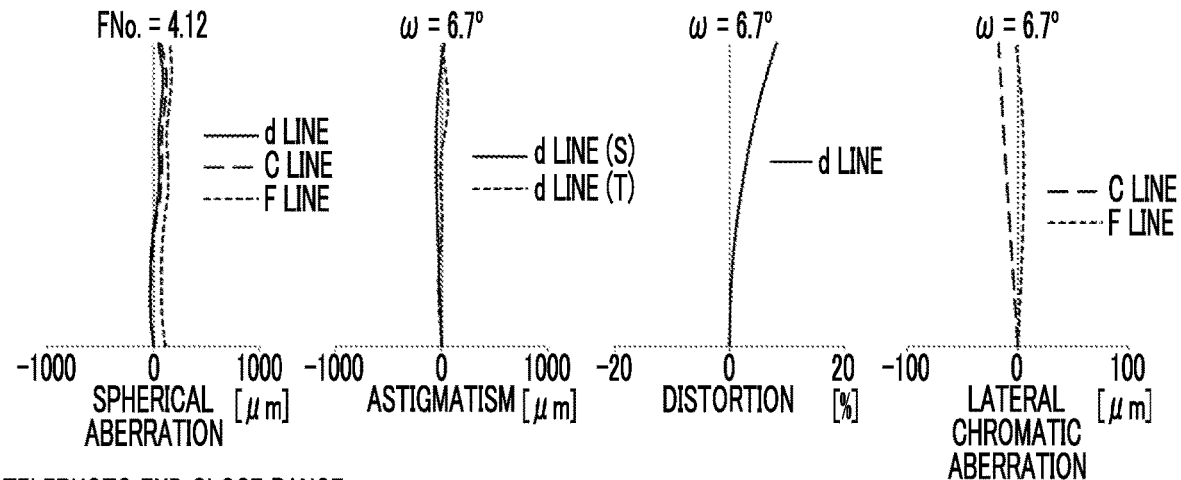
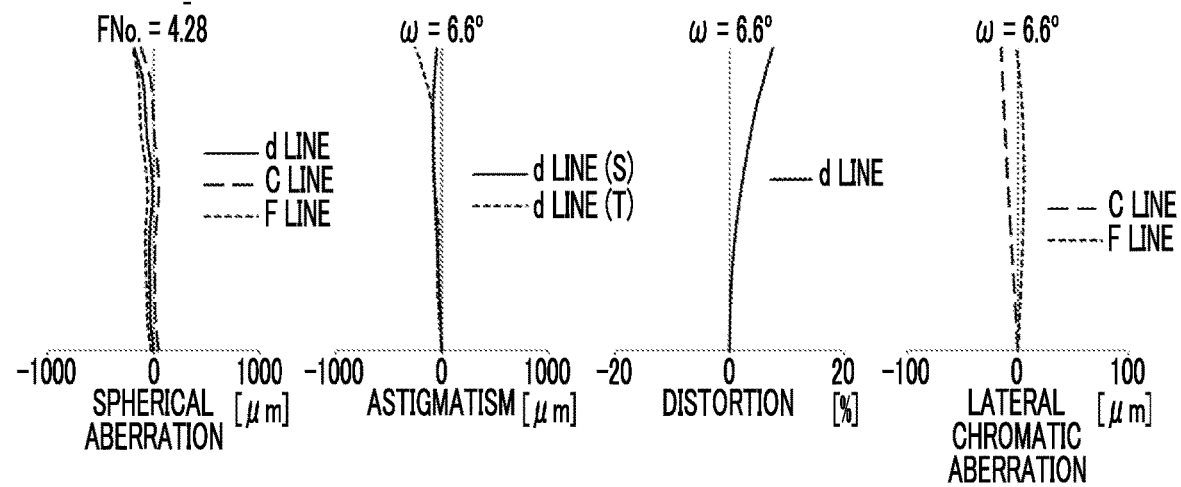

EXAMPLE 6

FIG.18
EXAMPLE 6
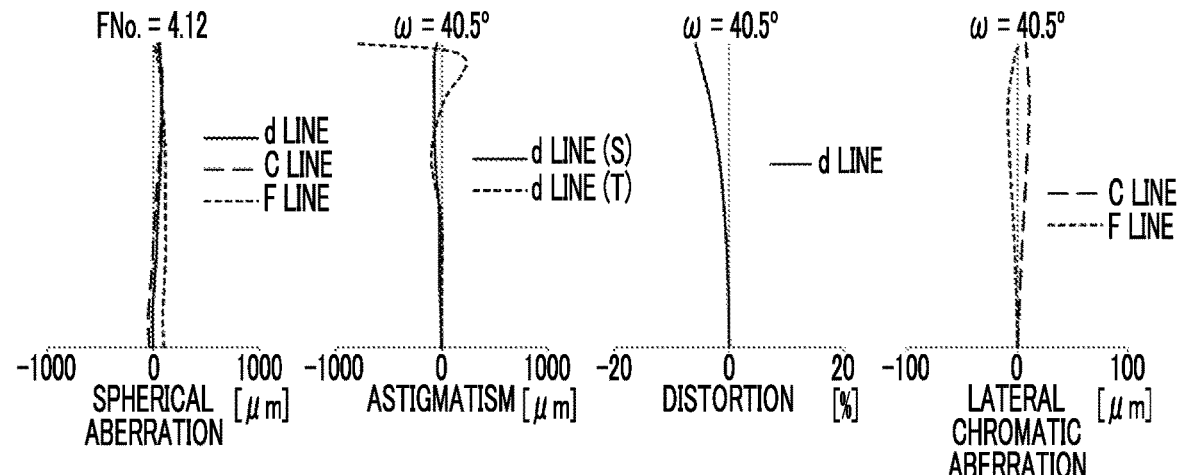
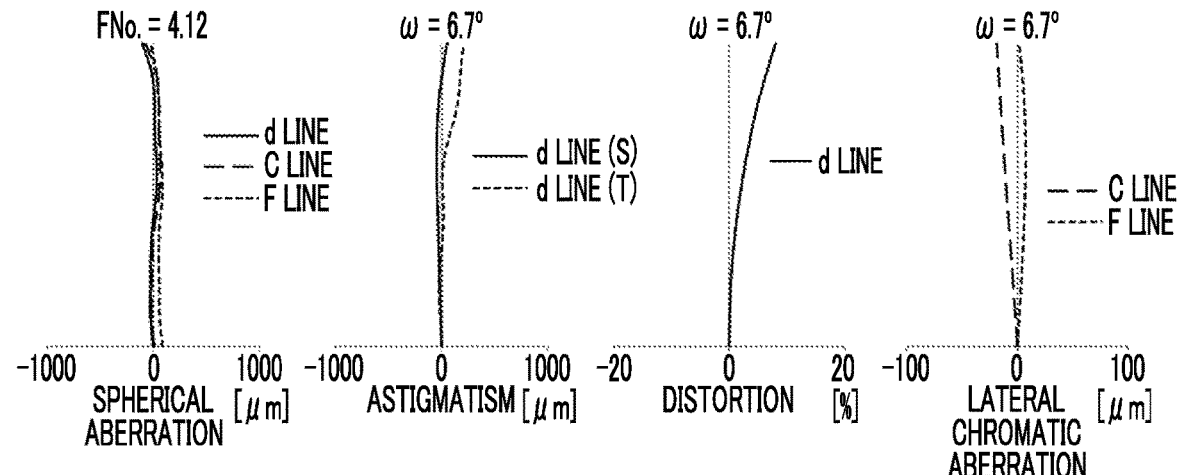
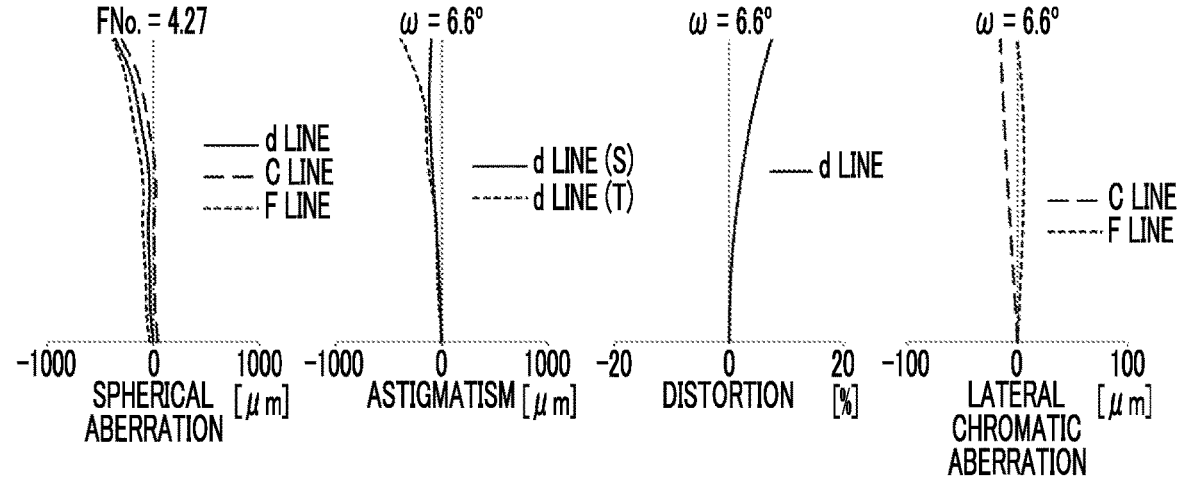

EXAMPLE 7

FIG.20
EXAMPLE 7
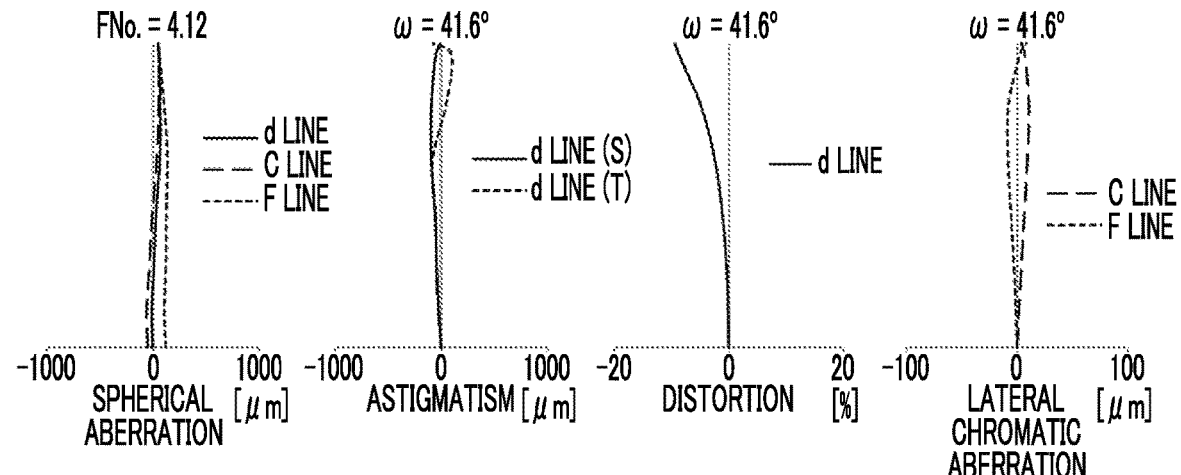
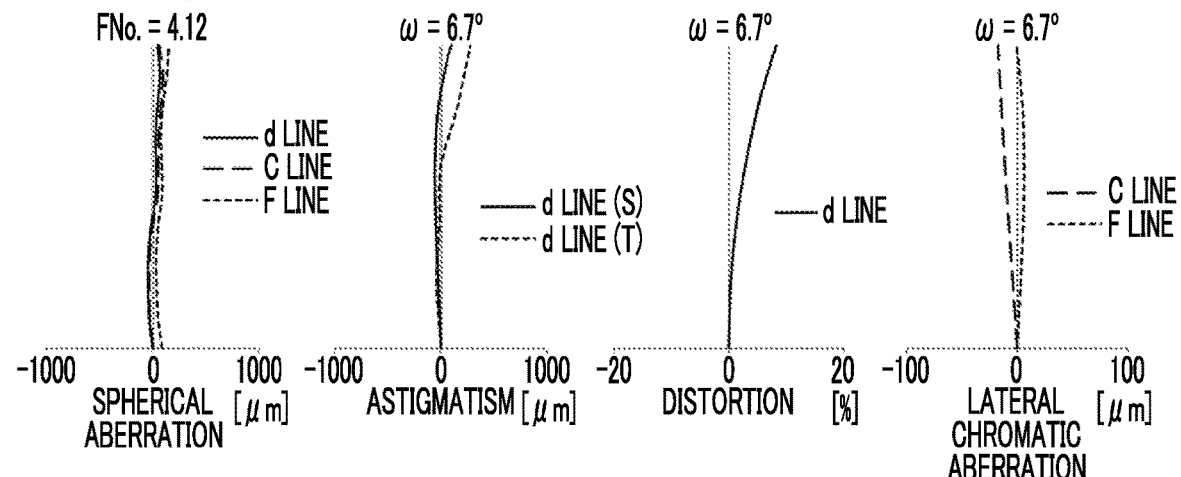
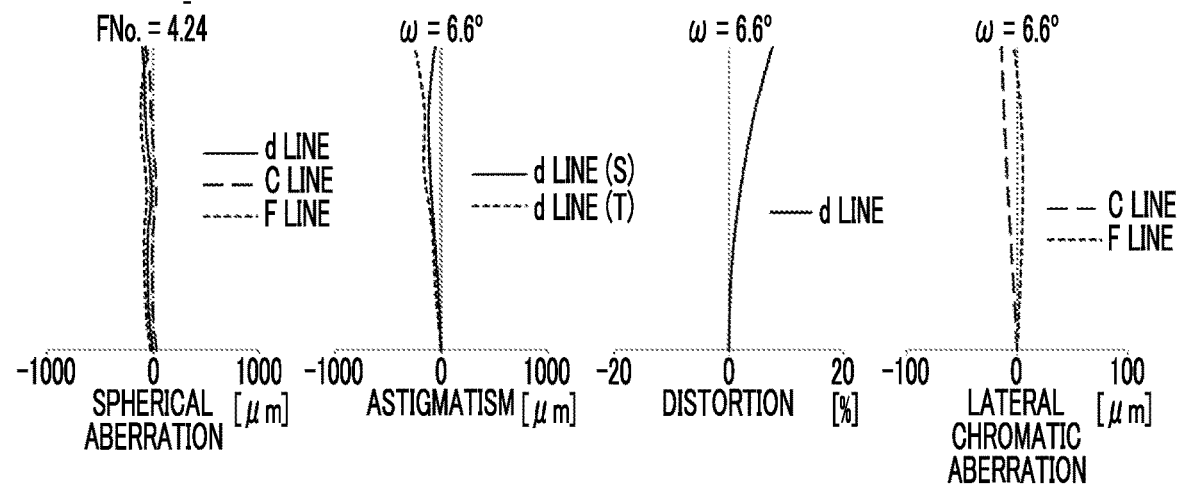

FIG.22
EXAMPLE 8
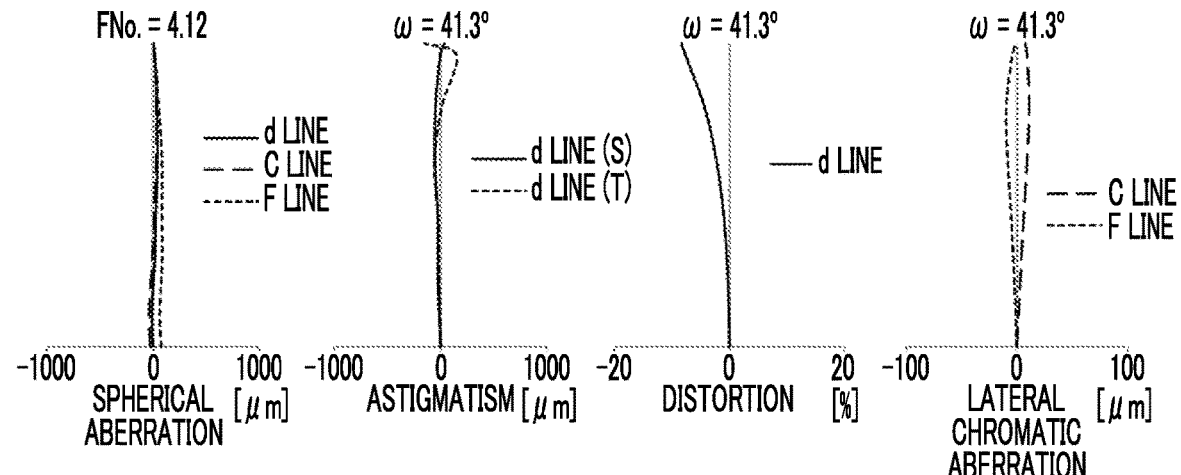
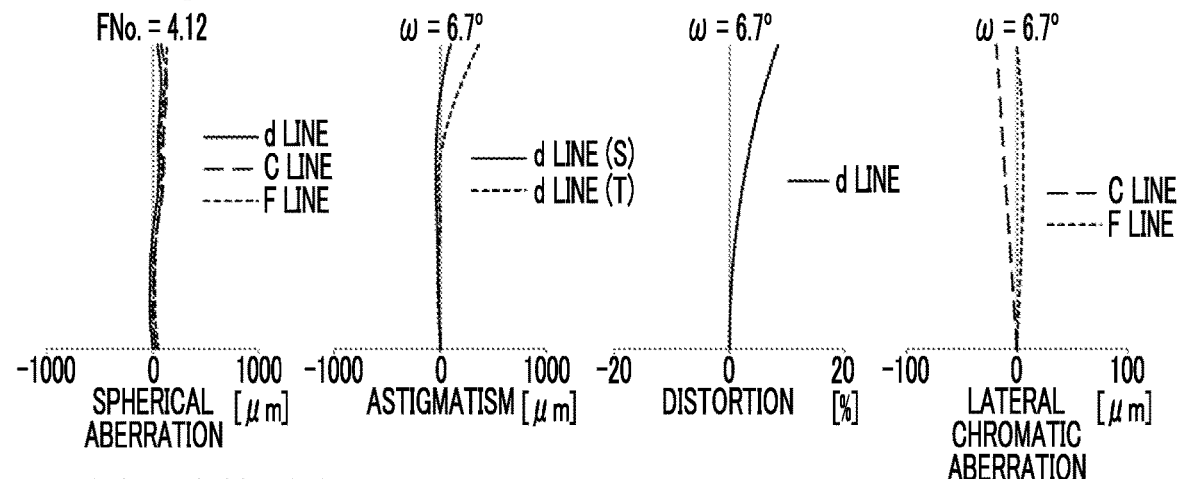
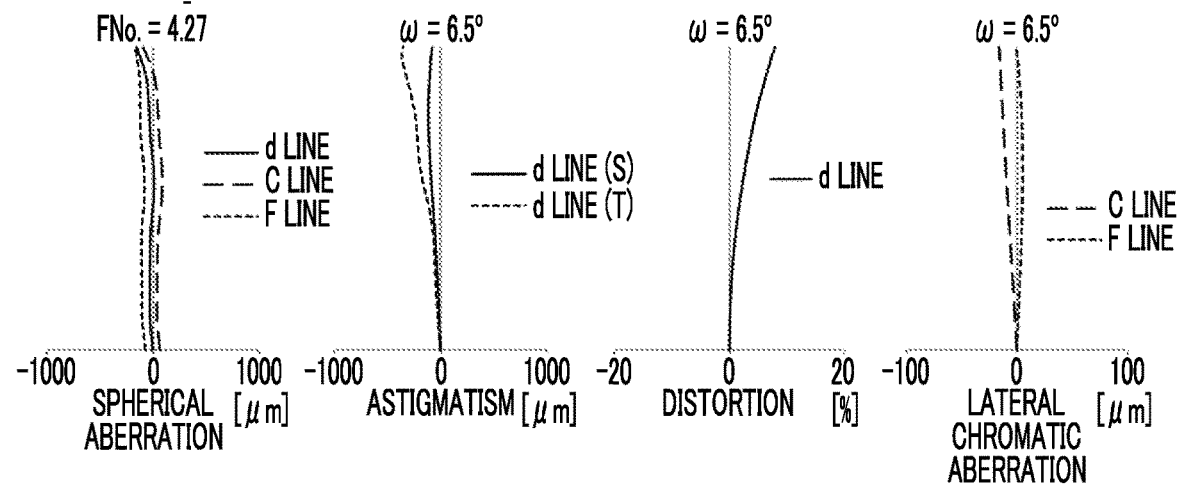

FIG.23 EXAMPLE 9

FIG.24
EXAMPLE 9
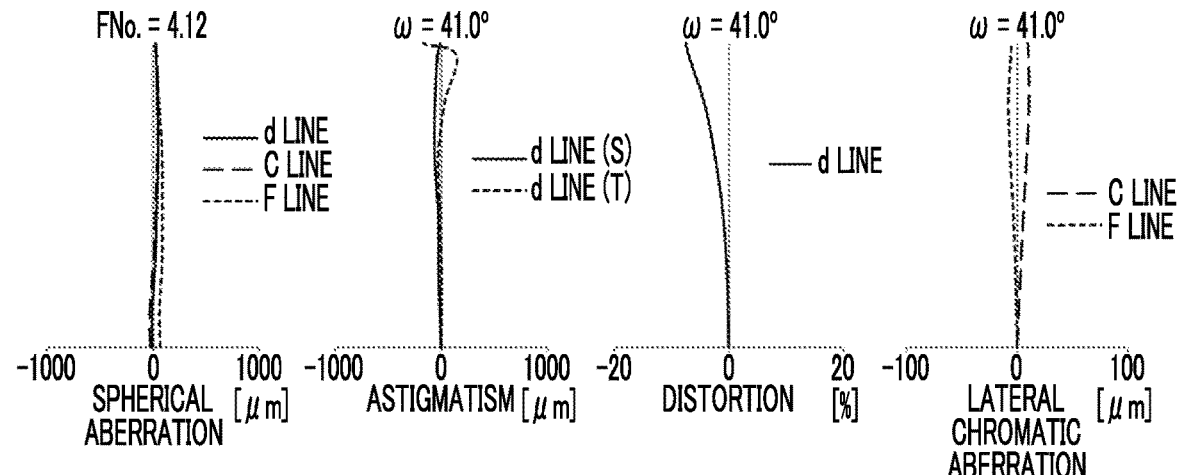
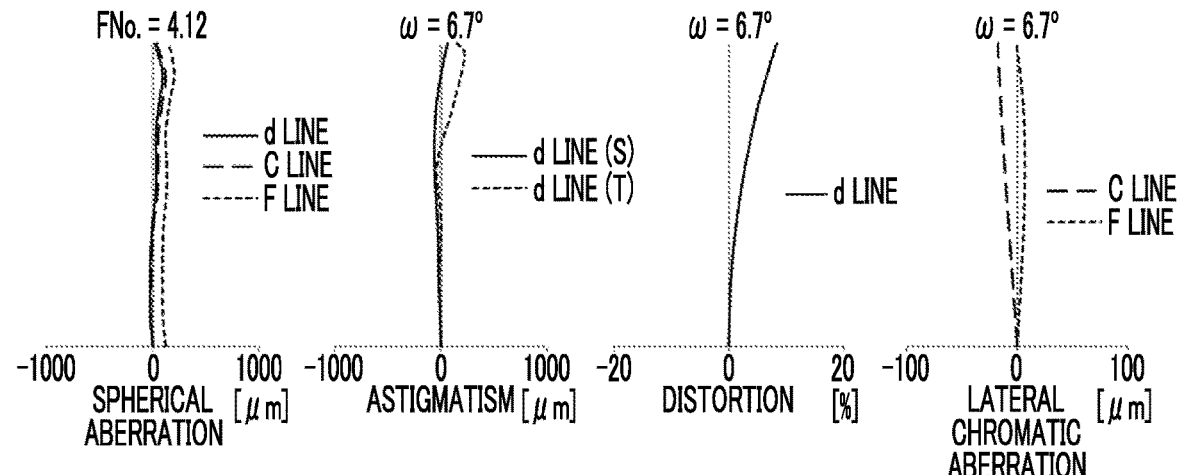
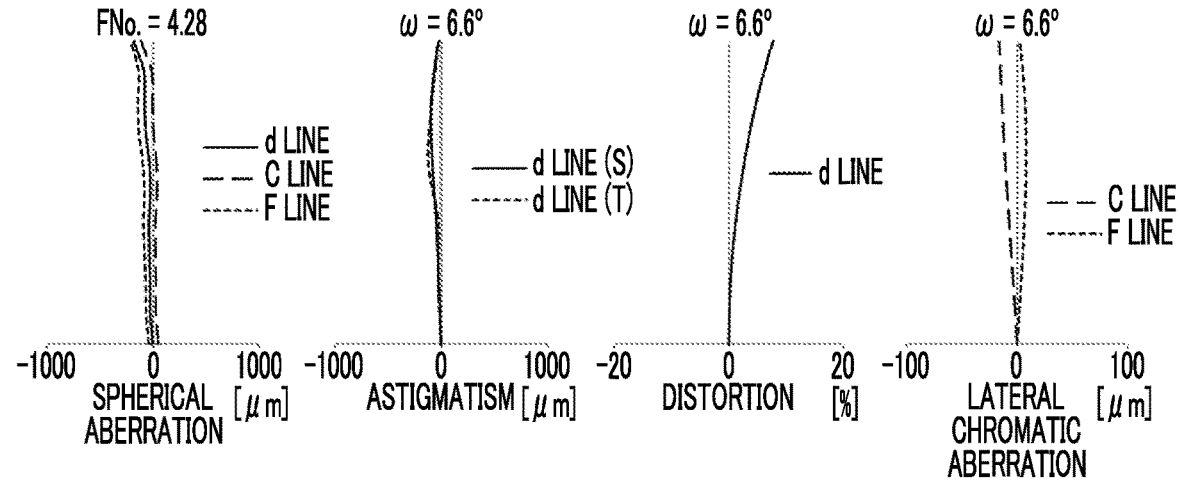

FIG.26
EXAMPLE 10
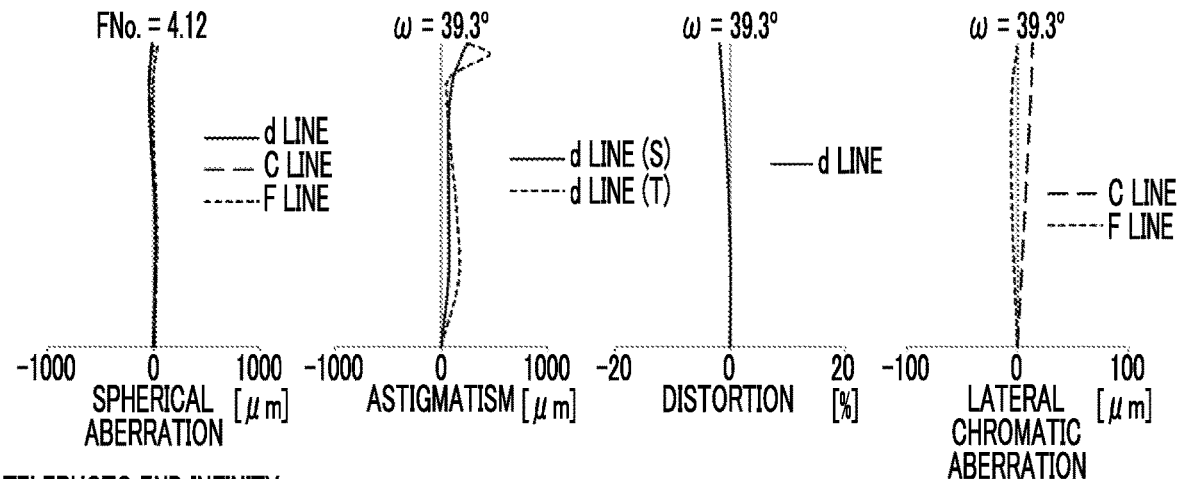
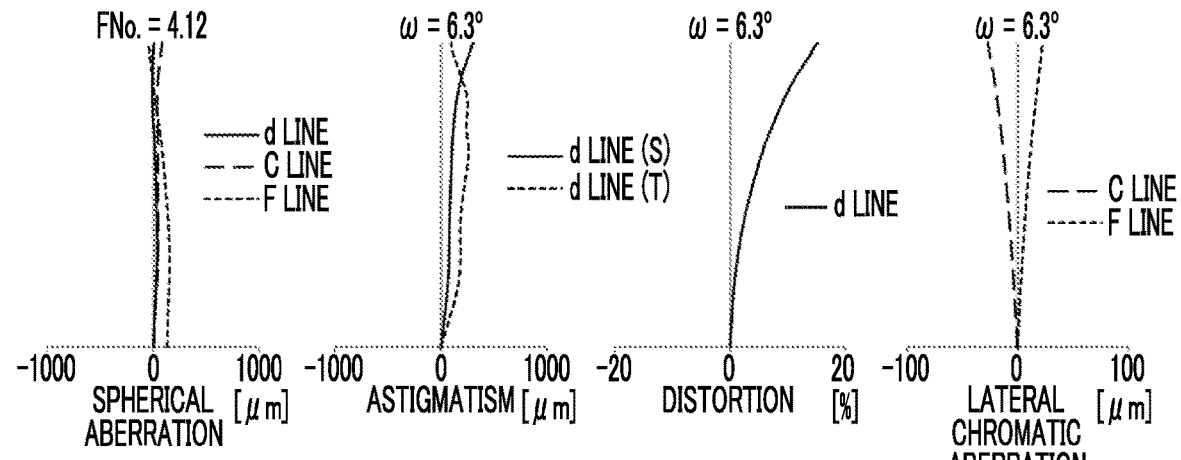
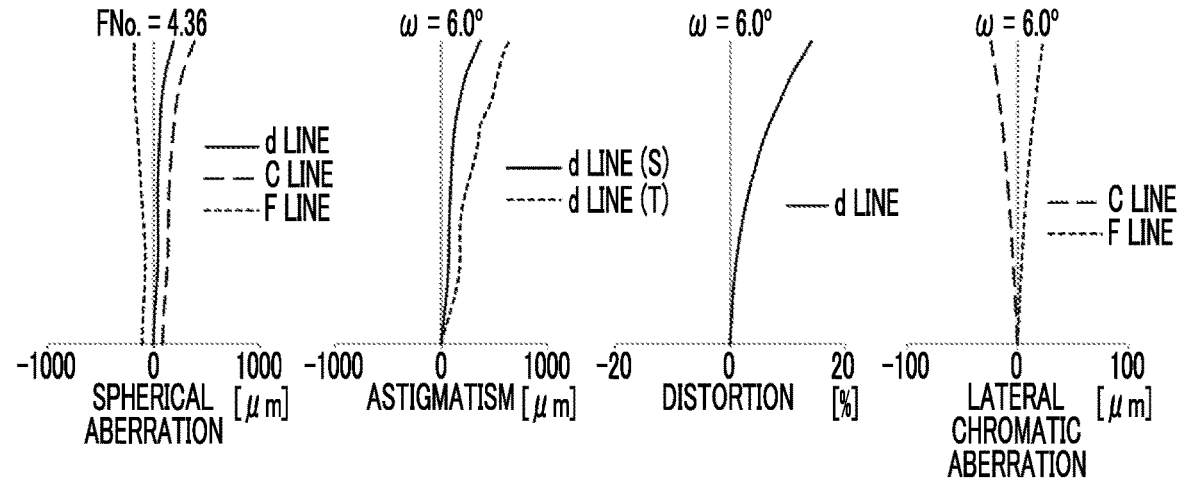

FIG.28
EXAMPLE 11
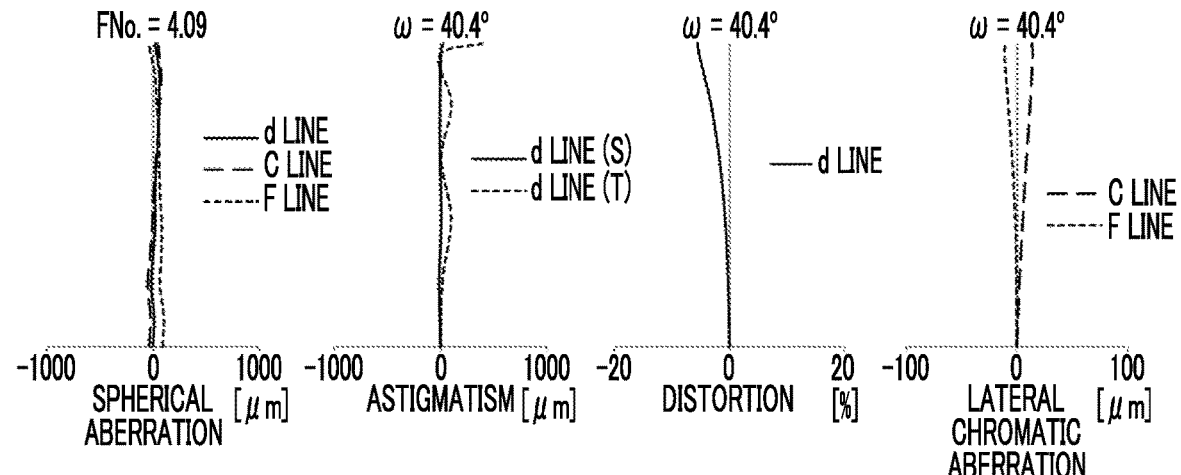
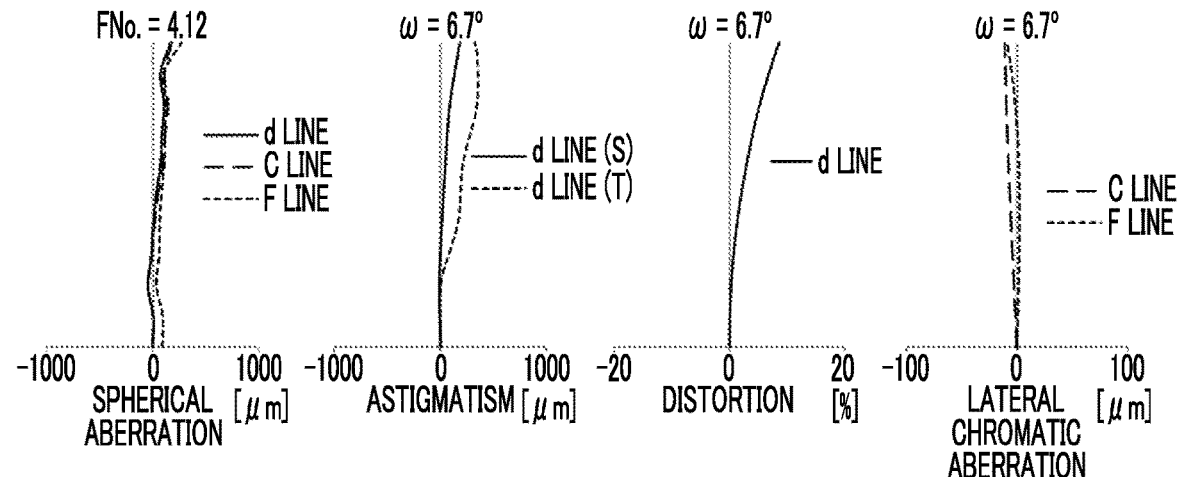
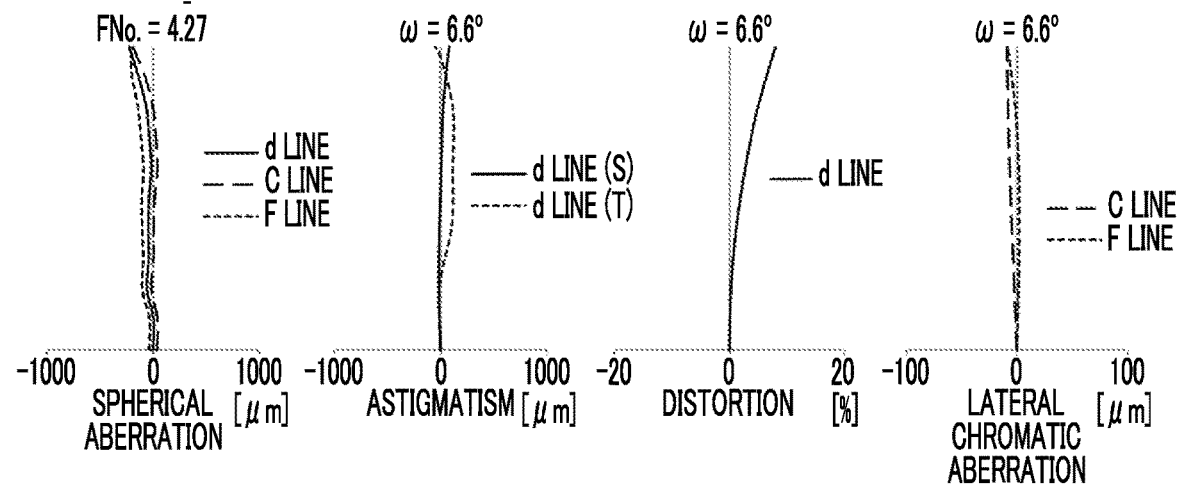

FIG.30
EXAMPLE 12
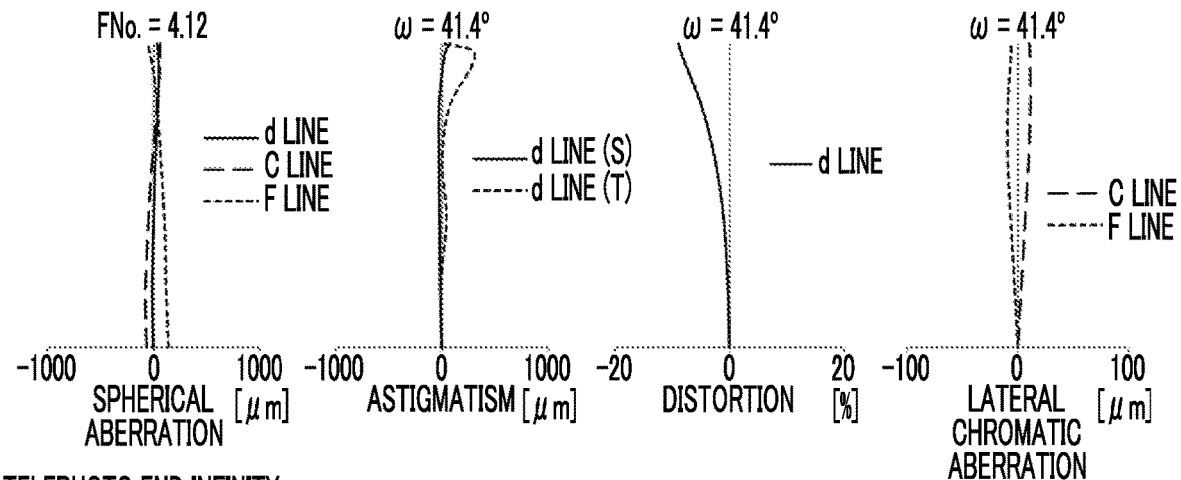
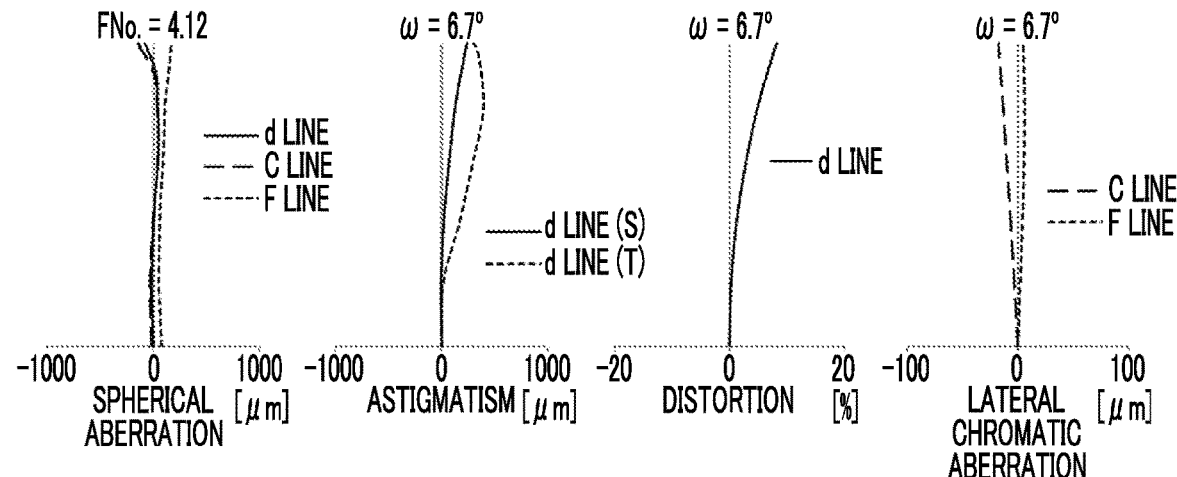
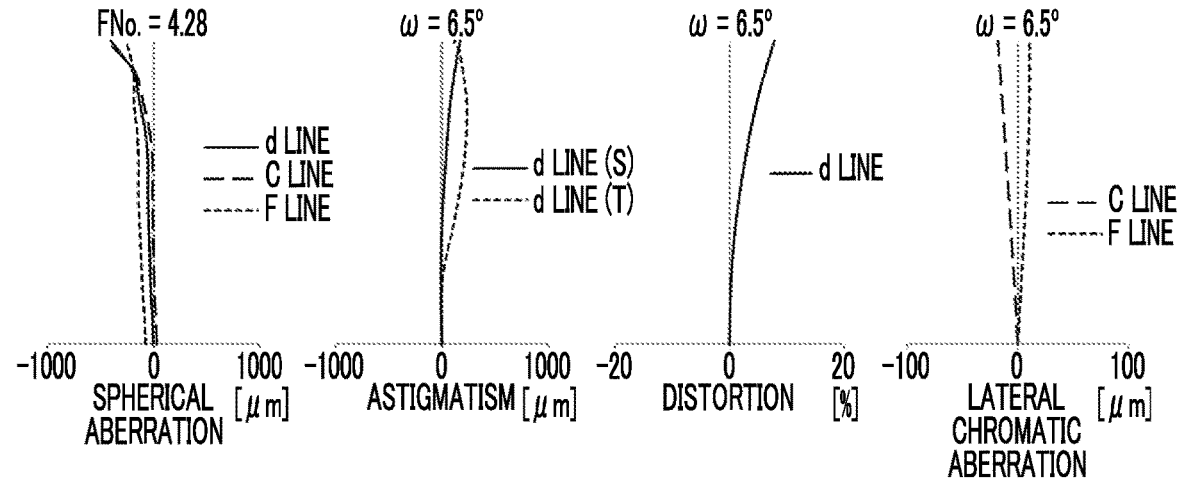

EXAMPLE 13

FIG.32
EXAMPLE 13
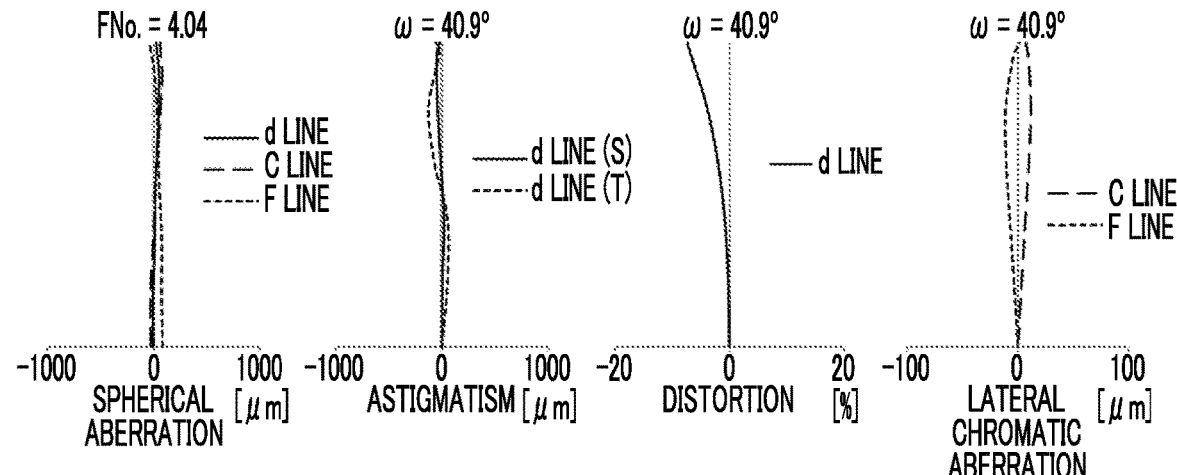
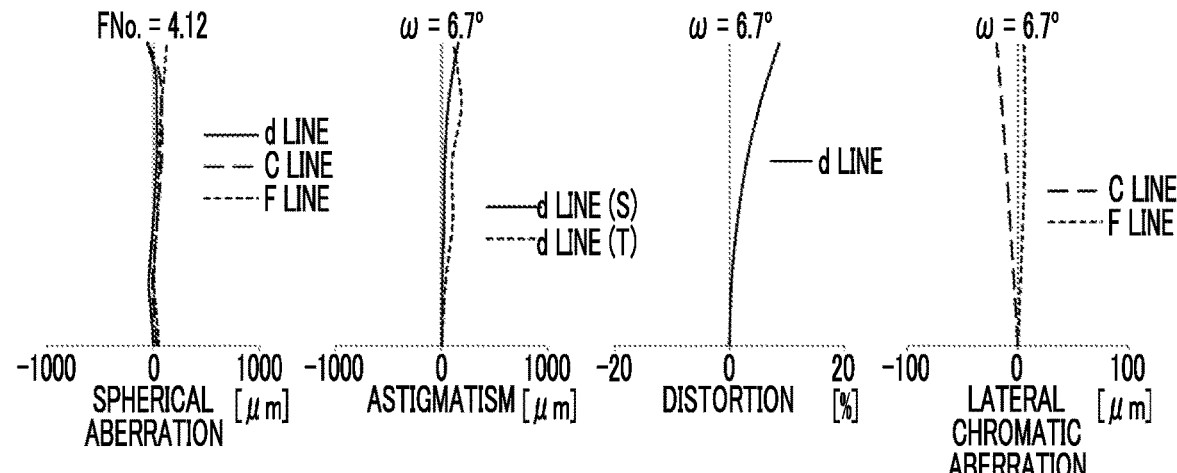
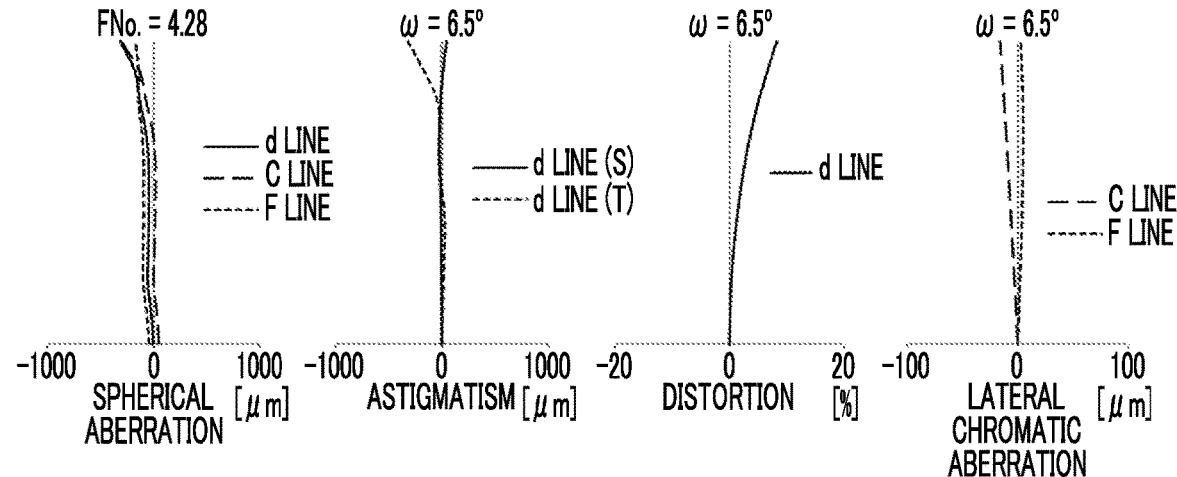

FIG.34
EXAMPLE 14
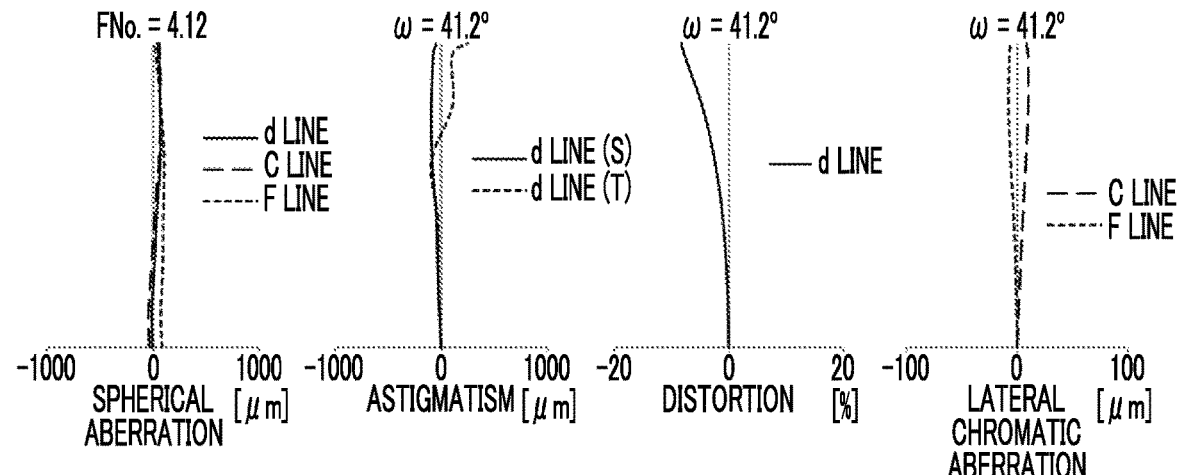
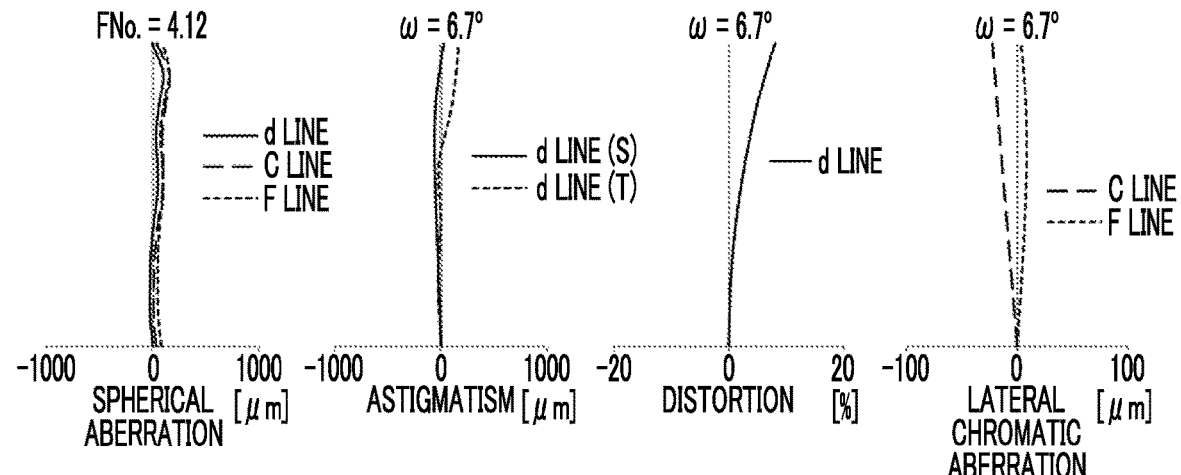
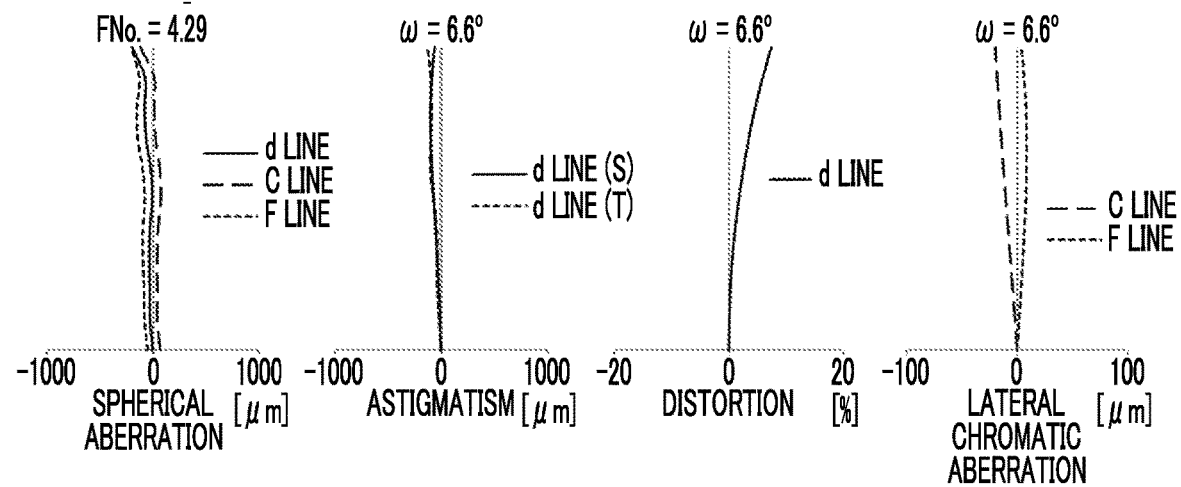

EXAMPLE 15

FIG.36
EXAMPLE 15
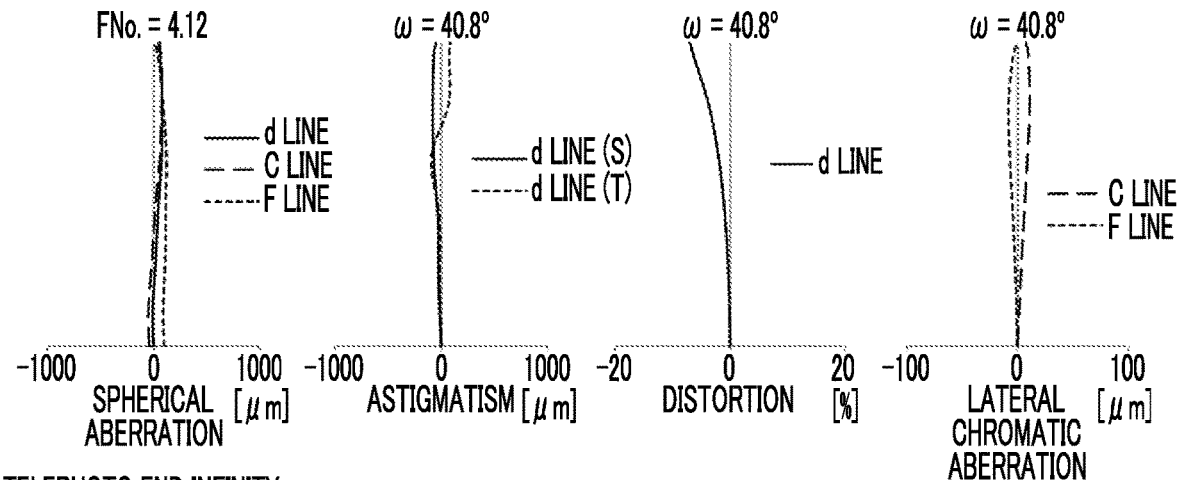
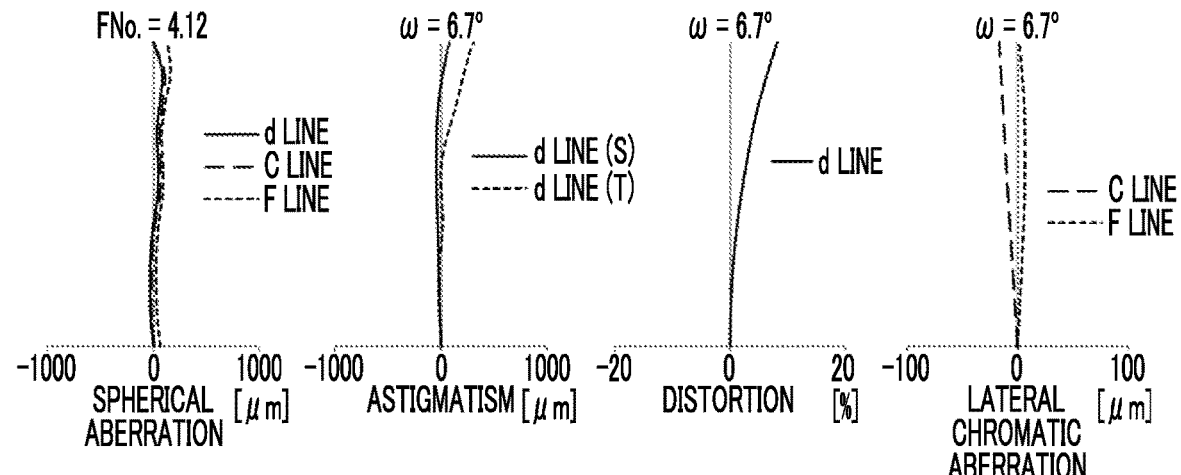
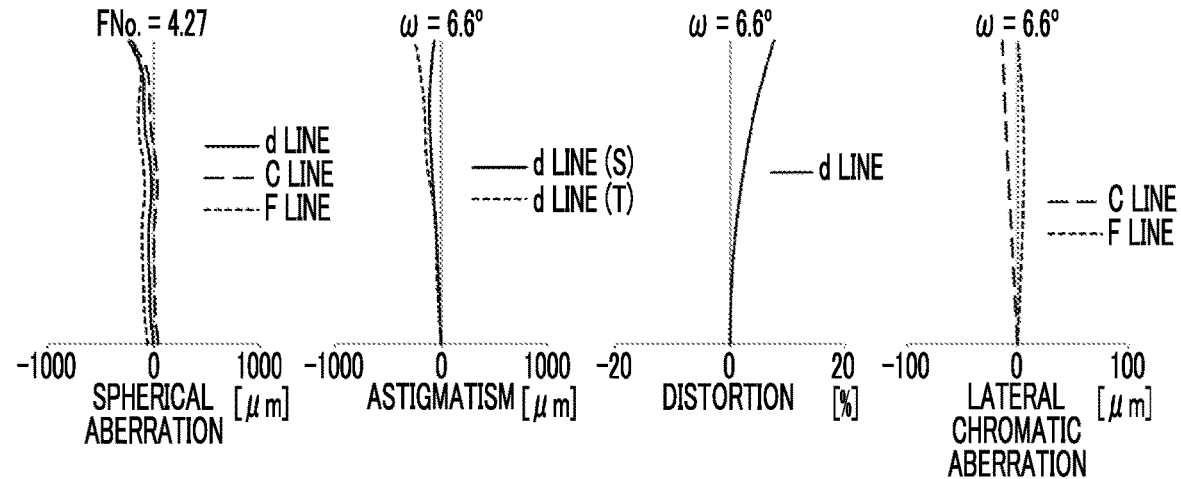

EXAMPLE 16

FIG.38
EXAMPLE 16
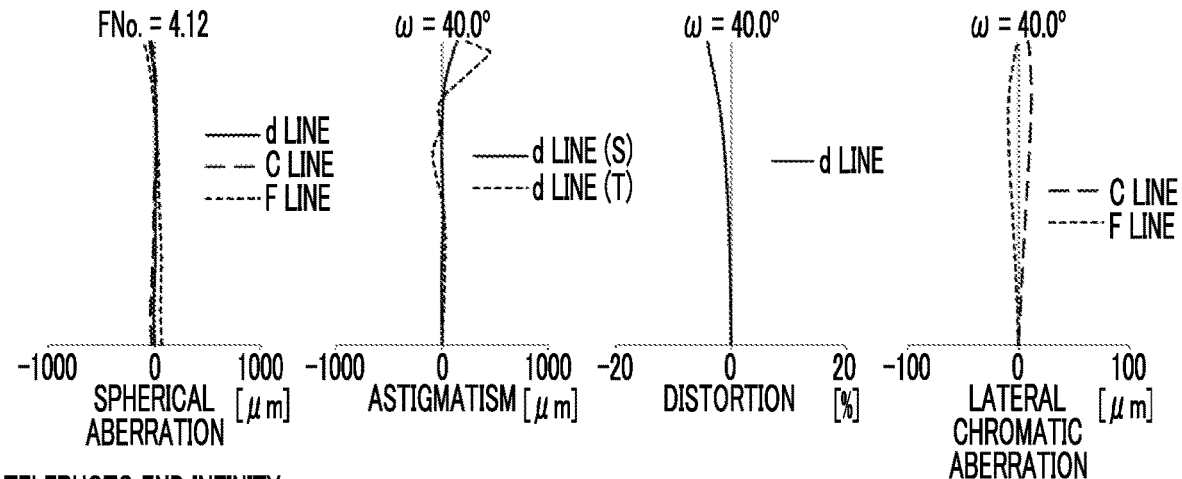
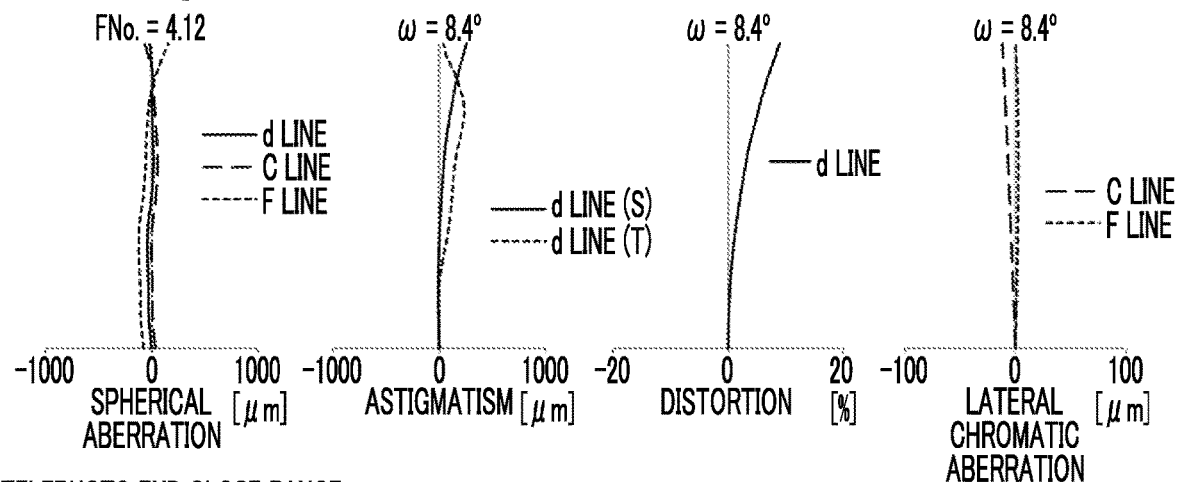
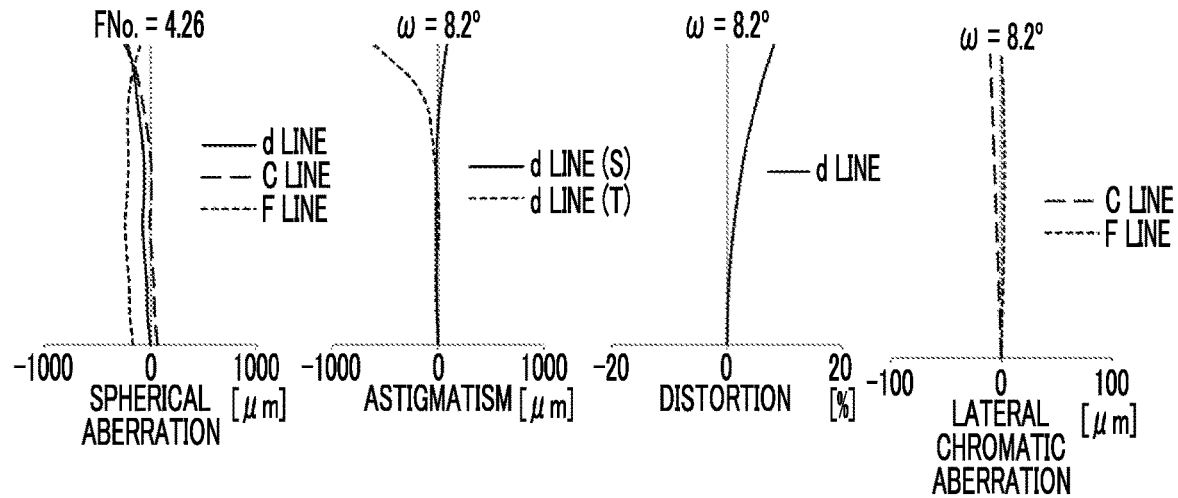

FIG.39 EXAMPLE 17

FIG.40
EXAMPLE 17
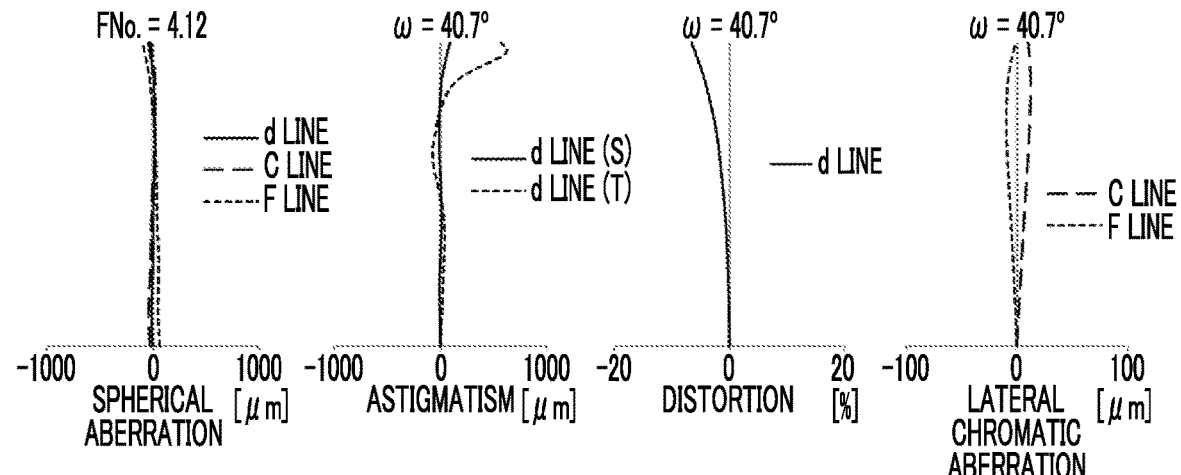
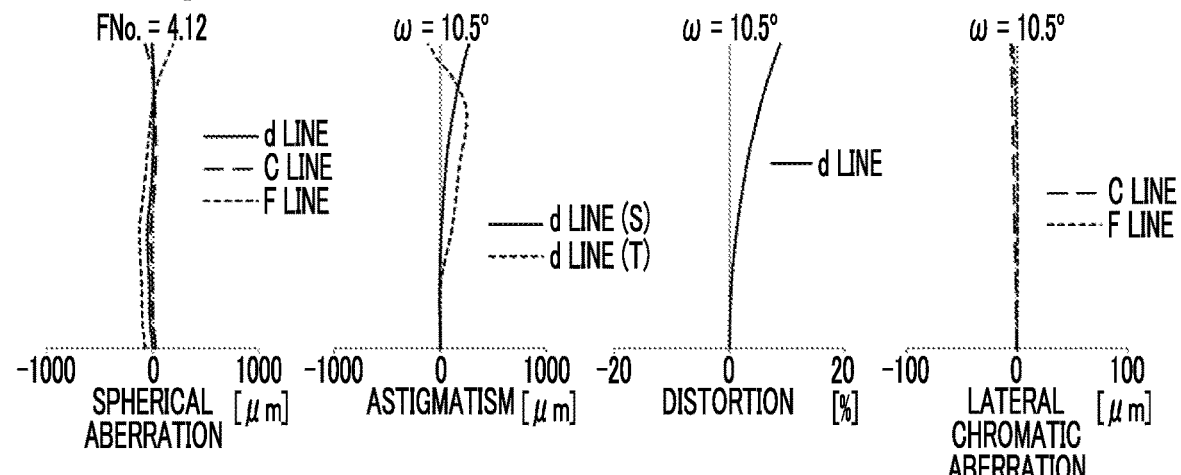
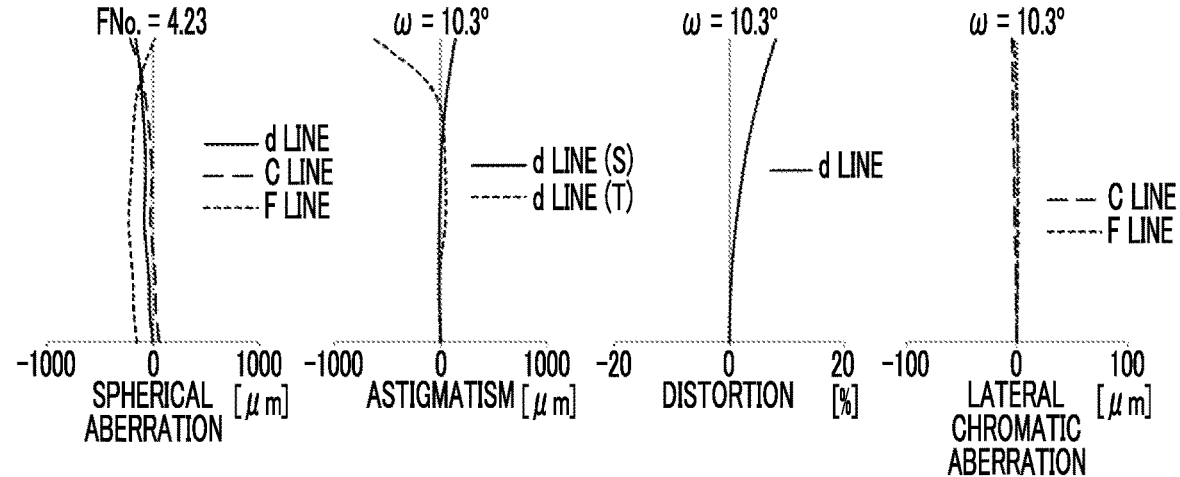

FIG.41 EXAMPLE 18

FIG.42
EXAMPLE 18
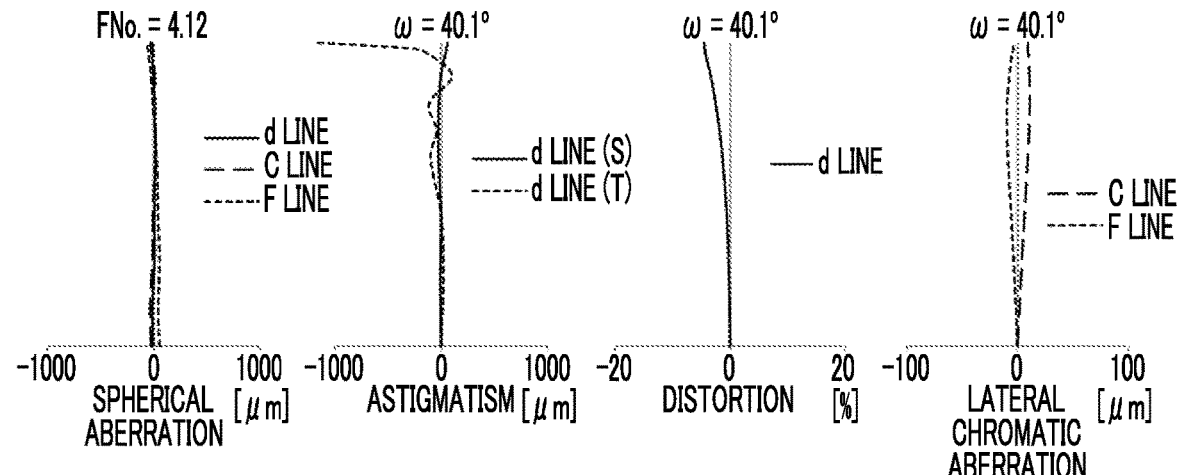
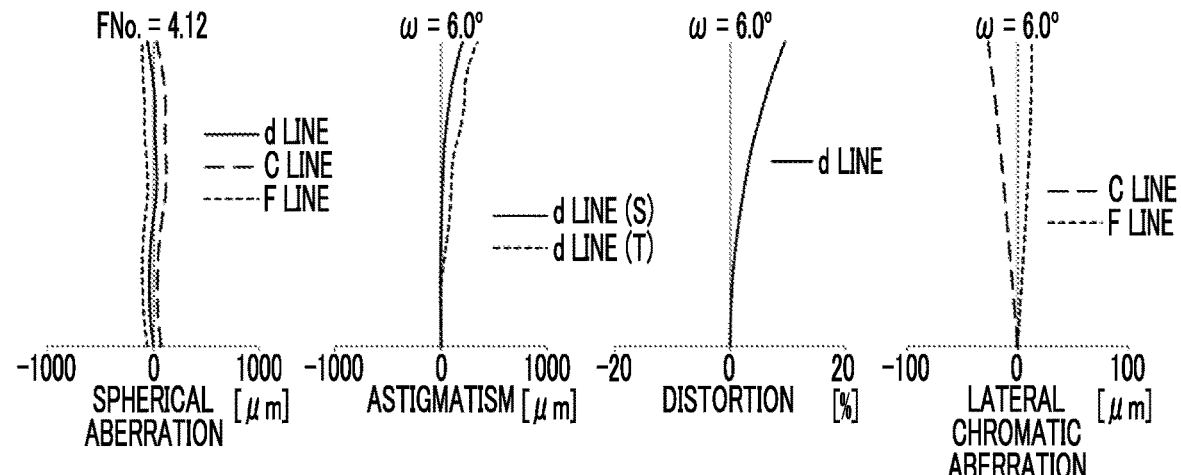
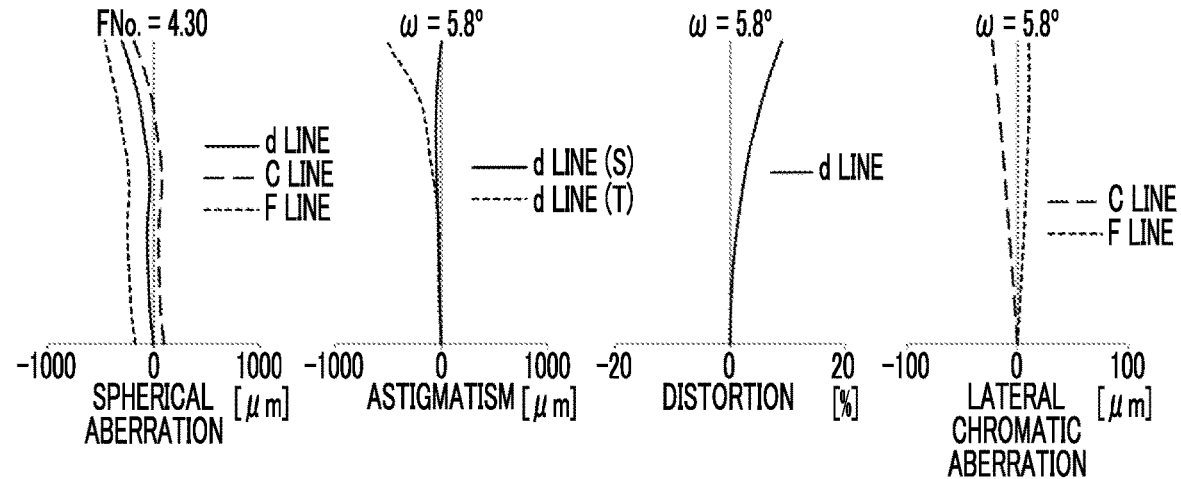

FIG.44
EXAMPLE 19
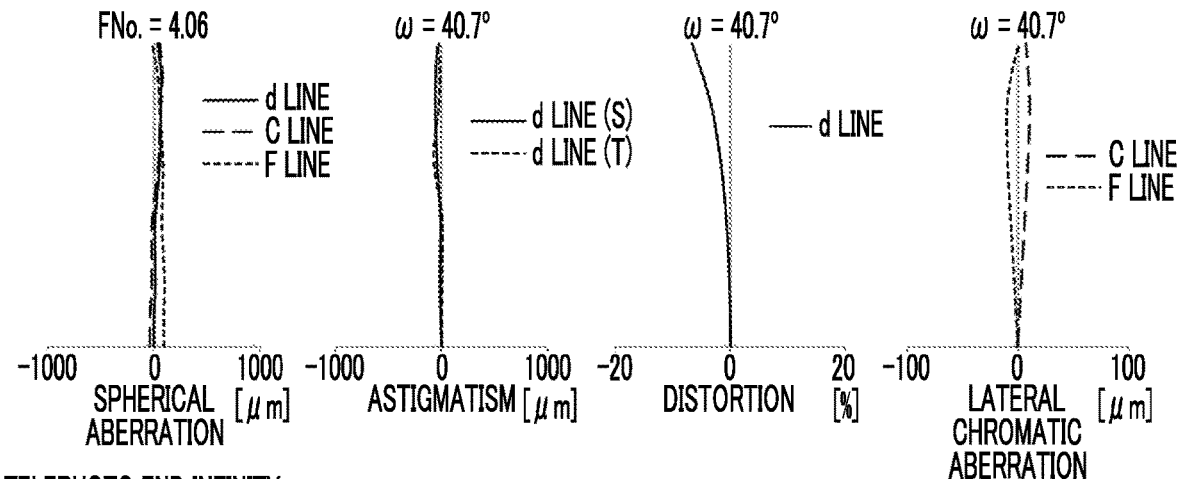
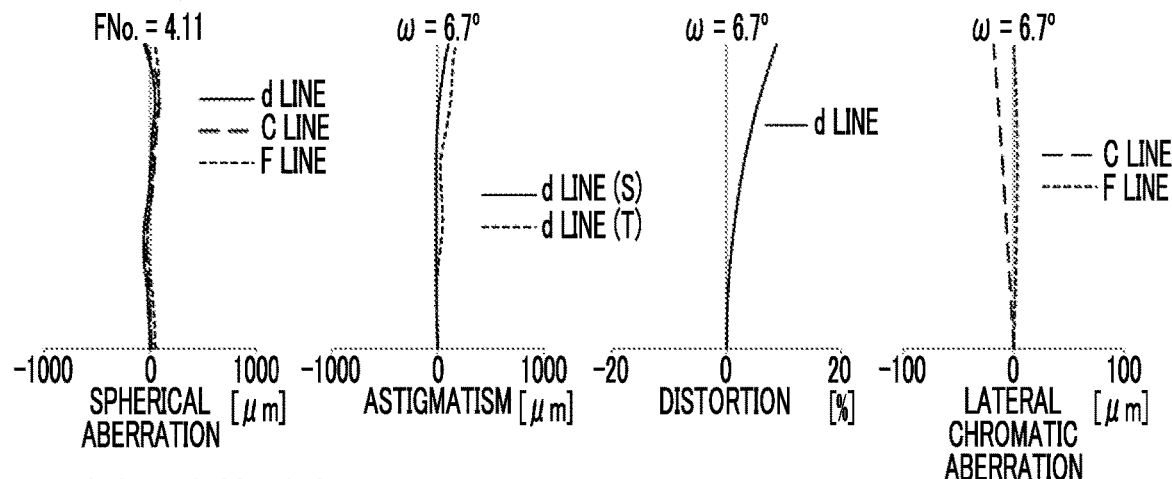
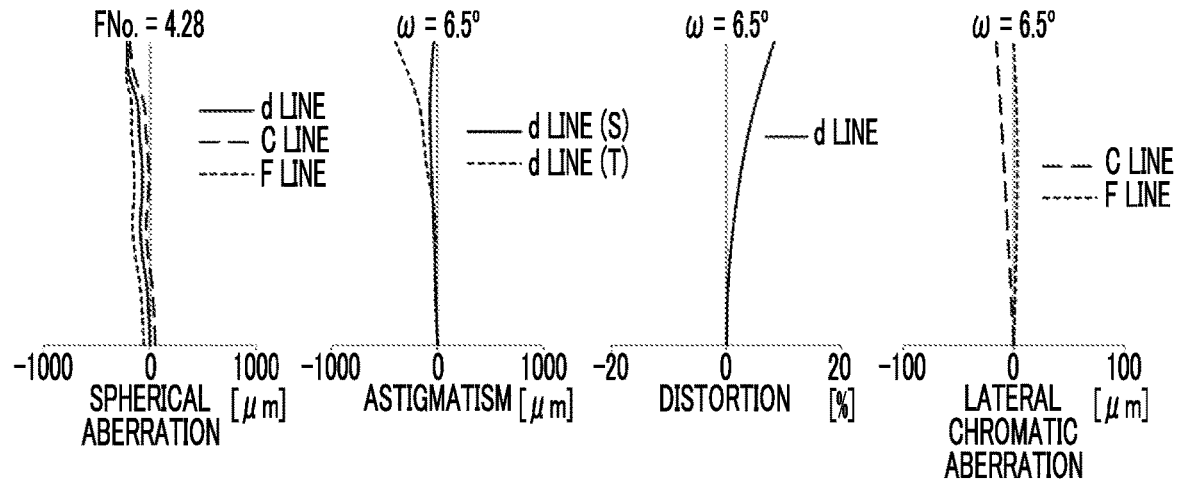

FIG.45 EXAMPLE 20

FIG.46
EXAMPLE 20
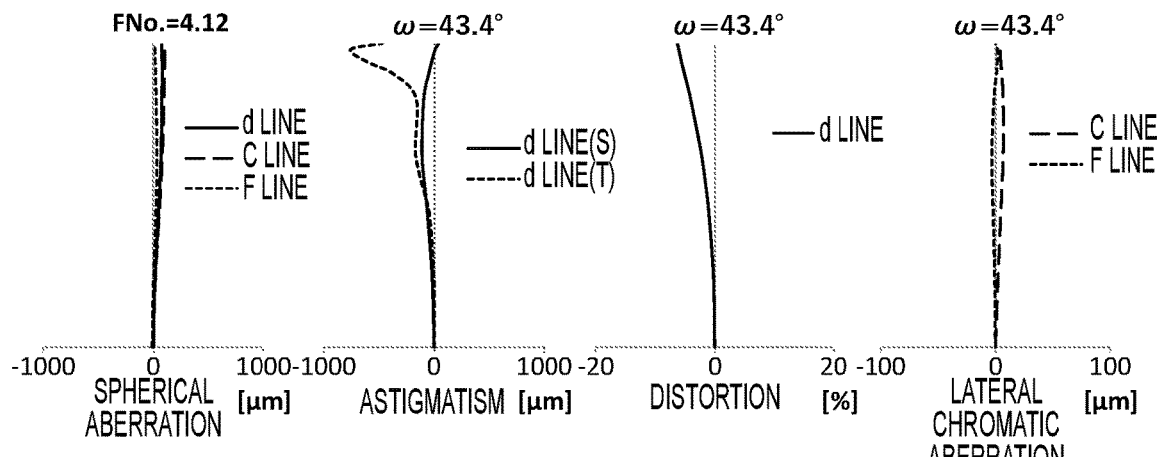
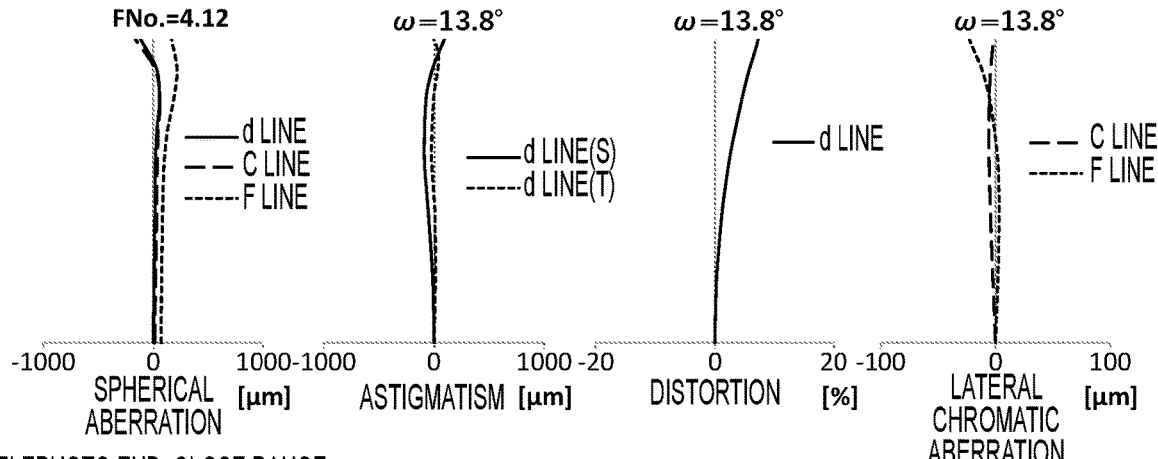
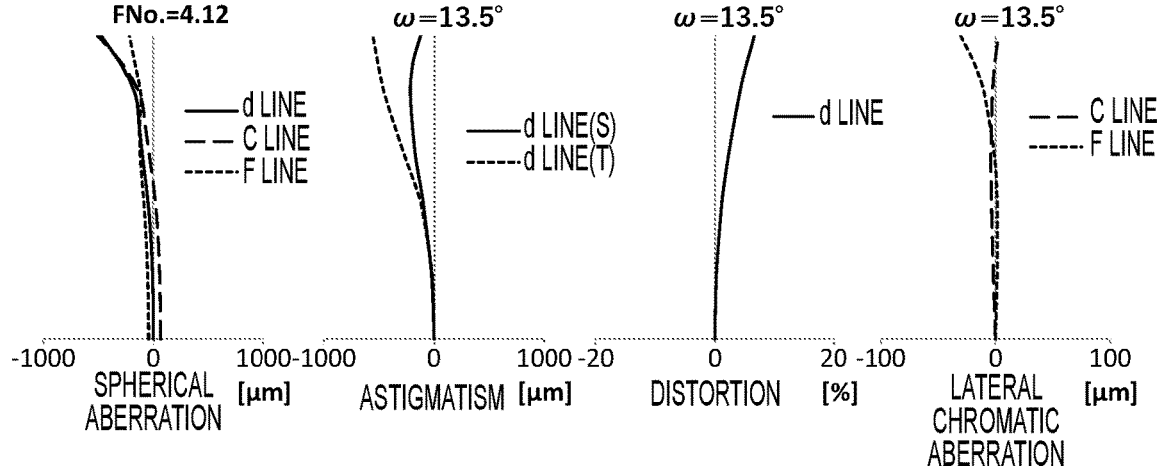

EXAMPLE 21

FIG.48
EXAMPLE 21
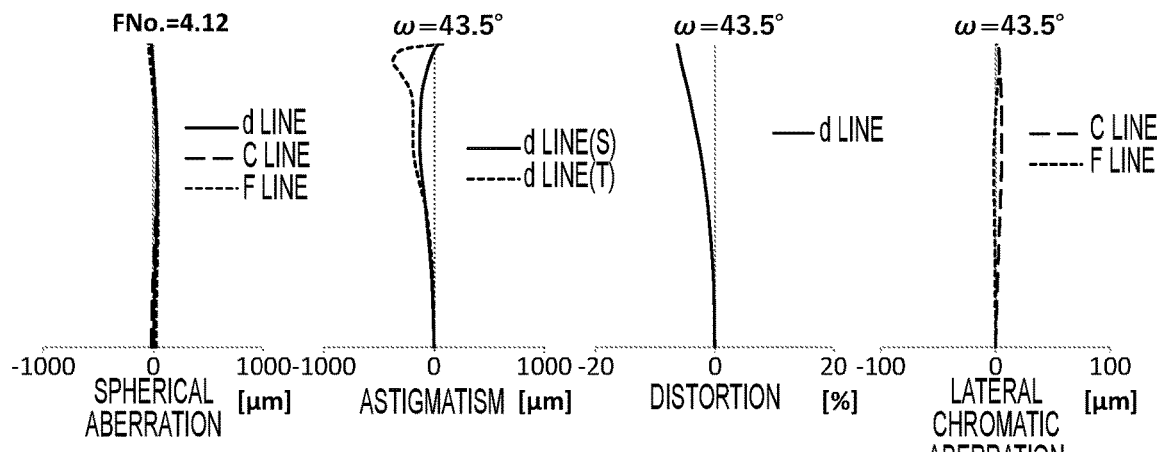
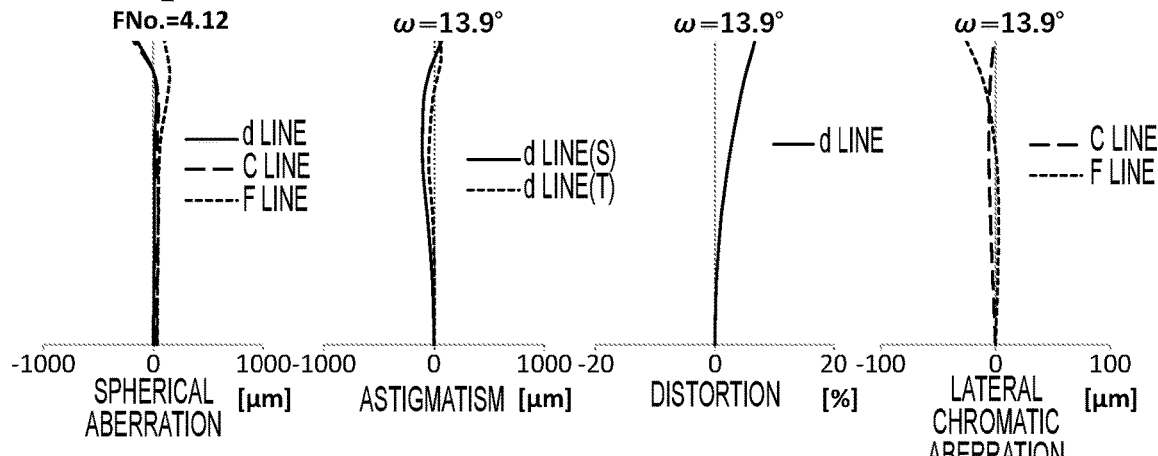
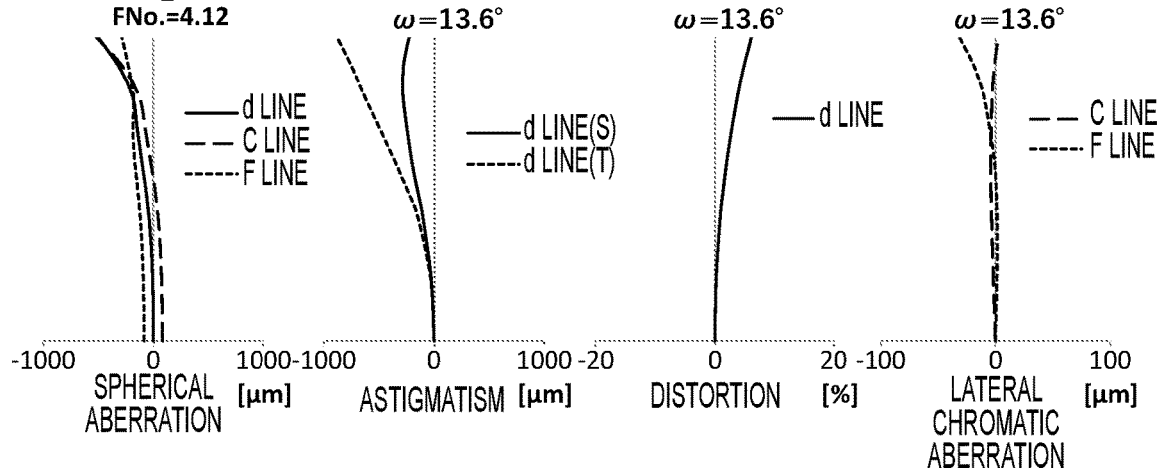

FIG.50
EXAMPLE 22
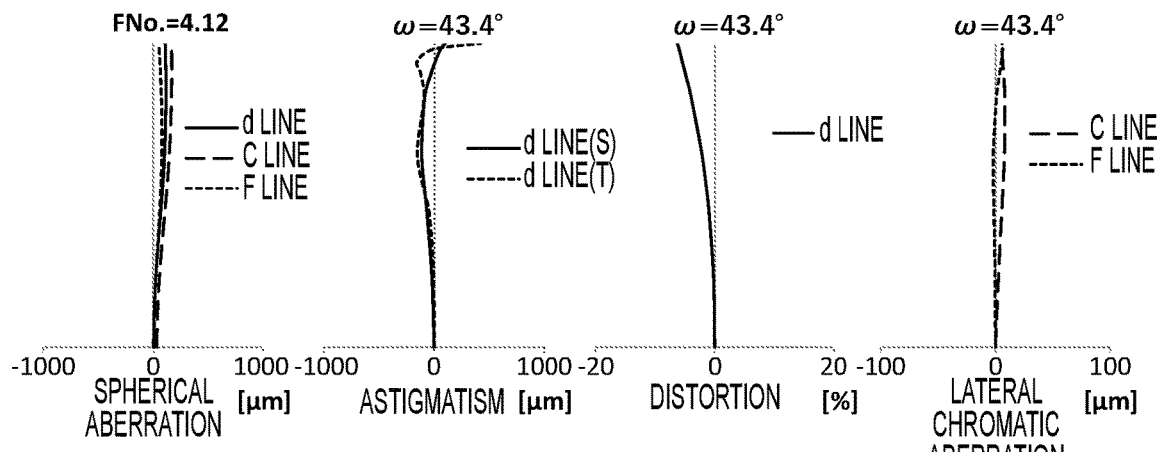
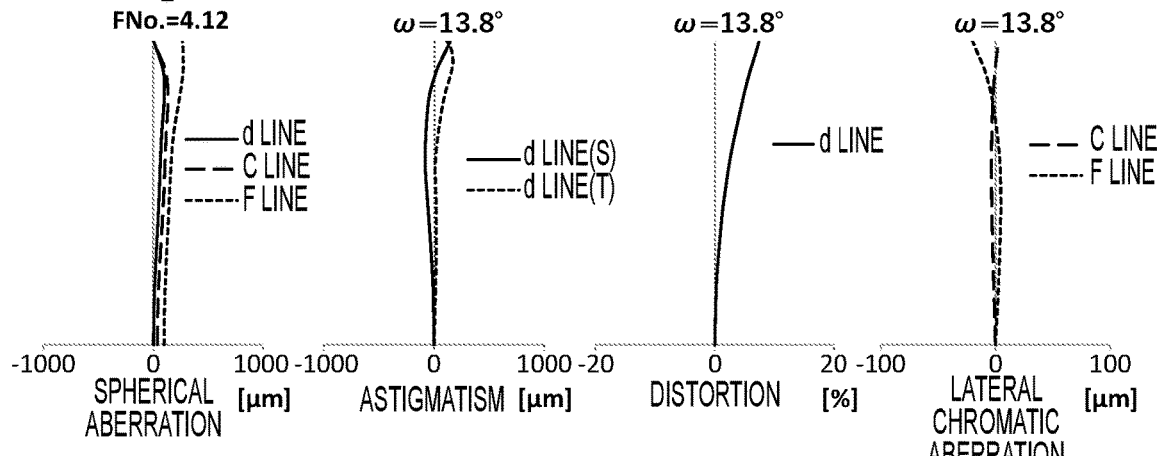
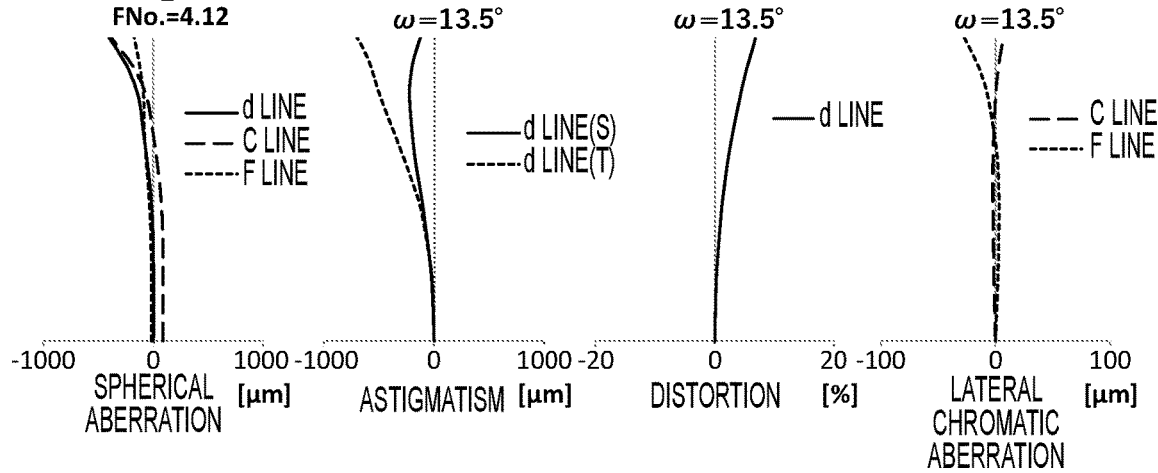

EXAMPLE 23

FIG.52
EXAMPLE 23
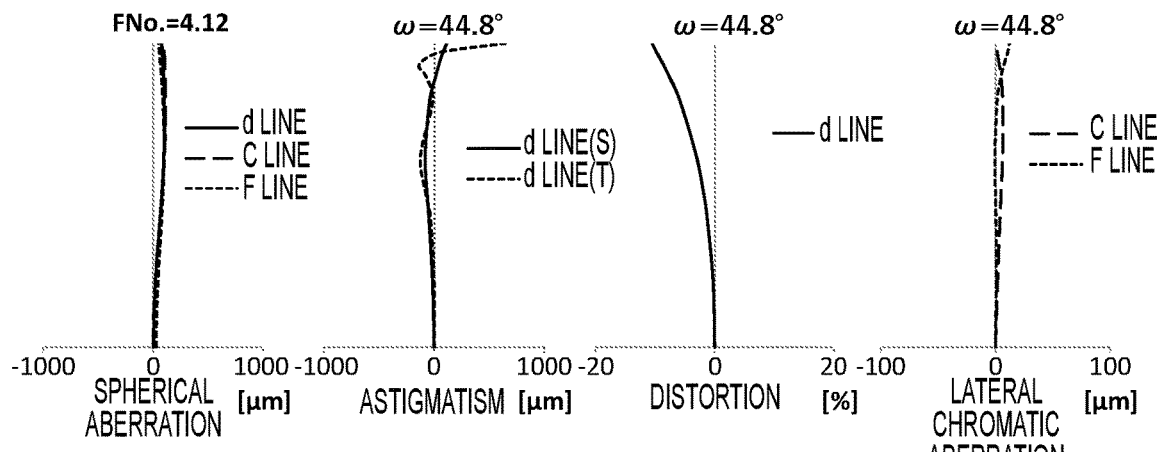
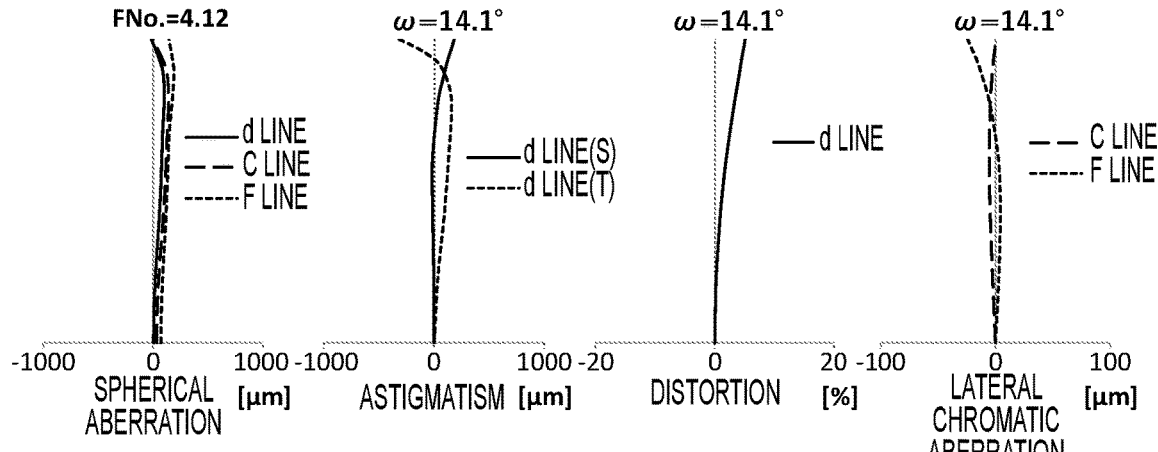
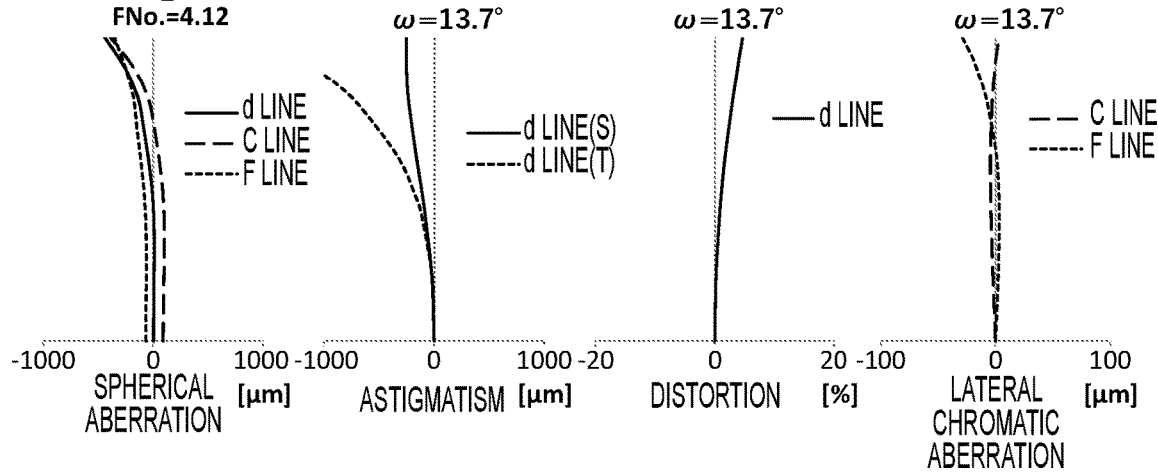

FIG.54
EXAMPLE 24
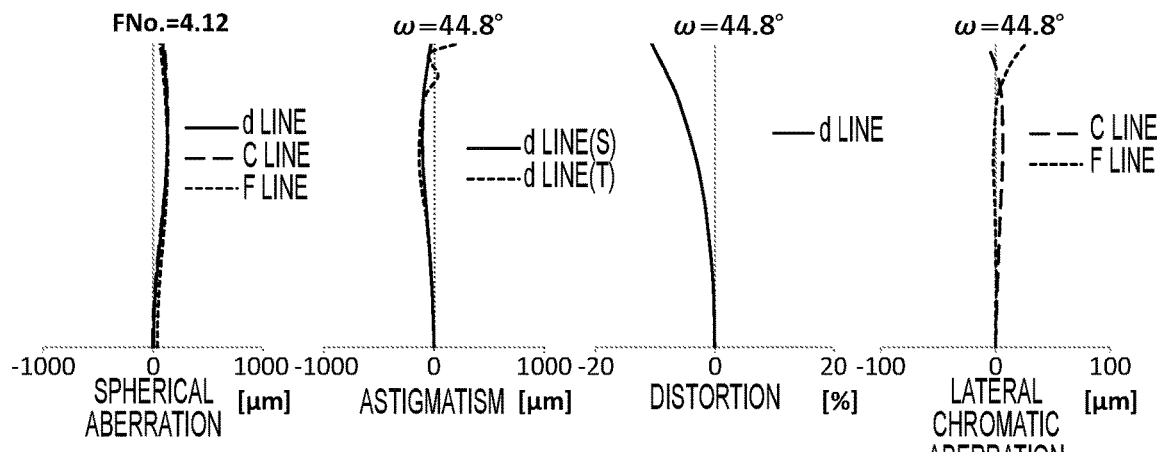
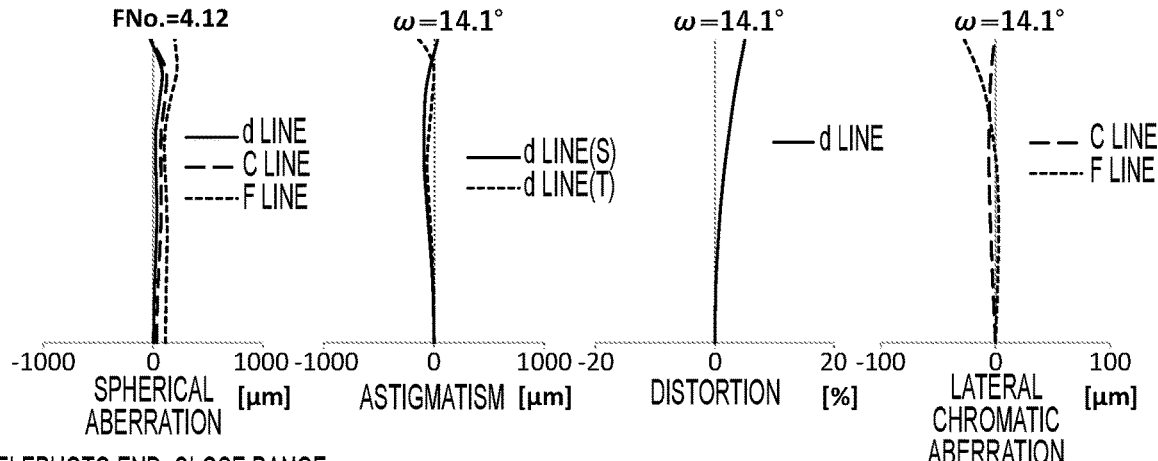
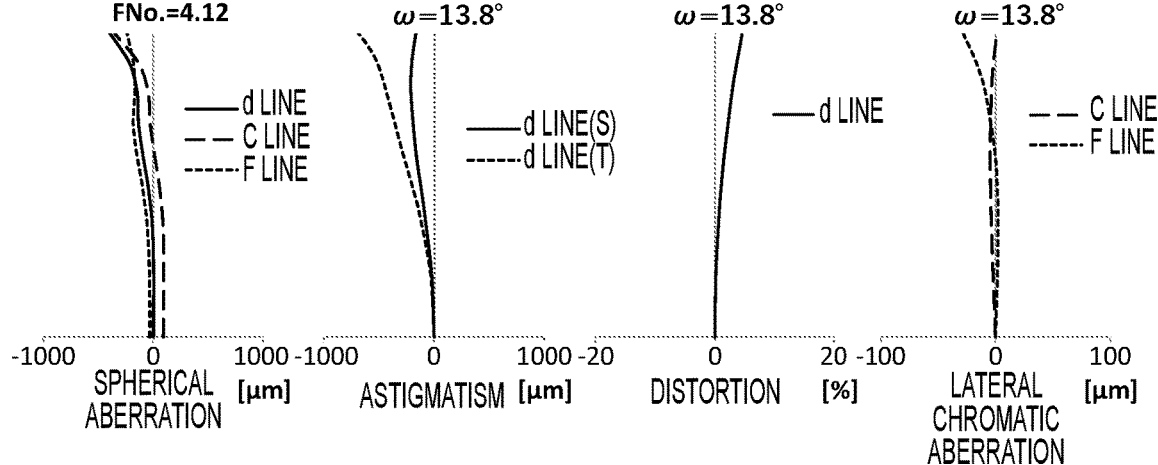

FIG.55 EXAMPLE 25

FIG.56
EXAMPLE 25
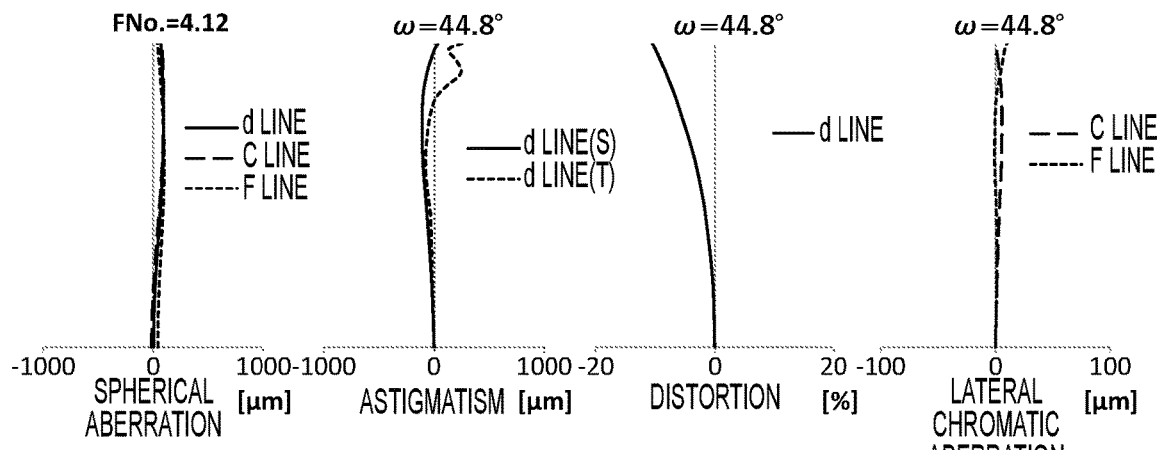
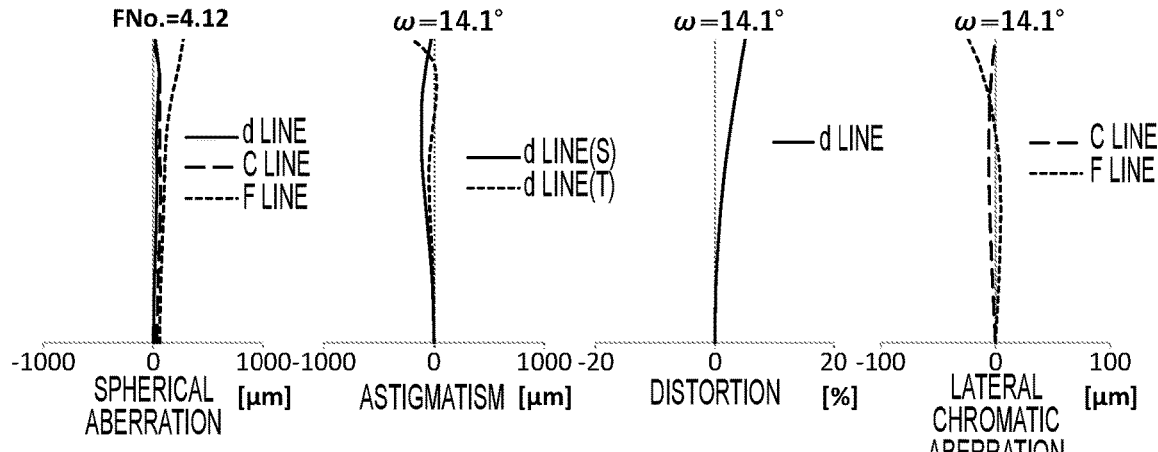
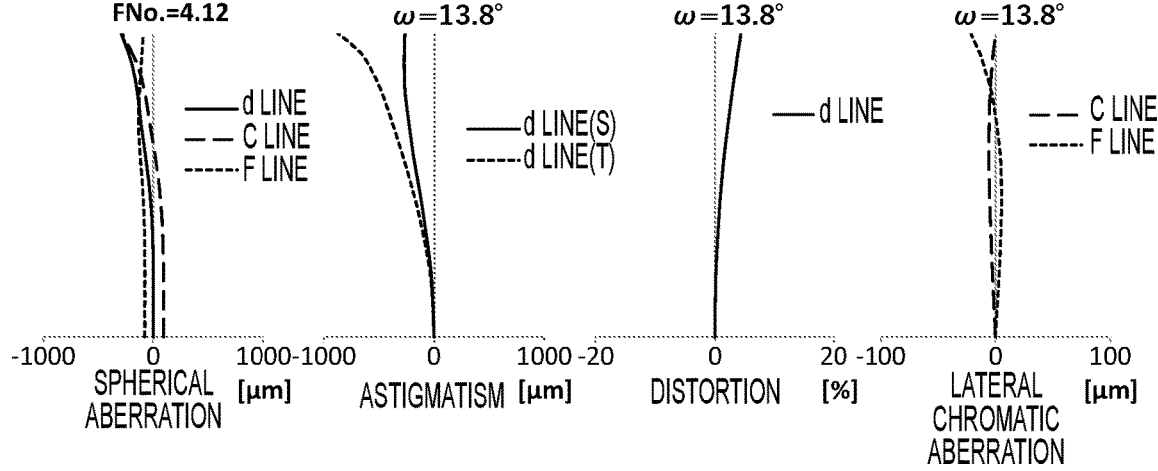

FIG.57 EXAMPLE 26

FIG.58
EXAMPLE 26
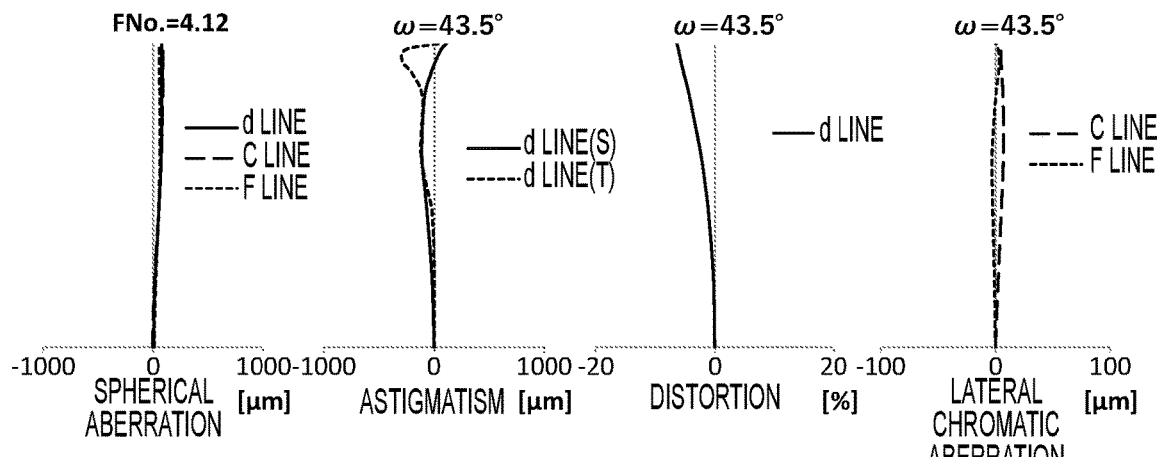
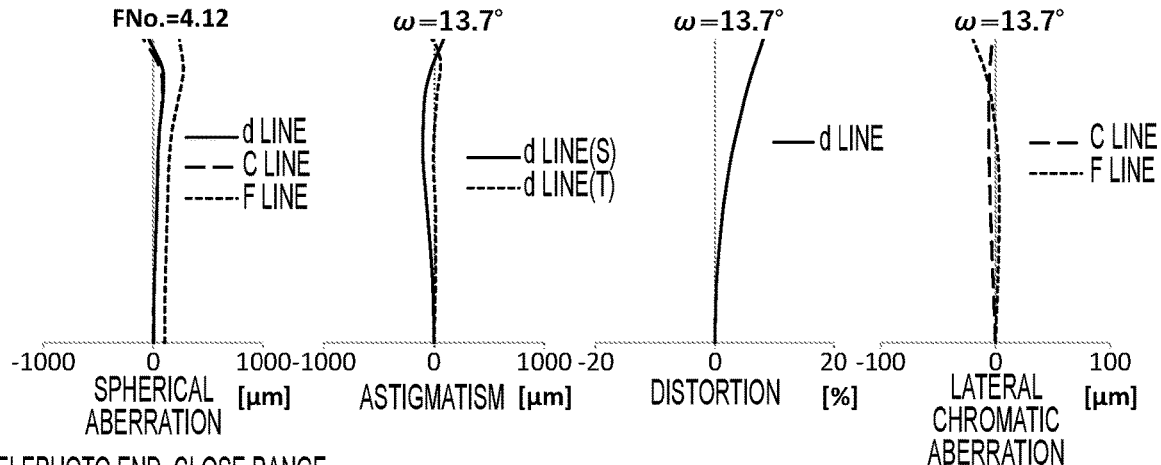
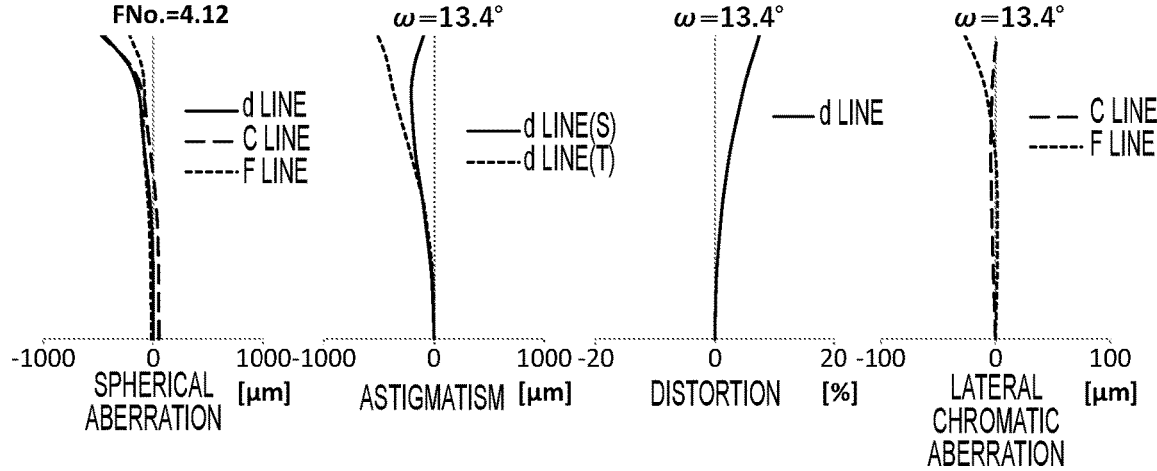

EXAMPLE 27

FIG.60
EXAMPLE 27
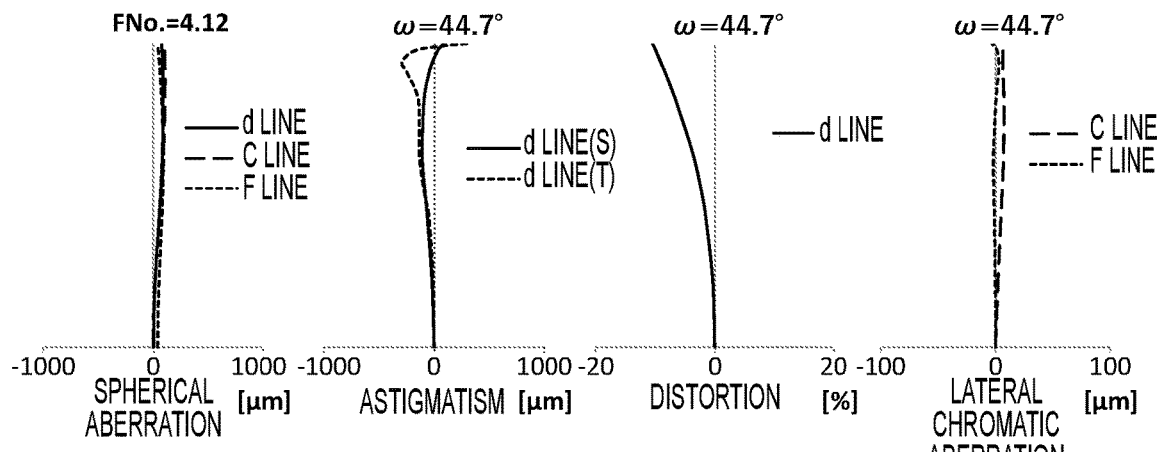
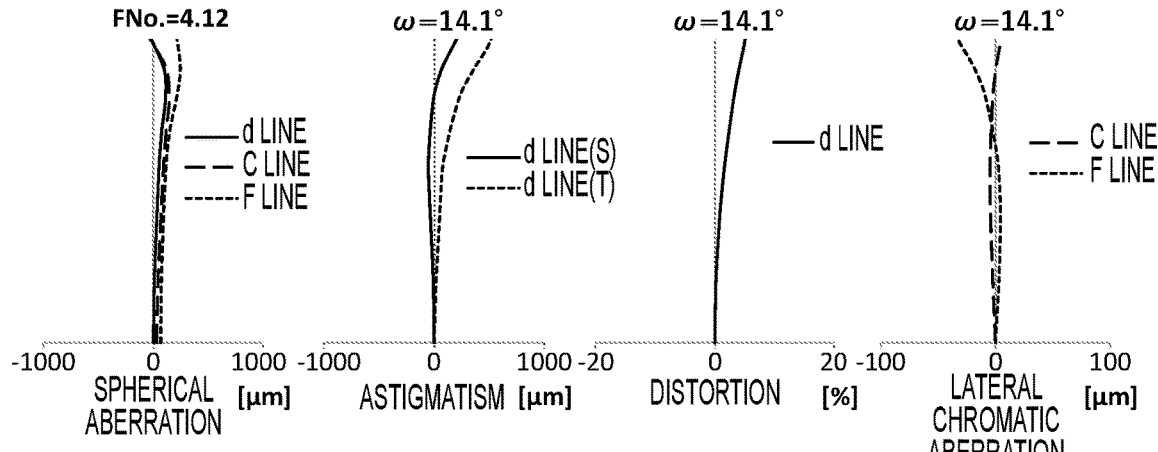
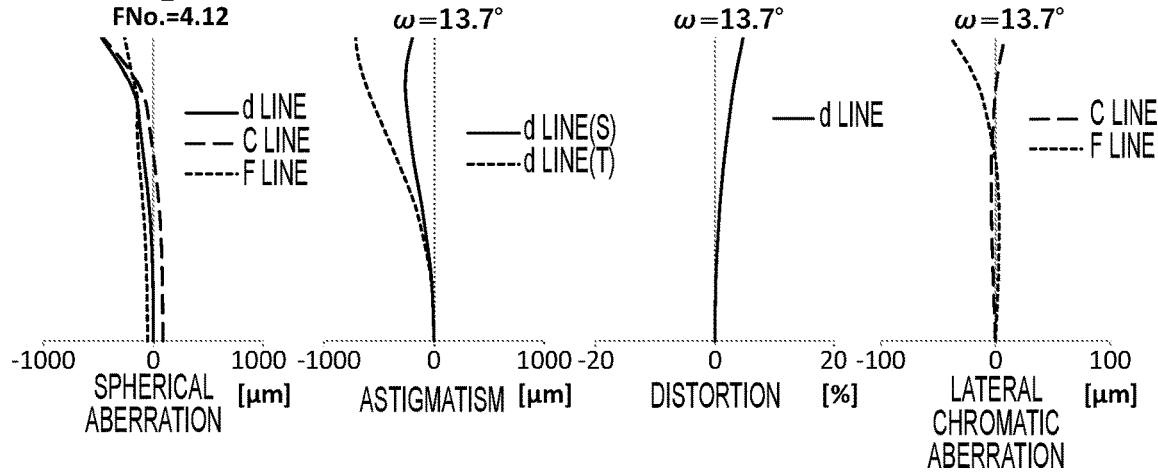

EXAMPLE 28

FIG.62
EXAMPLE 28
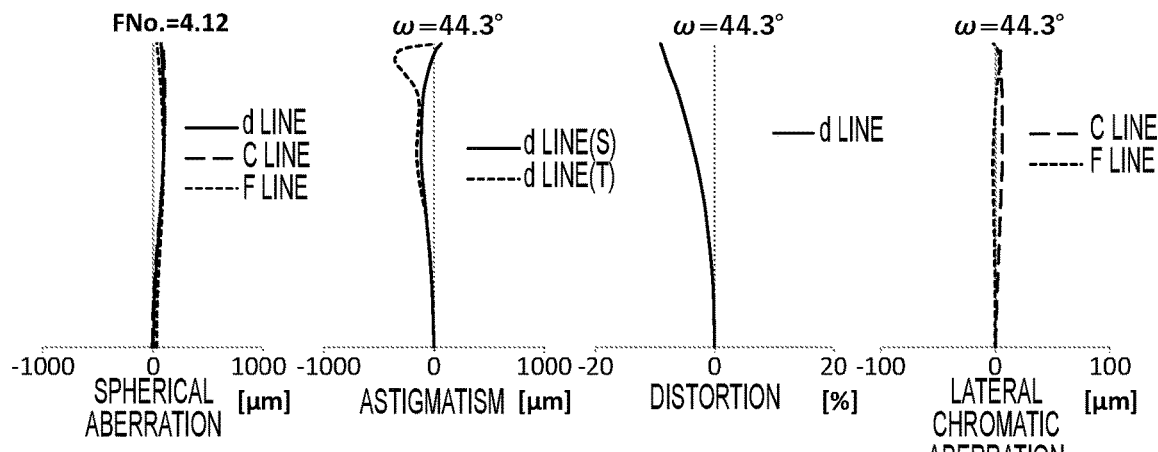
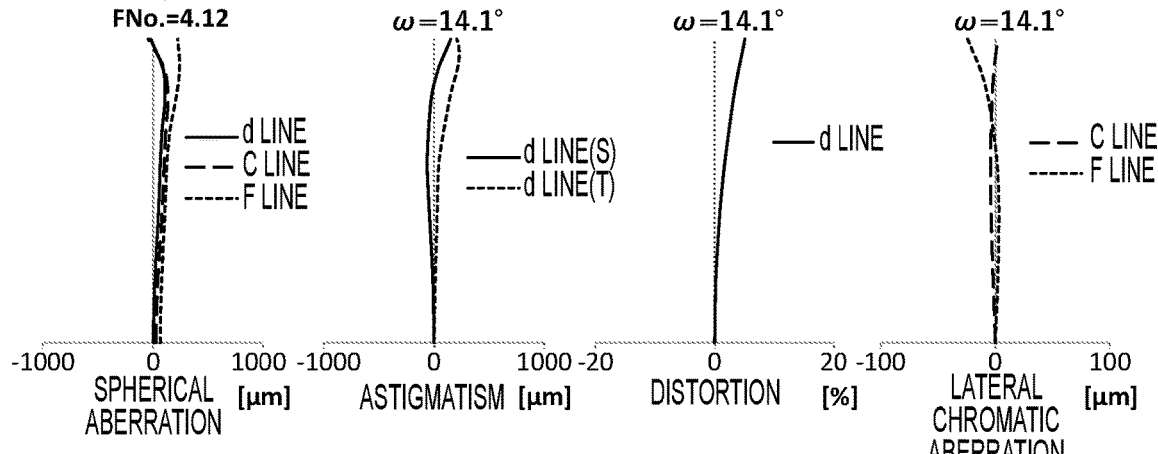
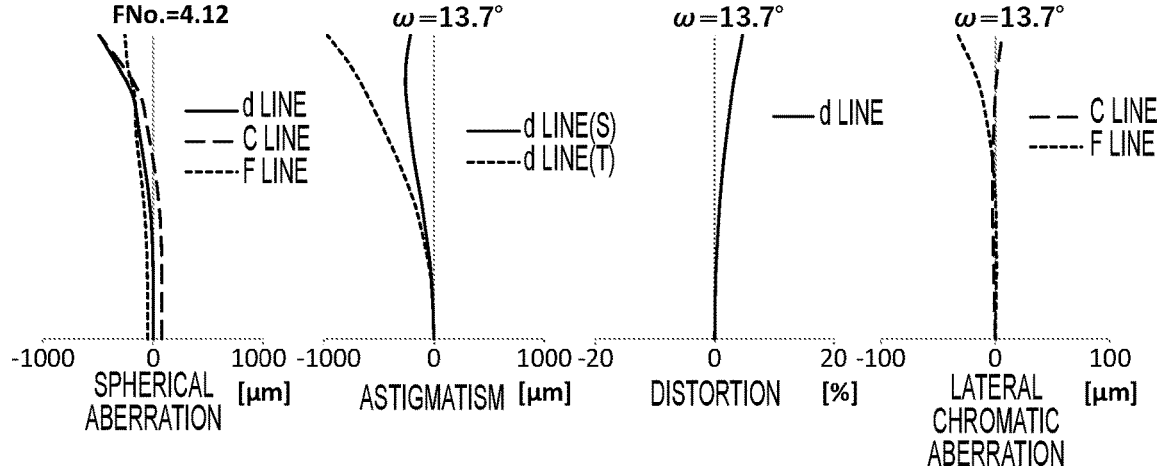

EXAMPLE 29

FIG.64
EXAMPLE 29
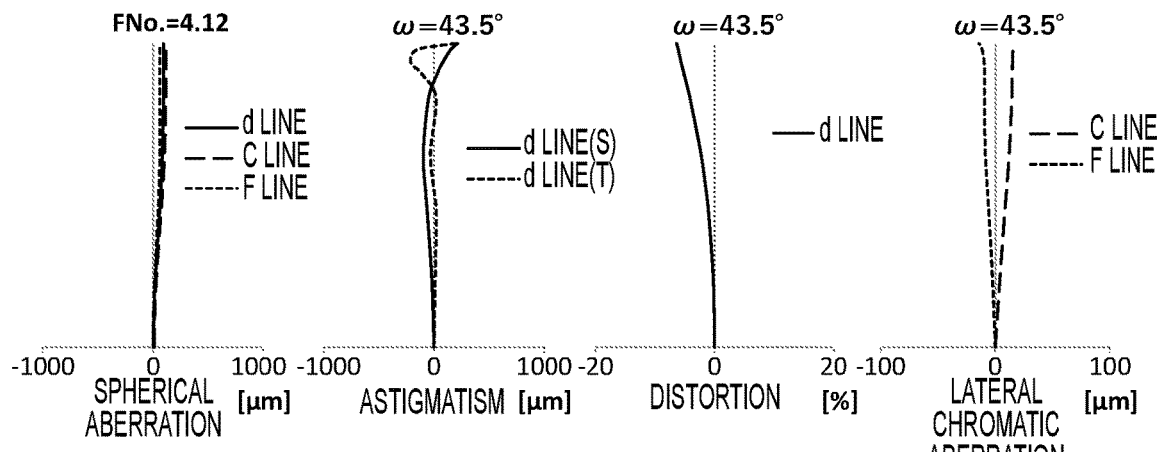
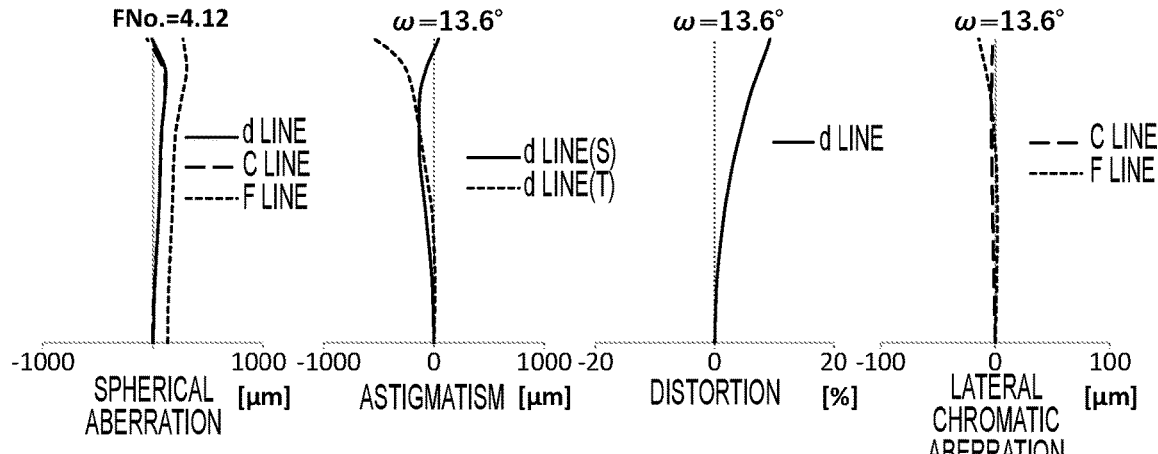
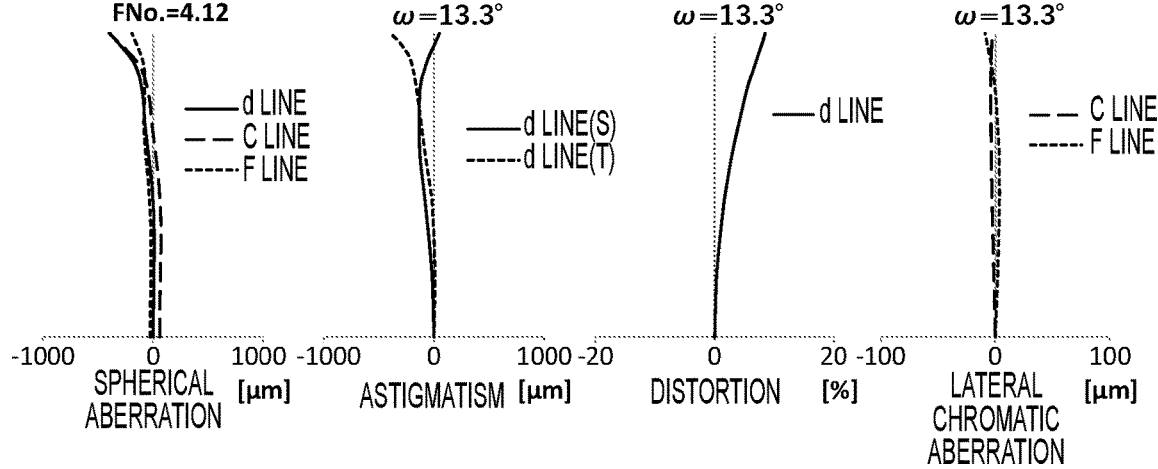

FIG.65 EXAMPLE 30

FIG.66
EXAMPLE 30
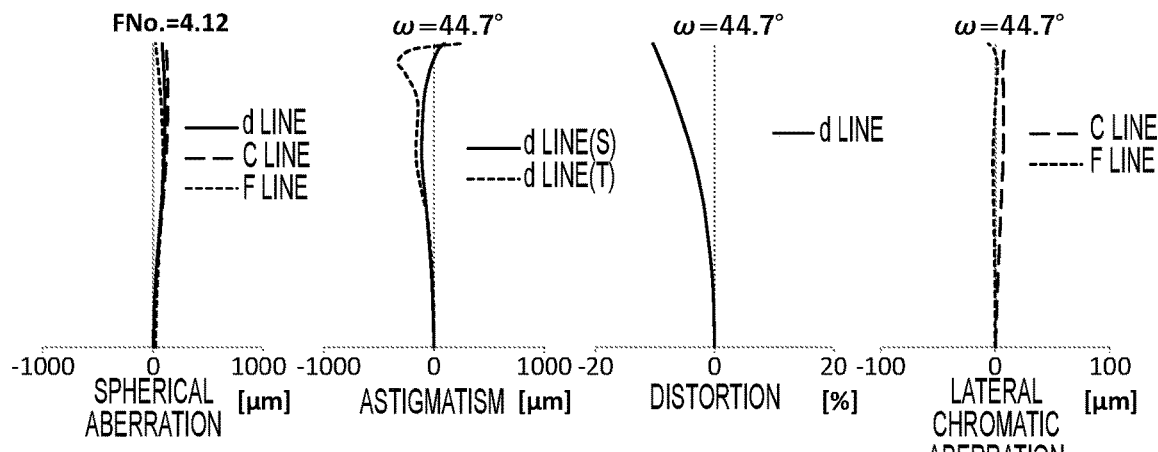
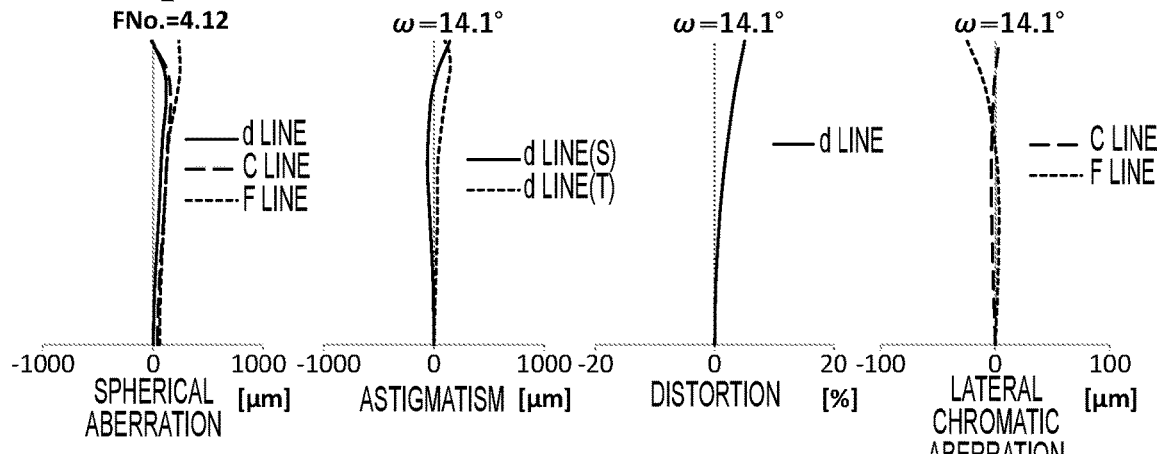
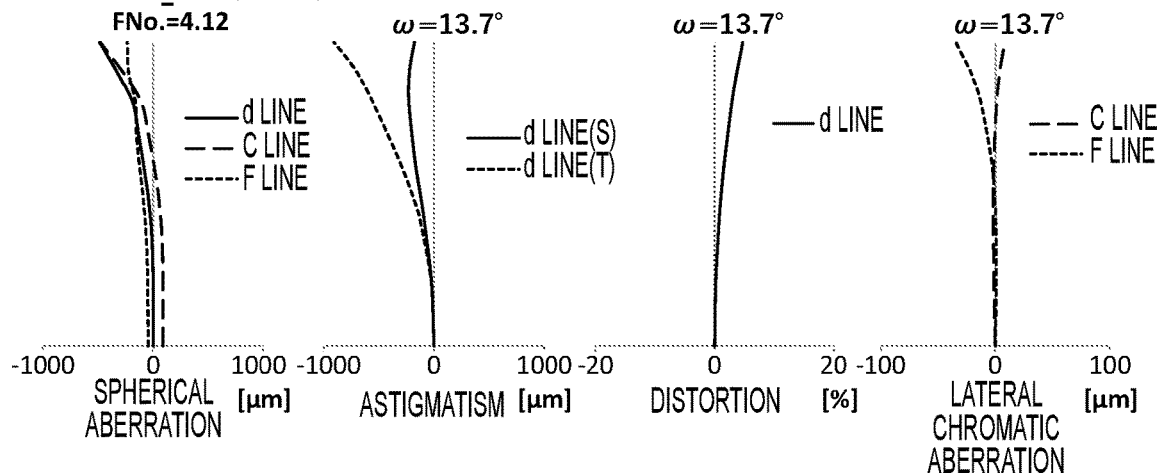

EXAMPLE 31

FIG.68
EXAMPLE 31
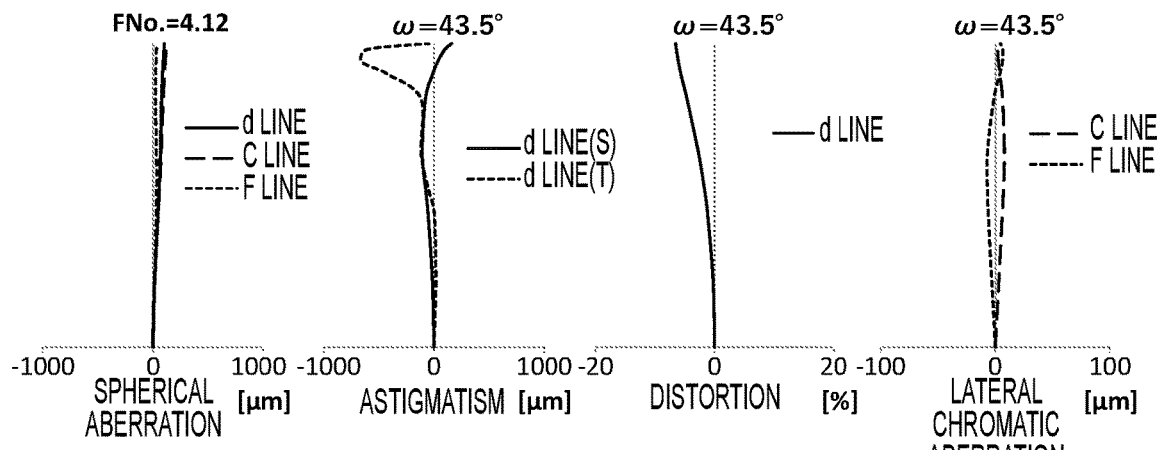
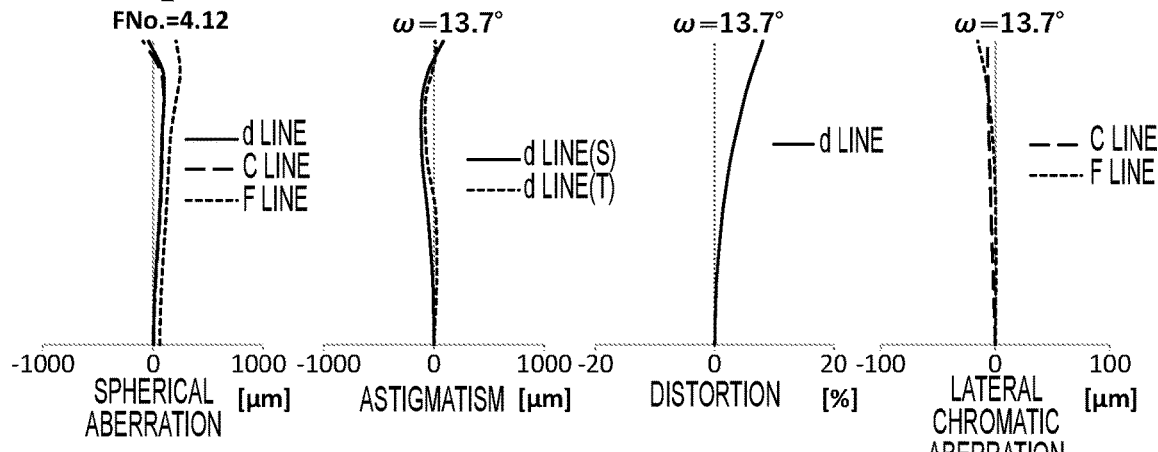
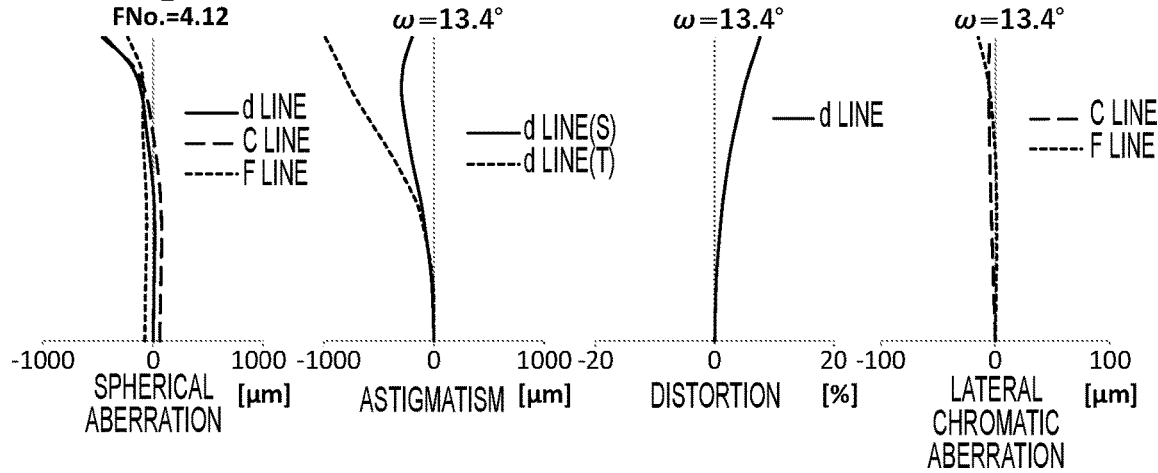

FIG.70
EXAMPLE 32
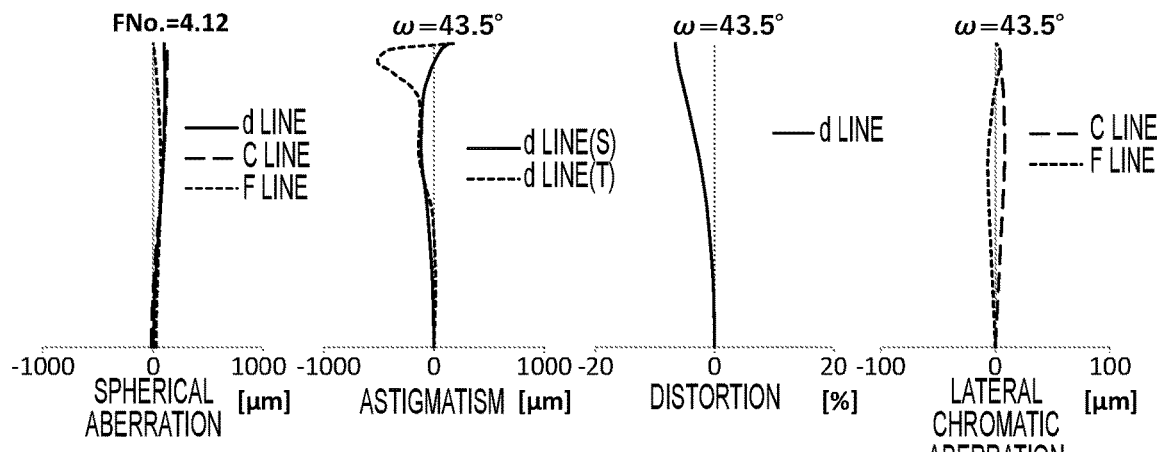
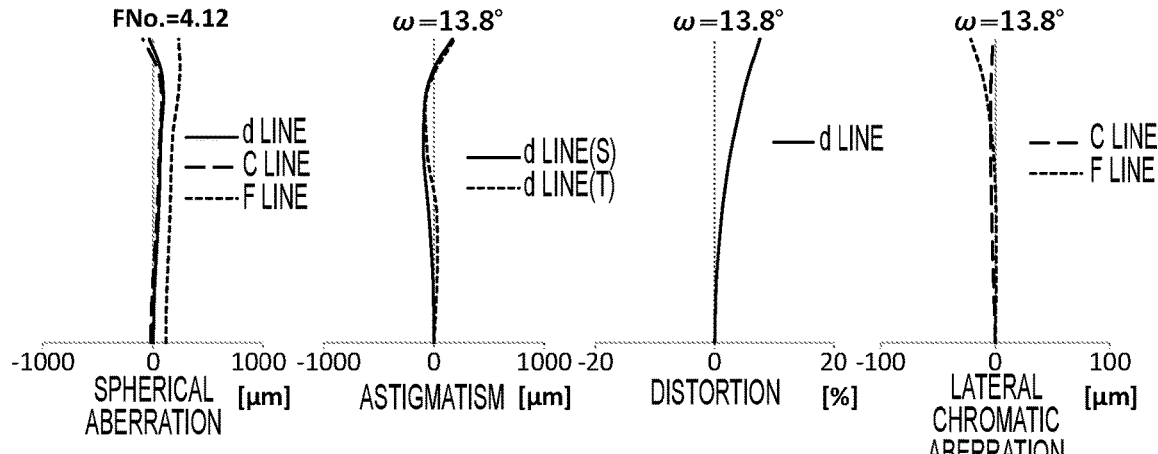
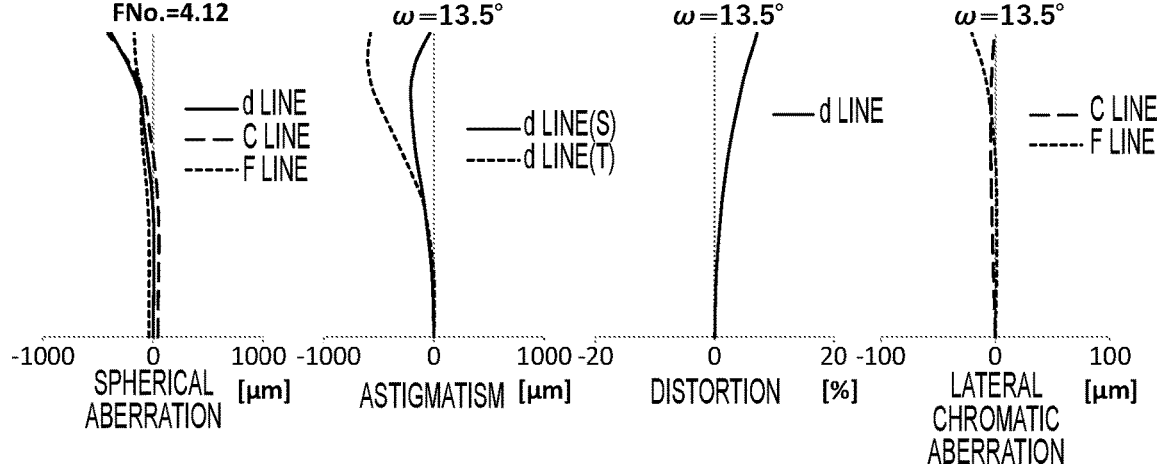

EXAMPLE 33

FIG.72
EXAMPLE 33
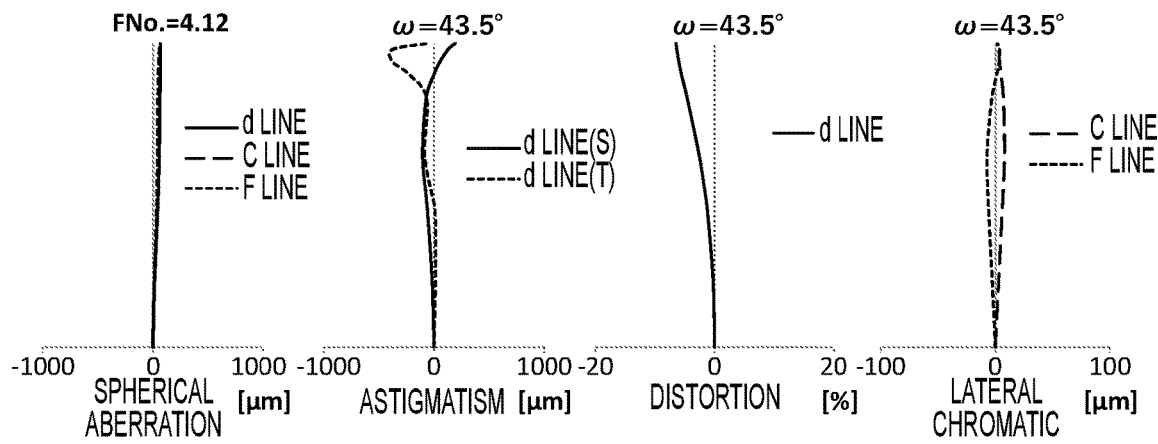
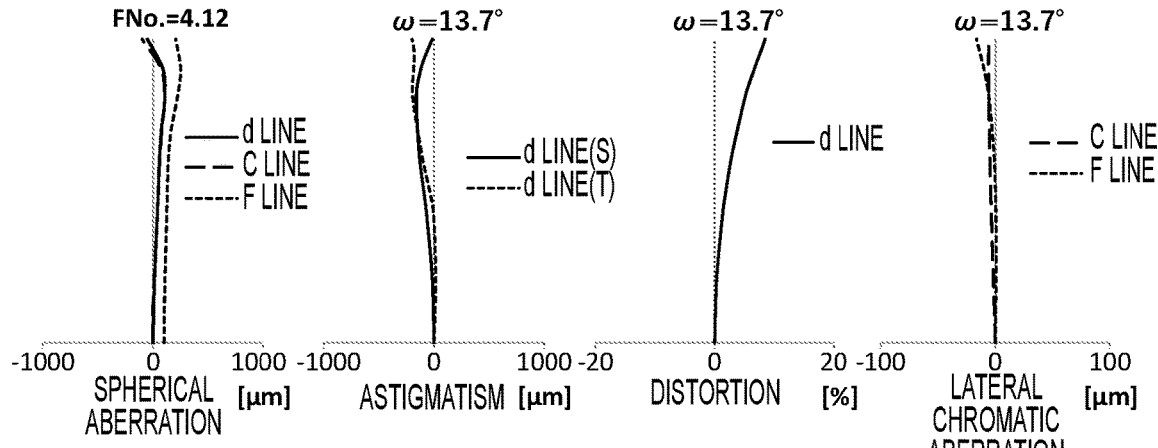
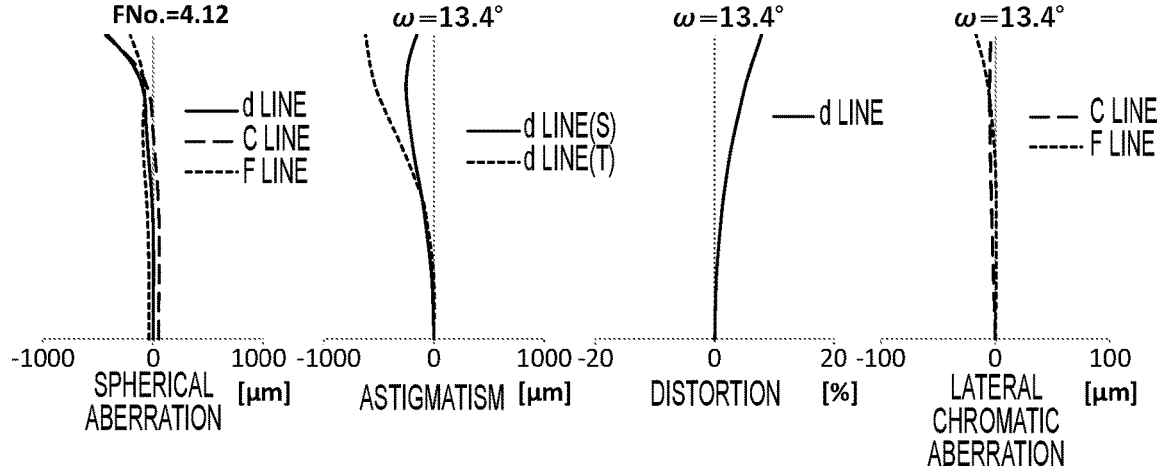

EXAMPLE 34

FIG.74
EXAMPLE 34
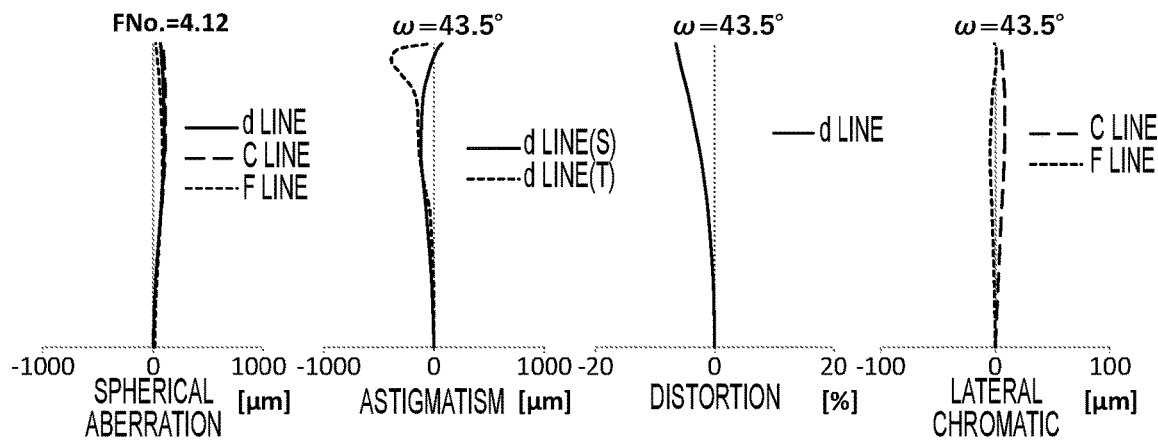
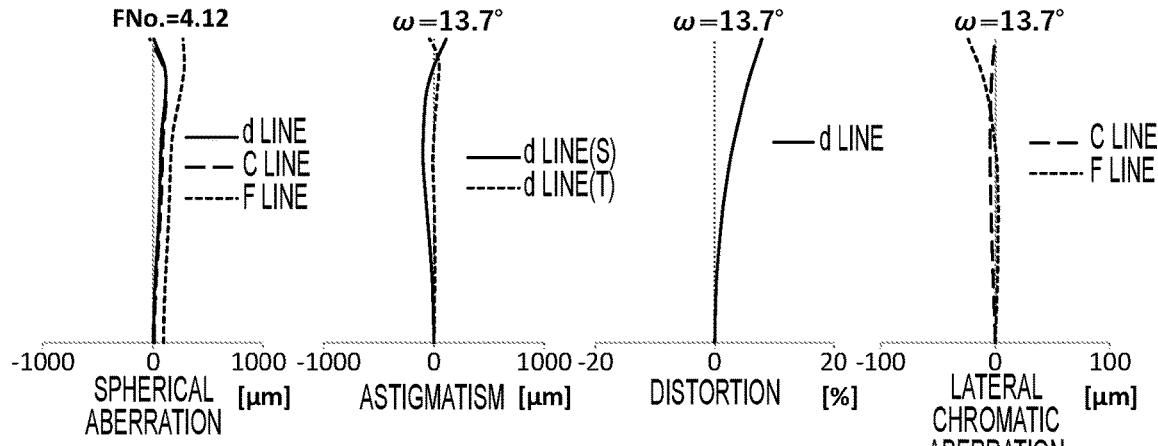
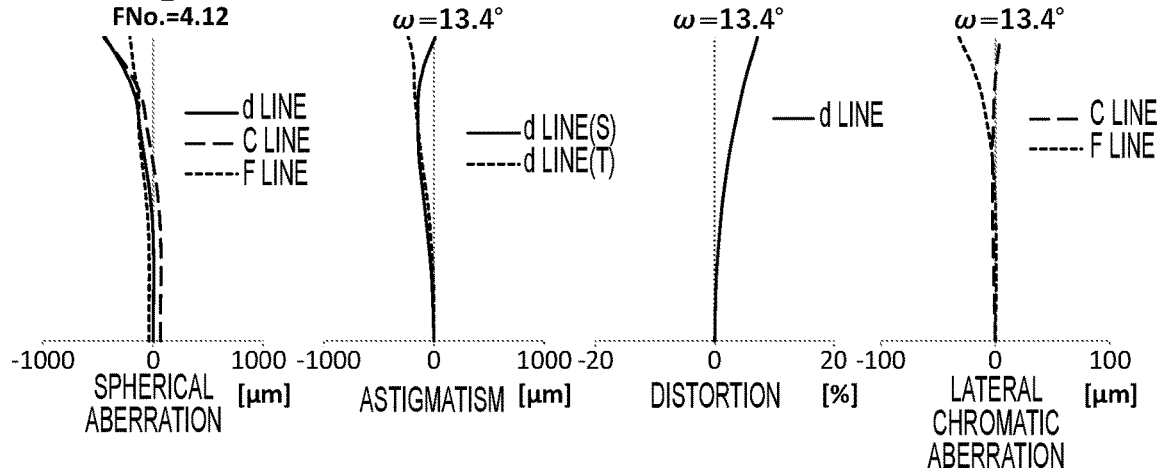

FIG.75 EXAMPLE 35

FIG.76
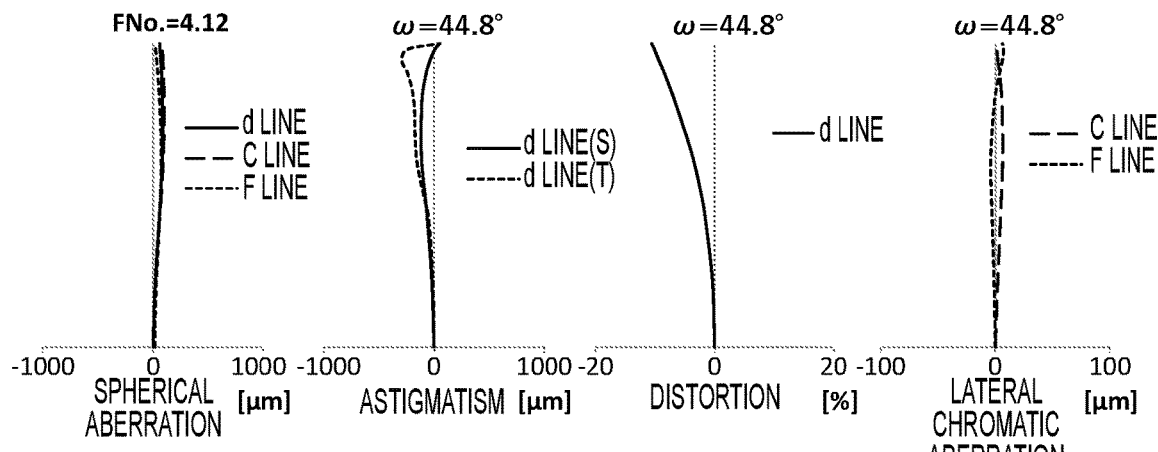
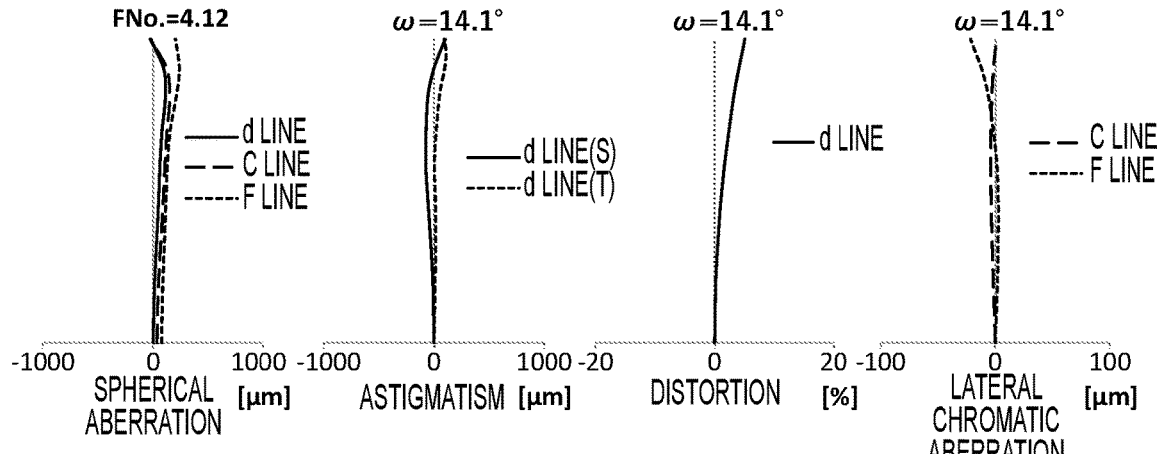
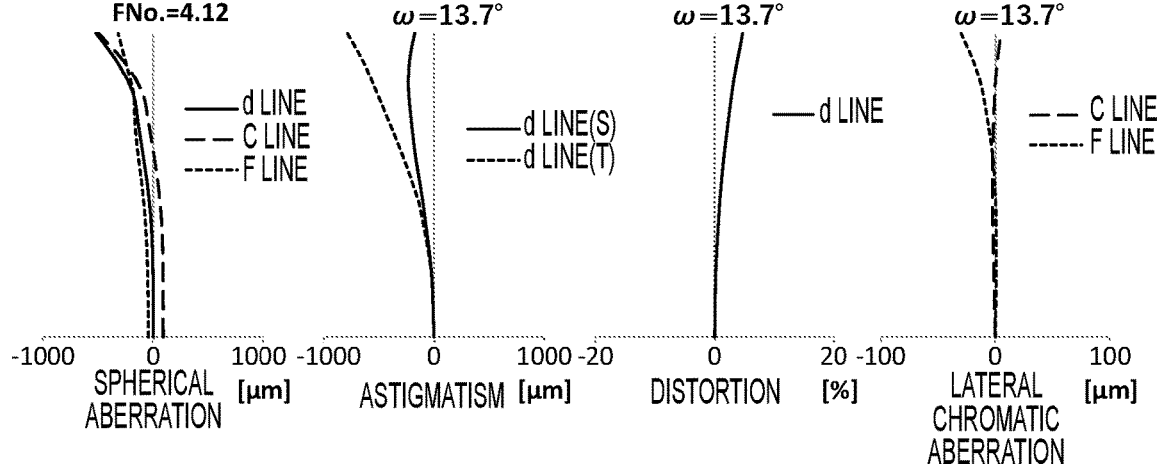

EXAMPLE 36

FIG.78
EXAMPLE 36
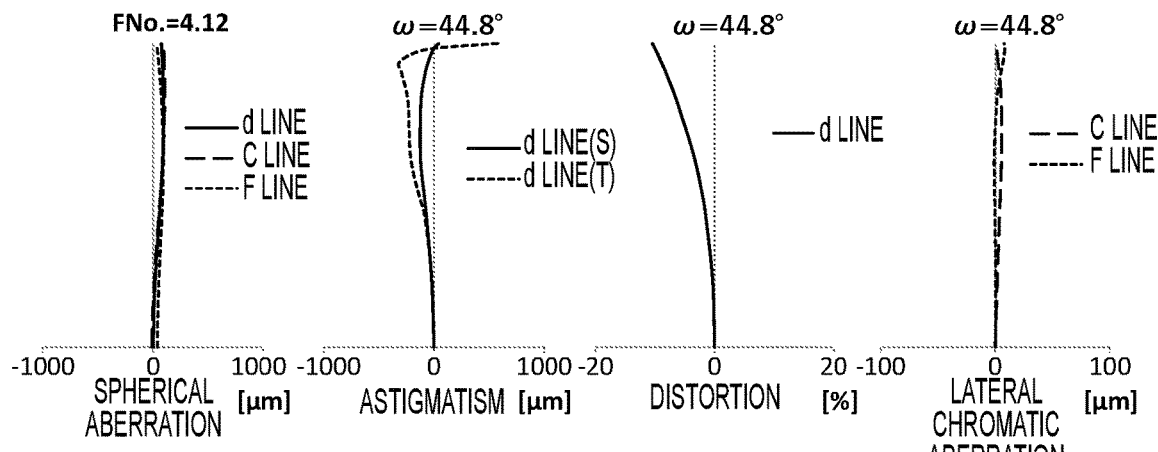
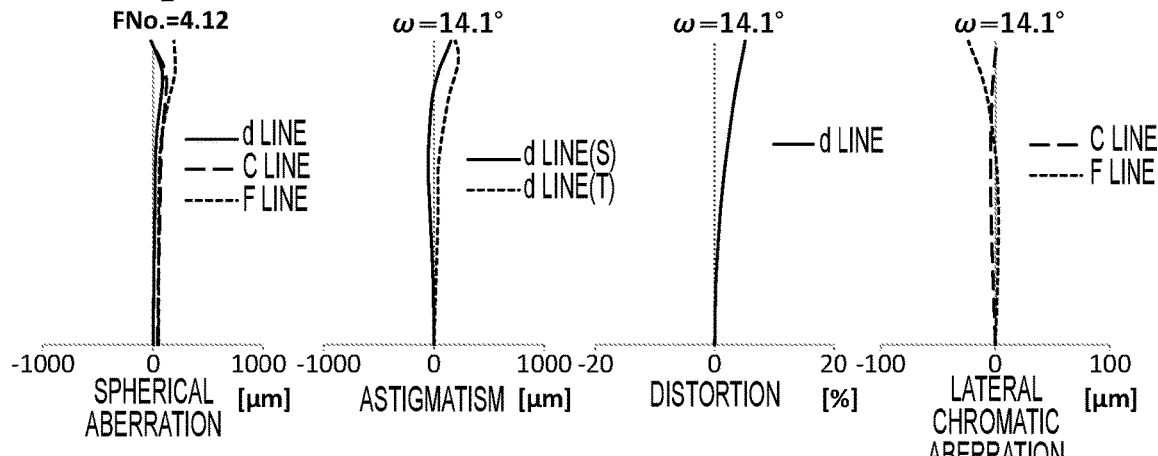
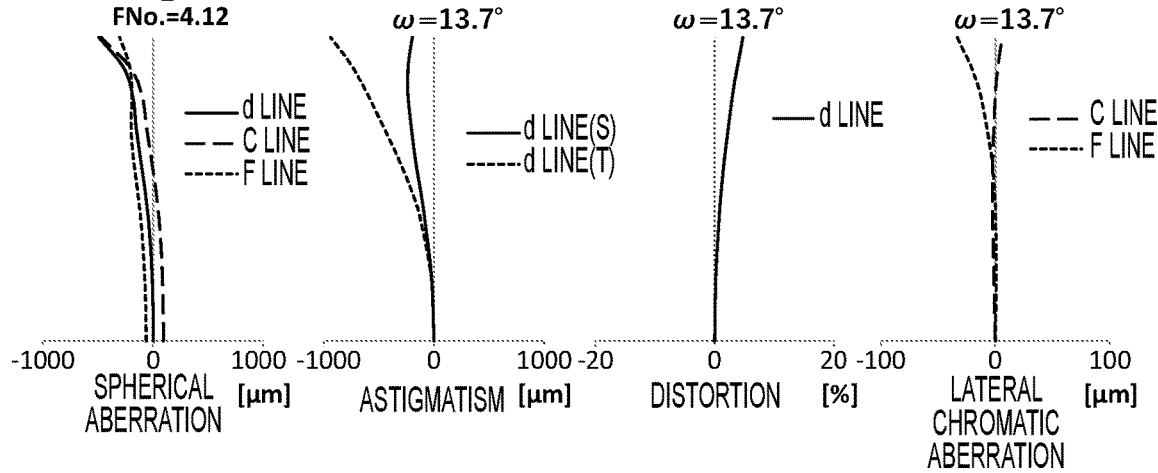

ZOOM LENS AND IMAGING APPARATUS

CROSS-REFERENCE TO RELATED APPLICATIONS

The present application claims priority under 35 U.S.C. § 119 to Japanese Patent Application No. 2021-139216, filed on Aug. 27, 2021 and Japanese Patent Application No. 2022-102075, filed on Jun. 24, 2022. Each application above is hereby expressly incorporated by reference, in its entirety, into the present application.

BACKGROUND

Technical Field

The technique of the present disclosure relates to a zoom lens and an imaging apparatus.

Related Art

In the related art, as a zoom lens that can be used in an imaging apparatus such as a digital camera, zoom lenses described in JP2018-109709A and WO2017/130478A are known.

There is a demand for a zoom lens that has a high magnification but is reduced in size and maintains favorable optical performance, and the required levels are increasing year by year.

SUMMARY

The present disclosure has been made in view of the above circumstances, and its object is to provide a zoom lens that has a high magnification, is reduced in size, and maintains favorable optical performance, and an imaging apparatus comprising the zoom lens.

According to an aspect of the present disclosure, there is provided a zoom lens consisting of, in order from an object side to an image side, a first lens group, a front group, a middle group, and a rear group. The first lens group has a positive refractive power, the front group consists of one or more lens groups that move during zooming and has a negative refractive power as a whole throughout an entire zoom range, the middle group includes only one lens group as a lens group, the rear group consists of a plurality of lens groups, an aperture stop is disposed between a lens surface closest to the image side in the front group and a lens surface closest to the object side in the rear group, during zooming, a spacing between the first lens group and the front group changes, a spacing between the front group and the middle group changes, a spacing between the middle group and the rear group changes, and all spacings between adjacent lens groups in the rear group change, in a case where the front group consists of a plurality of lens groups, all spacings between adjacent lens groups in the front group change during zooming, and the first lens group includes a first lens which is a negative lens and a second lens which is a positive lens, successively in order from a position closest to the object side to the image side. Assuming that a distance on an optical axis from a lens surface closest to the object side in the first lens group to the aperture stop in a state in which an infinite distance object is in focus at a wide angle end is DDG1STw, and a focal length of the first lens group is f1, Conditional Expression (1) is satisfied, which is represented by $$0.5 < DDG1STw/f1 < 1.5 \tag{1}.$$

It is preferable that the zoom lens of the above-mentioned aspect satisfies Conditional Expression (1-1), which is represented by $$0.55 < DDG1STw/f1 < 1.1 \tag{1-1}.$$

It is more preferable that the zoom lens satisfies Conditional Expression (1-2), which is represented by $$0.6 < DDG1STw/f1 < 0.99 \tag{1-2}.$$

It is yet more preferable that the zoom lens satisfies Conditional Expression (1-3), which is represented by $$0.7 < DDG1STw/f1 < 0.95 \tag{1-3}.$$

Assuming that a focal length of the middle group is fB, it is preferable that the zoom lens of the above-mentioned aspect satisfies Conditional Expression (2), which is represented by $$0.1 < f1/fB < 6 \tag{2}.$$

It is more preferable that the zoom lens satisfies Conditional Expression (2-1), which is represented by $$1.5 < f1/fB < 4.5 \tag{2-1}.$$

It is yet more preferable that the zoom lens satisfies Conditional Expression (2-2), which is represented by $$2.5 < f1/fB < 4.5 \tag{2-2}.$$

It is most preferable that the zoom lens satisfies Conditional Expression (2-3), which is represented by $$2.5 < f1/fB < 4 \tag{2-3}.$$

Assuming that a focal length of the front group in a state in which the infinite distance object is in focus at the wide angle end is fAw and a focal length of the middle group is fB, it is preferable that the zoom lens of the above-mentioned aspect satisfies Conditional Expression (3), which is represented by $$-1 < fAw/fB < -0.2 \tag{3}.$$

It is more preferable that the zoom lens satisfies Conditional Expression (3-1), which is represented by $$-0.7 < fAw/fB < -0.3 \tag{3-1}.$$

It is yet more preferable that the zoom lens satisfies Conditional Expression (3-2), which is represented by $$-0.67 < fAw/fB < -0.3 \tag{3-2}.$$

It is most preferable that the zoom lens satisfies Conditional Expression (3-3), which is represented by $$-0.67 < fAw/fB < -0.4 \tag{3-3}.$$

Assuming that a distance on the optical axis from the lens surface closest to the object side in the first lens group to a paraxial entrance pupil position in a state in which the infinite distance object is in focus at the wide angle end is enp, a maximum image height in a state in which the infinite distance object is in focus at the wide angle end is IHw, a focal length of the zoom lens in a state in which the infinite distance object is in focus at the wide angle end is fw, and a focal length of the zoom lens in a state in which the infinite distance object is in focus at a telephoto end is ft, it is preferable that the zoom lens of the above-mentioned aspect satisfies Conditional Expression (4), which is represented by $$1 < enp / \{IHw \times \log(ft/fw)\} < 3 \tag{4}.$$

Assuming that a focal length of the zoom lens in a state in which the infinite distance object is in focus at a telephoto end is ft, and an F number in a state in which the infinite distance object is in focus at the telephoto end is FNot, it is preferable that the zoom lens of the above-mentioned aspect satisfies Conditional Expression (5), which is represented by $$1.4 < f1/(ft/FNot) < 4.4 \quad (5).$$

Assuming that a maximum image height in a state in which the infinite distance object is in focus at the wide angle end is IHw, a focal length of the zoom lens in a state in which the infinite distance object is in focus at the wide angle end is fw, and a focal length of the zoom lens in a state in which the infinite distance object is in focus at a telephoto end is ft, it is preferable that the zoom lens of the above-mentioned aspect satisfies Conditional Expression (6), which is represented by $$3 < DDG1STw/\{IHw \times \log(ft/fw)\} < 10 \quad (6).$$

Assuming that a focal length of the front group in a state in which the infinite distance object is in focus at the wide angle end is fAw, it is preferable that the zoom lens of the above-mentioned aspect satisfies Conditional Expression (7), which is represented by $$-9 < f1/fAw < -4 \quad (7).$$

Assuming that an effective diameter of a lens surface closest to the image side in the rear group is EDz, and an effective diameter of a lens surface closest to the image side in a lens group which is second from the image side of the rear group is EDyr, it is preferable that the zoom lens of the above-mentioned aspect satisfies Conditional Expression (8), which is represented by $$0.3 < EDyr/EDz < 0.9 \quad (8).$$

Assuming that a focal length of a lens closest to the image side in the rear group is fz, and a focal length of a lens group closest to the image side in the rear group is fGz, it is preferable that the zoom lens of the above-mentioned aspect satisfies Conditional Expression (9), which is represented by $$0.1 < fz/fGz < 3 \quad (9).$$

Assuming that a focal length of a lens group closest to the image side in the rear group is fGz, it is preferable that the zoom lens of the above-mentioned aspect satisfies Conditional Expression (10), which is represented by $$0.1 < f1/fGz < 3 \quad (10).$$

Assuming that a lateral magnification of the middle group in a state in which the infinite distance object is in focus at the wide angle end is βBw, a lateral magnification of the middle group in a state in which the infinite distance object is in focus at the telephoto end is βBt, a focal length of the zoom lens in a state in which the infinite distance object is in focus at the wide angle end is fw, and a focal length of the zoom lens in a state in which the infinite distance object is in focus at the telephoto end is ft, it is preferable that the zoom lens of the above-mentioned aspect satisfies Conditional Expression (11), which is represented by $$0.2 < (\beta Bt/\beta Bw)/(ft/fw) < 1.55 \quad (11).$$

Assuming that a lateral magnification of a lens group closest to the image side in the rear group in a state in which the infinite distance object is in focus at the wide angle end is βGzw, it is preferable that the zoom lens of the above-mentioned aspect satisfies Conditional Expression (12), which is represented by $$0.2 < \beta Gzw < 0.9 \quad (12).$$

Assuming that a curvature radius of a lens surface closest to the object side in a lens group closest to the image side in the rear group is Rzf, and a curvature radius of a lens surface closest to the image side in a lens group which is second from the image side of the rear group is Ryr, it is preferable that the zoom lens of the above-mentioned aspect satisfies Conditional Expression (13), which is represented by $$0.5 < (Rzf+Ryr)/(Rzf-Ryr) < 2 \quad (13).$$

Assuming that a refractive index of the first lens of the first lens group at a d line is NL1, and an Abbe number of the first lens of the first lens group based on the d line is νL1, it is preferable that the zoom lens of the above-mentioned aspect satisfies Conditional Expressions (14), (15), and (16), which are represented by $$1.7 < NL1 < 2.02 \quad (14),$$

$$15 < \nu L1 < 45 \quad (15), \text{ and}$$

$$2 < NL1 + 0.01 \times \nu L1 < 3 \quad (16).$$

It is preferable that a positive lens is disposed closest to the image side in the first lens group. Assuming that a refractive index of the positive lens closest to the image side in the first lens group at a d line is N1z, and an Abbe number of the positive lens closest to the image side in the first lens group based on the d line is ν1z, it is preferable that the zoom lens of the above-mentioned aspect satisfies Conditional Expressions (17), (18), and (19), which are represented by $$1.65 < N1z < 2 \quad (17),$$

$$40 < \nu 1z < 60 \quad (18), \text{ and}$$

$$2 < N1z + 0.01 \times \nu 1z < 3 \quad (19).$$

It is preferable that a positive lens is disposed closest to the image side in the first lens group. Assuming that an Abbe number of the positive lens closest to the image side in the first lens group based on a d line is ν1z, and an Abbe number of the first lens of the first lens group based on the d line is νL1, it is preferable that the zoom lens of the above-mentioned aspect satisfies Conditional Expression (20), which is represented by $$7 < \nu 1z - \nu L1 < 40 \quad (20).$$

It is preferable that a positive lens is disposed closest to the image side in the first lens group. Assuming that a refractive index of the positive lens closest to the image side in the first lens group at a d line is N1z, and a refractive index of the first lens of the first lens group at the d line is NL1, it is preferable that the zoom lens of the above-mentioned aspect satisfies Conditional Expression (21), which is represented by $$0.02 < NL1 - N1z < 0.4 \quad (21).$$

It is preferable that a positive lens is disposed closest to the image side in the first lens group. Assuming that a focal length of the positive lens closest to the image side in the first lens group is f1z, it is preferable that the zoom lens of the above-mentioned aspect satisfies Conditional Expression (22), which is represented by $$0.5 < f1/f1z < 1.5 \quad (22).$$

It is preferable that a lens group closest to the image side in the front group includes a positive lens and a negative lens, successively in order from the object side to the image side. Assuming that an Abbe number of the positive lens of the lens group closest to the image side in the front group based on a d line is νAp, and an Abbe number of the negative lens of the lens group closest to the image side in the front group based on the d line is νAn, it is preferable that the zoom lens of the above-mentioned aspect satisfies Conditional Expression (23), which is represented by $$8 < vAn - vAp < 30 \tag{23}$$

It is preferable that a lens group closest to the image side in the front group includes a positive lens and a negative lens, successively in order from the object side to the image side, and assuming that a curvature radius of an image side surface of the positive lens of the lens group closest to the image side in the front group is RApr, and a curvature radius of an object side surface of the negative lens of the lens group closest to the image side in the front group is RAnf, it is preferable that the zoom lens of the above-mentioned aspect satisfies Conditional Expression (24), which is represented by $$-9 < (RAnf + RApr)/(RAnf - RApr) < -3 \tag{24}$$

It is preferable that the rear group includes a focusing group that moves along the optical axis during focusing.

It is preferable that the middle group includes the aperture stop.

It is preferable that all lenses that move along the optical axis during focusing are disposed in a lens group that moves during zooming of the rear group.

It is preferable that a lens group closest to the image side in the rear group includes two or more lenses.

It is preferable that the first lens group includes two or more positive lenses.

It is preferable that a lens closest to the object side in a lens group closest to the image side in the rear group is a meniscus lens that has a positive refractive power and that has a convex surface facing toward the image side.

It is preferable that the middle group has a positive refractive power.

It is preferable that a lens group closest to the image side in the rear group has a positive refractive power.

It is preferable that the rear group includes a focusing group that moves along the optical axis during focusing, and the focusing group has a negative refractive power.

The rear group may be configured to consist of two lens groups of which a mutual spacing changes during zooming.

The front group may be configured to consist of one lens group. Alternatively, the front group may be configured to consist of two lens groups of which a mutual spacing changes during zooming.

A lens group closest to the image side in the rear group may be configured to remain stationary with respect to an image plane during zooming. Further, it is preferable that a lens group closest to the image side in the rear group remains stationary with respect to an image plane during focusing.

The first lens group may be configured to remain stationary with respect to an image plane during zooming.

The middle group may be configured to remain stationary with respect to an image plane during zooming.

It is preferable that only one lens group in the rear group moves along the optical axis during focusing.

It is preferable that the middle group includes a cemented lens in which a negative lens and a positive lens are cemented.

The middle group may be configured to consist of, in order from the object side to the image side, the aperture stop, a single lens that has a positive refractive power, and a cemented lens in which a negative lens and a positive lens are cemented.

It is preferable that a lens group closest to the image side in the rear group includes an aspherical lens that has a positive refractive power.

The rear group may be configured to include a focusing group that moves along the optical axis during focusing, and the focusing group may be configured to constantly move to the image side during zooming from the wide angle end to a telephoto end in a state in which the infinite distance object is in focus.

The rear group may be configured to include a focusing group that moves along the optical axis during focusing, and the focusing group consists of a cemented lens in which a positive lens and a negative lens are cemented.

The first lens group may be configured to consist of a negative lens, a positive lens, and a positive lens, in order from the object side to the image side.

A lens group that has a negative refractive power may be configured to be disposed closest to the object side in the front group, and the lens group that has the negative refractive power and that is closest to the object side in the front group may be configured to constantly move to the image side during zooming from the wide angle end to a telephoto end.

Assuming that a focal length of the first lens of the first lens group is fL1, it is preferable that the zoom lens of the above-mentioned aspect satisfies Conditional Expression (25), which is represented by $$-0.95 < f1/fL1 < -0.3 \tag{25}$$

Assuming that a focal length of the zoom lens in a state in which the infinite distance object is in focus at the wide angle end is fw, it is preferable that the zoom lens of the above-mentioned aspect satisfies Conditional Expression (26), which is represented by $$2 < f1/fw < 5 \tag{26}$$

Assuming that a focal length of the zoom lens in a state in which the infinite distance object is in focus at the wide angle end is fw, and a focal length of the zoom lens in a state in which the infinite distance object is in focus at a telephoto end is ft, it is preferable that the zoom lens of the above-mentioned aspect satisfies Conditional Expression (27), which is represented by $$0.7 < f1/(fw \times ft)^{1/2} < 2.7 \tag{27}$$

It is preferable that the middle group has a positive refractive power. Assuming that a focal length of the middle group is fB, and a focal length of a lens group closest to the image side in the rear group is fGz, it is preferable that the zoom lens of the above-mentioned aspect satisfies Conditional Expression (28), which is represented by $$0.1 < fB/fGz < 1 \tag{28}$$

Assuming that a focal length of the front group in a state in which the infinite distance object is in focus at the wide angle end is fAw, and a focal length of the zoom lens in a state in which the infinite distance object is in focus at the wide angle end is fw, it is preferable that the zoom lens of the above-mentioned aspect satisfies Conditional Expression (29), which is represented by $$-1 < fAw/fw < -0.3 \tag{29}$$

Assuming that a lateral magnification of the front group in a state in which the infinite distance object is in focus at the wide angle end is βAw, a lateral magnification of the front group in a state in which the infinite distance object is in focus at a telephoto end is βAt, a focal length of the zoom lens in a state in which the infinite distance object is in focus at the wide angle end is fw, and a focal length of the zoom lens in a state in which the infinite distance object is in focus at the telephoto end is ft, it is preferable that the zoom lens of the above-mentioned aspect satisfies Conditional Expression (30), which is represented by $$0.3<(\beta At/\beta Aw)/(ft/fw)<0.8 \quad (30).$$

Assuming that a distance on the optical axis from the lens surface closest to the object side in the first lens group to a paraxial entrance pupil position in a state in which the infinite distance object is in focus at the wide angle end is enp, a focal length of the zoom lens in a state in which the infinite distance object is in focus at the wide angle end is fw, and a focal length of the zoom lens in a state in which the infinite distance object is in focus at a telephoto end is ft, it is preferable that the zoom lens of the above-mentioned aspect satisfies Conditional Expression (31), which is represented by $$0.3<enp/(fw\times ft)^{1/2}<1 \quad (31).$$

Assuming that a sum of a back focal length of the zoom lens at an air-equivalent distance and a distance on the optical axis from the lens surface closest to the object side in the first lens group to a lens surface closest to the image side in the rear group in a state in which the infinite distance object is in focus at the wide angle end is TLw, it is preferable that the zoom lens of the above-mentioned aspect satisfies Conditional Expression (32), which is represented by $$0.2<DDG1STw/TLw<0.6 \quad (32).$$

Assuming that an open opening diameter of the aperture stop in a state in which the infinite distance object is in focus at the wide angle end is STw, and an open opening diameter of the aperture stop in a state in which the infinite distance object is in focus at a telephoto end is STt, it is preferable that the zoom lens of the above-mentioned aspect satisfies Conditional Expression (33), which is represented by $$0.6<STw/STt<1 \quad (33).$$

Assuming that an effective diameter of the lens surface closest to the object side in the first lens group is ED1, and an effective diameter of a lens surface closest to the image side in the rear group is EDz, it is preferable that the zoom lens of the above-mentioned aspect satisfies Conditional Expression (34), which is represented by $$1.5<ED1/EDz<3 \quad (34).$$

It is preferable that the middle group includes at least one positive lens. Assuming that an average value of Abbe numbers of all positive lenses of the middle group based on a d line is vBpave, it is preferable that the zoom lens of the above-mentioned aspect satisfies Conditional Expression (35), which is represented by $$60<vBpave<85 \quad (35).$$

It is preferable that the rear group includes a focusing group that moves along the optical axis during focusing, and the focusing group includes at least one positive lens and at least one negative lens. Assuming that an average value of Abbe numbers of all positive lenses of the focusing group based on a d line is vGFpave, and an average value of Abbe numbers of all negative lenses of the focusing group based on the d line is vGFnave, it is preferable that the zoom lens of the above-mentioned aspect satisfies Conditional Expression (36), which is represented by $$11<vGFnave-vGFpave<30 \quad (36).$$

It is preferable that the rear group includes a focusing group that moves along the optical axis during focusing, and the focusing group includes at least one positive lens and at least one negative lens. Assuming that an average value of refractive indexes of all positive lenses of the focusing group at a d line is NGFpave, and an average value of refractive indexes of all negative lenses of the focusing group at the d line is NGFnave, it is preferable that the zoom lens of the above-mentioned aspect satisfies Conditional Expression (37), which is represented by $$-0.2<NGFnave-NGFpave<-0.01 \quad (37).$$

Assuming that a refractive index of the second lens of the first lens group at a d line is NL2, an Abbe number of the second lens of the first lens group based on the d line is vL2, and a partial dispersion ratio of the second lens of the first lens group between a g line and an F line is θL2, it is preferable that the zoom lens of the above-mentioned aspect satisfies Conditional Expressions (38), (39), (40), and (41), which are represented by $$1.495<NL2<1.56 \quad (38),$$

$$65<vL2<75 \quad (39),$$

$$2.18<NL2+0.01\times vL2<2.5 \quad (40), \text{ and}$$

$$0.645<\theta L2+0.001625\times vL2<0.66 \quad (41).$$

It is preferable that the front group includes two or more negative lenses. Assuming that a refractive index of a negative lens which is second from the object side among the negative lenses included in the front group at a d line is NA2n, an Abbe number of the negative lens which is second from the object side among the negative lenses included in the front group based on the d line is vA2n, and a partial dispersion ratio of the negative lens which is second from the object side among the negative lenses included in the front group between a g line and an F line is θA2n, it is preferable that the zoom lens of the above-mentioned aspect satisfies Conditional Expressions (42), (43), (44), and (45), which are represented by $$1.72<NA2n<1.8 \quad (42),$$

$$43<vA2n<57 \quad (43),$$

$$2.21<NA2n+0.01\times vA2n<2.37 \quad (44), \text{ and}$$

$$0.63<\theta A2n+0.001625\times vA2n<0.66 \quad (45).$$

It is preferable that the rear group includes a focusing group that moves along the optical axis during focusing, and the focusing group includes at least one negative lens. Assuming that a refractive index of the negative lens of the focusing group at a d line is NGFn, an Abbe number of the negative lens of the focusing group based on the d line is vGFn, and a partial dispersion ratio of the negative lens of the focusing group between a g line and an F line is θGFn, it is preferable that the zoom lens of the above-mentioned aspect includes at least one negative lens satisfying Conditional Expressions (46), (47), (48), and (49), which are represented by $$1.72<NGFn<1.8 \quad (46),$$

$$43<vGFn<57 \quad (47),$$

$$2.21<NGFn+0.01\times vGFn<2.37 \quad (48), \text{ and}$$

$$0.63<\theta GFn+0.001625\times vGFn<0.66 \quad (49).$$

It is preferable that the zoom lens includes only one focusing group that moves along the optical axis during focusing, the focusing group is disposed in the rear group, and a lens group closest to the image side in the rear group remains stationary with respect to an image plane during focusing. Assuming that a focal length of the front group in a state in which the infinite distance object is in focus at the wide angle end is fAw, and a focal length of the focusing group is fGF, it is preferable that the zoom lens of the above-mentioned aspect satisfies Conditional Expression (50), which is represented by $$0.3 < fAw/fGF < 0.8 \qquad (50).$$

It is preferable that the zoom lens includes only one focusing group that moves along the optical axis during focusing, the focusing group is disposed in the rear group, and a lens group closest to the image side in the rear group remains stationary with respect to an image plane during focusing. Assuming that a difference in an optical axis direction between a position of the focusing group in a state in which the infinite distance object is in focus at a telephoto end and a position of the focusing group in a state in which a lateral magnification of the zoom lens at the telephoto end is −0.1× is DDfft, and a difference in an optical axis direction between a position of the focusing group in a state in which the infinite distance object is in focus at the wide angle end and a position of the focusing group in a state in which the infinite distance object is in focus at the telephoto end is DDf, it is preferable that the zoom lens of the above-mentioned aspect satisfies Conditional Expression (51), which is represented by $$0.15 < |DDfft/DDf| < 0.5 \qquad (51).$$

It is preferable that the zoom lens includes only one focusing group that moves along the optical axis during focusing, the focusing group is disposed in the rear group, and a lens group closest to the image side in the rear group remains stationary with respect to an image plane during focusing. Assuming that a focal length of the lens group closest to the image side in the rear group is fGz, and a focal length of the focusing group is fGF, it is preferable that the zoom lens of the above-mentioned aspect satisfies Conditional Expression (52), which is represented by $$-4 < fGz/fGF < -2 \qquad (52).$$

Assuming that a back focal length of the zoom lens at an air-equivalent distance in a state in which the infinite distance object is in focus at the wide angle end is Bfw, and a maximum image height in a state in which the infinite distance object is in focus at the wide angle end is IHw, it is preferable that the zoom lens of the above-mentioned aspect satisfies Conditional Expression (53), which is represented by $$0.5 < Bfw/IHw < 2 \qquad (53).$$

Assuming that a focal length of the zoom lens in a state in which the infinite distance object is in focus at the wide angle end is fw, and a focal length of the zoom lens in a state in which the infinite distance object is in focus at a telephoto end is ft, it is preferable that the zoom lens of the above-mentioned aspect satisfies Conditional Expression (54), which is represented by $$3 < ft/fw < 100 \qquad (54).$$

Assuming that a curvature radius of an object side surface of the first lens is R1f, and a curvature radius of an image side surface of the second lens is R2r, it is preferable that the zoom lens of the above-mentioned aspect satisfies Conditional Expression (55), which is represented by $$-35 < (R2r+R1f)/(R2r-R1f) < -1 \qquad (55).$$

Assuming that a group consisting of all lenses in the front group on the image side closer than the longest air spacing on the optical axis in the front group in a state in which the infinite distance object is in focus at a wide angle end is an Aw subgroup, and an average value of Abbe numbers based on a d line of all negative lenses in the Aw subgroup is vAwnave, it is preferable that the zoom lens of the above-mentioned aspect satisfies Conditional Expression (56), which is represented by $$55 < vAwnave < 102 \qquad (56).$$

Assuming that a group consisting of all lenses in the front group on the image side closer than the longest air spacing on the optical axis in the front group in a state in which the infinite distance object is in focus at a telephoto end is an At subgroup, an air lens in the At subgroup having a focal length whose absolute value is larger than an absolute value of a focal length of the At subgroup is a specific air lens, among convex surfaces, in the At subgroup, which have a convex shape directed toward the image side and come into contact with air, a curvature radius of a convex surface that does not constitute the specific air lens and has the smallest absolute value of curvature radius is Rp, and among concave surfaces, in the At subgroup, which have a convex shape directed toward the image side and come into contact with air, a curvature radius of a concave surface that does not constitute the specific air lens and has the smallest absolute value of curvature radius is Rn, it is preferable that the zoom lens of the above-mentioned aspect satisfies Conditional Expression (57), which is represented by $$1 < (Rp+Rn)/(Rp-Rn) < 10 \qquad (57).$$

Assuming that a group consisting of all lenses in the front group on the image side closer than the longest air spacing on the optical axis in the front group in a state in which the infinite distance object is in focus at a telephoto end is an At subgroup, an air lens in the At subgroup having a focal length whose absolute value is larger than an absolute value of a focal length of the At subgroup is a specific air lens. Assuming that among convex surfaces, in the At subgroup, which have a convex shape directed toward the image side and come into contact with air, a convex surface that does not constitute the specific air lens and has the smallest absolute value of curvature radius is an Ap surface. Assuming that a distance on the optical axis between the Ap surface and an object point for the Ap surface in a case where a light ray parallel to the optical axis is incident on the zoom lens from the object side at the telephoto end to perform paraxial ray tracing is Dobjp, a sign of the Dobjp is negative if the object point is on the object side closer than the Ap surface, and positive if on the image side. Assuming that a curvature radius of the Ap surface is Rp, a refractive index of a medium on the object side of the Ap surface at a d line is Npf, and a refractive index of a medium on the image side of the Ap surface at the d line is Npr. Further, assuming that among concave surfaces, in the At subgroup, which have a convex shape directed toward the image side and come into contact with air, a concave surface that does not constitute the specific air lens and has the smallest absolute value of curvature radius is an An surface. Assuming that a distance on the optical axis between the An surface and an object point for the An surface in a case where a light ray parallel to the optical axis is incident on the zoom lens from the object side at the telephoto end to perform paraxial ray tracing is Dobjn, a sign of the Dobjn is negative if the object point for the An surface is on the object side closer than the An surface, and positive if on the image side. Assuming that a curvature radius of the An surface is Rn, a refractive index of the medium on the object side of the An surface at the d line is Nnf, a refractive index of the medium on the image side of the An surface at the d line is Nnr. If APLp and APLn are specified as follows:

$APLp=Dobjp/Rp-(1+Npr/Npf)$, and $APLn=Dobjn/Rn-(1+Nnr/Nnf)$, it is preferable that the zoom lens of the above-mentioned aspect satisfies Conditional Expression (58), which is represented by $-1.4<(APLp+APLn)/2<0$ (58).

The imaging apparatus according to another aspect of the present disclosure includes a zoom lens according to the above-mentioned aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the terms "group that has a positive refractive power" and "group has a positive refractive power" mean that the group as a whole has a positive refractive power. Similarly, the terms "group that has a negative refractive power" and "group has a negative refractive power" mean that the group as a whole has a negative refractive power. The term "a lens that has a positive refractive power" and the term "a positive lens" are synonymous. The term "a lens that has a negative refractive power" and the term "negative lens" are synonymous. Each of the terms "first lens group", "front group", "middle group", "rear group", "lens group", and "focusing group" in the present specification is not limited to a configuration consisting of a plurality of lenses, but may be a configuration consisting of only one lens.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The curvature radius, the sign of the refractive power, and the surface shape of the lens including the aspherical surface will be used in terms of a paraxial region unless otherwise specified. The sign of the curvature radius of the surface of the convex shape facing toward the object side is positive, and the sign of the curvature radius of the surface of the convex shape facing toward the image side is negative.

The "focal length" used in a conditional expression is a paraxial focal length. The "back focal length at the air-equivalent distance" is the air-equivalent distance on the optical axis from the lens surface closest to the image side to the image side focal position of the zoom lens. Unless otherwise specified, the "distance on the optical axis" used in conditional expressions is considered a geometrical length. The values used in conditional expressions are values in a case where the d line is used as a reference in a state in which the infinite distance object is in focus unless otherwise specified. The "d line", "C line", "F line", and "g line" described in the present specification are emission lines. The wavelength of the d line is 587.56 nm (nanometers), the wavelength of the C line is 656.27 nm (nanometers), the wavelength of the F line is 486.13 nm (nanometers), and the wavelength of the g line is 435.84 nm (nanometers).

According to the present disclosure, it is possible to provide a zoom lens which has a high magnification but is reduced in size and maintains favorable optical performance, and an imaging apparatus comprising the zoom lens.

BRIEF DESCRIPTION OF THE DRAWINGS

FIG. 2 is a diagram showing a configuration and a luminous flux in each state of the zoom lens of FIG. 1.

FIG. 8 is a diagram showing aberrations of the zoom lens of Example 1.

FIG. 10 is a diagram showing aberrations of the zoom lens of Example 2.

FIG. 12 is a diagram showing aberrations of the zoom lens of Example 3.

FIG. 14 is a diagram showing aberrations of the zoom lens of Example 4.

FIG. 16 is a diagram showing aberrations of the zoom lens of Example 5.

FIG. 18 is a diagram showing aberrations of the zoom lens of Example 6.

FIG. 20 is a diagram showing aberrations of the zoom lens of Example 7.

FIG. 22 is a diagram showing aberrations of the zoom lens of Example 8.

FIG. 24 is a diagram showing aberrations of the zoom lens of Example 9.

FIG. 26 is a diagram showing aberrations of the zoom lens of Example 10.

FIG. 28 is a diagram showing aberrations of the zoom lens of Example 11.

FIG. 30 is a diagram showing aberrations of the zoom lens of Example 12.

FIG. 32 is a diagram showing aberrations of the zoom lens of Example 13.

FIG. 34 is a diagram showing aberrations of the zoom lens of Example 14.

FIG. 36 is a diagram showing aberrations of the zoom lens of Example 15.

FIG. 38 is a diagram showing aberrations of the zoom lens of Example 16.

FIG. 40 is a diagram showing aberrations of the zoom lens of Example 17.

FIG. 42 is a diagram showing aberrations of the zoom lens of Example 18.

FIG. 44 is a diagram showing aberrations of the zoom lens of Example 19.

FIG. 46 is a diagram showing aberrations of the zoom lens of Example 20.

FIG. 48 is a diagram showing aberrations of the zoom lens of Example 21.

FIG. 50 is a diagram showing aberrations of the zoom lens of Example 22.

FIG. 52 is a diagram showing aberrations of the zoom lens of Example 23.

FIG. 54 is a diagram showing aberrations of the zoom lens of Example 24.

FIG. 56 is a diagram showing aberrations of the zoom lens of Example 25.

FIG. 58 is a diagram showing aberrations of the zoom lens of Example 26.

FIG. 60 is a diagram showing aberrations of the zoom lens of Example 27.

FIG. 62 is a diagram showing aberrations of the zoom lens of Example 28.

FIG. 64 is a diagram showing aberrations of the zoom lens of Example 29.

FIG. 66 is a diagram showing aberrations of the zoom lens of Example 30.

FIG. 68 is a diagram showing aberrations of the zoom lens of Example 31.

FIG. 70 is a diagram showing aberrations of the zoom lens of Example 32.

FIG. 72 is a diagram showing aberrations of the zoom lens of Example 33.

FIG. 74 is a diagram showing aberrations of the zoom lens of Example 34.

FIG. 76 is a diagram showing aberrations of the zoom lens of Example 35.

FIG. 78 is a diagram showing aberrations of the zoom lens of Example 36.

DESCRIPTION OF EMBODIMENTS

Hereinafter, embodiments of the present disclosure will be described with reference to the accompanying drawings.

Figure 1:
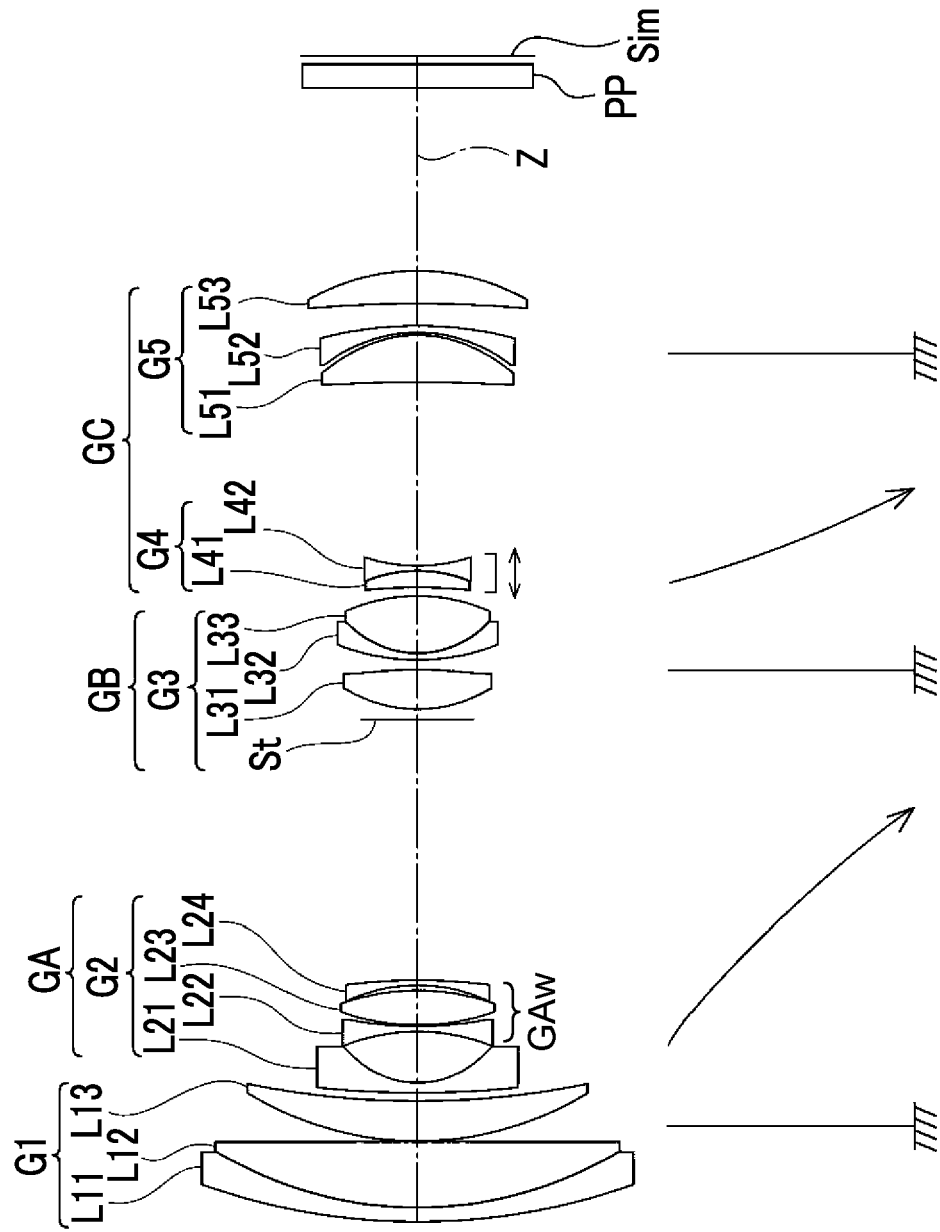
FIG. 1 is a cross-sectional view showing a configuration of a zoom lens according to an embodiment and a diagram showing movement loci thereof, the zoom lens corresponding to a zoom lens of Example 1.

FIG. 1 shows a cross-sectional view of a configuration and movement loci of a zoom lens according to an embodiment of the present disclosure at a wide angle end. Further, FIG. 2 shows a cross-sectional view and a luminous flux of the configuration of the zoom lens of FIG. 1 in each state. In FIG. 2, the upper part labeled "wide angle end_infinity" shows a state in which an infinite distance object is in focus at the wide angle end, the middle part labeled "telephoto end_infinity" shows a state in which the infinite distance object is in focus at a telephoto end, and the lower part labeled "telephoto end_close" shows a state in which a close range object is in focus at the telephoto end. In the present specification, an object at an infinite distance in an optical axis direction from a lens surface closest to an object side in the zoom lens is referred to as an "infinite distance object", and an object at a close range in the optical axis direction from the lens surface closest to the object side in the zoom lens is referred to as a "close range object". In FIG. 2, as the luminous flux, the upper part shows an on-axis luminous flux wa and a luminous flux with a maximum image height wb, the middle part shows an on-axis luminous flux to and a luminous flux with a maximum image height tb, and the lower part shows an on-axis luminous flux ta1 and a luminous flux with a maximum image height tb1. The upper part of FIG. 2 also shows a maximum image height IHw in a state in which the infinite distance object is in focus at the wide angle end. The examples shown in FIGS. 1 and 2 correspond to a zoom lens of Example 1 to be described later. In FIGS. 1 and 2, the left side is the object side, and the right side is an image side. Hereinafter, description thereof will be given mainly with reference to FIG. 1.

Figure 3:
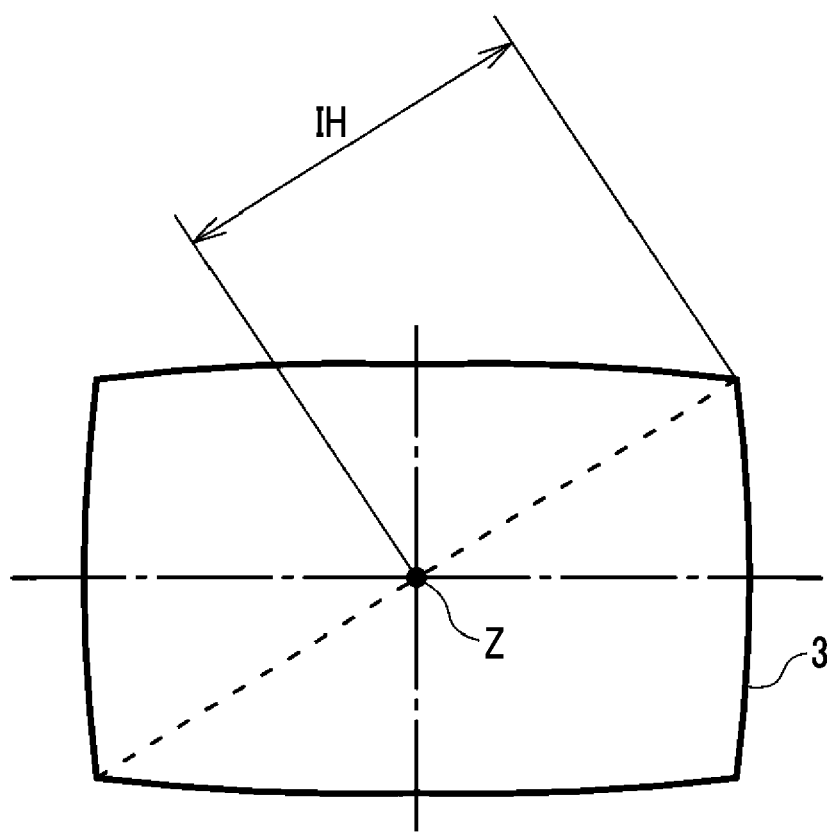
FIG. 3 is a diagram for explaining a maximum image height.

In the present specification, the maximum image height is a half number of the length that is the longest in linear distance in an imaging region used as a captured image in an image plane Sim. For example, in a case where the imaging region is rectangular, the half number of the diagonal length is the maximum image height, and in a case where the imaging region is circular, the radius is the maximum image height. Even in a case where a region 3 having a barrel shape in a plane perpendicular to an optical axis Z as shown in FIG. 3 is used as the imaging region, the half number of the longest linear distance in the region is a maximum image height IH. Further, in a case of an imaging apparatus in which the imaging region used as the captured image is moved in a direction intersecting with the optical axis Z to perform image blur correction, the value is set in a state in which image blur correction is not performed.

FIG. 1 shows an example in which, assuming that a zoom lens is applied to an imaging apparatus, an optical member PP having a parallel plate shape is disposed between the zoom lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The zoom lens of the present disclosure consists of a first lens group G1, a front group GA, a middle group GB, and a rear group GC, in order from the object side to the image side along the optical axis Z. The front group GA consists of one or more lens groups that move during zooming. The front group GA has a negative refractive power as a whole throughout an entire zoom range. The middle group GB includes only one lens group as the lens group. That is, the number of lens groups included in the middle group GB is only one. The rear group GC consists of a plurality of lens groups.

In the present specification, the "first lens group G1", the "lens group" in the front group GA, the "lens group" in the middle group GB, and the "lens group" in the rear group GC each are a constituent element of the zoom lens and a part which can be separated by an air spacing that changes during zooming and which includes at least one lens. During zooming, each lens group moves or remains stationary, and the mutual spacing between the lenses in each lens group does not change. That is, in the present specification, one lens group is a group in which the spacing between adjacent groups changes during zooming and the total spacing between adjacent lenses does not change within itself.

During zooming, the spacing between the first lens group G1 and the front group GA changes, the spacing between the front group GA and the middle group GB changes, the spacing between the middle group GB and the rear group GC changes, and all the spacings between the adjacent lens groups within the rear group GC change. Further, in a case where the front group GA consists of a plurality of lens groups, all the spacings between the adjacent lens groups in the front group GA change during zooming. The zooming effect thereof can be obtained by such a change in the spacing.

An aperture stop St is disposed between the lens surface closest to the image side in the front group GA and the lens surface closest to the object side in the rear group GC. By disposing the aperture stop St in such a manner, the stop unit can be reduced in size. As a result, there is an advantage in achieving reduction in size of an entire lens system.

For example, the zoom lens of FIG. 1 consists of a first lens group G1, a second lens group G2, a third lens group G3, a fourth lens group G4, and a fifth lens group G5, in order from the object side to the image side. In the example of FIG. 1, the front group GA consists of the second lens group G2, the middle group GB consists of the third lens group G3, and the rear group GC consists of the fourth lens group G4 and the fifth lens group G5.

For example, each lens group in FIG. 1 is configured as follows. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side. It should be noted that the aperture stop St shown in FIG. 1 does not indicate the shape and size, but indicates the position in the optical axis direction.

In the example of FIG. 1, during zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. Grounding symbols under each of the first lens group G1, the third lens group G3, and the fifth lens group G5 in FIG. 1 indicate that the lens groups remain stationary with respect to the image plane Sim during zooming. A curved arrow under each of the second lens group G2 and the fourth lens group G4 in FIG. 1 shows an approximate movement locus of each of the lens groups during zooming from the wide angle end to the telephoto end.

In the zoom lens of the present disclosure, the first lens group G1 has a positive refractive power. By setting the first lens group G1 as a lens group that has a positive refractive power, the total length of the lens system can be easily shortened. As a result, there is an advantage in achieving both reduction in size and high magnification. Further, by setting the first lens group G1 as a lens group that has a positive refractive power, the height of a ray incident on the front group GA from the optical axis Z becomes lower. Therefore, there is an advantage in suppressing fluctuation in aberrations during zooming.

Further, the first lens group G1 includes a first lens which is a negative lens and a second lens which is a positive lens, successively in order from a position closest to the object side to the image side. With such a configuration, it is easy to correct aberrations in the first lens group G1. As a result, there is an advantage in suppressing fluctuation in aberrations during zooming. By disposing the negative lens closest to the object side, it is easy to correct aberrations in a case where the focal length of the zoom lens at the wide angle end is shortened. In the example of FIG. 1, the first lens corresponds to the lens L11, and the second lens corresponds to the lens L12.

It is preferable that the first lens group G1 includes two or more positive lenses. In such a case, it is easy to suppress fluctuation in aberrations during zooming. As a result, there is an advantage in achieving high performance.

The first lens group G1 may be configured to consist of a negative lens, a positive lens, and a positive lens, in order from the object side to the image side. In such a case, there is an advantage in achieving reduction in size, and it is easy to suppress fluctuation in aberrations during zooming. As a result, there is an advantage in achieving high performance.

During zooming, the first lens group G1 may be configured to remain stationary with respect to the image plane Sim. In such a case, the structure can be simplified. As a result, there is an advantage in achieving reduction in size and weight of the whole system. It should be noted that "the whole system" in the specification means a zoom lens.

A lens group that has a negative refractive power may be configured to be disposed closest to the object side in the front group GA. A lens group that has a negative refractive power and that is closest to the object side in the front group GA may be configured to constantly move to the image side during zooming from the wide angle end to the telephoto end. In such a case, there is an advantage in achieving reduction in total length of the lens system at the telephoto end.

The front group GA may be configured to consist of one lens group. In such a case, the structure can be simplified. As a result, there is an advantage in achieving reduction in size and weight of the whole system. In a case where the front group GA consists of one lens group, the front group GA may be configured to consist of a negative lens, a negative lens, a positive lens, and a negative lens, in order from the object side to the image side.

It is preferable that the middle group GB has a positive refractive power. In such a case, there is an advantage in achieving reduction in size of the stop unit.

It is preferable that the middle group GB includes an aperture stop St. By disposing the aperture stop St in the middle group GB, the structure can be simplified. As a result, there is an advantage in achieving reduction in size and weight of the whole system.

It is preferable that the middle group GB includes a cemented lens in which a negative lens and a positive lens are cemented. In such a case, it is easy to correct longitudinal chromatic aberration on the wide angle side. As a result, there is an advantage in achieving high performance.

The middle group GB may be configured to consist of an aperture stop St, a single lens that has a positive refractive power, and a cemented lens in which a negative lens and a positive lens are cemented, in order from the object side to the image side. In such a case, it is easy to suppress fluctuation in aberrations during zooming. As a result, there is an advantage in achieving high performance.

During zooming, the middle group GB may be configured to remain stationary with respect to the image plane Sim. In such a case, the structure can be simplified. As a result, there is an advantage in achieving reduction in size and weight of the whole system.

The rear group GC may be configured to consist of two lens groups of which the mutual spacing changes during zooming. In such a case, the structure can be simplified. As a result, there is an advantage in achieving reduction in size and weight of the whole system.

It is preferable that the lens group closest to the image side in the rear group GC has a positive refractive power. In such a case, it is easy to correct distortion. As a result, there is an advantage in achieving high performance.

It is preferable that the lens group closest to the image side in the rear group GC includes two or more lenses. In such a case, it is easy to suppress fluctuation in aberrations during zooming and fluctuation in aberrations during focusing. As a result, there is an advantage in achieving high performance.

It is preferable that the lens group closest to the image side in the rear group GC includes an aspherical lens that has a positive refractive power. In such a case, it is easy to suppress fluctuation in aberrations during zooming and fluctuation in aberrations during focusing. As a result, there is an advantage in achieving high performance.

It is preferable that the lens closest to the object side in the lens group closest to the image side in the rear group GC is a meniscus lens that has a positive refractive power and that has a convex surface facing toward the image side. In such a case, it is easy to correct distortion. As a result, there is an advantage in achieving high performance.

During zooming, the lens group closest to the image side in the rear group GC may be configured to remain stationary with respect to the image plane Sim. In such a case, the structure can be simplified. As a result, there is an advantage in achieving reduction in size and weight of the whole system.

It is preferable that the lens group closest to the image side in the rear group GC remains stationary with respect to the image plane Sim during focusing. In such a case, the structure can be simplified. As a result, there is an advantage in achieving reduction in size and weight of the whole system.

It is preferable that the rear group GC includes a focusing group that moves along the optical axis Z during focusing. By disposing the focusing group in the rear group GC, the focusing group can be reduced in size. As a result, there is an advantage in achieving reduction in size of the entire lens system. In the present specification, a group that moves along the optical axis Z during focusing is referred to as a "focusing group". Focusing is performed by moving the focusing group.

For example, the focusing group of FIG. 1 consists of two lenses L41 and L42. That is, the focusing group of FIG. 1 consists of the fourth lens group G4. Parentheses under the fourth lens group G4 and a horizontal double-headed arrow in FIG. 1 indicate that the focusing group consists of the fourth lens group G4.

It is preferable that the focusing group included in the rear group GC has a negative refractive power. In a case where the focusing group has a negative refractive power, it is possible to minimize the amount of movement of the focusing group during focusing. As a result, there is an advantage in achieving reduction in size and weight of the whole system.

In a state in which the infinite distance object is in focus, it is preferable that the focusing group included in the rear group GC constantly moves to the image side during zooming from the wide angle end to the telephoto end. In such a case, there is an advantage in achieving both wide angle and high magnification.

The focusing group included in the rear group GC may be configured to consist of a cemented lens in which a positive lens and a negative lens are cemented. In such a case, it is easy to suppress fluctuation in aberrations during zooming and fluctuation in aberrations during focusing. As a result, there is an advantage in achieving high performance.

It is preferable that the focusing group is included in the lens groups that move during zooming in the rear group GC. That is, it is preferable that all the lenses that move along the optical axis Z during focusing are disposed in the lens groups that move during zooming in the rear group GC. In such a case, the structure can be simplified. As a result, there is an advantage in achieving reduction in size and weight of the whole system.

It is preferable that only one lens group in the rear group GC moves along the optical axis Z during focusing. In such a case, the structure can be simplified. As a result, there is an advantage in achieving reduction in size and weight of the whole system.

It is preferable that the zoom lens of the present disclosure includes only one focusing group. In such a case, the structure can be simplified. As a result, there is an advantage in achieving reduction in size and weight of the whole system. In a case where the zoom lens includes only one focusing group, it is preferable that the focusing group is disposed in the rear group GC.

Next, preferable and possible configurations about conditional expressions of the zoom lens of the present disclosure will be described. In the following description, the term "zoom lens of the present disclosure" is also simply referred to as a "zoom lens" in order to avoid redundant description.

Assuming that a distance on an optical axis from a lens surface closest to the object side in the first lens group G1 to the aperture stop St in a state in which the infinite distance object is in focus at the wide angle end is DDG1STw, and a focal length of the first lens group G1 is f1, it is preferable that the zoom lens satisfies Conditional Expression (1). For example, FIG. 2 shows the distance DDG1STw described above. By not allowing the corresponding value of Conditional Expression (1) to be equal to or less than the lower limit, the movable range of the front group GA can be made larger. Therefore, it is easy to achieve high magnification. Alternatively, by not allowing the corresponding value of Conditional Expression (1) to be equal to or less than the lower limit, the refractive power of the first lens group G1 is prevented from becoming excessively weak. Therefore, it is easy to achieve both reduction in size and high magnification. By not allowing the corresponding value of Conditional Expression (1) to be equal to or greater than the upper limit, there is an advantage in shortening the distance from the lens surface closest to the object side in the first lens group G1 on the wide angle side to an entrance pupil position. Therefore, it is possible to suppress an increase in diameter of the first lens group G1. As a result, it is easy to achieve reduction in size. Alternatively, by not allowing the corresponding value of Conditional Expression (1) to be equal to or greater than the upper limit, the refractive power of the first lens group G1 is prevented from becoming excessively strong. Therefore, it is easy to achieve high performance. In order to obtain more favorable characteristics, it is more preferable that the zoom lens satisfies Conditional Expression (1-1), it is yet more preferable that the zoom lens satisfies Conditional Expression (1-2), and it is most preferable that the zoom lens satisfies Conditional Expression (1-3).

$$0.5 < DDG1STw/f1 < 1.5 \qquad (1)$$

$$0.55 < DDG1STw/f1 < 1.1 \qquad (1\text{-}1)$$

$$0.6 < DDG1STw/f1 < 0.99 \qquad (1\text{-}2)$$

$$0.7 < DDG1STw/f1 < 0.95 \qquad (1\text{-}3)$$

Assuming that a focal length of the first lens group G1 is f1 and a focal length of the middle group GB is fB, it is preferable that the zoom lens satisfies Conditional Expression (2). By not allowing the corresponding value of Conditional Expression (2) to be equal to or less than the lower limit, the refractive power of the first lens group G1 is prevented from becoming excessively strong. Therefore, it is easy to achieve high performance. Alternatively, by not allowing the corresponding value of Conditional Expression (2) to be equal to or less than the lower limit, the refractive power of the middle group GB is prevented from becoming excessively weak. Therefore, in a case where the rear group GC includes the focusing group, it is possible to minimize the amount of movement of the focusing group during focusing. As a result, there is an advantage in achieving reduction in total length of the lens system. By not allowing the corresponding value of Conditional Expression (2) to be equal to or greater than the upper limit, the refractive power of the first lens group G1 is prevented from becoming excessively weak. Therefore, it is easy to achieve both reduction in size and high magnification. Alternatively, by not allowing the corresponding value of Conditional Expression (2) to be equal to or greater than the upper limit, the refractive power of the middle group GB is prevented from becoming excessively strong. Therefore, it is easy to suppress fluctuation in aberrations in the rear group GC. In particular, in a case where the rear group GC includes a focusing group, it is easy to suppress fluctuation in aberrations during focusing. In order to obtain more favorable characteristics, it is more preferable that the zoom lens satisfies Conditional Expression (2-1), it is yet more preferable that the zoom lens satisfies Conditional Expression (2-2), and it is most preferable that the zoom lens satisfies Conditional Expression (2-3).

$$0.1 < f1/fB < 6 \quad (2)$$

$$1.5 < f1/fB < 4.5 \quad (2\text{-}1)$$

$$2.5 < f1/fB < 4.5 \quad (2\text{-}2)$$

$$2.5 < f1/fB < 4 \quad (2\text{-}3)$$

Assuming that a focal length of the front group GA is fAw and a focal length of the middle group GB is fB in a state in which the infinite distance object is in focus at the wide angle end, it is preferable that the zoom lens satisfies Conditional Expression (3). By not allowing the corresponding value of Conditional Expression (3) to be equal to or less than the lower limit, the refractive power of the front group GA is prevented from becoming excessively weak. Therefore, it is easy to suppress the amount of movement of the front group GA during zooming. Alternatively, by not allowing the corresponding value of Conditional Expression (3) to be equal to or less than the lower limit, the refractive power of the middle group GB is prevented from becoming excessively strong. Therefore, it is easy to suppress fluctuation in aberrations in the rear group GC. In particular, in a case where the rear group GC includes a focusing group, it is easy to suppress fluctuation in aberrations during focusing. By not allowing the corresponding value of Conditional Expression (3) to be equal to or greater than the upper limit, the refractive power of the front group GA is prevented from becoming excessively strong. Therefore, it is easy to suppress fluctuation in aberrations during zooming. Alternatively, by not allowing the corresponding value of Conditional Expression (3) to be equal to or greater than the upper limit, the refractive power of the middle group GB is prevented from becoming excessively weak. Therefore, in a case where the rear group GC includes the focusing group, it is possible to minimize the amount of movement of the focusing group during focusing. As a result, there is an advantage in achieving reduction in total length of the lens system. In order to obtain more favorable characteristics, it is more preferable that the zoom lens satisfies Conditional Expression (3-1), it is yet more preferable that the zoom lens satisfies Conditional Expression (3-2), and it is most preferable that the zoom lens satisfies Conditional Expression (3-3).

$$-1 < fAw/fB < -0.2 \quad (3)$$

$$-0.7 < fAw/fB < -0.3 \quad (3\text{-}1)$$

$$-0.67 < fAw/fB < -0.3 \quad (3\text{-}2)$$

$$-0.67 < fAw/fB < -0.4 \quad (3\text{-}3)$$

It is preferable that the zoom lens satisfies Conditional Expression (4). Here, it is assumed that a distance on the optical axis from the lens surface closest to the object side in the first lens group G1 to a paraxial entrance pupil position Pe in a state in which the infinite distance object is in focus at the wide angle end is enp, and a maximum image height in a state in which the infinite distance object is in focus at the wide angle end is IHw. Further, it is assumed that a focal length of the zoom lens in a state in which the infinite distance object is in focus at the wide angle end is fw, and a focal length of the zoom lens in a state in which the infinite distance object is in focus at the telephoto end is ft. For example, the top of FIG. 2 shows the distance enp, the paraxial entrance pupil position Pe, and the maximum image height IHw defined above. ft/fw of Conditional Expression (4) is the maximum zoom magnification. By not allowing the corresponding value of Conditional Expression (4) to be equal to or less than the lower limit, the distance from the lens surface closest to the object side in the first lens group G1 on the wide angle side to the entrance pupil position is not excessively short. Therefore, it is easy to suppress fluctuation in aberrations during zooming. By not allowing the corresponding value of Conditional Expression (4) to be equal to or greater than the upper limit, there is an advantage in shortening the distance from the lens surface closest to the object side in the first lens group G1 on the wide angle side to the entrance pupil position. Therefore, it is possible to suppress an increase in diameter of the first lens group G1. As a result, it is easy to achieve reduction in size. In order to obtain more favorable characteristics, it is more preferable that the zoom lens satisfies Conditional Expression (4-1), it is yet more preferable that the zoom lens satisfies Conditional Expression (4-2), and it is most preferable that the zoom lens satisfies Conditional Expression (4-3).

$$1 < enp/\{IHw \times \log(ft/fw)\} < 3 \quad (4)$$

$$1.5 < enp/\{IHw \times \log(ft/fw)\} < 2.5 \quad (4\text{-}1)$$

$$1.5 < enp/\{IHw \times \log(ft/fw)\} < 2.37 \quad (4\text{-}2)$$

$$2 < enp/\{IHw \times \log(ft/fw)\} < 2.35 \quad (4\text{-}3)$$

Assuming that a focal length of the first lens group G1 is f1, a focal length of the zoom lens in a state in which the infinite distance object is in focus at the telephoto end is ft, and an F number in a state in which the infinite distance object is in focus at the telephoto end is FNot, it is preferable that the zoom lens satisfies Conditional Expression (5). f1/(ft/FNot) of Conditional Expression (5) indicates the F number of the first lens group G1 at the telephoto end. By not allowing the corresponding value of Conditional Expression (5) to be equal to or less than the lower limit, the refractive power of the first lens group G1 is prevented from becoming excessively strong. Therefore, it is easy to achieve high performance. Alternatively, by not allowing the corresponding value of Conditional Expression (5) to be equal to or less than the lower limit, the entrance pupil diameter at the telephoto end is prevented from becoming excessively large. Therefore, it is possible to suppress occurrence of F drop. "F-drop" is a phenomenon in which the F number becomes remarkably large on a telephoto side from a focal length state in a zoom range. By not allowing the corresponding value of Conditional Expression (5) to be equal to or greater than the upper limit, the entrance pupil diameter at the telephoto end is prevented from becoming excessively small. Therefore, it is possible to suppress an increase in the F number. Alternatively, by not allowing the corresponding value of Conditional Expression (5) to be equal to or greater than the upper limit, the refractive power of the first lens group G1 is prevented from becoming excessively weak. Therefore, it is easy to achieve reduction in size of the first lens group G1. In order to obtain more favorable characteristics, it is more preferable that the zoom lens satisfies Conditional Expression (5-1), and it is yet more preferable that the zoom lens satisfies Conditional Expression (5-2).

$$1.4 < f1/(ft/FNot) < 4.4 \quad (5)$$

$$1.8 < f1/(ft/FNot) < 3.4 \quad (5\text{-}1)$$

$$2 < f1/(ft/FNot) < 3 \quad (5\text{-}2)$$

It is preferable that the zoom lens satisfies Conditional Expression (6). Here, it is assumed that a distance on the optical axis from the lens surface closest to the object side in the first lens group G1 to the aperture stop St in a state in which the infinite distance object is in focus at the wide angle end is DDG1STw, and a maximum image height in a state in which the infinite distance object is in focus at the wide angle end is IHw. Further, it is assumed that a focal length of the zoom lens in a state in which the infinite distance object is in focus at the wide angle end is fw, and a focal length of the zoom lens in a state in which the infinite distance object is in focus at the telephoto end is ft. By not allowing the corresponding value of Conditional Expression (6) to be equal to or less than the lower limit, the distance from the lens surface closest to the object side in the first lens group G1 on the wide angle side to the entrance pupil position is not excessively short. Therefore, it is easy to suppress fluctuation in aberrations during zooming. By not allowing the corresponding value of Conditional Expression (6) to be equal to or greater than the upper limit, there is an advantage in shortening the distance from the lens surface closest to the object side in the first lens group G1 on the wide angle side to the entrance pupil position. Therefore, it is possible to suppress an increase in diameter of the first lens group G1. As a result, it is easy to achieve reduction in size. In order to obtain more favorable characteristics, it is more preferable that the zoom lens satisfies Conditional Expression (6-1), and it is yet more preferable that the zoom lens satisfies Conditional Expression (6-2).

$$3 < DDG1STw / \{IHw \times \log(ft/fw)\} < 10 \quad (6)$$

$$4 < DDG1STw / \{IHw \times \log(ft/fw)\} < 6 \quad (6\text{-}1)$$

$$4.5 < DDG1STw / \{IHw \times \log(ft/fw)\} < 5.5 \quad (6\text{-}2)$$

Assuming that a focal length of the first lens group G1 is f1 and a focal length of the front group GA in a state in which the infinite distance object is in focus at the wide angle end is fAw, it is preferable that the zoom lens satisfies Conditional Expression (7). By not allowing the corresponding value of Conditional Expression (7) to be equal to or less than the lower limit, the refractive power of the front group GA is prevented from becoming excessively strong. Therefore, it is easy to suppress fluctuation in aberrations during zooming. Alternatively, by not allowing the corresponding value of Conditional Expression (7) to be equal to or less than the lower limit, the refractive power of the first lens group G1 is prevented from becoming excessively weak. Therefore, it is easy to achieve reduction in size of the first lens group G1. By not allowing the corresponding value of Conditional Expression (7) to be equal to or greater than the upper limit, the refractive power of the first lens group G1 is prevented from becoming excessively strong. Therefore, it is easy to suppress fluctuation in aberrations during zooming. In order to obtain more favorable characteristics, it is more preferable that the zoom lens satisfies Conditional Expression (7-1), and it is yet more preferable that the zoom lens satisfies Conditional Expression (7-2).

$$-9 < f1/fAw < -4 \quad (7)$$

$$-8 < f1/fAw < -5 \quad (7\text{-}1)$$

$$-6 < f1/fAw < -5.2 \quad (7\text{-}2)$$

Assuming that an effective diameter of a lens surface closest to the image side in the rear group GC is EDz, and an effective diameter of a lens surface closest to the image side in the lens group which is second from the image side of the rear group GC is EDyr, it is preferable that the zoom lens satisfies Conditional Expression (8). By not allowing the corresponding value of Conditional Expression (8) to be equal to or less than the lower limit, the difference in height of the ray from the optical axis Z in the rear group GC is prevented from becoming excessively large. Therefore, it is easy to suppress fluctuation in aberrations during zooming and fluctuation in aberrations during focusing. By not allowing the corresponding value of Conditional Expression (8) to be equal to or greater than the upper limit, it is easy to achieve reduction in size of the rear group GC. In order to obtain more favorable characteristics, it is more preferable that the zoom lens satisfies Conditional Expression (8-1), and it is yet more preferable that the zoom lens satisfies Conditional Expression (8-2).

$$0.3 < EDyr/EDz < 0.9 \quad (8)$$

$$0.35 < EDyr/EDz < 0.6 \quad (8\text{-}1)$$

$$0.4 < EDyr/EDz < 0.5 \quad (8\text{-}2)$$

In the specification, twice the distance to the optical axis Z from the intersection between the lens surface and the ray passing through the outermost side among rays incident onto the lens surface from the object side and emitted to the image side is the "effective diameter" of the lens surface. The "outside" here is the radial outside centered on the optical axis Z, that is, the side separated from the optical axis Z. It should be noted that the "ray passing through the outermost side" is determined in consideration of the entire zoom range.

Figure 4:
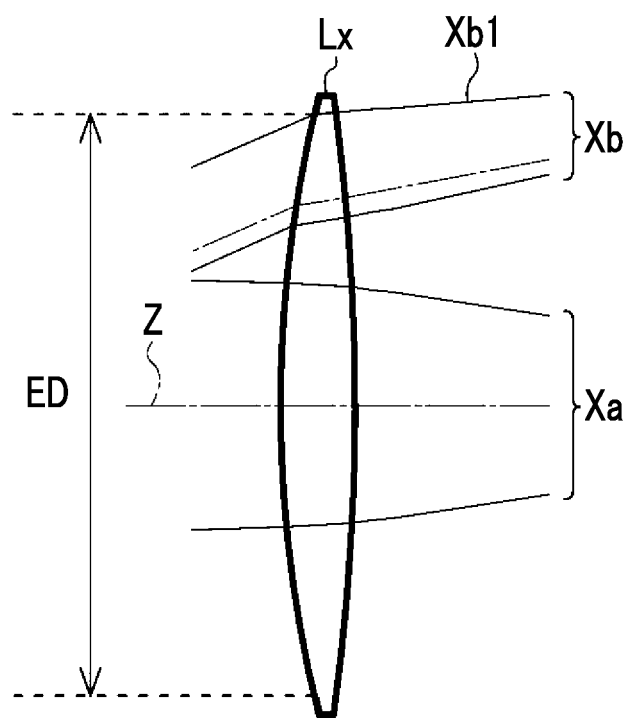
FIG. 4 is a diagram for explaining an effective diameter.

As an explanatory diagram, FIG. 4 shows an example of an effective diameter ED. In FIG. 4, the left side is the object side, and the right side is the image side. FIG. 4 shows an on-axis luminous flux Xa and an off-axis luminous flux Xb passing through a lens Lx. In the example of FIG. 4, a ray Xb1, which is the upper ray of the off-axis luminous flux Xb, is the ray passing through the outermost side. Therefore, in the example of FIG. 4, twice the distance to the optical axis Z from the intersection between the ray Xb1 and the object side surface of the lens Lx is the effective diameter ED of the object side surface of the lens Lx. In FIG. 4, the upper ray of the off-axis luminous flux Xb is the ray passing through the outermost side, but which ray is the ray passing through the outermost side depends on the optical system.

Assuming that a focal length of the lens closest to the image side in the rear group GC is fz and a focal length of the lens group closest to the image side in the rear group GC is fGz, it is preferable that the zoom lens satisfies Conditional Expression (9). By not allowing the corresponding value of Conditional Expression (9) to be equal to or less than the lower limit, the refractive power of the lens closest to the image side in the rear group GC is prevented from becoming excessively strong. Therefore, it is easy to suppress fluctuation in aberrations during zooming and fluctuation in aberrations during focusing. By not allowing the corresponding value of Conditional Expression (9) to be equal to or greater than the upper limit, the refractive power of the lens closest to the image side in the rear group GC is prevented from becoming excessively weak. As a result, there is an advantage in suppressing distortion and lateral chromatic aberration. In order to obtain more favorable characteristics, it is more preferable that the zoom lens satisfies Conditional Expression (9-1), and it is yet more preferable that the zoom lens satisfies Conditional Expression (9-2).

$$0.1<fz/fGz<3 \quad (9)$$

$$0.5<fz/fGz<1.5 \quad (9\text{-}1)$$

$$0.8<fz/fGz<1.3 \quad (9\text{-}2)$$

Assuming that a focal length of the first lens group G1 is f1 and a focal length of the lens group closest to the image side in the rear group GC is fGz, it is preferable that the zoom lens satisfies Conditional Expression (10). By not allowing the corresponding value of Conditional Expression (10) to be equal to or less than the lower limit, the refractive power of the first lens group G1 is prevented from becoming excessively strong. Therefore, it is easy to suppress fluctuation in aberrations during zooming. In a lens system as in the example of FIG. 1, the front group GA for the zooming action often has a strong negative refractive power. In such a case, the combined refractive power of the first lens group G1 and the front group GA is likely to be negative. As a result, the entire lens system is likely to be a retrofocus type. By not allowing the corresponding value of Conditional Expression (10) to be equal to or less than the lower limit, the positive refractive power of the lens group closest to the image side in the rear group GC is prevented from becoming excessively weak. Therefore, in such a retrofocus type lens system as described above, it is easy to ensure the back focal length. By not allowing the corresponding value of Conditional Expression (10) to be equal to or greater than the upper limit, the refractive power of the first lens group G1 is prevented from becoming excessively weak. Therefore, it is easy to achieve reduction in size of the first lens group G1. Alternatively, by not allowing the corresponding value of Conditional Expression (10) to be equal to or greater than the upper limit, the positive refractive power of the lens group closest to the image side in the rear group GC is prevented from becoming excessively strong. Therefore, it is easy to suppress fluctuation in aberrations during zooming and fluctuation in aberrations during focusing. In order to obtain more favorable characteristics, it is more preferable that the zoom lens satisfies Conditional Expression (10-1), and it is yet more preferable that the zoom lens satisfies Conditional Expression (10-2).

$$0.1<f1/fGz<3 \quad (10)$$

$$0.4<f1/fGz<2 \quad (10\text{-}1)$$

$$0.8<f1/fGz<1.5 \quad (10\text{-}2)$$

It is preferable that the zoom lens satisfies Conditional Expression (11). Here, it is assumed that a lateral magnification of the middle group GB in a state in which the infinite distance object is in focus at the wide angle end is βBw and a lateral magnification of the middle group GB in a state in which the infinite distance object is in focus at the telephoto end is βBt. Further, it is assumed that a focal length of the zoom lens in a state in which the infinite distance object is in focus at the wide angle end is fw, and a focal length of the zoom lens in a state in which the infinite distance object is in focus at the telephoto end is ft. By not allowing the corresponding value of Conditional Expression (11) to be equal to or less than the lower limit, there is an advantage in increasing the zooming efficiency of the middle group GB. Therefore, it is easy to achieve both high magnification and reduction in size. By not allowing the corresponding value of Conditional Expression (11) to be equal to or greater than the upper limit, the zooming efficiency of the middle group GB is prevented from becoming excessively high. Therefore, it is easy to suppress fluctuation in aberrations during zooming. In order to obtain more favorable characteristics, it is more preferable that the zoom lens satisfies Conditional Expression (11-1), and it is yet more preferable that the zoom lens satisfies Conditional Expression (11-2).

$$0.2<(\beta Bt/\beta Bw)/(ft/fw)<1.55 \quad (11)$$

$$0.25<(\beta Bt/\beta Bw)/(ft/fw)<0.6 \quad (11\text{-}1)$$

$$0.3<(\beta Bt/\beta Bw)/(ft/fw)<0.5 \quad (11\text{-}2)$$

Assuming that a lateral magnification of the lens group closest to the image side in the rear group GC in a state in which the infinite distance object is in focus at the wide angle end is βGzw, it is preferable that the zoom lens satisfies Conditional Expression (12). By not allowing the corresponding value of Conditional Expression (12) to be equal to or less than the lower limit, the lateral magnification of the lens group closest to the image side in the rear group GC is prevented from becoming excessively small. Therefore, the aberration correction effect in the lens group is favorable. As a result, it is easy to achieve high performance By not allowing the corresponding value of Conditional Expression (12) to be equal to or greater than the upper limit, the lateral magnification of the lens group closest to the image side in the rear group GC is prevented from becoming excessively large. As a result, it is easy to suppress fluctuation in aberrations during zooming and fluctuation in aberrations during focusing. In order to obtain more favorable characteristics, it is more preferable that the zoom lens satisfies Conditional Expression (12-1), and it is yet more preferable that the zoom lens satisfies Conditional Expression (12-2).

$$0.2<\beta Gzw<0.9 \quad (12)$$

$$0.3<\beta Gzw<0.8 \quad (12\text{-}1)$$

$$0.4<\beta Gzw<0.7 \quad (12\text{-}2)$$

Assuming that a curvature radius of a lens surface closest to the object side in a lens group closest to the image side in the rear group GC is Rzf and a curvature radius of a lens surface closest to the image side in a lens group which is second from the image side of the rear group GC is Ryr, it is preferable that the zoom lens satisfies Conditional Expression (13). By not allowing the corresponding value of Conditional Expression (13) to be equal to or less than the lower limit, it is possible to suppress occurrence of spherical aberration on the lens surface closest to the image side in the lens group which is second from the image side of the rear group GC. As a result, it is easy to suppress fluctuation in aberrations during zooming. By not allowing the corresponding value of Conditional Expression (13) to be equal to or greater than the upper limit, it is possible to suppress occurrence of astigmatism in the lens group closest to the image side in the rear group GC. Therefore, it is easy to suppress fluctuation in aberrations during zooming. In order to obtain more favorable characteristics, it is more preferable that the zoom lens satisfies Conditional Expression (13-1), and it is yet more preferable that the zoom lens satisfies Conditional Expression (13-2).

$$0.5<(Rzf+Ryr)/(Rzf-Ryr)<2 \quad (13)$$

$$0.58<(Rzf+Ryr)/(Rzf-Ryr)<1.15 \quad (13\text{-}1)$$

$$0.65<(Rzf+Ryr)/(Rzf-Ryr)<0.95 \quad (13\text{-}2)$$

Assuming that a refractive index of the first lens of the first lens group G1 at a d line is NL1, it is preferable that the zoom lens satisfies Conditional Expression (14). By not allowing the corresponding value of Conditional Expression (14) to be equal to or less than the lower limit, it is easy to ensure the refractive power of the first lens necessary for correcting the aberration generated in the positive lens constituting the first lens group G1. Therefore, since it is not necessary to reduce the absolute value of the curvature radius of the first lens in order to ensure the refractive power of the first lens, it is possible to suppress an increase in high-order spherical aberration at the telephoto end. As a result, there is an advantage in achieving high performance. In the present specification, the term "high-order" in aberrations means fifth order or higher. As the refractive index increases, the specific gravity generally increases and the Abbe number decreases. Therefore, by not allowing the corresponding value of Conditional Expression (14) to be equal to or greater than the upper limit, it is possible to suppress an increase in weight of the first lens having a large lens diameter. As a result, it is easy to achieve reduction in weight, and there is an advantage in correcting lateral chromatic aberration at the wide angle end. In order to obtain more favorable characteristics, it is more preferable that the zoom lens satisfies Conditional Expression (14-1), and it is yet more preferable that the zoom lens satisfies Conditional Expression (14-2).

$$1.7 < NL1 < 2.02 \tag{14}$$

$$1.75 < NL1 < 1.95 \tag{14-1}$$

$$1.82 < NL1 < 1.93 \tag{14-2}$$

Assuming that an Abbe number of the first lens of the first lens group G1 based on the d line is vL1, it is preferable that the zoom lens satisfies Conditional Expression (15). By not allowing the corresponding value of Conditional Expression (15) to be equal to or less than the lower limit, it is possible to prevent longitudinal chromatic aberration at the telephoto end from being excessively corrected. Alternatively, by not allowing the corresponding value of Conditional Expression (15) to be equal to or less than the lower limit, the difference in the Abbe number between the positive lens and the negative lens constituting the first lens group G1 is prevented from becoming excessively large. Therefore, it is possible to prevent the refractive power of the first lens from weakening. As a result, it is easy to correct lateral chromatic aberration at the wide angle end. By not allowing the corresponding value of Conditional Expression (15) to be equal to or greater than the upper limit, it is possible to prevent longitudinal chromatic aberration at the telephoto end from being insufficiently corrected. Alternatively, by not allowing the corresponding value of Conditional Expression (15) to be equal to or greater than the upper limit, the difference in the Abbe number between the positive lens and the negative lens constituting the first lens group G1 is prevented from becoming excessively small. Therefore, it is possible to suppress an increase in refractive power of each lens constituting the first lens group G1. As a result, it is possible to suppress an increase in high-order spherical aberration at the telephoto end. As a result, there is an advantage in achieving high performance. In order to obtain more favorable characteristics, it is more preferable that the zoom lens satisfies Conditional Expression (15-1), and it is yet more preferable that the zoom lens satisfies Conditional Expression (15-2).

$$15 < vL1 < 45 \tag{15}$$

$$20 < vL1 < 40 \tag{15-1}$$

$$25 < vL1 < 35 \tag{15-2}$$

Assuming that a refractive index of the first lens of the first lens group G1 at the d line is NL1 and an Abbe number of the first lens of the first lens group G1 based on the d line is vL1, it is preferable that the zoom lens satisfies Conditional Expression (16). By not allowing the corresponding value of Conditional Expression (16) to be equal to or less than the lower limit, the first lens can be configured without using a material having a low refractive index and a low Abbe number. As a result, there is an advantage in correcting lateral chromatic aberration at the wide angle end. By not allowing the corresponding value of Conditional Expression (16) to be equal to or greater than the upper limit, the first lens can be configured without using a material having a high refractive index and a high Abbe number. Therefore, it is possible to suppress an increase in specific gravity. As a result, it is easy to achieve reduction in weight. Alternatively, by not allowing the corresponding value of Conditional Expression (16) to be equal to or greater than the upper limit, the difference in the Abbe number between the positive lens and the negative lens constituting the first lens group G1 is prevented from becoming excessively small. Therefore, it is possible to suppress an increase in refractive power of each lens constituting the first lens group G1. As a result, there is an advantage in correcting high-order spherical aberration at the telephoto end. In order to obtain more favorable characteristics, it is more preferable that the zoom lens satisfies Conditional Expression (16-1), and it is yet more preferable that the zoom lens satisfies Conditional Expression (16-2).

$$2 < NL1 + 0.01 \times vL1 < 3 \tag{16}$$

$$2.09 < NL1 + 0.01 \times vL1 < 2.5 \tag{16-1}$$

$$2.1 < NL1 + 0.01 \times vL1 < 2.2 \tag{16-2}$$

It is more preferable that the zoom lens satisfies Conditional Expressions (14), (15), and (16) at the same time. In order to obtain more favorable characteristics, it is yet more preferable that the zoom lens satisfies Conditional Expressions (14), (15), and (16) at the same time, and then satisfies at least one of Conditional Expressions (14-1), (14-2), (15-1), (15-2), (16-1), and (16-2).

It is preferable that a positive lens is disposed closest to the image side in the first lens group G1. In such a case, the height of the ray incident on the front group GA from the optical axis Z becomes lower. As a result, there is an advantage in suppressing fluctuation in aberrations during zooming. In the configuration in which the positive lens is disposed closest to the image side in the first lens group G1, assuming that a refractive index of the positive lens closest to the image side in the first lens group G1 at the d line is N1z, it is preferable that the zoom lens satisfies Conditional Expression (17). By not allowing the corresponding value of Conditional Expression (17) to be equal to or less than the lower limit, it is easy to ensure the positive refractive power necessary for reduction in size of the first lens group G1. Therefore, since it is not necessary to reduce the absolute value of the curvature radius of the positive lens constituting the first lens group G1 in order to ensure the positive refractive power, it is possible to suppress an increase of high-order spherical aberration at the telephoto end. As a result, there is an advantage in achieving high performance or reduction in size of the first lens group G1. As the refractive index increases, the specific gravity generally increases. Therefore, by not allowing the corresponding value of Conditional Expression (17) to be equal to or greater than the upper limit, it is easy to suppress an increase in weight of the positive lens closest to the image side in the first lens group G1. As a result, it is easy to achieve reduction in weight. In order to obtain more favorable characteristics, it is more preferable that the zoom lens satisfies Conditional Expression (17-1), and it is yet more preferable that the zoom lens satisfies Conditional Expression (17-2).

$$1.65 < N1z < 2 \tag{17}$$

$$1.7 < N1z < 1.9 \tag{17-1}$$

$$1.75 < N1z < 1.79 \tag{17-2}$$

In the configuration in which the positive lens is disposed closest to the image side in the first lens group G1, assuming that an Abbe number of the positive lens closest to the image side in the first lens group G1 based on the d line is v1z, it is preferable that the zoom lens satisfies Conditional Expression (18). By not allowing the corresponding value of Conditional Expression (18) to be equal to or less than the lower limit, it is possible to prevent longitudinal chromatic aberration at the telephoto end from being insufficiently corrected. Alternatively, by not allowing the corresponding value of Conditional Expression (18) to be equal to or less than the lower limit, the difference in the Abbe number between the positive lens and the negative lens constituting the first lens group G1 is prevented from becoming excessively small. Therefore, it is possible to suppress an increase in refractive power of each lens constituting the first lens group G1. As a result, it is possible to suppress an increase in high-order spherical aberration at the telephoto end. As a result, there is an advantage in achieving high performance By not allowing the corresponding value of Conditional Expression (18) to be equal to or greater than the upper limit, it is possible to prevent longitudinal chromatic aberration at the telephoto end from being excessively corrected. Alternatively, by not allowing the corresponding value of Conditional Expression (18) to be equal to or greater than the upper limit, the difference in the Abbe number between the positive lens and the negative lens constituting the first lens group G1 is prevented from becoming excessively large. Therefore, it is possible to prevent the refractive power of the first lens from weakening. As a result, it is easy to correct lateral chromatic aberration at the wide angle end. In order to obtain more favorable characteristics, it is more preferable that the zoom lens satisfies Conditional Expression (18-1), and it is yet more preferable that the zoom lens satisfies Conditional Expression (18-2).

$$40 < v1z < 60 \tag{18}$$

$$43 < v1z < 58 \tag{18-1}$$

$$47 < v1z < 52 \tag{18-2}$$

In the configuration in which the positive lens is disposed closest to the image side in the first lens group G1, assuming that a refractive index of a positive lens closest to the image side in the first lens group G1 at the d line is N1z and an Abbe number of a positive lens closest to the image side in the first lens group G1 based on the d line is v1z, it is preferable that the zoom lens satisfies Conditional Expression (19). By not allowing the corresponding value of Conditional Expression (19) to be equal to or less than the lower limit, it is possible to form a positive lens closest to the image side in the first lens group G1 without using a material having a low refractive index and a low Abbe number. Therefore, it is possible to suppress an increase in high-order spherical aberration at the telephoto end. As a result, there is an advantage in achieving high performance. Alternatively, by not allowing the corresponding value of Conditional Expression (19) to be equal to or less than the lower limit, it is possible to prevent longitudinal chromatic aberration at the telephoto end from being insufficiently corrected. By not allowing the corresponding value of Conditional Expression (19) to be equal to or greater than the upper limit, it is possible to form a positive lens closest to the image side in the first lens group G1 without using a material having a high refractive index and a high Abbe number. Therefore, it is possible to suppress an increase in specific gravity, and it is easy to achieve reduction in weight. Alternatively, by not allowing the corresponding value of Conditional Expression (19) to be equal to or greater than the upper limit, it is possible to prevent longitudinal chromatic aberration at the telephoto end from being excessively corrected. In order to obtain more favorable characteristics, it is more preferable that the zoom lens satisfies Conditional Expression (19-1), and it is yet more preferable that the zoom lens satisfies Conditional Expression (19-2).

$$2 < N1z + 0.01 \times v1z < 3 \tag{19}$$

$$2.22 < N1z + 0.01 \times v1z < 2.5 \tag{19-1}$$

$$2.24 < N1z + 0.01 \times v1z < 2.3 \tag{19-2}$$

It is more preferable that the zoom lens satisfies Conditional Expressions (17), (18), and (19) at the same time. In order to obtain more favorable characteristics, it is yet more preferable that the zoom lens satisfies Conditional Expressions (17), (18), and (19) at the same time, and then satisfies at least one of Conditional Expressions (17-1), (17-2), (18-1), (18-2), (19-1), and (19-2).

In the configuration in which the positive lens is disposed closest to the image side in the first lens group G1, assuming that an Abbe number of a positive lens closest to the image side in the first lens group G1 based on the d line is v1z, and an Abbe number of the first lens of the first lens group G1 based on the d line is vL1, it is preferable that the zoom lens satisfies Conditional Expression (20). By not allowing the corresponding value of Conditional Expression (20) to be equal to or less than the lower limit, the difference in the Abbe number between the positive lens and the negative lens constituting the first lens group G1 is prevented from becoming excessively small. Therefore, it is possible to suppress an increase in refractive power of each lens constituting the first lens group G1. As a result, it is possible to suppress an increase in high-order spherical aberration at the telephoto end. As a result, there is an advantage in achieving high performance. By not allowing the corresponding value of Conditional Expression (20) to be equal to or greater than the upper limit, the difference in the Abbe number between the positive lens and the negative lens constituting the first lens group G1 is prevented from becoming excessively large. Therefore, it is possible to prevent the refractive power of the first lens from weakening. As a result, it is easy to correct lateral chromatic aberration at the wide angle end. In order to obtain more favorable characteristics, it is more preferable that the zoom lens satisfies Conditional Expression (20-1), and it is yet more preferable that the zoom lens satisfies Conditional Expression (20-2).

$$7 < v1z - vL1 < 40 \tag{20}$$

$$15 < v1z - vL1 < 32 \tag{20-1}$$

$$20 < v1z - vL1 < 30 \tag{20-2}$$

In the configuration in which the positive lens is disposed closest to the image side in the first lens group G1, assuming that a refractive index of a positive lens closest to the image side in the first lens group G1 at the d line is N1z, and a refractive index of the first lens of the first lens group G1 at the d line is NL1, it is preferable that the zoom lens satisfies Conditional Expression (21). By not allowing the corresponding value of Conditional Expression (21) to be equal to or less than the lower limit, it is possible to suppress that the refractive index of the first lens becomes relatively low. Therefore, it is easy to achieve reduction in size of the first lens group G1. By not allowing the corresponding value of Conditional Expression (21) to be equal to or greater than the upper limit, it is possible to prevent the refractive index of the positive lens closest to the image side in the first lens group G1 from becoming relatively low. Therefore, it is easy to achieve reduction in size. Alternatively, by not allowing the corresponding value of Conditional Expression (21) to be equal to or greater than the upper limit, the absolute value of the curvature radius of the positive lens constituting the first lens group G1 does not have to be reduced. Therefore, it is possible to suppress an increase of high-order spherical aberration at the telephoto end. As a result, there is an advantage in achieving high performance. In order to obtain more favorable characteristics, it is more preferable that the zoom lens satisfies Conditional Expression (21-1), and it is yet more preferable that the zoom lens satisfies Conditional Expression (21-2).

$$0.02 < NL1 - N1z < 0.4 \quad (21)$$

$$0.1 < NL1 - N1z < 0.2 \quad (21\text{-}1)$$

$$0.12 < NL1 - N1z < 0.18 \quad (21\text{-}2)$$

In the configuration in which the positive lens is disposed closest to the image side in the first lens group G1, assuming that a focal length of the first lens group G1 is f1 and a focal length of the positive lens closest to the image side in the first lens group G1 is f1z, it is preferable that the zoom lens satisfies Conditional Expression (22). By not allowing the corresponding value of Conditional Expression (22) to be equal to or less than the lower limit, the refractive power of the positive lens closest to the image side in the first lens group G1 is prevented from becoming excessively weak. Therefore, it is easy to achieve reduction in size. By not allowing the corresponding value of Conditional Expression (22) to be equal to or greater than the upper limit, the refractive power of the positive lens closest to the image side in the first lens group G1 is prevented from becoming excessively strong. Therefore, it is possible to suppress an increase in high-order spherical aberration at the telephoto end. As a result, there is an advantage in achieving high performance. In order to obtain more favorable characteristics, it is more preferable that the zoom lens satisfies Conditional Expression (22-1), and it is yet more preferable that the zoom lens satisfies Conditional Expression (22-2).

$$0.5 < f1/f1z < 1.5 \quad (22)$$

$$0.71 < f1/f1z < 0.85 \quad (22\text{-}1)$$

$$0.72 < f1/f1z < 0.8 \quad (22\text{-}2)$$

It is preferable that the lens group closest to the image side in the front group GA includes a positive lens and a negative lens, successively in order from the object side to the image side. In such a case, it is easy to suppress fluctuation in aberrations during zooming. As a result, there is an advantage in achieving high performance.

In a configuration in which the lens group closest to the image side in the front group GA includes a positive lens and a negative lens successively in order from the object side to the image side, assuming that Abbe numbers of the positive lens and the negative lens of the lens group closest to the image side in the front group GA based on the d line are respectively vAp and vAn, it is preferable that the zoom lens satisfies Conditional Expression (23). By not allowing the corresponding value of Conditional Expression (23) to be equal to or less than the lower limit, it is possible to prevent chromatic aberration in the front group GA from being insufficiently corrected. Alternatively, by not allowing the corresponding value of Conditional Expression (23) to be equal to or less than the lower limit, the refractive power of each lens is prevented from becoming excessively strong. As a result, it is possible to suppress fluctuation in spherical aberration during zooming. As a result, there is an advantage in achieving high performance By not allowing the corresponding value of Conditional Expression (23) to be equal to or greater than the upper limit, it is possible to prevent chromatic aberration in the front group GA from being excessively corrected. In order to obtain more favorable characteristics, it is more preferable that the zoom lens satisfies Conditional Expression (23-1), and it is yet more preferable that the zoom lens satisfies Conditional Expression (23-2).

$$8 < vAn - vAp < 30 \quad (23)$$

$$10 < vAn - vAp < 25 \quad (23\text{-}1)$$

$$15 < vAn - vAp < 20 \quad (23\text{-}2)$$

In a configuration in which the lens group closest to the image side in the front group GA includes a positive lens and a negative lens successively in order from the object side to the image side, it is preferable that the zoom lens satisfies Conditional Expression (24). Here, it is assumed that a curvature radius of an image side surface of the positive lens of the lens group closest to the image side in the front group GA is RApr and a curvature radius of an object side surface of the negative lens of the lens group closest to the image side in the front group GA is RAnf. By not allowing the corresponding value of Conditional Expression (24) to be equal to or less than the lower limit, it is possible to suppress occurrence of high-order spherical aberration on the wide angle side. Therefore, it is easy to suppress fluctuation in aberrations during zooming. By not allowing the corresponding value of Conditional Expression (24) to be equal to or greater than the upper limit, it is possible to suppress occurrence of astigmatism on the wide angle side. Therefore, it is easy to suppress fluctuation in aberrations during zooming. In order to obtain more favorable characteristics, it is more preferable that the zoom lens satisfies Conditional Expression (24-1), and it is yet more preferable that the zoom lens satisfies Conditional Expression (24-2).

$$-9 < (RAnf + RApr)/(RAnf - RApr) < -3 \quad (24)$$

$$-7 < (RAnf + RApr)/(RAnf - RApr) < -4 \quad (24\text{-}1)$$

$$-6.5 < (RAnf + RApr)/(RAnf - RApr) < -5 \quad (24\text{-}2)$$

Assuming that a focal length of the first lens group G1 is f1 and a focal length of the first lens of the first lens group G1 is fL1, it is preferable that the zoom lens satisfies Conditional Expression (25). By not allowing the corresponding value of Conditional Expression (25) to be equal to or less than the lower limit, the refractive power of the first lens is prevented from becoming excessively strong.

Therefore, it is easy to suppress high-order aberrations at the telephoto end. Alternatively, by not allowing the corresponding value of Conditional Expression (25) to be equal to or less than the lower limit, the refractive power of the first lens group G1 is prevented from becoming excessively weak. Therefore, it is easy to achieve reduction in size of the first lens group G1. By not allowing the corresponding value of Conditional Expression (25) to be equal to or greater than the upper limit, the refractive power of the first lens group G1 is prevented from becoming excessively strong. Therefore, it is easy to suppress fluctuation in aberrations during zooming. Alternatively, by not allowing the corresponding value of Conditional Expression (25) from becoming greater than or equal to the upper limit, the refractive power of the first lens is prevented from becoming excessively weak. Therefore, it is easy to suppress longitudinal chromatic aberration at the telephoto end. In order to obtain more favorable characteristics, it is more preferable that the zoom lens satisfies Conditional Expression (25-1), and it is yet more preferable that the zoom lens satisfies Conditional Expression (25-2).

$$-0.95 < f1/fL1 < -0.3 \tag{25}$$

$$-0.75 < f1/fL1 < -0.35 \tag{25-1}$$

$$-0.55 < f1/fL1 < -0.4 \tag{25-2}$$

Assuming that a focal length of the first lens group G1 is f1 and a focal length of the zoom lens in a state in which the infinite distance object is in focus at the wide angle end is fw, it is preferable that the zoom lens satisfies Conditional Expression (26). By not allowing the corresponding value of Conditional Expression (26) to be equal to or less than the lower limit, the refractive power of the first lens group G1 is prevented from becoming excessively strong. Therefore, it is easy to suppress fluctuation in aberrations during zooming. By not allowing the corresponding value of Conditional Expression (26) to be equal to or greater than the upper limit, the refractive power of the first lens group G1 is prevented from becoming excessively weak. Therefore, it is easy to achieve reduction in size of the first lens group G1. In order to obtain more favorable characteristics, it is more preferable that the zoom lens satisfies Conditional Expression (26-1), and it is yet more preferable that the zoom lens satisfies Conditional Expression (26-2).

$$2 < f1/fw < 5 \tag{26}$$

$$3 < f1/fw < 4 \tag{26-1}$$

$$0.2 < f1/fw < 3.7 \tag{26-2}$$

Assuming that a focal length of the first lens group G1 is f1, a focal length of the zoom lens in a state in which the infinite distance object is in focus at the wide angle end is fw, and a focal length of the zoom lens in a state in which the infinite distance object is in focus at the telephoto end is ft, it is preferable that the zoom lens satisfies Conditional Expression (27). By not allowing the corresponding value of Conditional Expression (27) to be equal to or less than the lower limit, the refractive power of the first lens group G1 is prevented from becoming excessively strong. Therefore, it is easy to suppress fluctuation in aberrations during zooming. By not allowing the corresponding value of Conditional Expression (27) to be equal to or greater than the upper limit, the refractive power of the first lens group G1 is prevented from becoming excessively weak. Therefore, it is easy to achieve reduction in size of the first lens group G1. In order to obtain more favorable characteristics, it is more preferable that the zoom lens satisfies Conditional Expression (27-1), and it is yet more preferable that the zoom lens satisfies Conditional Expression (27-2).

$$0.7 < f1/(fw \times ft)^{1/2} < 2.7 \tag{27}$$

$$1 < f1/(fw \times ft)^{1/2} < 1.7 \tag{27-1}$$

$$1.3 < f1/(fw \times ft)^{1/2} < 1.5 \tag{27-2}$$

In a configuration in which the middle group GB has a positive refractive power, assuming that a focal length of the middle group GB is fB and a focal length of the lens group closest to the image side in the rear group GC is fGz, it is preferable that the zoom lens satisfies Conditional Expression (28). By not allowing the corresponding value of Conditional Expression (28) to be equal to or less than the lower limit, the refractive power of the middle group GB is prevented from becoming excessively strong. Therefore, it is easy to suppress fluctuation in aberrations during zooming. Alternatively, by not allowing the corresponding value of Conditional Expression (28) to be equal to or less than the lower limit, the refractive power of the lens group closest to the image side in the rear group GC is prevented from becoming excessively weak. Therefore, it is possible to ensure the effect of correcting distortion and lateral chromatic aberration. As a result, there is an advantage in achieving high performance By not allowing the corresponding value of Conditional Expression (28) to be equal to or greater than the upper limit, the refractive power of the middle group GB is prevented from becoming excessively weak. Therefore, it is easy to achieve reduction in size of the stop unit. Alternatively, by not allowing the corresponding value of Conditional Expression (28) to be equal to or greater than the upper limit, the refractive power of the lens group closest to the image side in the rear group GC is prevented from becoming excessively strong. Therefore, the effect of correcting distortion and lateral chromatic aberration can be prevented from becoming excessive. As a result, there is an advantage in achieving high performance. In order to obtain more favorable characteristics, it is more preferable that the zoom lens satisfies Conditional Expression (28-1), and it is yet more preferable that the zoom lens satisfies Conditional Expression (28-2).

$$0.1 < fB/fGz < 1 \tag{28}$$

$$0.2 < fB/fGz < 0.5 \tag{28-1}$$

$$0.25 < fB/fGz < 0.4 \tag{28-2}$$

Assuming that a focal length of the front group GA in a state in which the infinite distance object is in focus at the wide angle end is fAw and a focal length of the zoom lens in a state in which the infinite distance object is in focus at the wide angle end is fw, it is preferable that the zoom lens satisfies Conditional Expression (29). By not allowing the corresponding value of Conditional Expression (29) to be equal to or less than the lower limit, the refractive power of the front group GA is prevented from becoming excessively weak. Therefore, it is possible to minimize the amount of movement of the lens group in the front group GA during zooming. As a result, it is easy to achieve reduction in size. By not allowing the corresponding value of Conditional Expression (29) to be equal to or greater than the upper limit, the refractive power of the front group GA is prevented from becoming excessively strong. Therefore, it is easy to suppress fluctuation in aberrations during zooming. In order to obtain more favorable characteristics, it is more preferable that the zoom lens satisfies Conditional Expression (29-1), and it is yet more preferable that the zoom lens satisfies Conditional Expression (29-2).

$$-1<fAw/fw<-0.3 \quad (29)$$

$$-0.8<fAw/fw<-0.5 \quad (29\text{-}1)$$

$$-0.7<fAw/fw<-0.6 \quad (29\text{-}2)$$

It is preferable that the zoom lens satisfies Conditional Expression (30). Here, it is assumed that a lateral magnification of the front group GA in a state in which the infinite distance object is in focus at the wide angle end is βAw and a lateral magnification of the front group GA in a state in which the infinite distance object is in focus at the telephoto end is βAt. Further, it is assumed that a focal length of the zoom lens in a state in which the infinite distance object is in focus at the wide angle end is fw, and a focal length of the zoom lens in a state in which the infinite distance object is in focus at the telephoto end is ft. By not allowing the corresponding value of Conditional Expression (30) to be equal to or less than the lower limit, the zooming efficiency of the front group GA can be increased. As a result, there is an advantage in achieving both high magnification and reduction in size. By not allowing the corresponding value of Conditional Expression (30) to be equal to or greater than the upper limit, the zooming efficiency of the front group GA is prevented from becoming excessively high. Therefore, it is easy to suppress fluctuation in aberrations during zooming. In order to obtain more favorable characteristics, it is more preferable that the zoom lens satisfies Conditional Expression (30-1), and it is yet more preferable that the zoom lens satisfies Conditional Expression (30-2).

$$0.3<(\beta At/\beta Aw)/(ft/fw)<0.8 \quad (30)$$

$$0.4<(\beta At/\beta Aw)/(ft/fw)<0.6 \quad (30\text{-}1)$$

$$0.45<(\beta At/\beta Aw)/(ft/fw)<0.5 \quad (30\text{-}2)$$

It is preferable that the zoom lens satisfies Conditional Expression (31). Here, it is assumed that a distance on the optical axis from the lens surface closest to the object side in the first lens group G1 to the paraxial entrance pupil position Pe in a state in which the infinite distance object is in focus at the wide angle end is enp. Further, it is assumed that a focal length of the zoom lens in a state in which the infinite distance object is in focus at the wide angle end is fw, and a focal length of the zoom lens in a state in which the infinite distance object is in focus at the telephoto end is ft. By not allowing the corresponding value of Conditional Expression (31) to be equal to or less than the lower limit, the above-mentioned distance enp is prevented from becoming excessively short. Therefore, it is easy to suppress fluctuation in aberrations during zooming. By not allowing the corresponding value of Conditional Expression (31) to be equal to or greater than the upper limit, there is an advantage in shortening the distance enp. Therefore, it is possible to suppress an increase in diameter of the first lens group G1. As a result, it is easy to achieve reduction in size. In order to obtain more favorable characteristics, it is more preferable that the zoom lens satisfies Conditional Expression (31-1), and it is yet more preferable that the zoom lens satisfies Conditional Expression (31-2).

$$0.3<enp/(fw \times ft)^{1/2}<1 \quad (31)$$

$$0.5<enp/(fw \times ft)^{1/2}<0.7 \quad (31\text{-}1)$$

$$0.55<enp/(fw \times ft)^{1/2}<0.6 \quad (31\text{-}2)$$

It is preferable that the zoom lens satisfies Conditional Expression (32). Here, it is assumed that a distance on the optical axis from the lens surface closest to the object side in the first lens group G1 to the aperture stop St in a state in which the infinite distance object is in focus at the wide angle end is DDG1STw. Further, it is assumed that a sum of a back focal length of the zoom lens at an air-equivalent distance and a distance on the optical axis from the lens surface closest to the object side in the first lens group G1 to a lens surface closest to the image side in the rear group GC in a state in which the infinite distance object is in focus at the wide angle end is TLw. By not allowing the corresponding value of Conditional Expression (32) to be equal to or less than the lower limit, the distance between the aperture stop St and the first lens group G1 is prevented from becoming excessively short. Therefore, the distance from the lens surface closest to the object side in the first lens group G1 to the entrance pupil position can be prevented from becoming excessively short. As a result, it is easy to suppress fluctuation in aberrations during zooming. By not allowing the corresponding value of Conditional Expression (32) to be equal to or greater than the upper limit, the distance between the aperture stop St and the first lens group G1 is prevented from becoming excessively long. Therefore, the distance from the lens surface closest to the object side in the first lens group G1 to the entrance pupil position can be prevented from becoming excessively long. As a result, it is possible to suppress an increase in diameter of the first lens group G1. As a result, it is easy to achieve reduction in size. In order to obtain more favorable characteristics, it is more preferable that the zoom lens satisfies Conditional Expression (32-1).

$$0.2<DDG1STw/TLw<0.6 \quad (32)$$

$$0.4<DDG1STw/TLw<0.5 \quad (32\text{-}1)$$

Assuming that an open opening diameter of the aperture stop St in a state in which the infinite distance object is in focus at the wide angle end is STw and an open opening diameter of the aperture stop St in a state in which the infinite distance object is in focus at the telephoto end is STt, it is preferable that the zoom lens satisfies Conditional Expression (33). In the present specification, the term "open opening diameter of the aperture stop St" means the diameter of the opening portion of the aperture stop St in the open stop state. By not allowing the corresponding value of Conditional Expression (33) to be equal to or less than the lower limit, the difference in open opening diameter between the wide angle end and the telephoto end is prevented from becoming excessively large. Therefore, it is easy to achieve reduction in size of the stop unit. By not allowing the corresponding value of Conditional Expression (33) to be equal to or greater than the upper limit, the difference in the open opening diameter between the wide angle end and the telephoto end is prevented from becoming excessively small. As a result, it is easy to minimize change in the F number between the wide angle end and the telephoto end. In order to obtain more favorable characteristics, it is more preferable that the zoom lens satisfies Conditional Expression (33-1), and it is yet more preferable that the zoom lens satisfies Conditional Expression (33-2).

$$0.6<STw/STt<1 \quad (33)$$

$$0.7<STw/STt<0.95 \quad (33\text{-}1)$$

$$0.8<STw/STt<0.9 \quad (33\text{-}2)$$

Assuming that an effective diameter of the lens surface closest to the object side in the first lens group G1 is ED1 and an effective diameter of a lens surface closest to the image side in the rear group GC is EDz, it is preferable that the zoom lens satisfies Conditional Expression (34). By not allowing the corresponding value of Conditional Expression (34) to be equal to or less than the lower limit, the diameter of the first lens is prevented from becoming excessively small Therefore, it is easy to ensure the peripheral light amount ratio at the maximum image height. Alternatively, by not allowing the corresponding value of Conditional Expression (34) to be equal to or less than the lower limit, the diameter of the first lens is prevented from becoming excessively small. Therefore, in order to reduce the diameter of the first lens, the refractive powers of the first lens group G1 and the front group GA do not have to be strong. As a result, it is easy to suppress fluctuation in aberrations during zooming. By not allowing the corresponding value of Conditional Expression (34) to be equal to or greater than the upper limit, the diameter of the first lens is prevented from becoming excessively large. Therefore, it is easy to achieve reduction in size. In order to obtain more favorable characteristics, it is more preferable that the zoom lens satisfies Conditional Expression (34-1), and it is yet more preferable that the zoom lens satisfies Conditional Expression (34-2).

$$1.5 < ED1/EDz < 3 \quad (34)$$

$$1.8 < ED1/EDz < 2.5 \quad (34\text{-}1)$$

$$1.9 < ED1/EDz < 2.1 \quad (34\text{-}2)$$

It is preferable that the middle group GB includes at least one positive lens. In a configuration in which the middle group GB includes at least one positive lens, assuming that an average value of Abbe numbers of all positive lenses of the middle group GB based on the d line is vBpave, it is preferable that the zoom lens satisfies Conditional Expression (35). By not allowing the corresponding value of Conditional Expression (35) to be equal to or less than the lower limit, it is possible to prevent longitudinal chromatic aberration at the wide angle end from being insufficiently corrected. As a result, there is an advantage in achieving high performance. By not allowing the corresponding value of Conditional Expression (35) to be equal to or greater than the upper limit, it is possible to prevent longitudinal chromatic aberration at the wide angle end from being excessively corrected. As a result, there is an advantage in achieving high performance. In order to obtain more favorable characteristics, it is more preferable that the zoom lens satisfies Conditional Expression (35-1).

$$60 < vBpave < 82 \quad (35)$$

$$70 < vBpave < 80 \quad (35\text{-}1)$$

It is preferable that the rear group GC includes a focusing group, and it is preferable that the focusing group included in the rear group GC includes at least one positive lens and at least one negative lens. By including at least one positive lens and at least one negative lens of the focusing group, it is easy to suppress fluctuation in aberrations during zooming and fluctuation in aberrations during focusing. Therefore, there is an advantage in achieving high performance.

In a configuration in which the rear group GC includes a focusing group and the focusing group includes at least one positive lens and at least one negative lens, assuming that an average value of Abbe numbers of all positive lenses of the focusing group based on the d line is vGFpave and an average value of Abbe numbers of all negative lenses of the focusing group based on the d line is vGFnave, it is preferable that the zoom lens satisfies Conditional Expression (36). By not allowing the corresponding value of Conditional Expression (36) to be equal to or less than the lower limit, the difference in the Abbe numbers between the positive lens and the negative lens constituting the focusing group is prevented from becoming excessively small. Therefore, the absolute value of the curvature radius of each lens does not have to be small. As a result, it is possible to suppress an increase in high-order spherical aberration. As a result, there is an advantage in achieving high performance. By not allowing the corresponding value of Conditional Expression (36) to be equal to or greater than the upper limit, the difference in the Abbe numbers between the positive lens and the negative lens constituting the focusing group is prevented from becoming excessively large. As a result, it is easy to suppress fluctuation in longitudinal chromatic aberration during focusing. In order to obtain more favorable characteristics, it is more preferable that the zoom lens satisfies Conditional Expression (36-1).

$$11 < vGFnave - vGFpave < 30 \quad (36)$$

$$20 < vGFnave - vGFpave < 25 \quad (36\text{-}1)$$

In a configuration in which the rear group GC includes a focusing group and the focusing group includes at least one positive lens and at least one negative lens, assuming that an average value of refractive indexes of all positive lenses of the focusing group at the d line is NGFpave and an average value of refractive indexes of all negative lenses of the focusing group at the d line is NGFnave, it is preferable that the zoom lens satisfies Conditional Expression (37). By not allowing the corresponding value of Conditional Expression (37) to be equal to or less than the lower limit, the difference in the refractive index between the positive lens and the negative lens constituting the focusing group is prevented from becoming excessively large. Therefore, the refractive index of the negative lens is prevented from becoming excessively low. Thus, the absolute value of the curvature radius of the negative lens does not have to be small. As a result, it is possible to suppress an increase in high-order spherical aberration. As a result, there is an advantage in achieving high performance By not allowing the corresponding value of Conditional Expression (37) to be equal to or greater than the upper limit, the difference in the refractive index between the positive lens and the negative lens constituting the focusing group is prevented from becoming excessively small. Therefore, it is easy to correct the Petzval sum. In order to obtain more favorable characteristics, it is more preferable that the zoom lens satisfies Conditional Expression (37-1).

$$-0.2 < NGFnave - NGFpave < -0.01 \quad (37)$$

$$-0.15 < NGFnave - NGFpave < -0.08 \quad (37\text{-}1)$$

Assuming that a refractive index of the second lens of the first lens group G1 at the d line is NL2, it is preferable that the zoom lens satisfies Conditional Expression (38). By not allowing the corresponding value of Conditional Expression (38) to be equal to or less than the lower limit, it is easy to ensure the positive refractive power necessary for reduction in size of the first lens group G1. Therefore, since it is not necessary to reduce the absolute value of the curvature radius of the positive lens constituting the first lens group G1 in order to ensure the positive refractive power, it is possible to suppress an increase of high-order spherical aberration at the telephoto end. As a result, there is an advantage in achieving high performance or reduction in size of the first lens group G1. Assuming that a refractive index is high, the specific gravity is generally heavy. Therefore, by not allowing the corresponding value of Conditional Expression (38) to be equal to or greater than the upper limit, it is possible to suppress an increase in weight of the second lens. As a result, it is easy to achieve reduction in weight. In order to obtain more favorable characteristics, it is more preferable that the zoom lens satisfies Conditional Expression (38-1), and it is yet more preferable that the zoom lens satisfies Conditional Expression (38-2).

$$1.495 < NL2 < 1.56 \quad (38)$$

$$1.5 < NL2 < 1.55 \quad (38\text{-}1)$$

$$1.51 < NL2 < 1.54 \quad (38\text{-}2)$$

Assuming that an Abbe number of the second lens of the first lens group G1 based on the d line is vL2, it is preferable that the zoom lens satisfies Conditional Expression (39). By not allowing the corresponding value of Conditional Expression (39) to be equal to or less than the lower limit, it is possible to prevent longitudinal chromatic aberration at the telephoto end from being insufficiently corrected. Alternatively, by not allowing the corresponding value of Conditional Expression (39) to be equal to or less than the lower limit, the difference in the Abbe number between the positive lens and the negative lens constituting the first lens group G1 is prevented from becoming excessively small. Therefore, it is possible to suppress an increase in refractive power of each lens constituting the first lens group G1. As a result, it is possible to suppress an increase in high-order spherical aberration at the telephoto end. As a result, there is an advantage in achieving high performance By not allowing the corresponding value of Conditional Expression (39) to be equal to or greater than the upper limit, it is possible to prevent longitudinal chromatic aberration at the telephoto end from being excessively corrected. Alternatively, by not allowing the corresponding value of Conditional Expression (39) to be equal to or greater than the upper limit, the difference in the Abbe number between the positive lens and the negative lens constituting the first lens group G1 is prevented from becoming excessively large. Therefore, it is possible to prevent the refractive power of the first lens from weakening. As a result, it is easy to correct lateral chromatic aberration at the wide angle end. In order to obtain more favorable characteristics, it is more preferable that the zoom lens satisfies Conditional Expression (39-1).

$$65 < vL2 < 75 \quad (39)$$

$$68 < vL2 < 73 \quad (39\text{-}1)$$

Assuming that a refractive index of the second lens of the first lens group G1 at the d line is NL2 and an Abbe number of the second lens of the first lens group G1 based on the d line is vL2, it is preferable that the zoom lens satisfies Conditional Expression (40). By not allowing the corresponding value of Conditional Expression (40) to be equal to or less than the lower limit, it is possible to form the second lens without using a material having a low refractive index and a low Abbe number. Therefore, it is possible to suppress an increase in high-order spherical aberration at the telephoto end. As a result, there is an advantage in achieving high performance. Alternatively, by not allowing the corresponding value of Conditional Expression (40) to be equal to or less than the lower limit, it is possible to prevent longitudinal chromatic aberration at the telephoto end from being insufficiently corrected. By not allowing the corresponding value of Conditional Expression (40) to be equal to or greater than the upper limit, it is possible to form the second lens without using a material having a high refractive index and a high Abbe number. Therefore, it is possible to suppress an increase in specific gravity. As a result, it is easy to achieve reduction in weight. Alternatively, by not allowing the corresponding value of Conditional Expression (40) to be equal to or greater than the upper limit, it is possible to prevent longitudinal chromatic aberration at the telephoto end from being excessively corrected. In order to obtain more favorable characteristics, it is more preferable that the zoom lens satisfies Conditional Expression (40-1).

$$2.18 < NL2 + 0.01 \times vL2 < 2.5 \quad (40)$$

$$2.2 < NL2 + 0.01 \times vL2 < 2.4 \quad (40\text{-}1)$$

Assuming that a partial dispersion ratio of the second lens of the first lens group G1 between a g line and an F line is θL2 and an Abbe number of the second lens of the first lens group G1 based on the d line is vL2, it is preferable that the zoom lens satisfies Conditional Expression (41). By not allowing the corresponding value of Conditional Expression (41) to be equal to or less than the lower limit, it is possible to prevent the secondary spectrum of longitudinal chromatic aberration at the telephoto end from being excessively corrected. By not allowing the corresponding value of Conditional Expression (41) to be equal to or greater than the upper limit, it is possible to prevent the secondary spectrum of longitudinal chromatic aberration at the telephoto end from being insufficiently corrected. In order to obtain more favorable characteristics, it is more preferable that the zoom lens satisfies Conditional Expression (41-1).

$$0.645 < \theta L2 + 0.001625 \times vL2 < 0.66 \quad (41)$$

$$0.645 < \theta L2 + 0.001625 \times vL2 < 0.655 \quad (41\text{-}1)$$

Assuming that refractive indexes for the g line, F line, and C line of a certain lens are Ng, NF, and NC, respectively, and the partial dispersion ratios thereof between the g line and the F line of the lens is θgF, θgF is defined by the following expression.

$$\theta gF = (Ng - NF)/(NF - NC)$$

It is more preferable that the zoom lens satisfies Conditional Expressions (38), (39), (40), and (41) at the same time. In order to obtain more favorable characteristics, it is yet more preferable that the zoom lens satisfies Conditional Expressions (38), (39), (40), and (41) at the same time, and then satisfies at least one of Conditional Expressions (38-1), (38-2), (39-1), (40-1), and (41-1).

It is preferable that the front group GA includes two or more negative lenses. By including two or more negative lenses of the front group GA, it is easy to ensure the negative refractive power necessary for zooming. As a result, there is an advantage in suppressing fluctuation in aberrations during zooming.

In a configuration in which the front group GA includes two or more negative lenses, assuming that a refractive index of a negative lens which is second from the object side among negative lenses included in the front group GA at the d line is NA2n, it is preferable that the zoom lens satisfies Conditional Expression (42). By not allowing the corresponding value of Conditional Expression (42) to be equal to or less than the lower limit, the refractive index is prevented from becoming excessively low. Therefore, it is possible to suppress the absolute value of the curvature radius of the lens from becoming small. As a result, it is possible to suppress an increase in high-order spherical aberration at the telephoto end. As a result, there is an advantage in achieving high performance. As the refractive index increases, the Abbe number generally decreases. Therefore, by not allowing the corresponding value of Conditional Expression (42) to be equal to or greater than the upper limit, the Abbe number is prevented from becoming excessively small. Therefore, it is possible to prevent longitudinal chromatic aberration at the telephoto end from being excessively corrected. In order to obtain more favorable characteristics, it is more preferable that the zoom lens satisfies Conditional Expression (42-1).

$$1.72 < NA2n < 1.8 \tag{42}$$

$$1.75 < NA2n < 1.78 \tag{42-1}$$

In a configuration in which the front group GA includes two or more negative lenses, assuming that an Abbe number of a negative lens which is second from the object side among negative lenses included in the front group GA based on the d line is vA2n, it is preferable that the zoom lens satisfies Conditional Expression (43). By not allowing the corresponding value of Conditional Expression (43) to be equal to or less than the lower limit, the Abbe number is prevented from becoming excessively small. Therefore, it is possible to prevent longitudinal chromatic aberration at the telephoto end from being excessively corrected. By not allowing the corresponding value of Conditional Expression (43) to be equal to or greater than the upper limit, the Abbe number is prevented from becoming excessively large. Therefore, it is possible to prevent longitudinal chromatic aberration at the telephoto end from being insufficiently corrected. In order to obtain more favorable characteristics, it is more preferable that the zoom lens satisfies Conditional Expression (43-1).

$$43 < vA2n < 57 \tag{43}$$

$$47 < vA2n < 52 \tag{43-1}$$

In a configuration in which the front group GA includes two or more negative lenses, assuming that a refractive index of a negative lens which is second from the object side among negative lenses included in the front group GA at the d line is NA2n and an Abbe number of a negative lens which is second from the object side among negative lenses included in the front group GA based on the d line is vA2n, it is preferable that the zoom lens satisfies Conditional Expression (44). By not allowing the corresponding value of Conditional Expression (44) to be equal to or less than the lower limit, the refractive index is prevented from becoming excessively low. Therefore, it is possible to suppress the absolute value of the curvature radius of the lens from becoming small. As a result, it is possible to suppress an increase in high-order spherical aberration at the telephoto end. As a result, there is an advantage in achieving high performance. Alternatively, by not allowing the corresponding value of Conditional Expression (44) to be equal to or less than the lower limit, the Abbe number is prevented from becoming excessively small. As a result, it is possible to prevent longitudinal chromatic aberration at the telephoto end from being excessively corrected. By not allowing the corresponding value of Conditional Expression (44) to be equal to or greater than the upper limit, the Abbe number is prevented from becoming excessively large. Therefore, it is possible to prevent longitudinal chromatic aberration at the telephoto end from being insufficiently corrected. In order to obtain more favorable characteristics, it is more preferable that the zoom lens satisfies Conditional Expression (44-1).

$$2.21 < NA2n + 0.01 \times vA2n < 2.37 \tag{44}$$

$$2.24 < NA2n + 0.01 \times vA2n < 2.3 \tag{44-1}$$

In a configuration in which the front group GA includes two or more negative lenses, assuming that a partial dispersion ratio of the negative lens which is second from the object side among the negative lenses included in the front group GA between the g line and the F line is θA2n and an Abbe number of a negative lens which is second from the object side among negative lenses included in the front group GA based on the d line is vA2n, it is preferable that the zoom lens satisfies Conditional Expression (45). By not allowing the corresponding value of Conditional Expression (45) to be equal to or less than the lower limit, it is possible to prevent the secondary spectrum of longitudinal chromatic aberration at the telephoto end from being insufficiently corrected. By not allowing the corresponding value of Conditional Expression (45) to be equal to or greater than the upper limit, it is possible to prevent the secondary spectrum of longitudinal chromatic aberration at the telephoto end from being excessively corrected. In order to obtain more favorable characteristics, it is more preferable that the zoom lens satisfies Conditional Expression (45-1).

$$0.63 < \theta A2n + 0.001625 \times vA2n < 0.66 \tag{45}$$

$$0.636 < \theta A2n + 0.001625 \times vA2n < 0.66 \tag{45-1}$$

In a configuration in which the front group GA includes two or more negative lenses, it is more preferable that the zoom lens satisfies Conditional Expressions (42), (43), (44), and (45) at the same time. In order to obtain more favorable characteristics, it is yet more preferable that the zoom lens satisfies Conditional Expressions (42), (43), (44), and (45) at the same time, and then satisfies at least one of Conditional Expressions (42-1), (43-1), (44-1), and (45-1).

It is preferable that the rear group GC includes a focusing group, and it is preferable that the focusing group included in the rear group GC includes at least one negative lens. In a configuration in which the rear group GC includes a focusing group and the focusing group included in the rear group GC includes at least one negative lens, assuming that a refractive index of a negative lens of the focusing group included in the rear group GC at the d line is NGFn, it is preferable that the zoom lens includes at least one negative lens satisfying Conditional Expression (46). By not allowing the corresponding value of Conditional Expression (46) to be equal to or less than the lower limit, the refractive index is prevented from becoming excessively low. Therefore, it is possible to suppress the absolute value of the curvature radius of the lens from becoming small. As a result, it is possible to suppress an increase in high-order spherical aberration at the wide angle end. As a result, there is an advantage in achieving high performance. As the refractive index increases, the Abbe number generally decreases. Therefore, by not allowing the corresponding value of Conditional Expression (46) to be equal to or greater than the upper limit, the Abbe number is prevented from becoming excessively small Therefore, it is possible to prevent longitudinal chromatic aberration at the wide angle end from being excessively corrected. In order to obtain more favorable characteristics, it is more preferable that the negative lens satisfying Conditional Expression (46) satisfies Conditional Expression (46-1).

$$1.72 < NGFn < 1.8 \tag{46}$$

$$1.75 < NGFn < 1.78 \tag{46-1}$$

In a configuration in which the rear group GC includes a focusing group and the focusing group included in the rear group GC includes at least one negative lens, assuming that an Abbe number of the negative lens of the focusing group based on the d line is vGFn, it is preferable that the zoom lens includes at least one negative lens satisfying Conditional Expression (47). By not allowing the corresponding value of Conditional Expression (47) to be equal to or less than the lower limit, the Abbe number is prevented from becoming excessively small. As a result, it is possible to prevent longitudinal chromatic aberration at the wide angle end from being excessively corrected. By not allowing the corresponding value of Conditional Expression (47) to be equal to or greater than the upper limit, the Abbe number is prevented from becoming excessively large. Therefore, it is possible to prevent longitudinal chromatic aberration at the wide angle end from being insufficiently corrected. In order to obtain more favorable characteristics, it is more preferable that the negative lens satisfying Conditional Expression (47) satisfies Conditional Expression (47-1).

$$43 < vGFn < 57 \tag{47}$$

$$47 < vGFn < 52 \tag{47-1}$$

In a configuration in which the rear group GC includes a focusing group and the focusing group included in the rear group GC includes at least one negative lens, assuming that a refractive index of a negative lens of the focusing group at the d line is NGFn and an Abbe number of the negative lens of the focusing group based on the d line is vGFn, it is preferable that the zoom lens includes at least one negative lens satisfying Conditional Expression (48). By not allowing the corresponding value of Conditional Expression (48) to be equal to or less than the lower limit, the refractive index is prevented from becoming excessively low. Therefore, it is possible to suppress the absolute value of the curvature radius of the lens from becoming small. As a result, it is possible to suppress an increase in high-order spherical aberration at the wide angle end. As a result, there is an advantage in achieving high performance. Alternatively, by not allowing the corresponding value of Conditional Expression (48) to be equal to or less than the lower limit, the Abbe number is prevented from becoming excessively small. As a result, it is possible to prevent longitudinal chromatic aberration at the wide angle end from being excessively corrected. By not allowing the corresponding value of Conditional Expression (48) to be equal to or greater than the upper limit, the Abbe number is prevented from becoming excessively large. Therefore, it is possible to prevent longitudinal chromatic aberration at the wide angle end from being insufficiently corrected. In order to obtain more favorable characteristics, it is more preferable that the negative lens satisfying Conditional Expression (48) satisfies Conditional Expression (48-1).

$$2.21 < NGFn + 0.01 \times vGFn < 2.37 \tag{48}$$

$$2.24 < NGFn + 0.01 \times vGFn < 2.3 \tag{48-1}$$

In a configuration in which the rear group GC includes a focusing group and the focusing group included in the rear group GC includes at least one negative lens, assuming that a partial dispersion ratio of the negative lens of the focusing group between the g line and the F line is θGFn and an Abbe number of the negative lens of the focusing group based on the d line is vGFn, it is preferable that the zoom lens includes at least one negative lens satisfying Conditional Expression (49). By not allowing the corresponding value of Conditional Expression (49) to be equal to or less than the lower limit, it is possible to prevent the secondary spectrum of longitudinal chromatic aberration at the wide angle end from being insufficiently corrected. By not allowing the corresponding value of Conditional Expression (49) to be equal to or greater than the upper limit, it is possible to prevent the secondary spectrum of longitudinal chromatic aberration at the wide angle end from being excessively corrected. In order to obtain more favorable characteristics, it is more preferable that the negative lens satisfying Conditional Expression (49) satisfies Conditional Expression (49-1).

$$0.63 < \theta GFn + 0.001625 \times vGFn < 0.66 \tag{49}$$

$$0.636 < \theta GFn + 0.001625 \times vGFn < 0.66 \tag{49-1}$$

In a configuration in which the rear group GC includes a focusing group and the focusing group included in the rear group GC includes at least one negative lens, it is more preferable that the zoom lens includes at least one negative lens satisfying Conditional Expressions (46), (47), (48), and (49). In order to obtain more favorable characteristics, it is yet more preferable that a negative lens simultaneously satisfies Conditional Expressions (46), (47), (48), and (49), and then satisfies at least one of Conditional Expressions (46-1), (47-1), (48-1), and (49-1).

In a configuration in which the zoom lens includes only one focusing group and the lens group closest to the image side in the rear group GC remains stationary with respect to the image plane Sim during focusing, assuming that a focal length of the front group GA in a state in which the infinite distance object is in focus at the wide angle end is fAw and a focal length of the focusing group is fGF, it is preferable that the zoom lens satisfies Conditional Expression (50). By not allowing the corresponding value of Conditional Expression (50) to be equal to or less than the lower limit, the refractive power of the front group GA is prevented from becoming excessively strong. Therefore, it is easy to suppress fluctuation in aberrations during zooming. Alternatively, by not allowing the corresponding value of Conditional Expression (50) to be equal to or less than the lower limit, the refractive power of the focusing group is prevented from becoming excessively weak. Therefore, it is possible to minimize the amount of movement of the focusing group during focusing. As a result, it is easy to achieve reduction in size. By not allowing the corresponding value of Conditional Expression (50) to be equal to or greater than the upper limit, the refractive power of the front group GA is prevented from becoming excessively weak. Therefore, it is possible to minimize the amount of movement of the front group GA during zooming. As a result, it is easy to achieve reduction in size. Alternatively, by not allowing the corresponding value of Conditional Expression (50) to be equal to or greater than the upper limit, the refractive power of the focusing group is prevented from becoming excessively strong. Therefore, it is easy to suppress fluctuation in aberrations during focusing. In order to obtain more favorable characteristics, it is more preferable that the zoom lens satisfies Conditional Expression (50-1), and it is yet more preferable that the zoom lens satisfies Conditional Expression (50-2).

$$0.3 < fAw/fGF < 0.8 \tag{50}$$

$$0.4 < fAw/fGF < 0.6 \tag{50-1}$$

$$0.45 < fAw/fGF < 0.5 \tag{50-2}$$

In a configuration in which the zoom lens includes only one focusing group and the lens group closest to the image side in the rear group GC remains stationary with respect to the image plane Sim during focusing, it is preferable that the zoom lens satisfies Conditional Expression (51). Here, it is assumed that a difference in an optical axis direction between a position of the focusing group in a state in which the infinite distance object is in focus at the telephoto end and a position of the focusing group in a state in which a lateral magnification of the zoom lens at the telephoto end is −0.1× is DDfft. Further, it is assumed that a difference in an optical axis direction between a position of the focusing group in a state in which the infinite distance object is in focus at the wide angle end and a position of the focusing group in a state in which the infinite distance object is in focus at the telephoto end is DDf. For example, FIG. 2 shows the difference DDf and DDfft described above. By not allowing the corresponding value of Conditional Expression (51) to be equal to or less than the lower limit, the sensitivity of focusing is prevented from becoming excessively high, that is, the amount of movement of the image plane Sim per unit amount of movement of the focusing group is prevented from becoming large. Therefore, it is easy to control the position of the focusing group. By not allowing the corresponding value of Conditional Expression (51) to be equal to or greater than the upper limit, it is possible to minimize the amount of movement of the focusing group during focusing. Therefore, it is easy to achieve reduction in size. In order to obtain more favorable characteristics, it is more preferable that the zoom lens satisfies Conditional Expression (51-1), and it is yet more preferable that the zoom lens satisfies Conditional Expression (51-2).

$$0.15<|DDfft/DDf|<0.5 \tag{51}$$

$$0.2<|DDfft/DDf|<0.4 \tag{51-1}$$

$$0.25<|DDfft/DDf|<0.3 \tag{51-2}$$

In a configuration in which the zoom lens includes only one focusing group and the lens group closest to the image side of the rear group GC remains stationary with respect to the image plane Sim during focusing, assuming that a focal length of the lens group closest to the image side in the rear group GC is fGz and a focal length of the focusing group is fGF, it is preferable that the zoom lens satisfies Conditional Expression (52). By not allowing the corresponding value of Conditional Expression (52) to be equal to or less than the lower limit, the refractive power of the lens group closest to the image side in the rear group GC is prevented from becoming excessively weak. Therefore, it is possible to ensure the effect of correcting distortion and lateral chromatic aberration. Therefore, there is an advantage in achieving high performance. Alternatively, by not allowing the corresponding value of Conditional Expression (52) to be equal to or less than the lower limit, the refractive power of the focusing group is prevented from becoming excessively strong. Therefore, it is easy to suppress fluctuation in aberrations during focusing. By not allowing the corresponding value of Conditional Expression (52) to be equal to or greater than the upper limit, the refractive power of the lens group closest to the image side in the rear group GC is prevented from becoming excessively strong. Therefore, the effect of correcting distortion and lateral chromatic aberration can be prevented from becoming excessive. As a result, there is an advantage in achieving high performance. Alternatively, by not allowing the corresponding value of Conditional Expression (52) to be equal to or greater than the upper limit, the refractive power of the focusing group is prevented from becoming excessively weak, and it is possible to minimize the amount of movement of the focusing group during focusing. As a result, it is easy to achieve reduction in size. In order to obtain more favorable characteristics, it is more preferable that the zoom lens satisfies Conditional Expression (52-1), and it is yet more preferable that the zoom lens satisfies Conditional Expression (52-2).

$$-4<fGz/fGF<-2 \tag{52}$$

$$-3<fGz/fGF<-2.2 \tag{52-1}$$

$$-2.5<fGz/fGF<-2.3 \tag{52-2}$$

Assuming that a back focal length of the zoom lens at an air-equivalent distance in a state in which the infinite distance object is in focus at the wide angle end is Bfw and a maximum image height in a state in which the infinite distance object is in focus at the wide angle end is IHw, it is preferable that the zoom lens satisfies Conditional Expression (53). By not allowing the corresponding value of Conditional Expression (53) to be equal to or less than the lower limit, the back focal length is prevented from becoming excessively short. Therefore, a mount exchange mechanism can be easily attached. By not allowing the corresponding value of Conditional Expression (53) to be equal to or greater than the upper limit, the back focal length is prevented from becoming excessively long. Therefore, it is easy to achieve reduction in size. In order to obtain more favorable characteristics, it is more preferable that the zoom lens satisfies Conditional Expression (53-1).

$$0.5<Bfw/IHw<2 \tag{53}$$

$$1<Bfw/IHw<1.8 \tag{53-1}$$

Assuming that a focal length of the zoom lens in a state in which the infinite distance object is in focus at the wide angle end is fw and a focal length of the zoom lens in a state in which the infinite distance object is in focus at the telephoto end is ft, it is preferable that the zoom lens satisfies Conditional Expression (54). By not allowing the corresponding value of Conditional Expression (54) to be equal to or less than the lower limit, it is easy to achieve high magnification. By not allowing the corresponding value of Conditional Expression (54) to be equal to or greater than the upper limit, it is easy to achieve both reduction in size and high performance. In order to obtain more favorable characteristics, it is more preferable that the zoom lens satisfies Conditional Expression (54-1), and it is yet more preferable that the zoom lens satisfies Conditional Expression (54-2).

$$3<ft/fw<100 \tag{54}$$

$$3.5<ft/fw<20 \tag{54-1}$$

$$3.9<ft/fw<10 \tag{54-2}$$

Assuming that the curvature radius of the object side surface of the first lens of the first lens group G1 is R1f and the curvature radius of the image side surface of the second lens of the first lens group G1 is R2r, it is preferable that the zoom lens satisfies Conditional Expression (55). By not allowing the corresponding value of Conditional Expression (55) to be equal to or less than the lower limit, the relative negative refractive power of the first lens is not becoming excessively strong. Therefore, it is possible to prevent the positive refractive power of the first lens group G1 from weakening. As a result, it is easy to achieve a reduction in size including the optical axis direction. By not allowing the corresponding value of Conditional Expression (55) to be equal to or greater than the upper limit, the entrance pupil position on the wide angle side can be positioned closer to the object side. Therefore, it is possible to suppress an increase in the diameter of the first lens group G1, which makes it easy to reduce size. Alternatively, by not allowing the corresponding value of Conditional Expression (55) to be equal to or greater than the upper limit, the refractive power of the first lens group G1 is prevented from becoming excessively strong. As a result, it is easy to achieve high performance. In order to obtain more favorable characteristics, it is more preferable that the zoom lens satisfies Conditional Expression (55-1), it is yet more preferable that the zoom lens satisfies Conditional Expression (55-2), and it is most preferable that the zoom lens satisfies Conditional Expression (55-3).

$$-35<(R2r+R1f)/(R2r-R1f)<-1 \quad (55)$$

$$-33<(R2r+R1f)/(R2r-R1f)<-1.1 \quad (55\text{-}1)$$

$$-30<(R2r+R1f)/(R2r-R1f)<-1.2 \quad (55\text{-}2)$$

$$-28<(R2r+R1f)/(R2r-R1f)<-1.3 \quad (55\text{-}3)$$

It is preferable that the zoom lens satisfies Conditional Expression (56). Here, the group consisting of all the lenses in the front group GA on the image side closer than the longest air spacing on the optical axis in the front group GA in the state in which the infinite distance object is in focus at the wide angle end is Aw subgroup GAw. Then, the average value of the Abbe numbers of all the negative lenses of the Aw subgroup GAw based on the d line is set to vAwnave. As an example, FIG. 1 shows the Aw subgroup GAw. In the example of FIG. 1, the longest air spacing on the optical axis in the front group GA in the state in which the infinite distance object is in focus at the wide angle end is the distance on the optical axis between the lens L21 and the lens L22, so the Aw subgroup GAw consists of the lenses L22 to L24. By not allowing the corresponding value of Conditional Expression (56) to be equal to or less than the lower limit, it is possible to suppress an increase in lateral chromatic aberration at the wide angle end. As a result, there is an advantage in achieving high performance. By not allowing the corresponding value of Conditional Expression (56) to be equal to or greater than the upper limit, it is possible to suppress an increase in the secondary spectrum of the lateral chromatic aberration and the monochromatic aberration at the wide angle end. As a result, there is an advantage in achieving high performance. In order to obtain more favorable characteristics, it is more preferable that the zoom lens satisfies Conditional Expression (56-1), it is yet more preferable that the zoom lens satisfies Conditional Expression (56-2), and it is most preferable that the zoom lens satisfies Conditional Expression (56-3).

$$55<vAwnave<102 \quad (56)$$

$$56<vAwnave<96 \quad (56\text{-}1)$$

$$57<vAwnave<86 \quad (56\text{-}2)$$

$$58<vAwnave<82 \quad (56\text{-}3)$$

It is preferable that the zoom lens satisfies Conditional Expression (57). Here, the group consisting of all the lenses in the front group GA on the image side in a closer side than the longest air spacing on the optical axis in the front group GA in the state in which the infinite distance object is in focus at the telephoto end is At subgroup GAt. The air lens in the At subgroup GAt with a focal length whose absolute value is larger than the absolute value of the focal length of the At subgroup GAt is a specific air lens Lair. Then, among convex surfaces, in the At subgroup GAt, which are in contact with the air having a convex shape toward the image side, a convex surface that does not constitute the specific air lens Lair and has the smallest absolute value of the curvature radius is Ap-surface SAp, and the curvature radius of this Ap-surface SAp is Rp. Further, among concave surfaces, in the At subgroup GAt, which have a convex shape directed toward the image side and are in contact with air, a concave surface that does not constitute the specific air lens Lair and has the smallest absolute value of the curvature radius is An-surface SAn, and the curvature radius of this An-surface SAn is Rn. By not allowing the corresponding value of Conditional Expression (57) to be equal to or less than the lower limit, it is possible to suppress an increase in monochromatic aberration in the central portion of the image formation region. As a result, there is an advantage in achieving high performance By not allowing the corresponding value of Conditional Expression (57) to be equal to or greater than the upper limit, it is possible to suppress an increase in monochromatic aberration in the peripheral portion of the image formation region, which is an advantage in achieving high performance. In order to obtain more favorable characteristics, it is more preferable that the zoom lens satisfies Conditional Expression (57-1), and it is yet more preferable that the zoom lens satisfies Conditional Expression (57-2).

$$1<(Rp+Rn)/(Rp-Rn)<10 \quad (57)$$

$$1.5<(Rp+Rn)/(Rp-Rn)<9 \quad (57\text{-}1)$$

$$2<(Rp+Rn)/(Rp-Rn)<8 \quad (57\text{-}2)$$

Figure 5:
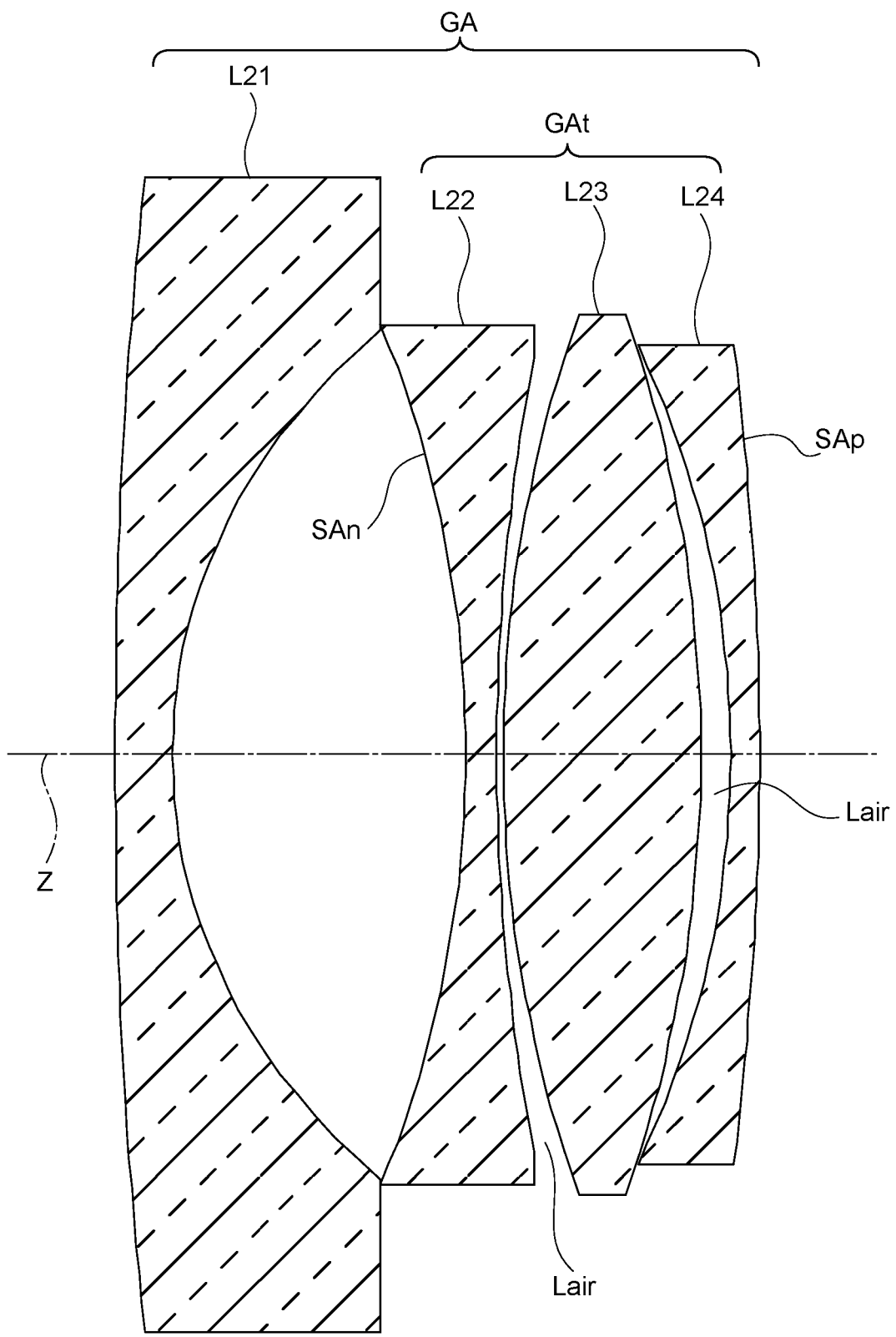
FIG. 5 is an enlarged view of the front group of FIG. 1

It should be noted that in the present specification, the air gap sandwiched between two facing lens surfaces is regarded as a lens having a refractive index of 1, and this air gap is called an air lens. As an explanatory diagram, FIG. 5 shows an enlarged view of the front group GA of the example of FIG. 1. In FIG. 5, to facilitate understanding, the lenses L21 to L24 are hatched, and the air lens is not hatched. In the example of FIG. 5, the At subgroup GAt consists of the lenses L22 to L24. It should be noted that, in the examples of FIGS. 1 and 5, the At subgroup GAt and the above-mentioned Aw subgroup GAw are the same, but in the technology of the present disclosure, the At subgroup GAt and the Aw subgroup GAw can be configured differently. In the example of FIG. 5, the air gap between the image side surface of the lens L22 and the object side surface of the lens L23, and the air gap between the image side surface of the lens L23 and the object side surface of the lens L24 corresponds to the specific air lens Lair. Further, in the example of FIG. 5, the image side surface of the lens L24 corresponds to the Ap-surface SAp, and the object side surface of the lens L22 corresponds to the An-surface SAn.

It is preferable that the zoom lens satisfies Conditional Expression (58) in relation to the Ap-surface SAp, the An-surface SAn, or the like defined above. By not allowing the corresponding value of Conditional Expression (58) to be equal to or less than the lower limit, it is possible to suppress an increase in monochromatic aberration in the center of the image formation region, which is an advantage in achieving high performance. By not allowing the corresponding value of Conditional Expression (58) to be equal to or greater than the upper limit, it is possible to suppress an increase in monochromatic aberration in the peripheral portion of the image formation region, which is an advantage in achieving high performance. In order to obtain more favorable characteristics, it is more preferable that the zoom lens satisfies Conditional Expression (58-1), it is yet more preferable that the zoom lens satisfies Conditional Expression (58-2), and it is most preferable that the zoom lens satisfies Conditional Expression (58-3).

$$-1.4<(APLp+APLn)/2<0 \qquad (58)$$

$$-1<(APLp+APLn)/2<0 \qquad (58\text{-}1)$$

$$-0.8<(APLp+APLn)/2<-0.05 \qquad (58\text{-}2)$$

$$-0.6<(APLp+APLn)/2<-0.1 \qquad (58\text{-}3)$$

In Conditional Expression (58), APLp and APLn are defined as follows:

$$APLp=Dobjp/Rp-(1+Npr/Npf)$$

$$APLn=Dobjn/Rn-(1+Nnr/Nnf)$$

Here, symbols are defined as follows. The distance on the optical axis between the Ap-surface SAp and the object point for the Ap-surface SAp in a case where the light ray parallel to the optical axis Z is incident on the zoom lens from the object side at the telephoto end to trace the paraxial ray is Dobjp. The sign of Dobjp is negative if the object point for the above-mentioned Ap-surface SAp is on the object side in a closer side than the Ap-surface SAp, and positive if it is on the image side. The curvature radius of the Ap-surface SAp is Rp. The refractive index of the medium on the object side of the Ap-surface SAp at the d line is Npf. The refractive index of the medium on the image side of the Ap-surface SAp at the d line is Npr. Further, the distance on the optical axis between the An-surface SAn and the object point for the An-surface SAn in a case where a light ray parallel to the optical axis Z is incident on the zoom lens from the object side at the telephoto end to trace the paraxial ray is Dobjn. The sign of Dobjn is negative if the object point for the above-mentioned An-surface SAn is on the object side closer than the An-surface SAn, and positive if it is on the image side. The curvature radius of the An-surface SAn is Rn. The refractive index of the medium on the object side of the An-surface SAn at the d line is Nnf. The refractive index of the medium on the image side of the An-surface SAn at the d line is Nnr. It should be noted that the medium on the object side of the Ap-surface SAp here means the medium on the object side of the Ap-surface SAp among the media in contact with the Ap-surface SAp. Similarly, the medium on the image side of the Ap-surface SAp means the medium on the image side of the Ap-surface SAp among the media in contact with the Ap-surface SAp. The same applies to the medium on the object side of the An-surface SAn and the medium on the image side of the An-surface SAn.

Figure 6:
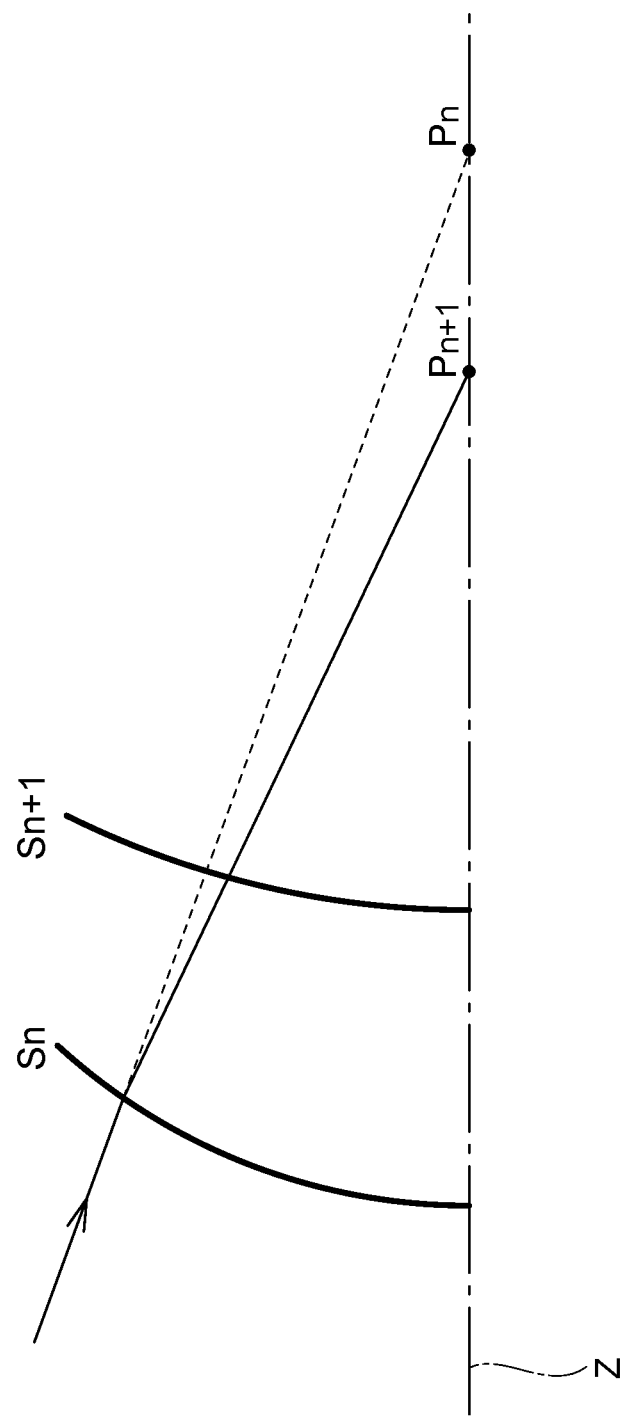
FIG. 6 is a conceptual diagram for explaining an object point in ray tracing.

The object point in ray tracing will be described with reference to FIG. 6. Here, it is assumed that there is a system of a plurality of optical surfaces arranged from the object side to the image side along the optical axis Z. Assuming n is a positive integer, FIG. 6 shows, as an example, the nth surface $S_n$, which is the nth optical surface from the object side, and the point $P_n$, which is an object point for the nth surface $S_n$. The line of the arrow on the left side of the nth surface $S_n$ in FIG. 6 indicates a light ray. In FIG. 6, the point $P_n$ is imaged at the point $P_{n+1}$ by the nth surface $S_n$. That is, the point $P_n$ and the point $P_{n+1}$ are in a conjugated relationship, and the point $P_{n+1}$ is an image point for the nth surface $S_n$. Assuming that the (n+1)th optical surface from the object side is the (n+1)th surface $S_{n+1}$, the point $P_{n+1}$ becomes an object point for the (n+1)th surface $S_{n+1}$. In this way, the image point for one surface is taken over as the object point for the next surface, and ray tracing is performed in order. Therefore, the above-mentioned "object point for the Ap-surface SAp in a case where a light ray is incident on the zoom lens from the object side" can be obtained by sequentially performing the ray tracing described above from the surface closest to the object side of the zoom lens to the surface adjacent to the object side of the Ap-surface SAp. It should be noted that, in FIG. 6, the (n+1) surface $S_{n+1}$ exists between the nth surface $S_n$ and the point $P_{n+1}$, but in a case where the ray tracing is performed in which the point $P_n$ is imaged at the point $P_{n+1}$ by the nth surface $S_n$, the next surface, the (n+1) surface $S_{n+1}$, is treated as absent.

Figure 7:
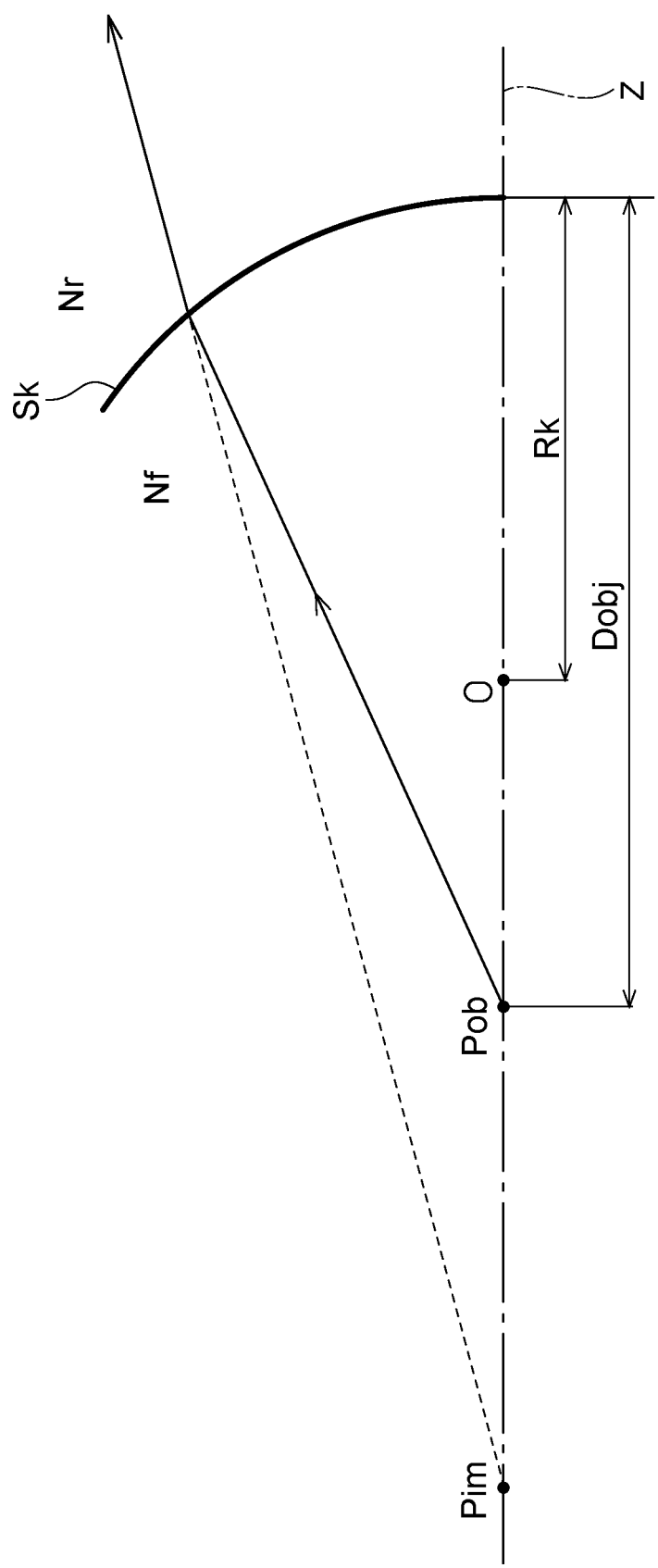
FIG. 7 is a diagram for explaining an aplanatic condition.

In Conditional Expression (58), APLp and APLn are quantities related to the aplanatic condition. The aplanatic condition will be described with reference to FIG. 7. FIG. 7 shows the optical surface Sk, the object point Pob for the optical surface Sk, and the point O, which is the center of curvature of the optical surface Sk. The optical surface Sk is, for example, a lens surface. The object point Pob is located on the optical axis Z. The distance on the optical axis between the object point Pob and the optical surface Sk is Dobj. The distance between the point O and the optical surface Sk on the optical axis is equal to the curvature radius of the optical surface Sk, and here, its curvature radius is Rk. Further, the refractive index of the medium on the incident side of the optical surface Sk is Nf, and the refractive index of the medium on the exit side is Nr. In FIG. 7, the object point Pob is imaged at the image point Pim by the optical surface Sk. That is, the object point Pob and the image point Pim are in a conjugated relationship. Here, in a case where the distance Dobj satisfies the equation below, $$Dobj=(1+Nr/Nf)\times Rk$$

the object point Pob and the image point Pim are conjugate points where spherical aberration and coma aberration near the axis do not occur. These conjugate points are called conjugate points that satisfy the aplanatic condition.

In Conditional Expression (58), APLp and APLn are values obtained by dividing the amount of displacement (amount of violation of the aplanatic condition) from the conjugate point satisfying the aplanatic condition by the curvature radius. When the above-mentioned "object point for Ap-surface SAp" is a conjugated point satisfying the aplanatic condition, APLp becomes zero. Similarly, in a case where the above-mentioned "object point for An-surface SAn" is a conjugated point satisfying the aplanatic condition, APLn becomes zero. The value obtained by dividing the amount of violation of the aplanatic condition by the curvature radius is obtained for the convex surface (Ap-surface SAp) and the concave surface (An-surface SAn), and the average value of them is taken as the corresponding value of Conditional Expression (58).

The example shown in FIG. 1 is an example, and various modifications can be made without departing from the scope of the technique of the present disclosure. For example, the number of lens groups included in each of the front group GA and the rear group GC may be different from the number in the example of FIG. 1. Further, the number of lenses included in each lens group may be different from the number shown in FIG. 1. For example, each group can be configured as follows.

The first lens and the second lens of the first lens group G1 may be cemented to each other. In such a case, there is an advantage in correcting chromatic aberration.

The first lens group G1 may be configured to consist of a negative lens, a positive lens, a positive lens, and a positive lens, in order from the object side to the image side. In such a case, there is an advantage in achieving high performance.

During zooming, the first lens group G1 may be configured to move. In such a case, it is easy to suppress fluctuation in aberrations during zooming. As a result, there is an advantage in achieving high performance.

The front group GA may be configured to consist of two lens groups of which the mutual spacing changes during zooming. In such a case, it is easy to suppress fluctuation in aberrations during zooming. As a result, there is an advantage in achieving high performance. The front group GA may be configured to consist of two lens groups that have negative refractive powers. In a case where the front group GA consists of two lens groups that have negative refractive powers, the lens group on the object side in the front group GA may be configured to consist of one negative lens, and the lens group on the image side in the front group GA may be configured to consist of a negative lens, a positive lens, and a negative lens, in order from the object side to the image side. Alternatively, the front group GA may be configured to consist of a lens group that has a negative refractive power and a lens group that has a positive refractive power, in order from the object side to the image side. In a case where the front group GA consists of a lens group that has a negative refractive power and a lens group that has a positive refractive power in order from the object side to the image side, the lens group on the object side in the front group GA may be configured to consist of two negative lenses, and the lens group on the image side in the front group GA may be configured to consist of a positive lens and a negative lens, in order from the object side to the image side.

The middle group GB may be configured to consist of an aperture stop St and a positive lens, in order from the object side to the image side. Alternatively, the middle group GB may be configured to consist of an aperture stop St, two cemented lenses, and a negative lens, in order from the object side to the image side. In the cemented lens of the middle group GB, it is preferable that the negative lens and the positive lens are cemented. The aperture stop St may be disposed closest to the object side in the middle group GB. In such a case, the structure can be simplified. As a result, there is an advantage in achieving reduction in size and weight of the whole system.

In the example of FIG. 1, the aperture stop St is included in the third lens group G3. However, unlike the example of FIG. 1, the aperture stop St may be configured not to be included in any lens group. That is, the configuration may be made such that the spacing between the lens adjacent to the object side of the aperture stop St and the aperture stop St changes and the spacing between the lens adjacent to the image side of the aperture stop St and the aperture stop St changes, during zooming. In this configuration, during zooming, the aperture stop St may move along the optical axis Z by changing the spacings between the adjacent lens groups, or may remain stationary with respect to the image plane Sim. However, the aperture stop St is not included in either the front group GA or the rear group GC.

During zooming, the middle group GB may be configured to move. In such a case, it is easy to suppress fluctuation in aberrations during zooming. As a result, there is an advantage in achieving high performance.

In a case where the rear group GC consists of two lens groups of which the mutual spacing changes during zooming, the rear group GC may be configured to consist of two lens groups including a lens group that has a negative refractive power and a lens group that has a positive refractive power, in order from the object side to the image side. In such a case, the lens group that has a negative refractive power in the rear group GC may be configured to consist of a positive lens and a negative lens in order from the object side to the image side, and the lens group that has a positive refractive power in the rear group GC may be configured to consist of a positive lens, a negative lens, and a positive lens, in order from the object side to the image side.

Alternatively, the rear group GC may be configured to consist of two lens groups including a lens group that has a positive refractive power and a lens group that has a negative refractive power, in order from the object side to the image side. In such a case, the lens group that has a positive refractive power in the rear group GC may be configured to consist of a positive lens, a negative lens, a positive lens, and a positive lens in order from the object side to the image side, and the lens group that has a negative refractive power in the rear group GC may be configured to consist of a negative lens, a positive lens, a positive lens, and a negative lens, in order from the object side to the image side.

The rear group GC may be configured to consist of three lens groups of which the spacings between adjacent lens groups change during zooming. In such a case, it is easy to suppress fluctuation in aberrations during zooming. As a result, there is an advantage in achieving high performance.

For example, the rear group GC may be configured to consist of three lens groups including a lens group that has a positive refractive power, a lens group that has a negative refractive power, and a lens group that has a positive refractive power, in order from the object side to the image side. In such a case, the lens group closest to the object side in the rear group GC may be configured to consist of a negative lens and a positive lens, in order from the object side to the image side. The lens group which is second from the object side in the rear group GC may be configured to consist of a positive lens and a negative lens, in order from the object side to the image side. The lens group closest to the image side in the rear group GC may be configured to consist of a positive lens, a negative lens, and a positive lens, in order from the object side to the image side.

Alternatively, the rear group GC may be configured to consist of three lens groups including a lens group that has a negative refractive power, a lens group that has a negative refractive power, and a lens group that has a positive refractive power, in order from the object side to the image side. In such a case, the lens group closest to the object side in the rear group GC may be configured to consist of only one negative lens. The lens group which is second from the object side in the rear group GC may be configured to consist of a positive lens and a negative lens, in order from the object side to the image side. The lens group closest to the image side in the rear group GC may be configured to consist of a positive lens, a negative lens, and a positive lens, in order from the object side to the image side.

Alternatively, the rear group GC consists of three lens groups including a lens group that has a negative refractive power, a lens group that has a positive refractive power, and a lens group that has a positive refractive power, in order from the object side to the image side. In such a case, the lens group closest to the object side in the rear group GC may be configured to consist of a positive lens and a negative lens, in order from the object side to the image side. The lens group which is second from the object side in the rear group GC may be configured to consist of only one positive lens. The lens group closest to the image side in the rear group GC may be configured to consist of a positive lens, a negative lens, and a positive lens, in order from the object side to the image side.

In a case where the rear group GC consists of two lens groups, the lens group on the object side in the rear group GC may move during zooming, and the lens group on the image side in the rear group GC may remain stationary with respect to the image plane Sim during zooming. Alternatively, during zooming, the two lens groups in the rear group GC may move by changing the mutual spacings therebetween.

In a case where the rear group GC consists of three lens groups, during zooming, the lens group closest to the object side in the rear group GC and the lens group which is second from the object side in the rear group GC may move such that the mutual spacing therebetween changes, and the lens group closest to the image side in the rear group GC may remain stationary with respect to the image plane Sim.

The focusing group may be disposed closest to the object side in the rear group GC. In such a case, the focusing group can be easily reduced in size. As a result, there is an advantage in achieving reduction in size of the entire lens system. Alternatively, in a case where the rear group GC consists of three lens groups, the focusing group may be disposed in the lens group which is second from the object side in the rear group GC.

The zoom lens may be configured to consist of five or six lens groups of which the spacings between adjacent lens groups change during zooming. In such a case, there is an advantage in achieving both reduction in size and high performance.

The above-mentioned preferred configurations and available configurations may be optional combinations, and it is preferable to selectively adopt the configurations in accordance with required specification. It should be noted that conditional expressions that the zoom lens of the present disclosure preferably satisfies are not limited to conditional expressions described in the form of expressions, and the lower limit and the upper limit are selected from the preferable, more preferable, yet more preferable, and most preferable conditional expressions. Conditional expressions may include all conditional expressions obtained through optional combinations.

For example, according to a preferred embodiment, the zoom lens of the present disclosure consists of, in order from the object side to the image side, a first lens group G1, a front group GA, a middle group GB, and a rear group GC. The first lens group G1 has a positive refractive power. The front group GA consists of one or more lens groups that move during zooming and has a negative refractive power as a whole throughout the entire zoom range. The middle group GB includes only one lens group as a lens group. The rear group GC consists of a plurality of lens groups. An aperture stop St is disposed between a lens surface closest to the image side in the front group GA and a lens surface closest to the object side in the rear group GC. During zooming, a spacing between the first lens group G1 and the front group GA changes, a spacing between the front group GA and the middle group GB changes, a spacing between the middle group GB and the rear group GC changes, and all spacings between adjacent lens groups in the rear group GC change. In a case where the front group GA consists of a plurality of lens groups, all spacings between adjacent lens groups in the front group GA change during zooming. The first lens group G1 includes a first lens which is a negative lens and a second lens which is a positive lens, successively in order from a position closest to the object side to the image side. Then, it is preferable that the zoom lens satisfies Conditional Expression (1).

Next, examples of the zoom lens of the present disclosure will be described, with reference to the drawings. The reference numerals attached to the lenses in the cross-sectional views of each example are used independently for each example in order to avoid complication of description and drawings due to an increase in the number of digits of the reference numerals. Accordingly, even in a case where common reference numerals are attached in the drawings of different examples, constituent elements do not necessarily have a common configuration.

Example 1

FIG. 1 shows a configuration and movement loci of a zoom lens of Example 1, and an illustration method and a configuration thereof are as described above. Therefore, some description is not repeated herein. The zoom lens shown in Example 1 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 1, Table 1 shows basic lens data, Table 2 shows specifications and variable surface spacings, and Table 3 shows aspherical coefficients thereof. The table of basic lens data will be described as follows. The Sn column shows surface numbers in a case where the surface closest to the object side is the first surface and the number is increased one by one toward the image side. The R column shows a curvature radius of each surface. The D column shows a surface spacing between each surface and the surface adjacent to the image side on the optical axis. The Nd column shows a refractive index of each constituent element at the d line. The vd column shows an Abbe number of each constituent element based on the d line. The θgF column shows a partial dispersion ratio of each constituent element between the g line and the F line. The ED column shows an effective diameter of each surface.

In the table of basic lens data, the sign of the curvature radius of the surface of the convex shape facing toward the object side is positive, and the sign of the curvature radius of the surface of the convex shape facing toward the image side is negative. In a cell of a surface number of a surface corresponding to the aperture stop St, the surface number and a term of (St) are noted. The table of basic lens data also shows the optical member PP. A value at the bottom cell of the D column in the table indicates a spacing between the image plane Sim and the surface closest to the image side in the table. Regarding the variable surface spacing, the symbol DD[ ] is used during zooming, and the object side surface number of the spacing is given in [ ] and is noted in the D column.

Table 2 shows a zoom magnification Zr, a focal length f, a back focal length Bf at the air-equivalent distance, an F number FNo. [°] in the open stop state, a maximum total angle of view 2ω, the maximum image height IH, and the variable surface spacing, based on the d line. The zoom magnification Zr is a zoom ratio. [°] in the cell of 2ω indicates that the unit thereof is degrees. In Table 2, the column labeled "wide angle end_infinity" shows values in a state in which the infinite distance object is in focus at the wide angle end, the column labeled "telephoto end_infinity" shows values in a state in which the infinite distance object is in focus at the telephoto end, and the column labeled "telephoto end_close" shows values in a state in which the close range object is in focus at the telephoto end. However, f and Bf indicate only values in a state in which the infinite distance object is in focus. In Example 1, the distance on the optical axis from the lens surface closest to the object side to the close range object is 1.1 m (meters). The distance on the optical axis from the lens surface closest to the object side to the close range object is the same in the data of an aberration diagram to be described later.

In basic lens data, a reference sign * is attached to surface numbers of aspherical surfaces, and numerical values of the paraxial curvature radius are written into the column of the curvature radius of the aspherical surface. In Table 3, the Sn row shows surface numbers of the aspherical surfaces, and the KA and Am rows show numerical values of the aspherical coefficients for each aspherical surface. It should be noted that m of Am is an integer of 3 or more, and differs depending on the surface. For example, on the sixth surface, m=4, 6, 8, . . . 20. The "E±n" (n: an integer) in numerical values of the aspherical coefficients of Table 3 indicates "×10$^{±n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd | θgF | ED |
|---|---|---|---|---|---|---|
| 1 | 87.87311 | 1.700 | 1.92286 | 20.89 | 0.63806 | 54.04 |
| 2 | 52.99910 | 7.900 | 1.59283 | 68.63 | 0.54286 | 50.81 |
| 3 | ∞ | 0.110 | | | | 49.73 |
| 4 | 44.22167 | 4.800 | 1.77535 | 50.30 | 0.55004 | 42.60 |
| 5 | 116.11577 | DD[5] | | | | 41.80 |
| *6 | 245.66038 | 1.200 | 1.80610 | 40.73 | 0.56940 | 24.84 |
| *7 | 12.68927 | 6.127 | | | | 18.24 |
| 8 | −26.91391 | 0.650 | 1.77535 | 50.30 | 0.55004 | 17.49 |
| 9 | 51.24076 | 0.130 | | | | 17.02 |
| 10 | 31.36898 | 4.140 | 1.84667 | 23.79 | 0.61771 | 17.00 |
| 11 | −31.36898 | 0.619 | | | | 16.49 |
| 12 | −22.72231 | 0.600 | 1.88299 | 40.78 | 0.56829 | 16.22 |
| 13 | −77.69761 | DD[13] | | | | 16.00 |
| 14(St) | ∞ | 1.200 | | | | 16.50 |
| *15 | 18.36941 | 4.760 | 1.49648 | 81.26 | 0.53689 | 18.46 |
| *16 | −48.27179 | 1.190 | | | | 18.40 |
| 17 | 29.69112 | 0.810 | 1.91082 | 35.25 | 0.58224 | 18.08 |
| 18 | 13.05210 | 6.860 | 1.53775 | 74.70 | 0.53936 | 17.15 |
| 19 | −23.87047 | DD[19] | | | | 17.06 |
| 20 | −77.85373 | 2.010 | 1.90200 | 25.26 | 0.61662 | 12.50 |
| 21 | −18.62990 | 0.610 | 1.78799 | 47.47 | 0.55346 | 12.64 |
| 22 | 23.25360 | DD[22] | | | | 12.87 |
| *23 | −179.47134 | 5.630 | 1.58313 | 59.46 | 0.54056 | 22.64 |
| *24 | −17.00892 | 0.300 | | | | 23.24 |
| 25 | −20.33930 | 0.810 | 2.00069 | 25.43 | 0.61417 | 22.98 |
| 26 | −52.65464 | 2.550 | | | | 24.47 |
| 27 | −170.95811 | 3.930 | 1.53172 | 48.85 | 0.56700 | 26.34 |
| 28 | −30.26663 | 21.929 | | | | 26.86 |
| 29 | ∞ | 2.850 | 1.51633 | 64.14 | 0.53531 | 29.50 |
| 30 | ∞ | 1.021 | | | | 29.70 |

TABLE 2

Example 1

| | Wide angle end_infinity | Telephoto end_infinity | Telephoto end_close |
|---|---|---|---|
| Zr | 1.00 | 6.30 | 6.30 |
| f | 18.544 | 116.830 | — |
| Bf | 24.829 | 24.829 | — |
| FNo. | 4.04 | 4.11 | 4.27 |
| 2ω[°] | 81.4 | 13.4 | 13.0 |
| IH | 14.9 | 14.9 | 14.9 |
| DD[5] | 1.010 | 31.285 | 31.285 |
| DD[13] | 31.220 | 0.945 | 0.945 |
| DD[19] | 1.000 | 12.925 | 16.026 |
| DD[22] | 22.060 | 10.135 | 7.034 |

TABLE 3

Example 1

| Sn | 6 | 7 | 23 | 24 |
|---|---|---|---|---|
| KA | 1.0000000E+00 | 1.0000000E+00 | 1.0000000E+00 | 1.0000000E+00 |
| A4 | 7.4473652E−05 | 6.5838933E−05 | 6.2558334E−07 | 1.7961844E−05 |
| A6 | −2.1119784E−06 | −8.2962920E−07 | −2.5123777E−07 | 2.5308981E−07 |
| A8 | 4.7319775E−08 | −8.0793970E−08 | 9.6772452E−09 | −1.7409809E−08 |
| A10 | −7.9524193E−10 | 5.9315217E−09 | −9.2663040E−11 | 6.4173328E−10 |
| A12 | 9.3934890E−12 | −2.0050240E−10 | −1.5910064E−12 | −1.2426583E−11 |

TABLE 3-continued

| | | Example 1 | | |
|---|---|---|---|---|
| A14 | −7.4102362E−14 | 3.9039118E−12 | 4.8091291E−14 | 1.3729067E−13 |
| A16 | 3.6783833E−16 | −4.4501804E−14 | −4.7819912E−16 | −8.6371114E−16 |
| A18 | −1.0327838E−18 | 2.7553203E−16 | 2.1682041E−18 | 2.8638107E−18 |
| A20 | 1.2461383E−21 | −7.1506946E−19 | −3.7741189E−21 | −3.8577185E−21 |

| Sn | 15 | 16 |
|---|---|---|
| KA | 1.0000000E+00 | 1.0000000E+00 |
| A3 | 0.0000000E+00 | 0.0000000E+00 |
| A4 | 7.3078481E−06 | 5.3950544E−05 |
| A5 | −2.9986848E−05 | −1.3977719E−05 |
| A6 | 1.6384009E−05 | 1.0144728E−05 |
| A7 | −4.0393568E−06 | −3.9828880E−06 |
| A8 | 2.4477938E−07 | 8.7491995E−07 |
| A9 | 9.0464563E−08 | −8.8643972E−08 |
| A10 | −1.6990822E−08 | −2.9596556E−09 |
| A11 | −2.4534913E−10 | 2.0443076E−09 |
| A12 | 3.0825088E−10 | −2.8803981E−10 |
| A13 | −2.3134201E−11 | 2.5839721E−11 |
| A14 | −7.8884947E−13 | −1.8603752E−12 |
| A15 | 1.6292002E−13 | 9.7346637E−14 |
| A16 | −5.4632706E−15 | −2.4344642E−15 |

FIG. 8 shows a diagram of aberrations of the zoom lens of Example 1. FIG. 8 shows, in order from the left, spherical aberration, astigmatism, distortion, and lateral chromatic aberration. In FIG. 8, the upper part labeled "wide angle end_infinity" shows aberrations in a state in which the infinite distance object is in focus at the wide angle end, the middle part labeled "telephoto end_infinity" shows aberrations in a state in which the infinite distance object is in focus at the telephoto end, and the lower part labeled "telephoto end_close" shows aberrations in a state in which the close range object is in focus at the telephoto end. In the spherical aberration diagram, aberrations at the d line, the C line, and the F line are indicated by a solid line, a long broken line, and a short broken line, respectively. In the astigmatism diagram, aberration in a sagittal direction at the d line is indicated by a solid line, and aberration in a tangential direction at the d line is indicated by a short broken line. In the distortion diagram, aberration at the d line is indicated by a solid line. In the lateral chromatic aberration diagram, aberrations at the C line and the F line are respectively indicated by a long broken line and a short broken line. In the spherical aberration diagram, FNo. after =, the value of the F number in the open stop state is shown. In other aberration diagrams, the value of the maximum half angle of view is shown after ω=.

Symbols, meanings, description methods, and illustration methods of the respective data pieces according to Example 1 are basically similar to those in the following examples unless otherwise specified. Therefore, in the following description, repeated description will not be given.

Example 2

Figure 9:
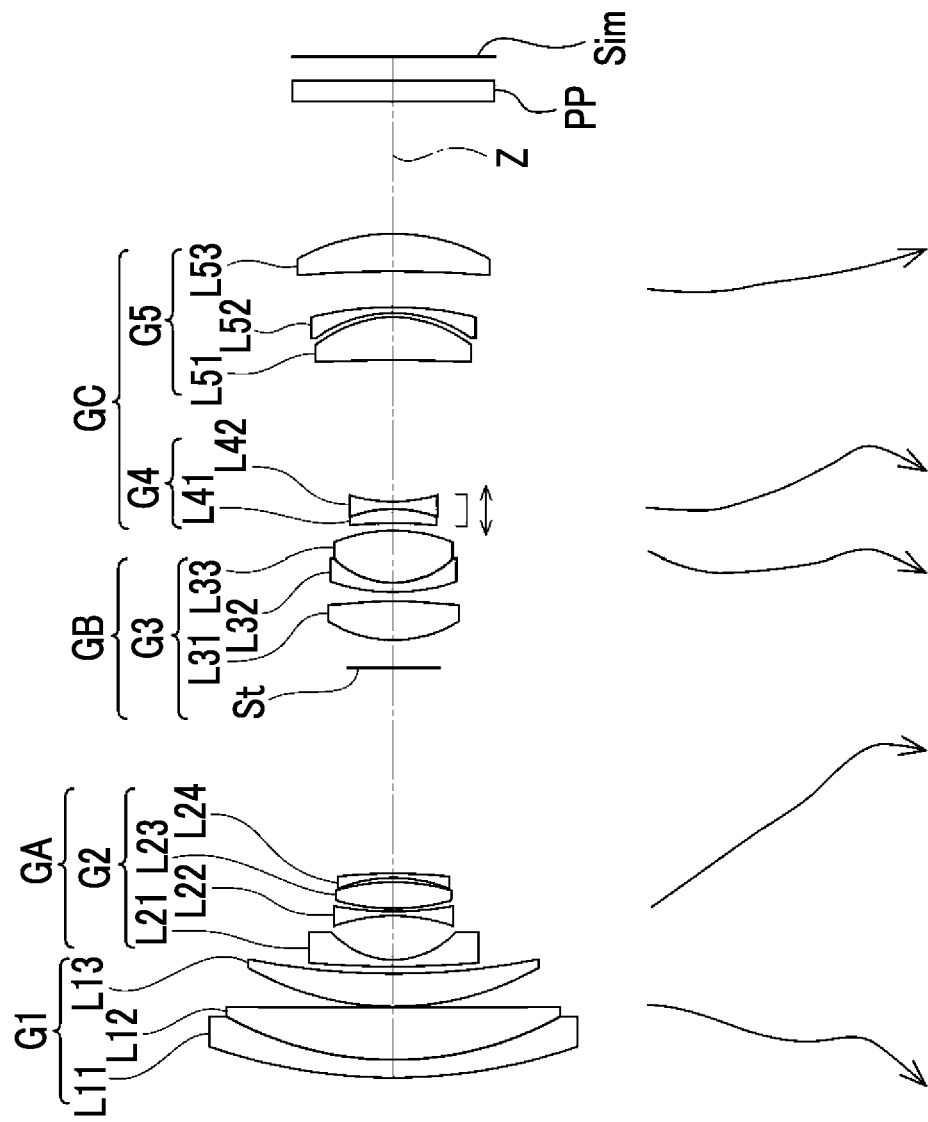
FIG. 9 is a cross-sectional view of a configuration of a zoom lens of Example 2 and a diagram showing movement loci thereof.

FIG. 9 shows a configuration and movement loci of the zoom lens of Example 2. The zoom lens shown in Example 2 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, all the lens groups move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 2, Table 4 shows basic lens data, Table 5 shows specifications and variable surface spacings, and Table 6 shows aspherical coefficients thereof. FIG. 10 shows aberration diagrams. In Example 2, the distance on the optical axis from the lens surface closest to the object side to the close range object is 1.0 m (meters).

TABLE 4

| | | Example 2 | | | | |
|---|---|---|---|---|---|---|
| Sn | R | D | Nd | νd | θgF | ED |
| 1 | 87.49459 | 2.440 | 1.92286 | 20.89 | 0.63806 | 52.68 |
| 2 | 53.32141 | 7.228 | 1.59283 | 68.63 | 0.54286 | 48.99 |
| 3 | 4908.34662 | 0.120 | | | | 48.19 |
| 4 | 44.97500 | 4.531 | 1.77535 | 50.30 | 0.55004 | 42.60 |
| 5 | 113.53122 | DD[5] | | | | 41.90 |
| *6 | 225.30772 | 0.906 | 1.80610 | 40.73 | 0.56940 | 24.35 |
| *7 | 12.66457 | 6.073 | | | | 18.27 |
| 8 | −27.06597 | 0.600 | 1.77535 | 50.30 | 0.55004 | 17.45 |
| 9 | 51.04891 | 0.388 | | | | 16.93 |
| 10 | 31.92519 | 3.641 | 1.84666 | 23.79 | 0.62056 | 16.86 |
| 11 | −31.62573 | 0.600 | | | | 16.45 |
| 12 | −22.46651 | 0.600 | 1.88300 | 40.76 | 0.56679 | 16.24 |
| 13 | −78.30938 | DD[13] | | | | 16.00 |
| 14(St) | ∞ | 3.833 | | | | 15.94 |
| *15 | 18.55855 | 5.369 | 1.49648 | 81.26 | 0.53689 | 19.07 |
| *16 | −49.05285 | 1.242 | | | | 18.92 |
| 17 | 29.82673 | 1.266 | 1.91082 | 35.25 | 0.58224 | 18.42 |
| 18 | 12.94077 | 7.069 | 1.53775 | 74.70 | 0.53936 | 17.23 |
| 19 | −24.21710 | DD[19] | | | | 17.06 |

TABLE 4-continued

Example 2

| Sn | R | D | Nd | vd | θgF | ED |
|---|---|---|---|---|---|---|
| 20 | −79.33253 | 1.980 | 1.90320 | 25.36 | 0.61616 | 12.50 |
| 21 | −18.68899 | 1.009 | 1.78604 | 47.87 | 0.55556 | 12.60 |
| 22 | 23.30363 | DD[22] | | | | 12.73 |
| *23 | −187.45092 | 5.944 | 1.58313 | 59.46 | 0.54056 | 22.09 |
| *24 | −17.01137 | 0.557 | | | | 22.83 |
| 25 | −20.32248 | 0.802 | 1.99958 | 25.02 | 0.61770 | 22.55 |
| 26 | −52.57788 | 4.974 | | | | 23.99 |
| 27 | −179.96729 | 5.179 | 1.53114 | 49.29 | 0.56224 | 27.19 |
| 28 | −30.13613 | DD[28] | | | | 28.09 |
| 29 | ∞ | 2.850 | 1.51633 | 64.14 | 0.53531 | 29.44 |
| 30 | ∞ | 3.299 | | | | 29.58 |

TABLE 5

Example 2

| | Wide angle end_infinity | Telephoto end_infinity | Telephoto end_close |
|---|---|---|---|
| Zr | 1.00 | 6.30 | 6.30 |
| f | 18.546 | 116.838 | — |
| Bf | 23.435 | 17.973 | — |
| FNo. | 4.12 | 4.12 | 4.26 |
| 2ω[°] | 84.0 | 13.6 | 13.4 |
| IH | 14.9 | 14.9 | 14.9 |
| DD[5] | 1.001 | 34.898 | 34.898 |
| DD[13] | 28.385 | 3.020 | 3.020 |
| DD[19] | 1.000 | 8.824 | 11.269 |
| DD[22] | 19.505 | 19.834 | 17.390 |
| DD[28] | 18.257 | 12.797 | 12.797 |

TABLE 6

Example 2

| Sn | 6 | 7 | 23 | 24 |
|---|---|---|---|---|
| KA | −5.8580946E+02 | 9.0279457E−01 | 1.9541379E+02 | 1.0369147E+00 |
| A4 | 7.2869982E−05 | 6.2579184E−05 | 1.0803973E−05 | 2.4090683E−05 |
| A6 | −2.1105147E−06 | −8.3599782E−07 | −2.4931445E−07 | 2.5202835E−07 |
| A8 | 4.7319661E−08 | −8.0795716E−08 | 9.6772854E−09 | −1.7409986E−08 |
| A10 | −7.9513628E−10 | 5.9315217E−09 | −9.2421978E−11 | 6.4158879E−10 |
| A12 | 9.3934890E−12 | −2.0050240E−10 | −1.5910064E−12 | −1.2426583E−11 |
| A14 | −7.4102362E−14 | 3.9039118E−12 | 4.8091291E−14 | 1.3729067E−13 |
| A16 | 3.6783833E−16 | −4.4501804E−14 | −4.7819912E−16 | −8.6371114E−16 |
| A18 | −1.0327838E−18 | 2.7553203E−16 | 2.1682041E−18 | 2.8638107E−18 |
| A20 | 1.2461383E−21 | −7.1506946E−19 | −3.7741189E−21 | −3.8577185E−21 |

| Sn | 15 | 16 |
|---|---|---|
| KA | 1.4814848E+00 | 1.0000000E+00 |
| A3 | −2.6516589E−06 | 0.0000000E+00 |
| A4 | −9.2328550E−07 | 5.3950544E−05 |
| A5 | −2.9188569E−05 | −1.3977719E−05 |
| A6 | 1.6267901E−05 | 1.0144728E−05 |
| A7 | −4.0389732E−06 | −3.9828880E−06 |
| A8 | 2.4477623E−07 | 8.7491995E−07 |
| A9 | 9.0464664E−08 | −8.8643972E−08 |
| A10 | −1.6990822E−08 | −2.9596556E−09 |
| A11 | −2.4534913E−10 | 2.0443076E−09 |
| A12 | 3.0825088E−10 | −2.8803981E−10 |
| A13 | −2.3134201E−11 | 2.5839721E−11 |
| A14 | −7.8884947E−13 | −1.8603752E−12 |
| A15 | 1.6292002E−13 | 9.7346637E−14 |
| A16 | −5.4632706E−15 | −2.4344642E−15 |

Example 3

Figure 11:
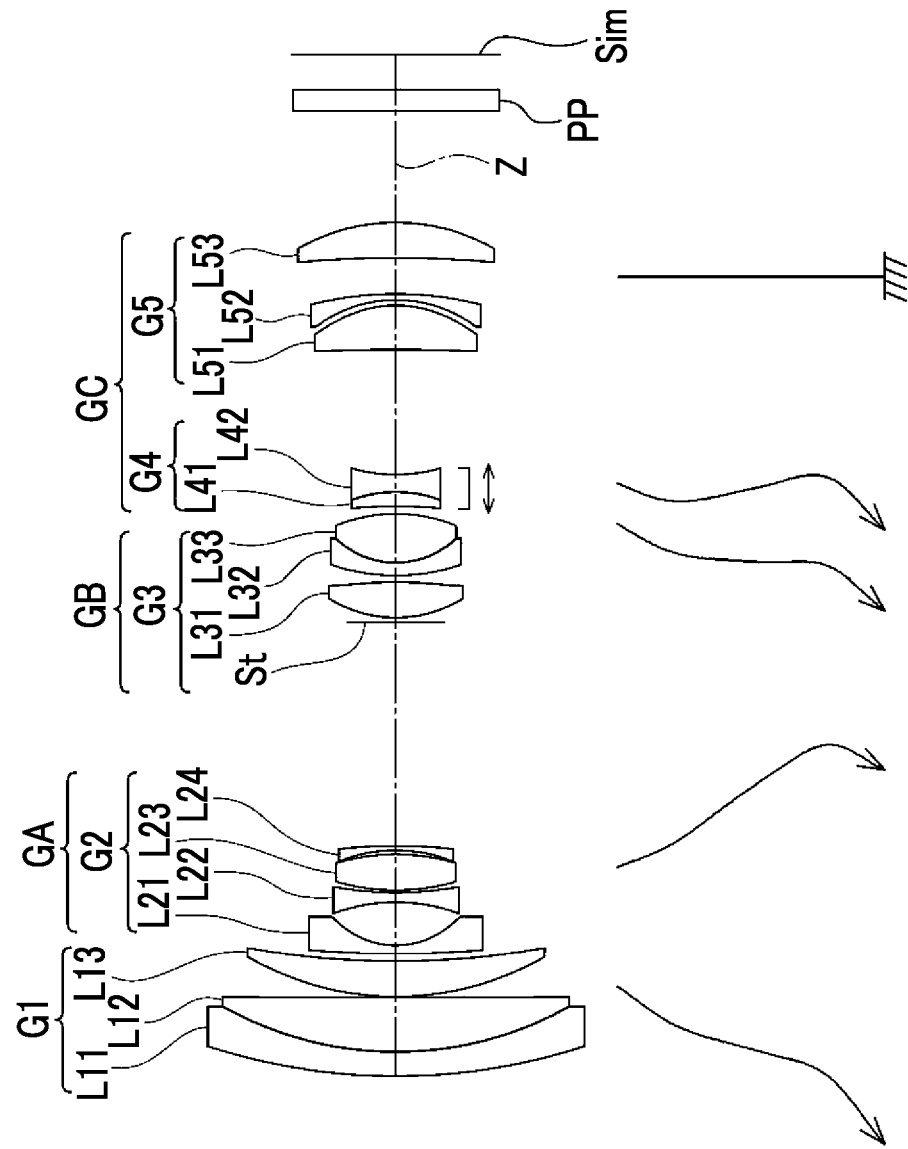
FIG. 11 is a cross-sectional view of a configuration of a zoom lens of Example 3 and a diagram showing movement loci thereof.

FIG. 11 shows a configuration and movement loci of the zoom lens of Example 3. The zoom lens shown in Example 3 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the fifth lens group G5 remains stationary with respect to the image plane Sim, and the first lens group G1, the second lens group G2, the third lens group G3, and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 3, Table 7 shows basic lens data, Table 8 shows specifications and variable surface spacings, and Table 9 shows aspherical coefficients thereof. FIG. 12 shows aberration diagrams. In Example 3, the distance on the optical axis from the lens surface closest to the object side to the close range object is 1.0 m (meters).

TABLE 7

Example 3

| Sn | R | D | Nd | vd | θgF | ED |
|---|---|---|---|---|---|---|
| 1 | 92.61294 | 3.262 | 1.92286 | 20.88 | 0.63900 | 54.04 |
| 2 | 53.65124 | 7.313 | 1.59283 | 68.63 | 0.54286 | 49.69 |
| 3 | 4517.09061 | 0.121 | | | | 48.71 |
| 4 | 44.81512 | 4.784 | 1.77535 | 50.30 | 0.55004 | 42.60 |
| 5 | 128.01894 | DD[5] | | | | 41.92 |
| *6 | 213.65270 | 1.145 | 1.80610 | 40.73 | 0.56940 | 24.84 |
| *7 | 12.70170 | 5.806 | | | | 18.30 |
| 8 | −26.88522 | 1.303 | 1.77535 | 50.30 | 0.55004 | 17.85 |
| 9 | 51.63385 | 0.307 | | | | 17.17 |
| 10 | 31.91637 | 4.828 | 1.84666 | 23.79 | 0.62056 | 17.11 |
| 11 | −31.56902 | 0.542 | | | | 16.35 |
| 12 | −22.33953 | 0.601 | 1.88300 | 40.76 | 0.56679 | 16.24 |
| 13 | −76.65821 | DD[13] | | | | 16.00 |
| 14(St) | ∞ | 0.632 | | | | 17.51 |
| *15 | 18.68637 | 4.781 | 1.49710 | 81.56 | 0.53848 | 19.06 |
| *16 | −49.22300 | 0.744 | | | | 18.94 |
| 17 | 30.00604 | 1.733 | 1.91082 | 35.25 | 0.58224 | 18.54 |
| 18 | 12.98634 | 6.562 | 1.53775 | 74.70 | 0.53936 | 17.19 |
| 19 | −23.94321 | DD[19] | | | | 17.06 |
| 20 | −79.12291 | 1.948 | 1.88123 | 27.53 | 0.60741 | 12.50 |
| 21 | −18.60817 | 2.329 | 1.78004 | 50.00 | 0.55109 | 12.58 |
| 22 | 23.54520 | DD[22] | | | | 12.71 |

TABLE 7-continued

Example 3

| Sn | R | D | Nd | vd | θgF | ED |
|---|---|---|---|---|---|---|
| 25 | −20.02018 | 0.800 | 2.00069 | 25.43 | 0.61417 | 22.81 |
| 26 | −52.08684 | 4.861 | | | | 24.29 |
| 27 | −167.96355 | 4.754 | 1.53172 | 48.85 | 0.56700 | 27.38 |
| 28 | −29.78891 | 15.000 | | | | 28.10 |
| 29 | ∞ | 2.850 | 1.51633 | 64.14 | 0.53531 | 29.38 |
| 30 | ∞ | 4.735 | | | | 29.51 |

TABLE 8

Example 3

| | Wide angle end_infinity | Telephoto end_infinity | Telephoto end_close |
|---|---|---|---|
| Zr | 1.00 | 6.30 | 6.30 |
| f | 18.551 | 116.871 | — |
| Bf | 21.614 | 21.614 | — |
| FNo. | 4.12 | 4.12 | 4.25 |
| 2ω[°] | 83.8 | 13.4 | 13.0 |
| IH | 14.9 | 14.9 | 14.9 |
| DD[5] | 1.000 | 34.101 | 34.101 |
| DD[13] | 30.061 | 6.284 | 6.284 |
| DD[19] | 1.000 | 6.068 | 8.247 |
| DD[22] | 16.854 | 22.906 | 20.726 |

TABLE 9

Example 3

| Sn | 6 | 7 | 23 | 24 |
|---|---|---|---|---|
| KA | −6.5985059E+02 | 9.2632919E−01 | 2.0281345E+02 | 1.0322718E+00 |
| A4 | 7.2872012E−05 | 6.1719315E−05 | 1.2055559E−05 | 2.5731846E−05 |
| A6 | −2.1105188E−06 | −8.3593592E−07 | −2.4932466E−07 | 2.5215915E−07 |
| A8 | 4.7319660E−08 | −8.0795717E−08 | 9.6772831E−09 | −1.7409990E−08 |
| A10 | −7.9513628E−10 | 5.9315217E−09 | −9.2421978E−11 | 6.4158879E−10 |
| A12 | 9.3934890E−12 | −2.0050240E−10 | −1.5910064E−12 | −1.2426583E−11 |
| A14 | −7.4102362E−14 | 3.9039118E−12 | 4.8091291E−14 | 1.3729067E−13 |
| A16 | 3.6783833E−16 | −4.4501804E−14 | −4.7819912E−16 | −8.6371114E−16 |
| A18 | −1.0327838E−18 | 2.7553203E−16 | 2.1682041E−18 | 2.8638107E−18 |
| A20 | 1.2461383E−21 | −7.1506946E−19 | −3.7741189E−21 | −3.8577185E−21 |

| Sn | 15 | 16 |
|---|---|---|
| KA | 1.4902677E+00 | 1.0000000E+00 |
| A3 | 6.5568985E−06 | 0.0000000E+00 |
| A4 | −2.5280759E−06 | 5.3950544E−05 |
| A5 | −2.9141071E−05 | −1.3977719E−05 |
| A6 | 1.6276276E−05 | 1.0144728E−05 |
| A7 | −4.0392473E−06 | −3.9828880E−06 |
| A8 | 2.4477623E−07 | 8.7491995E−07 |
| A9 | 9.0464664E−08 | −8.8643972E−08 |
| A10 | −1.6990822E−08 | −2.9596556E−09 |
| A11 | −2.4534913E−10 | 2.0443076E−09 |
| A12 | 3.0825088E−10 | −2.8803981E−10 |
| A13 | −2.3134201E−11 | 2.5839721E−11 |
| A14 | −7.8884947E−13 | −1.8603752E−12 |
| A15 | 1.6292002E−13 | 9.7346637E−14 |
| A16 | −5.4632706E−15 | −2.4344642E−15 |

TABLE 7-continued

Example 3

| Sn | R | D | Nd | vd | θgF | ED |
|---|---|---|---|---|---|---|
| *23 | −190.07943 | 5.947 | 1.58313 | 59.46 | 0.54056 | 22.55 |
| *24 | −16.98048 | 0.725 | | | | 23.18 |

Example 4

Figure 13:
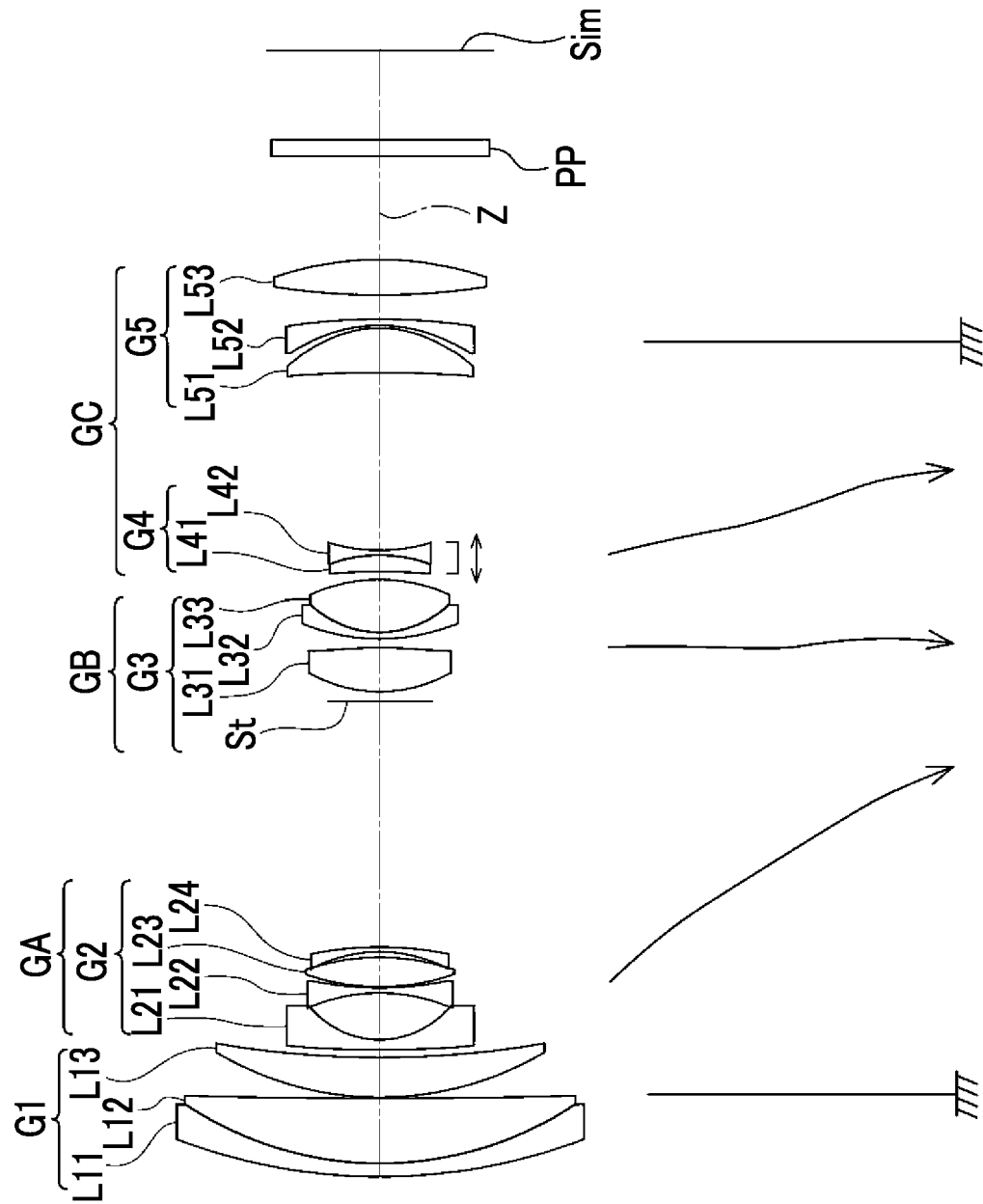
FIG. 13 is a cross-sectional view of a configuration of a zoom lens of Example 4 and a diagram showing movement loci thereof.

FIG. 13 shows a configuration and movement loci of the zoom lens of Example 4. The zoom lens shown in Example 4 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 4, Table 10 shows basic lens data, Table 11 shows specifications and variable surface spacings, and Table 12 shows aspherical coefficients thereof. FIG. 14 shows aberration diagrams. In Example 4, the distance on the optical axis from the lens surface closest to the object side to the close range object is 1.1 m (meters).

TABLE 10

Example 4

| Sn | R | D | Nd | vd | θgF | ED |
|---|---|---|---|---|---|---|
| 1 | 77.81886 | 1.650 | 1.92286 | 20.89 | 0.63806 | 54.04 |
| 2 | 48.66373 | 8.160 | 1.59283 | 68.63 | 0.54286 | 50.56 |
| 3 | 921.75358 | 0.110 | | | | 49.39 |
| 4 | 45.17296 | 4.913 | 1.77535 | 50.30 | 0.55004 | 42.60 |
| 5 | 132.08469 | DD[5] | | | | 41.80 |
| *6 | 789.67895 | 1.200 | 1.80610 | 40.73 | 0.56940 | 24.79 |
| *7 | 12.81187 | 5.804 | | | | 18.03 |
| 8 | −26.27896 | 0.650 | 1.77535 | 50.30 | 0.55004 | 17.43 |

TABLE 10-continued

Example 4

| Sn | R | D | Nd | vd | θgF | ED |
|---|---|---|---|---|---|---|
| 9 | 52.45468 | 0.120 | | | | 16.86 |
| 10 | 32.17113 | 3.733 | 1.84666 | 23.79 | 0.62056 | 16.80 |
| 11 | −32.17113 | 0.624 | | | | 16.33 |
| 12 | −21.38492 | 0.919 | 1.88299 | 40.78 | 0.56829 | 16.23 |
| 13 | −55.14030 | DD[13] | | | | 16.00 |
| 14(St) | ∞ | 1.200 | | | | 15.77 |
| *15 | 20.45744 | 4.412 | 1.49700 | 81.54 | 0.53748 | 17.52 |
| *16 | −49.65336 | 1.863 | | | | 17.58 |
| 17 | 31.26125 | 0.800 | 1.91082 | 35.25 | 0.58224 | 17.66 |
| 18 | 14.21582 | 6.419 | 1.53775 | 74.70 | 0.53936 | 17.03 |
| 19 | −23.31144 | DD[19] | | | | 17.06 |
| 20 | −82.49242 | 1.955 | 1.90200 | 25.26 | 0.61662 | 12.50 |
| 21 | −19.87652 | 0.610 | 1.78799 | 47.47 | 0.55346 | 12.67 |
| 22 | 25.17085 | DD[22] | | | | 12.94 |
| *23 | −208.13089 | 5.612 | 1.58313 | 59.46 | 0.54056 | 22.59 |
| *24 | −16.82414 | 0.389 | | | | 23.16 |
| 25 | −20.20914 | 1.355 | 2.00069 | 25.43 | 0.61417 | 22.83 |
| 26 | −61.28858 | 2.110 | | | | 24.65 |
| 27 | 37691.41588 | 4.400 | 1.53172 | 48.85 | 0.56700 | 26.64 |
| 28 | −31.78829 | 8.000 | | | | 27.15 |
| 29 | ∞ | 2.000 | 1.51633 | 64.14 | 0.53531 | 28.13 |
| 30 | ∞ | 17.244 | | | | 28.25 |

TABLE 11

Example 4

| | Wide angle end_infinity | Telephoto end_infinity | Telephoto end_close |
|---|---|---|---|
| Zr | 1.00 | 6.30 | 6.30 |
| f | 18.531 | 116.743 | — |
| Bf | 26.562 | 26.562 | — |
| FNo. | 4.12 | 4.12 | 4.23 |
| 2ω[°] | 82.8 | 13.4 | 13.2 |
| IH | 14.9 | 14.9 | 14.9 |
| DD[5] | 1.106 | 30.722 | 30.722 |
| DD[13] | 30.332 | 0.938 | 0.938 |
| DD[19] | 1.000 | 12.325 | 15.779 |
| DD[22] | 21.261 | 9.714 | 6.261 |

TABLE 12

Example 4

| Sn | 6 | 7 | 23 | 24 |
|---|---|---|---|---|
| KA | 1.0000000E+00 | 1.0000000E+00 | 1.0000000E+00 | 1.0000000E+00 |
| A4 | 7.6365798E−05 | 6.5656300E−05 | 4.6030309E−06 | 1.9082135E−05 |
| A6 | −2.1155939E−06 | −8.1894174E−07 | −3.1452115E−07 | 2.4850649E−07 |
| A8 | 4.7360768E−08 | −8.1175395E−08 | 9.9715681E−09 | −1.7749577E−08 |
| A10 | −7.9557165E−10 | 5.9365823E−09 | −9.1528319E−11 | 6.4558404E−10 |
| A12 | 9.3945159E−12 | −2.0049188E−10 | −1.5993264E−12 | −1.2433900E−11 |
| A14 | −7.4097865E−14 | 3.9035325E−12 | 4.8081810E−14 | 1.3726712E−13 |
| A16 | 3.6781808E−16 | −4.4501804E−14 | −4.7819344E−16 | −8.6374141E−16 |
| A18 | −1.0328099E−18 | 2.7553203E−16 | 2.1676321E−18 | 2.8638610E−18 |
| A20 | 1.2462110E−21 | −7.1506946E−19 | −3.7724338E−21 | −3.8590661E−21 |

| Sn | 15 | 16 |
|---|---|---|
| KA | 1.0000000E+00 | 1.0000000E+00 |
| A3 | 0.0000000E+00 | 0.0000000E+00 |
| A4 | 1.5252595E−05 | 5.7334642E−05 |
| A5 | −3.0264710E−05 | −1.4230338E−05 |
| A6 | 1.6365019E−05 | 1.0076699E−05 |
| A7 | −4.0352906E−06 | −3.9769011E−06 |
| A8 | 2.4445876E−07 | 8.7530132E−07 |
| A9 | 9.0481264E−08 | −8.8655275E−08 |
| A10 | −1.6990614E−08 | −2.9633010E−09 |
| A11 | −2.4546687E−10 | 2.0443086E−09 |

TABLE 12-continued

| | Example 4 | |
|---|---|---|
| A12 | 3.0825472E-10 | -2.8803409E-10 |
| A13 | -2.3134591E-11 | 2.5839625E-11 |
| A14 | -7.8885159E-13 | -1.8603928E-12 |
| A15 | 1.6291941E-13 | 9.7347431E-14 |
| A16 | -5.4632834E-15 | -2.4343050E-15 |

Example 5

Figure 15:
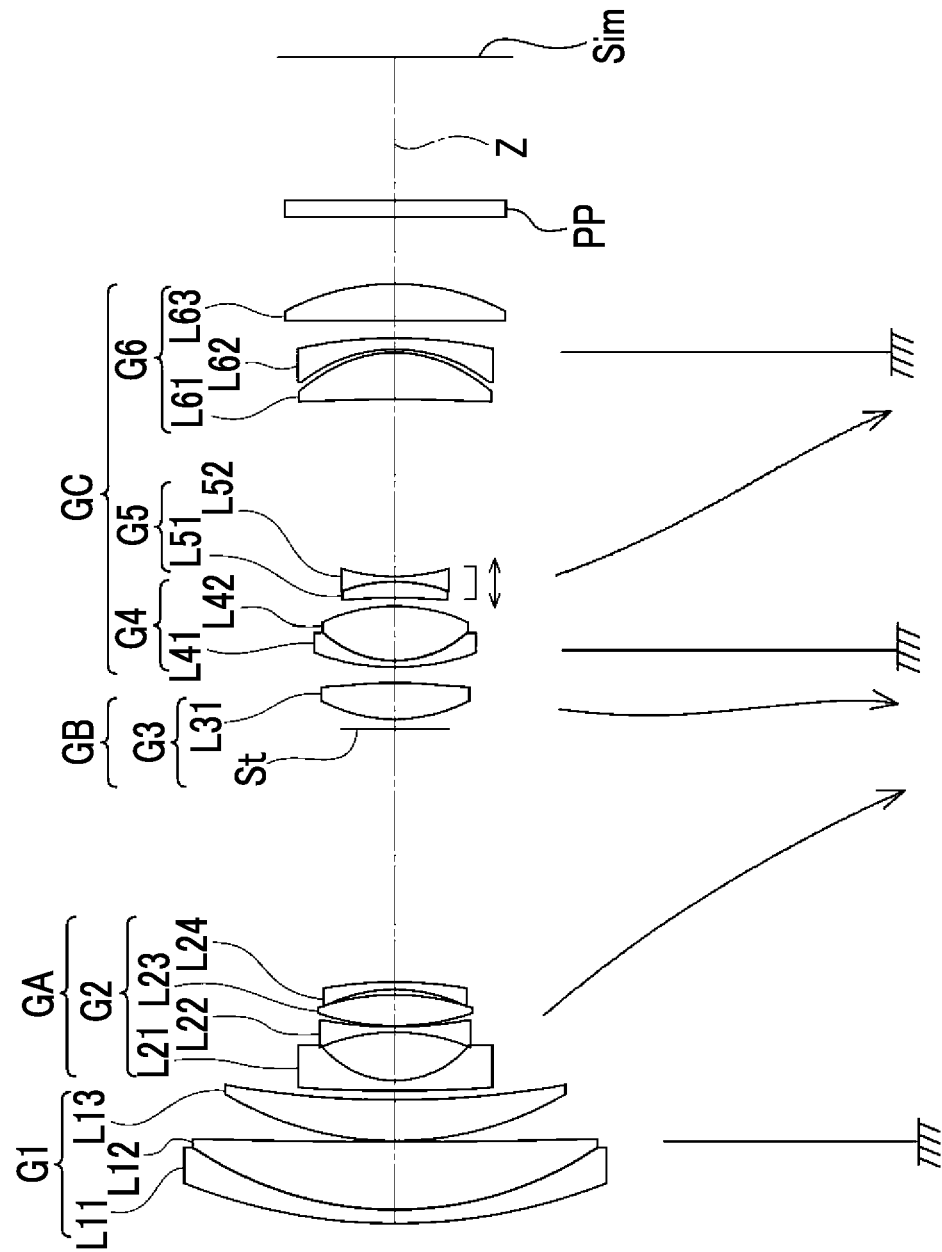
FIG. 15 is a cross-sectional view of a configuration of a zoom lens of Example 5 and a diagram showing movement loci thereof.

FIG. 15 shows a configuration and movement loci of the zoom lens of Example 5. The zoom lens of Example 5 consists of, in order from the object side to the image side, a first lens group G1 that has a positive refractive power, a second lens group G2 that has a negative refractive power, a third lens group G3 that has a positive refractive power, a fourth lens group G4 that has a positive refractive power, a fifth lens group G5 that has a negative refractive power, and a sixth lens group G6 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and one lens L31, in order from the object side to the image side. The fourth lens group G4 consists of two lenses L41 and L42, in order from the object side to the image side. The fifth lens group G5 consists of two lenses L51 and L52, in order from the object side to the image side. The sixth lens group G6 consists of three lenses L61 to L63, in order from the object side to the image side.

During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The front group GA consists of a second lens group G2. The middle group GB consists of a third lens group G3. The rear group GC consists of a fourth lens group G4, a fifth lens group G5, and a sixth lens group G6. The focusing group consists of a fifth lens group G5.

Regarding the zoom lens of Example 5, Table 13 shows basic lens data, Table 14 shows specifications and variable surface spacings, and Table 15 shows aspherical coefficients thereof. FIG. 16 shows aberration diagrams. In Example 5, the distance on the optical axis from the lens surface closest to the object side to the close range object is 1.1 m (meters).

TABLE 13

| | Example 5 | | | | | |
|---|---|---|---|---|---|---|
| Sn | R | D | Nd | vd | θgF | ED |
| 1 | 80.58712 | 1.650 | 1.92286 | 20.89 | 0.63806 | 54.04 |
| 2 | 49.27317 | 8.096 | 1.59283 | 68.63 | 0.54286 | 50.55 |
| 3 | 1040.97644 | 0.110 | | | | 49.40 |
| 4 | 45.13487 | 4.968 | 1.77535 | 50.30 | 0.55004 | 42.60 |
| 5 | 135.63769 | DD[5] | | | | 41.81 |
| *6 | 757.62492 | 1.200 | 1.80610 | 40.73 | 0.56940 | 24.79 |
| *7 | 13.09815 | 5.810 | | | | 18.02 |
| 8 | -25.54522 | 0.650 | 1.77535 | 50.30 | 0.55004 | 17.36 |

TABLE 13-continued

| | Example 5 | | | | | |
|---|---|---|---|---|---|---|
| Sn | R | D | Nd | vd | θgF | ED |
| 9 | 47.41398 | 0.120 | | | | 16.75 |
| 10 | 32.08373 | 3.667 | 1.84666 | 23.79 | 0.62056 | 16.70 |
| 11 | -32.08373 | 0.677 | | | | 16.26 |
| 12 | -20.71392 | 0.600 | 1.88299 | 40.78 | 0.56829 | 16.15 |
| 13 | -48.84682 | DD[13] | | | | 16.00 |
| 14(St) | ∞ | 1.200 | | | | 16.12 |
| *15 | 20.03369 | 5.469 | 1.49700 | 81.54 | 0.53748 | 17.89 |
| *16 | -54.66894 | DD[16] | | | | 17.87 |
| 17 | 29.40616 | 0.800 | 1.91082 | 35.25 | 0.58224 | 17.82 |
| 18 | 14.07211 | 6.434 | 1.53775 | 74.70 | 0.53936 | 17.11 |
| 19 | -24.06312 | DD[19] | | | | 17.06 |
| 20 | -81.91985 | 2.049 | 1.90200 | 25.26 | 0.61662 | 12.50 |
| 21 | -20.54862 | 0.610 | 1.78799 | 47.47 | 0.55346 | 12.68 |
| 22 | 25.11778 | DD[22] | | | | 12.95 |
| *23 | -157.52451 | 5.523 | 1.58313 | 59.46 | 0.54056 | 22.70 |
| *24 | -16.45398 | 0.301 | | | | 23.32 |
| 25 | -22.37453 | 0.800 | 2.00069 | 25.43 | 0.61417 | 22.89 |
| 26 | -88.03892 | 3.000 | | | | 24.24 |
| 27 | 96.50442 | 4.400 | 1.53172 | 48.85 | 0.56700 | 27.07 |
| 28 | -46.25586 | 12.906 | | | | 27.44 |
| 29 | ∞ | 2.000 | 1.51633 | 64.14 | 0.53531 | 28.74 |
| 30 | ∞ | 11.125 | | | | 28.86 |

TABLE 14

| | Example 5 | | |
|---|---|---|---|
| | Wide angle end_infinity | Telephoto end_infinity | Telephoto end_close |
| Zr | 1.00 | 6.30 | 6.30 |
| f | 18.527 | 116.723 | — |
| Bf | 25.349 | 25.349 | — |
| FNo. | 4.12 | 4.12 | 4.28 |
| 2ω[°] | 82.8 | 13.4 | 13.2 |
| IH | 14.9 | 14.9 | 14.9 |
| DD[5] | 1.000 | 30.396 | 30.396 |
| DD[13] | 30.583 | 0.950 | 0.950 |
| DD[16] | 1.100 | 1.338 | 1.338 |
| DD[19] | 1.000 | 13.255 | 16.642 |
| DD[22] | 22.091 | 9.836 | 6.449 |

TABLE 15

| | | Example 5 | | |
|---|---|---|---|---|
| Sn | 6 | 7 | 23 | 24 |
| KA | 1.0000000E+00 | 1.0000000E+00 | 1.0000000E+00 | 1.0000000E+00 |
| A4 | 8.0171659E−05 | 7.0138841E−05 | 4.2203819E−06 | 2.3304260E−05 |
| A6 | −2.1303258E−06 | −7.4609741E−07 | −3.1421321E−07 | 2.7550284E−07 |
| A8 | 4.7499450E−08 | −8.2370969E−08 | 1.0031140E−08 | −1.7949754E−08 |
| A10 | −7.9574734E−10 | 5.9549352E−09 | −9.3045412E−11 | 6.4665077E−10 |
| A12 | 9.3899341E−12 | −2.0049827E−10 | −1.5955731E−12 | −1.2430158E−11 |
| A14 | −7.4077653E−14 | 3.9031998E−12 | 4.8000989E−14 | 1.3717462E−13 |
| A16 | 3.6774493E−16 | −4.4501804E−14 | −4.7782592E−16 | −8.6390755E−16 |
| A18 | −1.0321670E−18 | 2.7553203E−16 | 2.1666378E−18 | 2.8656326E−18 |
| A20 | 1.2443369E−21 | −7.1506946E−19 | −3.7696644E−21 | −3.8585346E−21 |

| Sn | 15 | 16 |
|---|---|---|
| KA | 1.0000000E+00 | 1.0000000E+00 |
| A3 | 0.0000000E+00 | 0.0000000E−00 |
| A4 | 1.5487755E−05 | 5.7019851E−05 |
| A5 | −2.9987842E−05 | −1.3689721E−05 |
| A6 | 1.6331519E−05 | 1.0031451E−05 |
| A7 | −4.0390815E−06 | −3.9811195E−06 |
| A8 | 2.4526200E−07 | 8.7565937E−07 |
| A9 | 9.0474396E−08 | −8.8634199E−08 |
| A10 | −1.6990797E−08 | −2.9580578E−09 |
| A11 | −2.4561486E−10 | 2.0443848E−09 |
| A12 | 3.0823270E−10 | −2.8806598E−10 |
| A13 | −2.3134737E−11 | 2.5835578E−11 |
| A14 | −7.8892901E−13 | −1.8608432E−12 |
| A15 | 1.6294203E−13 | 9.7313528E−14 |
| A16 | −5.4600529E−15 | −2.4219019E−15 |

Example 6

Figure 17:
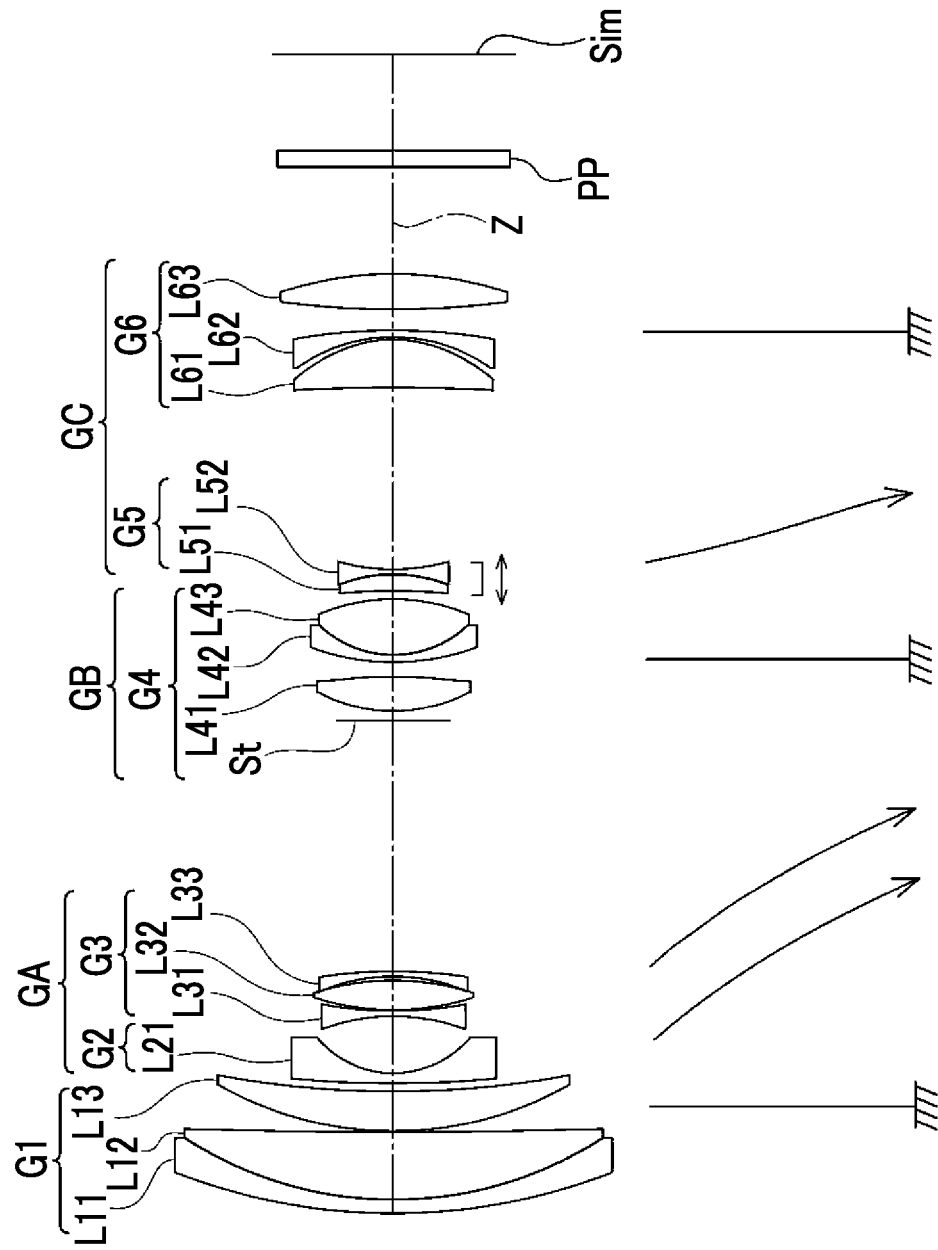
FIG. 17 is a cross-sectional view of a configuration of a zoom lens of Example 6 and a diagram showing movement loci thereof.

FIG. 17 shows a configuration and movement loci of the zoom lens of Example 6. The zoom lens of Example 6 consists of, in order from the object side to the image side, a first lens group G1 that has a positive refractive power, a second lens group G2 that has a negative refractive power, a third lens group G3 that has a negative refractive power, a fourth lens group G4 that has a positive refractive power, a fifth lens group G5 that has a negative refractive power, and a sixth lens group G6 that has a positive refractive power. The first lens group G1 consists of three lenses L11 to L13, in order from the object side to the image side. The second lens group G2 consists of one lens L21. The third lens group G3 consists of three lenses L31 to L33, in order from the object side to the image side. The fourth lens group G4 consists of an aperture stop St and three lenses L41 to L43, in order from the object side to the image side. The fifth lens group G5 consists of two lenses L51 and L52, in order from the object side to the image side. The sixth lens group G6 consists of three lenses L61 to L63, in order from the object side to the image side.

During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The front group GA consists of a second lens group G2 and a third lens group G3. The middle group GB consists of a fourth lens group G4. The rear group GC consists of a fifth lens group G5 and a sixth lens group G6. The focusing group consists of a fifth lens group G5.

Regarding the zoom lens of Example 6, Table 16 shows basic lens data, Table 17 shows specifications and variable surface spacings, and Table 18 shows aspherical coefficients thereof. FIG. 18 shows aberration diagrams. In Example 6, the distance on the optical axis from the lens surface closest to the object side to the close range object is 1.1 m (meters).

TABLE 16

| | | Example 6 | | | | |
|---|---|---|---|---|---|---|
| Sn | R | D | Nd | vd | θgF | ED |
| 1 | 76.83455 | 1.650 | 1.92286 | 20.89 | 0.63806 | 54.20 |
| 2 | 48.85123 | 8.175 | 1.59283 | 68.63 | 0.54286 | 50.78 |
| 3 | 869.59279 | 0.110 | | | | 49.60 |
| 4 | 44.74604 | 4.830 | 1.77535 | 50.30 | 0.55004 | 42.60 |
| 5 | 122.64546 | DD[5] | | | | 41.80 |
| *6 | 358.72762 | 1.200 | 1.80610 | 40.73 | 0.56940 | 25.36 |
| *7 | 12.86095 | DD[7] | | | | 18.48 |
| 8 | −25.57239 | 0.650 | 1.77535 | 50.30 | 0.55004 | 17.04 |
| 9 | 49.07971 | 0.120 | | | | 16.58 |
| 10 | 32.99201 | 3.558 | 1.84666 | 23.79 | 0.62056 | 16.58 |
| 11 | −32.99201 | 0.493 | | | | 16.21 |
| 12 | −23.29825 | 0.600 | 1.88299 | 40.78 | 0.56829 | 16.15 |
| 13 | −61.63302 | DD[13] | | | | 16.00 |
| 14(St) | ∞ | 1.200 | | | | 16.33 |
| *15 | 19.78920 | 4.199 | 1.49700 | 81.54 | 0.53748 | 18.13 |
| *16 | −47.18823 | 1.732 | | | | 18.12 |
| 17 | 30.34052 | 0.875 | 1.91082 | 35.25 | 0.58224 | 17.91 |
| 18 | 13.54077 | 6.610 | 1.53775 | 74.70 | 0.53936 | 17.09 |
| 19 | −24.18064 | DD[19] | | | | 17.06 |
| 20 | −75.26664 | 1.996 | 1.90200 | 25.26 | 0.61662 | 12.50 |
| 21 | −18.60929 | 0.610 | 1.78799 | 47.47 | 0.55346 | 12.67 |
| 22 | 25.05977 | DD[22] | | | | 12.96 |
| *23 | −208.31689 | 5.800 | 1.58313 | 59.46 | 0.54056 | 22.85 |
| *24 | −16.24410 | 0.300 | | | | 23.44 |
| 25 | −21.07268 | 0.800 | 2.00069 | 25.43 | 0.61417 | 22.98 |
| 26 | −73.74887 | 2.546 | | | | 24.43 |
| 27 | 108.00221 | 4.313 | 1.53172 | 48.85 | 0.56700 | 26.99 |
| 28 | −45.35016 | 12.906 | | | | 27.36 |
| 29 | ∞ | 2.000 | 1.51633 | 64.14 | 0.53531 | 28.68 |
| 30 | ∞ | 11.650 | | | | 28.80 |

TABLE 17

Example 6

| | Wide angle end_infinity | Telephoto end_infinity | Telephoto end_close |
|---|---|---|---|
| Zr | 1.00 | 6.30 | 6.30 |
| f | 18.529 | 116.732 | — |
| Bf | 25.874 | 25.874 | — |
| FNo. | 4.12 | 4.12 | 4.27 |
| 2ω[°] | 81.0 | 13.4 | 13.2 |
| IH | 14.9 | 14.9 | 14.9 |
| DD[5] | 1.000 | 30.299 | 30.299 |
| DD[7] | 6.872 | 6.972 | 6.972 |
| DD[13] | 30.260 | 0.861 | 0.861 |
| DD[19] | 1.000 | 13.405 | 16.799 |
| DD[22] | 21.952 | 9.547 | 6.153 |

TABLE 18

Example 6

| Sn | 6 | 7 | 23 | 24 |
|---|---|---|---|---|
| KA | 1.0000000E+00 | 1.0000000E+00 | 1.0000000E+00 | 1.0000000E+00 |
| A4 | 7.8931144E−05 | 6.9300123E−05 | 2.2873070E−06 | 2.1427524E−05 |
| A6 | −2.1199829E−06 | −7.9022377E−07 | −2.6637516E−07 | 2.6606998E−07 |
| A8 | 4.7291640E−08 | −8.1261473E−08 | 9.6010318E−09 | −1.7368879E−08 |
| A10 | −7.9524259E−10 | 5.9351594E−09 | −9.1422875E−11 | 6.4160820E−10 |
| A12 | 9.3942504E−12 | −2.0047075E−10 | −1.5864501E−12 | −1.2424929E−11 |
| A14 | −7.4102336E−14 | 3.9036191E−12 | 4.8095320E−14 | 1.3731515E−13 |
| A16 | 3.6784124E−16 | −4.4501804E−14 | −4.7840484E−16 | −8.6334243E−16 |
| A18 | −1.0326058E−18 | 2.7553203E−16 | 2.1657809E−18 | 2.8641723E−18 |
| A20 | 1.2448396E−21 | −7.1506946E−19 | −3.7809399E−21 | −3.8913441E−21 |

| Sn | 15 | 16 |
|---|---|---|
| KA | 1.0000000E+00 | 1.0000000E+00 |
| A3 | 0.0000000E+00 | 0.0000000E+00 |
| A4 | 1.2150478E−05 | 5.3570860E−05 |
| A5 | −3.0186488E−05 | −1.4395264E−05 |
| A6 | 1.6389201E−05 | 1.0150510E−05 |
| A7 | −4.0390994E−06 | −3.9824681E−06 |
| A8 | 2.4476802E−07 | 8.7498285E−07 |
| A9 | 9.0465287E−08 | −8.8642389E−08 |
| A10 | −1.6990786E−08 | −2.9595041E−09 |
| A11 | −2.4535007E−10 | 2.0443017E−09 |
| A12 | 3.0825146E−10 | −2.8804177E−10 |
| A13 | −2.3133770E−11 | 2.5839493E−11 |
| A14 | −7.8876387E−13 | −1.8603061E−12 |
| A15 | 1.6292627E−13 | 9.7349178E−14 |
| A16 | −5.4642138E−15 | −2.4341379E−15 |

Example 7

Figure 19:
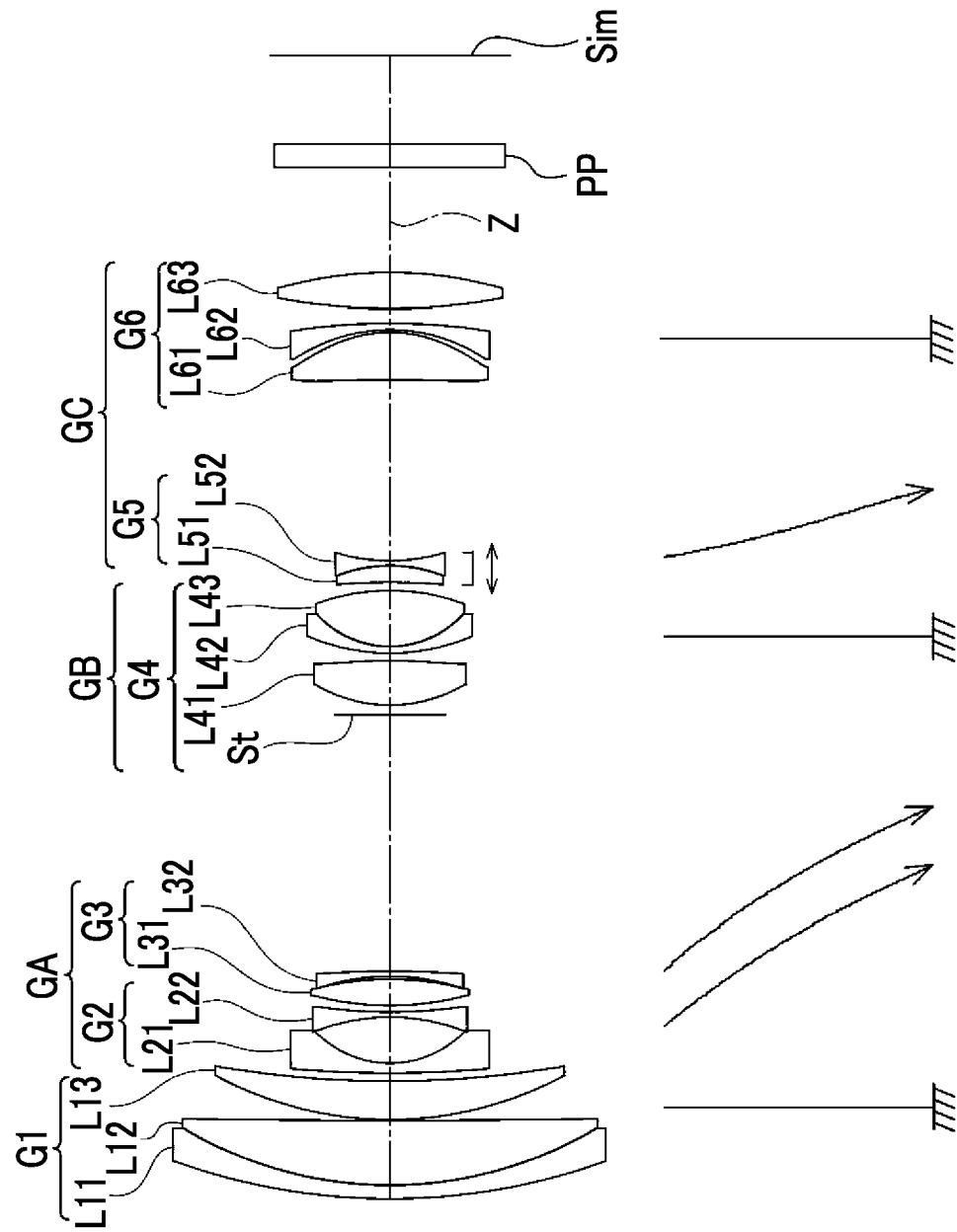
FIG. 19 is a cross-sectional view of a configuration of a zoom lens of Example 7 and a diagram showing movement loci thereof.

FIG. 19 shows a configuration and movement loci of the zoom lens of Example 7. The zoom lens of Example 7 consists of, in order from the object side to the image side, a first lens group G1 that has a positive refractive power, a second lens group G2 that has a negative refractive power, a third lens group G3 that has a positive refractive power, a fourth lens group G4 that has a positive refractive power, a fifth lens group G5 that has a negative refractive power, and a sixth lens group G6 that has a positive refractive power. The first lens group G1 consists of three lenses L11 to L13, in order from the object side to the image side. The second lens group G2 consists of two lenses L21 and L22, in order from the object side to the image side. The third lens group G3 consists of two lenses L31 and L32, in order from the object side to the image side. The fourth lens group G4 consists of an aperture stop St and three lenses L41 to L43, in order from the object side to the image side. The fifth lens group G5 consists of two lenses L51 and L52, in order from the object side to the image side. The sixth lens group G6 consists of three lenses L61 to L63, in order from the object side to the image side.

During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The front group GA consists of a second lens group G2 and a third lens group G3. The middle group GB consists of a fourth lens group G4. The rear group GC consists of a fifth lens group G5 and a sixth lens group G6. The focusing group consists of a fifth lens group G5.

Regarding the zoom lens of Example 7, Table 19 shows basic lens data, Table 20 shows specifications and variable surface spacings, and Table 21 shows aspherical coefficients thereof. FIG. 20 shows aberration diagrams. In Example 7, the distance on the optical axis from the lens surface closest to the object side to the close range object is 1.1 m (meters).

TABLE 19

Example 7

| Sn | R | D | Nd | vd | θgF | ED |
|---|---|---|---|---|---|---|
| 1 | 81.29480 | 1.650 | 1.92286 | 20.89 | 0.63806 | 54.04 |
| 2 | 51.02215 | 7.970 | 1.59283 | 68.63 | 0.54286 | 50.73 |
| 3 | 1695.72138 | 0.110 | | | | 49.58 |
| 4 | 46.50410 | 4.724 | 1.77535 | 50.30 | 0.55004 | 42.68 |
| 5 | 131.01606 | DD[5] | | | | 41.91 |
| *6 | 282.30339 | 1.200 | 1.80610 | 40.73 | 0.56940 | 24.34 |
| *7 | 13.49101 | 5.618 | | | | 18.10 |
| 8 | −26.19086 | 0.650 | 1.77535 | 50.30 | 0.55004 | 17.49 |
| 9 | 64.95229 | DD[9] | | | | 16.91 |
| 10 | 38.37452 | 3.217 | 1.85896 | 22.73 | 0.62844 | 16.70 |
| 11 | −38.37452 | 0.359 | | | | 16.28 |

TABLE 19-continued

Example 7

| Sn | R | D | Nd | νd | θgF | ED |
|---|---|---|---|---|---|---|
| 12 | −28.28842 | 0.600 | 1.88299 | 40.78 | 0.56829 | 16.23 |
| 13 | −134.15651 | DD[13] | | | | 15.92 |
| 14(St) | ∞ | 1.200 | | | | 16.43 |
| *15 | 18.25373 | 5.481 | 1.49700 | 81.54 | 0.53748 | 18.50 |
| *16 | −59.21189 | 0.934 | | | | 18.38 |
| 17 | 26.67867 | 0.800 | 1.91082 | 35.25 | 0.58224 | 18.15 |
| 18 | 12.51044 | 6.865 | 1.53775 | 74.70 | 0.53936 | 17.16 |
| 19 | −27.23035 | DD[19] | | | | 17.06 |
| 20 | −81.51771 | 2.042 | 1.90200 | 25.26 | 0.61662 | 12.54 |
| 21 | −18.45794 | 0.610 | 1.78799 | 47.47 | 0.55346 | 12.71 |
| 22 | 24.05135 | DD[22] | | | | 12.99 |
| *23 | −208.33315 | 5.800 | 1.58313 | 59.46 | 0.54056 | 23.32 |
| *24 | −16.51891 | 0.300 | | | | 23.64 |
| 25 | −21.80783 | 0.800 | 2.00069 | 25.43 | 0.61417 | 23.28 |
| 26 | −81.12206 | 1.740 | | | | 24.73 |

TABLE 20

Example 7

| | Wide angle end_infinity | Telephoto end_infinity | Telephoto end_close |
|---|---|---|---|
| Zr | 1.00 | 6.30 | 6.30 |
| f | 18.530 | 116.736 | — |
| Bf | 25.619 | 25.619 | — |
| FNo. | 4.12 | 4.12 | 4.24 |
| 2ω[°] | 83.2 | 13.4 | 13.2 |
| IH | 14.9 | 14.9 | 14.9 |
| DD[5] | 1.000 | 31.074 | 31.074 |
| DD[9] | 0.800 | 1.146 | 1.146 |
| DD[13] | 31.355 | 0.934 | 0.934 |
| DD[19] | 1.000 | 13.545 | 16.997 |
| DD[22] | 22.218 | 9.673 | 6.221 |

TABLE 21

Example 7

| Sn | 6 | 7 | 23 | 24 |
|---|---|---|---|---|
| KA | 1.0000000E+00 | 1.0000000E+00 | 1.0000000E+00 | 1.0000000E+00 |
| A4 | 7.5840671E−05 | 6.9737698E−05 | 9.9229100E−06 | 2.5834706E−05 |
| A6 | −2.1152786E−06 | −7.1911413E−07 | −4.2882833E−07 | 2.3650875E−07 |
| A8 | 4.6906281E−08 | −8.4621120E−08 | 1.1596158E−08 | −1.7974732E−08 |
| A10 | −7.9104566E−10 | 5.9958637E−09 | −9.5701754E−11 | 6.5569777E−10 |
| A12 | 9.3749977E−12 | −2.0106428E−10 | −1.6112615E−12 | −1.2480255E−11 |
| A14 | −7.4057936E−14 | 3.9058884E−12 | 4.7905953E−14 | 1.3727075E−13 |
| A16 | 3.6772692E−16 | −4.4501804E−14 | −4.7733014E−16 | −8.6410135E−16 |
| A18 | −1.0323341E−18 | 2.7553203E−16 | 2.1810041E−18 | 2.8599777E−18 |
| A20 | 1.2450431E−21 | −7.1506946E−19 | −3.8063128E−21 | −3.7837083E−21 |

| Sn | 15 | 16 |
|---|---|---|
| KA | 1.0000000E+00 | 1.0000000E+00 |
| A3 | 0.0000000E+00 | 0.0000000E+00 |
| A4 | 1.3700532E−05 | 5.1978465E−05 |
| A5 | −2.9806094E−05 | −1.3272254E−05 |
| A6 | 1.6295184E−05 | 9.9536454E−06 |
| A7 | −4.0424587E−06 | −3.9828404E−06 |
| A8 | 2.4484977E−07 | 8.7537977E−07 |
| A9 | 9.0697440E−08 | −8.8452606E−08 |
| A10 | −1.6998356E−08 | −2.9616688E−09 |
| A11 | −2.4596232E−10 | 2.0440300E−09 |
| A12 | 3.0819942E−10 | −2.8809614E−10 |
| A13 | −2.3133049E−11 | 2.5826107E−11 |
| A14 | −7.8939148E−13 | −1.8605131E−12 |
| A15 | 1.6288555E−13 | 9.7370920E−14 |
| A16 | −5.4492724E−15 | −2.4208538E−15 |

TABLE 19-continued

Example 7

| Sn | R | D | Nd | νd | θgF | ED |
|---|---|---|---|---|---|---|
| 27 | 77.91717 | 4.400 | 1.53172 | 48.85 | 0.56700 | 27.05 |
| 28 | −51.57085 | 12.906 | | | | 27.39 |
| 29 | ∞ | 2.850 | 1.51633 | 64.14 | 0.53531 | 28.70 |
| 30 | ∞ | 10.835 | | | | 28.86 |

Example 8

Figure 21:
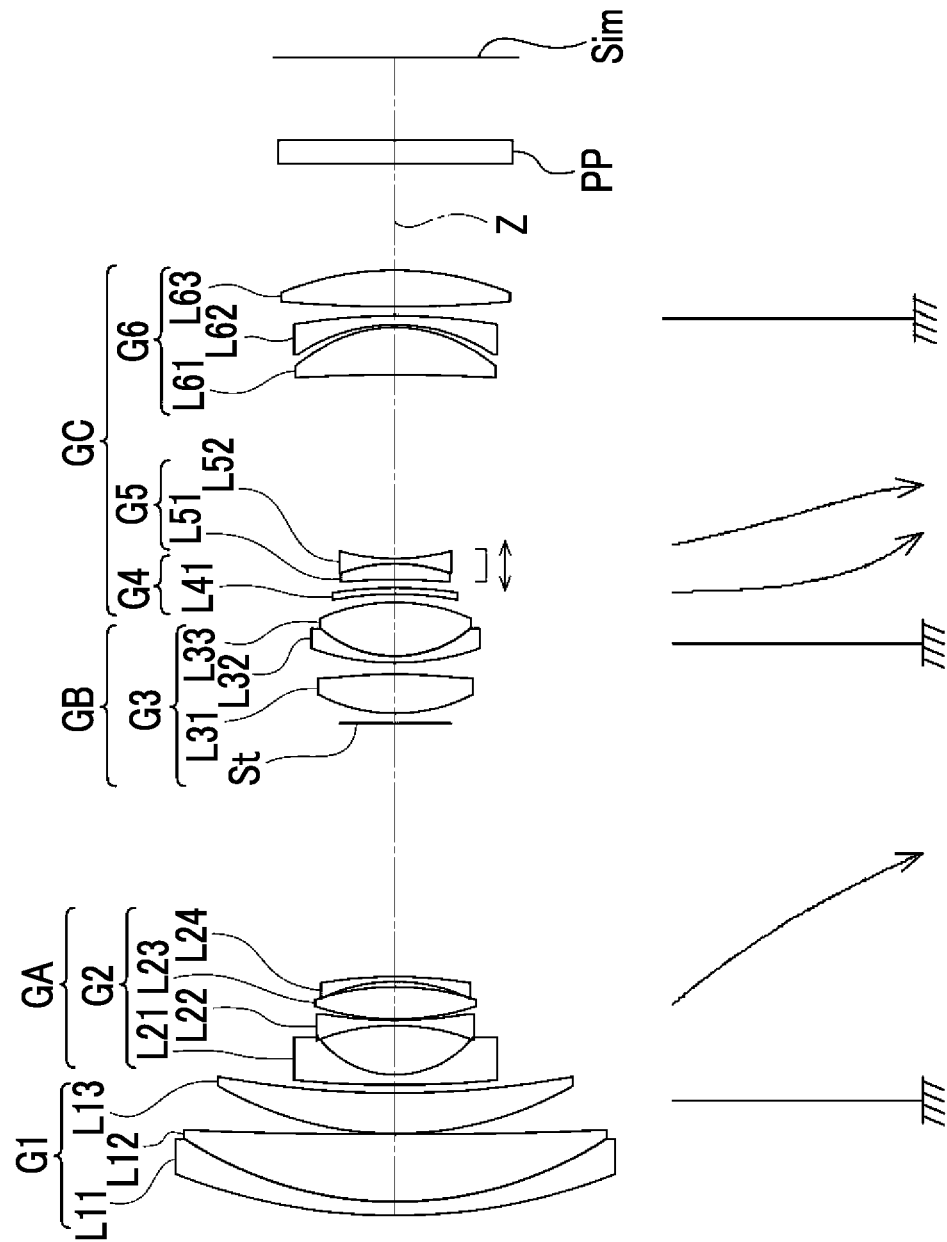
FIG. 21 is a cross-sectional view of a configuration of a zoom lens of Example 8 and a diagram showing movement loci thereof.

FIG. 21 shows a configuration and movement loci of the zoom lens of Example 8. The zoom lens of Example 8 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, a fifth lens group G5 that has a negative refractive power, and a sixth lens group G6 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of one lens L41. The fifth lens group G5 consists of two lenses L51 and L52, in order from the object side to the image side. The sixth lens group G6 consists of three lenses L61 to L63, in order from the object side to the image side.

During zooming, the first lens group G1, the third lens group G3, and the sixth lens group G6 remain stationary with respect to the image plane Sim, and the second lens group G2, the fourth lens group G4, and the fifth lens group G5 move along the optical axis Z by changing the spacings between the adjacent lens groups. The front group GA consists of a second lens group G2. The middle group GB consists of a third lens group G3. The rear group GC consists of a fourth lens group G4, a fifth lens group G5, and a sixth lens group G6. The focusing group consists of a fifth lens group G5.

Regarding the zoom lens of Example 8, Table 22 shows basic lens data, Table 23 shows specifications and variable surface spacings, and Table 24 shows aspherical coefficients thereof. FIG. 22 shows aberration diagrams. In Example 8, the distance on the optical axis from the lens surface closest to the object side to the close range object is 1.1 m (meters).

TABLE 22

Example 8

| Sn | R | D | Nd | vd | θgF | ED |
|---|---|---|---|---|---|---|
| 1 | 75.26774 | 1.650 | 1.92286 | 20.89 | 0.63806 | 54.04 |
| 2 | 47.71018 | 8.180 | 1.59283 | 68.63 | 0.54286 | 50.53 |
| 3 | 648.62283 | 0.110 | | | | 49.34 |
| 4 | 44.17164 | 4.892 | 1.77535 | 50.30 | 0.55004 | 42.60 |
| 5 | 121.12035 | DD[5] | | | | 41.79 |
| *6 | 294.54691 | 1.200 | 1.80610 | 40.73 | 0.56940 | 24.84 |
| *7 | 12.38506 | 5.947 | | | | 17.96 |
| 8 | −26.50151 | 0.650 | 1.77535 | 50.30 | 0.55004 | 17.37 |
| 9 | 53.60574 | 0.120 | | | | 16.84 |
| 10 | 32.21829 | 3.890 | 1.84666 | 23.79 | 0.62056 | 16.78 |
| 11 | −32.21829 | 0.642 | | | | 16.27 |

TABLE 22-continued

Example 8

| Sn | R | D | Nd | vd | θgF | ED |
|---|---|---|---|---|---|---|
| 12 | −21.14661 | 0.600 | 1.88299 | 40.78 | 0.56829 | 16.17 |
| 13 | −54.09060 | DD[13] | | | | 16.00 |
| 14(St) | ∞ | 1.200 | | | | 16.01 |
| *15 | 20.74848 | 4.735 | 1.49700 | 81.54 | 0.53748 | 17.69 |
| *16 | −50.53783 | 1.404 | | | | 17.73 |
| 17 | 31.21623 | 0.800 | 1.91082 | 35.25 | 0.58224 | 17.70 |
| 18 | 14.16167 | 6.505 | 1.53775 | 74.70 | 0.53936 | 17.05 |
| 19 | −22.62331 | DD[19] | | | | 17.06 |
| 20 | −40.98369 | 0.741 | 1.51633 | 64.14 | 0.53531 | 15.24 |
| 21 | −49.91589 | DD[21] | | | | 15.15 |
| 22 | −75.30507 | 1.929 | 1.90200 | 25.26 | 0.61662 | 12.52 |
| 23 | −19.55329 | 0.610 | 1.78799 | 47.47 | 0.55346 | 12.72 |
| 24 | 25.97864 | DD[24] | | | | 13.07 |
| *25 | −208.33408 | 5.747 | 1.58313 | 59.46 | 0.54056 | 23.03 |
| *26 | −16.60213 | 0.300 | | | | 23.66 |
| 27 | −21.78026 | 1.064 | 2.00069 | 25.43 | 0.61417 | 23.29 |
| 28 | −76.35389 | 0.999 | | | | 24.90 |
| 29 | 157.47712 | 4.400 | 1.53172 | 48.85 | 0.56700 | 26.50 |
| 30 | −37.77246 | 12.906 | | | | 26.95 |
| 31 | ∞ | 2.850 | 1.51633 | 64.14 | 0.53531 | 28.59 |
| 32 | ∞ | 9.974 | | | | 28.79 |

TABLE 23

Example 8

| | Wide angle end_infinity | Telephoto end_infinity | Telephoto end_close |
|---|---|---|---|
| Zr | 1.00 | 6.30 | 6.30 |
| f | 18.531 | 116.748 | — |
| Bf | 24.759 | 24.759 | — |
| FNo. | 4.12 | 4.12 | 4.27 |
| 2ω[°] | 82.6 | 13.4 | 13.0 |
| IH | 14.9 | 14.9 | 14.9 |
| DD[5] | 0.999 | 30.583 | 30.583 |
| DD[13] | 30.520 | 0.936 | 0.936 |
| DD[19] | 1.000 | 12.656 | 12.656 |
| DD[21] | 1.000 | 1.000 | 4.794 |
| DD[24] | 22.232 | 10.577 | 6.783 |

TABLE 24

Example 8

| Sn | 6 | 7 | 25 | 26 |
|---|---|---|---|---|
| KA | 1.0000000E+00 | 1.0000000E+00 | 1.0000000E+00 | 1.0000000E+00 |
| A4 | 7.5914207E−05 | 6.5937089E−05 | 2.9068802E−06 | 2.1307266E−05 |
| A6 | −2.1047568E−06 | −7.5402317E−07 | −3.2793715E−07 | 2.4133051E−07 |
| A8 | 4.7162530E−08 | −8.2302834E−08 | 1.0119943E−08 | −1.7600770E−08 |
| A10 | −7.9452853E−10 | 5.9417593E−09 | −9.2595839E−11 | 6.4460634E−10 |
| A12 | 9.3979737E−12 | −2.0044564E−10 | −1.5975117E−12 | −1.2430720E−11 |
| A14 | −7.4143411E−14 | 3.9032141E−12 | 4.8100239E−14 | 1.3726239E−13 |
| A16 | 3.6788539E−16 | −4.4501804E−14 | −4.7830220E−16 | −8.6354983E−16 |
| A18 | −1.0328677E−18 | 2.7553203E−16 | 2.1677266E−18 | 2.8633500E−18 |
| A20 | 1.2475371E−21 | −7.1506946E−19 | −3.7740890E−21 | −3.8641648E−21 |

| Sn | 15 | 16 |
|---|---|---|
| KA | 1.0000000E+00 | 1.0000000E+00 |
| A3 | 0.0000000E+00 | 0.0000000E+00 |
| A4 | 1.6615693E−05 | 5.5088680E−05 |
| A5 | −3.0071459E−05 | −1.3612049E−05 |
| A6 | 1.6395175E−05 | 1.0037407E−05 |
| A7 | −4.0435537E−06 | −3.9827352E−06 |
| A8 | 2.4424386E−07 | 8.7572427E−07 |
| A9 | 9.0563927E−08 | −8.8634395E−08 |
| A10 | −1.6987639E−08 | −2.9615631E−09 |
| A11 | −2.4594657E−10 | 2.0443712E−09 |
| A12 | 3.0825553E−10 | −2.8806381E−10 |

TABLE 24-continued

| | Example 8 | |
|---|---|---|
| A13 | −2.3134602E−11 | 2.5838661E−11 |
| A14 | −7.8890684E−13 | −1.8603615E−12 |
| A15 | 1.6292320E−13 | 9.7355024E−14 |
| A16 | −5.4633658E−15 | −2.4345203E−15 |

Example 9

Figure 23:
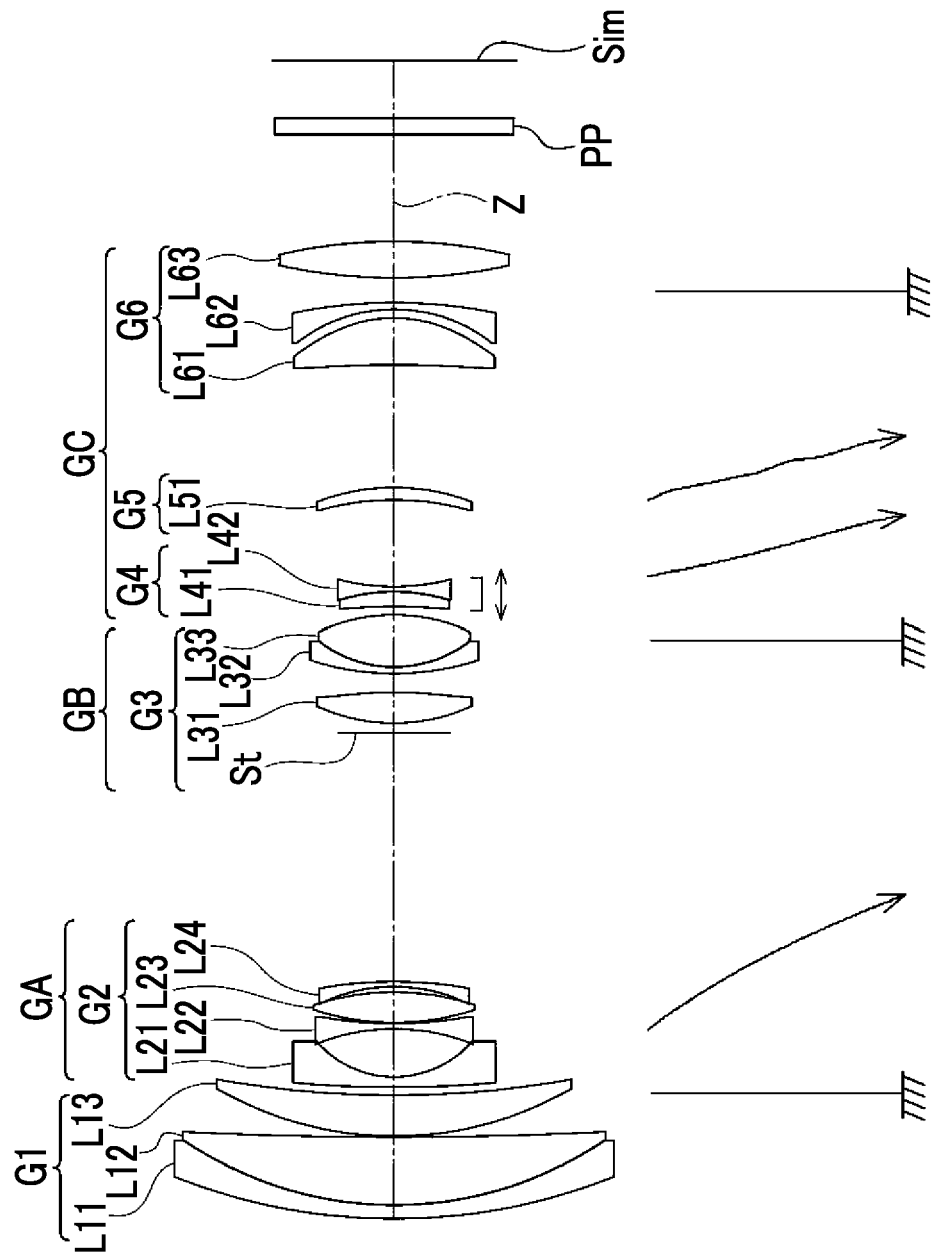
FIG. 23 is a cross-sectional view of a configuration of a zoom lens of Example 9 and a diagram showing movement loci thereof.

FIG. 23 shows a configuration and movement loci of the zoom lens of Example 9. The zoom lens of Example 9 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, a fifth lens group G5 that has a positive refractive power, and a sixth lens group G6 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of one lens L51. The sixth lens group G6 consists of three lenses L61 to L63, in order from the object side to the image side.

During zooming, the first lens group G1, the third lens group G3, and the sixth lens group G6 remain stationary with respect to the image plane Sim, and the second lens group G2, the fourth lens group G4, and the fifth lens group G5 move along the optical axis Z by changing the spacings between the adjacent lens groups. The front group GA consists of a second lens group G2. The middle group GB consists of a third lens group G3. The rear group GC consists of a fourth lens group G4, a fifth lens group G5, and a sixth lens group G6. The focusing group consists of a fourth lens group G4.

Regarding the zoom lens of Example 9, Table 25 shows basic lens data, Table 26 shows specifications and variable surface spacings, and Table 27 shows aspherical coefficients thereof. FIG. 24 shows aberration diagrams. In Example 9, the distance on the optical axis from the lens surface closest to the object side to the close range object is 1.1 m (meters).

TABLE 25

| | Example 9 | | | | | |
|---|---|---|---|---|---|---|
| Sn | R | D | Nd | vd | θgF | ED |
| 1 | 74.73825 | 1.650 | 1.89286 | 20.36 | 0.63944 | 54.04 |
| 2 | 46.74655 | 8.220 | 1.59283 | 68.63 | 0.54286 | 50.41 |
| 3 | 530.41718 | 0.110 | | | | 49.21 |
| 4 | 44.23190 | 4.949 | 1.77535 | 50.30 | 0.55004 | 42.60 |
| 5 | 125.08658 | DD[5] | | | | 41.79 |
| *6 | 568.83466 | 1.200 | 1.80610 | 40.73 | 0.56940 | 24.84 |
| *7 | 12.84453 | 5.844 | | | | 18.02 |
| 8 | −26.09379 | 0.650 | 1.77535 | 50.30 | 0.55004 | 17.39 |
| 9 | 49.47980 | 0.120 | | | | 16.79 |
| 10 | 32.09731 | 3.673 | 1.84666 | 23.79 | 0.62056 | 16.73 |

TABLE 25-continued

| | Example 9 | | | | | |
|---|---|---|---|---|---|---|
| Sn | R | D | Nd | vd | θgF | ED |
| 11 | −32.09731 | 0.673 | | | | 16.27 |
| 12 | −20.76607 | 0.600 | 1.88299 | 40.78 | 0.56829 | 16.17 |
| 13 | −52.22422 | DD[13] | | | | 16.00 |
| 14(St) | ∞ | 1.200 | | | | 15.88 |
| *15 | 22.64254 | 3.744 | 1.49700 | 81.54 | 0.53748 | 17.43 |
| *16 | −43.57860 | 2.251 | | | | 17.50 |
| 17 | 33.53738 | 0.800 | 1.91082 | 35.25 | 0.58224 | 17.57 |
| 18 | 15.31103 | 6.179 | 1.53775 | 74.70 | 0.53936 | 17.03 |
| 19 | −22.47761 | DD[19] | | | | 17.06 |
| 20 | −74.72993 | 1.800 | 1.90200 | 25.26 | 0.61662 | 12.54 |
| 21 | −22.44181 | 0.610 | 1.78799 | 47.47 | 0.55346 | 12.73 |
| 22 | 26.88762 | DD[22] | | | | 13.04 |
| 23 | −34.03432 | 1.500 | 1.51633 | 64.14 | 0.53531 | 18.35 |
| 24 | −26.51784 | DD[24] | | | | 18.94 |
| *25 | −125.00476 | 5.640 | 1.58313 | 59.46 | 0.54056 | 23.20 |
| *26 | −16.64435 | 1.057 | | | | 23.67 |
| 27 | −19.67997 | 0.806 | 2.00069 | 25.43 | 0.61417 | 22.92 |
| 28 | −61.83884 | 3.000 | | | | 24.52 |
| 29 | 66.57481 | 4.400 | 1.53172 | 48.85 | 0.56700 | 27.82 |
| 30 | −63.07795 | 12.906 | | | | 28.10 |
| 31 | ∞ | 2.000 | 1.51633 | 64.14 | 0.53531 | 29.23 |
| 32 | ∞ | 6.938 | | | | 29.33 |

TABLE 26

| | Example 9 | | |
|---|---|---|---|
| | Wide angle end_infinity | Telephoto end_infinity | Telephoto end_close |
| Zr | 1.00 | 6.30 | 6.30 |
| f | 18.529 | 116.733 | — |
| Bf | 21.162 | 21.162 | — |
| FNo. | 4.12 | 4.12 | 4.28 |
| 2ω[°] | 82.0 | 13.4 | 13.2 |
| IH | 14.9 | 14.9 | 14.9 |
| DD[5] | 1.000 | 30.109 | 30.109 |
| DD[13] | 30.045 | 0.936 | 0.936 |
| DD[19] | 1.000 | 14.184 | 17.819 |
| DD[22] | 10.481 | 11.169 | 7.535 |
| DD[24] | 14.871 | 0.998 | 0.998 |

TABLE 27

Example 9

| Sn | 6 | 7 | 25 | 26 |
|---|---|---|---|---|
| KA | 1.0000000E+00 | 1.0000000E+00 | 1.0000000E+00 | 1.0000000E+00 |
| A4 | 8.0280870E−05 | 6.8370318E−05 | 7.1344034E−06 | 2.0402977E−05 |
| A6 | −2.1186734E−06 | −7.7313660E−07 | −3.0107945E−07 | 2.4407657E−07 |
| A8 | 4.7338726E−08 | −8.1101884E−08 | 9.8317976E−09 | −1.7520033E−08 |
| A10 | −7.9506542E−10 | 5.9284678E−09 | −9.2659149E−11 | 6.4283664E−10 |
| A12 | 9.3942648E−12 | −2.0028650E−10 | −1.5864889E−12 | −1.2422106E−11 |
| A14 | −7.4114726E−14 | 3.9024254E−12 | 4.8093313E−14 | 1.3727808E−13 |
| A16 | 3.6780107E−16 | −4.4501804E−14 | −4.7821700E−16 | −8.6375247E−16 |
| A18 | −1.0325627E−18 | 2.7553203E−16 | 2.1668462E−18 | 2.8634944E−18 |
| A20 | 1.2467953E−21 | −7.1506946E−19 | −3.7678006E−21 | −3.8547178E−21 |

| Sn | 15 | 16 |
|---|---|---|
| KA | 1.0000000E+00 | 1.0000000E+00 |
| A3 | 0.0000000E+00 | 0.0000000E+00 |
| A4 | 1.4938268E−05 | 5.5751227E−05 |
| A5 | −3.0335298E−05 | −1.4449697E−05 |
| A6 | 1.6425369E−05 | 1.0159914E−05 |
| A7 | −4.0397219E−06 | −3.9801925E−06 |
| A8 | 2.4476415E−07 | 8.7498628E−07 |
| A9 | 9.0474133E−08 | −8.8635106E−08 |
| A10 | −1.6991654E−08 | −2.9592354E−09 |
| A11 | −2.4529111E−10 | 2.0442552E−09 |
| A12 | 3.0824068E−10 | −2.8804638E−10 |
| A13 | −2.3134492E−11 | 2.5839612E−11 |
| A14 | −7.8883425E−13 | −1.8604732E−12 |
| A15 | 1.6293485E−13 | 9.7338752E−14 |
| A16 | −5.4649447E−15 | −2.4337292E−15 |

Example 10

Figure 25:
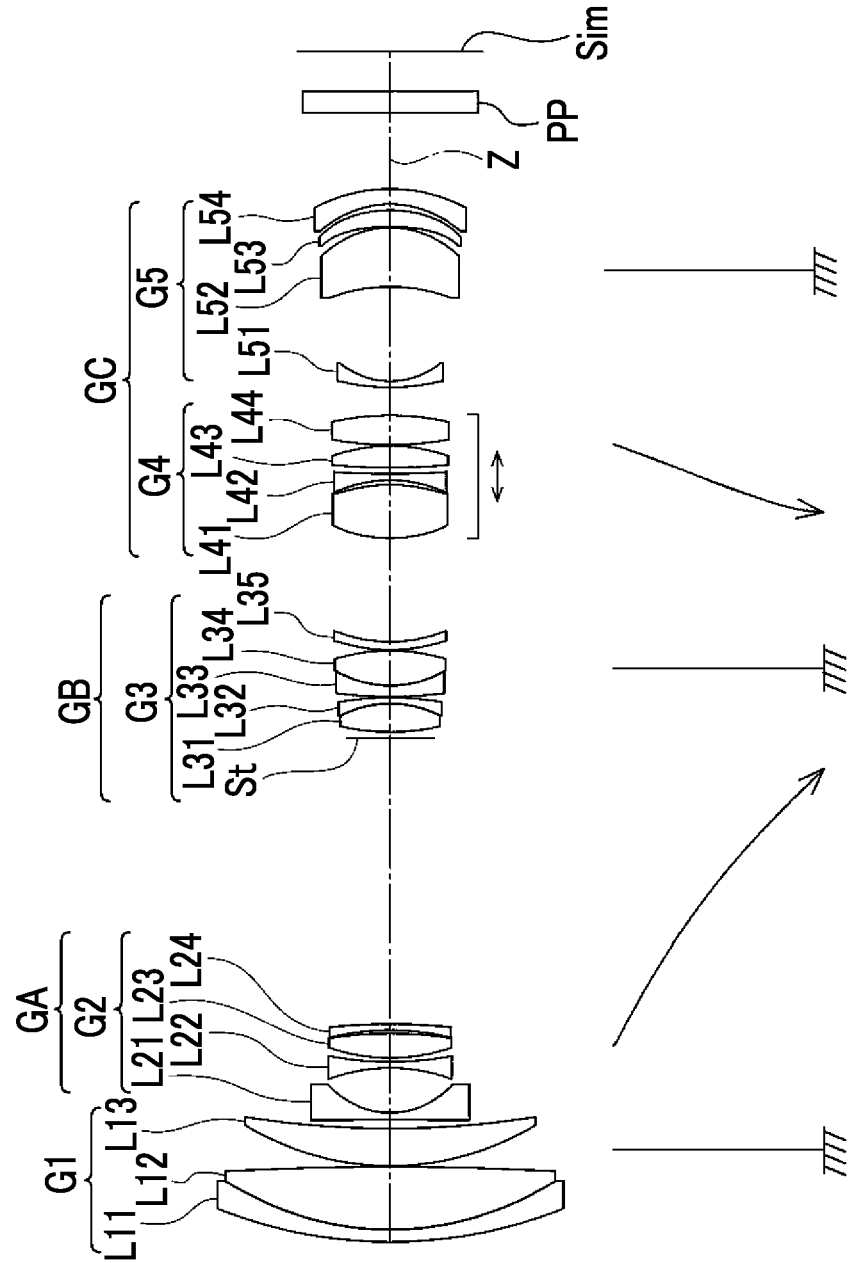
FIG. 25 is a cross-sectional view of a configuration of a zoom lens of Example 10 and a diagram showing movement loci thereof.

FIG. 25 shows a configuration and movement loci of the zoom lens of Example 10. The zoom lens of Example 10 consists of, in order from the object side to the image side, a first lens group G1 that has a positive refractive power, a second lens group G2 that has a negative refractive power, a third lens group G3 that has a positive refractive power, a fourth lens group G4 that has a positive refractive power, and a fifth lens group G5 that has a negative refractive power. The first lens group G1 consists of three lenses L11 to L13, in order from the object side to the image side. The second lens group G2 consists of four lenses L21 to L24, in order from the object side to the image side. The third lens group G3 consists of an aperture stop St and five lenses L31 to L35, in order from the object side to the image side. The fourth lens group G4 consists of four lenses L41 to L44, in order from the object side to the image side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 10, Table 28 shows basic lens data, Table 29 shows specifications and variable surface spacings, and Table 30 shows aspherical coefficients thereof. FIG. 26 shows aberration diagrams. In Example 10, the distance on the optical axis from the lens surface closest to the object side to the close range object is 1.1 m (meters).

TABLE 28

Example 10

| Sn | R | D | Nd | vd | θgF | ED |
|---|---|---|---|---|---|---|
| 1 | 91.84686 | 1.600 | 1.92286 | 20.88 | 0.63900 | 56.00 |
| 2 | 58.82396 | 8.278 | 1.49700 | 81.54 | 0.53748 | 53.34 |
| 3 | −627.77761 | 0.120 | | | | 52.60 |
| 4 | 54.29474 | 4.917 | 1.77535 | 50.30 | 0.55004 | 47.00 |
| 5 | 182.74851 | DD[5] | | | | 46.38 |
| *6 | −142.39144 | 0.916 | 1.85135 | 40.10 | 0.56954 | 25.61 |
| *7 | 16.89463 | 5.872 | | | | 20.34 |
| 8 | −34.63456 | 0.802 | 1.80059 | 47.94 | 0.55484 | 19.91 |
| 9 | 65.57284 | 0.512 | | | | 19.71 |
| 10 | 36.97208 | 3.210 | 1.85896 | 22.73 | 0.62844 | 19.61 |
| 11 | −78.21364 | 0.438 | | | | 19.61 |
| 12 | −50.35878 | 0.800 | 1.88300 | 40.76 | 0.56679 | 19.55 |
| 13 | −111.02423 | DD[13] | | | | 19.40 |
| 14(St) | ∞ | 0.776 | | | | 15.17 |
| 15 | 44.68650 | 3.703 | 1.43875 | 94.66 | 0.53402 | 15.85 |
| 16 | −21.62433 | 0.800 | 1.84850 | 43.79 | 0.56197 | 16.14 |
| 17 | −61.20733 | 0.120 | | | | 16.73 |
| 18 | 82.04244 | 1.464 | 1.87914 | 33.82 | 0.58794 | 17.18 |
| 19 | 20.83960 | 4.612 | 1.67476 | 31.80 | 0.59967 | 17.49 |
| 20 | −37.33675 | 0.120 | | | | 17.88 |
| 21 | 34.65611 | 1.043 | 1.80829 | 47.17 | 0.55632 | 18.09 |
| 22 | 28.81157 | DD[22] | | | | 17.84 |
| *23 | 28.75093 | 6.995 | 1.58313 | 59.38 | 0.54237 | 18.58 |
| *24 | −30.22650 | 0.593 | | | | 17.95 |
| 25 | −26.25641 | 0.825 | 1.95090 | 32.12 | 0.59091 | 17.85 |
| 26 | 168.00352 | 0.838 | | | | 18.17 |
| 27 | 140.67716 | 2.852 | 1.43875 | 94.66 | 0.53402 | 18.49 |
| 28 | −33.32263 | 0.126 | | | | 18.73 |
| 29 | 64.93977 | 3.892 | 1.57706 | 40.55 | 0.57833 | 18.81 |
| 30 | −53.29844 | DD[30] | | | | 18.61 |
| 31 | 42.98121 | 0.800 | 1.77674 | 33.66 | 0.59127 | 17.10 |
| 32 | 15.24194 | 12.262 | | | | 16.33 |
| 33 | −33.87789 | 7.760 | 1.50000 | 55.00 | 0.55246 | 19.71 |
| 34 | −18.41119 | 0.120 | | | | 22.27 |
| *35 | −42.79010 | 2.161 | 1.58313 | 59.38 | 0.54237 | 22.25 |
| *36 | −24.89600 | 0.790 | | | | 22.89 |
| 37 | −20.00672 | 2.003 | 1.83899 | 44.10 | 0.56200 | 22.77 |
| 38 | −31.70582 | 10.000 | | | | 24.41 |

TABLE 28-continued

Example 10

| Sn | R | D | Nd | νd | θgF | ED |
|---|---|---|---|---|---|---|
| 39 | ∞ | 2.850 | 1.51633 | 64.14 | 0.53531 | 27.89 |
| 40 | ∞ | 5.189 | | | | 28.41 |

TABLE 29

Example 10

| | Wide angle end_infinity | Telephoto end_infinity | Telephoto end_close |
|---|---|---|---|
| Zr | 1.00 | 6.30 | 6.30 |
| f | 18.558 | 116.918 | — |
| Bf | 17.067 | 17.067 | — |
| FNo. | 4.12 | 4.12 | 4.36 |
| 2ω[°] | 78.6 | 12.6 | 12.0 |
| IH | 14.9 | 14.9 | 14.9 |
| DD[5] | 1.151 | 37.830 | 37.830 |
| DD[13] | 37.445 | 0.766 | 0.766 |
| DD[22] | 13.605 | 4.635 | 1.686 |
| DD[30] | 3.699 | 12.669 | 15.618 |

TABLE 30

Example 10

| Sn | 6 | 7 | 23 |
|---|---|---|---|
| KA  | 1.0000000E+00 | 1.0000000E+00 | 1.0000000E+00 |
| A4  | 1.2854937E−04 | 1.3164014E−04 | 5.8826480E−06 |
| A6  | −3.5558622E−06 | −3.0957647E−06 | 1.1314268E−07 |
| A8  | 6.8495490E−08 | 3.6100446E−08 | −4.4525885E−10 |
| A10 | −9.0858626E−10 | 2.5901215E−10 | 1.7664959E−11 |
| A12 | 8.1567633E−12 | −1.6266487E−11 | 1.9292071E−13 |
| A14 | −4.8144291E−14 | 2.5834740E−13 | −8.4507341E−15 |
| A16 | 1.7742707E−16 | −2.0726126E−15 | 1.0455918E−16 |
| A18 | −3.6730072E−19 | 8.4679981E−18 | −4.9603469E−19 |
| A20 | 3.2332834E−22 | −1.3872882E−20 | 6.9817023E−22 |

| Sn | 24 | 35 | 36 |
|---|---|---|---|
| KA  | 1.0000000E+00 | 1.0000000E+00 | 1.0000000E+00 |
| A4  | 1.5418921E−05 | −1.0514431E−04 | −6.0640508E−05 |
| A6  | −7.0604721E−08 | 4.3732641E−06 | 2.4233855E−06 |
| A8  | 7.1038682E−09 | −1.6357269E−07 | −7.3474756E−08 |
| A10 | −1.5808629E−10 | 3.6230949E−09 | 1.2119495E−09 |
| A12 | 2.6050603E−12 | −5.1538976E−11 | −1.1637832E−11 |
| A14 | −2.5881727E−14 | 4.6736677E−13 | 5.5193510E−14 |
| A16 | 1.4474591E−16 | −2.5925865E−15 | −1.0208180E−17 |
| A18 | −2.4480238E−19 | 7.9031536E−18 | −1.0344270E−18 |
| A20 | −4.7107094E−22 | −9.9440606E−21 | 3.0979626E−21 |

Example 11

Figure 27:
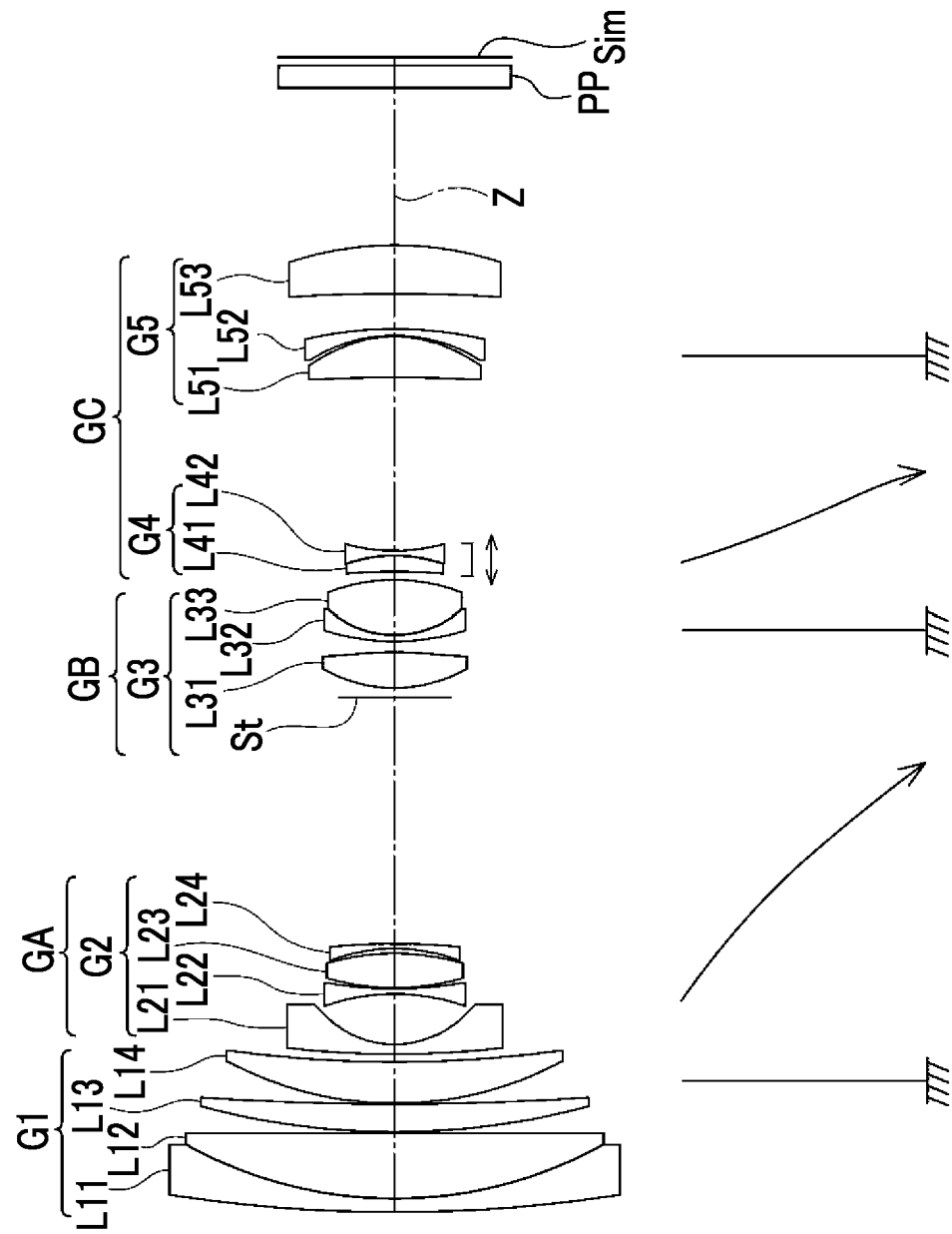
FIG. 27 is a cross-sectional view of a configuration of a zoom lens of Example 11 and a diagram showing movement loci thereof.

FIG. 27 shows a configuration and movement loci of the zoom lens of Example 11. The zoom lens of Example 11 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 11, Table 31 shows basic lens data, Table 32 shows specifications and variable surface spacings, and Table 33 shows aspherical coefficients thereof. FIG. 28 shows aberration diagrams. In Example 11, the distance on the optical axis from the lens surface closest to the object side to the close range object is 1.1 m (meters).

TABLE 31

Example 11

| Sn | R | D | Nd | νd | θgF | ED |
|---|---|---|---|---|---|---|
| 1 | 192.92207 | 1.700 | 1.85000 | 27.03 | 0.60935 | 57.70 |
| 2 | 55.87757 | 8.275 | 1.53775 | 74.70 | 0.53936 | 53.54 |
| 3 | −19857.12051 | 0.120 | | | | 52.73 |
| 4 | 97.48920 | 3.513 | 1.59282 | 68.63 | 0.54286 | 49.63 |
| 5 | 357.36706 | 0.119 | | | | 48.75 |
| 6 | 45.91557 | 5.212 | 1.79828 | 48.27 | 0.55361 | 42.98 |
| 7 | 158.14340 | DD[7] | | | | 42.20 |
| *8 | 220.94270 | 1.200 | 1.80610 | 40.73 | 0.56940 | 25.38 |
| *9 | 12.90803 | 6.338 | | | | 18.64 |
| 10 | −27.04466 | 0.649 | 1.77535 | 50.30 | 0.55004 | 17.86 |
| 11 | 49.11820 | 0.119 | | | | 17.36 |
| 12 | 31.02315 | 4.317 | 1.84667 | 23.79 | 0.61771 | 17.34 |
| 13 | −31.02315 | 0.634 | | | | 16.80 |
| 14 | −22.65111 | 0.600 | 1.88300 | 40.85 | 0.56772 | 16.51 |
| 15 | −83.32898 | DD[15] | | | | 16.27 |
| 16(St) | ∞ | 1.200 | | | | 16.50 |
| *17 | 18.20448 | 4.489 | 1.48789 | 83.67 | 0.53782 | 18.40 |
| *18 | −47.77350 | 1.366 | | | | 18.34 |
| 19 | 29.97220 | 0.801 | 1.91097 | 36.50 | 0.57938 | 17.97 |
| 20 | 13.00001 | 6.824 | 1.53775 | 74.70 | 0.53936 | 17.05 |
| 21 | −23.79880 | DD[21] | | | | 16.96 |
| 22 | −75.50247 | 2.015 | 1.89502 | 25.23 | 0.61670 | 12.12 |
| 23 | −18.76960 | 0.610 | 1.76963 | 51.04 | 0.54960 | 12.29 |
| 24 | 23.68241 | DD[24] | | | | 12.55 |
| *25 | −178.41215 | 5.155 | 1.58313 | 59.46 | 0.54056 | 21.30 |
| *26 | −16.62193 | 0.120 | | | | 21.86 |
| 27 | −20.45076 | 0.810 | 2.00272 | 19.32 | 0.64514 | 21.66 |
| 28 | −52.28769 | 4.475 | | | | 22.91 |
| 29 | −199.21751 | 6.124 | 1.72073 | 29.78 | 0.60404 | 25.53 |
| 30 | −43.15335 | 19.776 | | | | 27.00 |
| 31 | ∞ | 2.850 | 1.51633 | 64.14 | 0.53531 | 29.48 |
| 32 | ∞ | 1.019 | | | | 29.69 |

TABLE 32

Example 11

| | Wide angle end_infinity | Telephoto end_infinity | Telephoto end_close |
|---|---|---|---|
| Zr | 1.00 | 6.30 | 6.30 |
| f | 18.540 | 116.804 | — |
| Bf | 22.675 | 22.675 | — |
| FNo. | 4.09 | 4.12 | 4.27 |
| 2ω[°] | 80.8 | 13.4 | 13.2 |
| IH | 14.9 | 14.9 | 14.9 |
| DD[7] | 1.010 | 31.031 | 31.031 |

TABLE 32-continued

Example 11

| | Wide angle end_infinity | Telephoto end_infinity | Telephoto end_close |
|---|---|---|---|
| DD[15] | 31.025 | 1.004 | 1.004 |
| DD[21] | 1.040 | 12.533 | 15.692 |
| DD[24] | 21.801 | 10.308 | 7.149 |

TABLE 33

Example 11

| Sn | 8 | 9 | 25 | 26 |
|---|---|---|---|---|
| KA | 1.0000000E+00 | 1.0000000E+00 | 1.0000000E+00 | 1.0000000E+00 |
| A4 | 6.3654280E−05 | 5.8115700E−05 | −3.3313022E−07 | 1.5864674E−05 |
| A6 | −1.6520578E−06 | −8.6702710E−07 | −3.1035733E−07 | 4.6814967E−07 |
| A8 | 3.6308297E−08 | −4.5783717E−08 | 1.3953513E−08 | −2.8075495E−08 |
| A10 | −6.2436489E−10 | 3.8246956E−09 | −1.9091620E−10 | 9.8406524E−10 |
| A12 | 7.5884189E−12 | −1.3330761E−10 | −7.6081743E−13 | −1.9031014E−11 |
| A14 | −6.0903631E−14 | 2.6082780E−12 | 5.1744107E−14 | 2.1392501E−13 |
| A16 | 3.0342366E−16 | −2.9426472E−14 | −5.9555663E−16 | −1.3822383E−15 |
| A18 | −8.4569318E−19 | 1.7856370E−16 | 2.9430982E−18 | 4.7328661E−18 |
| A20 | 1.0050279E−21 | −4.5150703E−19 | −5.4890319E−21 | −6.6078617E−21 |

| Sn | 17 | 18 |
|---|---|---|
| KA | 1.0000000E+00 | 1.0000000E+00 |
| A3 | 0.0000000E+00 | 0.0000000E+00 |
| A4 | −3.8865422E−05 | 7.1075371E−05 |
| A5 | 7.6564967E−05 | −2.3245540E−05 |
| A6 | −7.1121281E−05 | 8.8240861E−06 |
| A7 | 3.1399739E−05 | −1.6886838E−06 |
| A8 | −7.0470848E−06 | 1.8063804E−07 |
| A9 | 5.5583077E−07 | −1.8197456E−08 |
| A10 | 9.7347054E−08 | 2.8022294E−09 |
| A11 | −2.8941874E−08 | −6.9908347E−11 |
| A12 | 2.6732043E−09 | −6.6561840E−11 |
| A13 | −2.3823750E−11 | 9.3073733E−12 |
| A14 | −1.4334971E−11 | −2.8836404E−13 |
| A15 | 1.0709284E−12 | −1.8458979E−14 |
| A16 | −2.5308020E−14 | 1.0024286E−15 |

Example 12

Figure 29:
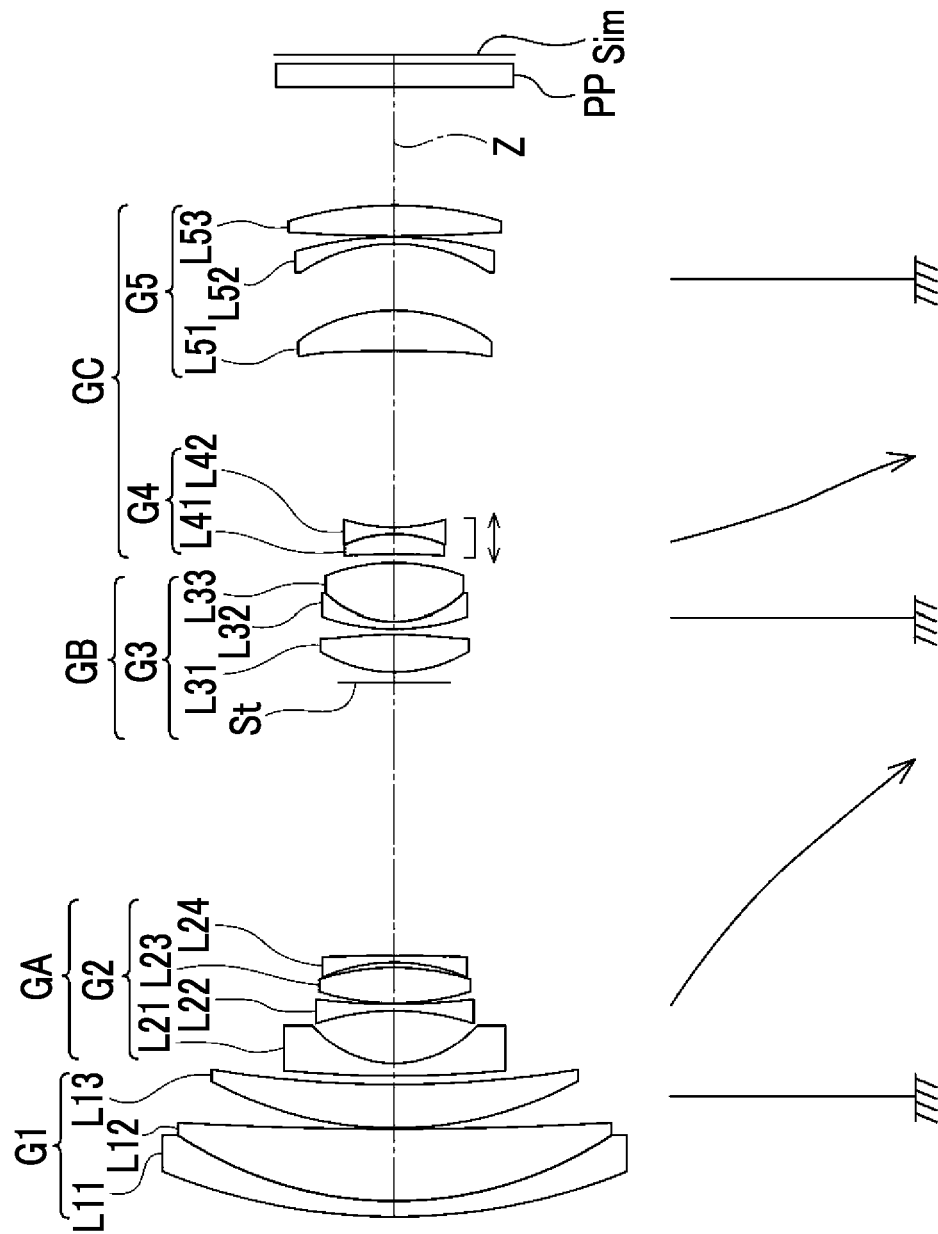
FIG. 29 is a cross-sectional view of a configuration of a zoom lens of Example 12 and a diagram showing movement loci thereof.

FIG. 29 shows a configuration and movement loci of the zoom lens of Example 12. The zoom lens shown in Example 12 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 12, Table 34 shows basic lens data, Table 35 shows specifications and variable surface spacings, and Table 36 shows aspherical coefficients thereof. FIG. 30 shows aberration diagrams. In Example 12, the distance on the optical axis from the lens surface closest to the object side to the close range object is 1.1 m (meters).

TABLE 34

Example 12

| Sn | R | D | Nd | vd | θgF | ED |
|---|---|---|---|---|---|---|
| 1 | 80.73777 | 1.860 | 1.89286 | 20.36 | 0.63944 | 58.00 |
| 2 | 50.42733 | 8.616 | 1.59282 | 68.62 | 0.54414 | 54.03 |
| 3 | 486.03010 | 0.120 | | | | 52.76 |
| 4 | 49.50975 | 5.202 | 1.76385 | 48.49 | 0.55898 | 45.69 |
| 5 | 147.56883 | DD[5] | | | | 44.83 |
| *6 | 217.62896 | 1.500 | 1.85135 | 40.10 | 0.56954 | 27.60 |
| *7 | 13.84079 | 6.309 | | | | 20.12 |
| 8 | −31.81968 | 0.800 | 1.76385 | 48.49 | 0.55898 | 19.62 |
| 9 | 82.79214 | 0.122 | | | | 18.97 |
| 10 | 32.80413 | 4.243 | 1.84053 | 23.16 | 0.62492 | 18.77 |
| 11 | −31.75242 | 0.630 | | | | 18.22 |
| 12 | −23.00519 | 0.800 | 1.88300 | 40.76 | 0.56679 | 18.01 |
| 13 | −237.20953 | DD[13] | | | | 17.57 |
| 14(St) | ∞ | 1.201 | | | | 16.46 |
| *15 | 18.00025 | 4.502 | 1.49710 | 81.56 | 0.53848 | 18.45 |
| *16 | −48.10314 | 0.643 | | | | 18.38 |
| 17 | 28.69251 | 0.857 | 1.89980 | 35.93 | 0.58131 | 18.07 |
| 18 | 12.61144 | 6.964 | 1.53775 | 74.70 | 0.53936 | 17.07 |
| 19 | −24.38483 | DD[19] | | | | 16.96 |
| 20 | −97.88956 | 2.392 | 1.89999 | 22.10 | 0.63225 | 12.17 |
| 21 | −15.72326 | 0.810 | 1.84712 | 36.80 | 0.58027 | 12.31 |
| 22 | 22.41638 | DD[22] | | | | 12.55 |
| *23 | −207.38552 | 4.840 | 1.58313 | 59.38 | 0.54237 | 22.94 |
| *24 | −22.58983 | 7.972 | | | | 24.00 |
| 25 | −21.89704 | 0.801 | 1.96769 | 18.52 | 0.65415 | 23.42 |

TABLE 34-continued

Example 12

| Sn | R | D | Nd | vd | θgF | ED |
|----|----|----|----|----|----|----|
| 26 | −45.69967 | 0.124 | | | | 24.81 |
| 27 | 184.44109 | 3.668 | 1.51215 | 52.72 | 0.55616 | 26.09 |
| 28 | −47.61173 | 14.103 | | | | 26.50 |
| 29 | ∞ | 2.850 | 1.51633 | 64.14 | 0.53531 | 29.29 |
| 30 | ∞ | 1.036 | | | | 29.62 |

TABLE 35

Example 12

| | Wide angle end_infinity | Telephoto end_infinity | Telephoto end_close |
|---|---|---|---|
| Zr | 1.00 | 6.30 | 6.30 |
| f | 18.543 | 116.824 | — |
| Bf | 17.019 | 17.019 | — |
| FNo. | 4.12 | 4.12 | 4.28 |
| 2ω[°] | 82.8 | 13.4 | 13.0 |
| IH | 14.9 | 14.9 | 14.9 |
| DD[5] | 1.024 | 32.699 | 32.699 |
| DD[13] | 32.659 | 0.984 | 0.984 |
| DD[19] | 1.036 | 12.520 | 15.385 |
| DD[22] | 21.096 | 9.612 | 6.747 |

TABLE 36

Example 12

| Sn | 6 | 7 | 23 | 24 |
|----|----|----|----|----|
| KA | 1.0000000E+00 | 1.0000000E+00 | 1.0000000E+00 | 1.0000000E+00 |
| A4 | 3.8801230E−05 | 3.3656427E−05 | −1.0898849E−06 | 1.2875733E−06 |
| A6 | −5.6900825E−07 | −1.4294659E−07 | −2.0426127E−07 | 2.3215304E−07 |
| A8 | 4.3917453E−09 | −3.8784815E−08 | 7.2614854E−09 | −1.3374335E−08 |
| A10 | −2.2424006E−11 | 2.0176117E−09 | −1.6987159E−10 | 3.7415668E−10 |
| A12 | 1.8514405E−13 | −5.7594721E−11 | 2.3046380E−12 | −6.2685660E−12 |
| A14 | −2.0051826E−15 | 9.8057171E−13 | −2.0062419E−14 | 6.3134017E−14 |
| A16 | 1.2748165E−17 | −9.7878612E−15 | 1.1021853E−16 | −3.7804630E−16 |
| A18 | −3.9933064E−20 | 5.2732228E−17 | −3.5321513E−19 | 1.2407686E−18 |
| A20 | 4.8900316E−23 | −1.1837027E−19 | 4.5313413E−22 | −1.7502257E−21 |

| Sn | 15 | 16 |
|----|----|----|
| KA | 1.0000000E+00 | 1.0000000E+00 |
| A3 | 0.0000000E+00 | 0.0000000E+00 |
| A4 | 2.0307555E−05 | 7.7796921E−05 |
| A5 | −3.0112422E−05 | −2.7501361E−05 |
| A6 | 1.2191246E−05 | 1.1436649E−05 |
| A7 | −2.9245884E−06 | −2.6559760E−06 |
| A8 | 5.2503300E−07 | 3.6159720E−07 |
| A9 | −8.9479579E−08 | −3.0283257E−08 |
| A10 | 1.2547283E−08 | 1.9244296E−09 |
| A11 | −7.5157192E−10 | −8.3307800E−11 |
| A12 | −7.0521902E−11 | 1.3829034E−11 |
| A13 | 1.3255052E−11 | −7.6547399E−12 |
| A14 | −4.6010621E−13 | 1.4005925E−12 |
| A15 | −2.3082692E−14 | −1.0483595E−13 |
| A16 | 1.3452698E−15 | 2.8255382E−15 |

Example 13

Figure 31:
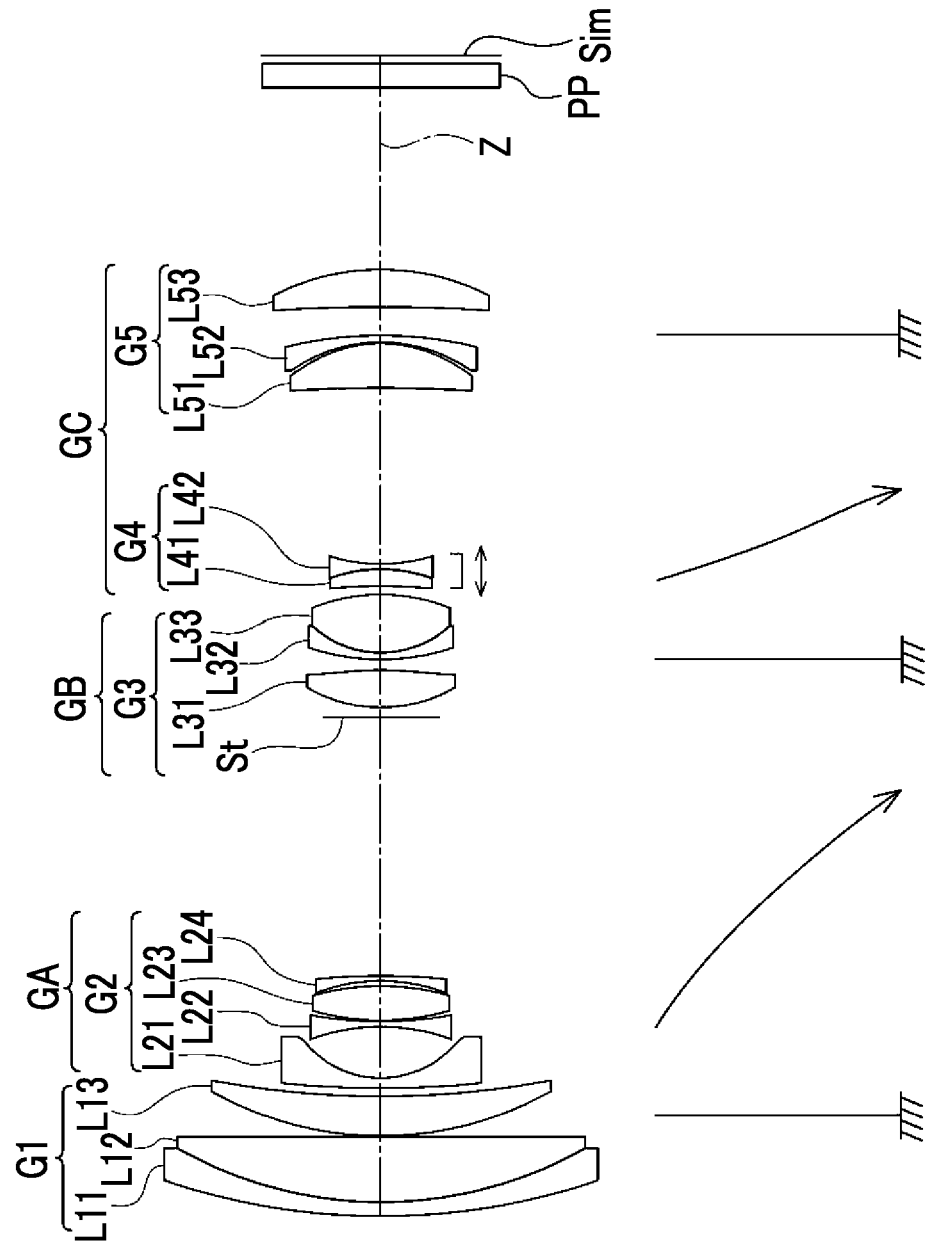
FIG. 31 is a cross-sectional view of a configuration of a zoom lens of Example 13 and a diagram showing movement loci thereof.

FIG. 31 shows a configuration and movement loci of the zoom lens of Example 13. The zoom lens shown in Example 13 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 13, Table 37 shows basic lens data, Table 38 shows specifications and variable surface spacings, and Table 39 shows aspherical coefficients thereof. FIG. 32 shows aberration diagrams. In Example 13, the distance on the optical axis from the lens surface closest to the object side to the close range object is 1.1 m (meters).

TABLE 37

Example 13

| Sn | R | D | Nd | vd | θgF | ED |
|----|----|----|----|----|----|----|
| 1 | 88.29872 | 1.700 | 1.92286 | 20.88 | 0.63900 | 54.26 |
| 2 | 53.82650 | 7.818 | 1.59280 | 68.34 | 0.54473 | 51.08 |
| 3 | ∞ | 0.120 | | | | 50.02 |
| 4 | 44.56450 | 4.780 | 1.77535 | 50.30 | 0.55004 | 42.54 |

TABLE 37-continued

Example 13

| Sn | R | D | Nd | νd | θgF | ED |
|---|---|---|---|---|---|---|
| 5 | 118.42397 | DD[5] | | | | 41.74 |
| *6 | 242.52162 | 1.200 | 1.80610 | 40.73 | 0.56940 | 24.96 |
| *7 | 12.88174 | 6.143 | | | | 18.33 |
| 8 | −26.56283 | 0.650 | 1.77535 | 50.30 | 0.55004 | 17.54 |
| 9 | 50.70427 | 0.120 | | | | 17.04 |
| 10 | 31.57156 | 4.128 | 1.84667 | 23.79 | 0.61771 | 17.02 |
| 11 | −31.57156 | 0.625 | | | | 16.51 |
| 12 | −22.82174 | 0.600 | 1.88300 | 40.85 | 0.56772 | 16.22 |
| 13 | −80.25097 | DD[13] | | | | 16.00 |
| 14(St) | ∞ | 1.200 | | | | 16.50 |
| *15 | 18.38341 | 4.485 | 1.50062 | 81.02 | 0.53838 | 18.48 |
| *16 | −47.44990 | 1.298 | | | | 18.43 |
| 17 | 29.56736 | 0.801 | 1.91098 | 34.66 | 0.58465 | 18.09 |
| 18 | 13.00237 | 6.867 | 1.53775 | 74.70 | 0.53936 | 17.16 |
| 19 | −23.64411 | DD[19] | | | | 17.07 |
| 20 | −76.17504 | 2.031 | 1.89041 | 23.88 | 0.62134 | 12.50 |
| 21 | −18.94206 | 0.610 | 1.76385 | 48.49 | 0.55898 | 12.64 |
| *22 | 21.54102 | DD[22] | | | | 12.85 |
| *23 | −184.84932 | 5.367 | 1.58313 | 59.46 | 0.54056 | 22.12 |
| *24 | −16.84826 | 0.120 | | | | 22.69 |
| 25 | −20.32970 | 0.810 | 2.00069 | 25.43 | 0.61417 | 22.50 |
| 26 | −52.32105 | 3.414 | | | | 23.92 |
| 27 | −222.81652 | 4.543 | 1.51904 | 52.04 | 0.55719 | 26.29 |
| 28 | −30.74978 | 21.862 | | | | 27.00 |
| 29 | ∞ | 2.850 | 1.51633 | 64.14 | 0.53531 | 29.52 |
| 30 | ∞ | 1.020 | | | | 29.71 |

TABLE 38

Example 13

| | Wide angle end_infinity | Telephoto end_infinity | Telephoto end_close |
|---|---|---|---|
| Zr | 1.00 | 6.30 | 6.30 |
| f | 18.547 | 116.846 | — |
| Bf | 24.760 | 24.760 | — |
| FNo. | 4.04 | 4.12 | 4.28 |
| 2ω[°] | 81.8 | 13.4 | 13.0 |
| IH | 14.9 | 14.9 | 14.9 |
| DD[5] | 1.010 | 31.098 | 31.098 |
| DD[13] | 31.038 | 0.950 | 0.950 |
| DD[19] | 1.024 | 12.881 | 15.898 |
| DD[22] | 21.145 | 9.288 | 6.271 |

TABLE 39

Example 13

| Sn | 6 | 7 |
|---|---|---|
| KA | 1.0000000E+00 | 1.0000000E+00 |
| A4 | 6.7435114E−05 | 6.1442612E−05 |
| A6 | −1.8015305E−06 | −9.4228336E−07 |
| A8 | 4.0757015E−08 | −5.1204761E−08 |
| A10 | −7.2146359E−10 | 4.3973955E−09 |
| A12 | 9.0260097E−12 | −1.5758773E−10 |
| A14 | −7.4567076E−14 | 3.1703041E−12 |
| A16 | 3.8239088ET6 | −3.6776367E−14 |
| A18 | −1.0970403E−18 | 2.2946133E−16 |
| A20 | 1.3419578E−21 | −5.9657888E−19 |

| Sn | 15 | 16 |
|---|---|---|
| KA | 1.0000000E+00 | 1.0000000E+00 |
| A3 | 0.0000000E+00 | 0.0000000E+00 |
| A4 | −4.0019066E−06 | 6.0898106E−05 |
| A5 | −1.1896263E−05 | −2.5167633E−05 |
| A6 | 1.8355799E−06 | 1.5084416E−05 |
| A7 | 1.5100181E−06 | −4.9339518E−06 |
| A8 | −6.9931391E−07 | 1.0685709E−06 |

TABLE 39-continued

Example 13

| | | |
|---|---|---|
| A9 | 1.1017225E−07 | −1.6570563E−07 |
| A10 | −2.7876514E−09 | 1.7074509E−08 |
| A11 | −1.1774064E−09 | −6.2308119E−10 |
| A12 | 1.2166059E−10 | −9.1794228E−11 |
| A13 | −1.0501134E−13 | 1.1319990E−11 |
| A14 | −5.1818183E−13 | −9.8728526E−14 |
| A15 | 2.2754707E−14 | −4.0564816E−14 |
| A16 | −1.9958988E−16 | 1.6083657E−15 |

| Sn | 22 | 23 | 24 |
|---|---|---|---|
| KA | 9.9281164E−01 | −1.4545266E+01 | 1.0000000E+00 |
| A4 | −1.3164721E−06 | −4.8285279E−07 | 2.0549063E−05 |
| A6 | −6.7361538E−08 | −4.5252602E−07 | −1.028676lE−07 |
| A8 | −1.4459290E−08 | 2.2325800E−08 | −2.3386616E−09 |
| A10 | 3.5902246E−09 | −4.5507804E−10 | 3.0874409E−10 |
| A12 | −3.0370409E−10 | 4.3207949E−12 | −8.1445353E−12 |
| A14 | 1.3460157E−11 | −9.6641925E−15 | 1.0471603E−13 |
| A16 | −3.3448449E−13 | −1.4831680E−16 | −7.2444173E−16 |
| A18 | 4.4150847E−15 | 1.1697820E−18 | 2.5757594E−18 |
| A20 | −2.4132134E−17 | −2.5620490E−21 | −3.6703675E−21 |

Example 14

Figure 33:
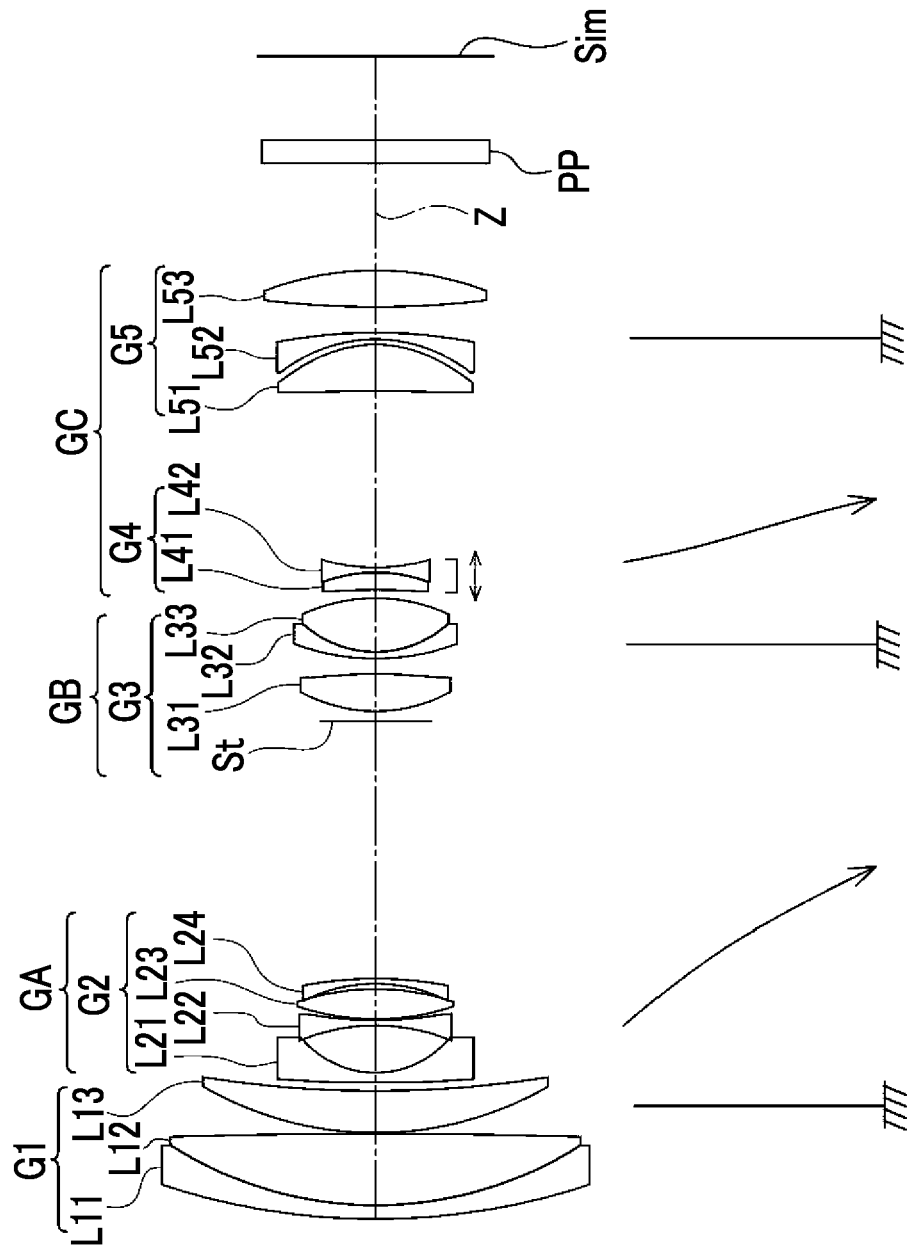
FIG. 33 is a cross-sectional view of a configuration of a zoom lens of Example 14 and a diagram showing movement loci thereof.

FIG. 33 shows a configuration and movement loci of the zoom lens of Example 14. The zoom lens shown in Example 14 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 14, Table 40 shows basic lens data, Table 41 shows specifications and variable surface spacings, and Table 42 shows aspherical coefficients thereof. FIG. 34 shows aberration diagrams. In Example 14, the distance on the optical axis from the lens surface closest to the object side to the close range object is 1.1 m (meters).

TABLE 40

Example 14

| Sn | R | D | Nd | vd | θgF | ED |
|---|---|---|---|---|---|---|
| 1 | 90.33712 | 1.650 | 1.92286 | 20.89 | 0.63806 | 54.04 |
| 2 | 49.71536 | 8.664 | 1.51860 | 69.89 | 0.53184 | 50.40 |
| 3 | −921.27364 | 0.110 | | | | 49.30 |
| 4 | 45.25112 | 5.065 | 1.84850 | 43.79 | 0.56197 | 42.60 |
| 5 | 144.62698 | DD[5] | | | | 41.84 |
| *6 | 777.28503 | 1.200 | 1.80610 | 40.73 | 0.56940 | 24.29 |
| *7 | 12.96615 | 5.688 | | | | 17.87 |
| 8 | −26.07784 | 0.650 | 1.77535 | 50.30 | 0.55004 | 17.28 |
| 9 | 52.34692 | 0.120 | | | | 16.74 |
| 10 | 32.60160 | 3.622 | 1.84666 | 23.79 | 0.62056 | 16.69 |
| 11 | −32.60160 | 0.651 | | | | 16.25 |
| 12 | −21.20883 | 0.600 | 1.88299 | 40.78 | 0.56829 | 16.16 |
| 13 | −50.80434 | DD[13] | | | | 16.00 |
| 14(St) | ∞ | 1.200 | | | | 16.20 |
| *15 | 20.22473 | 4.498 | 1.49700 | 81.54 | 0.53748 | 17.92 |
| *16 | −50.98325 | 1.855 | | | | 17.92 |
| 17 | 30.95186 | 0.800 | 1.91082 | 35.25 | 0.58224 | 17.80 |
| 18 | 14.20108 | 6.471 | 1.53775 | 74.70 | 0.53936 | 17.09 |
| 19 | −23.14796 | DD[19] | | | | 17.06 |
| 20 | −89.41122 | 2.101 | 1.90200 | 25.26 | 0.61662 | 12.50 |
| 21 | −20.12039 | 0.610 | 1.78799 | 47.47 | 0.55346 | 12.67 |
| 22 | 24.14764 | DD[22] | | | | 12.91 |
| *23 | −208.33387 | 5.666 | 1.58313 | 59.46 | 0.54056 | 22.28 |
| *24 | −16.26785 | 0.632 | | | | 22.78 |
| 25 | −19.82271 | 0.800 | 2.00069 | 25.43 | 0.61417 | 22.30 |
| 26 | −68.41987 | 2.996 | | | | 23.83 |
| 27 | 123.42599 | 4.400 | 1.53172 | 48.85 | 0.56700 | 26.72 |
| 28 | −41.05602 | 12.906 | | | | 27.13 |
| 29 | ∞ | 2.850 | 1.51633 | 64.14 | 0.53531 | 28.63 |
| 30 | ∞ | 10.111 | | | | 28.81 |

TABLE 41

Example 14

| | Wide angle end_infinity | Telephoto end_infinity | Telephoto end_close |
|---|---|---|---|
| Zr | 1.00 | 6.30 | 6.30 |
| f | 18.527 | 116.721 | — |
| Bf | 24.896 | 24.896 | — |
| FNo. | 4.12 | 4.12 | 4.29 |
| 2ω[°] | 82.4 | 13.4 | 13.2 |
| IH | 14.9 | 14.9 | 14.9 |
| DD[5] | 1.000 | 31.102 | 31.102 |
| DD[13] | 31.038 | 0.936 | 0.936 |
| DD[19] | 1.000 | 12.965 | 16.272 |
| DD[22] | 21.309 | 9.344 | 6.037 |

TABLE 42

Example 14

| Sn | 6 | 7 | 23 | 24 |
|---|---|---|---|---|
| KA | 1.0000000E+00 | 1.0000000E+00 | 1.0000000E+00 | 1.0000000E+00 |
| A4 | 7.9386538E−05 | 6.8561827E−05 | 1.0987082E−05 | 2.5333918E−05 |
| A6 | −2.1073221E−06 | −7.9582080E−07 | −3.9998641E−07 | 2.1037868E−07 |
| A8 | 4.6997647E−08 | −8.0327970E−08 | 1.1039903E−08 | −1.7328894E−08 |
| A10 | −7.9255241E−10 | 5.9055717E−09 | −9.1730875E−11 | 6.4870905E−10 |
| A12 | 9.3842808E−12 | −2.0009976E−10 | −1.6336759E−12 | −1.2463385E−11 |
| A14 | −7.4089404E−14 | 3.9018877E−12 | 4.8007539E−14 | 1.3727935E−13 |
| A16 | 3.6789209E−16 | −4.4501804E−14 | −4.7887630E−16 | −8.6350172E−16 |
| A18 | −1.0336112E−18 | 2.7553203E−16 | 2.2015926E−18 | 2.8639490E−18 |
| A20 | 1.2488535E−21 | −7.1506946E−19 | −3.9150348E−21 | −3.8514250E−21 |

| Sn | 15 | 16 |
|---|---|---|
| KA | 1.0000000E+00 | 1.0000000E+00 |
| A3 | 0.0000000E+00 | 0.0000000E+00 |
| A4 | 1.7556212E−05 | 6.1180727E−05 |
| A5 | −3.0782754E−05 | −1.4803179E−05 |
| A6 | 1.6379055E−05 | 1.0162748E−05 |
| A7 | −4.0323596E−06 | −3.9816208E−06 |
| A8 | 2.4519942E−07 | 8.7505342E−07 |
| A9 | 9.0427367E−08 | −8.8619546E−08 |
| A10 | −1.6994400E−08 | −2.9573147E−09 |
| A11 | −2.4560553E−10 | 2.0444308E−09 |
| A12 | 3.0826528E−10 | −2.8808444E−10 |
| A13 | −2.3133481E−11 | 2.5833416E−11 |
| A14 | −7.8855687E−13 | −1.8603331E−12 |
| A15 | 1.6290597E−13 | 9.7366606E−14 |
| A16 | −5.4627855E−15 | −2.4311427E−15 |

Example 15

Figure 35:
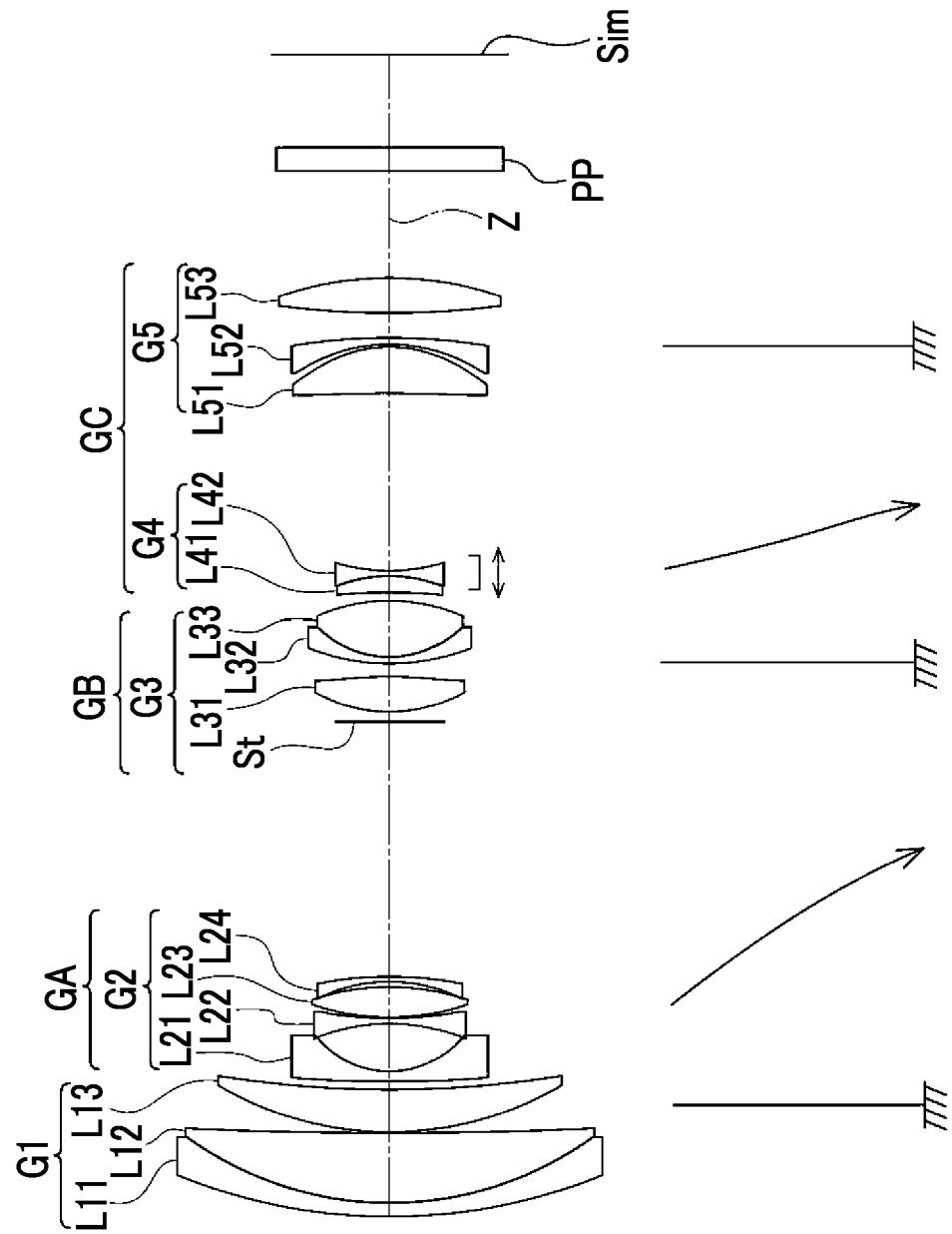
FIG. 35 is a cross-sectional view of a configuration of a zoom lens of Example 15 and a diagram showing movement loci thereof.

FIG. 35 shows a configuration and movement loci of the zoom lens of Example 15. The zoom lens shown in Example 15 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 15, Table 43 shows basic lens data, Table 44 shows specifications and variable surface spacings, and Table 45 shows aspherical coefficients thereof. FIG. 36 shows aberration diagrams. In Example 15, the distance on the optical axis from the lens surface closest to the object side to the close range object is 1.1 m (meters).

TABLE 43

Example 15

| Sn | R | D | Nd | vd | θgF | ED |
|---|---|---|---|---|---|---|
| 1 | 75.33715 | 1.650 | 1.92119 | 23.96 | 0.62025 | 54.04 |
| 2 | 45.82397 | 8.445 | 1.59283 | 68.63 | 0.54286 | 50.29 |
| 3 | 598.30976 | 0.110 | | | | 49.10 |

TABLE 43-continued

Example 15

| Sn | R | D | Nd | vd | θgF | ED |
|---|---|---|---|---|---|---|
| 4 | 44.64097 | 5.162 | 1.72916 | 54.68 | 0.54451 | 42.60 |
| 5 | 145.18378 | DD[5] | | | | 41.81 |
| *6 | 959.69233 | 1.200 | 1.80610 | 40.73 | 0.56940 | 24.46 |
| *7 | 12.73504 | 5.753 | | | | 17.88 |
| 8 | −26.37021 | 0.650 | 1.77535 | 50.30 | 0.55004 | 17.29 |
| 9 | 50.99436 | 0.120 | | | | 16.74 |
| 10 | 32.25497 | 3.652 | 1.84666 | 23.79 | 0.62056 | 16.69 |
| 11 | −32.25497 | 0.654 | | | | 16.25 |
| 12 | −21.02734 | 0.600 | 1.88299 | 40.78 | 0.56829 | 16.15 |
| 13 | −49.56937 | DD[13] | | | | 16.00 |
| 14(St) | ∞ | 1.200 | | | | 16.23 |
| *15 | 19.78677 | 4.263 | 1.49700 | 81.54 | 0.53748 | 18.03 |
| *16 | −50.08028 | 1.584 | | | | 18.03 |
| 17 | 29.37238 | 0.799 | 1.91082 | 35.25 | 0.58224 | 17.88 |
| 18 | 13.48040 | 6.662 | 1.53775 | 74.70 | 0.53936 | 17.09 |
| 19 | −23.83740 | DD[19] | | | | 17.06 |
| 20 | −76.15008 | 1.995 | 1.90200 | 25.26 | 0.61662 | 12.50 |
| 21 | −18.65520 | 0.610 | 1.78799 | 47.47 | 0.55346 | 12.66 |
| 22 | 24.21639 | DD[22] | | | | 12.92 |
| *23 | −208.34181 | 5.602 | 1.58313 | 59.46 | 0.54056 | 22.73 |
| *24 | −16.64448 | 0.300 | | | | 23.27 |
| 25 | −22.22627 | 0.800 | 2.00069 | 25.43 | 0.61417 | 22.89 |
| 26 | −80.25361 | 3.000 | | | | 24.23 |
| 27 | 114.56813 | 4.260 | 1.53172 | 48.85 | 0.56700 | 26.93 |
| 28 | −44.97542 | 12.906 | | | | 27.30 |
| 29 | ∞ | 2.850 | 1.51633 | 64.14 | 0.53531 | 28.64 |
| 30 | ∞ | 11.194 | | | | 28.80 |

TABLE 44

Example 15

| | Wide angle end_infinity | Telephoto end_infinity | Telephoto end_close |
|---|---|---|---|
| Zr | 1.00 | 6.30 | 6.30 |
| f | 18.529 | 116.731 | — |
| Bf | 25.979 | 25.979 | — |
| FNo. | 4.12 | 4.12 | 4.27 |
| 2ω[°] | 81.6 | 13.4 | 13.2 |
| IH | 14.9 | 14.9 | 14.9 |
| DD[5] | 1.000 | 30.833 | 30.833 |
| DD[13] | 30.770 | 0.937 | 0.937 |
| DD[19] | 1.000 | 13.049 | 16.325 |
| DD[22] | 21.421 | 9.372 | 6.096 |

TABLE 45

Example 15

| Sn | 6 | 7 | 23 | 24 |
|---|---|---|---|---|
| KA | 1.0000000E+00 | 1.0000000E+00 | 1.0000000E+00 | 1.0000000E+00 |
| A4 | 7.9772496E−05 | 6.6385496E−05 | 4.3135816E−06 | 2.2878085E−05 |
| A6 | −2.1253716E−06 | −7.6879540E−07 | −3.4658732E−07 | 2.2525586E−07 |
| A8 | 4.7506601E−08 | −8.2925789E−08 | 1.0535012E−08 | −1.7257116E−08 |
| A10 | −7.9733686E−10 | 5.9773328E−09 | −9.4323318E−11 | 6.4345036E−10 |
| A12 | 9.3989378E−12 | −2.0094013E−10 | −1.5910026E−12 | −1.2428012E−11 |
| A14 | −7.4048472E−14 | 3.9054011E−12 | 4.8071188E−14 | 1.3728693E−13 |
| A16 | 3.6767614E−16 | −4.4501804E−14 | −4.7810582E−16 | −8.6381316E−16 |
| A18 | −1.0345144E−18 | 2.7553203E−16 | 2.1677455E−18 | 2.8637086E−18 |
| A20 | 1.2532227E−21 | −7.1506946E−19 | −3.7745746E−21 | −3.8581833E−21 |

| Sn | 15 | 16 |
|---|---|---|
| KA | 1.0000000E+00 | 1.0000000E+00 |
| A3 | 0.0000000E+00 | 0.0000000E+00 |
| A4 | 1.5230082E−05 | 5.6955542E−05 |
| A5 | −3.0481192E−05 | −1.4432683E−05 |
| A6 | 1.6392025E−05 | 1.0147164E−05 |

TABLE 45-continued

| | Example 15 | |
|---|---|---|
| A7 | −4.0369333E−06 | −3.9828217E−06 |
| A8 | 2.4514965E−07 | 8.7510654E−07 |
| A9 | 9.0426206E−08 | −8.8685965E−08 |
| A10 | −1.6994300E−08 | −2.9557479E−09 |
| A11 | −2.4561605E−10 | 2.0445965E−09 |
| A12 | 3.0826098E−10 | −2.8807392E−10 |
| A13 | −2.3133052E−11 | 2.5838989E−11 |
| A14 | −7.8804007E−13 | −1.8604303E−12 |
| A15 | 1.6295742E−13 | 9.7344955E−14 |
| A16 | −5.4727300E−15 | −2.4339439E−15 |

Example 16

Figure 37:
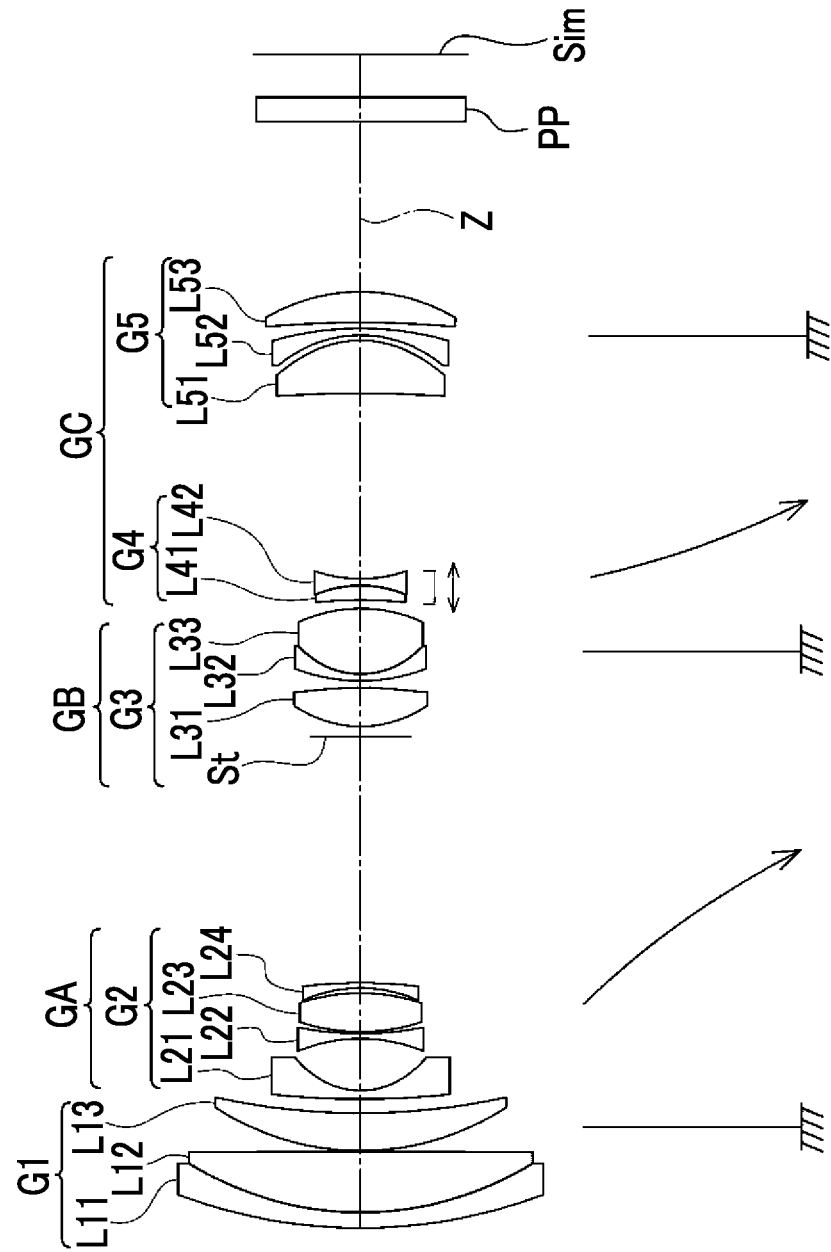
FIG. 37 is a cross-sectional view of a configuration of a zoom lens of Example 16 and a diagram showing movement loci thereof.

FIG. 37 shows a configuration and movement loci of the zoom lens of Example 16. The zoom lens shown in Example 16 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 16, Table 46 shows basic lens data, Table 47 shows specifications and variable surface spacings, and Table 48 shows aspherical coefficients thereof. FIG. 38 shows aberration diagrams. In Example 16, the distance on the optical axis from the lens surface closest to the object side to the close range object is 0.8 m (meters).

TABLE 46

| | Example 16 | | | | | |
|---|---|---|---|---|---|---|
| Sn | R | D | Nd | vd | θgF | ED |
| 1 | 85.13382 | 1.819 | 1.92286 | 20.89 | 0.63806 | 51.05 |
| 2 | 52.84299 | 7.125 | 1.55200 | 70.70 | 0.54219 | 48.02 |
| 3 | −4685.39638 | 0.120 | | | | 47.00 |
| 4 | 43.21255 | 4.436 | 1.77535 | 50.30 | 0.55004 | 40.71 |
| 5 | 113.11893 | DD[5] | | | | 39.97 |
| *6 | 266.72131 | 1.000 | 1.80610 | 40.73 | 0.56940 | 24.35 |
| *7 | 12.64590 | 6.121 | | | | 18.21 |
| 8 | −26.73782 | 0.600 | 1.77535 | 50.30 | 0.55004 | 17.41 |

TABLE 46-continued

| | Example 16 | | | | | |
|---|---|---|---|---|---|---|
| Sn | R | D | Nd | vd | θgF | ED |
| 9 | 51.18596 | 0.225 | | | | 16.93 |
| 10 | 32.41719 | 4.520 | 1.85896 | 22.73 | 0.62844 | 16.90 |
| 11 | −31.72630 | 0.610 | | | | 16.26 |
| 12 | −22.63070 | 0.600 | 1.89395 | 36.91 | 0.57870 | 16.01 |
| 13 | −78.97149 | DD[13] | | | | 15.80 |
| 14(St) | ∞ | 1.218 | | | | 16.44 |
| *15 | 18.38609 | 4.565 | 1.49648 | 81.26 | 0.53689 | 18.50 |
| *16 | −48.28308 | 0.792 | | | | 18.46 |
| 17 | 29.85626 | 0.801 | 1.91082 | 35.25 | 0.58224 | 18.21 |
| 18 | 13.02421 | 7.571 | 1.53775 | 74.70 | 0.53936 | 17.29 |
| 19 | −23.99105 | DD[19] | | | | 17.22 |
| 20 | −77.50687 | 1.713 | 1.90137 | 26.77 | 0.60969 | 12.34 |
| 21 | −18.66257 | 0.800 | 1.77462 | 50.54 | 0.55032 | 12.44 |
| 22 | 23.17199 | DD[22] | | | | 12.66 |
| *23 | −179.34858 | 6.203 | 1.58313 | 59.46 | 0.54056 | 22.53 |
| *24 | −17.03680 | 0.607 | | | | 23.32 |
| 25 | −20.30703 | 0.800 | 2.00069 | 25.43 | 0.61417 | 22.97 |
| 26 | −52.41574 | 0.688 | | | | 24.47 |
| 27 | −171.64130 | 3.606 | 1.53172 | 48.85 | 0.56700 | 25.38 |
| 28 | −30.29772 | 20.000 | | | | 25.86 |
| 29 | ∞ | 2.850 | 1.51633 | 64.14 | 0.53531 | 28.92 |
| 30 | ∞ | 5.029 | | | | 29.18 |

TABLE 47

| | Example 16 | | |
|---|---|---|---|
| | Wide angle end_infinity | Telephoto end_infinity | Telephoto end_close |
| Zr | 1.00 | 5.00 | 5.00 |
| f | 18.547 | 92.736 | — |
| Bf | 26.907 | 26.907 | — |
| FNo. | 4.12 | 4.12 | 4.26 |
| 2ω[°] | 80.0 | 16.8 | 16.4 |
| IH | 14.9 | 14.9 | 14.9 |
| DD[5] | 1.644 | 28.210 | 28.210 |
| DD[13] | 28.902 | 2.336 | 2.336 |
| DD[19] | 0.995 | 14.283 | 16.960 |
| DD[22] | 21.824 | 8.536 | 5.859 |

TABLE 48

Example 16

| Sn | 6 | 7 | 23 | 24 |
|---|---|---|---|---|
| KA | 2.5333683E+01 | 9.3393736E-01 | -4.5532197E+00 | 9.9800160E-01 |
| A4 | 7.4747562E-05 | 6.5732077E-05 | 5.8364786E-07 | 1.8033181E-05 |
| A6 | -2.1118360E-06 | -8.2923671E-07 | -2.5118091E-07 | 2.5314979E-07 |
| A8 | 4.7319759E-08 | -8.0793996E-08 | 9.6772388E-09 | -1.7409810E-08 |
| A10 | -7.9524193E-10 | 5.9315217E-09 | -9.2663040E-11 | 6.4173328E-10 |
| A12 | 9.3934890E-12 | -2.0050240E-10 | -1.5910064E-12 | -1.2426583E-11 |
| A14 | -7.4102362E-14 | 3.9039118E-12 | 4.8091291E-14 | 1.3729067E-13 |
| A16 | 3.6783833E-16 | -4.4501804E-14 | -4.7819912E-16 | -8.6371114E-16 |
| A18 | -1.0327838E-18 | 2.7553203E-16 | 2.1682041E-18 | 2.8638107E-18 |
| A20 | 1.2461383E-21 | -7.1506946E-19 | -3.7741189E-21 | -3.8577185E-21 |

| Sn | 15 | 16 |
|---|---|---|
| KA | 1.0198230E+00 | 1.0000000E+00 |
| A3 | 1.0842559E-07 | 0.0000000E+00 |
| A4 | 7.0065327E-06 | 5.3950544E-05 |
| A5 | -2.9962692E-05 | -1.3977719E-05 |
| A6 | 1.6385445E-05 | 1.0144728E-05 |
| A7 | -4.0393228E-06 | -3.9828880E-06 |
| A8 | 2.4477993E-07 | 8.7491995E-07 |
| A9 | 9.0464563E-08 | -8.8643972E-08 |
| A10 | -1.6990822E-08 | -2.9596556E-09 |
| A11 | -2.4534913E-10 | 2.0443076E-09 |
| A12 | 3.0825088E-10 | -2.8803981E-10 |
| A13 | -2.3134201E-11 | 2.5839721E-11 |
| A14 | -7.8884947E-13 | -1.8603752E-I2 |
| A15 | 1.6292002E-13 | 9.7346637E-I4 |
| A16 | -5.4632706E-15 | -2.4344642E-I5 |

Example 17

Figure 39:
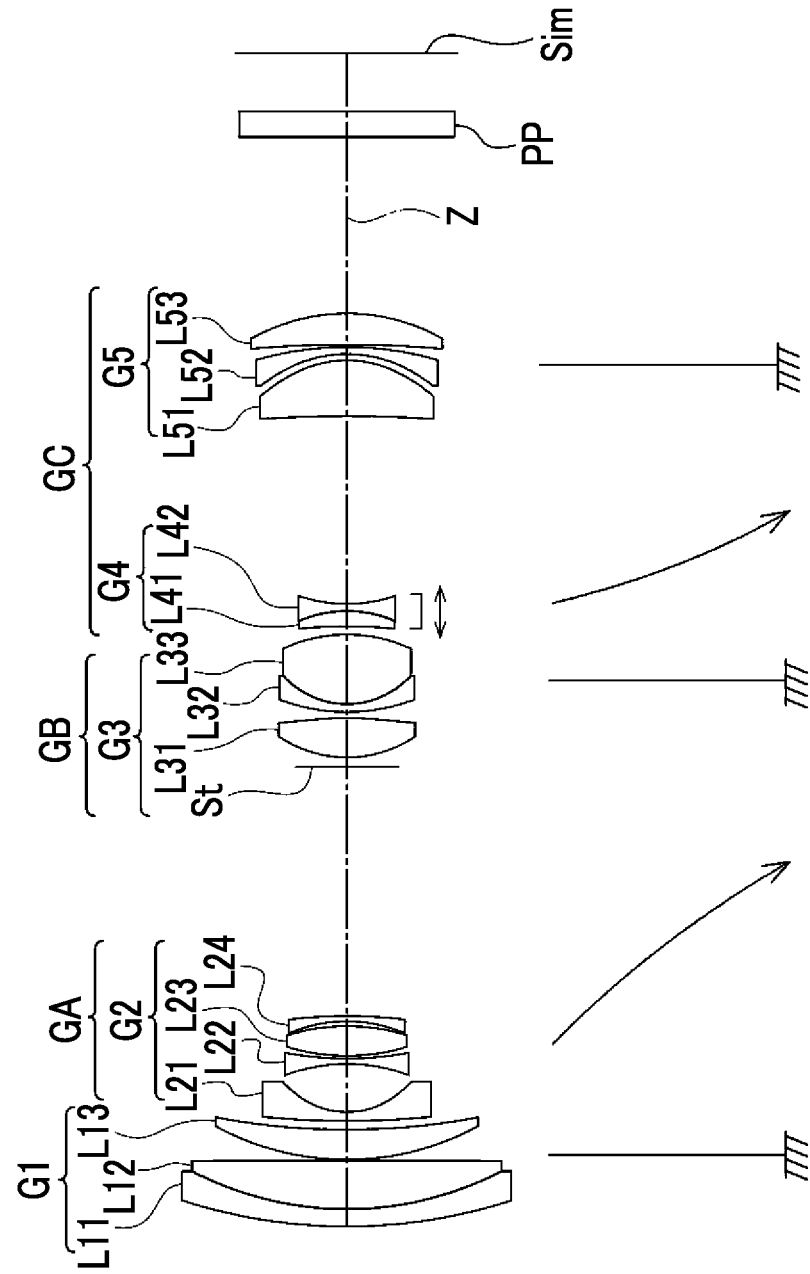
FIG. 39 is a cross-sectional view of a configuration of a zoom lens of Example 17 and a diagram showing movement loci thereof.

FIG. 39 shows a configuration and movement loci of the zoom lens of Example 17. The zoom lens shown in Example 17 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 17, Table 49 shows basic lens data, Table 50 shows specifications and variable surface spacings, and Table 51 shows aspherical coefficients thereof. FIG. 40 shows aberration diagrams. In Example 17, the distance on the optical axis from the lens surface closest to the object side to the close range object is 0.7 m (meters).

TABLE 49

Example 17

| Sn | R | D | Nd | vd | θgF | ED |
|---|---|---|---|---|---|---|
| 1 | 84.92605 | 1.967 | 1.92286 | 20.89 | 0.63806 | 44.42 |
| 2 | 52.93313 | 5.490 | 1.55397 | 71.76 | 0.53931 | 41.75 |
| 3 | -6241.07385 | 0.121 | | | | 40.81 |
| 4 | 43.21580 | 3.397 | 1.77535 | 50.30 | 0.55004 | 35.42 |
| 5 | 112.68323 | DD[5] | | | | 34.83 |
| *6 | 272.25078 | 1.000 | 1.80610 | 40.73 | 0.56940 | 22.59 |
| *7 | 12.64274 | 5.483 | | | | 17.31 |
| 8 | -26.81246 | 0.600 | 1.77535 | 50.30 | 0.55004 | 16.63 |
| 9 | 51.24935 | 0.326 | | | | 16.18 |
| 10 | 32.39229 | 3.350 | 1.85896 | 22.73 | 0.62844 | 16.14 |
| 11 | -31.67442 | 0.550 | | | | 15.79 |
| 12 | -22.70869 | 0.600 | 1.90060 | 36.50 | 0.57966 | 15.59 |
| 13 | -78.88377 | DD[13] | | | | 15.39 |
| 14(St) | ∞ | 1.077 | | | | 16.38 |
| *15 | 18.43230 | 4.463 | 1.49648 | 81.26 | 0.53689 | 18.34 |
| *16 | -48.08359 | 0.693 | | | | 18.31 |
| 17 | 29.94834 | 0.888 | 1.91082 | 35.25 | 0.58224 | 18.09 |
| 18 | 13.03948 | 7.875 | 1.53775 | 74.70 | 0.53936 | 17.17 |
| 19 | -23.97609 | DD[19] | | | | 17.10 |
| 20 | -77.55727 | 1.739 | 1.89905 | 26.83 | 0.60942 | 12.66 |
| 21 | -18.65333 | 0.801 | 1.77061 | 50.94 | 0.54974 | 12.75 |
| 22 | 23.21224 | DD[22] | | | | 12.94 |
| *23 | -182.22979 | 6.321 | 1.58313 | 59.46 | 0.54056 | 22.60 |
| *24 | -17.00289 | 0.698 | | | | 23.40 |
| 25 | -20.30491 | 0.801 | 2.00069 | 25.43 | 0.61417 | 23.02 |
| 26 | -51.97106 | 0.286 | | | | 24.52 |
| 27 | -170.66896 | 3.523 | 1.53172 | 48.85 | 0.56700 | 25.22 |
| 28 | -30.34460 | 20.000 | | | | 25.68 |
| 29 | ∞ | 2.850 | 1.51633 | 64.14 | 0.53531 | 28.75 |
| 30 | ∞ | 6.684 | | | | 29.00 |

TABLE 50

Example 17

| | Wide angle end_infinity | Telephoto end_infinity | Telephoto end_close |
|---|---|---|---|
| Zr | 1.00 | 4.00 | 4.00 |
| f | 18.548 | 74.191 | — |
| Bf | 28.564 | 28.564 | — |
| FNo. | 4.12 | 4.12 | 4.23 |
| 2ω[°] | 81.4 | 21.0 | 20.6 |
| IH | 14.9 | 14.9 | 14.9 |
| DD[5] | 1.001 | 24.570 | 24.570 |
| DD[13] | 28.231 | 4.662 | 4.662 |
| DD[19] | 0.824 | 13.438 | 15.559 |
| DD[22] | 21.327 | 8.713 | 6.592 |

TABLE 51

Example 17

| Sn | 6 | 7 | 23 | 24 |
|---|---|---|---|---|
| KA | 2.3548523E+01 | 9.2195621E−01 | −1.5312876E+01 | 9.8530353E−01 |
| A4 | 7.4734485E−05 | 6.5705820E−05 | 5.9874785E−07 | 1.8040619E−05 |
| A6 | −2.1118336E−06 | −8.2922595E−07 | −2.5118269E−07 | 2.5314758E−07 |
| A8 | 4.7319759E−08 | −8.0793996E−08 | 9.6772388E−09 | −1.7409810E−08 |
| A10 | −7.9524193E−10 | 5.9315217E−09 | −9.2663040E−11 | 6.4173328E−10 |
| A12 | 9.3934890E−12 | −2.0050240E−10 | −1.5910064E−12 | −1.2426583E−11 |
| A14 | −7.4102362E−14 | 3.9039118E−12 | 4.8091291E−14 | 1.3729067E−13 |
| A16 | 3.6783833E−16 | −4.4501804E−14 | −4.7819912E−16 | −8.6371114E−16 |
| A18 | −1.0327838E−18 | 2.7553203E−16 | 2.1682041E−18 | 2.8638107E−18 |
| A20 | 1.2461383E−21 | −7.1506946E−19 | −3.7741189E−21 | −3.8577185E−21 |

| Sn | 15 | 16 |
|---|---|---|
| KA | 1.0255665E+00 | 1.0000000E+00 |
| A3 | 7.9011380E−07 | 0.0000000E+00 |
| A4 | 7.0520973E−06 | 5.3950544E−05 |
| A5 | −2.9961233E−05 | −1.3977719E−05 |
| A6 | 1.6385437E−05 | 1.0144728E−05 |
| A7 | −4.0393170E−06 | −3.9828880E−06 |
| A8 | 2.4477993E−07 | 8.7491995E−07 |
| A9 | 9.0464563E−08 | −8.8643972E−08 |
| A10 | −1.6990822E−08 | −2.9596556E−09 |
| A11 | −2.4534913E−10 | 2.0443076E−09 |
| A12 | 3.0825088E−10 | −2.8803981E−10 |
| A13 | −2.3134201E−11 | 2.5839721E−11 |
| A14 | −7.8884947E−13 | −1.8603752E−12 |
| A15 | 1.6292002E−13 | 9.7346637E−14 |
| A16 | −5.4632706E−15 | −2.4344642E−15 |

Example 18

Figure 41:
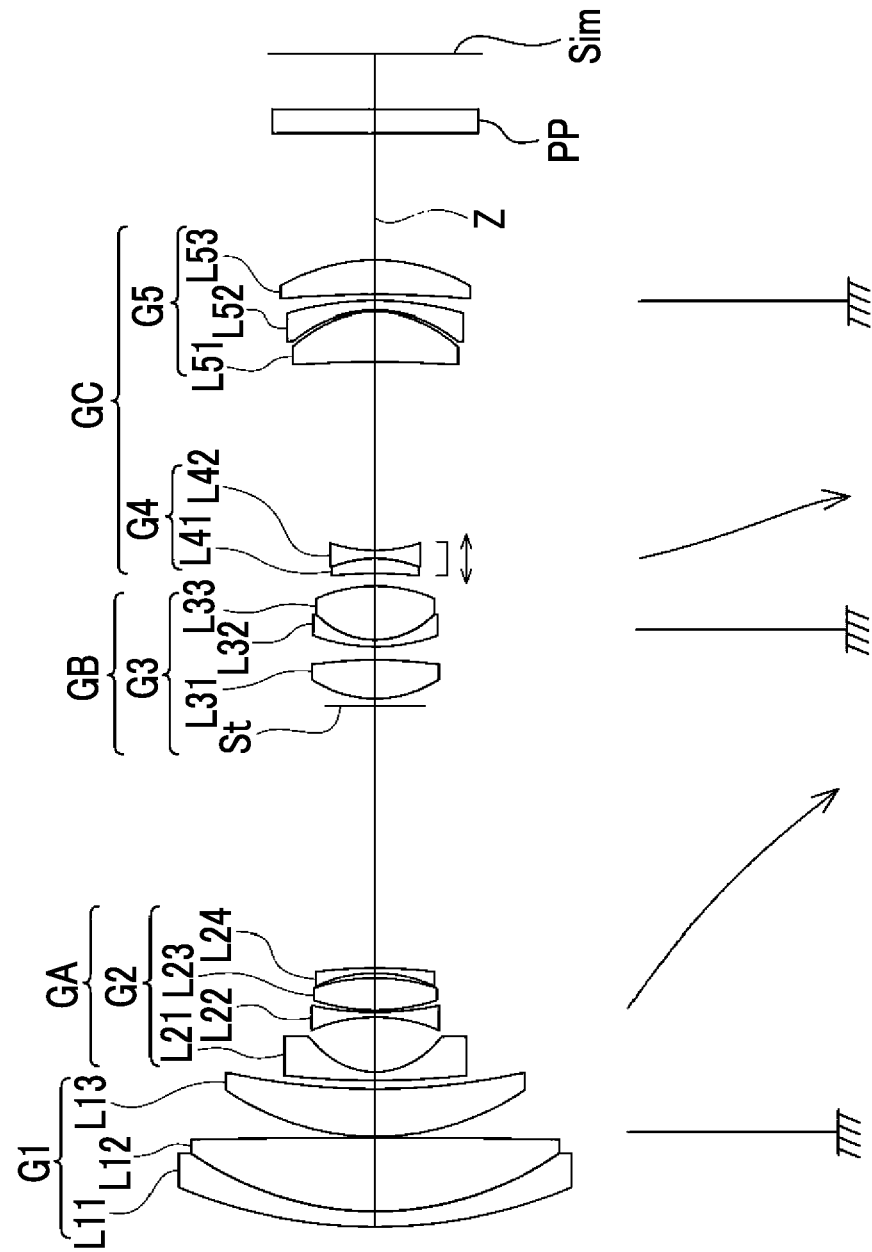
FIG. 41 is a cross-sectional view of a configuration of a zoom lens of Example 18 and a diagram showing movement loci thereof.

FIG. 41 shows a configuration and movement loci of the zoom lens of Example 18. The zoom lens shown in Example 18 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 18, Table 52 shows basic lens data, Table 53 shows specifications and variable surface spacings, and Table 54 shows aspherical coefficients thereof. FIG. 42 shows aberration diagrams. In Example 18, the distance on the optical axis from the lens surface closest to the object side to the close range object is 1.2 m (meters).

TABLE 52

Example 18

| Sn | R | D | Nd | vd | θgF | ED |
|---|---|---|---|---|---|---|
| 1 | 83.84947 | 1.812 | 1.92286 | 20.89 | 0.63806 | 55.13 |
| 2 | 51.89837 | 8.773 | 1.55200 | 70.70 | 0.54219 | 51.67 |
| 3 | −1502.06573 | 0.121 | | | | 50.34 |
| 4 | 42.84570 | 5.640 | 1.77535 | 50.30 | 0.55004 | 42.00 |
| 5 | 112.38560 | DD[5] | | | | 40.74 |
| *6 | 275.38700 | 1.000 | 1.80610 | 40.73 | 0.56940 | 25.52 |
| *7 | 12.69218 | 6.467 | | | | 18.70 |
| 8 | −26.73310 | 0.600 | 1.77535 | 50.30 | 0.55004 | 17.90 |
| 9 | 51.69688 | 0.242 | | | | 17.39 |
| 10 | 32.39468 | 3.801 | 1.85896 | 22.73 | 0.62844 | 17.35 |
| 11 | −31.77148 | 0.610 | | | | 16.94 |
| 12 | −22.59374 | 0.600 | 1.89041 | 37.05 | 0.57838 | 16.75 |
| 13 | −78.58073 | DD[13] | | | | 16.53 |
| 14(St) | ∞ | 0.800 | | | | 16.25 |
| *15 | 18.37579 | 4.617 | 1.49648 | 81.26 | 0.53689 | 17.85 |
| *16 | −48.67479 | 1.541 | | | | 17.79 |
| 17 | 29.78217 | 0.800 | 1.91082 | 35.25 | 0.58224 | 17.46 |
| 18 | 13.02633 | 6.362 | 1.53775 | 74.70 | 0.53936 | 16.62 |

TABLE 52-continued

Example 18

| Sn | R | D | Nd | vd | θgF | ED |
|---|---|---|---|---|---|---|
| 19 | −23.90632 | DD[19] | | | | 16.53 |
| 20 | −77.38145 | 1.811 | 1.90139 | 27.43 | 0.60725 | 12.09 |
| 21 | −18.66542 | 0.960 | 1.77843 | 50.12 | 0.55093 | 12.24 |
| 22 | 23.09859 | DD[22] | | | | 12.54 |
| *23 | −180.94072 | 5.906 | 1.58313 | 59.46 | 0.54056 | 22.57 |
| *24 | −17.02024 | 0.178 | | | | 23.28 |
| 25 | −20.32860 | 1.088 | 2.00069 | 25.43 | 0.61417 | 23.08 |
| 26 | −52.47588 | 0.737 | | | | 24.74 |
| 27 | −172.48445 | 4.065 | 1.53172 | 48.85 | 0.56700 | 25.70 |
| 28 | −30.45441 | 15.000 | | | | 26.33 |
| 29 | ∞ | 2.850 | 1.51633 | 64.14 | 0.53531 | 28.70 |
| 30 | ∞ | 6.545 | | | | 28.95 |

TABLE 53

Example 18

| | Wide angle end_infinity | Telephoto end_infinity | Telephoto end_close |
|---|---|---|---|
| Zr | 1.00 | 7.00 | 7.00 |
| f | 18.548 | 129.839 | — |
| Bf | 23.423 | 23.423 | — |
| FNo. | 4.12 | 4.12 | 4.30 |
| 2ω[°] | 80.2 | 12.0 | 11.6 |
| IH | 14.9 | 14.9 | 14.9 |
| DD[5] | 1.006 | 31.739 | 31.739 |
| DD[13] | 30.963 | 0.230 | 0.230 |
| DD[19] | 1.484 | 13.522 | 17.320 |
| DD[22] | 22.281 | 10.243 | 6.445 |

TABLE 54

Example 18

| Sn | 6 | 7 | 23 | 24 |
|---|---|---|---|---|
| KA | 5.8295202E+01 | 9.9575245E−01 | 6.8211962E+01 | 1.0196999E+00 |
| A4 | 7.4745923E−05 | 6.5707648E−05 | 5.6556854E−07 | 1.8074856E−05 |
| A6 | −2.1118321E−06 | −8.2922284E−07 | −2.5118098E−07 | 2.5315341E−07 |
| A8 | 4.7319759E−08 | −8.0793996E−08 | 9.6772390E−09 | −1.7409810E−08 |
| A10 | −7.9524193E−10 | 5.9315217E−09 | −9.2663040E−11 | 6.4173328E−10 |
| A12 | 9.3934890E−12 | −2.0050240E−10 | −1.5910064E−12 | −1.2426583E−11 |
| A14 | −7.4102362E−14 | 3.9039118E−12 | 4.8091291E−14 | 1.3729067E−13 |
| A16 | 3.6783833E−16 | −4.4501804E−14 | −4.7819912E−16 | −8.6371114E−16 |
| A18 | −1.0327838E−18 | 2.7553203E−16 | 2.1682041E−18 | 2.8638107E−18 |
| A20 | 1.2461383E−21 | −7.1506946E−19 | −3.7741189E−21 | −3.8577185E−21 |

| Sn | 15 | 16 |
|---|---|---|
| KA | 9.9722751E−01 | 1.0000000E+00 |
| A3 | 1.0595588E−07 | 0.0000000E+00 |
| A4 | 7.0181098E−06 | 5.3950544E−05 |
| A5 | −2.9963806E−05 | −1.3977719E−05 |
| A6 | 1.6385529E−05 | 1.0144728E−05 |
| A7 | −4.0393652E−06 | −3.9828880E−06 |
| A8 | 2.4477993E−07 | 8.7491995E−07 |
| A9 | 9.0464563E−08 | −8.8643972E−08 |
| A10 | −1.6990822E−08 | −2.9596556E−09 |
| A11 | −2.4534913E−10 | 2.0443076E−09 |
| A12 | 3.0825088E−10 | −2.8803981E−10 |
| A13 | −2.3134201E−11 | 2.5839721E−11 |
| A14 | −7.8884947E−13 | −1.8603752E−12 |
| A15 | 1.6292002E−13 | 9.7346637E−14 |
| A16 | −5.4632706E−15 | −2.4344642E−15 |

Example 19

Figure 43:
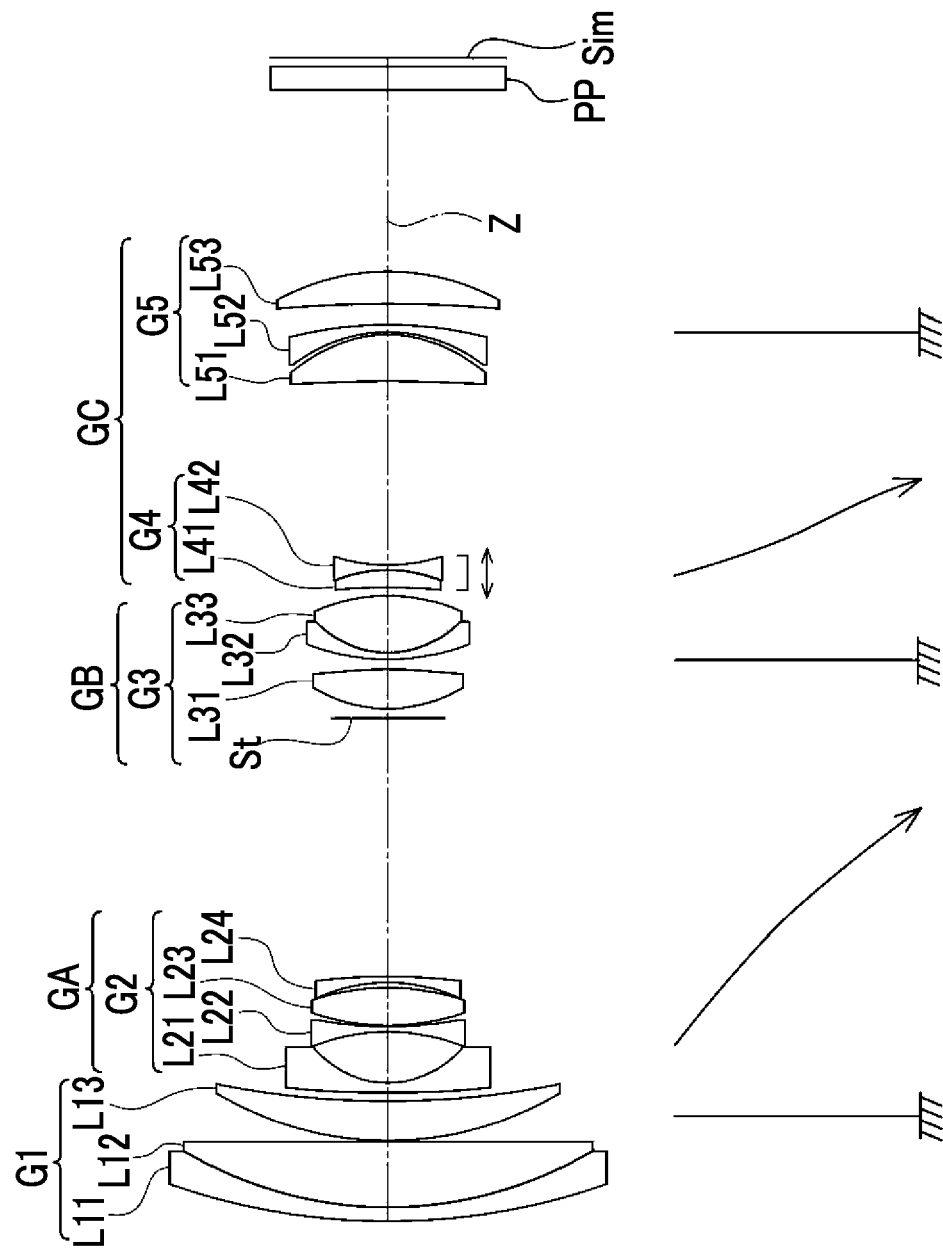
FIG. 43 is a cross-sectional view of a configuration of a zoom lens of Example 19 and a diagram showing movement loci thereof.

FIG. 43 shows a configuration and movement loci of the zoom lens of Example 19. The zoom lens shown in Example 19 consists of, in order from the object side to the image side, a first lens group G1 that has a positive refractive power, a second lens group G2 that has a negative refractive power, a third lens group G3 that has a negative refractive power, a fourth lens group G4 that has a positive refractive power, and a fifth lens group G5 that has a positive refractive power. The first lens group G1 consists of three lenses L11 to L13, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of two lenses L41 and L42, in order from the object side to the image side. The fifth lens group G5 consists of three lenses L51 to L53, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 19, Table 55 shows basic lens data, Table 56 shows specifications and variable surface spacings, and Table 57 shows aspherical coefficients thereof. FIG. 44 shows aberration diagrams. In Example 19, the distance on the optical axis from the lens surface closest to the object side to the close range object is 1.1 m (meters).

TABLE 55

Example 19

| Sn | R | D | Nd | νd | θgF | ED |
|---|---|---|---|---|---|---|
| 1 | 87.49027 | 1.700 | 1.92286 | 20.89 | 0.63806 | 54.04 |
| 2 | 52.89620 | 7.910 | 1.59283 | 68.63 | 0.54286 | 50.90 |
| 3 | ∞ | 0.120 | | | | 49.88 |
| 4 | 44.12034 | 4.790 | 1.77535 | 50.30 | 0.55004 | 42.60 |
| 5 | 116.11585 | DD[5] | | | | 41.81 |
| *6 | 245.66038 | 1.200 | 1.80610 | 40.73 | 0.56940 | 24.84 |
| *7 | 12.68927 | 6.145 | | | | 18.27 |
| 8 | −26.73160 | 0.650 | 1.77535 | 50.30 | 0.55004 | 17.54 |
| 9 | 50.98602 | 0.120 | | | | 17.08 |
| 10 | 31.42270 | 4.540 | 1.84666 | 23.79 | 0.62056 | 17.08 |
| 11 | −31.42270 | 0.627 | | | | 16.48 |
| 12 | −22.66685 | 0.740 | 1.88299 | 40.78 | 0.56829 | 16.21 |
| 13 | −76.75060 | DD[13] | | | | 16.00 |
| 14(St) | ∞ | 1.200 | | | | 16.50 |
| *15 | 18.36941 | 4.760 | 1.49648 | 81.26 | 0.53689 | 18.47 |
| *16 | −48.27179 | 1.190 | | | | 18.40 |
| 17 | 29.69112 | 0.810 | 1.91082 | 35.25 | 0.58224 | 18.08 |
| 18 | 13.05210 | 6.860 | 1.53775 | 74.70 | 0.53936 | 17.15 |
| 19 | −23.87047 | DD[19] | | | | 17.06 |
| 20 | −78.14210 | 2.100 | 1.90200 | 25.26 | 0.61662 | 12.50 |
| 21 | −18.35250 | 0.610 | 1.78799 | 47.47 | 0.55346 | 12.65 |
| 22 | 23.19920 | DD[22] | | | | 12.87 |
| *23 | −179.47134 | 5.630 | 1.58313 | 59.46 | 0.54056 | 22.61 |
| *24 | −17.00892 | 0.300 | | | | 23.21 |

TABLE 55-continued

Example 19

| Sn | R | D | Nd | νd | θgF | ED |
|---|---|---|---|---|---|---|
| 25 | −20.28331 | 0.870 | 2.00069 | 25.43 | 0.61417 | 22.95 |
| 26 | −53.01793 | 2.410 | | | | 24.47 |
| 27 | −170.48426 | 3.950 | 1.53172 | 48.85 | 0.56700 | 26.28 |
| 28 | −30.13278 | 21.850 | | | | 26.81 |
| 29 | ∞ | 2.850 | 1.51633 | 64.14 | 0.53531 | 29.50 |
| 30 | ∞ | 1.022 | | | | 29.70 |

TABLE 56

Example 19

| | Wide angle end_infinity | Telephoto end_infinity | Telephoto end_close |
|---|---|---|---|
| Zr | 1.00 | 6.30 | 6.30 |
| f | 18.547 | 116.847 | — |
| Bf | 24.750 | 24.750 | — |
| FNo. | 4.06 | 4.11 | 4.28 |
| 2ω[°] | 81.4 | 13.4 | 13.0 |
| IH | 14.9 | 14.9 | 14.9 |
| DD[5] | 1.010 | 31.197 | 31.197 |
| DD[13] | 30.990 | 0.803 | 0.803 |
| DD[19] | 1.000 | 12.816 | 15.898 |
| DD[22] | 22.140 | 10.324 | 7.242 |

TABLE 57

Example 19

| Sn | 6 | 7 | 23 | 24 |
|---|---|---|---|---|
| KA | 1.0000000E+00 | 1.0000000E+00 | 1.0000000E+00 | 1.0000000E+00 |
| A4 | 7.2162182E−05 | 6.3951258E−05 | 6.2558334E−07 | 1.7961844E−05 |
| A6 | −2.4070551E−06 | −1.6240922E−06 | −2.5123777E−07 | 2.5308981E−07 |
| A8 | 6.6292530E−08 | −1.3300528E−08 | 9.6772452E−09 | −1.7409809E−08 |
| A10 | −1.2928618E−09 | 2.9349449E−09 | −9.2663040E−11 | 6.4173328E−10 |
| A12 | 1.6662337E−11 | −1.1360714E−10 | −1.5910064E−12 | −1.2426583E−11 |
| A14 | −1.3767364E−13 | 2.2401189E−12 | 4.8091291E−14 | 1.3729067E−13 |
| A16 | 6.9920905E−16 | −2.4643236E−14 | −4.7819912E−16 | −8.6371114E−16 |
| A18 | −1.9843666E−18 | 1.4358958E−16 | 2.1682041E−18 | 2.8638107E−18 |
| A20 | 2.4073118E−21 | −3.4575521E−19 | −3.7741189E−21 | −3.8577185E−21 |

| Sn | 15 | 16 |
|---|---|---|
| KA | 1.0000000E+00 | 1.0000000E+00 |
| A3 | 0.0000000E+00 | 0.0000000E+00 |
| A4 | −6.0687358E−07 | 5.2748347E−05 |
| A5 | −2.8167628E−05 | −1.5462879E−05 |
| A6 | 1.9630198E−05 | 1.1360978E−05 |
| A7 | −6.0535065E−06 | −3.7763585E−06 |
| A8 | 7.7542404E−07 | 5.9968569E−07 |
| A9 | 6.0985521E−09 | −3.0551057E−08 |
| A10 | −8.1194622E−09 | −2.6503898E−09 |
| A11 | −5.3620339E−10 | 2.3432904E−10 |
| A12 | 2.1704935E−10 | 2.6746174E−11 |
| A13 | −9.6055698E−12 | −5.5244317E−12 |
| A14 | −1.1170760E−12 | 6.6721773E−13 |
| A15 | 1.1369689E−13 | −5.6273681E−14 |
| A16 | −2.8178209E−15 | 1.9621089E−15 |

Example 20

Figure 45:
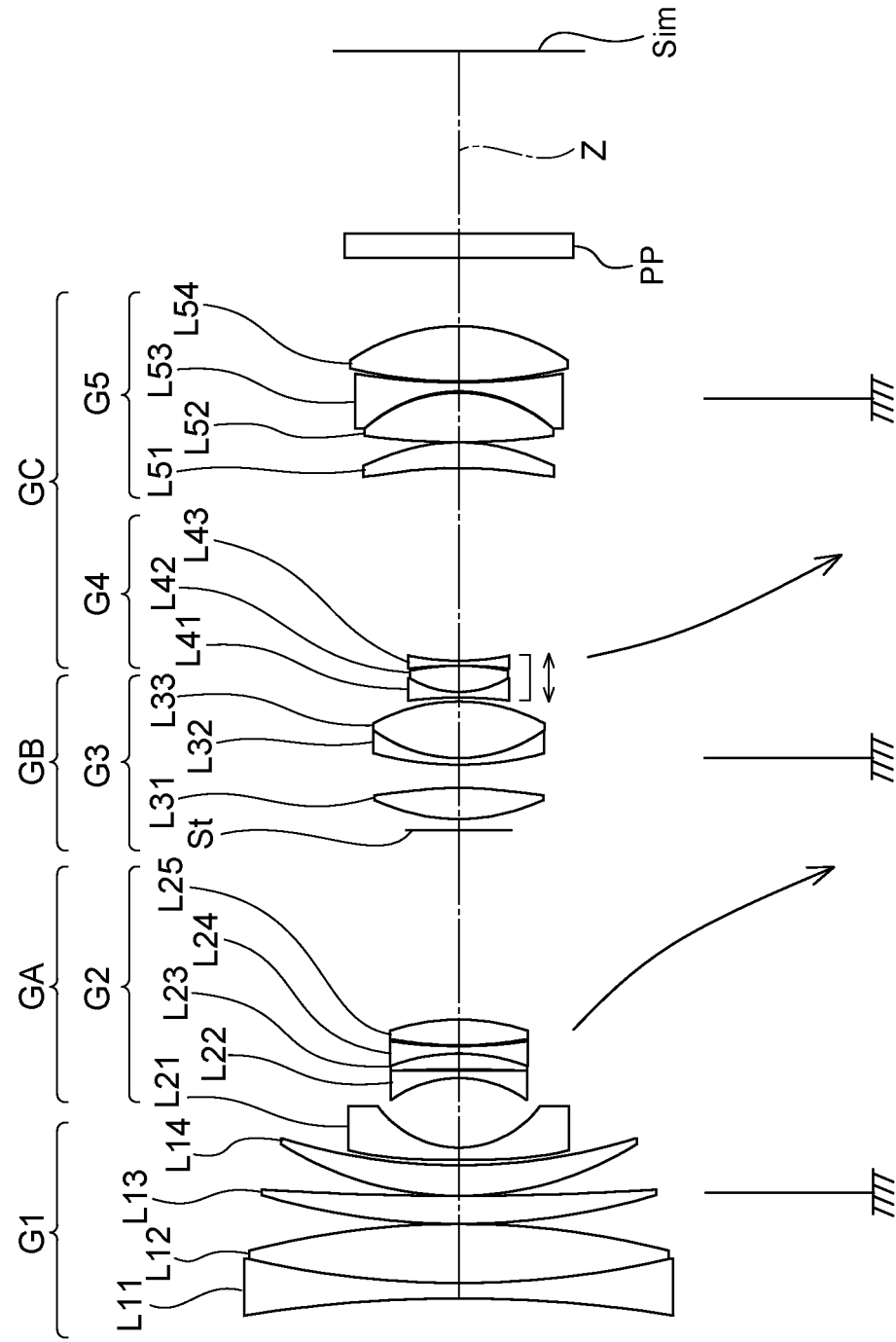
FIG. 45 is a cross-sectional view of a configuration of a zoom lens of Example 20 and a diagram showing movement loci thereof.

FIG. 45 shows a configuration and movement loci of the zoom lens of Example 20. The zoom lens of Example 20 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of five lenses L21 to L25, in order from the object side to the image side. The third lens group G3 consists of the aperture stop St and three lenses L31 to L33, in order from the object side to the image side. The fourth lens group G4 consists of three lenses L41 and L43, in order from the object side to the image side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 20, Table 58 shows basic lens data, Table 59 shows specifications and variable surface spacings, and Table 60 shows aspherical coefficients thereof. FIG. 46 shows aberration diagrams. In Example 20, the distance on the optical axis from the lens surface closest to the object side to the close range object is 0.9 m (meters).

TABLE 58

| Sn | R | D | Nd | vd | θgF | ED |
|---|---|---|---|---|---|---|
| 1 | −295.8645 | 3.1009 | 1.85883 | 30.00 | 0.59793 | 90.00 |
| 2 | 201.8515 | 11.9149 | 1.59950 | 65.57 | 0.54124 | 88.02 |
| 3 | −182.2352 | 0.0283 | | | | 87.80 |
| 4 | 150.6690 | 5.6409 | 1.84850 | 43.79 | 0.56197 | 81.85 |
| 5 | 671.9347 | 0.0294 | | | | 81.19 |
| 6 | 72.1729 | 6.1390 | 1.75500 | 52.34 | 0.54761 | 73.74 |

TABLE 58-continued

| Sn | R | D | Nd | vd | θgF | ED |
|---|---|---|---|---|---|---|
| 7 | 129.4982 | DD[7] | | | | 72.57 |
| *8 | 253.3357 | 2.5010 | 1.85135 | 40.10 | 0.56954 | 43.76 |
| *9 | 20.9603 | 14.0297 | | | | 31.57 |
| 10 | −25.2063 | 1.4991 | 1.69560 | 59.05 | 0.54348 | 28.20 |
| 11 | −9659.7341 | 0.2683 | | | | 28.55 |
| 12 | −366.6421 | 3.1931 | 1.66520 | 47.31 | 0.55748 | 28.55 |
| 13 | −42.3095 | 1.5107 | 1.55332 | 71.68 | 0.54029 | 28.64 |
| 14 | 107.0984 | 0.1748 | | | | 28.88 |
| 15 | 83.7483 | 5.1765 | 1.59270 | 35.27 | 0.59363 | 28.98 |
| 16 | −47.3863 | DD[16] | | | | 29.00 |
| 17(St) | ∞ | 2.2908 | | | | 31.42 |
| *18 | 40.6322 | 6.2682 | 1.49710 | 81.56 | 0.53848 | 35.25 |
| *19 | −75.3699 | 4.6949 | | | | 35.42 |
| 20 | 70.6719 | 1.3491 | 1.91650 | 31.60 | 0.59117 | 35.90 |
| 21 | 31.3786 | 11.4028 | 1.49700 | 81.61 | 0.53887 | 34.95 |
| 22 | −38.6322 | DD[22] | | | | 35.12 |
| 23 | −89.0662 | 1.1359 | 1.65160 | 58.62 | 0.54102 | 21.10 |
| 24 | 20.4095 | 5.2900 | 1.61293 | 36.96 | 0.58507 | 20.62 |
| 25 | −53.4057 | 0.0291 | | | | 20.50 |
| 26 | −88.5682 | 1.0009 | 1.69680 | 55.53 | 0.54341 | 20.59 |
| 27 | 55.2966 | DD[27] | | | | 21.14 |
| *28 | −94.2868 | 5.1786 | 1.58313 | 59.38 | 0.54237 | 37.92 |
| *29 | −41.1027 | 0.0291 | | | | 38.81 |
| 30 | 152.7747 | 9.9801 | 1.53775 | 74.70 | 0.53936 | 39.67 |
| 31 | −30.6890 | 0.2415 | | | | 39.69 |
| 32 | −29.9662 | 1.8003 | 1.91082 | 35.25 | 0.58224 | 39.62 |
| 33 | 132.1922 | 0.2339 | | | | 43.59 |
| 34 | 99.4568 | 11.1453 | 1.55332 | 71.68 | 0.54029 | 44.73 |
| 35 | −41.0976 | 13.7468 | | | | 45.54 |
| 36 | ∞ | 4.9000 | 1.51633 | 64.14 | 0.53531 | 47.49 |
| 37 | ∞ | 36.8663 | | | | 47.79 |

TABLE 59

Example 20

| | Wide angle end_infinity | Telephoto end_infinity | Telephoto end_close |
|---|---|---|---|
| Zr | 1.0 | 3.4 | 3.4 |
| f | 28.85 | 97.02 | — |
| Bf | 53.85 | 53.85 | — |
| FNo. | 4.12 | 4.12 | 4.12 |
| 2ω[°] | 86.8 | 27.6 | 27.0 |
| IH | 25.6 | 25.6 | 25.6 |
| DD[7] | 1.05 | 37.64 | 37.64 |
| DD[16] | 38.17 | 1.58 | 1.58 |
| DD[22] | 0.80 | 25.82 | 29.82 |
| DD[27] | 38.88 | 13.86 | 9.85 |

TABLE 60

Example 20

| Sn | 8 | 9 | 18 | 19 |
|---|---|---|---|---|
| KA | 1.0000000E+00 | 1.0000000E+00 | 1.0000000E+00 | 1.0000000E+00 |
| A4 | 3.9577718E−06 | −3.6351804E−06 | −2.6242252E−06 | 6.3898108E−06 |
| A6 | −2.7241315E−09 | 8.5273828E−09 | 5.6025731E−09 | 5.1354676E−09 |
| A8 | −2.4942378E−12 | −1.2477156E−10 | −9.7933326E−12 | −7.6697340E−12 |
| A10 | 1.4049440E−14 | 4.6882677E−13 | −5.2347555E−15 | 2.2135917E−14 |
| A12 | −6.0880202E−18 | 3.7616904E−16 | 1.0662143E−16 | 3.8142440E−18 |
| A14 | −1.0197870E−21 | −8.9337531E−18 | 4.7560362E−20 | −2.3372368E−19 |
| A16 | 7.1233024E−25 | −9.9148560E−22 | −1.6856701E−21 | −2.0148453E−22 |
| A18 | −5.9332061E−26 | 1.7323575E−22 | 5.3682701E−25 | −1.3759412E−24 |
| A20 | 7.5569737E−29 | −3.6405828E−25 | −5.0361155E−27 | −2.9986965E−27 |

TABLE 60-continued

| | Example 20 | |
|---|---|---|
| Sn | 28 | 29 |
| KA | 1.0000000E+00 | 1.0000000E+00 |
| A4 | −4.8414521E−07 | 9.2898699E−07 |
| A6 | 4.1583951E−09 | 1.3318428E−09 |
| A8 | 1.4417700E−12 | 7.7150840E−12 |
| A10 | 3.2715233E−14 | −8.6357730E−16 |
| A12 | −1.7873707E−17 | 4.0884916E−17 |
| A14 | 4.6925368E−20 | −2.6866561E−24 |
| A16 | −2.9487165E−22 | −1.5133836E−26 |
| A18 | 1.6936136E−25 | −4.9014144E−25 |
| A20 | −3.5363576E−28 | 7.5132809E−29 |

Example 21

Figure 47:
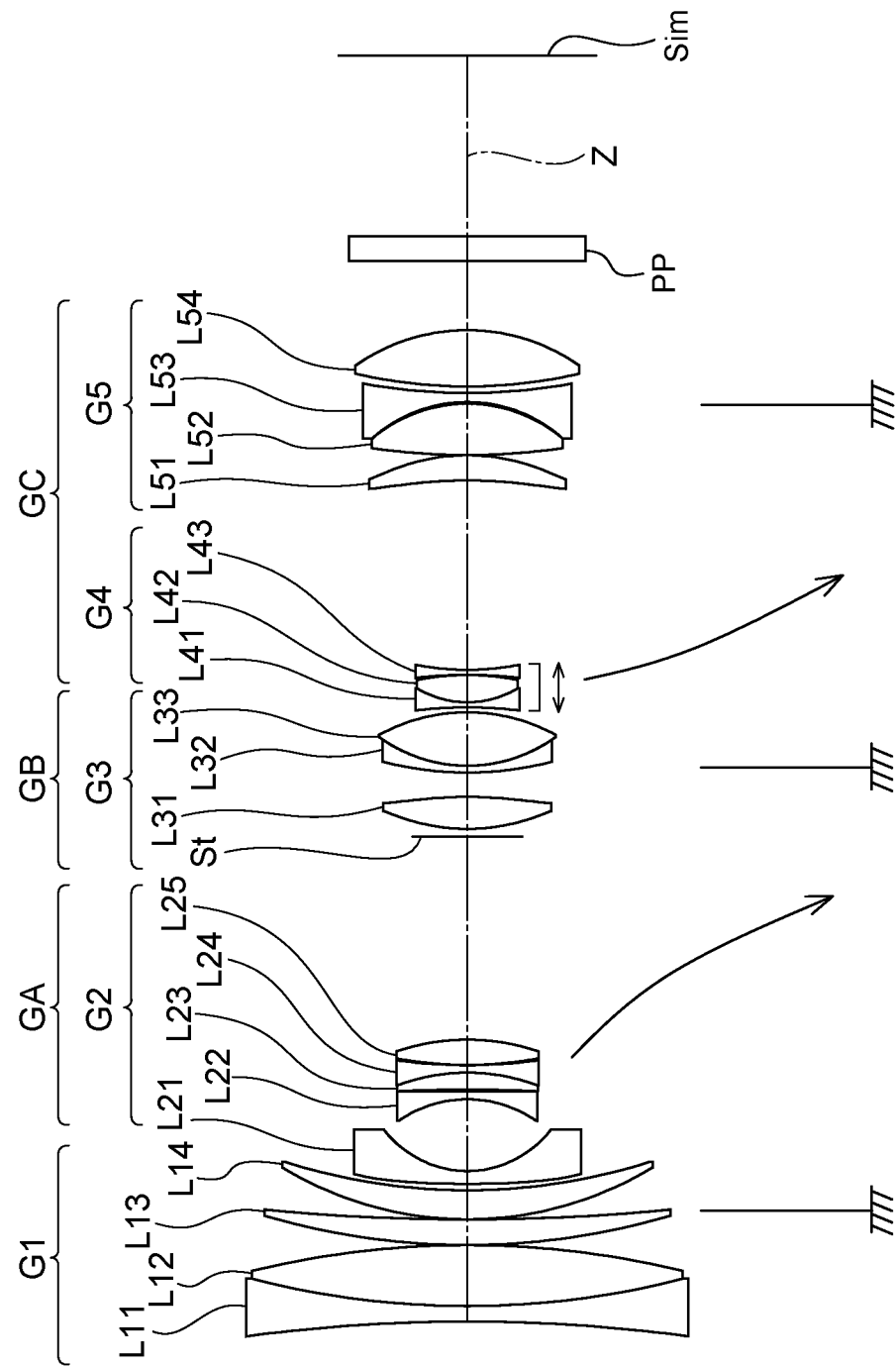
FIG. 47 is a cross-sectional view of a configuration of a zoom lens of Example 21 and a diagram showing movement loci thereof.

FIG. 47 shows a configuration and movement loci of the zoom lens of Example 21. The zoom lens shown in Example 21 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of five lenses L21 to L25, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 21, Table 61 shows basic lens data, Table 62 shows specifications and variable surface spacings, and Table 63 shows aspherical coefficients thereof. FIG. 48 shows aberration diagrams. In Example 21, the distance on the optical axis from the lens surface closest to the object side to the close range object is 0.9 m (meters).

TABLE 61

| | Example 21 | | | | | |
|---|---|---|---|---|---|---|
| Sn | R | D | Nd | vd | θgF | ED |
| 1 | −348.1113 | 3.1006 | 1.85883 | 30.00 | 0.59793 | 90.00 |
| 2 | 180.5869 | 12.0987 | 1.60300 | 65.44 | 0.53901 | 87.73 |
| 3 | −189.8806 | 0.0302 | | | | 87.49 |
| 4 | 149.9913 | 5.0640 | 1.88300 | 40.69 | 0.56730 | 81.56 |
| 5 | 439.5982 | 0.0309 | | | | 80.93 |
| 6 | 74.0625 | 5.7859 | 1.77250 | 49.62 | 0.55188 | 74.44 |
| 7 | 125.2770 | DD[7] | | | | 73.27 |
| *8 | 268.6419 | 2.5007 | 1.85135 | 40.10 | 0.56954 | 43.29 |
| *9 | 21.1159 | 14.2821 | | | | 31.57 |
| 10 | −25.0929 | 1.5009 | 1.69560 | 59.05 | 0.54348 | 28.05 |
| 11 | 8927.1489 | 0.4342 | | | | 28.51 |
| 12 | −289.9144 | 3.3394 | 1.72000 | 43.61 | 0.56833 | 28.52 |

TABLE 61-continued

| | Example 21 | | | | | |
|---|---|---|---|---|---|---|
| Sn | R | D | Nd | vd | θgF | ED |
| 13 | −42.0498 | 1.5091 | 1.53775 | 74.70 | 0.53936 | 28.66 |
| 14 | 106.5601 | 0.0296 | | | | 28.91 |
| 15 | 80.7815 | 5.0252 | 1.59551 | 39.21 | 0.58059 | 28.99 |
| 16 | −46.2765 | DD[16] | | | | 29.00 |
| 17(St) | ∞ | 1.5670 | | | | 30.96 |
| *18 | 40.4990 | 6.3800 | 1.49710 | 81.56 | 0.53848 | 34.01 |
| *19 | −78.4749 | 4.8281 | | | | 34.18 |
| 20 | 70.1839 | 1.3499 | 1.91650 | 31.60 | 0.59117 | 34.52 |
| 21 | 31.1970 | 10.6191 | 1.49700 | 81.61 | 0.53887 | 33.62 |
| 22 | −38.4222 | DD[22] | | | | 33.76 |
| 23 | −88.4024 | 0.9995 | 1.65160 | 58.54 | 0.53901 | 21.13 |
| 24 | 20.3135 | 5.4319 | 1.61293 | 36.94 | 0.58634 | 20.64 |
| 25 | −53.2078 | 0.0299 | | | | 20.50 |
| 26 | −89.6393 | 1.0003 | 1.72916 | 54.68 | 0.54451 | 20.59 |
| 27 | 56.3981 | DD[27] | | | | 21.12 |
| *28 | −97.0042 | 4.9972 | 1.58313 | 59.38 | 0.54237 | 37.59 |
| *29 | −40.5088 | 0.0292 | | | | 38.38 |
| 30 | 138.9936 | 10.2103 | 1.53775 | 74.70 | 0.53936 | 39.03 |
| 31 | −30.7146 | 0.3302 | | | | 38.98 |
| 32 | −29.7685 | 1.8002 | 1.91082 | 35.25 | 0.58224 | 38.76 |
| 33 | 123.2695 | 1.3030 | | | | 42.50 |
| 34 | 103.8496 | 11.1887 | 1.55215 | 71.99 | 0.54103 | 44.70 |
| 35 | −40.4744 | 13.7468 | | | | 45.54 |
| 36 | ∞ | 4.9000 | 1.51633 | 64.14 | 0.53531 | 47.53 |
| 37 | ∞ | 35.9682 | | | | 47.84 |

TABLE 62

| | Example 21 | | |
|---|---|---|---|
| | Wide angle end_infinity | Telephoto end_infinity | Telephoto end_close |
| Zr | 1.0 | 3.4 | 3.4 |
| f | 28.84 | 97.01 | — |
| Bf | 52.95 | 52.95 | — |
| FNo. | 4.12 | 4.12 | 4.12 |
| 2ω[°] | 87.0 | 27.8 | 27.2 |
| IH | 25.6 | 25.6 | 25.6 |
| DD[7] | 1.29 | 40.63 | 40.63 |
| DD[16] | 40.32 | 0.99 | 0.99 |
| DD[22] | 0.99 | 25.27 | 29.10 |
| DD[27] | 37.65 | 13.37 | 9.54 |

TABLE 63

| | Example 21 | | | |
|---|---|---|---|---|
| Sn | 8 | 9 | 18 | 19 |
| KA | 1.0000000E+00 | 1.0000000E+00 | 1.0000000E+00 | 1.0000000E+00 |
| A4 | 3.9575742E−06 | −3.6426457E−06 | −2.6212771E−06 | 6.4068605E−06 |
| A6 | −2.7208674E−09 | 8.5441153E−09 | 5.6002395E−09 | 5.1597799E−09 |
| A8 | −2.4744285E−12 | −1.2477429E−10 | −9.7199836E−12 | −7.5428429E−12 |
| A10 | 1.4049783E−14 | 4.6883518E−13 | −4.6573393E−15 | 2.2868424E−14 |
| A12 | −6.0853178E−18 | 3.7617081E−16 | 1.0656352E−16 | 6.5187452E−18 |
| A14 | −1.0191091E−21 | −8.9337517E−18 | 4.7560411E−20 | −2.3431342E−19 |
| A16 | 7.1251706E−25 | −9.9149220E−22 | −1.6732733E−21 | −2.1441267E−22 |
| A18 | −5.9331915E−26 | 1.7323222E−22 | 5.3689012E−25 | −1.3760058E−24 |
| A20 | 7.5569713E−29 | −3.6399745E−25 | −5.0361040E−27 | −2.9990921E−27 |

| Sn | 28 | 29 |
|---|---|---|
| KA | 1.0000000E+00 | 1.0000000E+00 |
| A4 | −4.3921566E−07 | 9.2831084E−07 |
| A6 | 4.1572203E−09 | 1.3344013E−09 |
| A8 | 1.4326791E−12 | 7.7258811E−12 |
| A10 | 3.2689494E−14 | −8.3334084E−16 |
| A12 | −1.7643495E−17 | 4.1035723E−17 |
| A14 | 4.6924880E−20 | −2.8347877E−24 |
| A16 | −2.9459527E−22 | −1.5078373E−26 |
| A18 | 1.6936141E−25 | −4.8949122E−25 |
| A20 | −3.5398846E−28 | 7.5134828E−29 |

Example 22

Figure 49:
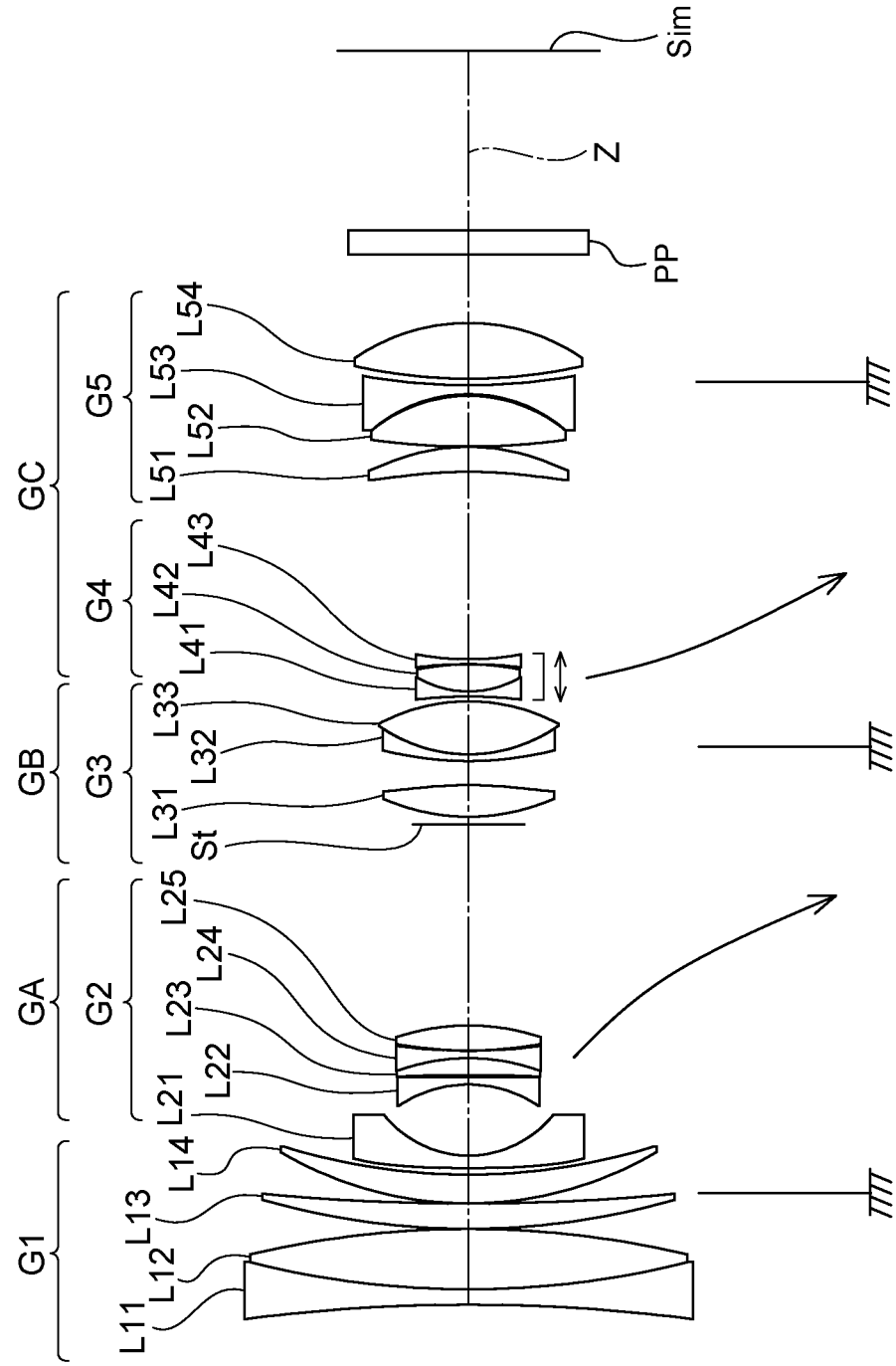
FIG. 49 is a cross-sectional view of a configuration of a zoom lens of Example 22 and a diagram showing movement loci thereof.

FIG. 49 shows a configuration and movement loci of the zoom lens of Example 22. The zoom lens shown in Example 22 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of five lenses L21 to L25, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 22, Table 64 shows basic lens data, Table 65 shows specifications and variable surface spacings, and Table 66 shows aspherical coefficients thereof. FIG. 50 shows aberration diagrams. In Example 22, the distance on the optical axis from the lens surface closest to the object side to the close range object is 0.9 m (meters).

TABLE 64

| | Example 22 | | | | | |
|---|---|---|---|---|---|---|
| Sn | R | D | Nd | νd | θgF | ED |
| 1 | −288.6755 | 3.0993 | 1.85883 | 30.00 | 0.59793 | 90.00 |
| 2 | 192.4257 | 13.1128 | 1.59500 | 67.84 | 0.54321 | 88.01 |
| 3 | −172.9737 | 0.0313 | | | | 87.73 |
| 4 | 139.3434 | 5.7563 | 1.84850 | 43.79 | 0.56197 | 81.40 |
| 5 | 495.1446 | 0.0309 | | | | 80.71 |
| 6 | 75.0870 | 5.4183 | 1.81600 | 46.67 | 0.55648 | 74.05 |
| 7 | 122.8257 | DD[7] | | | | 72.92 |
| *8 | 222.5455 | 2.5004 | 1.85135 | 40.10 | 0.56954 | 42.75 |
| *9 | 20.8580 | 13.6736 | | | | 31.22 |
| 10 | −25.6636 | 1.7861 | 1.69560 | 59.05 | 0.54348 | 28.24 |
| 11 | 771.3429 | 0.4244 | | | | 28.63 |
| 12 | −499.3605 | 3.3324 | 1.72000 | 43.61 | 0.56833 | 28.64 |
| 13 | −46.0280 | 1.5106 | 1.52841 | 76.45 | 0.53954 | 28.77 |
| 14 | 100.5286 | 0.1117 | | | | 28.93 |
| 15 | 78.7227 | 5.1684 | 1.59551 | 39.21 | 0.58059 | 29.02 |
| 16 | −49.3322 | DD[16] | | | | 29.00 |
| 17(St) | ∞ | 1.5755 | | | | 30.87 |
| *18 | 40.4615 | 6.4477 | 1.49710 | 81.56 | 0.53848 | 33.92 |
| *19 | −83.9524 | 3.7596 | | | | 34.11 |
| 20 | 71.1443 | 1.3502 | 1.91650 | 31.60 | 0.59117 | 34.51 |
| 21 | 31.6130 | 11.6820 | 1.49700 | 81.61 | 0.53887 | 33.67 |
| 22 | −37.8510 | DD[22] | | | | 33.91 |
| 23 | −93.2446 | 1.0001 | 1.62846 | 59.17 | 0.55582 | 21.23 |
| 24 | 18.7026 | 5.8797 | 1.60342 | 38.03 | 0.58300 | 20.68 |
| 25 | −57.1981 | 0.0309 | | | | 20.50 |
| 26 | −92.0407 | 1.0004 | 1.69560 | 59.05 | 0.54348 | 20.58 |
| 27 | 52.3595 | DD[27] | | | | 21.13 |
| *28 | −84.8965 | 4.9250 | 1.58313 | 59.38 | 0.54237 | 37.79 |
| *29 | −39.4567 | 0.0364 | | | | 38.66 |
| 30 | 113.1495 | 10.7004 | 1.53775 | 74.70 | 0.53936 | 39.73 |
| 31 | −31.5023 | 0.4091 | | | | 39.70 |
| 32 | −30.3126 | 1.8000 | 1.91100 | 35.22 | 0.58360 | 39.44 |
| 33 | 101.9687 | 0.3495 | | | | 43.28 |
| 34 | 84.2051 | 12.1145 | 1.53775 | 74.70 | 0.53936 | 44.63 |
| 35 | −39.4016 | 13.7468 | | | | 45.54 |
| 36 | ∞ | 4.9000 | 1.51633 | 64.14 | 0.53531 | 47.62 |
| 37 | ∞ | 33.8284 | | | | 47.94 |

TABLE 65

Example 22

| | Wide angle end_infinity | Telephoto end_infinity | Telephoto end_close |
|---|---|---|---|
| Zr | 1.0 | 3.4 | 3.4 |
| f | 28.85 | 97.02 | — |
| Bf | 50.81 | 50.81 | — |
| FNo. | 4.12 | 4.12 | 4.12 |
| 2ω[°] | 86.8 | 27.6 | 27.0 |
| IH | 25.6 | 25.6 | 25.6 |
| DD[7] | 1.16 | 39.75 | 39.75 |
| DD[16] | 39.58 | 1.00 | 1.00 |
| DD[22] | 0.99 | 25.03 | 29.06 |
| DD[27] | 38.45 | 14.42 | 10.39 |

TABLE 66

Example 22

| Sn | 8 | 9 | 18 | 19 |
|---|---|---|---|---|
| KA | 1.0000000E+00 | 1.0000000E+00 | 1.0000000E+00 | 1.0000000E+00 |
| A4 | 3.9105922E−06 | −3.5137158E−06 | −2.4750853E−06 | 6.6150776E−06 |
| A6 | −2.7374219E−09 | 8.6740701E−09 | 5.6282510E−09 | 5.1179827E−09 |
| A8 | −2.4939677E−12 | −1.2523790E−10 | −9.8755519E−12 | −7.5456182E−12 |
| A10 | 1.4006114E−14 | 4.6853629E−13 | −5.2168534E−15 | 2.2653446E−14 |
| A12 | −6.0588028E−18 | 3.7616364E−16 | 1.0392556E−16 | 6.0500031E−18 |
| A14 | −1.0173423E−21 | −8.9337014E−18 | 4.7556636E−20 | −2.4737928E−19 |
| A16 | 7.1636748E−25 | −9.8599327E−22 | −1.7001407E−21 | −2.2728580E−22 |
| A18 | −5.9330575E−26 | 1.7321473E−22 | 4.8780952E−25 | −1.3497189E−24 |
| A20 | 7.5562097E−29 | −3.6399938E−25 | −5.0362526E−27 | −2.9990371E−27 |

| Sn | 28 | 29 |
|---|---|---|
| KA | 1.0000000E+00 | 1.0000000E+00 |
| A4 | −4.7419349E−07 | 1.0708146E−06 |
| A6 | 4.1381611E−09 | 1.3459975E−09 |
| A8 | 1.4592208E−12 | 7.7384175E−12 |
| A10 | 3.2839904E−14 | −7.5576909E−16 |
| A12 | −1.6870532E−17 | 4.0855876E−17 |
| A14 | 4.6918185E−20 | 2.1173742E−25 |
| A16 | −3.0037315E−22 | −1.5972846E−26 |
| A18 | 1.6936167E−25 | −4.8588604E−25 |
| A20 | −3.5258134E−28 | 7.2939154E−29 |

Example 23

Figure 51:
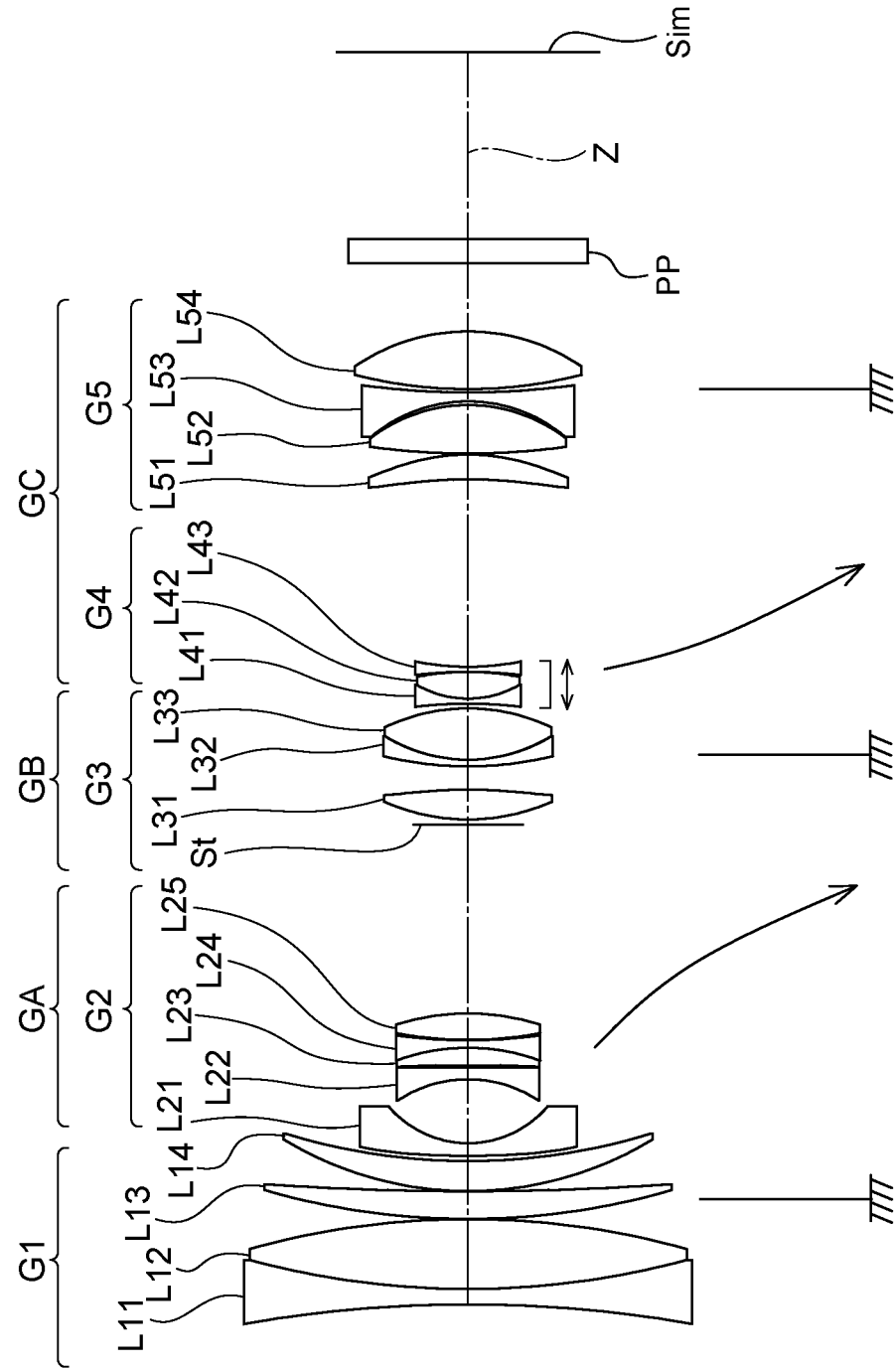
FIG. 51 is a cross-sectional view of a configuration of a zoom lens of Example 23 and a diagram showing movement loci thereof.

FIG. 51 shows a configuration and movement loci of the zoom lens of Example 23. The zoom lens shown in Example 23 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of five lenses L21 to L25, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 23, Table 67 shows basic lens data, Table 68 shows specifications and variable surface spacings, and Table 69 shows aspherical coefficients thereof. FIG. 52 shows aberration diagrams. In Example 23, the distance on the optical axis from the lens surface closest to the object side to the close range object is 0.9 m (meters).

TABLE 67

Example 23

| Sn | R | D | Nd | vd | θgF | ED |
|---|---|---|---|---|---|---|
| 1 | −259.6944 | 3.0996 | 1.85883 | 30.00 | 0.59793 | 90.00 |
| 2 | 168.0591 | 14.0406 | 1.59470 | 64.51 | 0.54228 | 87.36 |
| 3 | −163.3222 | 0.0304 | | | | 87.14 |
| 4 | 147.1125 | 5.5652 | 1.85390 | 42.46 | 0.56516 | 81.11 |
| 5 | 579.3515 | 0.0301 | | | | 80.42 |
| 6 | 71.2899 | 6.0343 | 1.80445 | 47.54 | 0.55560 | 73.12 |
| 7 | 124.8413 | DD[7] | | | | 71.93 |
| *8 | 216.1790 | 2.4994 | 1.85135 | 40.10 | 0.56954 | 42.07 |
| *9 | 20.4657 | 12.8590 | | | | 30.54 |
| 10 | −25.5349 | 2.4058 | 1.69560 | 59.05 | 0.54348 | 28.20 |
| 11 | 3852.9446 | 0.4277 | | | | 28.58 |
| 12 | −345.1609 | 3.4895 | 1.68545 | 45.01 | 0.56539 | 28.59 |
| 13 | −41.9530 | 1.5100 | 1.55385 | 71.72 | 0.53992 | 28.71 |
| 14 | 105.4021 | 0.0757 | | | | 28.91 |
| 15 | 78.5567 | 5.3283 | 1.59275 | 38.91 | 0.58141 | 29.01 |
| 16 | −47.2096 | DD[16] | | | | 29.00 |
| 17(St) | ∞ | 1.0001 | | | | 30.93 |
| *18 | 40.1045 | 6.0396 | 1.49710 | 81.56 | 0.53848 | 33.60 |
| *19 | −84.6040 | 4.6390 | | | | 33.73 |
| 20 | 71.3334 | 1.3503 | 1.92000 | 32.57 | 0.59039 | 34.12 |
| 21 | 31.9398 | 10.3020 | 1.49700 | 81.61 | 0.53887 | 33.29 |
| 22 | −38.6082 | DD[22] | | | | 33.43 |
| 23 | −87.2915 | 1.0009 | 1.63326 | 58.73 | 0.54302 | 21.09 |

TABLE 67-continued

Example 23

| Sn | R | D | Nd | vd | θgF | ED |
|---|---|---|---|---|---|---|
| 24 | 20.4266 | 5.3817 | 1.60985 | 37.02 | 0.58616 | 20.64 |
| 25 | −54.2621 | 0.0292 | | | | 20.50 |
| 26 | −84.1579 | 1.0000 | 1.71006 | 56.00 | 0.54364 | 20.57 |
| 27 | 54.2609 | DD[27] | | | | 21.14 |
| *28 | −98.2028 | 4.9714 | 1.58313 | 59.38 | 0.54237 | 40.07 |
| *29 | −41.7270 | 0.2097 | | | | 40.87 |
| 30 | 141.4240 | 9.7551 | 1.54889 | 72.48 | 0.53966 | 42.16 |
| 31 | −32.3142 | 0.7359 | | | | 42.17 |
| 32 | −30.1468 | 1.8025 | 1.90167 | 34.03 | 0.58670 | 39.03 |
| 33 | 155.7966 | 0.6769 | | | | 42.70 |
| 34 | 92.4709 | 11.5879 | 1.50686 | 78.94 | 0.53729 | 44.77 |
| 35 | −40.2235 | 13.7468 | | | | 45.54 |
| 36 | ∞ | 4.9000 | 1.51633 | 64.05 | 0.53463 | 47.46 |
| 37 | ∞ | 37.4461 | | | | 47.76 |

TABLE 68

Example 23

| | Wide angle end_infinity | Telephoto end_infinity | Telephoto end_close |
|---|---|---|---|
| Zr | 1.0 | 3.4 | 3.4 |
| f | 28.84 | 97.01 | — |
| Bf | 54.42 | 54.42 | — |
| FNo. | 4.12 | 4.12 | 4.12 |
| 2ω[°] | 89.6 | 28.2 | 27.4 |
| IH | 25.6 | 25.6 | 25.6 |
| DD[7] | 1.09 | 38.04 | 38.04 |
| DD[16] | 37.98 | 1.03 | 1.03 |
| DD[22] | 0.95 | 24.62 | 28.65 |
| DD[27] | 37.68 | 14.01 | 9.98 |

TABLE 69

Example 23

| Sn | 8 | 9 | 18 | 19 |
|---|---|---|---|---|
| KA | 1.0000000E+00 | 1.0000000E+00 | 1.0000000E+00 | 1.0000000E+00 |
| A4 | 3.9241147E−06 | −3.7214005E−06 | −2.5817538E−06 | 6.3751967E−06 |
| A6 | −2.7243038E−09 | 8.5517792E−09 | 5.6141396E−09 | 5.1498213E−09 |
| A8 | −2.4886719E−12 | −1.2453628E−10 | −9.8491190E−12 | −7.5693083E−12 |
| A10 | 1.4075990E−14 | 4.6878716E−13 | −5.4388855E−15 | 2.2792800E−14 |
| A12 | −6.0858549E−18 | 3.7616998E−16 | 1.0344786E−16 | 8.7594457E−18 |
| A14 | −1.0188694E−21 | −8.9337508E−18 | 4.7558515E−20 | −2.3943175E−19 |
| A16 | 7.1249816E−25 | −9.9147945E−22 | −1.6393251E−21 | −2.1146860E−22 |
| A18 | −5.9331999E−26 | 1.7315999E−22 | 5.3677247E−25 | −1.3762022E−24 |
| A20 | 7.5569753E−29 | −3.6410575E−25 | −5.0373693E−27 | −3.0189195E−27 |

| Sn | 28 | 29 |
|---|---|---|
| KA | 1.0000000E+00 | 1.0000000E+00 |
| A4 | −3.6887868E−07 | 8.4037788E−07 |
| A6 | 4.1566640E−09 | 1.3344489E−09 |
| A8 | 1.4327460E−12 | 7.7266140E−12 |
| A10 | 3.2769979E−14 | −8.5532059E−16 |
| A12 | −1.6892785E−17 | 4.0572014E−17 |
| A14 | 4.6925326E−20 | −1.9206017E−24 |
| A16 | −2.9506836E−22 | −1.5042686E−26 |
| A18 | 1.6936147E−25 | −4.9214265E−25 |
| A20 | −3.5757691E−28 | 7.5135974E−29 |

Example 24

Figure 53:
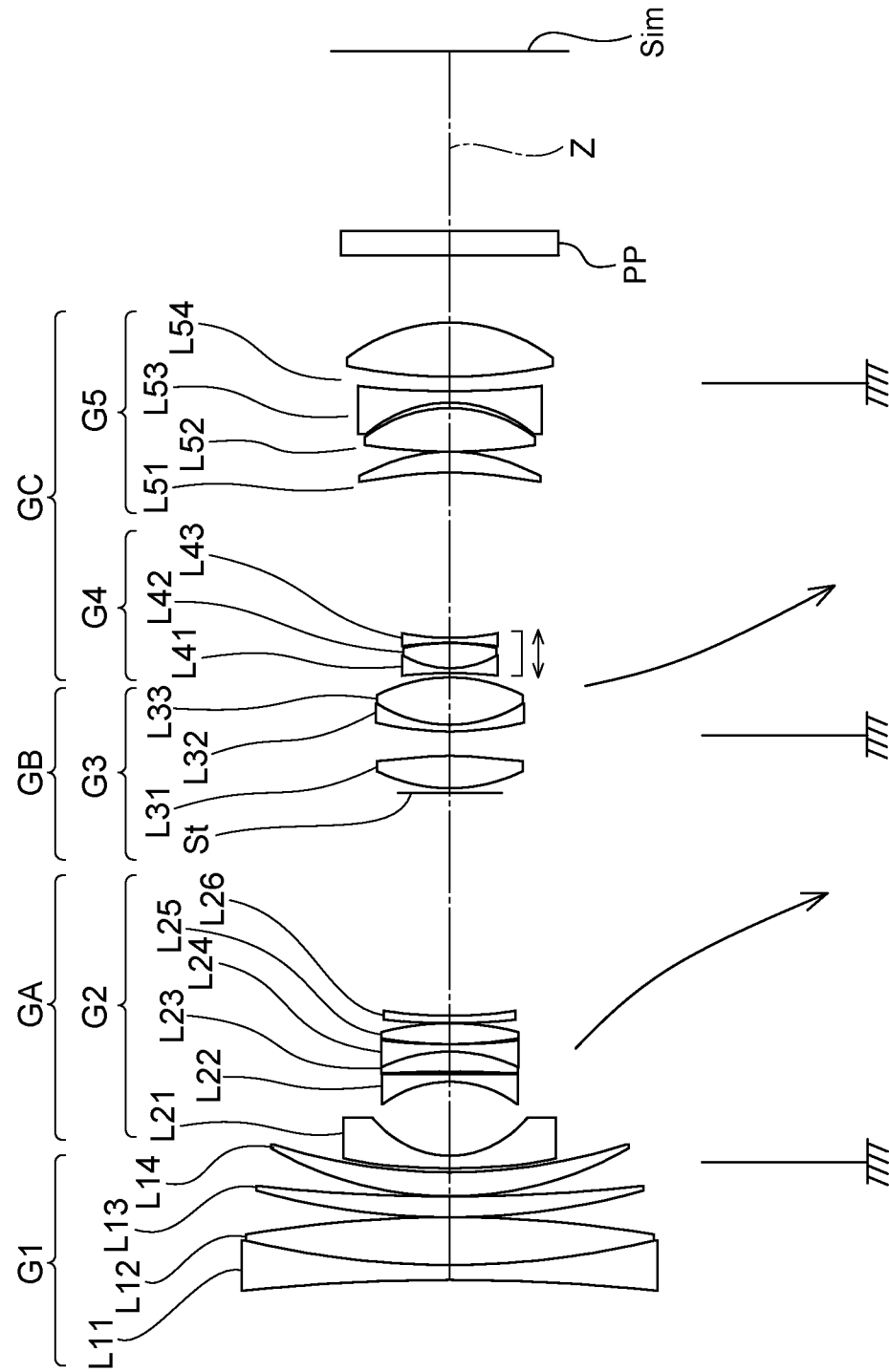
FIG. 53 is a cross-sectional view of a configuration of a zoom lens of Example 24 and a diagram showing movement loci thereof.

FIG. 53 shows a configuration and movement loci of the zoom lens of Example 24. The zoom lens shown in Example 24 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of six lenses L21 to L26, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 24, Table 70 shows basic lens data, Table 71 shows specifications and variable surface spacings, and Table 72 shows aspherical coefficients thereof. FIG. 54 shows aberration diagrams. In Example 24, the distance on the optical axis from the lens surface closest to the object side to the close range object is 0.9 m (meters).

TABLE 70

Example 24

| Sn | R | D | Nd | νd | θgF | ED |
|---|---|---|---|---|---|---|
| 1 | −477.8523 | 3.1003 | 1.89245 | 23.74 | 0.62191 | 92.00 |
| 2 | 207.8853 | 9.7060 | 1.72355 | 55.32 | 0.54395 | 89.74 |
| 3 | −291.2531 | 0.0303 | | | | 89.47 |
| 4 | 172.2206 | 4.2356 | 1.88280 | 39.72 | 0.57121 | 85.19 |
| 5 | 430.2190 | 0.0290 | | | | 84.71 |
| 6 | 85.0113 | 4.8953 | 1.90765 | 37.24 | 0.57738 | 78.75 |
| 7 | 136.6491 | DD[7] | | | | 77.94 |
| *8 | 227.6511 | 2.4991 | 1.85135 | 40.10 | 0.56954 | 45.89 |
| *9 | 22.1195 | 15.1087 | | | | 33.47 |
| 10 | −26.2071 | 1.5010 | 1.69560 | 59.05 | 0.54348 | 29.64 |
| 11 | 1623.3376 | 0.5760 | | | | 30.07 |
| 12 | −292.1810 | 4.0602 | 1.71874 | 51.06 | 0.55152 | 30.08 |
| 13 | −37.5286 | 1.5104 | 1.52021 | 76.89 | 0.53807 | 30.23 |
| 14 | 148.0213 | 0.0484 | | | | 30.35 |
| 15 | 99.7271 | 4.2290 | 1.76742 | 40.42 | 0.57284 | 30.41 |
| 16 | −64.9026 | 0.0305 | | | | 30.34 |
| 17 | 148.4279 | 1.5006 | 1.54630 | 72.88 | 0.53951 | 29.09 |
| 18 | 101.9186 | DD[18] | | | | 29.14 |
| 19(St) | ∞ | 0.9995 | | | | 29.37 |
| *20 | 37.8389 | 6.5852 | 1.49710 | 81.56 | 0.53848 | 32.08 |
| *21 | −83.9580 | 5.0314 | | | | 32.27 |
| 22 | 76.0621 | 1.3505 | 1.91764 | 33.95 | 0.58648 | 32.71 |
| 23 | 32.2710 | 9.6585 | 1.49700 | 81.61 | 0.53887 | 32.03 |
| 24 | −37.7707 | DD[24] | | | | 32.18 |
| 25 | −106.3143 | 1.0007 | 1.70499 | 56.25 | 0.54353 | 21.17 |
| 26 | 21.9619 | 5.1295 | 1.62956 | 35.04 | 0.59122 | 20.64 |
| 27 | −52.0518 | 0.0304 | | | | 20.50 |
| 28 | −83.0183 | 1.0008 | 1.74832 | 53.17 | 0.54654 | 20.57 |
| 29 | 57.6793 | DD[29] | | | | 21.10 |
| *30 | −88.1978 | 4.2657 | 1.58313 | 59.38 | 0.54237 | 36.16 |
| *31 | −40.0555 | 0.0303 | | | | 36.83 |
| 32 | 134.2618 | 8.8756 | 1.54086 | 69.28 | 0.53714 | 37.64 |
| 33 | −32.9139 | 1.1187 | | | | 37.63 |
| 34 | −29.8179 | 2.3132 | 1.92270 | 31.97 | 0.59219 | 37.02 |
| 35 | 191.8162 | 2.9943 | | | | 40.53 |
| 36 | 119.2666 | 11.0470 | 1.51630 | 74.45 | 0.53609 | 44.73 |
| 37 | −39.5185 | 13.7468 | | | | 45.54 |
| 38 | ∞ | 4.8973 | 1.51633 | 64.05 | 0.53463 | 47.49 |
| 39 | ∞ | 36.7279 | | | | 47.8 |

TABLE 71

Example 24

| | Wide angle end_infinity | Telephoto end_infinity | Telephoto end_close |
|---|---|---|---|
| Zr | 1.0 | 3.4 | 3.4 |
| f | 28.85 | 97.02 | — |
| Bf | 53.71 | 53.71 | — |
| FNo. | 4.12 | 4.12 | 4.12 |
| 2ω[°] | 89.6 | 28.2 | 27.6 |
| IH | 25.6 | 25.6 | 25.6 |
| DD[7] | 0.87 | 44.11 | 44.11 |
| DD[18] | 45.44 | 2.20 | 2.20 |
| DD[24] | 0.90 | 22.56 | 25.93 |
| DD[29] | 33.74 | 12.08 | 8.71 |

TABLE 72

Example 24

| Sn | 8 | 9 | 20 | 21 |
|---|---|---|---|---|
| KA | 1.0000000E+00 | 1.0000000E+00 | 1.0000000E+00 | 1.0000000E+00 |
| A4 | 3.4882438E−06 | −2.9937944E−06 | −2.8324324E−06 | 7.3389775E−06 |
| A6 | −2.7169241E−09 | 8.4185074E−09 | 6.0240952E−09 | 5.2378813E−09 |
| A8 | −2.5305178E−12 | −1.2457850E−10 | −9.1622960E−12 | −7.2434681E−12 |
| A10 | 1.4068794E−14 | 4.6915128E−13 | −1.1286556E−14 | 3.0388153E−14 |
| A12 | −6.0899205E−18 | 3.7617535E−16 | 1.0221356E−16 | −8.9355248E−18 |
| A14 | −1.0182235E−21 | −8.9337561E−18 | 4.7557399E−20 | −4.2204984E−19 |
| A16 | 7.1167516E−25 | −1.2270801E−21 | −1.8885114E−21 | −1.0596773E−22 |
| A18 | −5.9332385E−26 | 1.7317488E−22 | 5.3267816E−25 | −1.3806711E−24 |
| A20 | 7.1238844E−29 | −3.6407281E−25 | −5.0289019E−27 | −3.0215470E−27 |

| Sn | 30 | 31 |
|---|---|---|
| KA | 1.0000000E+00 | 1.0000000E+00 |
| A4 | −1.3570352E−07 | 7.0100118E−07 |
| A6 | 4.1447670E−09 | 1.2618022E−09 |
| A8 | 1.0094276E−12 | 7.7394941E−12 |
| A10 | 3.3088383E−14 | −7.4124393E−16 |
| A12 | −9.2315951E−18 | 3.8222693E−17 |
| A14 | 4.6921589E−20 | −4.5116088E−24 |
| A16 | −3.2985625E−22 | −1.5079491E−26 |
| A18 | 1.6941024E−25 | −4.5631082E−25 |
| A20 | −3.6146927E−28 | 8.3539877E−29 |

Example 25

Figure 55:
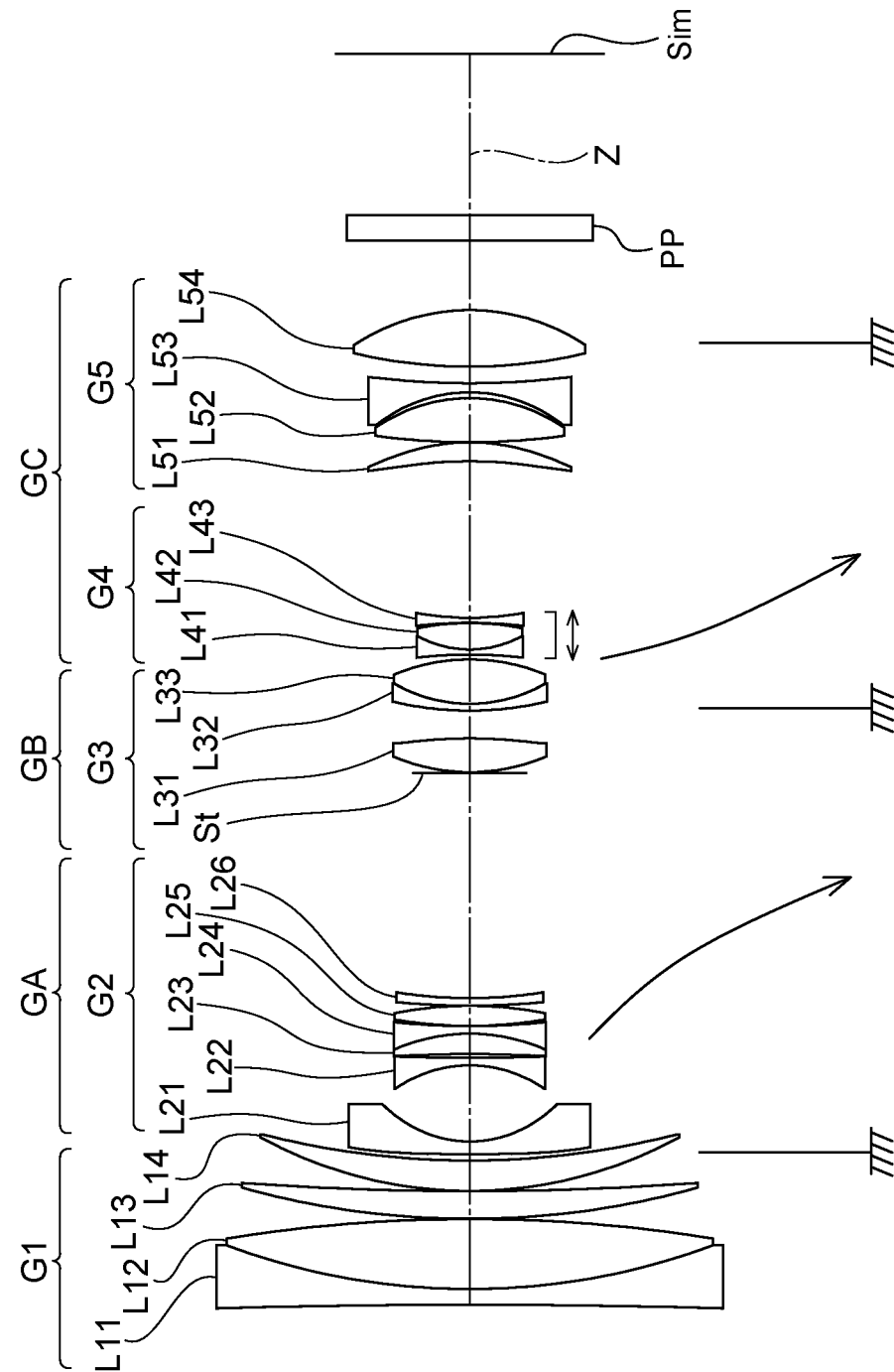
FIG. 55 is a cross-sectional view of a configuration of a zoom lens of Example 25 and a diagram showing movement loci thereof.

FIG. 55 shows a configuration and movement loci of the zoom lens of Example 25. The zoom lens shown in Example 25 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of six lenses L21 to L26, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 25, Table 73 shows basic lens data, Table 74 shows specifications and variable surface spacings, and Table 75 shows aspherical coefficients thereof. FIG. 56 shows aberration diagrams. In Example 25, the distance on the optical axis from the lens surface closest to the object side to the close range object is 0.9 m (meters).

TABLE 73

Example 25

| Sn | R | D | Nd | vd | θgF | ED |
|---|---|---|---|---|---|---|
| 1 | −1817.3751 | 3.1003 | 1.79578 | 27.95 | 0.60809 | 99.66 |
| 2 | 137.2669 | 13.7818 | 1.51630 | 77.43 | 0.53781 | 95.52 |
| 3 | −298.9311 | 0.0301 | | | | 95.18 |
| 4 | 166.7631 | 5.4650 | 1.73043 | 54.96 | 0.54413 | 89.58 |
| 5 | 621.4631 | 0.0300 | | | | 89.06 |
| 6 | 85.7190 | 5.9841 | 1.89250 | 38.75 | 0.57361 | 81.22 |
| 7 | 164.3154 | DD[7] | | | | 80.48 |
| *8 | 501.6740 | 2.5000 | 1.85135 | 40.10 | 0.56954 | 46.14 |

TABLE 73-continued

Example 25

| Sn | R | D | Nd | vd | θgF | ED |
|---|---|---|---|---|---|---|
| *9 | 22.9377 | 14.9937 | | | | 33.57 |
| 10 | −25.5330 | 1.5007 | 1.69560 | 59.05 | 0.54348 | 29.24 |
| 11 | 486.7567 | 0.6985 | | | | 29.68 |
| 12 | −282.2911 | 4.0304 | 1.87679 | 39.07 | 0.57316 | 29.69 |
| 13 | −36.8796 | 1.5100 | 1.51671 | 77.43 | 0.53787 | 29.86 |
| 14 | 141.4185 | 0.0303 | | | | 29.64 |
| 15 | 88.0016 | 3.9385 | 1.75244 | 48.83 | 0.55463 | 29.66 |
| 16 | −77.7764 | 0.0310 | | | | 29.51 |
| 17 | 144.8620 | 1.5000 | 1.51711 | 77.37 | 0.53789 | 28.92 |
| 18 | 93.5648 | DD[18] | | | | 28.46 |
| 19(St) | ∞ | 0.2003 | | | | 27.98 |
| *20 | 37.2524 | 6.6598 | 1.49710 | 81.56 | 0.53848 | 29.87 |
| *21 | −80.0589 | 5.4544 | | | | 30.09 |
| 22 | 65.7883 | 1.3500 | 1.91486 | 32.59 | 0.59047 | 30.44 |
| 23 | 29.7753 | 8.7229 | 1.49700 | 81.61 | 0.53887 | 29.72 |
| 24 | −38.5577 | DD[24] | | | | 29.81 |
| 25 | −89.4705 | 1.0008 | 1.70930 | 56.04 | 0.54362 | 20.84 |
| 26 | 21.2119 | 5.2241 | 1.65174 | 33.67 | 0.59475 | 20.53 |
| 27 | −52.2354 | 0.0300 | | | | 20.50 |
| 28 | −96.0761 | 1.0003 | 1.82502 | 45.50 | 0.55944 | 20.59 |
| 29 | 60.0408 | DD[29] | | | | 21.09 |
| *30 | −87.3465 | 3.7262 | 1.58313 | 59.38 | 0.54237 | 35.40 |
| *31 | −40.1837 | 0.0300 | | | | 35.97 |
| 32 | 137.2371 | 8.6453 | 1.57644 | 68.24 | 0.54125 | 37.09 |
| 33 | −32.6553 | 1.1670 | | | | 37.14 |
| 34 | −29.4461 | 1.8004 | 1.92289 | 32.06 | 0.59188 | 36.53 |
| 35 | 160.5267 | 3.2627 | | | | 39.93 |
| 36 | 100.2148 | 11.0965 | 1.51630 | 77.49 | 0.53785 | 44.76 |
| 37 | −41.2752 | 13.7468 | | | | 45.54 |
| 38 | ∞ | 4.9000 | 1.51633 | 64.05 | 0.53463 | 47.65 |
| 39 | ∞ | 31.8347 | | | | 47.98 |

TABLE 74

Example 25

| | Wide angle end_infinity | Telephoto end_infinity | Telephoto end_close |
|---|---|---|---|
| Zr | 1.0 | 3.4 | 3.4 |
| f | 28.84 | 97.00 | — |
| Bf | 48.81 | 48.81 | — |
| FNo. | 4.12 | 4.12 | 4.12 |
| 2ω[°] | 89.6 | 28.2 | 27.6 |
| IH | 25.6 | 25.6 | 25.6 |
| DD[7] | 1.23 | 43.21 | 43.21 |
| DD[18] | 44.25 | 2.26 | 2.26 |
| DD[24] | 0.95 | 19.92 | 23.31 |
| DD[29] | 30.78 | 11.82 | 8.43 |

TABLE 75

Example 25

| Sn | 8 | 9 | 20 | 21 |
|---|---|---|---|---|
| KA | 1.0000000E+00 | 1.0000000E+00 | 1.0000000E+00 | 1.0000000E+00 |
| A4 | 3.4938083E−06 | −2.9447638E−06 | −2.7131748E−06 | 7.5015272E−06 |
| A6 | −2.7159227E−09 | 8.4220620E−09 | 5.9844014E−09 | 5.3683935E−09 |
| A8 | −2.5293157E−12 | −1.2459327E−10 | −8.8885061E−12 | −7.2648136E−12 |
| A10 | 1.4055090E−14 | 4.6919950E−13 | −1.0052722E−14 | 2.9478629E−14 |
| A12 | −6.1090014E−18 | 3.7618871E−16 | 1.0111396E−16 | −1.8041090E−17 |
| A14 | −1.1156306E−21 | −8.9305584E−18 | 4.7560759E−20 | −4.1862022E−19 |
| A16 | 7.2255957E−25 | −1.2926208E−21 | −1.9991331E−21 | −5.0272632E−23 |
| A18 | −5.9215967E−26 | 1.7316469E−22 | 5.1414430E−25 | −1.3497349E−24 |
| A20 | 7.1289524E−29 | −3.6409161E−25 | −5.0438286E−27 | −3.0289242E−27 |

TABLE 75-continued

Example 25

| Sn | 30 | 31 |
|---|---|---|
| KA | 1.0000000E+00 | 1.0000000E+00 |
| A4 | −1.3405455E−07 | 7.2600575E−07 |
| A6 | 4.1320981E−09 | 1.2712771E−09 |
| A8 | 8.5207972E−13 | 7.4506901E−12 |
| A10 | 3.3036836E−14 | −2.8972094E−16 |
| A12 | −9.9855894E−18 | 3.7827997E−17 |
| A14 | 4.6920347E−20 | 9.2927339E−25 |
| A16 | −3.2478491E−22 | −1.5186085E−26 |
| A18 | 1.6970217E−25 | −4.6439676E−25 |
| A20 | −3.4317616E−28 | 7.5400858E−29 |

Example 26

Figure 57:
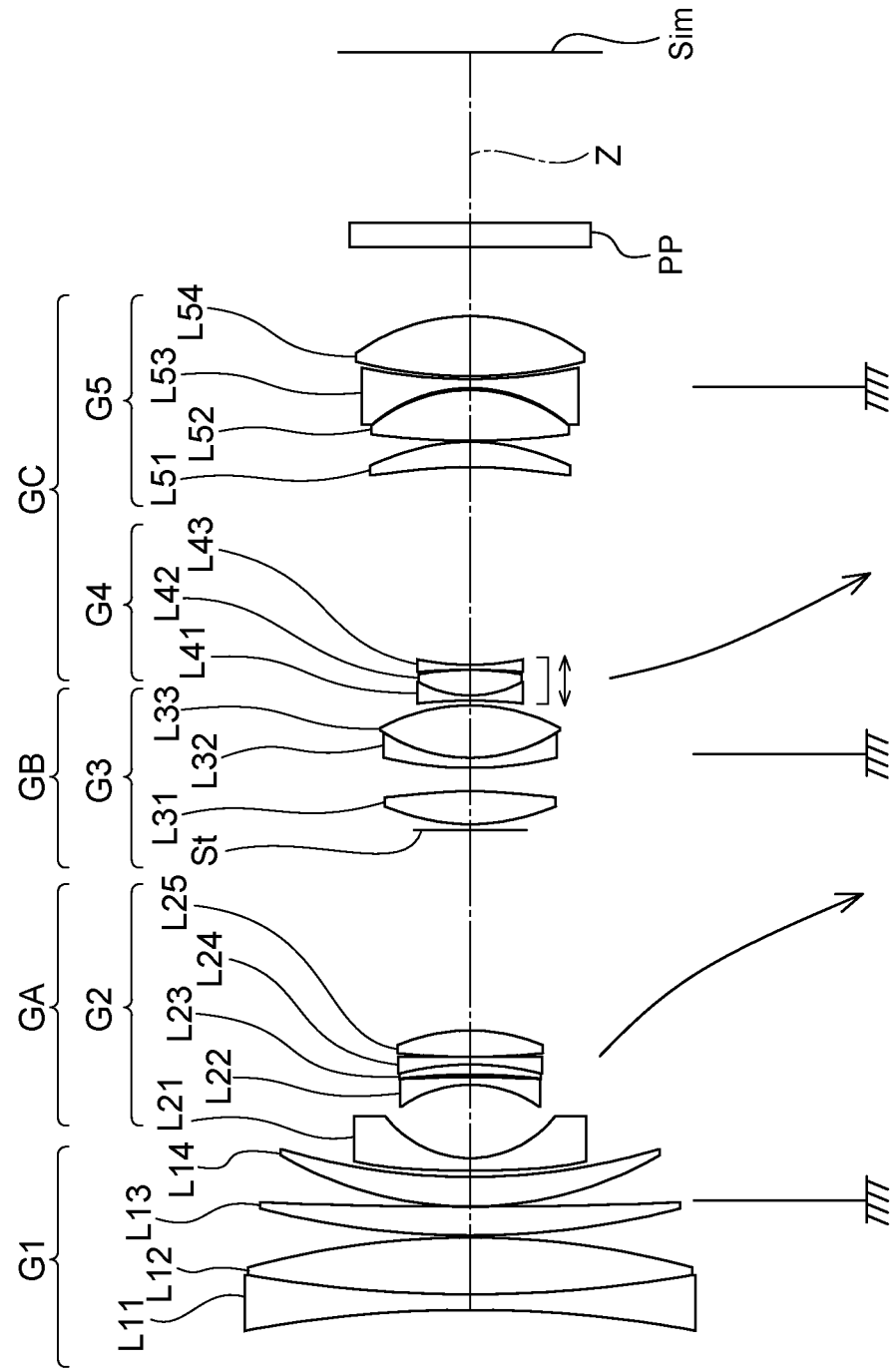
FIG. 57 is a cross-sectional view of a configuration of a zoom lens of Example 26 and a diagram showing movement loci thereof.

FIG. 57 shows a configuration and movement loci of the zoom lens of Example 26. The zoom lens of Example 26 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of five lenses L21 to L25, in order from the object side to the image side. The third lens group G3 consists of the aperture stop St and three lenses L31 to L33, in order from the object side to the image side. The fourth lens group G4 consists of three lenses L41 and L43, in order from the object side to the image side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 26, Table 76 shows basic lens data, Table 77 shows specifications and variable surface spacings, and Table 78 shows aspherical coefficients thereof. FIG. 58 shows aberration diagrams. In Example 26, the distance on the optical axis from the lens surface closest to the object side to the close range object is 0.9 m (meters).

TABLE 76

Example 26

| Sn | R | D | Nd | vd | θgF | ED |
|---|---|---|---|---|---|---|
| 1 | −244.4039 | 3.1010 | 1.85883 | 30.00 | 0.59793 | 90.00 |
| 2 | 255.9183 | 11.3332 | 1.59950 | 65.57 | 0.54124 | 88.46 |
| 3 | −168.3783 | 0.4581 | | | | 88.30 |
| 4 | 166.9989 | 5.7362 | 1.84850 | 43.79 | 0.56197 | 82.70 |
| 5 | 1029.0168 | 0.0299 | | | | 82.09 |
| 6 | 75.0191 | 5.9013 | 1.75500 | 52.34 | 0.54761 | 74.75 |
| 7 | 130.5601 | DD[7] | | | | 73.59 |
| *8 | 280.2537 | 2.5000 | 1.85135 | 40.10 | 0.56954 | 42.61 |
| *9 | 20.7964 | 14.6364 | | | | 31.13 |
| 10 | −23.8970 | 1.4991 | 1.69560 | 59.05 | 0.54348 | 27.37 |
| 11 | −295.9567 | 0.5475 | | | | 28.02 |
| 12 | −119.4193 | 2.0138 | 1.66520 | 47.31 | 0.55748 | 28.02 |
| 13 | −55.7109 | 1.5091 | 1.55332 | 71.68 | 0.54029 | 28.20 |
| 14 | 1518.5449 | 0.0308 | | | | 28.71 |
| 15 | 149.1899 | 5.2470 | 1.59270 | 35.27 | 0.59363 | 28.87 |
| 16 | −37.1962 | DD[16] | | | | 29.00 |
| 17(St) | ∞ | 1.1106 | | | | 31.28 |
| *18 | 41.0042 | 6.5741 | 1.49710 | 81.56 | 0.53848 | 34.03 |
| *19 | −80.5476 | 4.6610 | | | | 34.24 |
| 20 | 73.9293 | 2.0101 | 1.91650 | 31.60 | 0.59117 | 34.63 |
| 21 | 32.0579 | 10.4658 | 1.49700 | 81.61 | 0.53887 | 33.67 |
| 22 | −38.0728 | DD[22] | | | | 33.82 |
| 23 | −90.1963 | 1.0002 | 1.65160 | 58.62 | 0.54102 | 21.09 |
| 24 | 20.9207 | 5.1135 | 1.61293 | 36.96 | 0.58507 | 20.63 |
| 25 | −60.9187 | 0.0306 | | | | 20.50 |
| 26 | −122.6840 | 0.9991 | 1.69680 | 55.53 | 0.54341 | 20.61 |
| 27 | 53.0679 | DD[27] | | | | 21.12 |
| *28 | −102.1371 | 5.0324 | 1.58313 | 59.38 | 0.54237 | 37.86 |
| *29 | −41.0281 | 0.2455 | | | | 38.65 |
| 30 | 154.2909 | 10.1234 | 1.53775 | 74.70 | 0.53936 | 39.44 |
| 31 | −30.9868 | 0.3904 | | | | 39.44 |
| 32 | −29.8812 | 1.8009 | 1.91082 | 35.25 | 0.58224 | 39.19 |
| 33 | 105.2297 | 0.5911 | | | | 43.16 |
| 34 | 91.9474 | 11.9676 | 1.55332 | 71.68 | 0.54029 | 44.60 |
| 35 | −38.8184 | 13.7468 | | | | 45.54 |
| 36 | ∞ | 4.9000 | 1.51633 | 64.14 | 0.53531 | 47.63 |
| 37 | ∞ | 34.0689 | | | | 47.95 |

TABLE 77

Example 26

| | Wide angle end_infinity | Telephoto end_infinity | Telephoto end_close |
|---|---|---|---|
| Zr | 1.0 | 3.4 | 3.4 |
| f | 28.85 | 97.02 | — |
| Bf | 51.05 | 51.05 | — |
| FNo. | 4.12 | 4.12 | 4.12 |
| 2ω[°] | 87.0 | 27.4 | 26.8 |
| IH | 25.6 | 25.6 | 25.6 |
| DD[7] | 1.27 | 40.49 | 40.49 |
| DD[16] | 40.14 | 0.92 | 0.92 |
| DD[22] | 0.98 | 26.29 | 30.42 |
| DD[27] | 39.49 | 14.18 | 10.05 |

TABLE 78

| | Example 26 | | | |
|---|---|---|---|---|
| Sn | 8 | 9 | 18 | 19 |
| KA | 1.0000000E+00 | 1.0000000E+00 | 1.0000000E+00 | 1.0000000E+00 |
| A4 | 3.9795336E−06 | −3.6577978E−06 | −2.5361979E−06 | 6.3703013E−06 |
| A6 | −2.7641361E−09 | 8.3934994E−09 | 5.6311657E−09 | 5.0971676E−09 |
| A8 | −2.4325640E−12 | −1.2503197E−10 | −9.8056666E−12 | −7.6892623E−12 |
| A10 | 1.3847735E−14 | 4.6799975E−13 | −5.4466648E−15 | 2.2285042E−14 |
| A12 | −5.8690617E−18 | 3.7619157E−16 | 1.0651046E−16 | 3.2900626E−18 |
| A14 | −1.0051399E−21 | −8.9337581E−18 | 4.7573965E−20 | −2.0552573E−19 |
| A16 | 7.1438785E−25 | −9.6608071E−22 | −1.6481130E−21 | −2.3361880E−22 |
| A18 | −5.9332548E−26 | 1.7323575E−22 | 5.9010778E−25 | −1.4029961E−24 |
| A20 | 7.5571379E−29 | −3.6405828E−25 | −5.0361155E−27 | −2.9986965E−27 |

| Sn | 28 | 29 |
|---|---|---|
| KA | 1.0000000E+00 | 1.0000000E+00 |
| A4 | −6.3031971E−07 | 1.0480016E−06 |
| A6 | 4.1838214E−09 | 1.3023549E−09 |
| A8 | 1.4322643E−12 | 7.7222430E−12 |
| A10 | 3.2653942E−14 | −1.0043580E−15 |
| A12 | −1.8335112E−17 | 4.0962324E−17 |
| A14 | 4.6929876E−20 | 1.2587198E−23 |
| A16 | −2.9316111E−22 | −1.2846555E−26 |
| A18 | 1.6944646E−25 | −4.9127270E−25 |
| A20 | −3.5363576E−28 | 7.3578613E−29 |

Example 27

Figure 59:
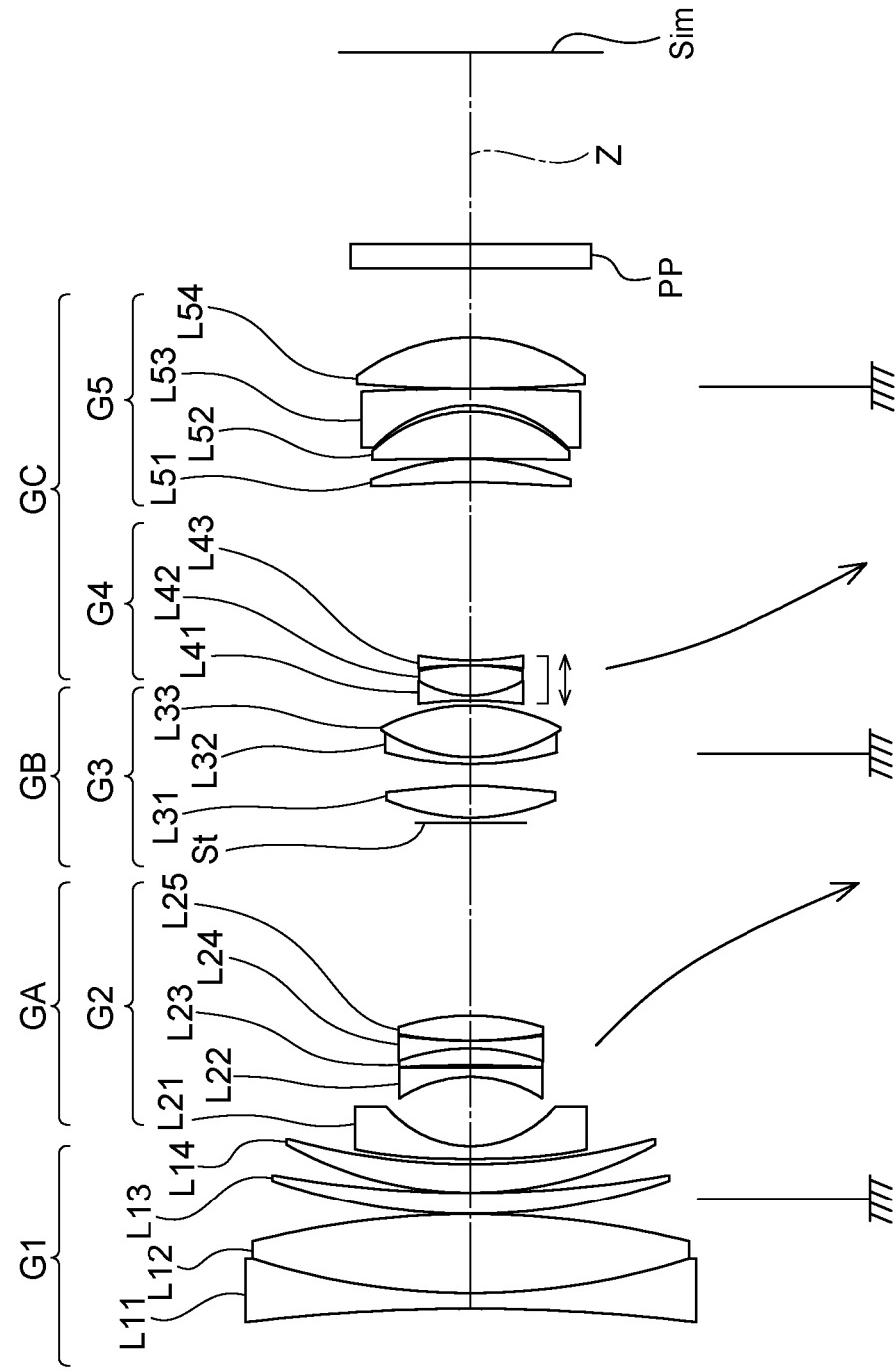
FIG. 59 is a cross-sectional view of a configuration of a zoom lens of Example 27 and a diagram showing movement loci thereof.

FIG. 59 shows a configuration and movement loci of the zoom lens of Example 27. The zoom lens shown in Example 27 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of five lenses L21 to L25, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 27, Table 79 shows basic lens data, Table 80 shows specifications and variable surface spacings, and Table 81 shows aspherical coefficients thereof. FIG. 60 shows aberration diagrams. In Example 27, the distance on the optical axis from the lens surface closest to the object side to the close range object is 0.9 m (meters).

TABLE 79

| | Example 27 | | | | | |
|---|---|---|---|---|---|---|
| Sn | R | D | Nd | νd | θgF | ED |
| 1 | −376.7520 | 3.1001 | 1.85883 | 30.00 | 0.59793 | 90.00 |
| 2 | 140.5533 | 15.8315 | 1.60738 | 56.82 | 0.54840 | 86.42 |
| 3 | −175.7462 | 0.0307 | | | | 85.57 |
| 4 | 121.2835 | 4.2563 | 1.84850 | 43.79 | 0.56197 | 78.24 |
| 5 | 220.9592 | 0.0291 | | | | 77.48 |
| 6 | 75.2483 | 5.7471 | 1.84850 | 43.79 | 0.56197 | 72.62 |
| 7 | 134.5143 | DD[7] | | | | 71.50 |
| *8 | 229.9923 | 2.5430 | 1.85135 | 40.10 | 0.56954 | 43.56 |
| *9 | 21.5818 | 13.8193 | | | | 31.82 |
| 10 | −26.0832 | 1.9293 | 1.69560 | 59.05 | 0.54348 | 28.41 |
| 11 | −3865.8030 | 0.3847 | | | | 28.64 |
| 12 | −296.0684 | 3.3601 | 1.60738 | 56.71 | 0.54817 | 28.64 |
| 13 | −43.0986 | 1.5091 | 1.52841 | 76.45 | 0.53954 | 28.73 |
| 14 | 101.1443 | 0.0566 | | | | 28.93 |
| 15 | 81.8756 | 5.0132 | 1.59270 | 35.27 | 0.59363 | 29.00 |
| 16 | −46.0643 | DD[16] | | | | 29.00 |
| 17(St) | ∞ | 0.9980 | | | | 31.05 |
| *18 | 40.7501 | 6.3577 | 1.49710 | 81.56 | 0.53848 | 33.77 |
| *19 | −79.3031 | 4.3654 | | | | 33.96 |
| 20 | 66.2731 | 1.3491 | 1.95000 | 29.37 | 0.60018 | 34.47 |
| 21 | 32.5476 | 10.3051 | 1.49700 | 81.61 | 0.53887 | 33.62 |
| 22 | −38.9623 | DD[22] | | | | 33.73 |
| 23 | −80.8794 | 0.9991 | 1.63860 | 63.43 | 0.54267 | 21.13 |
| 24 | 20.1634 | 6.0028 | 1.59270 | 35.27 | 0.59363 | 20.66 |
| 25 | −50.4173 | 0.0307 | | | | 20.50 |
| 26 | −94.0657 | 1.0006 | 1.80400 | 46.60 | 0.55755 | 20.60 |
| 27 | 61.4761 | DD[27] | | | | 21.11 |
| *28 | −162.4576 | 4.6741 | 1.58313 | 59.38 | 0.54237 | 38.45 |
| *29 | −45.7160 | 0.0291 | | | | 38.94 |
| 30 | −763.7936 | 9.3848 | 1.43875 | 94.66 | 0.53402 | 39.35 |
| 31 | −28.6810 | 1.2188 | | | | 39.52 |
| 32 | −26.6297 | 3.3417 | 1.68893 | 31.07 | 0.60041 | 38.77 |
| 33 | −439.7506 | 0.0334 | | | | 43.73 |
| 34 | 270.4077 | 10.1942 | 1.41390 | 100.82 | 0.53373 | 44.82 |
| 35 | −37.8490 | 13.7468 | | | | 45.54 |
| 36 | ∞ | 4.9000 | 1.51633 | 64.05 | 0.53463 | 47.50 |
| 37 | ∞ | 38.3897 | | | | 47.79 |

TABLE 80

Example 27

| | Wide angle end_infinity | Telephoto end_infinity | Telephoto end_close |
|---|---|---|---|
| Zr | 1.0 | 3.4 | 3.4 |
| f | 28.84 | 97.01 | — |
| Bf | 55.37 | 55.37 | — |
| FNo. | 4.12 | 4.12 | 4.12 |
| 2ω[°] | 89.4 | 28.2 | 27.4 |
| IH | 25.6 | 25.6 | 25.6 |
| DD[7] | 1.05 | 38.66 | 38.66 |
| DD[16] | 38.65 | 1.04 | 1.04 |
| DD[22] | 0.99 | 24.56 | 28.19 |
| DD[27] | 35.68 | 12.11 | 8.47 |

TABLE 81

Example 27

| Sn | 8 | 9 | 18 | 19 |
|---|---|---|---|---|
| KA | 1.0000000E+00 | 1.0000000E+00 | 1.0000000E+00 | 1.0000000E+00 |
| A4 | 3.5128583E−06 | −3.1671216E−06 | −2.9707590E−06 | 6.1101334E−06 |
| A6 | −2.7016379E−09 | 8.6051724E−09 | 5.5374546E−09 | 5.2317455E−09 |
| A8 | −2.4622081E−12 | −1.2492822E−10 | −9.8201996E−12 | −7.6146562E−12 |
| A10 | 1.4084734E−14 | 4.6865948E−13 | −4.9193655E−15 | 2.2202684E−14 |
| A12 | −6.0833006E−18 | 3.7614098E−16 | 1.0361576E−16 | 6.5400822E−18 |
| A14 | −1.0167372E−21 | −8.9337513E−18 | 4.7561923E−20 | −1.9786778E−19 |
| A16 | 7.1187636E−25 | −1.0408259E−21 | −1.6032214E−21 | −2.3874076E−22 |
| A18 | −5.9333840E−26 | 1.7315845E−22 | 5.3405325E−25 | −1.3959206E−24 |
| A20 | 7.5582500E−29 | −3.6410574E−25 | −5.0373968E−27 | −3.0188555E−27 |

| Sn | 28 | 29 |
|---|---|---|
| KA | 1.0000000E+00 | 1.0000000E+00 |
| A4 | 8.9842902E−08 | 1.1659130E−06 |
| A6 | 4.0698208E−09 | 1.3397350E−09 |
| A8 | 1.3343618E−12 | 7.7452704E−12 |
| A10 | 3.2313894E−14 | −6.2553322E−16 |
| A12 | −1.7591800E−17 | 4.0889655E−17 |
| A14 | 4.6925779E−20 | −2.2693302E−24 |
| A16 | −2.7854354E−22 | −1.4694192E−26 |
| A18 | 1.6887572E−25 | −5.0653834E−25 |
| A20 | −3.5758073E−28 | 8.5934207E−29 |

Example 28

Figure 61:
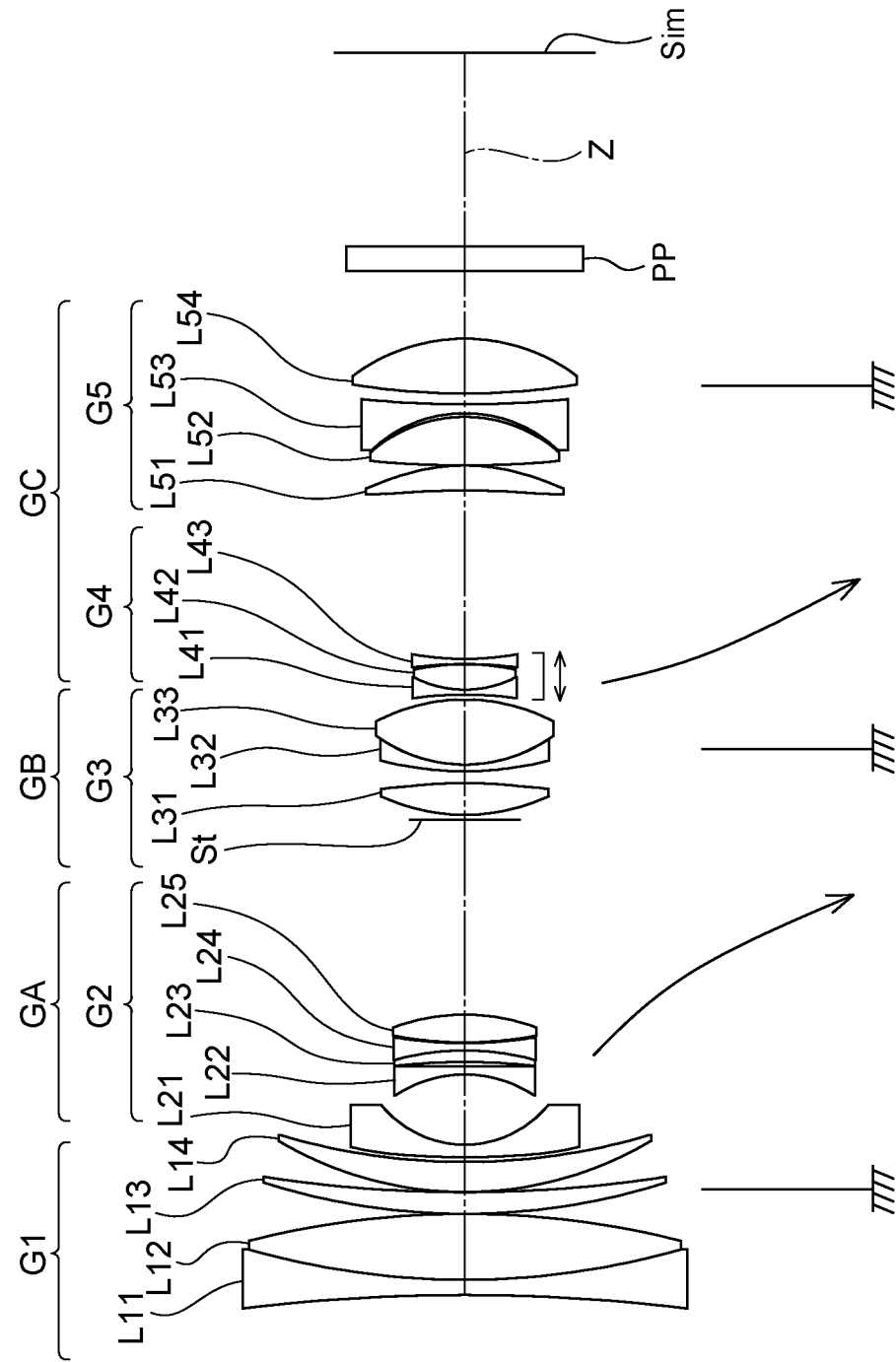
FIG. 61 is a cross-sectional view of a configuration of a zoom lens of Example 28 and a diagram showing movement loci thereof.

FIG. 61 shows a configuration and movement loci of the zoom lens of Example 28. The zoom lens shown in Example 28 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of five lenses L21 to L25, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 28, Table 82 shows basic lens data, Table 83 shows specifications and variable surface spacings, and Table 84 shows aspherical coefficients thereof. FIG. 62 shows aberration diagrams. In Example 28, the distance on the optical axis from the lens surface closest to the object side to the close range object is 0.9 m (meters).

TABLE 82

Example 28

| Sn | R | D | Nd | vd | θgF | ED |
|---|---|---|---|---|---|---|
| 1 | −373.2222 | 3.0991 | 1.85883 | 30.00 | 0.59793 | 90.00 |
| 2 | 158.5625 | 13.3353 | 1.59410 | 60.47 | 0.55516 | 87.45 |
| 3 | −178.6503 | 0.0300 | | | | 87.18 |
| 4 | 134.3818 | 4.3800 | 1.84850 | 43.79 | 0.56197 | 80.41 |
| 5 | 268.4460 | 0.0307 | | | | 79.78 |
| 6 | 73.7169 | 6.0921 | 1.84850 | 43.79 | 0.56197 | 74.51 |
| 7 | 130.8165 | DD[7] | | | | 73.37 |
| *8 | 216.1336 | 2.5003 | 1.85135 | 40.10 | 0.56954 | 43.78 |
| *9 | 21.2509 | 14.2206 | | | | 31.80 |
| 10 | −25.4493 | 1.7290 | 1.69560 | 59.05 | 0.54348 | 28.12 |
| 11 | −2638.4840 | 0.7956 | | | | 28.42 |
| 12 | −138.2937 | 2.3554 | 1.59270 | 35.27 | 0.59363 | 28.42 |
| 13 | −53.6073 | 1.4991 | 1.41390 | 100.82 | 0.53373 | 28.57 |
| 14 | 87.2409 | 0.1432 | | | | 28.90 |
| 15 | 76.9484 | 5.6201 | 1.56732 | 42.84 | 0.57436 | 28.98 |
| 16 | −41.9532 | DD[16] | | | | 29.00 |
| 17(St) | ∞ | 1.0191 | | | | 31.09 |
| *18 | 38.8540 | 6.4619 | 1.49710 | 81.56 | 0.53848 | 33.85 |
| *19 | −82.9840 | 2.3786 | | | | 33.99 |
| 20 | 68.4076 | 1.3491 | 1.91650 | 31.60 | 0.59117 | 34.12 |
| 21 | 30.4080 | 13.1824 | 1.49700 | 81.61 | 0.53887 | 33.17 |
| 22 | −38.5354 | DD[22] | | | | 33.45 |
| 23 | −74.1106 | 0.9991 | 1.65670 | 62.28 | 0.54205 | 20.97 |

TABLE 82-continued

Example 28

| Sn | R | D | Nd | νd | θgF | ED |
|---|---|---|---|---|---|---|
| 24 | 22.5937 | 5.1775 | 1.59270 | 35.27 | 0.59363 | 20.59 |
| 25 | −47.0109 | 0.0304 | | | | 20.50 |
| 26 | −77.8943 | 1.0004 | 1.69560 | 59.05 | 0.54348 | 20.60 |
| 27 | 58.9355 | DD[27] | | | | 21.18 |
| *28 | −158.5720 | 5.0461 | 1.58313 | 59.38 | 0.54237 | 37.42 |
| *29 | −41.2663 | 0.0291 | | | | 37.92 |
| 30 | 201.9640 | 9.8389 | 1.43875 | 94.66 | 0.53402 | 38.18 |
| 31 | −29.0595 | 0.7472 | | | | 38.14 |
| 32 | −27.4603 | 1.8008 | 1.80610 | 33.27 | 0.58845 | 37.63 |
| 33 | 212.6213 | 2.1805 | | | | 41.79 |
| 34 | 142.7835 | 11.1168 | 1.49700 | 81.61 | 0.53887 | 44.68 |
| 35 | −37.8382 | 13.7468 | | | | 45.54 |
| 36 | ∞ | 4.9000 | 1.51633 | 64.05 | 0.53463 | 47.47 |
| 37 | ∞ | 39.2616 | | | | 47.76 |

TABLE 83

Example 28

| | Wide angle end_infinity | Telephoto end_infinity | Telephoto end_close |
|---|---|---|---|
| Zr | 1.0 | 3.4 | 3.4 |
| f | 28.84 | 97.01 | — |
| Bf | 56.24 | 56.24 | — |
| FNo. | 4.12 | 4.12 | 4.12 |
| 2ω[°] | 88.6 | 28.2 | 27.4 |
| IH | 25.6 | 25.6 | 25.6 |
| DD[7] | 0.99 | 39.48 | 39.48 |
| DD[16] | 39.49 | 1.01 | 1.01 |
| DD[22] | 1.00 | 23.31 | 26.87 |
| DD[27] | 34.18 | 11.87 | 8.30 |

TABLE 84

Example 28

| Sn | 8 | 9 | 18 | 19 |
|---|---|---|---|---|
| KA | 1.0000000E+00 | 1.0000000E+00 | 1.0000000E+00 | 1.0000000E+00 |
| A4 | 3.6521040E−06 | −3.1097202E−06 | −2.8805249E−06 | 6.2678659E−06 |
| A6 | −2.7225270E−09 | 8.5287205E−09 | 5.6230528E−09 | 5.1392239E−09 |
| A8 | −2.5250983E−12 | −1.2468582E−10 | −9.7975400E−12 | −7.6091641E−12 |
| A10 | 1.4198027E−14 | 4.6827309E−13 | −5.4993950E−15 | 2.3100868E−14 |
| A12 | −6.0929417E−18 | 3.7623542E−16 | 1.0592467E−16 | 5.3394749E−18 |
| A14 | −1.0524517E−21 | −8.9337950E−18 | 4.7556344E−20 | −2.3347093E−19 |
| A16 | 7.1516774E−25 | −1.0016862E−21 | −1.6339002E−21 | −2.0919666E−22 |
| A18 | −5.9330421E−26 | 1.7315901E−22 | 5.3442158E−25 | −1.3647213E−24 |
| A20 | 7.5569402E−29 | −3.6410592E−25 | −5.0374871E−27 | −3.0188006E−27 |

| Sn | 28 | 29 |
|---|---|---|
| KA | 1.0000000E+00 | 1.0000000E+00 |
| A4 | 3.1948266E−07 | 1.2218050E−06 |
| A6 | 4.1275004E−09 | 1.3475780E−09 |
| A8 | 1.3337393E−12 | 7.8555421E−12 |
| A10 | 3.2178777E−14 | −4.4935894E−16 |
| A12 | −1.7256285E−17 | 4.0240676E−17 |
| A14 | 4.6936055E−20 | −2.1174243E−24 |
| A16 | −2.8794418E−22 | −9.9866011E−27 |
| A18 | 1.6940172E−25 | −4.9116607E−25 |
| A20 | −3.5738191E−28 | 7.7235415E−29 |

Example 29

Figure 63:
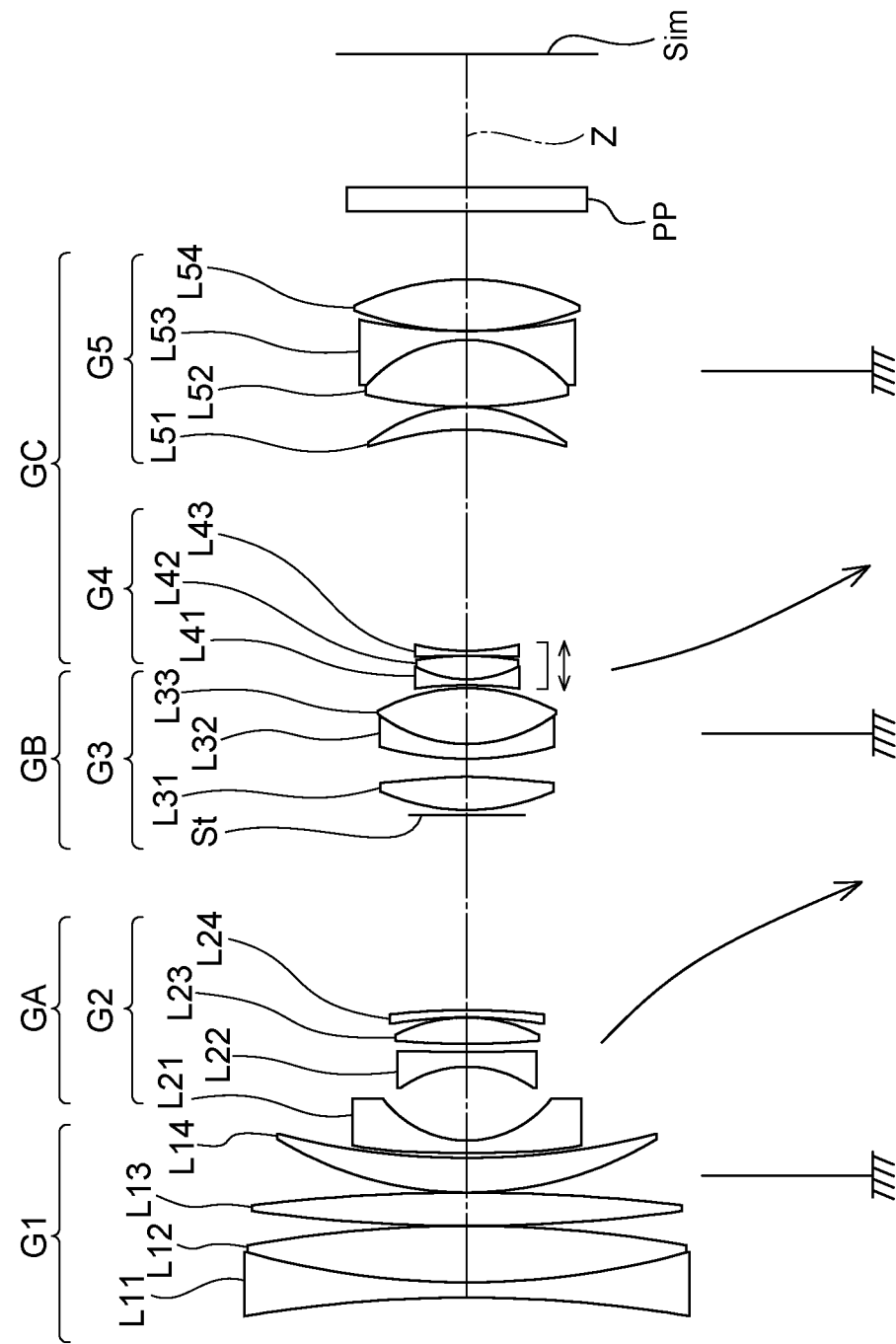
FIG. 63 is a cross-sectional view of a configuration of a zoom lens of Example 29 and a diagram showing movement loci thereof.

FIG. 63 shows a configuration and movement loci of the zoom lens of Example 29. The zoom lens shown in Example 29 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 29, Table 85 shows basic lens data, Table 86 shows specifications and variable surface spacings, and Table 87 shows aspherical coefficients thereof. FIG. 64 shows aberration diagrams. In Example 29, the distance on the optical axis from the lens surface closest to the object side to the close range object is 0.9 m (meters).

TABLE 85

Example 29

| Sn | R | D | Nd | vd | θgF | ED |
|---|---|---|---|---|---|---|
| 1 | −272.3724 | 3.0991 | 1.85883 | 30.00 | 0.59793 | 90.00 |
| 2 | 165.9447 | 11.4173 | 1.59950 | 65.57 | 0.54124 | 88.43 |
| 3 | −251.9220 | 0.0304 | | | | 88.40 |
| 4 | 318.0754 | 6.7109 | 1.84850 | 43.79 | 0.56197 | 86.67 |
| 5 | −371.9043 | 0.0291 | | | | 86.35 |
| 6 | 73.5274 | 6.9867 | 1.75500 | 52.34 | 0.54761 | 76.59 |
| 7 | 152.1141 | DD[7] | | | | 75.66 |
| *8 | 436.3199 | 2.5002 | 1.85135 | 40.10 | 0.56954 | 42.22 |
| *9 | 20.8393 | 14.9464 | | | | 30.89 |
| 10 | −23.0585 | 3.0009 | 1.69560 | 59.05 | 0.54348 | 27.02 |
| 11 | 547.1608 | 1.6583 | | | | 28.21 |
| 12 | 174.9173 | 5.2867 | 1.59270 | 35.27 | 0.59363 | 28.84 |
| 13 | −32.0579 | 0.0291 | | | | 29.00 |
| 14 | −91.6206 | 1.4992 | 1.43875 | 89.42 | 0.53108 | 30.23 |
| 15 | −134.4573 | DD[15] | | | | 31.12 |
| 16(St) | ∞ | 0.9991 | | | | 32.01 |
| *17 | 40.7962 | 6.7101 | 1.49710 | 81.56 | 0.53848 | 34.83 |
| *18 | −82.0032 | 3.6714 | | | | 35.04 |
| 19 | 65.2660 | 3.0007 | 1.91650 | 31.60 | 0.59117 | 35.39 |
| 20 | 29.8389 | 11.2816 | 1.49700 | 81.61 | 0.53887 | 33.98 |
| 21 | −37.6003 | DD[21] | | | | 34.11 |
| 22 | −79.9103 | 1.1710 | 1.65160 | 58.62 | 0.54102 | 21.16 |
| 23 | 22.1277 | 4.7369 | 1.61293 | 36.96 | 0.58507 | 20.63 |
| 24 | −62.8277 | 0.0310 | | | | 20.50 |
| 25 | −245.5703 | 1.0007 | 1.69680 | 55.53 | 0.54341 | 20.64 |
| 26 | 44.9924 | DD[26] | | | | 21.01 |
| *27 | −53.4151 | 4.5912 | 1.43876 | 76.45 | 0.52552 | 39.64 |
| *28 | −29.3302 | 0.0291 | | | | 40.01 |
| 29 | 86.2319 | 13.5236 | 1.61555 | 45.56 | 0.56669 | 40.90 |
| 30 | −27.2638 | 1.7991 | 1.90187 | 31.04 | 0.59578 | 40.64 |
| 31 | 103.1622 | 0.0299 | | | | 43.54 |
| 32 | 64.5608 | 10.4473 | 1.43874 | 88.79 | 0.53076 | 45.20 |
| 33 | −51.3995 | 13.7468 | | | | 45.54 |
| 34 | ∞ | 4.9000 | 1.51633 | 64.14 | 0.53531 | 47.79 |
| 35 | ∞ | 26.9909 | | | | 48.17 |

TABLE 86

Example 29

| | Wide angle end_infinity | Telephoto end_infinity | Telephoto end_close |
|---|---|---|---|
| Zr | 1.0 | 3.4 | 3.4 |
| f | 28.85 | 97.04 | — |
| Bf | 43.97 | 43.97 | — |
| FNo. | 4.12 | 4.12 | 4.12 |
| 2ω[°] | 87.0 | 27.2 | 26.6 |
| IH | 25.6 | 25.6 | 25.6 |
| DD[7] | 1.03 | 39.94 | 39.94 |
| DD[15] | 39.49 | 0.58 | 0.58 |
| DD[21] | 0.64 | 23.22 | 26.81 |
| DD[26] | 44.76 | 22.19 | 18.59 |

TABLE 87

Example 29

| Sn | 8 | 9 | 17 | 18 |
|---|---|---|---|---|
| KA | 1.0000000E+00 | 1.0000000E+00 | 1.0000000E+00 | 1.0000000E+00 |
| A4 | 4.0066303E−06 | −3.8601314E−06 | −2.3261656E−06 | 6.6702798E−06 |
| A6 | −2.7426092E−09 | 8.9236099E−09 | 5.5980283E−09 | 5.1111391E−09 |
| A8 | −2.2498492E−12 | −1.2427852E−10 | −9.8287358E−12 | −7.9170169E−12 |
| A10 | 1.3680539E−14 | 4.8172929E−13 | −4.7597050E−15 | 2.3064672E−14 |
| A12 | −6.9333908E−18 | 3.7628723E−16 | 1.0326977E−16 | 2.3103561E−18 |
| A14 | −1.0240543E−21 | −8.9338651E−18 | 4.7632737E−20 | −1.6867155E−19 |
| A16 | 7.3083138E−25 | −9.6563875E−22 | −1.5870782E−21 | −3.2441779E−22 |
| A18 | −5.9329246E−26 | 1.7323249E−22 | 5.8437469E−25 | −1.4388393E−24 |
| A20 | 7.5582697E−29 | −3.6392841E−25 | −5.0288464E−27 | −3.0005615E−27 |

| Sn | 27 | 28 |
|---|---|---|
| KA | 1.0000000E+00 | 1.0000000E+00 |
| A4 | 2.1856563E−07 | 2.0172484E−06 |
| A6 | 4.0249085E−09 | 1.5845455E−09 |
| A8 | 1.7058595E−12 | 8.1897822E−12 |
| A10 | 3.1641579E−14 | −1.8923391E−15 |
| A12 | −2.4166797E−17 | 4.5754153E−17 |
| A14 | 4.6807257E−20 | −7.7236034E−23 |
| A16 | −2.6396154E−22 | −2.2793261E−26 |
| A18 | 1.6966148E−25 | −4.7682739E−25 |
| A20 | −3.5616388E−28 | 6.8637194E−29 |

Example 30

Figure 65:
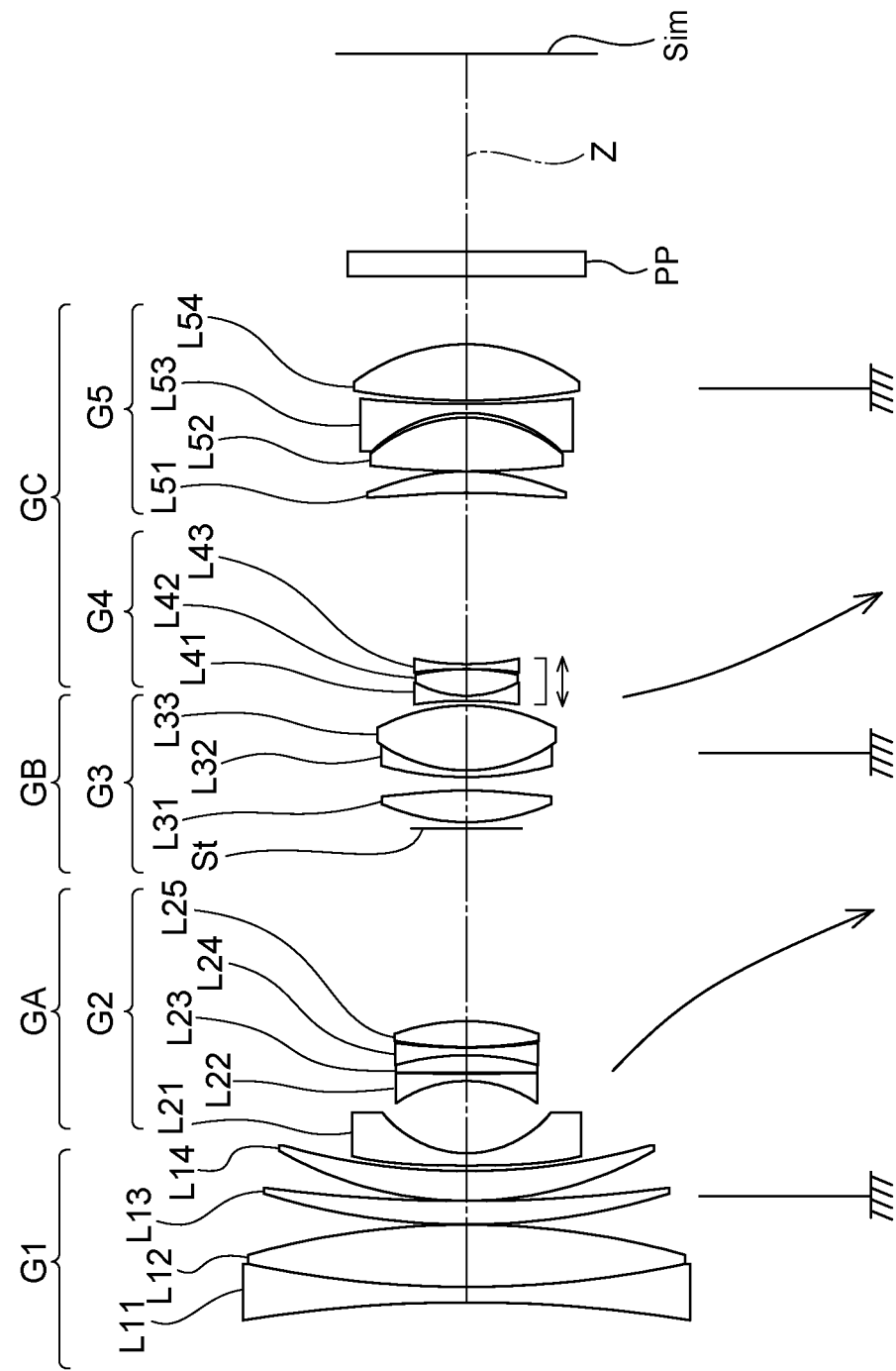
FIG. 65 is a cross-sectional view of a configuration of a zoom lens of Example 30 and a diagram showing movement loci thereof.

FIG. 65 shows a configuration and movement loci of the zoom lens of Example 30. The zoom lens of Example 30 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of five lenses L21 to L25, in order from the object side to the image side. The third lens group G3 consists of the aperture stop St and three lenses L31 to L33, in order from the object side to the image side. The fourth lens group G4 consists of three lenses L41 and L43, in order from the object side to the image side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 30, Table 88 shows basic lens data, Table 89 shows specifications and variable surface spacings, and Table 90 shows aspherical coefficients thereof. FIG. 66 shows aberration diagrams. In Example 30, the distance on the optical axis from the lens surface closest to the object side to the close range object is 0.9 m (meters).

TABLE 88

Example 30

| Sn | R | D | Nd | vd | θgF | ED |
|---|---|---|---|---|---|---|
| 1 | −281.7673 | 3.0991 | 1.85883 | 30.00 | 0.59793 | 90.00 |
| 2 | 210.8435 | 12.5652 | 1.56908 | 71.34 | 0.54530 | 88.03 |
| 3 | −161.9452 | 0.0304 | | | | 87.80 |
| 4 | 137.2682 | 4.7274 | 1.88300 | 40.80 | 0.56557 | 80.99 |
| 5 | 311.2502 | 0.0303 | | | | 80.27 |
| 6 | 75.6875 | 5.9966 | 1.84850 | 43.79 | 0.56197 | 74.47 |

TABLE 88-continued

Example 30

| Sn | R | D | Nd | vd | θgF | ED |
|---|---|---|---|---|---|---|
| 7 | 134.9410 | DD[7] | | | | 73.29 |
| *8 | 257.3386 | 2.5008 | 1.85135 | 40.10 | 0.56954 | 44.21 |
| *9 | 21.1408 | 14.5710 | | | | 31.97 |
| 10 | −24.8494 | 1.4991 | 1.61997 | 63.88 | 0.54252 | 28.37 |
| 11 | 1367.2563 | 0.1669 | | | | 28.54 |
| 12 | −16772.9676 | 3.5215 | 1.51680 | 64.20 | 0.53430 | 28.55 |
| 13 | −52.6635 | 1.5122 | 1.56908 | 71.34 | 0.54530 | 28.61 |
| 14 | 105.1318 | 0.1390 | | | | 28.86 |
| 15 | 84.2373 | 5.2315 | 1.59270 | 35.27 | 0.59363 | 28.96 |
| 16 | −42.1562 | DD[16] | | | | 29.00 |
| 17(St) | ∞ | 1.2395 | | | | 31.09 |
| *18 | 39.5616 | 6.4113 | 1.49710 | 81.56 | 0.53848 | 33.98 |
| *19 | −82.0330 | 2.6791 | | | | 34.14 |
| 20 | 65.7346 | 1.3503 | 1.95000 | 29.37 | 0.60018 | 34.38 |
| 21 | 31.1735 | 13.0720 | 1.49700 | 81.61 | 0.53887 | 33.43 |
| 22 | −38.3779 | DD[22] | | | | 33.71 |
| 23 | −73.9666 | 0.9998 | 1.63860 | 63.43 | 0.54267 | 21.03 |
| 24 | 21.3870 | 5.3373 | 1.59270 | 35.27 | 0.59363 | 20.61 |
| 25 | −48.9739 | 0.0303 | | | | 20.50 |
| 26 | −85.5704 | 1.0002 | 1.69560 | 59.05 | 0.54348 | 20.59 |
| 27 | 51.4235 | DD[27] | | | | 21.14 |
| *28 | −138.2592 | 4.3508 | 1.58313 | 59.38 | 0.54237 | 37.91 |
| *29 | −44.1131 | 0.0291 | | | | 38.32 |
| 30 | 168.7394 | 10.7735 | 1.43875 | 94.66 | 0.53402 | 38.87 |
| 31 | −29.4197 | 0.9824 | | | | 38.88 |
| 32 | −27.4112 | 1.7991 | 1.80610 | 33.27 | 0.58845 | 38.23 |
| 33 | 217.0826 | 0.7189 | | | | 42.94 |
| 34 | 132.6854 | 11.2969 | 1.52841 | 76.45 | 0.53954 | 44.64 |
| 35 | −37.7104 | 13.7468 | | | | 45.54 |
| 36 | ∞ | 4.9000 | 1.51633 | 64.05 | 0.53463 | 47.45 |
| 37 | ∞ | 39.9343 | | | | 47.74 |

TABLE 89

Example 30

| | Wide angle end_infinity | Telephoto end_infinity | Telephoto end_close |
|---|---|---|---|
| Zr | 1.0 | 3.4 | 3.4 |
| f | 28.84 | 97.02 | — |
| Bf | 56.91 | 56.91 | — |
| FNo. | 4.12 | 4.12 | 4.12 |
| 2ω[°] | 89.4 | 28.2 | 27.4 |
| IH | 25.6 | 25.6 | 25.6 |
| DD[7] | 1.11 | 39.03 | 39.03 |
| DD[16] | 38.88 | 0.96 | 0.96 |
| DD[22] | 1.00 | 23.12 | 26.59 |
| DD[27] | 34.54 | 12.42 | 8.95 |

TABLE 90

Example 30

| Sn | 8 | 9 | 18 | 19 |
|---|---|---|---|---|
| KA | 1.0000000E+00 | 1.0000000E+00 | 1.0000000E+00 | 1.0000000E+00 |
| A4 | 3.8103769E−06 | −3.4913359E−06 | −3.0385781E−06 | 6.1022922E−06 |
| A6 | −2.6260705E−09 | 8.8962827E−09 | 5.5841872E−09 | 5.1690209E−09 |
| A8 | −2.7580166E−12 | −1.2650454E−10 | −9.6959450E−12 | −7.5068623E−12 |
| A10 | 1.4294540E−14 | 4.6928989E−13 | −5.2456811E−15 | 2.3551235E−14 |
| A12 | −6.1592455E−18 | 3.7598758E−16 | 1.0343941E−16 | 2.8780706E−18 |
| A14 | −1.0439477E−21 | −8.9337588E−18 | 4.7569906E−20 | −2.0932950E−19 |
| A16 | 7.1900429E−25 | −1.0012408E−21 | −1.6077212E−21 | −2.3190314E−22 |
| A18 | −5.9330353E−26 | 1.7316078E−22 | 5.3562470E−25 | −1.4010365E−24 |
| A20 | 7.5501812E−29 | −3.6410575E−25 | −5.0373702E−27 | −3.0189762E−27 |

TABLE 90-continued

| | Example 30 | |
|---|---|---|
| Sn | 28 | 29 |
| KA | 1.0000000E+00 | 1.0000000E+00 |
| A4 | 6.9321768E−07 | 1.2106909E−06 |
| A6 | 4.2526276E−09 | 1.2331595E−09 |
| A8 | 1.2433401E−12 | 8.3612426E−12 |
| A10 | 3.2347951E−14 | −5.4161911E−16 |
| A12 | −1.7601236E−17 | 3.9019433E−17 |
| A14 | 4.6917315E−20 | −1.2734365E−23 |
| A16 | −2.8257138E−22 | −1.2750254E−26 |
| A18 | 1.6948147E−25 | −5.1127408E−25 |
| A20 | −3.5757420E−28 | 7.4044390E−29 |

Example 31

Figure 67:
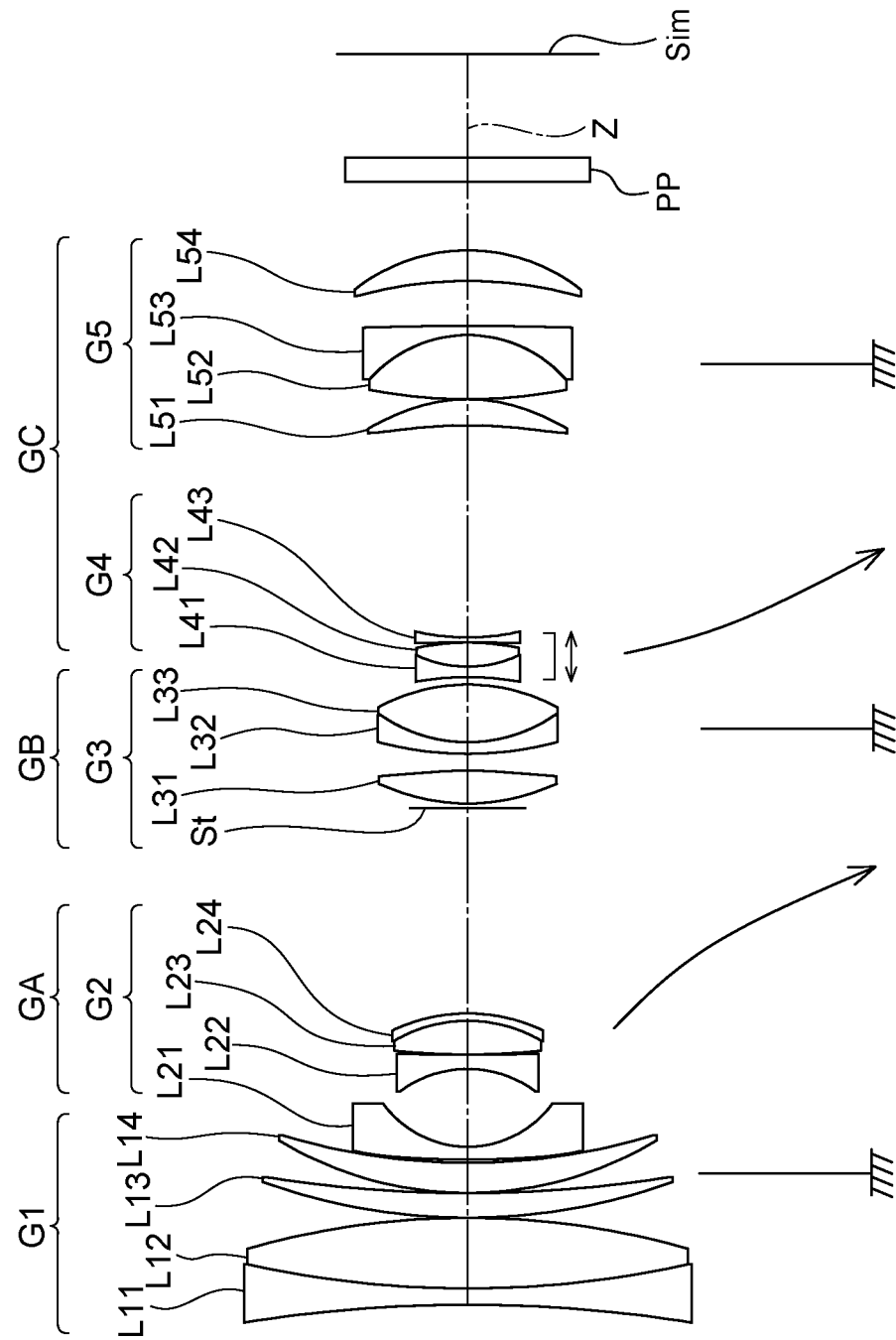
FIG. 67 is a cross-sectional view of a configuration of a zoom lens of Example 31 and a diagram showing movement loci thereof.

FIG. 67 shows a configuration and movement loci of the zoom lens of Example 31. The zoom lens of Example 31 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of three lenses L41 and L43, in order from the object side to the image side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 31, Table 91 shows basic lens data, Table 92 shows specifications and variable surface spacings, and Table 93 shows aspherical coefficients thereof. FIG. 68 shows aberration diagrams. In Example 31, the distance on the optical axis from the lens surface closest to the object side to the close range object is 0.9 m (meters).

TABLE 91

| | Example 31 | | | | | |
|---|---|---|---|---|---|---|
| Sn | R | D | Nd | vd | θgF | ED |
| 1 | −283.9412 | 3.2854 | 1.85883 | 30.00 | 0.59793 | 90.00 |
| 2 | 205.2252 | 14.2125 | 1.59950 | 65.57 | 0.54124 | 88.60 |
| 3 | −160.4345 | 0.0291 | | | | 88.45 |
| 4 | 121.7067 | 4.9450 | 1.84850 | 43.79 | 0.56197 | 82.47 |
| 5 | 258.1583 | 0.0300 | | | | 81.90 |
| 6 | 73.5167 | 6.0813 | 1.75500 | 52.34 | 0.54761 | 76.04 |
| 7 | 129.3337 | DD[7] | | | | 75.03 |
| *8 | 345.0863 | 2.5001 | 1.85135 | 40.10 | 0.56954 | 42.96 |
| *9 | 20.4365 | 15.6899 | | | | 31.22 |
| 10 | −22.7828 | 2.8729 | 1.69560 | 59.05 | 0.54348 | 27.20 |

TABLE 91-continued

| | Example 31 | | | | | |
|---|---|---|---|---|---|---|
| Sn | R | D | Nd | vd | θgF | ED |
| 11 | 651.5302 | 0.0264 | | | | 28.58 |
| 12 | 137.5738 | 6.7790 | 1.59270 | 35.27 | 0.59363 | 28.80 |
| 13 | −29.0688 | 1.4995 | 1.43875 | 94.66 | 0.53402 | 29.58 |
| 14 | −35.2876 | DD[14] | | | | 30.40 |
| 15(St) | ∞ | 0.9991 | | | | 32.63 |
| *16 | 40.9429 | 6.5740 | 1.49710 | 81.56 | 0.53848 | 35.53 |
| *17 | −87.6961 | 3.4015 | | | | 35.74 |
| 18 | 69.6040 | 2.3560 | 1.91650 | 31.60 | 0.59117 | 36.08 |
| 19 | 30.8534 | 11.5890 | 1.49700 | 81.61 | 0.53887 | 34.86 |
| 20 | −37.6293 | DD[20] | | | | 35.02 |
| 21 | −59.3266 | 2.1102 | 1.65160 | 58.62 | 0.54102 | 20.95 |
| 22 | 24.1792 | 4.8297 | 1.61293 | 36.96 | 0.58507 | 20.57 |
| 23 | −51.3195 | 0.0291 | | | | 20.50 |
| 24 | −404.2212 | 0.9994 | 1.69680 | 55.53 | 0.54341 | 20.73 |
| 25 | 46.4692 | DD[25] | | | | 21.11 |
| *26 | −92.6082 | 5.2133 | 1.45880 | 89.95 | 0.53677 | 39.07 |
| *27 | −33.5859 | 0.0291 | | | | 39.45 |
| 28 | 104.0530 | 12.9002 | 1.59410 | 60.47 | 0.55516 | 39.67 |
| 29 | −26.3512 | 1.8567 | 1.91650 | 31.60 | 0.59117 | 39.40 |
| 30 | −638.4171 | 9.0472 | | | | 42.10 |
| 31 | −83.0976 | 6.1366 | 1.43875 | 94.66 | 0.53402 | 44.90 |
| 32 | −36.7462 | 13.7468 | | | | 45.54 |
| 33 | ∞ | 4.9000 | 1.51633 | 64.14 | 0.53531 | 48.25 |
| 34 | ∞ | 20.9321 | | | | 48.66 |

TABLE 92

| | Example 31 | | |
|---|---|---|---|
| | Wide angle end_infinity | Telephoto end_infinity | Telephoto end_close |
| Zr | 1.0 | 3.4 | 3.4 |
| f | 28.85 | 97.04 | — |
| Bf | 37.91 | 37.91 | — |
| FNo. | 4.12 | 4.12 | 4.12 |
| 2ω[°] | 87.0 | 27.4 | 26.8 |
| IH | 25.6 | 25.6 | 25.6 |
| DD[7] | 0.69 | 41.12 | 41.12 |
| DD[14] | 41.26 | 0.83 | 0.83 |
| DD[20] | 1.50 | 25.13 | 29.06 |
| DD[25] | 42.73 | 19.09 | 15.17 |

TABLE 93

| | Example 31 | | | |
|---|---|---|---|---|
| Sn | 8 | 9 | 16 | 17 |
| KA | 1.0000000E+00 | 1.0000000E+00 | 1.0000000E+00 | 1.0000000E+00 |
| A4 | 4.3170574E−06 | −3.8021268E−06 | −1.7956250E−06 | 6.9107254E−06 |
| A6 | −3.0068346E−09 | 8.8663854E−09 | 5.5116158E−09 | 5.2398789E−09 |
| A8 | −2.7880431E−12 | −1.2939756E−10 | −9.6206246E−12 | −7.6935210E−12 |
| A10 | 1.5012863E−14 | 4.8042301E−13 | −5.8693223E−15 | 1.9707767E−14 |
| A12 | −7.3587690E−18 | 3.7592490E−16 | 1.0561073E−16 | 1.0104548E−17 |
| A14 | −9.2112185E−22 | −8.9338225E−18 | 4.7626638E−20 | −1.6531387E−19 |
| A16 | 7.4324474E−25 | −9.6162541E−22 | −1.7154521E−21 | −4.2482799E−22 |
| A18 | −5.9324573E−26 | 1.7324510E−22 | 7.0595285E−25 | −1.4938644E−24 |
| A20 | 6.9756794E−29 | −3.6392882E−25 | −5.0286142E−27 | −3.0002155E−27 |

| Sn | 26 | 27 |
|---|---|---|
| KA | 1.0000000E+00 | 1.0000000E+00 |
| A4 | 1.2502632E−06 | 2.7680697E−06 |
| A6 | 4.3534218E−09 | 1.0094574E−09 |
| A8 | −4.2512270E−13 | 8.1656847E−12 |
| A10 | 3.0976167E−14 | −7.7729544E−16 |
| A12 | −1.5953685E−17 | 3.4090751E−17 |
| A14 | 4.6951807E−20 | 9.2993215E−23 |
| A16 | −3.0844091E−22 | −1.6952562E−26 |
| A18 | 1.6949843E−25 | −5.9472316E−25 |
| A20 | −3.5909947E−28 | 1.9345689E−28 |

Example 32

Figure 69:
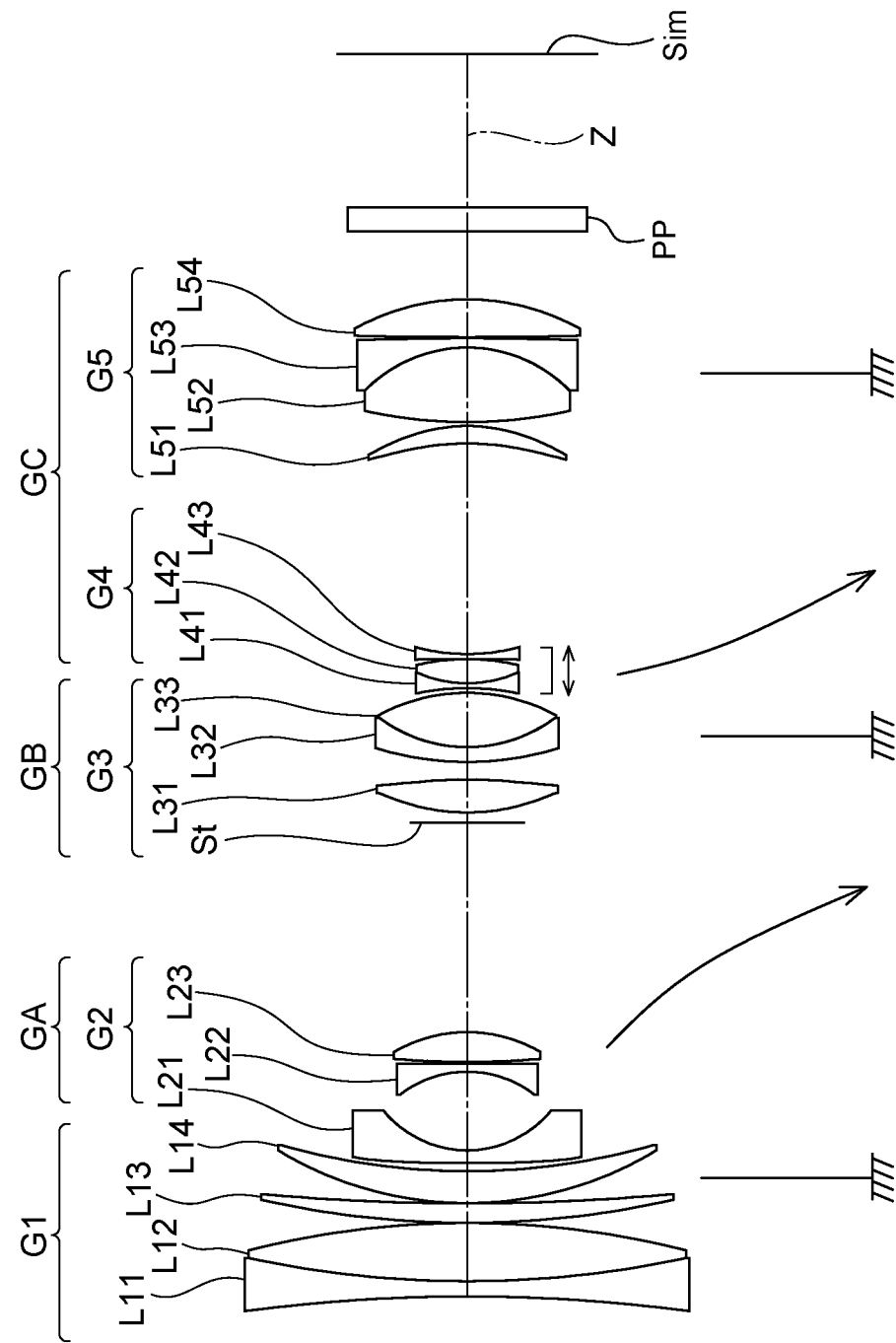
FIG. 69 is a cross-sectional view of a configuration of a zoom lens of Example 32 and a diagram showing movement loci thereof.

FIG. 69 shows a configuration and movement loci of the zoom lens of Example 32. The zoom lens shown in Example 32 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of three lenses L21 to L23, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 32, Table 94 shows basic lens data, Table 95 shows specifications and variable surface spacings, and Table 96 shows aspherical coefficients thereof. FIG. 70 shows aberration diagrams. In Example 32, the distance on the optical axis from the lens surface closest to the object side to the close range object is 0.9 m (meters).

TABLE 94

| | Example 32 | | | | | |
|---|---|---|---|---|---|---|
| Sn | R | D | Nd | vd | θgF | ED |
| 1 | −343.0311 | 3.0991 | 1.85883 | 30.00 | 0.59793 | 90.00 |
| 2 | 210.7220 | 11.8039 | 1.59950 | 65.57 | 0.54124 | 87.96 |
| 3 | −178.5130 | 0.0291 | | | | 87.71 |
| 4 | 188.5661 | 3.9465 | 1.84850 | 43.79 | 0.56197 | 82.49 |
| 5 | 468.0297 | 0.0302 | | | | 81.95 |
| 6 | 73.9577 | 6.4802 | 1.75500 | 52.34 | 0.54761 | 75.77 |
| 7 | 136.8617 | DD[7] | | | | 74.65 |
| *8 | 1191.9751 | 2.4991 | 1.85135 | 40.10 | 0.56954 | 42.55 |
| *9 | 21.1137 | 15.9446 | | | | 31.32 |
| 10 | −22.1941 | 1.5829 | 1.69560 | 59.05 | 0.54348 | 27.07 |
| 11 | 3431.8087 | 0.4268 | | | | 28.44 |
| 12 | 186.7509 | 6.0157 | 1.59270 | 35.27 | 0.59363 | 28.80 |
| 13 | −29.2807 | DD[13] | | | | 29.59 |
| 14(St) | ∞ | 2.0069 | | | | 32.63 |
| *15 | 40.4645 | 6.6875 | 1.49710 | 81.56 | 0.53848 | 36.36 |
| *16 | −85.6697 | 3.5552 | | | | 36.62 |
| 17 | 62.8752 | 3.0000 | 1.91650 | 31.60 | 0.59117 | 37.05 |
| 18 | 29.6012 | 10.9880 | 1.49700 | 81.61 | 0.53887 | 35.45 |
| 19 | −37.9475 | DD[19] | | | | 35.50 |
| 20 | −50.6162 | 0.9992 | 1.65160 | 58.62 | 0.54102 | 20.82 |
| 21 | 25.4329 | 4.8781 | 1.61293 | 36.96 | 0.58507 | 20.56 |
| 22 | −44.2182 | 0.0291 | | | | 20.50 |
| 23 | −412.7530 | 0.9991 | 1.69680 | 55.53 | 0.54341 | 20.72 |
| 24 | 40.2250 | DD[24] | | | | 21.05 |
| *25 | −52.1582 | 3.5246 | 1.45880 | 89.95 | 0.53677 | 39.15 |
| *26 | −33.8874 | 0.7957 | | | | 39.61 |
| 27 | 95.3879 | 15.1013 | 1.59410 | 60.47 | 0.55516 | 41.59 |
| 28 | −28.9436 | 1.8567 | 1.91650 | 31.60 | 0.59117 | 41.47 |
| 29 | −834.8994 | 0.2580 | | | | 44.58 |
| 30 | 930.3977 | 7.6504 | 1.43875 | 94.66 | 0.53402 | 45.03 |
| 31 | −46.6352 | 13.7468 | | | | 45.54 |
| 32 | ∞ | 4.9000 | 1.51633 | 64.14 | 0.53531 | 47.64 |
| 33 | ∞ | 31.0760 | | | | 47.99 |

TABLE 95

Example 32

| | Wide angle end_infinity | Telephoto end_infinity | Telephoto end_close |
|---|---|---|---|
| Zr | 1.0 | 3.4 | 3.4 |
| f | 28.85 | 97.04 | — |
| Bf | 48.05 | 48.05 | — |
| FNo. | 4.12 | 4.12 | 4.12 |
| 2ω[°] | 87.0 | 27.6 | 27.0 |
| IH | 25.6 | 25.6 | 25.6 |
| DD[7] | 1.69 | 43.21 | 43.21 |
| DD[13] | 42.48 | 0.96 | 0.96 |
| DD[19] | 0.96 | 23.95 | 27.34 |
| DD[24] | 42.65 | 19.66 | 16.27 |

TABLE 96

Example 32

| Sn | 8 | 9 | 15 | 16 |
|---|---|---|---|---|
| KA | 1.0000000E+00 | 1.0000000E+00 | 1.0000000E+00 | 1.0000000E+00 |
| A4 | 4.2784592E−06 | −4.6322524E−06 | −2.1792918E−06 | 6.7380532E−06 |
| A6 | −2.9860929E−09 | 8.9495978E−09 | 5.4922429E−09 | 5.2689472E−09 |
| A8 | −2.7794238E−12 | −1.2931937E−10 | −9.6249838E−12 | −7.6863183E−12 |
| A10 | 1.5011578E−14 | 4.8042022E−13 | −5.8279942E−15 | 1.9598207E−14 |
| A12 | −7.3855607E−18 | 3.7592881E−16 | 1.0665811E−16 | 8.6871204E−18 |
| A14 | −9.1685263E−22 | −8.9338202E−18 | 4.7622154E−20 | −1.6562622E−19 |
| A16 | 7.4447645E−25 | −9.5299913E−22 | −1.7364075E−21 | −4.0405838E−22 |
| A18 | −5.9338918E−26 | 1.7340332E−22 | 6.8323788E−25 | −1.5059117E−24 |
| A20 | 6.9935309E−29 | −3.6394312E−25 | −5.0299007E−27 | −2.9994760E−27 |

| Sn | 25 | 26 |
|---|---|---|
| KA | 1.0000000E+00 | 1.0000000E+00 |
| A4 | 2.1257068E−06 | 2.5485788E−06 |
| A6 | 4.3540244E−09 | 9.5783631E−10 |
| A8 | −4.1080949E−13 | 8.0677097E−12 |
| A10 | 3.1105236E−14 | −1.0010975E−15 |
| A12 | −1.5321421E−17 | 3.3362503E−17 |
| A14 | 4.6950568E−20 | 9.4396782E−23 |
| A16 | −3.2107031E−22 | −1.7161923E−26 |
| A18 | 1.6949513E−25 | −5.8172147E−25 |
| A20 | −3.6022731E−28 | 1.9402394E−28 |

Example 33

Figure 71:
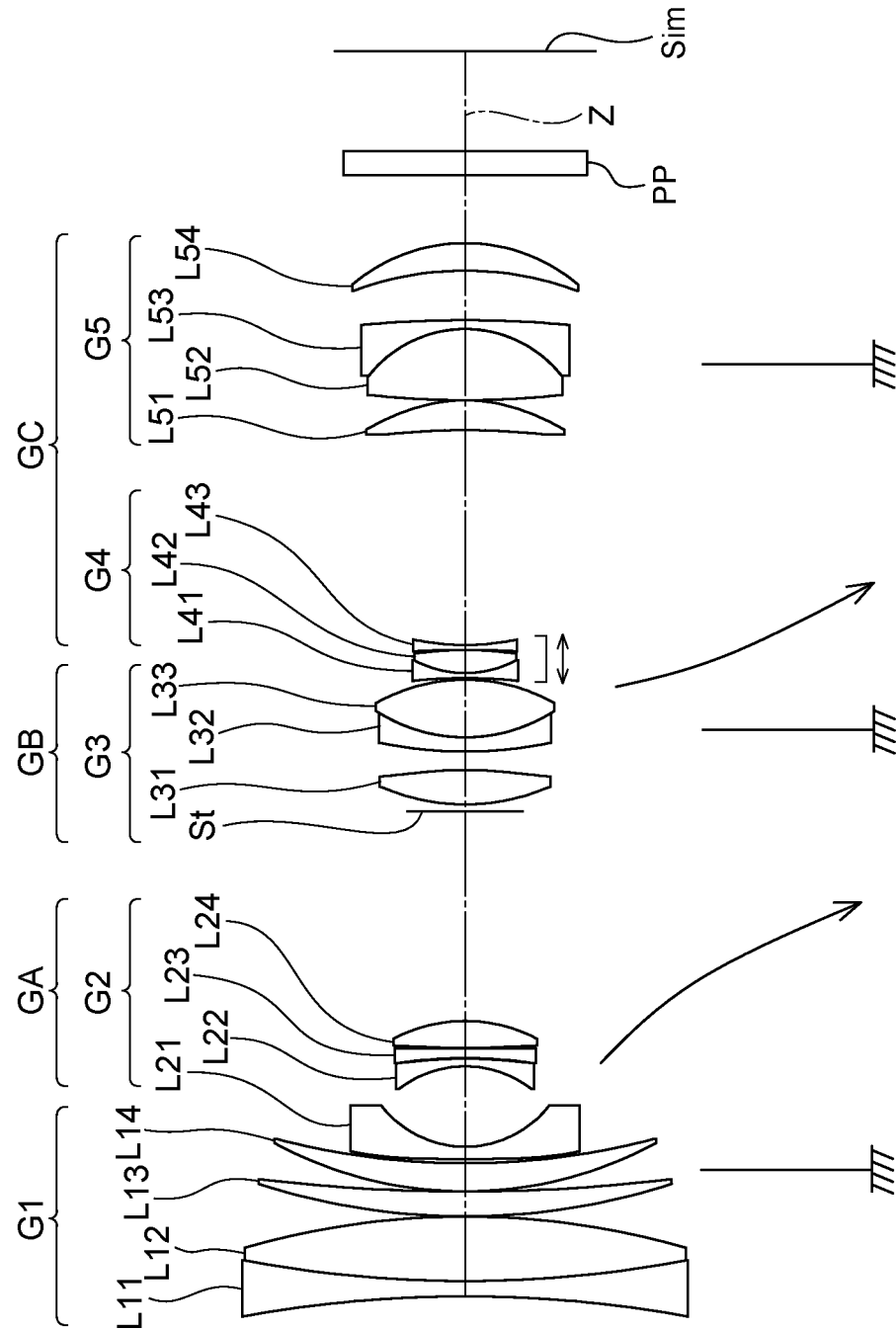
FIG. 71 is a cross-sectional view of a configuration of a zoom lens of Example 33 and a diagram showing movement loci thereof.

FIG. 71 shows a configuration and movement loci of the zoom lens of Example 33. The zoom lens shown in Example 33 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 33, Table 97 shows basic lens data, Table 98 shows specifications and variable surface spacings, and Table 99 shows aspherical coefficients thereof. FIG. 72 shows aberration diagrams. In Example 33, the distance on the optical axis from the lens surface closest to the object side to the close range object is 0.9 m (meters).

TABLE 97

Example 33

| Sn | R | D | Nd | vd | θgF | ED |
|---|---|---|---|---|---|---|
| 1 | −252.0263 | 3.1009 | 1.85883 | 30.00 | 0.59793 | 90.00 |
| 2 | 239.2660 | 13.0409 | 1.59950 | 65.57 | 0.54124 | 88.55 |
| 3 | −159.5598 | 0.0307 | | | | 88.46 |
| 4 | 136.1735 | 5.0088 | 1.84850 | 43.79 | 0.56197 | 83.05 |
| 5 | 344.8798 | 0.0300 | | | | 82.53 |
| 6 | 80.7376 | 5.6994 | 1.75500 | 52.34 | 0.54761 | 76.85 |
| 7 | 150.5557 | DD[7] | | | | 76.08 |
| *8 | 478.4690 | 2.5006 | 1.85135 | 40.10 | 0.56954 | 42.72 |
| *9 | 20.8182 | 16.2759 | | | | 31.31 |
| 10 | −21.6510 | 1.4991 | 1.69560 | 59.05 | 0.54348 | 26.75 |
| 11 | −103.7154 | 0.1347 | | | | 27.90 |
| 12 | −94.3290 | 2.0196 | 1.49700 | 81.61 | 0.53887 | 27.91 |
| 13 | −1830.8046 | 0.1012 | | | | 28.59 |
| 14 | 244.9232 | 5.4002 | 1.59270 | 35.27 | 0.59363 | 28.78 |
| 15 | −30.9533 | DD[15] | | | | 29.00 |
| 16(St) | ∞ | 1.4238 | | | | 31.46 |
| *17 | 41.0243 | 6.9538 | 1.49710 | 81.56 | 0.53848 | 34.45 |
| *18 | −76.0470 | 3.7300 | | | | 34.58 |
| 19 | 84.6571 | 2.8839 | 1.91650 | 31.60 | 0.59117 | 34.78 |
| 20 | 33.0459 | 11.6566 | 1.49700 | 81.61 | 0.53887 | 33.73 |
| 21 | −36.4946 | DD[21] | | | | 34.01 |
| 22 | −98.5607 | 0.9991 | 1.65160 | 58.62 | 0.54102 | 21.23 |
| 23 | 21.8344 | 4.6424 | 1.61293 | 36.96 | 0.58507 | 20.64 |

TABLE 97-continued

Example 33

| Sn | R | D | Nd | vd | θgF | ED |
|---|---|---|---|---|---|---|
| 24 | −72.4651 | 0.0307 | | | | 20.50 |
| 25 | −197.4730 | 1.0008 | 1.69680 | 55.53 | 0.54341 | 20.61 |
| 26 | 50.8047 | DD[26] | | | | 21.03 |
| *27 | −124.1389 | 5.9878 | 1.45880 | 89.95 | 0.53677 | 39.38 |
| *28 | −33.2366 | 0.0303 | | | | 39.72 |
| 29 | 178.1706 | 14.3889 | 1.59410 | 60.47 | 0.55516 | 39.35 |
| 30 | −24.8161 | 1.7991 | 1.91650 | 31.60 | 0.59117 | 38.90 |
| 31 | −224.9662 | 10.0023 | | | | 42.02 |
| 32 | −64.7537 | 5.5780 | 1.43875 | 94.66 | 0.53402 | 44.92 |
| 33 | −35.0766 | 13.7468 | | | | 45.54 |
| 34 | ∞ | 4.9000 | 1.51633 | 64.14 | 0.53531 | 48.35 |
| 35 | ∞ | 20.1544 | | | | 48.75 |

TABLE 98

Example 33

| | Wide angle end_infinity | Telephoto end_infinity | Telephoto end_close |
|---|---|---|---|
| Zr | 1.0 | 3.4 | 3.4 |
| f | 28.85 | 97.03 | — |
| Bf | 37.13 | 37.13 | — |
| FNo. | 4.12 | 4.12 | 4.12 |
| 2ω[°] | 87.0 | 27.4 | 26.8 |
| IH | 25.6 | 25.6 | 25.6 |
| DD[7] | 0.82 | 42.46 | 42.46 |
| DD[15] | 42.33 | 0.69 | 0.69 |
| DD[21] | 0.35 | 24.87 | 28.82 |
| DD[26] | 43.44 | 18.91 | 14.97 |

TABLE 99

Example 33

| Sn | 8 | 9 | 17 | 18 |
|---|---|---|---|---|
| KA | 1.0000000E+00 | 1.0000000E+00 | 1.0000000E+00 | 1.0000000E+00 |
| A4 | 4.3692613E−06 | −4.1313415E−06 | −2.4081554E−06 | 6.9887568E−06 |
| A6 | −2.6865472E−09 | 8.3627354E−09 | 5.5641076E−09 | 5.1039789E−09 |
| A8 | −2.5111364E−12 | −1.2432636E−10 | −9.5864819E−12 | −7.5972740E−12 |
| A10 | 1.3881439E−14 | 4.6778276E−13 | −5.5501887E−15 | 2.1776890E−14 |
| A12 | −5.8523359E−18 | 3.7614403E−16 | 1.0243844E−16 | 7.3613874E−18 |
| A14 | −1.0230209E−21 | −8.9337271E−18 | 4.7574354E−20 | −2.3711931E−19 |
| A16 | 7.1475116E−25 | −9.7122246E−22 | −1.7098191E−21 | −2.5578874E−22 |
| A18 | −5.9332729E−26 | 1.7358346E−22 | 5.8397617E−25 | −1.4231512E−24 |
| A20 | 7.5333840E−29 | −3.6429866E−25 | −5.0397768E−27 | −3.0018616E−27 |

| Sn | 27 | 28 |
|---|---|---|
| KA | 1.0000000E+00 | 1.0000000E+00 |
| A4 | 1.3877975E−06 | 3.0508337E−06 |
| A6 | 4.0476233E−09 | 1.1544429E−09 |
| A8 | 5.8046195E−13 | 7.9196123E−12 |
| A10 | 3.2051933E−14 | −1.0673389E−15 |
| A12 | −1.9552244E−17 | 3.9942572E−17 |
| A14 | 4.6940460E−20 | 1.0652000E−23 |
| A16 | −2.6053796E−22 | −1.4834046E−26 |
| A18 | 1.6948421E−25 | −4.8468062E−25 |
| A20 | −3.5871792E−28 | 7.4250580E−29 |

Example 34

Figure 73:
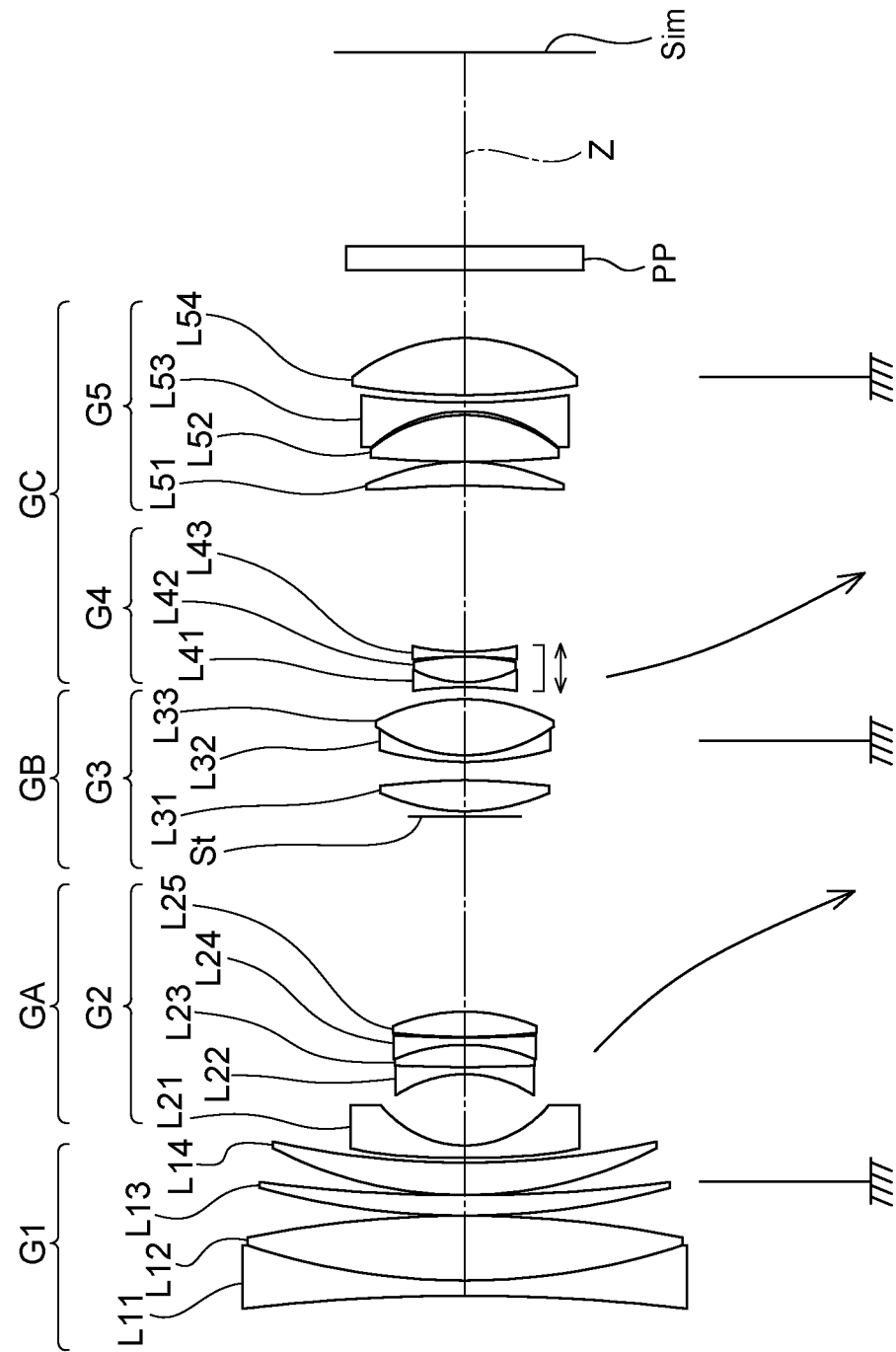
FIG. 73 is a cross-sectional view of a configuration of a zoom lens of Example 34 and a diagram showing movement loci thereof.

FIG. 73 shows a configuration and movement loci of the zoom lens of Example 34. The zoom lens shown in Example 34 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of five lenses L21 to L25, in order from the object side to the image side. The third lens group G3 consists of the aperture stop St and three lenses L31 to L33, in order from the object side to the image side. The fourth side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 34, Table 100 shows basic lens data, Table 101 shows specifications and variable surface spacings, and Table 102 shows aspherical coefficients thereof. FIG. 74 shows aberration diagrams. In Example 34, the distance on the optical axis from the lens surface closest to the object side to the close range object is 0.9 m (meters).

TABLE 100

Example 34

| Sn | R | D | Nd | vd | θgF | ED |
|---|---|---|---|---|---|---|
| 1 | −386.9472 | 3.1005 | 1.85883 | 30.00 | 0.59793 | 90.00 |
| 2 | 139.5255 | 13.1115 | 1.69560 | 59.05 | 0.54348 | 87.35 |

TABLE 100-continued

Example 34

| Sn | R | D | Nd | vd | θgF | ED |
|---|---|---|---|---|---|---|
| 3 | −221.5063 | 0.0307 | | | | 87.05 |
| 4 | 155.8389 | 4.1285 | 1.69560 | 59.05 | 0.54348 | 81.86 |
| 5 | 325.3467 | 0.0309 | | | | 81.26 |
| 6 | 83.9579 | 6.5774 | 1.90043 | 37.37 | 0.57668 | 76.68 |
| 7 | 179.5810 | DD[7] | | | | 75.56 |
| *8 | 241.6913 | 2.5009 | 1.85135 | 40.10 | 0.56954 | 43.18 |
| *9 | 21.1744 | 14.4191 | | | | 31.51 |
| 10 | −24.8555 | 1.4991 | 1.69560 | 59.05 | 0.54348 | 27.63 |
| 11 | 378.0824 | 4.4670 | 1.51823 | 58.90 | 0.54567 | 28.05 |
| 12 | −36.2246 | 1.5091 | 1.59410 | 60.47 | 0.55516 | 28.17 |
| 13 | 258.7060 | 0.1037 | | | | 28.76 |
| 14 | 130.0109 | 5.1085 | 1.59270 | 35.27 | 0.59363 | 28.89 |
| 15 | −37.0828 | DD[15] | | | | 29.00 |
| 16(St) | ∞ | 1.0004 | | | | 31.27 |
| *17 | 39.6751 | 6.3084 | 1.49710 | 81.56 | 0.53848 | 33.99 |
| *18 | −88.6100 | 3.6951 | | | | 34.15 |
| 19 | 64.0096 | 1.3492 | 1.91650 | 31.60 | 0.59117 | 34.49 |
| 20 | 30.7853 | 11.3510 | 1.49700 | 81.61 | 0.53887 | 33.54 |

TABLE 101

Example 34

| | Wide angle end_infinity | Telephoto end_infinity | Telephoto end_close |
|---|---|---|---|
| Zr | 1.0 | 3.4 | 3.4 |
| f | 28.85 | 97.02 | — |
| Bf | 56.28 | 56.28 | — |
| FNo. | 4.12 | 4.12 | 4.12 |
| 2ω[°] | 87.0 | 27.4 | 26.8 |
| IH | 25.6 | 25.6 | 25.6 |
| DD[7] | 0.97 | 39.64 | 39.64 |
| DD[15] | 39.60 | 0.93 | 0.93 |
| DD[21] | 2.44 | 24.06 | 27.46 |
| DD[26] | 33.63 | 12.01 | 8.60 |

TABLE 102

Example 34

| Sn | 8 | 9 | 17 | 18 |
|---|---|---|---|---|
| KA | 1.0000000E+00 | 1.0000000E+00 | 1.0000000E+00 | 1.0000000E+00 |
| A4 | 3.6937099E−06 | −3.2054292E−06 | −2.7534993E−06 | 6.2334568E−06 |
| A6 | −2.8054300E−09 | 8.6676393E−09 | 5.5986464E−09 | 5.1095795E−09 |
| A8 | −2.5042972E−12 | −1.2552508E−10 | −9.8530832E−12 | −7.5088305E−12 |
| A10 | 1.4066224E−14 | 4.6855251E−13 | −5.4366065E−15 | 2.3526395E−14 |
| A12 | −6.1048636E−18 | 3.7612117E−16 | 1.0223191E−16 | 9.6399415E−18 |
| A14 | −1.0250522E−21 | −8.9337217E−18 | 4.7555087E−20 | −2.6682454E−19 |
| A16 | 7.1309753E−25 | −1.0199336E−21 | −1.6705694E−21 | −2.4231195E−22 |
| A18 | −5.9333216E−26 | 1.7315969E−22 | 5.1286109E−25 | −1.3634129E−24 |
| A20 | 7.5566700E−29 | −3.6410576E−25 | −5.0374002E−27 | −3.0189178E−27 |

| Sn | 27 | 28 |
|---|---|---|
| KA | 1.0000000E+00 | 1.0000000E+00 |
| A4 | 1.6344722E−07 | 1.4568767E−06 |
| A6 | 4.2029932E−09 | 1.3031004E−09 |
| A8 | 1.3301871E−12 | 7.9556885E−12 |
| A10 | 3.2732065E−14 | −3.3794536E−16 |
| A12 | −1.5611975E−17 | 4.1070235E−17 |
| A14 | 4.6916489E−20 | −3.6231580E−24 |
| A16 | −2.9687792E−22 | −1.4491048E−26 |
| A18 | 1.6972523E−25 | −5.0548493E−25 |
| A20 | −3.5757593E−28 | 7.3016790E−29 |

TABLE 100-continued

Example 34

| Sn | R | D | Nd | vd | θgF | ED |
|---|---|---|---|---|---|---|
| 21 | −39.3060 | DD[21] | | | | 33.67 |
| 22 | −75.1018 | 1.0000 | 1.65670 | 62.28 | 0.54205 | 21.04 |
| 23 | 22.5255 | 5.1668 | 1.59270 | 35.27 | 0.59363 | 20.61 |
| 24 | −48.7623 | 0.0304 | | | | 20.50 |
| 25 | −92.9419 | 1.0002 | 1.69560 | 59.05 | 0.54348 | 20.60 |
| 26 | 50.3600 | DD[26] | | | | 21.14 |
| *27 | −158.1122 | 4.8145 | 1.58313 | 59.38 | 0.54237 | 37.12 |
| *28 | −41.9953 | 0.0300 | | | | 37.63 |
| 29 | 212.2457 | 9.4372 | 1.49700 | 81.61 | 0.53887 | 38.02 |
| 30 | −29.8588 | 0.7668 | | | | 38.01 |
| 31 | −28.0280 | 1.8008 | 1.91650 | 31.60 | 0.59117 | 37.50 |
| 32 | 149.1364 | 1.4972 | | | | 42.03 |
| 33 | 133.0388 | 11.5272 | 1.59410 | 60.47 | 0.55516 | 44.53 |
| 34 | −36.8600 | 13.7468 | | | | 45.54 |
| 35 | ∞ | 4.9000 | 1.51633 | 64.05 | 0.53463 | 47.50 |
| 36 | ∞ | 39.3027 | | | | 47.79 |

Example 35

Figure 75:
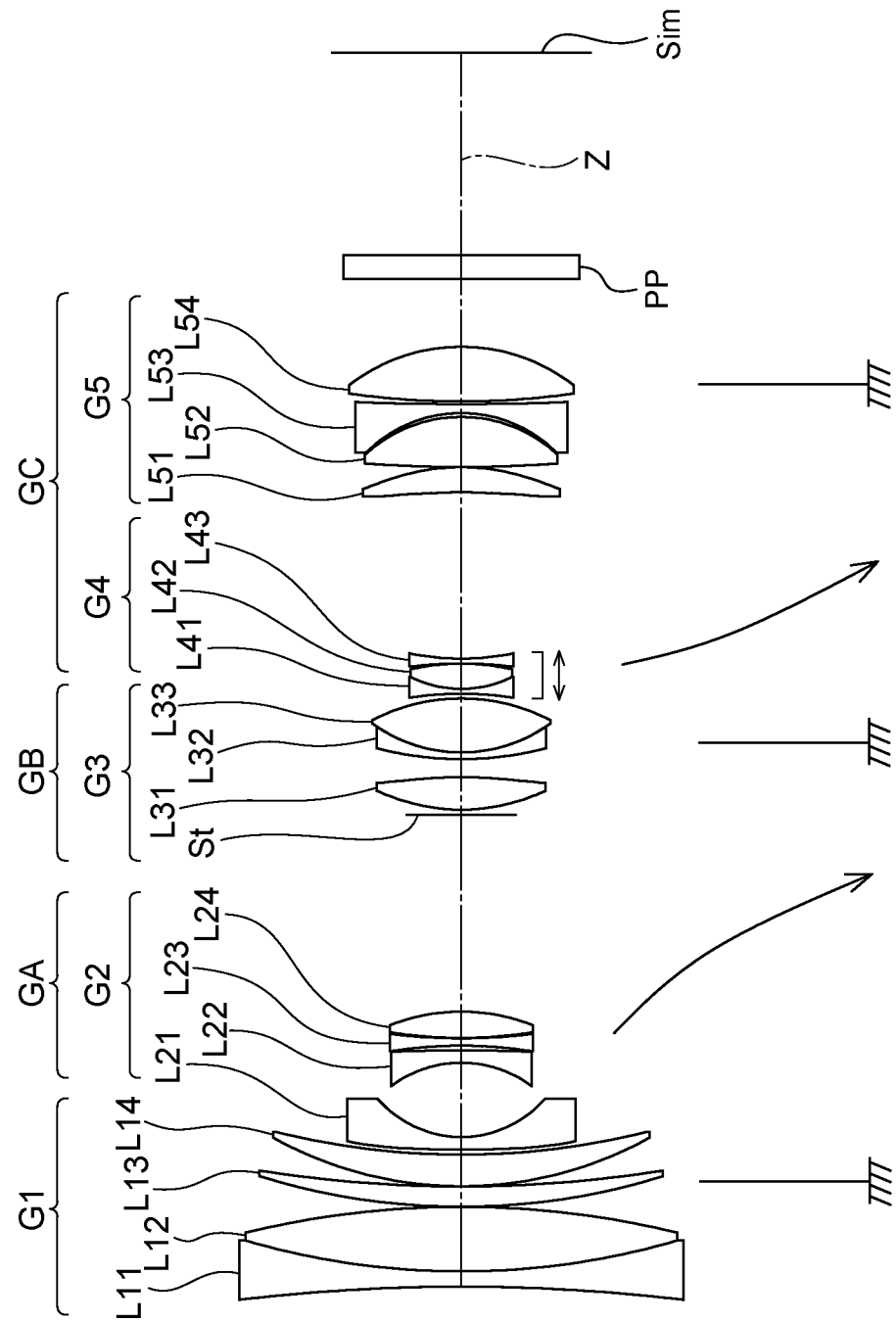
FIG. 75 is a cross-sectional view of a configuration of a zoom lens of Example 35 and a diagram showing movement loci thereof.

FIG. 75 shows a configuration and movement loci of the zoom lens of Example 35. The zoom lens of Example 35 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of three lenses L41 and L43, in order from the object side to the image side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 35, Table 103 shows basic lens data, Table 104 shows specifications and variable surface spacings, and Table 105 shows aspherical coefficients thereof. FIG. 76 shows aberration diagrams. In Example 35, the distance on the optical axis from the lens surface closest to the object side to the close range object is 0.9 m (meters).

TABLE 103

Example 35

| Sn | R | D | Nd | vd | θgF | ED |
|---|---|---|---|---|---|---|
| 1 | −381.6010 | 3.1000 | 1.85883 | 30.00 | 0.59793 | 90.00 |
| 2 | 156.1124 | 13.0879 | 1.59410 | 60.47 | 0.55516 | 87.41 |
| 3 | −185.1530 | 0.0291 | | | | 87.16 |
| 4 | 138.3399 | 4.1044 | 1.84850 | 43.79 | 0.56197 | 80.70 |
| 5 | 260.2985 | 0.0308 | | | | 80.00 |
| 6 | 78.6447 | 6.4211 | 1.84850 | 43.79 | 0.56197 | 75.33 |
| 7 | 155.6834 | DD[7] | | | | 74.19 |
| *8 | 308.9322 | 2.5330 | 1.88299 | 40.78 | 0.56640 | 44.10 |
| *9 | 21.7740 | 15.0822 | | | | 32.25 |
| 10 | −23.6993 | 2.4998 | 1.55032 | 75.50 | 0.54001 | 28.38 |
| 11 | −333.7188 | 0.9521 | | | | 28.57 |
| 12 | −90.6046 | 1.5009 | 1.41390 | 100.82 | 0.53373 | 28.57 |
| 13 | 115.4576 | 0.0788 | | | | 28.88 |
| 14 | 92.2633 | 5.3312 | 1.58144 | 40.98 | 0.57640 | 28.96 |
| 15 | −39.4154 | DD[15] | | | | 29.00 |
| 16(St) | ∞ | 1.0992 | | | | 31.19 |
| *17 | 38.4697 | 6.5790 | 1.49710 | 81.56 | 0.53848 | 34.03 |

TABLE 103-continued

Example 35

| Sn | R | D | Nd | vd | θgF | ED |
|---|---|---|---|---|---|---|
| *18 | −82.8098 | 3.6653 | | | | 34.18 |
| 19 | 67.9763 | 1.3491 | 1.91650 | 31.60 | 0.59117 | 34.30 |
| 20 | 30.6141 | 10.9513 | 1.49700 | 81.61 | 0.53887 | 33.33 |
| 21 | −39.0150 | DD[21] | | | | 33.45 |
| 22 | −71.3206 | 1.0010 | 1.65670 | 62.28 | 0.54205 | 20.96 |
| 23 | 23.0215 | 5.1156 | 1.59270 | 35.27 | 0.59363 | 20.58 |
| 24 | −47.0434 | 0.0291 | | | | 20.50 |
| 25 | −83.5941 | 0.9991 | 1.69560 | 59.05 | 0.54348 | 20.60 |
| 26 | 54.2020 | DD[26] | | | | 21.18 |
| *27 | −141.8920 | 5.1137 | 1.58313 | 59.38 | 0.54237 | 37.84 |
| *28 | −42.6802 | 0.0291 | | | | 38.46 |
| 29 | 267.1454 | 10.1653 | 1.43875 | 94.66 | 0.53402 | 38.95 |
| 30 | −28.7118 | 0.7811 | | | | 38.99 |
| 31 | −27.1661 | 1.8000 | 1.80610 | 33.27 | 0.58845 | 38.44 |
| 32 | 537.4100 | 0.5625 | | | | 43.04 |
| 33 | 165.2411 | 11.0821 | 1.49700 | 81.61 | 0.53887 | 44.66 |
| 34 | −37.0356 | 13.7468 | | | | 45.54 |
| 35 | ∞ | 4.9000 | 1.51633 | 64.05 | 0.53463 | 47.43 |
| 36 | ∞ | 41.0169 | | | | 47.71 |

TABLE 104

Example 35

| | Wide angle end_infinity | Telephoto end_infinity | Telephoto end_close |
|---|---|---|---|
| Zr | 1.0 | 3.4 | 3.4 |
| f | 28.85 | 97.02 | — |
| Bf | 57.99 | 57.99 | — |
| FNo. | 4.12 | 4.12 | 4.12 |
| 2ω[°] | 89.6 | 28.2 | 27.4 |
| IH | 25.6 | 25.6 | 25.6 |
| DD[7] | 1.03 | 39.90 | 39.90 |
| DD[15] | 39.87 | 1.00 | 1.00 |
| DD[21] | 0.94 | 22.47 | 25.93 |
| DD[26] | 33.70 | 12.17 | 8.71 |

TABLE 105

Example 35

| Sn | 8 | 9 | 17 | 18 |
|---|---|---|---|---|
| KA | 1.0000000E+00 | 1.0000000E+00 | 1.0000000E+00 | 1.0000000E+00 |
| A4 | 3.6238186E−06 | −3.2581457E−06 | −2.9685464E−06 | 6.3148546E−06 |
| A6 | −2.6902187E−09 | 8.4658556E−09 | 5.5978270E−09 | 5.1515174E−09 |
| A8 | −2.4891551E−12 | −1.2453081E−10 | −9.8075091E−12 | −7.6547068E−12 |
| A10 | 1.4210955E−14 | 4.6838364E−13 | −5.2859576E−15 | 2.2960901E−14 |
| A12 | −6.1285860E−18 | 3.7623065E−16 | 1.0595720E−16 | 5.3051178E−18 |
| A14 | −1.0410752E−21 | −8.9337800E−18 | 4.7557121E−20 | −2.2556147E−19 |
| A16 | 7.1229528E−25 | −1.0244640E−21 | −1.6647888E−21 | −2.6743281E−22 |
| A18 | −5.9329853E−26 | 1.7315864E−22 | 5.3031301E−25 | −1.3576270E−24 |
| A20 | 7.5569510E−29 | −3.6410624E−25 | −5.0375558E−27 | −3.0189082E−27 |

| Sn | 27 | 28 |
|---|---|---|
| KA | 1.0000000E+00 | 1.0000000E+00 |
| A4 | 5.3910019E−07 | 1.2439587E−06 |
| A6 | 4.1632178E−09 | 1.3479319E−09 |
| A8 | 1.2874865E−12 | 8.0114823E−12 |
| A10 | 3.2169230E−14 | −5.5181798E−16 |
| A12 | −1.7267888E−17 | 4.0247903E−17 |
| A14 | 4.6933280E−20 | 1.6524292E−24 |
| A16 | −2.8787403E−22 | −8.0558360E−27 |
| A18 | 1.6940023E−25 | −4.9223720E−25 |
| A20 | −3.5734772E−28 | 7.5789175E−29 |

Example 36

Figure 77:
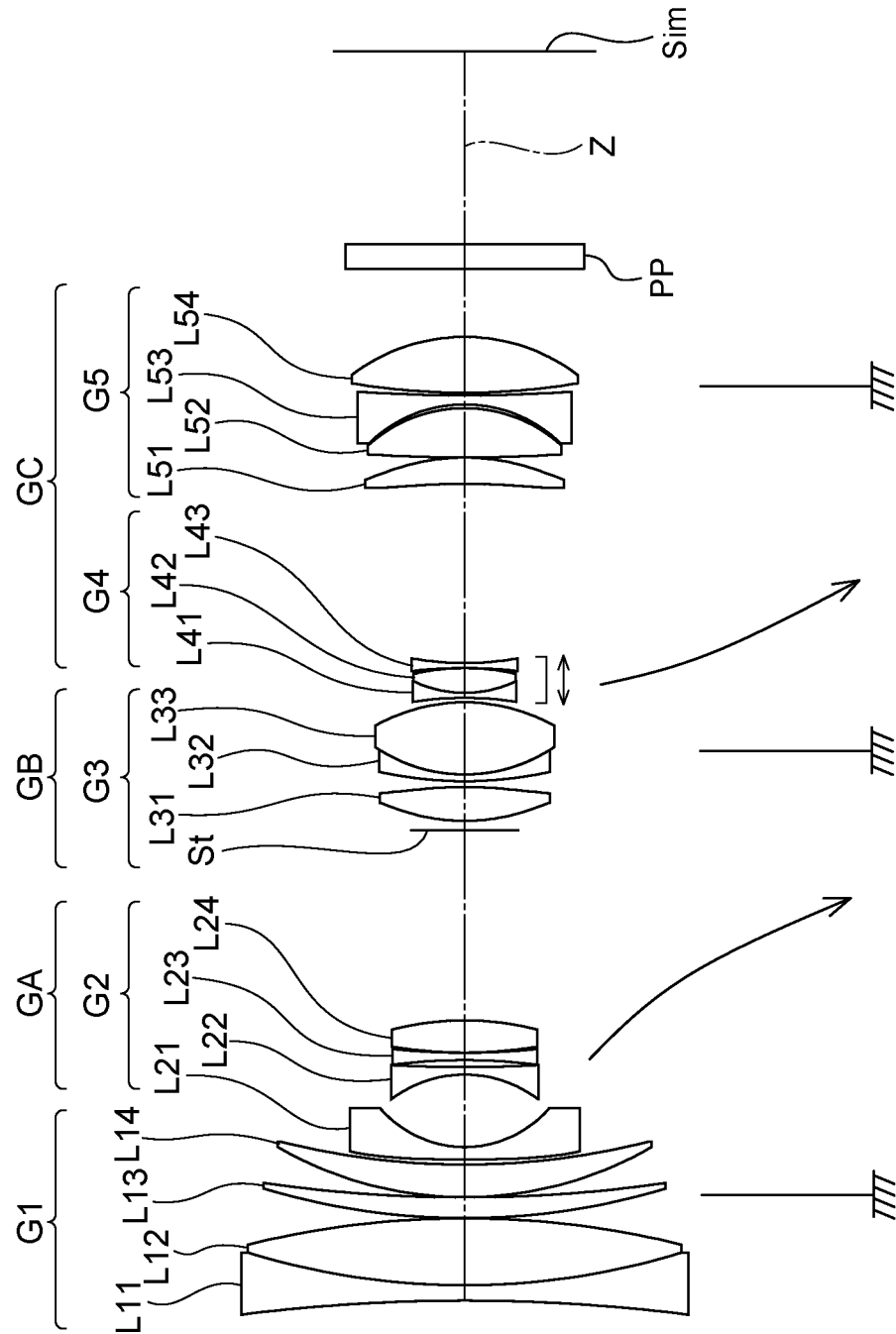
FIG. 77 is a cross-sectional view of a configuration of a zoom lens of Example 36 and a diagram showing movement loci thereof.

FIG. 77 shows a configuration and movement loci of the zoom lens of Example 36. The zoom lens of Example 36 consists of, in order from the object side to the image side, a first lens group G1 that has a positive refractive power, a second lens group G2 that has a negative refractive power, a third lens group G3 that has a positive refractive power, a fourth lens group G4 that has a negative refractive power, and a fifth lens group G5 that has a positive refractive power. The first lens group G1 consists of four lenses L11 to L14, in order from the object side to the image side. The second lens group G2 consists of four lenses L21 to L24, in order from the object side to the image side. The third lens group G3 consists of the aperture stop St and three lenses L31 to L33, in order from the object side to the image side. The fourth lens group G4 consists of three lenses L41 and L43, in order from the object side to the image side. The fifth lens group G5 consists of four lenses L51 to L54, in order from the object side to the image side.

During zooming, the first lens group G1, the third lens group G3, and the fifth lens group G5 remain stationary with respect to the image plane Sim, and the second lens group G2 and the fourth lens group G4 move along the optical axis Z by changing the spacings between the adjacent lens groups. The front group GA consists of a second lens group G2. The middle group GB consists of a third lens group G3. The rear group GC consists of a fourth lens group G4 and a fifth lens group G5. The focusing group consists of a fourth lens group G4.

Regarding the zoom lens of Example 36, Table 106 shows basic lens data, Table 107 shows specifications and variable surface spacings, and Table 108 shows aspherical coefficients thereof. FIG. 78 shows aberration diagrams. In Example 36, the distance on the optical axis from the lens surface closest to the object side to the close range object is 0.9 m (meters).

TABLE 106

Example 36

| Sn | R | D | Nd | vd | θgF | ED |
|---|---|---|---|---|---|---|
| 1 | −357.4830 | 3.1007 | 1.85883 | 30.00 | 0.59793 | 90.00 |
| 2 | 148.5398 | 13.4893 | 1.59410 | 60.47 | 0.55516 | 86.94 |
| 3 | −182.0283 | 0.0291 | | | | 86.69 |
| 4 | 140.1000 | 4.1882 | 1.84850 | 43.79 | 0.56197 | 80.51 |
| 5 | 283.2333 | 0.0291 | | | | 79.87 |

TABLE 106-continued

Example 36

| Sn | R | D | Nd | vd | θgF | ED |
|---|---|---|---|---|---|---|
| 6 | 75.0876 | 6.5716 | 1.84850 | 43.79 | 0.56197 | 74.29 |
| 7 | 150.4212 | DD[7] | | | | 73.18 |
| *8 | 334.0223 | 2.4991 | 1.87070 | 40.73 | 0.56825 | 44.93 |
| *9 | 21.8017 | 14.6249 | | | | 32.63 |
| 10 | −24.5050 | 1.4991 | 1.43700 | 95.10 | 0.53364 | 29.69 |
| 11 | 261.2102 | 1.4070 | | | | 29.08 |
| 12 | −112.8844 | 1.4996 | 1.41390 | 100.82 | 0.53373 | 29.08 |
| 13 | 145.2443 | 0.0291 | | | | 29.14 |
| 14 | 90.4686 | 6.4713 | 1.62588 | 35.72 | 0.58880 | 29.20 |
| 15 | −59.2635 | DD[15] | | | | 29.00 |
| 16(St) | ∞ | 1.8910 | | | | 30.68 |
| *17 | 38.9195 | 6.8329 | 1.49710 | 81.56 | 0.53848 | 34.06 |
| *18 | −77.5584 | 1.1631 | | | | 34.26 |
| 19 | 78.6643 | 1.3503 | 1.91650 | 31.60 | 0.59117 | 34.42 |
| 20 | 32.0271 | 14.5336 | 1.49700 | 81.61 | 0.53887 | 33.60 |
| 21 | −36.8746 | DD[21] | | | | 34.14 |
| 22 | −66.2457 | 1.0007 | 1.65670 | 62.28 | 0.54205 | 20.82 |
| 23 | 23.7897 | 4.9864 | 1.59270 | 35.27 | 0.59363 | 20.55 |
| 24 | −46.9655 | 0.0301 | | | | 20.50 |
| 25 | −92.1881 | 0.9998 | 1.69560 | 59.05 | 0.54348 | 20.64 |
| 26 | 62.3381 | DD[26] | | | | 21.22 |
| *27 | −146.4241 | 5.3294 | 1.58313 | 59.38 | 0.54237 | 38.12 |
| *28 | −42.0475 | 0.0306 | | | | 38.72 |
| 29 | 311.6681 | 9.9087 | 1.43875 | 94.66 | 0.53402 | 39.01 |
| 30 | −29.0747 | 0.7757 | | | | 39.01 |
| 31 | −27.4734 | 1.7991 | 1.80610 | 33.27 | 0.58845 | 38.46 |
| 32 | 301.4642 | 0.5530 | | | | 43.05 |
| 33 | 138.0062 | 11.2463 | 1.49700 | 81.61 | 0.53887 | 44.67 |
| 34 | −37.6244 | 13.7468 | | | | 45.54 |
| 35 | ∞ | 4.9000 | 1.51633 | 64.05 | 0.53463 | 47.48 |
| 36 | ∞ | 38.8614 | | | | 47.77 |

TABLE 107

Example 36

| | Wide angle end_infinity | Telephoto end_infinity | Telephoto end_close |
|---|---|---|---|
| Zr | 1.0 | 3.4 | 3.4 |
| f | 28.84 | 97.01 | — |
| Bf | 55.84 | 55.84 | — |
| FNo. | 4.12 | 4.12 | 4.12 |
| 2ω[°] | 89.6 | 28.2 | 27.4 |
| IH | 25.6 | 25.6 | 25.6 |
| DD[7] | 1.02 | 38.36 | 38.36 |
| DD[15] | 38.34 | 1.00 | 1.00 |
| DD[21] | 0.93 | 24.44 | 28.36 |
| DD[26] | 36.09 | 12.58 | 8.66 |

TABLE 108

Example 36

| Sn | 8 | 9 | 17 | 18 |
|---|---|---|---|---|
| KA | 1.0000000E+00 | 1.0000000E+00 | 1.0000000E+00 | 1.0000000E+00 |
| A4 | 3.6602147E−06 | −3.3695425E−06 | −3.0739664E−06 | 6.8739135E−06 |
| A6 | −2.7051135E−09 | 8.6075233E−09 | 5.6235130E−09 | 5.1354605E−09 |
| A8 | −2.4422028E−12 | −1.2467310E−10 | −9.7619394E−12 | −7.6444583E−12 |
| A10 | 1.4104697E−14 | 4.6820459E−13 | −5.5430843E−15 | 2.3234733E−14 |
| A12 | −6.0929340E−18 | 3.7629290E−16 | 1.0601146E−16 | 6.1065421E−18 |
| A14 | −1.0691896E−21 | −8.9339191E−18 | 4.7556399E−20 | −2.3775546E−19 |
| A16 | 7.1605419E−25 | −9.9634218E−22 | −1.6388298E−21 | −2.1773334E−22 |
| A18 | −5.9335582E−26 | 1.7310158E−22 | 5.2798915E−25 | −1.3409521E−24 |
| A20 | 7.5574308E−29 | −3.6410628E−25 | −5.0429606E−27 | −3.0218469E−27 |

TABLE 108-continued

| | Example 36 | |
|---|---|---|
| Sn | 27 | 28 |
| KA | 1.0000000E+00 | 1.0000000E+00 |
| A4 | 5.8064846E−07 | 1.5129360E−06 |
| A6 | 4.1041038E−09 | 1.3608535E−09 |
| A8 | 1.2626857E−12 | 7.9505831E−12 |
| A10 | 3.2070677E−14 | −2.7979158E−16 |
| A12 | −1.7164020E−17 | 4.0306711E−17 |
| A14 | 4.6942156E−20 | −2.8295626E−23 |
| A16 | −2.8558323E−22 | −1.1458916E−26 |
| A18 | 1.6938822E−25 | −4.9697836E−25 |
| A20 | −3.5744545E−28 | 7.6888054E−29 |

Tables 109 to 124 each show corresponding values of Conditional Expressions (1) to (58) of the zoom lenses of Examples 1 to 36. Tables 109 to 124 show numerical values rounded off to predetermined decimal places.

TABLE 109

| Expression Number | Expression | Example 1 | Example 2 | Example 3 | Example 4 | Example 5 |
|---|---|---|---|---|---|---|
| (1) | DDG1STw/f1 | 0.92 | 0.83 | 0.91 | 0.93 | 0.93 |
| (2) | f1/fB | 3.55 | 3.58 | 3.6 | 3.34 | 2.11 |
| (3) | fAw/fB | −0.65 | −0.63 | −0.65 | −0.63 | −0.39 |
| (4) | enp/{IHw × log(ft/fw)} | 2.32 | 2.23 | 2.34 | 2.35 | 2.33 |
| (5) | f1/(ft/FNot) | 2.31 | 2.39 | 2.35 | 2.24 | 2.25 |
| (6) | DDG1STw/{IHw × log(ft/fw)} | 5.06 | 4.74 | 5.13 | 4.98 | 4.96 |
| (7) | f1/fAw | −5.48 | −5.71 | −5.55 | −5.31 | −5.38 |
| (8) | EDyr/EDz | 0.48 | 0.45 | 0.45 | 0.48 | 0.47 |
| (9) | fz/fGz | 1.09 | 1.1 | 1.08 | 0.97 | 0.94 |
| (10) | f1/fGz | 1.05 | 1.11 | 1.07 | 1.03 | 1.01 |
| (11) | (βBt/βBw)/(ft/fw) | 0.37 | 0.28 | 0.26 | 0.34 | 1.53 |
| (12) | βGzw | 0.62 | 0.61 | 0.65 | 0.58 | 0.6 |
| (13) | (Rzf + Ryr)/(Rzf − Ryr) | 0.77 | 0.78 | 0.78 | 0.78 | 0.72 |
| (14) | NL1 | 1.92 | 1.92 | 1.92 | 1.92 | 1.92 |
| (15) | νL1 | 20.9 | 20.9 | 20.9 | 20.9 | 20.9 |
| (16) | NL1 + 0.01 × νL1 | 2.13 | 2.13 | 2.13 | 2.13 | 2.13 |
| (17) | N1z | 1.78 | 1.78 | 1.78 | 1.78 | 1.78 |
| (18) | ν1z | 50.3 | 50.3 | 50.3 | 50.3 | 50.3 |
| (19) | N1z + 0.01 × ν1z | 2.28 | 2.28 | 2.28 | 2.28 | 2.28 |
| (20) | ν1z − νL1 | 29.4 | 29.4 | 29.4 | 29.4 | 29.4 |
| (21) | NL1 − N1z | 0.14 | 0.14 | 0.14 | 0.14 | 0.14 |
| (22) | f1/f1z | 0.73 | 0.73 | 0.77 | 0.74 | 0.75 |
| (23) | νAn − νAp | 17 | 17 | 17 | 17 | 17 |
| (24) | (RAnf + RApr)/(RAnf − RApr) | −6.26 | −5.91 | −5.84 | −4.97 | −4.64 |
| (25) | f1/fL1 | −0.44 | −0.44 | −0.46 | −0.44 | −0.45 |
| (26) | f1/fw | 3.54 | 3.66 | 3.6 | 3.43 | 3.45 |
| (27) | f1/(fw × ft)$^{1/2}$ | 1.41 | 1.46 | 1.43 | 1.37 | 1.37 |

TABLE 110

| Expression Number | Expression | Example 1 | Example 2 | Example 3 | Example 4 | Example 5 |
|---|---|---|---|---|---|---|
| (28) | fB/fGz | 0.29 | 0.31 | 0.3 | 0.31 | 0.48 |
| (29) | fAw/fw | −0.65 | −0.64 | −0.65 | −0.65 | −0.64 |
| (30) | (βAt/βAw)/(ft/fw) | 0.49 | 0.56 | 0.57 | 0.52 | 0.5 |
| (31) | enp/(fw × ft)$^{1/2}$ | 0.59 | 0.57 | 0.6 | 0.6 | 0.6 |
| (32) | DDG1STw/TLw | 0.43 | 0.4 | 0.45 | 0.43 | 0.42 |
| (33) | STw/STt | 0.87 | 0.85 | 0.8 | 0.86 | 0.85 |
| (34) | ED1/EDz | 2.01 | 1.88 | 1.92 | 1.99 | 1.97 |
| (35) | νBpave | 78 | 78 | 78.1 | 78.1 | 81.5 |
| (36) | νGFnave − νGFpave | 22.2 | 22.5 | 22.5 | 22.2 | 22.2 |
| (37) | NGFnave − NGFpave | −0.11 | −0.12 | −0.1 | −0.11 | −0.11 |
| (38) | NL2 | 1.59 | 1.59 | 1.59 | 1.59 | 1.59 |
| (39) | νL2 | 68.6 | 68.6 | 68.6 | 68.6 | 68.6 |
| (40) | NL2 + 0.01 × νL2 | 2.28 | 2.28 | 2.28 | 2.28 | 2.28 |
| (41) | θL2 + 0.001625 × νL2 | 0.654 | 0.654 | 0.654 | 0.654 | 0.654 |
| (42) | NA2n | 1.78 | 1.78 | 1.78 | 1.78 | 1.78 |

TABLE 110-continued

| Expression Number | Expression | Example 1 | Example 2 | Example 3 | Example 4 | Example 5 |
|---|---|---|---|---|---|---|
| (43) | vA2n | 50.3 | 50.3 | 50.3 | 50.3 | 50.3 |
| (44) | NA2n + 0.01 × vA2n | 2.28 | 2.28 | 2.28 | 2.28 | 2.28 |
| (45) | θA2n + 0.001625 × vA2n | 0.632 | 0.632 | 0.632 | 0.632 | 0.632 |
| (46) | NGFn | 1.79 | 1.79 | 1.78 | 1.79 | 1.79 |
| (47) | vGFn | 47.5 | 47.9 | 50 | 47.5 | 47.5 |
| (48) | NGFn + 0.01 × vGFn | 2.27 | 2.27 | 2.28 | 2.27 | 2.27 |
| (49) | θgFn + 0.001625 × vGFn | 0.631 | 0.633 | 0.632 | 0.631 | 0.631 |
| (50) | fAw/fGF | 0.48 | 0.47 | 0.47 | 0.44 | 0.44 |
| (51) | |DDfft/DDf| | 0.26 | 0.42 | 0.36 | 0.3 | 0.28 |
| (52) | fGz/fGF | −2.49 | −2.4 | −2.46 | −2.27 | −2.35 |
| (53) | Bfw/IHw | 1.67 | 1.57 | 1.45 | 1.78 | 1.7 |
| (54) | ft/fw | 6.3 | 6.3 | 6.3 | 6.3 | 6.3 |
| (55) | (R2r + R1f)/(R2r − R1f) | 1 | 1.04 | 1.04 | 1.18 | 1.17 |
| (56) | vAwnave | 45.5 | 45.5 | 45.5 | 45.5 | 45.5 |
| (57) | (Rp + Rn)/(Rp − Rn) | 2.06 | 2.06 | 2.08 | 2.82 | 3.19 |
| (58) | (APLp + APLn)/2 | −1.002 | −0.936 | −0.875 | −0.881 | −0.822 |

TABLE 111

| Expression Number | Expression | Example 6 | Example 7 | Example 8 | Example 9 | Example 10 |
|---|---|---|---|---|---|---|
| (1) | DDG1STw/f1 | 0.93 | 0.91 | 0.93 | 0.93 | 0.9 |
| (2) | f1/fB | 3.39 | 3.43 | 3.38 | 3.33 | 1.42 |
| (3) | fAw/fB | −0.62 | −0.63 | −0.63 | −0.62 | −0.28 |
| (4) | enp/{IHw × log(ft/fw)} | 2.36 | 2.32 | 2.35 | 2.36 | 2.43 |
| (5) | f1/(ft/FNot) | 2.26 | 2.3 | 2.26 | 2.24 | 2.58 |
| (6) | DDG1STw/{IHw × log(ft/fw)} | 5 | 4.97 | 4.99 | 4.93 | 5.55 |
| (7) | f1/fAw | −5.45 | −5.45 | −5.38 | −5.41 | −5.04 |
| (8) | EDyr/EDz | 0.47 | 0.47 | 0.49 | 0.67 | 0.76 |
| (9) | fz/fGz | 0.98 | 0.97 | 1 | 0.82 | 1.05 |
| (10) | f1/fGz | 1.04 | 1.07 | 1.11 | 0.84 | −1.1 |
| (11) | (βBt/βBw)/(ft/fw) | 0.36 | 0.36 | 0.35 | 0.36 | −0.31 |
| (12) | βGzw | 0.57 | 0.57 | 0.57 | 0.71 | 2.02 |
| (13) | (Rzf + Ryr)/(Rzf − Ryr) | 0.79 | 0.79 | 0.78 | 1.54 | −0.11 |
| (14) | NL1 | 1.92 | 1.92 | 1.92 | 1.89 | 1.92 |
| (15) | vL1 | 20.9 | 20.9 | 20.9 | 20.4 | 20.9 |
| (16) | NL1 + 0.01 × vL1 | 2.13 | 2.13 | 2.13 | 2.09 | 2.13 |
| (17) | N1z | 1.78 | 1.78 | 1.78 | 1.78 | 1.78 |
| (18) | v1z | 50.3 | 50.3 | 50.3 | 50.3 | 50.3 |
| (19) | N1z + 0.01 × v1z | 2.28 | 2.28 | 2.28 | 2.28 | 2.28 |
| (20) | v1z − vL1 | 29.4 | 29.4 | 29.4 | 29.9 | 29.4 |
| (21) | NL1 − N1z | 0.14 | 0.14 | 0.14 | 0.11 | 0.14 |
| (22) | f1/f1z | 0.72 | 0.72 | 0.73 | 0.74 | 0.75 |
| (23) | vAn − vAp | 17 | 18.1 | 17 | 17 | 18 |
| (24) | (RAnf + RApr)/(RAnf − RApr) | −5.81 | −6.61 | −4.82 | −4.67 | −4.62 |
| (25) | f1/fL1 | −0.43 | −0.43 | −0.44 | −0.44 | −0.4 |
| (26) | f1/fw | 3.45 | 3.52 | 3.45 | 3.42 | 3.95 |
| (27) | f1/(fw × ft)$^{1/2}$ | 1.38 | 1.4 | 1.38 | 1.36 | 1.57 |

TABLE 112

| Expression Number | Expression | Example 6 | Example 7 | Example 8 | Example 9 | Example 10 |
|---|---|---|---|---|---|---|
| (28) | fB/fGz | 0.31 | 0.31 | 0.33 | 0.25 | −0.78 |
| (29) | fAw/fw | −0.63 | −0.65 | −0.64 | −0.63 | −0.78 |
| (30) | (βAt/βAw)/(ft/fw) | 0.5 | 0.5 | 0.51 | 0.5 | 0.56 |
| (31) | enp/(fw × ft)$^{1/2}$ | 0.61 | 0.59 | 0.6 | 0.6 | 0.62 |
| (32) | DDG1STw/TLw | 0.43 | 0.43 | 0.43 | 0.42 | 0.43 |
| (33) | STw/STt | 0.85 | 0.85 | 0.86 | 0.86 | 0.93 |
| (34) | ED1/EDz | 1.98 | 1.97 | 2.01 | 1.92 | 2.29 |
| (35) | vBpave | 78.1 | 78.1 | 78.1 | 78.1 | 63.2 |
| (36) | vGFnave − vGFpave | 22.2 | 22.2 | 22.2 | 22.2 | −24.6 |
| (37) | NGFnave − NGFpave | −0.11 | −0.11 | −0.11 | −0.11 | 0.31 |
| (38) | NL2 | 1.59 | 1.59 | 1.59 | 1.59 | 1.5 |
| (39) | vL2 | 68.6 | 68.6 | 68.6 | 68.6 | 81.5 |
| (40) | NL2 + 0.01 × vL2 | 2.28 | 2.28 | 2.28 | 2.28 | 2.32 |

TABLE 112-continued

| Expression Number | Expression | Example 6 | Example 7 | Example 8 | Example 9 | Example 10 |
|---|---|---|---|---|---|---|
| (41) | θL2 + 0.001625 × vL2 | 0.654 | 0.654 | 0.654 | 0.654 | 0.67 |
| (42) | NA2n | 1.78 | 1.78 | 1.78 | 1.78 | 1.8 |
| (43) | vA2n | 50.3 | 50.3 | 50.3 | 50.3 | 47.9 |
| (44) | NA2n + 0.01 × vA2n | 2.28 | 2.28 | 2.28 | 2.28 | 2.28 |
| (45) | θA2n + 0.001625 × vA2n | 0.632 | 0.632 | 0.632 | 0.632 | 0.633 |
| (46) | NGFn | 1.79 | 1.79 | 1.79 | 1.79 | 1.95 |
| (47) | vGFn | 47.5 | 47.5 | 47.5 | 47.5 | 32.1 |
| (48) | NGFn + 0.01 × vGFn | 2.27 | 2.27 | 2.27 | 2.27 | 2.27 |
| (49) | θGFn + 0.001625 × vGFn | 0.631 | 0.631 | 0.631 | 0.631 | 0.643 |
| (50) | fAw/fGF | 0.44 | 0.46 | 0.44 | 0.43 | −0.46 |
| (51) | |DDfft/DDf| | 0.27 | 0.28 | 0.33 | 0.28 | 0.33 |
| (52) | fGz/fGF | −2.32 | −2.31 | −2.12 | −2.76 | −2.11 |
| (53) | Bfw/IHw | 1.74 | 1.72 | 1.66 | 1.42 | 1.15 |
| (54) | ft/fw | 6.3 | 6.3 | 6.3 | 6.3 | 6.3 |
| (55) | (R2r + R1f)/(R2r − R1f) | 1.19 | 1.1 | 1.26 | 1.33 | 0.74 |
| (56) | vAwnave | 45.5 | 45.5 | 45.5 | 45.5 | 44.4 |
| (57) | (Rp + Rn)/(Rp − Rn) | 2.42 | 1.49 | 2.92 | 3 | 1.91 |
| (58) | (APLp + APLn)/2 | −0.851 | −0.943 | −0.915 | −0.864 | −1.201 |

TABLE 113

| Expression Number | Expression | Example 11 | Example 12 | Example 13 | Example 14 | Example 15 |
|---|---|---|---|---|---|---|
| (1) | DDG1STw/f1 | 1.03 | 0.9 | 0.91 | 0.94 | 0.92 |
| (2) | f1/fB | 3.38 | 3.91 | 3.58 | 3.38 | 3.48 |
| (3) | fAw/fB | −0.64 | −0.69 | −0.65 | −0.64 | −0.64 |
| (4) | enp/{IHw × log(ft/fw)} | 2.51 | 2.53 | 2.32 | 2.32 | 2.37 |
| (5) | f1/(ft/FNot) | 2.22 | 2.49 | 2.31 | 2.25 | 2.3 |
| (6) | DDG1STw/{IHw × log(ft/fw)} | 5.44 | 5.36 | 5.03 | 5.04 | 5.02 |
| (7) | f1/fAw | −5.27 | −5.66 | −5.51 | −5.28 | −5.43 |
| (8) | EDyr/EDz | 0.46 | 0.47 | 0.48 | 0.48 | 0.47 |
| (9) | fz/fGz | 1.16 | 1.15 | 1.12 | 0.89 | 1.01 |
| (10) | f1/fGz | 0.98 | 1.09 | 1.07 | 0.97 | 1.07 |
| (11) | (βBt/βBw)/(ft/fw) | 0.36 | 0.39 | 0.37 | 0.36 | 0.36 |
| (12) | βGzw | 0.66 | 0.55 | 0.61 | 0.62 | 0.56 |
| (13) | (Rzf + Ryr)/(Rzf − Ryr) | 0.77 | 0.8 | 0.79 | 0.79 | 0.79 |
| (14) | NL1 | 1.85 | 1.89 | 1.92 | 1.92 | 1.92 |
| (15) | vL1 | 27 | 20.4 | 20.9 | 20.9 | 24 |
| (16) | NL1 + 0.01 × vL1 | 2.12 | 2.09 | 2.13 | 2.13 | 2.16 |
| (17) | N1z | 1.8 | 1.76 | 1.78 | 1.85 | 1.73 |
| (18) | v1z | 48.3 | 48.5 | 50.3 | 43.8 | 54.7 |
| (19) | N1z + 0.01 × v1z | 2.28 | 2.25 | 2.28 | 2.29 | 2.28 |
| (20) | v1z − vL1 | 21.3 | 28.1 | 29.4 | 22.9 | 30.7 |
| (21) | NL1 − N1z | 0.05 | 0.13 | 0.14 | 0.07 | 0.19 |
| (22) | f1/f1z | 0.79 | 0.74 | 0.73 | 0.84 | 0.75 |
| (23) | vAn–vAp | 17.1 | 17.6 | 17.1 | 17 | 17 |
| (24) | (RAnf + RApr)/(RAnf − RApr) | −6.41 | −6.26 | −6.22 | −4.72 | −4.75 |
| (25) | f1/fL1 | −0.68 | −0.46 | −0.43 | −0.52 | −0.5 |
| (26) | f1/fw | 3.4 | 3.81 | 3.53 | 3.45 | 3.51 |
| (27) | f1/(fw × ft)$^{1/2}$ | 1.36 | 1.52 | 1.41 | 1.37 | 1.4 |

TABLE 114

| Expression Number | Expression | Example 11 | Example 12 | Example 13 | Example 14 | Example 15 |
|---|---|---|---|---|---|---|
| (28) | fB/fGz | 0.29 | 0.28 | 0.3 | 0.29 | 0.31 |
| (29) | fAw/fw | −0.65 | −0.67 | −0.64 | −0.65 | −0.65 |
| (30) | (βAt/βAw)/(ft/fw) | 0.51 | 0.47 | 0.49 | 0.5 | 0.49 |
| (31) | enp/(fw × ft)$^{1/2}$ | 0.64 | 0.65 | 0.59 | 0.59 | 0.61 |
| (32) | DDG1STw/TLw | 0.45 | 0.46 | 0.43 | 0.43 | 0.43 |
| (33) | STw/STt | 0.87 | 0.84 | 0.87 | 0.86 | 0.85 |
| (34) | ED1/EDz | 2.14 | 2.19 | 2.01 | 1.99 | 1.98 |
| (35) | vBpave | 79.2 | 78.1 | 77.9 | 78.1 | 78.1 |
| (36) | vGFnave − vGFpave | 25.8 | 14.7 | 24.6 | 22.2 | 22.2 |
| (37) | NGFnave − NGFpave | −0.13 | −0.05 | −0.13 | −0.11 | −0.11 |
| (38) | NL2 | 1.54 | 1.59 | 1.59 | 1.52 | 1.59 |

TABLE 114-continued

| Expression Number | Expression | Example 11 | Example 12 | Example 13 | Example 14 | Example 15 |
|---|---|---|---|---|---|---|
| (39) | $vL2$ | 74.7 | 68.6 | 68.3 | 69.9 | 68.6 |
| (40) | $NL2 + 0.01 \times vL2$ | 2.29 | 2.28 | 2.27 | 2.22 | 2.28 |
| (41) | $\theta L2 + 0.001625 \times vL2$ | 0.661 | 0.656 | 0.656 | 0.645 | 0.654 |
| (42) | $NA2n$ | 1.78 | 1.76 | 1.78 | 1.78 | 1.78 |
| (43) | $vA2n$ | 50.3 | 48.5 | 50.3 | 50.3 | 50.3 |
| (44) | $NA2n + 0.01 \times vA2n$ | 2.28 | 2.25 | 2.28 | 2.28 | 2.28 |
| (45) | $\theta A2n + 0.001625 \times vA2n$ | 0.632 | 0.638 | 0.632 | 0.632 | 0.632 |
| (46) | $NGFn$ | 1.77 | 1.85 | 1.76 | 1.79 | 1.79 |
| (47) | $vGFn$ | 51 | 36.8 | 48.5 | 47.5 | 47.5 |
| (48) | $NGFn + 0.01 \times vGFn$ | 2.28 | 2.22 | 2.25 | 2.27 | 2.27 |
| (49) | $\theta GFn + 0.001625 \times vGFn$ | 0.633 | 0.64 | 0.638 | 0.631 | 0.631 |
| (50) | $fAw/fGF$ | 0.46 | 0.55 | 0.49 | 0.45 | 0.46 |
| (51) | $|DDfft/DDfl|$ | 0.27 | 0.25 | 0.25 | 0.28 | 0.27 |
| (52) | $fGz/fGF$ | −2.46 | −2.86 | −2.5 | −2.45 | −2.35 |
| (53) | $Bfw/IHw$ | 1.52 | 1.14 | 1.66 | 1.67 | 1.74 |
| (54) | $ft/fw$ | 6.3 | 6.3 | 6.3 | 6.3 | 6.3 |
| (55) | $(R2r + R1f)/(R2r - R1f)$ | 0.98 | 1.4 | 1 | 0.82 | 1.29 |
| (56) | $vAwnave$ | 45.6 | 44.6 | 45.6 | 45.5 | 45.5 |
| (57) | $(Rp + Rn)/(Rp - Rn)$ | 1.96 | 1.31 | 1.99 | 3.11 | 3.27 |
| (58) | $(APLp + APLn)/2$ | −0.923 | −1.303 | −0.971 | −0.882 | −0.937 |

TABLE 115

| Expression Number | Expression | Example 16 | Example 17 | Example 18 | Example 19 |
|---|---|---|---|---|---|
| (1) | $DDG1STw/fl$ | 0.87 | 0.79 | 0.96 | 0.93 |
| (2) | $fl/fB$ | 3.56 | 3.56 | 3.46 | 3.54 |
| (3) | $fAw/fB$ | −0.63 | −0.64 | −0.63 | −0.64 |
| (4) | $enp/\{IHw \times \log(ft/fw)\}$ | 2.62 | 2.6 | 2.33 | 2.32 |
| (5) | $fl/(ft/FNot)$ | 2.93 | 3.67 | 2.04 | 2.3 |
| (6) | $DDG1STw/\{IHw \times \log(ft/fw)\}$ | 5.54 | 5.81 | 4.89 | 5.08 |
| (7) | $fl/fAw$ | −5.66 | −5.6 | −5.49 | −5.48 |
| (8) | $EDyr/EDz$ | 0.49 | 0.5 | 0.48 | 0.48 |
| (9) | $fz/fGz$ | 1.1 | 1.12 | 1.1 | 1.08 |
| (10) | $fl/fGz$ | 1.06 | 1.08 | 1.02 | 1.03 |
| (11) | $(\beta Bt/\beta Bw)/(ft/fw)$ | 0.48 | 0.57 | 0.33 | 0.37 |
| (12) | $\beta Gzw$ | 0.57 | 0.53 | 0.65 | 0.62 |
| (13) | $(Rzf + Ryr)/(Rzf - Ryr)$ | 0.77 | 0.77 | 0.77 | 0.77 |
| (14) | $NL1$ | 1.92 | 1.92 | 1.92 | 1.92 |
| (15) | $vL1$ | 20.9 | 20.9 | 20.9 | 20.9 |
| (16) | $NL1 + 0.01 \times vL1$ | 2.13 | 2.13 | 2.13 | 2.13 |
| (17) | $N1z$ | 1.78 | 1.78 | 1.78 | 1.78 |
| (18) | $v1z$ | 50.3 | 50.3 | 50.3 | 50.3 |
| (19) | $N1z + 0.01 \times v1z$ | 2.28 | 2.28 | 2.28 | 2.28 |
| (20) | $v1z - vL1$ | 29.4 | 29.4 | 29.4 | 29.4 |
| (21) | $NL1 - N1z$ | 0.14 | 0.14 | 0.14 | 0.14 |
| (22) | $fl/f1z$ | 0.75 | 0.75 | 0.74 | 0.73 |
| (23) | $vAn - vAp$ | 14.2 | 13.8 | 14.3 | 17 |
| (24) | $(RAnf + RApr)/(RAnf - RApr)$ | −5.98 | −6.07 | −5.92 | −6.18 |
| (25) | $fl/fL1$ | −0.43 | −0.42 | −0.42 | −0.44 |
| (26) | $fl/fw$ | 3.56 | 3.57 | 3.46 | 3.52 |
| (27) | $fl/(fw \times ft)^{1/2}$ | 1.59 | 1.78 | 1.31 | 1.4 |

TABLE 116

| Expression Number | Expression | Example 16 | Example 17 | Example 18 | Example 19 |
|---|---|---|---|---|---|
| (28) | $fB/fGz$ | 0.3 | 0.3 | 0.3 | 0.29 |
| (29) | $fAw/fw$ | −0.63 | −0.64 | −0.63 | −0.64 |
| (30) | $(\beta At/\beta Aw)/(ft/fw)$ | 0.48 | 0.5 | 0.5 | 0.49 |
| (31) | $enp/(fw \times ft)^{1/2}$ | 0.66 | 0.63 | 0.6 | 0.59 |
| (32) | $DDG1STw/TLw$ | 0.42 | 0.39 | 0.45 | 0.44 |
| (33) | $STw/STt$ | 0.84 | 0.84 | 0.86 | 0.87 |
| (34) | $ED1/EDz$ | 1.97 | 1.73 | 2.09 | 2.02 |
| (35) | $vBpave$ | 78 | 78 | 78 | 78 |
| (36) | $vGFnave - vGFpave$ | 23.8 | 24.1 | 22.7 | 22.2 |
| (37) | $NGFnave - NGFpave$ | −0.13 | −0.13 | −0.12 | −0.11 |
| (38) | $NL2$ | 1.55 | 1.55 | 1.55 | 1.59 |
| (39) | $vL2$ | 70.7 | 71.8 | 70.7 | 68.6 |
| (40) | $NL2 + 0.01 \times vL2$ | 2.26 | 2.27 | 2.26 | 2.28 |
| (41) | $\theta L2 + 0.001625 \times vL2$ | 0.657 | 0.656 | 0.657 | 0.654 |
| (42) | $NA2n$ | 1.78 | 1.78 | 1.78 | 1.78 |
| (43) | $vA2n$ | 50.3 | 50.3 | 50.3 | 50.3 |
| (44) | $NA2n + 0.01 \times vA2n$ | 2.28 | 2.28 | 2.28 | 2.28 |
| (45) | $\theta A2n + 0.001625 \times vA2n$ | 0.632 | 0.632 | 0.632 | 0.632 |
| (46) | $NGFn$ | 1.77 | 1.77 | 1.78 | 1.79 |
| (47) | $vGFn$ | 50.5 | 50.9 | 50.1 | 47.5 |
| (48) | $NGFn + 0.01 \times vGFn$ | 2.28 | 2.28 | 2.28 | 2.27 |
| (49) | $\theta GFn + 0.001625 \times vGFn$ | 0.632 | 0.633 | 0.632 | 0.631 |
| (50) | $fAw/fGF$ | 0.45 | 0.45 | 0.46 | 0.47 |
| (51) | $|DDfft/DDfl|$ | 0.2 | 0.17 | 0.28 | 0.26 |
| (52) | $fGz/fGF$ | −2.4 | −2.34 | −2.45 | −2.52 |
| (53) | $Bfw/IHw$ | 1.81 | 1.92 | 1.57 | 1.66 |
| (54) | $ft/fw$ | 5 | 4 | 7 | 6.3 |
| (55) | $(R2r + R1f)/(R2r - R1f)$ | 0.96 | 0.97 | 0.89 | 1 |
| (56) | $vAwnave$ | 43.6 | 43.4 | 43.7 | 45.5 |
| (57) | $(Rp + Rn)/(Rp - Rn)$ | 2.02 | 2.03 | 2.03 | 2.07 |
| (58) | $(APLp + APLn)/2$ | −1.149 | −1.256 | −0.861 | −0.983 |

TABLE 117

| Expression Number | Expression | Example 20 | Example 21 | Example 22 | Example 23 | Example 24 |
|---|---|---|---|---|---|---|
| (1) | DDG1STw/f1 | 0.83 | 0.78 | 0.82 | 0.85 | 0.73 |
| (2) | f1/fB | 3.12 | 3.4 | 3.24 | 3.09 | 3.77 |
| (3) | fAw/fB | −0.58 | −0.62 | −0.61 | −0.61 | −0.66 |
| (4) | enp/{IHw × log(ft/fw)} | 2.91 | 2.9 | 2.92 | 2.91 | 2.78 |
| (5) | f1/(ft/FNot) | 4.84 | 5.27 | 5.04 | 4.81 | 5.82 |
| (6) | DDG1STw/{IHw × log(ft/fw)} | 7 | 7.14 | 7.17 | 7.15 | 7.37 |
| (7) | f1/fAw | −5.38 | −5.51 | −5.26 | −5.08 | −5.69 |
| (8) | EDyr/EDz | 0.46 | 0.46 | 0.46 | 0.46 | 0.46 |
| (9) | fz/fGz | 0.62 | 0.63 | 0.6 | 0.69 | 0.67 |
| (10) | f1/fGz | 1.31 | 1.44 | 1.39 | 1.36 | 1.56 |
| (11) | (βBt/βBw)/(ft/fw) | 0.63 | 0.64 | 0.63 | 0.62 | 0.64 |
| (12) | βGzw | 0.33 | 0.33 | 0.33 | 0.26 | 0.32 |
| (13) | (Rzf + Ryr)/(Rzf − Ryr) | 0.26 | 0.26 | 0.24 | 0.29 | 0.21 |
| (14) | NL1 | 1.86 | 1.86 | 1.86 | 1.86 | 1.89 |
| (15) | νL1 | 30 | 30 | 30 | 30 | 23.74 |
| (16) | NL1 + 0.01 × νL1 | 2.16 | 2.16 | 2.16 | 2.16 | 2.13 |
| (17) | N1z | 1.76 | 1.77 | 1.82 | 1.8 | 1.91 |
| (18) | ν1z | 52.34 | 49.62 | 46.67 | 47.54 | 37.24 |
| (19) | N1z + 0.01 × ν1z | 2.28 | 2.27 | 2.28 | 2.28 | 2.28 |
| (20) | ν1z − νL1 | 22.34 | 19.62 | 16.67 | 17.55 | 13.49 |
| (21) | NL1 − N1z | 0.1 | 0.09 | 0.04 | 0.05 | −0.02 |
| (22) | f1/f1z | 0.55 | 0.56 | 0.53 | 0.58 | 0.58 |
| (23) | νAn − νAp | 24.37 | 31.09 | 32.84 | 26.71 | 25.83 |
|  |  |  |  |  |  | 32.46 |
| (24) | (RAnf + RApr)/(RAnf − RApr) | ∞ | ∞ | ∞ | ∞ | ∞ |
|  |  | — | — | — | — | 0.39 |
| (25) | f1/fL1 | −0.32 | −0.33 | −0.34 | −0.37 | −0.31 |
| (26) | f1/fw | 3.95 | 4.3 | 4.11 | 3.93 | 4.75 |
| (27) | f1/(fw × ft)$^{1/2}$ | 2.15 | 2.35 | 2.24 | 2.14 | 2.59 |

TABLE 118

| Expression Number | Expression | Example 20 | Example 21 | Example 22 | Example 23 | Example 24 |
|---|---|---|---|---|---|---|
| (28) | fB/fGz | 0.42 | 0.42 | 0.43 | 0.44 | 0.41 |
| (29) | fAw/fw | −0.73 | −0.78 | −0.78 | −0.77 | −0.84 |
| (30) | (βAt/βAw)/(ft/fw) | 0.52 | 0.51 | 0.52 | 0.52 | 0.5 |
| (31) | enp/(fw × ft)$^{1/2}$ | 0.74 | 0.74 | 0.74 | 0.74 | 0.71 |
| (32) | DDG1STw/TLw | 0.38 | 0.39 | 0.39 | 0.39 | 0.4 |
| (33) | STw/STt | 0.82 | 0.81 | 0.82 | 0.8 | 0.81 |
| (34) | ED1/EDz | 1.98 | 1.98 | 1.98 | 1.98 | 2.02 |
| (35) | νBpave | 81.58 | 81.58 | 81.58 | 81.58 | 81.58 |
| (36) | νGFnave − νGFpave | 20.11 | 19.67 | 21.08 | 20.35 | 19.67 |
| (37) | NGFnave − NGFpave | 0.06 | 0.08 | 0.06 | 0.06 | 0.1 |
| (38) | NL2 | 1.6 | 1.6 | 1.59 | 1.59 | 1.72 |
| (39) | νL2 | 65.57 | 65.44 | 67.84 | 64.51 | 55.32 |
| (40) | NL2 + 0.01 × νL2 | 2.26 | 2.26 | 2.27 | 2.24 | 2.28 |
| (41) | θL2 + 0.001625 × νL2 | 0.648 | 0.645 | 0.653 | 0.647 | 0.634 |
| (42) | NA2n | 1.7 | 1.7 | 1.7 | 1.7 | 1.7 |
| (43) | νA2n | 59.05 | 59.05 | 59.05 | 59.05 | 59.05 |
| (44) | NA2n + 0.01 × νA2n | 2.29 | 2.29 | 2.29 | 2.29 | 2.29 |
| (45) | θA2n + 0.001625 × νA2n | 0.639 | 0.639 | 0.639 | 0.639 | 0.639 |
| (46) | NGFn | 1.65 | 1.65 | 1.63 | 1.63 | 1.7 |
|  |  | 1.7 | 1.73 | 1.7 | 1.71 | 1.75 |
| (47) | νGFn | 58.62 | 58.54 | 59.17 | 58.73 | 56.25 |
|  |  | 55.53 | 54.68 | 59.05 | 56 | 53.17 |
| (48) | NGFn + 0.01 × νGFn | 2.24 | 2.24 | 2.22 | 2.22 | 2.27 |
|  |  | 2.25 | 2.28 | 2.29 | 2.27 | 2.28 |
| (49) | θGFn + 0.001625 × νGFn | 0.636 | 0.634 | 0.652 | 0.638 | 0.635 |
|  |  | 0.634 | 0.633 | 0.639 | 0.635 | 0.633 |
| (50) | fAw/fGF | 0.39 | 0.43 | 0.42 | 0.43 | 0.49 |
| (51) | |DDfft/DDf1| | 0.16 | 0.16 | 0.17 | 0.17 | 0.16 |
| (52) | fGz/fGF | −1.62 | −1.65 | −1.61 | −1.59 | −1.79 |
| (53) | Bfw/IHw | 2.1 | 2.07 | 1.98 | 2.13 | 2.1 |
| (54) | ft/fw | 3.36 | 3.36 | 3.36 | 3.36 | 3.36 |
| (55) | (R2r + R1f)/(R2r − R1f) | −4.21 | −3.4 | −3.99 | −4.39 | −4.12 |
| (56) | νAwnave | 65.4 | 66.9 | 67.8 | 65.4 | 69.6 |
| (57) | (Rp + Rn)/(Rp − Rn) | 3.27 | 3.37 | 3.17 | 3.36 | 2.35 |
| (58) | (APLp + APLn)/2 | −0.488 | −0.495 | −0.523 | −0.52 | −0.521 |

TABLE 119

| Expression Number | Expression | Example 25 | Example 26 | Example 27 | Example 28 | Example 29 |
|---|---|---|---|---|---|---|
| (1) | DDG1STw/f1 | 0.82 | 0.79 | 0.81 | 0.79 | 0.85 |
| (2) | f1/fB | 3.62 | 3.27 | 3.38 | 3.36 | 3.2 |
| (3) | fAw/fB | −0.68 | −0.61 | −0.63 | −0.63 | −0.61 |
| (4) | enp/{IHw × log(ft/fw)} | 3.18 | 2.89 | 2.97 | 2.92 | 2.88 |
| (5) | f1/(ft/FNot) | 5.41 | 5.15 | 5.13 | 5.16 | 4.91 |
| (6) | DDG1STw/{IHw × log(ft/fw)} | 7.76 | 7.11 | 7.22 | 7.14 | 7.25 |
| (7) | f1/fAw | −5.31 | −5.37 | −5.39 | −5.35 | −5.26 |
| (8) | EDyr/EDz | 0.46 | 0.46 | 0.46 | 0.47 | 0.46 |
| (9) | fz/fGz | 0.67 | 0.58 | 0.99 | 0.73 | 0.72 |
| (10) | f1/fGz | 1.48 | 1.38 | 1.47 | 1.45 | 1.24 |
| (11) | (βBt/βBw)/(ft/fw) | 0.61 | 0.64 | 0.64 | 0.63 | 0.62 |
| (12) | βGzw | 0.36 | 0.36 | 0.23 | 0.24 | 0.41 |
| (13) | (Rzf + Ryr)/(Rzf − Ryr) | 0.19 | 0.32 | 0.45 | 0.46 | 0.09 |
| (14) | NL1 | 1.8 | 1.86 | 1.86 | 1.86 | 1.86 |
| (15) | vL1 | 27.95 | 30 | 30 | 30 | 30 |
| (16) | NL1 + 0.01 × vL1 | 2.08 | 2.16 | 2.16 | 2.16 | 2.16 |
| (17) | N1z | 1.89 | 1.76 | 1.85 | 1.85 | 1.76 |
| (18) | v1z | 38.75 | 52.34 | 43.79 | 43.79 | 52.34 |
| (19) | N1z + 0.01 × v1z | 2.28 | 2.28 | 2.29 | 2.29 | 2.28 |
| (20) | v1z − vL1 | 10.8 | 22.34 | 13.79 | 13.79 | 22.34 |
| (21) | NL1 − N1z | −0.1 | 0.1 | 0.01 | 0.01 | 0.1 |
| (22) | f1/f1z | 0.66 | 0.54 | 0.63 | 0.64 | 0.64 |
| (23) | vAn − vAp | 38.36<br>28.53 | 24.37 | 19.74 | 65.55 | 54.15 |
| (24) | (RAnf + RApr)/(RAnf − RApr) | ∞<br>0.3 | ∞ | ∞ | ∞ | 2.08 |
| (25) | f1/fL1 | −0.18 | −0.36 | −0.34 | −0.33 | −0.37 |
| (26) | f1/fw | 4.42 | 4.2 | 4.19 | 4.21 | 4 |
| (27) | f1/(fw × ft)$^{1/2}$ | 2.41 | 2.29 | 2.28 | 2.3 | 2.18 |

TABLE 120

| Expression Number | Expression | Example 25 | Example 26 | Example 27 | Example 28 | Example 29 |
|---|---|---|---|---|---|---|
| (28) | fB/fGz | 0.41 | 0.42 | 0.44 | 0.43 | 0.39 |
| (29) | fAw/fw | −0.83 | −0.78 | −0.78 | −0.79 | −0.76 |
| (30) | (βAt/βAw)/(ft/fw) | 0.52 | 0.51 | 0.5 | 0.51 | 0.53 |
| (31) | enp/(fw × ft)$^{1/2}$ | 0.81 | 0.74 | 0.76 | 0.74 | 0.73 |
| (32) | DDG1STw/TLw | 0.43 | 0.38 | 0.39 | 0.39 | 0.39 |
| (33) | STw/STt | 0.83 | 0.81 | 0.79 | 0.8 | 0.83 |
| (34) | ED1/EDz | 2.19 | 1.98 | 1.98 | 1.98 | 1.98 |
| (35) | vBpave | 81.58 | 81.58 | 81.58 | 81.58 | 81.58 |
| (36) | vGFnave − vGFpave | 17.1 | 20.11 | 19.74 | 25.39 | 20.11 |
| (37) | NGFnave − NGFpave | 0.12 | 0.06 | 0.13 | 0.08 | 0.06 |
| (38) | NL2 | 1.52 | 1.6 | 1.61 | 1.59 | 1.6 |
| (39) | vL2 | 77.43 | 65.57 | 56.82 | 60.47 | 65.57 |
| (40) | NL2 + 0.01 × vL2 | 2.29 | 2.26 | 2.18 | 2.2 | 2.26 |
| (41) | θL2 + 0.001625 × θvL2 | 0.664 | 0.648 | 0.641 | 0.653 | 0.648 |
| (42) | NA2n | 1.7 | 1.7 | 1.7 | 1.7 | 1.7 |
| (43) | vA2n | 59.05 | 59.05 | 59.05 | 59.05 | 59.05 |
| (44) | NA2n + 0.01 × vA2n | 2.29 | 2.29 | 2.29 | 2.29 | 2.29 |
| (45) | θA2n + 0.001625 × vA2n | 0.639 | 0.639 | 0.639 | 0.639 | 0.639 |
| (46) | NGFn | 1.71<br>1.83 | 1.65<br>1.7 | 1.64<br>1.8 | 1.66<br>1.7 | 1.65<br>1.7 |
| (47) | vGFn | 56.04<br>45.5 | 58.62<br>55.53 | 63.43<br>46.6 | 62.28<br>59.05 | 58.62<br>55.53 |
| (48) | NGFn + 0.01 × vGFn | 2.27<br>2.28 | 2.24<br>2.25 | 2.27<br>2.27 | 2.28<br>2.29 | 2.24<br>2.25 |
| (49) | θgFn + 0.001625 × vGFn | 0.635<br>0.633 | 0.636<br>0.634 | 0.646<br>0.633 | 0.643<br>0.639 | 0.636<br>0.634 |
| (50) | fAw/fGF | 0.5 | 0.41 | 0.46 | 0.46 | 0.41 |
| (51) | |DDfft/DDf| | 0.18 | 0.16 | 0.15 | 0.16 | 0.16 |
| (52) | fGz/fGF | −1.81 | −1.59 | −1.68 | −1.7 | −1.76 |
| (53) | Bfw/IHw | 1.91 | 1.99 | 2.16 | 2.2 | 1.72 |
| (54) | ft/fw | 3.36 | 3.36 | 3.36 | 3.36 | 3.36 |
| (55) | (R2r + R1f)/(R2r − R1f) | −1.39 | −5.43 | −2.75 | −2.84 | −25.64 |
| (56) | vAwnave | 71.3 | 65.4 | 67.8 | 79.9 | 74.2 |
| (57) | (Rp + Rn)/(Rp − Rn) | 1.98 | 4.59 | 3.61 | 4.08 | 6.12 |
| (58) | (APLp + APLn)/2 | −0.518 | −0.37 | −0.501 | −0.431 | −0.254 |

TABLE 121

| Expression Number | Expression | Example 30 | Example 31 | Example 32 | Example 33 | Example 34 |
|---|---|---|---|---|---|---|
| (1) | DDG1STw/f1 | 0.8 | 0.83 | 0.73 | 0.79 | 0.81 |
| (2) | f1/fB | 3.33 | 3.25 | 3.69 | 3.32 | 3.35 |
| (3) | fAw/fB | −0.62 | −0.61 | −0.64 | −0.62 | −0.62 |
| (4) | enp/{IHw × log(ft/fw)} | 2.89 | 2.92 | 2.88 | 2.83 | 2.88 |
| (5) | f1/(ft/FNot) | 5.08 | 5.09 | 5.6 | 5.27 | 5.11 |
| (6) | DDG1STw/{IHw × log(ft/fw)} | 7.09 | 7.41 | 7.12 | 7.27 | 7.2 |
| (7) | f1/fAw | −5.34 | −5.29 | −5.73 | −5.36 | −5.37 |
| (8) | EDyr/EDz | 0.46 | 0.46 | 0.46 | 0.46 | 0.46 |
| (9) | fz/fGz | 0.69 | 1.54 | 1.12 | 1.73 | 0.61 |
| (10) | f1/fGz | 1.45 | 1.28 | 1.46 | 1.31 | 1.47 |
| (11) | (βBt/βBw)/(ft/fw) | 0.62 | 0.63 | 0.65 | 0.64 | 0.62 |
| (12) | βGzw | 0.22 | 0.44 | 0.36 | 0.44 | 0.26 |
| (13) | (Rzf + Ryr)/(Rzf − Ryr) | 0.46 | 0.33 | 0.13 | 0.42 | 0.52 |
| (14) | NL1 | 1.86 | 1.86 | 1.86 | 1.86 | 1.86 |
| (15) | νL1 | 30 | 30 | 30 | 30 | 30 |
| (16) | NL1 + 0.01 × νL1 | 2.16 | 2.16 | 2.16 | 2.16 | 2.16 |
| (17) | N1z | 1.85 | 1.76 | 1.76 | 1.76 | 1.9 |
| (18) | ν1z | 43.79 | 52.34 | 52.34 | 52.34 | 37.37 |
| (19) | N1z + 0.01 × ν1z | 2.29 | 2.28 | 2.28 | 2.28 | 2.27 |
| (20) | ν1z − νL1 | 13.79 | 22.34 | 22.34 | 22.34 | 7.38 |
| (21) | NL1 − N1z | 0.01 | 0.1 | 0.1 | 0.1 | −0.04 |
| (22) | f1/f1z | 0.62 | 0.56 | 0.65 | 0.56 | 0.71 |
| (23) | νAn − νAp | 7.14 | 59.39 | — | — | 1.57 |
| (24) | (RAnf + RApr)/(RAnf − RApr) | ∞ | ∞ | — | — | ∞ |
| (25) | f1/fL1 | −0.34 | −0.35 | −0.33 | −0.37 | −0.34 |
| (26) | f1/fw | 4.15 | 4.16 | 4.58 | 4.31 | 4.17 |
| (27) | f1/(fw × ft)$^{1/2}$ | 2.26 | 2.27 | 2.49 | 2.35 | 2.28 |

TABLE 122

| Expression Number | Expression | Example 30 | Example 31 | Example 32 | Example 33 | Example 34 |
|---|---|---|---|---|---|---|
| (28) | fB/fGz | 0.44 | 0.39 | 0.4 | 0.39 | 0.44 |
| (29) | fAw/fw | −0.78 | −0.79 | −0.8 | −0.8 | −0.78 |
| (30) | (βAt/βAw)/(ft/fw) | 0.51 | 0.53 | 0.5 | 0.52 | 0.51 |
| (31) | enp/(fw × ft)$^{1/2}$ | 0.74 | 0.74 | 0.73 | 0.72 | 0.73 |
| (32) | DDG1STw/TLw | 0.38 | 0.4 | 0.38 | 0.39 | 0.39 |
| (33) | STw/STt | 0.79 | 0.83 | 0.82 | 0.83 | 0.8 |
| (34) | ED1/EDz | 1.98 | 1.98 | 1.98 | 1.98 | 1.98 |
| (35) | νBpave | 81.58 | 81.58 | 81.58 | 81.58 | 81.58 |
| (36) | νGFnave − νGFpave | 25.97 | 20.11 | 20.11 | 20.11 | 25.39 |
| (37) | NGFnave − NGFpave | 0.07 | 0.06 | 0.06 | 0.06 | 0.08 |
| (38) | NL2 | 1.57 | 1.6 | 1.6 | 1.6 | 1.7 |
| (39) | νL2 | 71.34 | 65.57 | 65.57 | 65.57 | 59.05 |
| (40) | NL2 + 0.01 × νL2 | 2.28 | 2.26 | 2.26 | 2.26 | 2.29 |
| (41) | θL2 + 0.001625 × νL2 | 0.661 | 0.648 | 0.648 | 0.648 | 0.639 |
| (42) | NA2n | 1.62 | 1.7 | 1.7 | 1.7 | 1.7 |
| (43) | νA2n | 63.88 | 59.05 | 59.05 | 59.05 | 59.05 |
| (44) | NA2n + 0.01 × νA2n | 2.26 | 2.29 | 2.29 | 2.29 | 2.29 |
| (45) | θA2n + 0.001625 × νA2n | 0.646 | 0.639 | 0.639 | 0.639 | 0.639 |
| (46) | NGFn | 1.64 | 1.65 | 1.65 | 1.65 | 1.66 |
| | | 1.7 | 1.7 | 1.7 | 1.7 | 1.7 |
| (47) | νGFn | 63.43 | 58.62 | 58.62 | 58.62 | 62.28 |
| | | 59.05 | 55.53 | 55.53 | 55.53 | 59.05 |
| (48) | NGFn + 0.01 × νGFn | 2.27 | 2.24 | 2.24 | 2.24 | 2.28 |
| | | 2.29 | 2.25 | 2.25 | 2.25 | 2.29 |
| (49) | θgFn + 0.001625 × νGFn | 0.646 | 0.636 | 0.636 | 0.636 | 0.643 |
| | | 0.639 | 0.634 | 0.634 | 0.634 | 0.639 |
| (50) | fAw/fGF | 0.47 | 0.4 | 0.46 | 0.4 | 0.47 |
| (51) | |DDfft/DDf| | 0.16 | 0.17 | 0.15 | 0.16 | 0.16 |
| (52) | fGz/fGF | −1.72 | −1.65 | −1.79 | −1.66 | −1.74 |
| (53) | Bfw/IHw | 2.22 | 1.48 | 1.88 | 1.45 | 2.2 |
| (54) | ft/fw | 3.36 | 3.36 | 3.36 | 3.36 | 3.36 |
| (55) | (R2r + R1f)/(R2r − R1f) | −3.7 | −3.6 | −3.17 | −4.45 | −3.68 |
| (56) | νAwnave | 67.6 | 76.9 | 59.1 | 70.3 | 59.8 |
| (57) | (Rp + Rn)/(Rp − Rn) | 3.87 | 4.64 | 7.26 | 5.65 | 5.07 |
| (58) | (APLp + APLn)/2 | −0.389 | −0.301 | −0.273 | −0.194 | −0.367 |

TABLE 123

| Expression Number | Expression | Example 35 | Example 36 |
|---|---|---|---|
| (1) | DDG1STw/f1 | 0.78 | 0.81 |
| (2) | f1/fB | 3.43 | 3.24 |
| (3) | fAw/fB | −0.64 | −0.62 |
| (4) | enp/{IHw × log(ft/fw)} | 2.91 | 2.95 |
| (5) | f1/(ft/FNot) | 5.24 | 4.99 |
| (6) | DDG1STw/{IHw × log(ft/fw)} | 7.09 | 7.03 |
| (7) | f1/fAw | −5.33 | −5.25 |
| (8) | EDyr/EDz | 0.47 | 0.47 |
| (9) | fz/fGz | 0.76 | 0.72 |
| (10) | f1/fGz | 1.51 | 1.38 |
| (11) | (βBt/βBw)/(ft/fw) | 0.62 | 0.63 |
| (12) | βGzw | 0.21 | 0.26 |
| (13) | (Rzf + Ryr)/(Rzf − Ryr) | 0.45 | 0.4 |
| (14) | NL1 | 1.86 | 1.86 |
| (15) | νL1 | 30 | 30 |
| (16) | NL1 + 0.01 × νL1 | 2.16 | 2.16 |
| (17) | N1z | 1.85 | 1.85 |
| (18) | ν1z | 43.79 | 43.79 |
| (19) | N1z + 0.01 × ν1z | 2.29 | 2.29 |
| (20) | ν1z − νL1 | 13.79 | 13.79 |
| (21) | NL1 − N1z | 0.01 | 0.01 |
| (22) | f1/f1z | 0.68 | 0.69 |
| (23) | νAn − νAp | — | — |
| (24) | (RAnf + RApr)/(RAnf − RApr) | — | — |
| (25) | f1/fL1 | −0.33 | −0.33 |
| (26) | f1/fw | 4.27 | 4.07 |
| (27) | f1/(fw × ft)$^{1/2}$ | 2.33 | 2.22 |

TABLE 124

| Expression Number | Expression | Example 35 | Example 36 |
|---|---|---|---|
| (28) | fB/fGz | 0.44 | 0.43 |
| (29) | fAw/fw | −0.8 | −0.78 |
| (30) | (βAt/βAw)/(ft/fw) | 0.5 | 0.51 |
| (31) | enp/(fw × ft)$^{1/2}$ | 0.74 | 0.75 |
| (32) | DDG1STw/TLw | 0.38 | 0.38 |
| (33) | STw/STt | 0.79 | 0.8 |
| (34) | ED1/EDz | 1.98 | 1.98 |
| (35) | νBpave | 81.58 | 81.58 |
| (36) | νGFnave − νGFpave | 25.39 | 25.39 |
| (37) | NGFnave − NGFpave | 0.08 | 0.08 |
| (38) | NL2 | 1.59 | 1.59 |
| (39) | νL2 | 60.47 | 60.47 |
| (40) | NL2 + 0.01 × νL2 | 2.2 | 2.2 |
| (41) | θL2 + 0.001625 × νL2 | 0.653 | 0.653 |
| (42) | NA2n | 1.55 | 1.44 |
| (43) | νA2n | 75.5 | 95.1 |
| (44) | NA2n + 0.01 × νA2n | 2.31 | 2.39 |
| (45) | θA2n + 0.001625 × νA2n | 0.663 | 0.688 |
| (46) | NGFn | 1.66 1.7 | 1.66 1.7 |
| (47) | νGFn | 62.28 59.05 | 62.28 59.05 |
| (48) | NGFn + 0.01 × νGFn | 2.28 2.29 | 2.28 2.29 |
| (49) | θGFn + 0.001625 × νGFn | 0.643 0.639 | 0.643 0.639 |
| (50) | fAw/fGF | 0.49 | 0.43 |
| (51) | |DDfft/DDfl| | 0.16 | 0.17 |
| (52) | fGz/fGF | −1.71 | −1.62 |
| (53) | Bfw/IHw | 2.27 | 2.18 |
| (54) | ft/fw | 3.36 | 3.36 |
| (55) | (R2r + R1f)/(R2r − R1f) | −2.89 | −3.07 |
| (56) | νAwnave | 88.2 | 98 |
| (57) | (Rp + Rn)/(Rp − Rn) | 4.02 | 2.41 |
| (58) | (APLp + APLn)/2 | −0.301 | −0.395 |

The maximum zoom magnification of the zoom lenses of Examples 1 to 36 is equal to or greater than 3, especially, the maximum zoom magnification of the zoom lenses of Examples 1 to 19 is equal to or greater than 4, and among them, the maximum zoom magnification of the zoom lenses of some examples is equal to or greater than 6. Therefore, high magnification is achieved. Further, although the zoom lenses of Examples 1 to 19 each are configured to have a small size, the zoom lenses of Examples 1 to 19 are satisfactorily corrected for various aberrations and maintain high optical performance.

Figure 79:
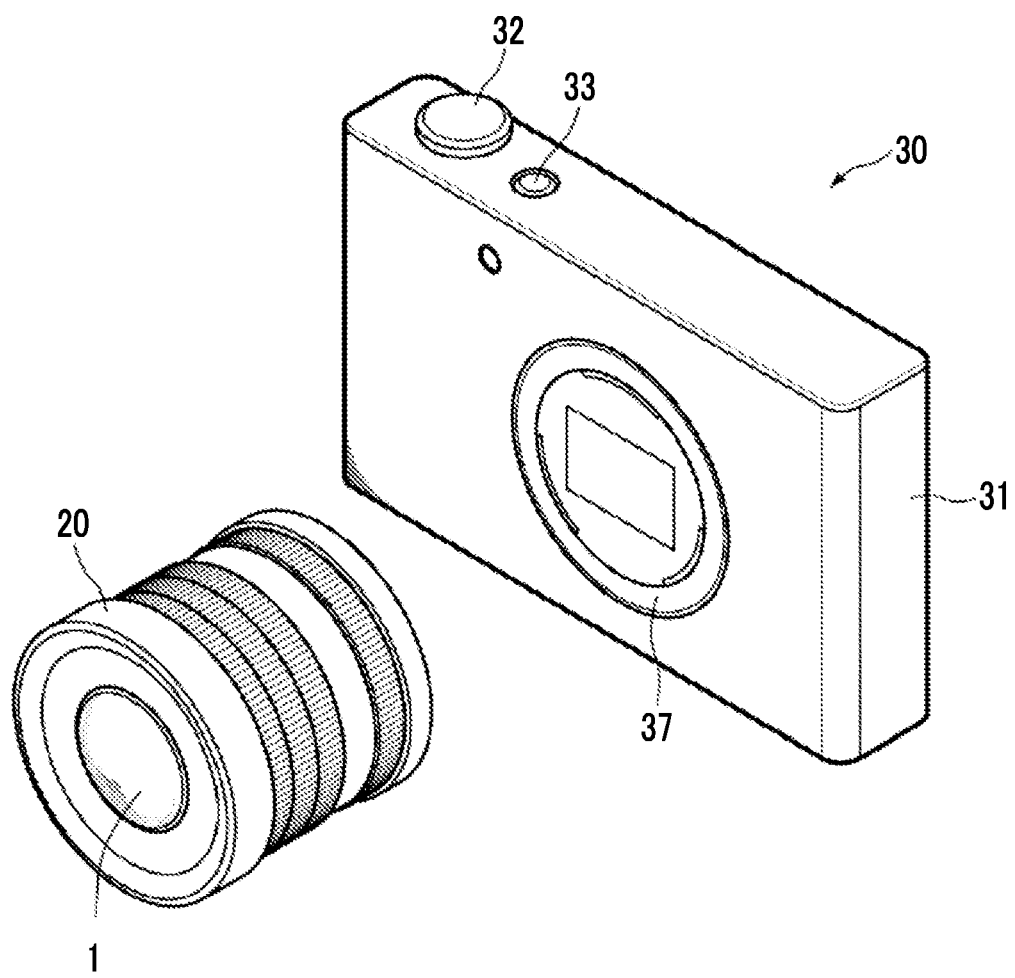
FIG. 79 is a perspective view of a front side of the imaging apparatus according to an embodiment.
Figure 80:
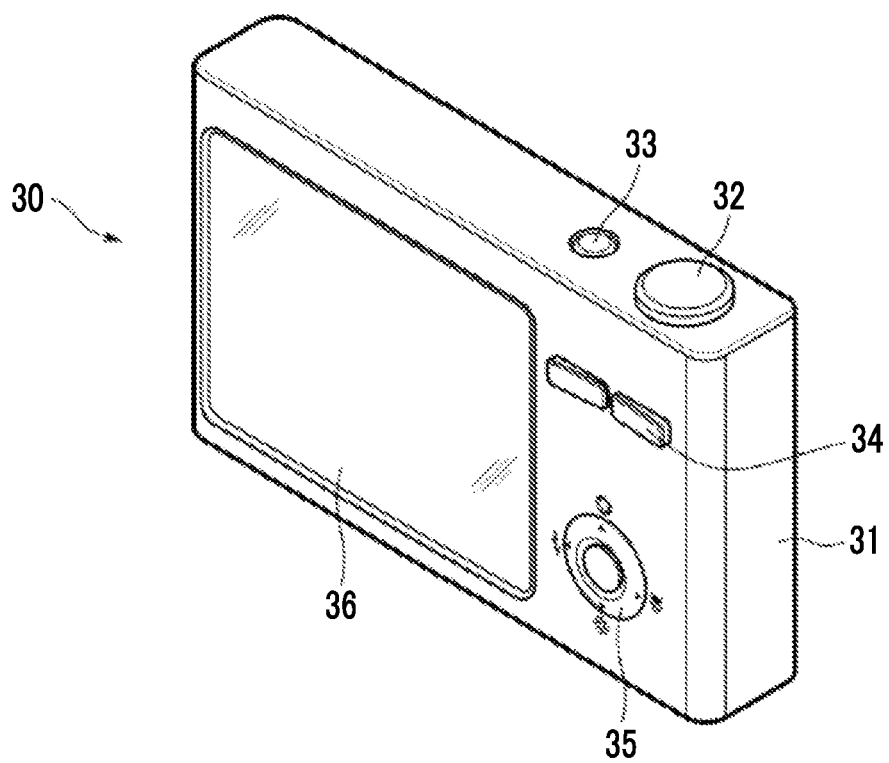
FIG. 80 is a perspective view of a rear side of an imaging apparatus according to the embodiment.

Next, an imaging apparatus according to an embodiment of the present disclosure will be described. FIGS. 79 and 80 are external views of a camera 30 which is the imaging apparatus according to the embodiment of the present disclosure. FIG. 79 is a perspective view of the camera 30 viewed from a front side, and FIG. 80 is a perspective view of the camera 30 viewed from a rear side. The camera 30 is a so-called mirrorless type digital camera, and an interchangeable lens 20 can be removably attached thereto. The interchangeable lens 20 is configured to include a zoom lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at a center on a front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

Hereinafter, further additional configurations related to the above embodiments and examples will be disclosed.

[Additional item 1] A zoom lens consisting of, in order from an object side to an image side, a first lens group, a front group, a middle group, and a rear group, wherein the first lens group has a positive refractive power, the front group consists of one or more lens groups that move during zooming and has a negative refractive power as a whole throughout an entire zoom range, the middle group includes only one lens group as a lens group, the rear group consists of a plurality of lens groups, an aperture stop is disposed between a lens surface closest to the image side in the front group and a lens surface closest to the object side in the rear group, during zooming, a spacing between the first lens group and the front group changes, a spacing between the front group and the middle group changes, a spacing between the middle group and the rear group changes, and all spacings between adjacent lens groups in the rear group change, in a case where the front group consists of a plurality of lens groups, all spacings between adjacent lens groups in the front group change during zooming, the first lens group includes a first lens which is a negative lens and a second lens which is a positive lens, successively in order from a position closest to the object side to the image side, and assuming that a distance on an optical axis from a lens surface closest to the object side in the first lens group to the aperture stop in a state in which an infinite distance object is in focus at a wide angle end is DDG1STw, and a focal length of the first lens group is f1, Conditional Expression (1) is satisfied, which is represented by $0.5 < DDG1STw/f1 < 1.5$ (1).

[Additional item 2] The zoom lens according to additional item 1, wherein assuming that a focal length of the middle group is fB, Conditional Expression (2) is satisfied, which is represented by $0.1 < f1/fB < 6$ (2).

[Additional item 3] The zoom lens according to additional item 1 or 2, wherein assuming that a focal length of the front group in a state in which the infinite distance object is in focus at the wide angle end is fAw, and a focal length of the middle group is fB, Conditional Expression (3) is satisfied, which is represented by $-1 < fAw/fB < -0.2$ (3).

[Additional item 4] The zoom lens according to any one of additional items 1 to 3, wherein assuming that a distance on the optical axis from the lens surface closest to the object side in the first lens group to a paraxial entrance pupil position in a state in which the infinite distance object is in focus at the wide angle end is enp, a maximum image height in a state in which the infinite distance object is in focus at the wide angle end is IHw, a focal length of the zoom lens in a state in which the infinite distance object is in focus at the wide angle end is fw, and a focal length of the zoom lens in a state in which the infinite distance object is in focus at a telephoto end is ft, Conditional Expression (4) is satisfied, which is represented by $1 < enp/\{IHw \times \log(ft/fw)\} < 3$ (4).

[Additional item 5] The zoom lens according to any one of additional items 1 to 4, wherein assuming that a focal length of the zoom lens in a state in which the infinite distance object is in focus at a telephoto end is ft, and an F number in a state in which the infinite distance object is in focus at the telephoto end is FNot, Conditional Expression (5) is satisfied, which is represented by $1.4 < f1/(ft/FNot) < 4.4$ (5).

[Additional item 6] The zoom lens according to any one of additional items 1 to 5, wherein assuming that a maximum image height in a state in which the infinite distance object is in focus at the wide angle end is IHw, a focal length of the zoom lens in a state in which the infinite distance object is in focus at the wide angle end is fw, and a focal length of the zoom lens in a state in which the infinite distance object is in focus at a telephoto end is ft, Conditional Expression (6) is satisfied, which is represented by $3 < DDG1STw/\{IHw \times \log(ft/fw)\} < 10$ (6).

[Additional item 7] The zoom lens according to any one of additional items 1 to 6, wherein assuming that a focal length of the front group in a state in which the infinite distance object is in focus at the wide angle end is fAw, Conditional Expression (7) is satisfied, which is represented by $-9 < f1/fAw < -4$ (7).

[Additional item 8] The zoom lens according to any one of additional items 1 to 7, wherein assuming that an effective diameter of a lens surface closest to the image side in the rear group is EDz, and an effective diameter of a lens surface closest to the image side in a lens group which is second from the image side of the rear group is EDyr, Conditional Expression (8) is satisfied, which is represented by $0.3 < EDyr/EDz < 0.9$ (8).

[Additional item 9] The zoom lens according to any one of additional items 1 to 8, wherein assuming that a focal length of a lens closest to the image side in the rear group is fz, and a focal length of a lens group closest to the image side in the rear group is fGz, Conditional Expression (9) is satisfied, which is represented by $0.1 < fz/fGz < 3$ (9).

[Additional item 10] The zoom lens according to any one of additional items 1 to 9, wherein assuming that a focal length of a lens group closest to the image side in the rear group is fGz, Conditional Expression (10) is satisfied, which is represented by $0.1 < f1/fGz < 3$ (10).

[Additional item 11] The zoom lens according to any one of additional items 1 to 10, wherein assuming that
a lateral magnification of the middle group in a state in which the infinite distance object is in focus at the wide angle end is βBw,
a lateral magnification of the middle group in a state in which the infinite distance object is in focus at a telephoto end is βBt,
a focal length of the zoom lens in a state in which the infinite distance object is in focus at the wide angle end is fw, and
a focal length of the zoom lens in a state in which the infinite distance object is in focus at the telephoto end is ft,
Conditional Expression (11) is satisfied, which is represented by $$0.2 < (\beta Bt/\beta Bw)/(ft/fw) < 1.55 \quad (11).$$

[Additional item 12] The zoom lens according to any one of additional items 1 to 11, wherein assuming that a lateral magnification of a lens group closest to the image side in the rear group in a state in which the infinite distance object is in focus at the wide angle end is βGzw, Conditional Expression (12) is satisfied, which is represented by $$0.2 < \beta Gzw < 0.9 \quad (12).$$

[Additional item 13] The zoom lens according to any one of additional items 1 to 12, wherein assuming that
a curvature radius of a lens surface closest to the object side in a lens group closest to the image side in the rear group is Rzf, and
a curvature radius of a lens surface closest to the image side in a lens group which is second from the image side of the rear group is Ryr,
Conditional Expression (13) is satisfied, which is represented by $$0.5 < (Rzf + Ryr)/(Rzf - Ryr) < 2 \quad (13).$$

[Additional item 14] The zoom lens according to any one of additional items 1 to 13, wherein assuming that
a refractive index of the first lens of the first lens group at a d line is NL1, and
an Abbe number of the first lens of the first lens group based on the d line is vL1,
Conditional Expressions (14), (15), and (16) are satisfied, which are represented by $$1.7 < NL1 < 2.02 \quad (14),$$

$$15 < vL1 < 45 \quad (15), \text{ and}$$

$$2 < NL1 + 0.01 \times vL1 < 3 \quad (16).$$

[Additional item 15] The zoom lens according to any one of additional items 1 to 14,
wherein a positive lens is disposed closest to the image side in the first lens group, and
assuming that
a refractive index of the positive lens closest to the image side in the first lens group at a d line is N1z, and
an Abbe number of the positive lens closest to the image side in the first lens group based on the d line is v1z,
Conditional Expressions (17), (18), and (19) are satisfied, which are represented by $$1.65 < N1z < 2 \quad (17),$$

$$40 < v1z < 60 \quad (18), \text{ and}$$

$$2 < N1z + 0.01 \times v1z < 3 \quad (19).$$

[Additional item 16] The zoom lens according to any one of additional items 1 to 15,
wherein a positive lens is disposed closest to the image side in the first lens group, and
assuming that
an Abbe number of the positive lens closest to the image side in the first lens group based on a d line is v1z, and
an Abbe number of the first lens of the first lens group based on the d line is vL1,
Conditional Expression (20) is satisfied, which is represented by $$7 < v1z - vL1 < 40 \quad (20).$$

[Additional item 17] The zoom lens according to any one of additional items 1 to 16,
wherein a positive lens is disposed closest to the image side in the first lens group, and
assuming that
a refractive index of the positive lens closest to the image side in the first lens group at a d line is N1z, and
a refractive index of the first lens of the first lens group at the d line is NL1,
Conditional Expression (21) is satisfied, which is represented by $$0.02 < NL1 - N1z < 0.4 \quad (21).$$

[Additional item 18] The zoom lens according to any one of additional items 1 to 17,
wherein a positive lens is disposed closest to the image side in the first lens group, and
assuming that a focal length of the positive lens closest to the image side in the first lens group is f1z, Conditional Expression (22) is satisfied, which is represented by $$0.5 < f1/f1z < 1.5 \quad (22)$$

[Additional item 19] The zoom lens according to any one of additional items 1 to 18,
wherein a lens group closest to the image side in the front group includes a positive lens and a negative lens, successively in order from the object side to the image side, and
assuming that
an Abbe number of the positive lens of the lens group closest to the image side in the front group based on a d line is vAp, and
an Abbe number of the negative lens of the lens group closest to the image side in the front group based on the d line is vAn,
Conditional Expression (23) is satisfied, which is represented by $$8 < vAn - vAp < 30 \quad (23).$$

[Additional item 20] The zoom lens according to any one of additional items 1 to 19,
wherein a lens group closest to the image side in the front group includes a positive lens and a negative lens, successively in order from the object side to the image side, and
assuming that
a curvature radius of an image side surface of the positive lens of the lens group closest to the image side in the front group is RApr, and
a curvature radius of an object side surface of the negative lens of the lens group closest to the image side in the front group is RAnf, Conditional Expression (24) is satisfied, which is represented by $$-9 < (RAnf + RApr)/(RAnf - RApr) < -3 \quad (24).$$

[Additional item 21] The zoom lens according to any one of additional items 1 to 20, wherein the rear group includes a focusing group that moves along the optical axis during focusing.

[Additional item 22] The zoom lens according to any one of additional items 1 to 21, wherein the middle group includes the aperture stop.

[Additional item 23] The zoom lens according to any one of additional items 1 to 22, wherein all lenses that move along the optical axis during focusing are disposed in a lens group that moves during zooming of the rear group.

[Additional item 24] The zoom lens according to any one of additional items 1 to 23, wherein a lens group closest to the image side in the rear group includes two or more lenses.

[Additional item 25] The zoom lens according to any one of additional items 1 to 24, wherein the first lens group includes two or more positive lenses.

[Additional item 26] The zoom lens according to any one of additional items 1 to 25, wherein a lens closest to the object side in a lens group closest to the image side in the rear group is a meniscus lens that has a positive refractive power and that has a convex surface facing toward the image side.

[Additional item 27] The zoom lens according to any one of additional items 1 to 26, wherein the middle group has a positive refractive power.

[Additional item 28] The zoom lens according to any one of additional items 1 to 27, wherein a lens group closest to the image side in the rear group has a positive refractive power.

[Additional item 29] The zoom lens according to any one of additional items 1 to 28,
   wherein the rear group includes a focusing group that moves along the optical axis during focusing, and
   the focusing group has a negative refractive power.

[Additional item 30] The zoom lens according to any one of additional items 1 to 29, wherein the rear group consists of two lens groups of which a mutual spacing changes during zooming.

[Additional item 31] The zoom lens according to any one of additional items 1 to 30, wherein the front group consists of one lens group.

[Additional item 32] The zoom lens according to any one of additional items 1 to 30, wherein the front group consists of two lens groups of which a mutual spacing changes during zooming.

[Additional item 33] The zoom lens according to any one of additional items 1 to 32, wherein a lens group closest to the image side in the rear group remains stationary with respect to an image plane during zooming.

[Additional item 34] The zoom lens according to any one of additional items 1 to 33, wherein a lens group closest to the image side in the rear group remains stationary with respect to an image plane during focusing.

[Additional item 35] The zoom lens according to any one of additional items 1 to 34, wherein the first lens group remains stationary with respect to an image plane during zooming.

[Additional item 36] The zoom lens according to any one of additional items 1 to 35, wherein the middle group remains stationary with respect to an image plane during zooming.

[Additional item 37] The zoom lens according to any one of additional items 1 to 36, wherein only one lens group in the rear group moves along the optical axis during focusing.

[Additional item 38] The zoom lens according to any one of additional items 1 to 37, wherein the middle group includes a cemented lens in which a negative lens and a positive lens are cemented.

[Additional item 39] The zoom lens according to any one of additional items 1 to 38, wherein the middle group consists of, in order from the object side to the image side, the aperture stop, a single lens that has a positive refractive power, and a cemented lens in which a negative lens and a positive lens are cemented.

[Additional item 40] The zoom lens according to any one of additional items 1 to 39, wherein a lens group closest to the image side in the rear group includes an aspherical lens that has a positive refractive power.

[Additional item 41] The zoom lens according to any one of additional items 1 to 40,
   wherein the rear group includes a focusing group that moves along the optical axis during focusing, and
   the focusing group constantly moves to the image side during zooming from the wide angle end to a telephoto end in a state in which the infinite distance object is in focus.

[Additional item 42] The zoom lens according to any one of additional items 1 to 41,
   wherein the rear group includes a focusing group that moves along the optical axis during focusing, and
   the focusing group consists of a cemented lens in which a positive lens and a negative lens are cemented.

[Additional item 43] The zoom lens according to any one of additional items 1 to 42, wherein the first lens group consists of, in order from the object side to the image side, a negative lens, a positive lens, and a positive lens.

[Additional item 44] The zoom lens according to any one of additional items 1 to 43,
   wherein a lens group that has a negative refractive power is disposed closest to the object side in the front group, and
   the lens group that has the negative refractive power and that is closest to the object side in the front group constantly moves to the image side during zooming from the wide angle end to a telephoto end.

[Additional item 45] The zoom lens according to any one of additional items 1 to 44, wherein assuming that a focal length of the first lens of the first lens group is fL1, Conditional Expression (25) is satisfied, which is represented by $$-0.95 < f1/fL1 < -0.3 \quad (25).$$

[Additional item 46] The zoom lens according to any one of additional items 1 to 45, wherein assuming that a focal length of the zoom lens in a state in which the infinite distance object is in focus at the wide angle end is fw, Conditional Expression (26) is satisfied, which is represented by $$2 < f1/fw < 5 \quad (26).$$

[Additional item 47] The zoom lens according to any one of additional items 1 to 46, wherein assuming that
   a focal length of the zoom lens in a state in which the infinite distance object is in focus at the wide angle end is fw, and
   a focal length of the zoom lens in a state in which the infinite distance object is in focus at a telephoto end is ft, Conditional Expression (27) is satisfied, which is represented by $$0.7 < f1/(fw \times ft)^{1/2} < 2.7 \quad (27).$$

[Additional item 48] The zoom lens according to any one of additional items 1 to 47,
wherein the middle group has a positive refractive power, and
assuming that
a focal length of the middle group is fB, and
a focal length of a lens group closest to the image side in the rear group is fGz,
Conditional Expression (28) is satisfied, which is represented by $$0.1 < fB/fGz < 1 \quad (28).$$

[Additional item 49] The zoom lens according to any one of additional items 1 to 48, wherein assuming that
a focal length of the front group in a state in which the infinite distance object is in focus at the wide angle end is fAw, and
a focal length of the zoom lens in a state in which the infinite distance object is in focus at the wide angle end is fw,
Conditional Expression (29) is satisfied, which is represented by $$-1 < fAw/fw < -0.3 \quad (29).$$

[Additional item 50] The zoom lens according to any one of additional items 1 to 49, wherein assuming that
a lateral magnification of the front group in a state in which the infinite distance object is in focus at the wide angle end is βAw,
a lateral magnification of the front group in a state in which the infinite distance object is in focus at a telephoto end is βAt,
a focal length of the zoom lens in a state in which the infinite distance object is in focus at the wide angle end is fw, and
a focal length of the zoom lens in a state in which the infinite distance object is in focus at the telephoto end is ft,
Conditional Expression (30) is satisfied, which is represented by $$0.3 < (βAt/βAw)/(ft/fw) < 0.8 \quad (30).$$

[Additional item 51] The zoom lens according to any one of additional items 1 to 50, wherein assuming that
a distance on the optical axis from the lens surface closest to the object side in the first lens group to a paraxial entrance pupil position in a state in which the infinite distance object is in focus at the wide angle end is enp,
a focal length of the zoom lens in a state in which the infinite distance object is in focus at the wide angle end is fw, and
a focal length of the zoom lens in a state in which the infinite distance object is in focus at a telephoto end is ft,
Conditional Expression (31) is satisfied, which is represented by $$0.3 < enp/(fw \times ft)^{1/2} < 1 \quad (31).$$

[Additional item 52] The zoom lens according to any one of additional items 1 to 51, wherein assuming that a sum of a back focal length of the zoom lens at an air-equivalent distance and a distance on the optical axis from the lens surface closest to the object side in the first lens group to a lens surface closest to the image side in the rear group in a state in which the infinite distance object is in focus at the wide angle end is TLw, Conditional Expression (32) is satisfied, which is represented by $$0.2 < DDG1STw/TLw < 0.6 \quad (32).$$

[Additional item 53] The zoom lens according to any one of additional items 1 to 52, wherein assuming that
an open opening diameter of the aperture stop in a state in which the infinite distance object is in focus at the wide angle end is STw, and
an open opening diameter of the aperture stop in a state in which the infinite distance object is in focus at a telephoto end is STt,
Conditional Expression (33) is satisfied, which is represented by $$0.6 < STw/STt < 1 \quad (33).$$

[Additional item 54] The zoom lens according to any one of additional items 1 to 53, wherein assuming that
an effective diameter of the lens surface closest to the object side in the first lens group is ED1, and
an effective diameter of a lens surface closest to the image side in the rear group is EDz,
Conditional Expression (34) is satisfied, which is represented by $$1.5 < ED1/EDz < 3 \quad (34).$$

[Additional item 55] The zoom lens according to any one of additional items 1 to 54,
wherein the middle group includes at least one positive lens, and
assuming that an average value of Abbe numbers of all positive lenses of the middle group based on a d line is vBpave, Conditional Expression (35) is satisfied, which is represented by $$60 < vBpave < 85 \quad (35).$$

[Additional item 56] The zoom lens according to any one of additional items 1 to 55,
wherein the rear group includes a focusing group that moves along the optical axis during focusing,
the focusing group includes at least one positive lens and at least one negative lens, and
assuming that
an average value of Abbe numbers of all positive lenses of the focusing group based on a d line is vGFpave, and
an average value of Abbe numbers of all negative lenses of the focusing group based on the d line is vGFnave,
Conditional Expression (36) is satisfied, which is represented by $$11 < vGFnave - vGFpave < 30 \quad (36).$$

[Additional item 57] The zoom lens according to any one of additional items 1 to 56,
wherein the rear group includes a focusing group that moves along the optical axis during focusing,
the focusing group includes at least one positive lens and at least one negative lens, and
assuming that
an average value of refractive indexes of all positive lenses of the focusing group at a d line is NGFpave, and
an average value of refractive indexes of all negative lenses of the focusing group at the d line is NGFnave, Conditional Expression (37) is satisfied, which is represented by $$-0.2 < NGFnave - NGFpave < -0.01 \quad (37).$$

[Additional item 58] The zoom lens according to any one of additional items 1 to 57, wherein assuming that
a refractive index of the second lens of the first lens group at a d line is NL2,
an Abbe number of the second lens of the first lens group based on the d line is vL2, and
a partial dispersion ratio of the second lens of the first lens group between a g line and an F line is θL2,
Conditional Expressions (38), (39), (40), and (41) are satisfied, which are represented by $$1.495 < NL2 < 1.56 \quad (38),$$

$$65 < vL2 < 75 \quad (39),$$

$$2.18 < NL2 + 0.01 \times vL2 < 2.5 \quad (40), \text{ and}$$

$$0.645 < \theta L2 + 0.001625 \times vL2 < 0.66 \quad (41).$$

[Additional item 59] The zoom lens according to any one of additional items 1 to 58,
wherein the front group includes two or more negative lenses, and
assuming that
a refractive index of a negative lens which is second from the object side among the negative lenses included in the front group at a d line is NA2n,
an Abbe number of the negative lens which is second from the object side among the negative lenses included in the front group based on the d line is vA2n, and
a partial dispersion ratio of the negative lens which is second from the object side among the negative lenses included in the front group between a g line and an F line is θA2n,
Conditional Expressions (42), (43), (44), and (45) are satisfied, which are represented by $$1.72 < NA2n < 1.8 \quad (42),$$

$$43 < vA2n < 57 \quad (43),$$

$$2.21 < NA2n + 0.01 \times vA2n < 2.37 \quad (44), \text{ and}$$

$$0.63 < \theta A2n + 0.001625 \times vA2n < 0.66 \quad (45).$$

[Additional item 60] The zoom lens according to any one of additional items 1 to 59,
wherein the rear group includes a focusing group that moves along the optical axis during focusing,
the focusing group includes at least one negative lens, and
assuming that
a refractive index of the negative lens of the focusing group at a d line is NGFn,
an Abbe number of the negative lens of the focusing group based on the d line is vGFn, and
a partial dispersion ratio of the negative lens of the focusing group between a g line and an F line is θGFn,
the zoom lens includes at least one negative lens satisfying Conditional Expressions (46), (47), (48), and (49), which are represented by $$1.72 < NGFn < 1.8 \quad (46),$$

$$43 < vGFn < 57 \quad (47),$$

$$2.21 < NGFn + 0.01 \times vGFn < 2.37 \quad (48), \text{ and}$$

$$0.63 < \theta GFn + 0.001625 \times vGFn < 0.66 \quad (49).$$

[Additional item 61] The zoom lens according to any one of additional items 1 to 60,
wherein the zoom lens includes only one focusing group that moves along the optical axis during focusing,
the focusing group is disposed in the rear group,
a lens group closest to the image side in the rear group remains stationary with respect to an image plane during focusing, and
assuming that
a focal length of the front group in a state in which the infinite distance object is in focus at the wide angle end is fAw, and
a focal length of the focusing group is fGF,
Conditional Expression (50) is satisfied, which is represented by $$0.3 < fAw/fGF < 0.8 \quad (50).$$

[Additional item 62] The zoom lens according to any one of additional items 1 to 61,
wherein the zoom lens includes only one focusing group that moves along the optical axis during focusing,
the focusing group is disposed in the rear group,
a lens group closest to the image side in the rear group remains stationary with respect to an image plane during focusing, and
assuming that
a difference in an optical axis direction between a position of the focusing group in a state in which the infinite distance object is in focus at a telephoto end and a position of the focusing group in a state in which a lateral magnification of the zoom lens at the telephoto end is −0.1× is DDfft, and
a difference in an optical axis direction between a position of the focusing group in a state in which the infinite distance object is in focus at the wide angle end and a position of the focusing group in a state in which the infinite distance object is in focus at the telephoto end is DDf,
Conditional Expression (51) is satisfied, which is represented by $$0.15 < |DDfft/DDf| < 0.5 \quad (51).$$

[Additional item 63] The zoom lens according to any one of additional items 1 to 62,
wherein the zoom lens includes only one focusing group that moves along the optical axis during focusing,
the focusing group is disposed in the rear group,
a lens group closest to the image side in the rear group remains stationary with respect to an image plane during focusing, and
assuming that
a focal length of the lens group closest to the image side in the rear group is fGz, and
a focal length of the focusing group is fGF,
Conditional Expression (52) is satisfied, which is represented by $$-4 < fGz/fGF < -2 \quad (52).$$

[Additional item 64] The zoom lens according to any one of additional items 1 to 63, wherein assuming that
a back focal length of the zoom lens at an air-equivalent distance in a state in which the infinite distance object is in focus at the wide angle end is Bfw, and a maximum image height in a state in which the infinite distance object is in focus at the wide angle end is IHw,
Conditional Expression (53) is satisfied, which is represented by $$0.5 < Bfw/IHw < 2 \qquad (53).$$

[Additional item 65] The zoom lens according to any one of additional items 1 to 64, wherein assuming that
a focal length of the zoom lens in a state in which the infinite distance object is in focus at the wide angle end is fw, and
a focal length of the zoom lens in a state in which the infinite distance object is in focus at a telephoto end is ft,
Conditional Expression (54) is satisfied, which is represented by $$3 < ft/fw < 100 \qquad (54).$$

[Additional item 66] The zoom lens according to additional item 1, wherein Conditional Expression (1-1) is satisfied, which is represented by $$0.55 < DDG1STw/f1 < 1.1 \qquad (1\text{-}1).$$

[Additional item 67] The zoom lens according to additional item 1, wherein Conditional Expression (1-2) is satisfied, which is represented by $$0.6 < DDG1STw/f1 < 0.99 \qquad (1\text{-}2).$$

[Additional item 68] The zoom lens according to additional item 1, wherein Conditional Expression (1-3) is satisfied, which is represented by $$0.7 < DDG1STw/f1 < 0.95 \qquad (1\text{-}3).$$

[Additional item 69] The zoom lens according to additional item 2, wherein Conditional Expression (2-1) is satisfied, which is represented by $$1.5 < f1/fB < 4.5 \qquad (2\text{-}1).$$

[Additional item 70] The zoom lens according to additional item 2, wherein Conditional Expression (2-2) is satisfied, which is represented by $$2.5 < f1/fB < 4.5 \qquad (2\text{-}2).$$

[Additional item 71] The zoom lens according to additional item 2, wherein Conditional Expression (2-3) is satisfied, which is represented by $$2.5 < f1/fB < 4 \qquad (2\text{-}3).$$

[Additional item 72] The zoom lens according to additional item 3, wherein Conditional Expression (3-1) is satisfied, which is represented by $$-0.7 < fAw/fB < -0.3 \qquad (3\text{-}1).$$

[Additional item 73] The zoom lens according to additional item 3, wherein Conditional Expression (3-2) is satisfied, which is represented by $$-0.67 < fAw/fB < -0.3 \qquad (3\text{-}2).$$

[Additional item 74] The zoom lens according to additional item 3, wherein Conditional Expression (3-3) is satisfied, which is represented by $$-0.67 < fAw/fB < -0.4 \qquad (3\text{-}3).$$

[Additional item 75] The zoom lens according to any one of additional items 1 to 74, wherein assuming that
a curvature radius of an object side surface of the first lens is R1f, and
a curvature radius of an image side surface of the second lens is R2r,
Conditional Expression (55) is satisfied, which is represented by $$-35 < (R2r + R1f)/(R2r - R1f) < -1 \qquad (55).$$

[Additional item 76] The zoom lens according to any one of additional items 1 to 75, wherein assuming that
a group consisting of all lenses in the front group on the image side closer than the longest air spacing on the optical axis in the front group in a state in which the infinite distance object is in focus at the wide angle end is an Aw subgroup, and
an average value of Abbe numbers based on a d line of all negative lenses in the Aw subgroup is vAwnave,
Conditional Expression (56) is satisfied, which is represented by $$55 < vAwnave < 102 \qquad (56).$$

[Additional item 77] The zoom lens according to any one of additional items 1 to 76, wherein assuming that
a group consisting of all lenses in the front group on the image side closer than the longest air spacing on the optical axis in the front group in a state in which the infinite distance object is in focus at a telephoto end is an At subgroup,
an air lens in the At subgroup having a focal length whose absolute value is larger than an absolute value of a focal length of the At subgroup is a specific air lens,
among convex surfaces, in the At subgroup, which have a convex shape directed toward the image side and come into contact with air, a curvature radius of a convex surface that does not constitute the specific air lens and has the smallest absolute value of curvature radius is Rp, and
among concave surfaces, in the At subgroup, which have a convex shape directed toward the image side and come into contact with air, a curvature radius of a concave surface that does not constitute the specific air lens and has the smallest absolute value of curvature radius is Rn,
Conditional Expression (57) is satisfied, which is represented by $$1 < (Rp + Rn)/(Rp - Rn) < 10 \qquad (57).$$

[Additional item 78] The zoom lens according to any one of additional items 1 to 77, wherein assuming that
a group consisting of all lenses in the front group on the image side closer than the longest air spacing on the optical axis in the front group in a state in which the infinite distance object is in focus at a telephoto end is an At subgroup,
an air lens in the At subgroup having a focal length whose absolute value is larger than an absolute value of a focal length of the At subgroup is a specific air lens,
among convex surfaces, in the At subgroup, which have a convex shape directed toward the image side and come into contact with air, a convex surface that does not constitute the specific air lens and has the smallest absolute value of curvature radius is an Ap surface,
a distance on the optical axis between the Ap surface and an object point for the Ap surface in a case where a light ray parallel to the optical axis is incident on the zoom lens from the object side at the telephoto end to perform paraxial ray tracing is Dobjp,
a sign of the Dobjp is negative if the object point is on the object side closer than the Ap surface, and positive if on the image side, a curvature radius of the Ap surface is Rp,
a refractive index of a medium on the object side of the Ap surface at a d line is Npf,
a refractive index of a medium on the image side of the Ap surface at the d line is Npr,
among concave surfaces, in the At subgroup, which have a convex shape directed toward the image side and come into contact with air, a concave surface that does not constitute the specific air lens and has the smallest absolute value of curvature radius is an An surface,
a distance on the optical axis between the An surface and an object point for the An surface in a case where a light ray parallel to the optical axis is incident on the zoom lens from the object side at the telephoto end to perform paraxial ray tracing is Dobjn,
a sign of the Dobjn is negative if the object point for the An surface is on the object side closer than the An surface, and positive if on the image side,
a curvature radius of the An surface is Rn,
a refractive index of the medium on the object side of the An surface at the d line is Nnf,
a refractive index of the medium on the image side of the An surface at the d line is Nnr, $$APLp = Dobjp/Rp - (1 + Npr/Npf), \text{ and}$$

$$APLn = Dobjn/Rn - (1 + Nnr/Nnf),$$

Conditional Expression (58) is satisfied, which is represented by $$-1.4 < (APLp + APLn)/2 < 0 \tag{58}.$$

[Additional item 79] An imaging apparatus comprising the zoom lens according to any one of additional items 1 to 78.

What is claimed is:

1. A zoom lens consisting of, in order from an object side to an image side, a first lens group, a front group, a middle group, and a rear group,
   wherein the first lens group has a positive refractive power,
   the front group consists of one or more lens groups that move during zooming and has a negative refractive power as a whole throughout an entire zoom range,
   the middle group includes only one lens group as a lens group,
   the rear group consists of a plurality of lens groups,
   an aperture stop is disposed between a lens surface closest to the image side in the front group and a lens surface closest to the object side in the rear group,
   during zooming, a spacing between the first lens group and the front group changes, a spacing between the front group and the middle group changes, a spacing between the middle group and the rear group changes, and all spacings between adjacent lens groups in the rear group change,
   in a case where the front group consists of a plurality of lens groups, all spacings between adjacent lens groups in the front group change during zooming,
   the first lens group includes a first lens which is a negative lens and a second lens which is a positive lens, successively in order from a position closest to the object side to the image side, and
   assuming that
   a distance on an optical axis from a lens surface closest to the object side in the first lens group to the aperture stop in a state in which an infinite distance object is in focus at a wide angle end is DDG1STw, and
   a focal length of the first lens group is f1,
   Conditional Expression (1) is satisfied, which is represented by $$0.5 < DDG1STw/f1 < 1.5 \tag{1}.$$

2. The zoom lens according to claim 1, wherein assuming that a focal length of the middle group is fB, Conditional Expression (2) is satisfied, which is represented by $$0.1 < f1/fB < 6 \tag{2}.$$

3. The zoom lens according to claim 1, wherein assuming that
   a focal length of the front group in a state in which the infinite distance object is in focus at the wide angle end is fAw, and
   a focal length of the middle group is fB,
   Conditional Expression (3) is satisfied, which is represented by $$-1 < fAw/fB < -0.2 \tag{3}.$$

4. The zoom lens according to claim 1, wherein assuming that
   a distance on the optical axis from the lens surface closest to the object side in the first lens group to a paraxial entrance pupil position in a state in which the infinite distance object is in focus at the wide angle end is enp,
   a maximum image height in a state in which the infinite distance object is in focus at the wide angle end is IHw,
   a focal length of the zoom lens in a state in which the infinite distance object is in focus at the wide angle end is fw, and
   a focal length of the zoom lens in a state in which the infinite distance object is in focus at a telephoto end is ft,
   Conditional Expression (4) is satisfied, which is represented by $$1 < enp/\{IHw \times \log(ft/fw)\} < 3 \tag{4}.$$

5. The zoom lens according to claim 1, wherein assuming that
   a focal length of the zoom lens in a state in which the infinite distance object is in focus at a telephoto end is ft, and
   an F number in a state in which the infinite distance object is in focus at the telephoto end is FNot,
   Conditional Expression (5) is satisfied, which is represented by $$1.4 < f1/(ft/FNot) < 4.4 \tag{5}.$$

6. The zoom lens according to claim 1, wherein assuming that
   a maximum image height in a state in which the infinite distance object is in focus at the wide angle end is IHw,
   a focal length of the zoom lens in a state in which the infinite distance object is in focus at the wide angle end is fw, and
   a focal length of the zoom lens in a state in which the infinite distance object is in focus at a telephoto end is ft,
   Conditional Expression (6) is satisfied, which is represented by $$3 < DDG1STw/\{IHw \times \log(ft/fw)\} < 10 \tag{6}.$$

7. The zoom lens according to claim 1, wherein assuming that a focal length of the front group in a state in which the infinite distance object is in focus at the wide angle end is fAw, Conditional Expression (7) is satisfied, which is represented by $$-9 < f1/fAw < -4 \qquad (7).$$

8. The zoom lens according to claim 1, wherein assuming that
an effective diameter of a lens surface closest to the image side in the rear group is EDz, and
an effective diameter of a lens surface closest to the image side in a lens group which is second from the image side of the rear group is EDyr,
Conditional Expression (8) is satisfied, which is represented by $$0.3 < EDyr/EDz < 0.9 \qquad (8).$$

9. The zoom lens according to claim 1, wherein assuming that
a focal length of a lens closest to the image side in the rear group is fz, and
a focal length of a lens group closest to the image side in the rear group is fGz,
Conditional Expression (9) is satisfied, which is represented by $$0.1 < fz/fGz < 3 \qquad (9).$$

10. The zoom lens according to claim 1, wherein assuming that a focal length of a lens group closest to the image side in the rear group is fGz, Conditional Expression (10) is satisfied, which is represented by $$0.1 < f1/fGz < 3 \qquad (10).$$

11. The zoom lens according to claim 1, wherein assuming that
a lateral magnification of the middle group in a state in which the infinite distance object is in focus at the wide angle end is βBw,
a lateral magnification of the middle group in a state in which the infinite distance object is in focus at a telephoto end is βBt,
a focal length of the zoom lens in a state in which the infinite distance object is in focus at the wide angle end is fw, and
a focal length of the zoom lens in a state in which the infinite distance object is in focus at the telephoto end is ft,
Conditional Expression (11) is satisfied, which is represented by $$0.2 < (\beta Bt/\beta Bw)/(ft/fw) < 1.55 \qquad (11).$$

12. The zoom lens according to claim 1, wherein assuming that a lateral magnification of a lens group closest to the image side in the rear group in a state in which the infinite distance object is in focus at the wide angle end is βGzw, Conditional Expression (12) is satisfied, which is represented by $$0.2 < \beta Gzw < 0.9 \qquad (12).$$

13. The zoom lens according to claim 1, wherein assuming that
a curvature radius of a lens surface closest to the object side in a lens group closest to the image side in the rear group is Rzf, and
a curvature radius of a lens surface closest to the image side in a lens group which is second from the image side of the rear group is Ryr,
Conditional Expression (13) is satisfied, which is represented by $$0.5 < (Rzf+Ryr)/(Rzf-Ryr) < 2 \qquad (13).$$

14. The zoom lens according to claim 1, wherein assuming that
a refractive index of the first lens of the first lens group at a d line is NL1, and
an Abbe number of the first lens of the first lens group based on the d line is vL1,
Conditional Expressions (14), (15), and (16) are satisfied, which are represented by $$1.7 < NL1 < 2.02 \qquad (14),$$

$$15 < vL1 < 45 \qquad (15), \text{ and}$$

$$2 < NL1 + 0.01 \times vL1 < 3 \qquad (16).$$

15. The zoom lens according to claim 1,
wherein a positive lens is disposed closest to the image side in the first lens group, and
assuming that
a refractive index of the positive lens closest to the image side in the first lens group at a d line is N1z, and
an Abbe number of the positive lens closest to the image side in the first lens group based on the d line is v1z,
Conditional Expressions (17), (18), and (19) are satisfied, which are represented by $$1.65 < N1z < 2 \qquad (17),$$

$$40 < v1z < 60 \qquad (18), \text{ and}$$

$$2 < N1z + 0.01 \times v1z < 3 \qquad (19).$$

16. The zoom lens according to claim 1,
wherein a positive lens is disposed closest to the image side in the first lens group, and
assuming that
an Abbe number of the positive lens closest to the image side in the first lens group based on a d line is v1z, and
an Abbe number of the first lens of the first lens group based on the d line is vL1,
Conditional Expression (20) is satisfied, which is represented by $$7 < v1z - vL1 < 40 \qquad (20).$$

17. The zoom lens according to claim 1,
wherein a positive lens is disposed closest to the image side in the first lens group, and
assuming that
a refractive index of the positive lens closest to the image side in the first lens group at a d line is N1z, and
a refractive index of the first lens of the first lens group at the d line is NL1,
Conditional Expression (21) is satisfied, which is represented by $$0.02 < NL1 - N1z < 0.4 \qquad (21).$$

18. The zoom lens according to claim 1,
wherein a positive lens is disposed closest to the image side in the first lens group, and
assuming that a focal length of the positive lens closest to the image side in the first lens group is f1z, Conditional Expression (22) is satisfied, which is represented by $$0.5 < f1/f1z < 1.5 \qquad (22).$$

19. The zoom lens according to claim 1,
wherein a lens group closest to the image side in the front group includes a positive lens and a negative lens, successively in order from the object side to the image side, and
assuming that
an Abbe number of the positive lens of the lens group closest to the image side in the front group based on a d line is vAp, and
an Abbe number of the negative lens of the lens group closest to the image side in the front group based on the d line is vAn,
Conditional Expression (23) is satisfied, which is represented by $$8 < vAn - vAp < 30 \qquad (23).$$

20. The zoom lens according to claim 1,
wherein a lens group closest to the image side in the front group includes a positive lens and a negative lens, successively in order from the object side to the image side, and
assuming that
a curvature radius of an image side surface of the positive lens of the lens group closest to the image side in the front group is RApr, and
a curvature radius of an object side surface of the negative lens of the lens group closest to the image side in the front group is RAnf,
Conditional Expression (24) is satisfied, which is represented by $$-9 < (RAnf + RApr)/(RAnf - RApr) < -3 \qquad (24).$$

21. The zoom lens according to claim 1, wherein the rear group includes a focusing group that moves along the optical axis during focusing.

22. The zoom lens according to claim 1, wherein the middle group includes the aperture stop.

23. The zoom lens according to claim 1, wherein all lenses that move along the optical axis during focusing are disposed in a lens group that moves during zooming of the rear group.

24. The zoom lens according to claim 1, wherein a lens group closest to the image side in the rear group includes two or more lenses.

25. The zoom lens according to claim 1, wherein the first lens group includes two or more positive lenses.

26. The zoom lens according to claim 1, wherein a lens closest to the object side in a lens group closest to the image side in the rear group is a meniscus lens that has a positive refractive power and that has a convex surface facing toward the image side.

27. The zoom lens according to claim 1, wherein the middle group has a positive refractive power.

28. The zoom lens according to claim 1, wherein a lens group closest to the image side in the rear group has a positive refractive power.

29. The zoom lens according to claim 1,
wherein the rear group includes a focusing group that moves along the optical axis during focusing, and
the focusing group has a negative refractive power.

30. The zoom lens according to claim 1, wherein the rear group consists of two lens groups of which a mutual spacing changes during zooming.

31. The zoom lens according to claim 1, wherein the front group consists of one lens group.

32. The zoom lens according to claim 1, wherein the front group consists of two lens groups of which a mutual spacing changes during zooming.

33. The zoom lens according to claim 1, wherein a lens group closest to the image side in the rear group remains stationary with respect to an image plane during zooming.

34. The zoom lens according to claim 1, wherein a lens group closest to the image side in the rear group remains stationary with respect to an image plane during focusing.

35. The zoom lens according to claim 1, wherein the first lens group remains stationary with respect to an image plane during zooming.

36. The zoom lens according to claim 1, wherein the middle group remains stationary with respect to an image plane during zooming.

37. The zoom lens according to claim 1, wherein only one lens group in the rear group moves along the optical axis during focusing.

38. The zoom lens according to claim 1, wherein the middle group includes a cemented lens in which a negative lens and a positive lens are cemented.

39. The zoom lens according to claim 1, wherein the middle group consists of, in order from the object side to the image side, the aperture stop, a single lens that has a positive refractive power, and a cemented lens in which a negative lens and a positive lens are cemented.

40. The zoom lens according to claim 1, wherein a lens group closest to the image side in the rear group includes an aspherical lens that has a positive refractive power.

41. The zoom lens according to claim 1,
wherein the rear group includes a focusing group that moves along the optical axis during focusing, and
the focusing group constantly moves to the image side during zooming from the wide angle end to a telephoto end in a state in which the infinite distance object is in focus.

42. The zoom lens according to claim 1,
wherein the rear group includes a focusing group that moves along the optical axis during focusing, and
the focusing group consists of a cemented lens in which a positive lens and a negative lens are cemented.

43. The zoom lens according to claim 1, wherein the first lens group consists of, in order from the object side to the image side, a negative lens, a positive lens, and a positive lens.

44. The zoom lens according to claim 1,
wherein a lens group that has a negative refractive power is disposed closest to the object side in the front group, and
the lens group that has the negative refractive power and that is closest to the object side in the front group constantly moves to the image side during zooming from the wide angle end to a telephoto end.

45. The zoom lens according to claim 1, wherein assuming that a focal length of the first lens of the first lens group is fL1, Conditional Expression (25) is satisfied, which is represented by $$-0.95 < f1/fL1 < -0.3 \qquad (25).$$

46. The zoom lens according to claim 1, wherein assuming that a focal length of the zoom lens in a state in which the infinite distance object is in focus at the wide angle end is fw, Conditional Expression (26) is satisfied, which is represented by $$2 < f1/fw < 5 \qquad (26).$$

47. The zoom lens according to claim 1, wherein assuming that
a focal length of the zoom lens in a state in which the infinite distance object is in focus at the wide angle end is fw, and
a focal length of the zoom lens in a state in which the infinite distance object is in focus at a telephoto end is ft,
Conditional Expression (27) is satisfied, which is represented by $$0.7 < f1/(fw \times ft)^{1/2} < 2.7 \qquad (27).$$

48. The zoom lens according to claim 1,
wherein the middle group has a positive refractive power, and
assuming that
a focal length of the middle group is fB, and
a focal length of a lens group closest to the image side in the rear group is fGz,
Conditional Expression (28) is satisfied, which is represented by $$0.1 < fB/fGz < 1 \qquad (28).$$

49. The zoom lens according to claim 1, wherein assuming that
a focal length of the front group in a state in which the infinite distance object is in focus at the wide angle end is fAw, and
a focal length of the zoom lens in a state in which the infinite distance object is in focus at the wide angle end is fw,
Conditional Expression (29) is satisfied, which is represented by $$-1 < fAw/fw < -0.3 \qquad (29).$$

50. The zoom lens according to claim 1, wherein assuming that
a lateral magnification of the front group in a state in which the infinite distance object is in focus at the wide angle end is βAw,
a lateral magnification of the front group in a state in which the infinite distance object is in focus at a telephoto end is βAt,
a focal length of the zoom lens in a state in which the infinite distance object is in focus at the wide angle end is fw, and
a focal length of the zoom lens in a state in which the infinite distance object is in focus at the telephoto end is ft,
Conditional Expression (30) is satisfied, which is represented by $$0.3 < (\beta At/\beta Aw)/(ft/fw) < 0.8 \qquad (30).$$

51. The zoom lens according to claim 1, wherein assuming that
a distance on the optical axis from the lens surface closest to the object side in the first lens group to a paraxial entrance pupil position in a state in which the infinite distance object is in focus at the wide angle end is enp,
a focal length of the zoom lens in a state in which the infinite distance object is in focus at the wide angle end is fw, and
a focal length of the zoom lens in a state in which the infinite distance object is in focus at a telephoto end is ft,
Conditional Expression (31) is satisfied, which is represented by $$0.3 < enp/(fw \times ft)^{1/2} < 1 \qquad (31).$$

52. The zoom lens according to claim 1, wherein assuming that a sum of a back focal length of the zoom lens at an air-equivalent distance and a distance on the optical axis from the lens surface closest to the object side in the first lens group to a lens surface closest to the image side in the rear group in a state in which the infinite distance object is in focus at the wide angle end is TLw, Conditional Expression (32) is satisfied, which is represented by $$0.2 < DDG1STw/TLw < 0.6 \qquad (32).$$

53. The zoom lens according to claim 1, wherein assuming that
an open opening diameter of the aperture stop in a state in which the infinite distance object is in focus at the wide angle end is STw, and
an open opening diameter of the aperture stop in a state in which the infinite distance object is in focus at a telephoto end is STt,
Conditional Expression (33) is satisfied, which is represented by $$0.6 < STw/STt < 1 \qquad (33).$$

54. The zoom lens according to claim 1, wherein assuming that
an effective diameter of the lens surface closest to the object side in the first lens group is ED1, and
an effective diameter of a lens surface closest to the image side in the rear group is EDz,
Conditional Expression (34) is satisfied, which is represented by $$1.5 < ED1/EDz < 3 \qquad (34).$$

55. The zoom lens according to claim 1,
wherein the middle group includes at least one positive lens, and
assuming that an average value of Abbe numbers of all positive lenses of the middle group based on a d line is vBpave, Conditional Expression (35) is satisfied, which is represented by $$60 < vBpave < 85 \qquad (35).$$

56. The zoom lens according to claim 1,
wherein the rear group includes a focusing group that moves along the optical axis during focusing,
the focusing group includes at least one positive lens and at least one negative lens, and
assuming that
an average value of Abbe numbers of all positive lenses of the focusing group based on a d line is vGFpave, and
an average value of Abbe numbers of all negative lenses of the focusing group based on the d line is vGFnave,
Conditional Expression (36) is satisfied, which is represented by $$11 < vGFnave - vGFpave < 30 \qquad (36).$$

57. The zoom lens according to claim 1,
wherein the rear group includes a focusing group that moves along the optical axis during focusing,
the focusing group includes at least one positive lens and at least one negative lens, and
assuming that
an average value of refractive indexes of all positive lenses of the focusing group at a d line is NGFpave, and an average value of refractive indexes of all negative lenses of the focusing group at the d line is NGFnave, Conditional Expression (37) is satisfied, which is represented by $$-0.2 < NGFnave - NGFpave < -0.01 \tag{37}$$

58. The zoom lens according to claim 1, wherein assuming that a refractive index of the second lens of the first lens group at a d line is NL2, an Abbe number of the second lens of the first lens group based on the d line is vL2, and a partial dispersion ratio of the second lens of the first lens group between a g line and an F line is θL2, Conditional Expressions (38), (39), (40), and (41) are satisfied, which are represented by $$1.495 < NL2 < 1.56 \tag{38},$$

$$65 < vL2 < 75 \tag{39},$$

$$2.18 < NL2 + 0.01 \times vL2 < 2.5 \tag{40}, \text{ and}$$

$$0.645 < \theta L2 + 0.001625 \times vL2 < 0.66 \tag{41}.$$

59. The zoom lens according to claim 1, wherein the front group includes two or more negative lenses, and assuming that a refractive index of a negative lens which is second from the object side among the negative lenses included in the front group at a d line is NA2n, an Abbe number of the negative lens which is second from the object side among the negative lenses included in the front group based on the d line is vA2n, and a partial dispersion ratio of the negative lens which is second from the object side among the negative lenses included in the front group between a g line and an F line is θA2n, Conditional Expressions (42), (43), (44), and (45) are satisfied, which are represented by $$1.72 < NA2n < 1.8 \tag{42},$$

$$43 < vA2n < 57 \tag{43},$$

$$2.21 < NA2n + 0.01 \times vA2n < 2.37 \tag{44}, \text{ and}$$

$$0.63 < \theta A2n + 0.001625 \times vA2n < 0.66 \tag{45}.$$

60. The zoom lens according to claim 1, wherein the rear group includes a focusing group that moves along the optical axis during focusing, the focusing group includes at least one negative lens, and assuming that a refractive index of the negative lens of the focusing group at a d line is NGFn, an Abbe number of the negative lens of the focusing group based on the d line is vGFn, and a partial dispersion ratio of the negative lens of the focusing group between a g line and an F line is θGFn, the zoom lens includes at least one negative lens satisfying Conditional Expressions (46), (47), (48), and (49), which are represented by $$1.72 < NGFn < 1.8 \tag{46},$$

$$43 < vGFn < 57 \tag{47},$$

$$2.21 < NGFn + 0.01 \times vGFn < 2.37 \tag{48}, \text{ and}$$

$$0.63 < \theta GFn + 0.001625 \times vGFn < 0.66 \tag{49}.$$

61. The zoom lens according to claim 1, wherein the zoom lens includes only one focusing group that moves along the optical axis during focusing, the focusing group is disposed in the rear group, a lens group closest to the image side in the rear group remains stationary with respect to an image plane during focusing, and assuming that a focal length of the front group in a state in which the infinite distance object is in focus at the wide angle end is fAw, and a focal length of the focusing group is fGF, Conditional Expression (50) is satisfied, which is represented by $$0.3 < fAw/fGF < 0.8 \tag{50}.$$

62. The zoom lens according to claim 1, wherein the zoom lens includes only one focusing group that moves along the optical axis during focusing, the focusing group is disposed in the rear group, a lens group closest to the image side in the rear group remains stationary with respect to an image plane during focusing, and assuming that a difference in an optical axis direction between a position of the focusing group in a state in which the infinite distance object is in focus at a telephoto end and a position of the focusing group in a state in which a lateral magnification of the zoom lens at the telephoto end is −0.1× is DDfft, and a difference in an optical axis direction between a position of the focusing group in a state in which the infinite distance object is in focus at the wide angle end and a position of the focusing group in a state in which the infinite distance object is in focus at the telephoto end is DDf, Conditional Expression (51) is satisfied, which is represented by $$0.15 < |DDfft/DDf| < 0.5 \tag{51}.$$

63. The zoom lens according to claim 1, wherein the zoom lens includes only one focusing group that moves along the optical axis during focusing, the focusing group is disposed in the rear group, a lens group closest to the image side in the rear group remains stationary with respect to an image plane during focusing, and assuming that a focal length of the lens group closest to the image side in the rear group is fGz, and a focal length of the focusing group is fGF, Conditional Expression (52) is satisfied, which is represented by $$-4 < fGz/fGF < -2 \tag{52}.$$

64. The zoom lens according to claim 1, wherein assuming that a back focal length of the zoom lens at an air-equivalent distance in a state in which the infinite distance object is in focus at the wide angle end is Bfw, and a maximum image height in a state in which the infinite distance object is in focus at the wide angle end is IHw, Conditional Expression (53) is satisfied, which is represented by $$0.5 < Bfw/IHw < 2 \tag{53}.$$

65. The zoom lens according to claim 1, wherein assuming that
 a focal length of the zoom lens in a state in which the infinite distance object is in focus at the wide angle end is fw, and
 a focal length of the zoom lens in a state in which the infinite distance object is in focus at a telephoto end is ft,
 Conditional Expression (54) is satisfied, which is represented by $$3 < ft/fw < 100 \qquad (54).$$

66. The zoom lens according to claim 1, wherein Conditional Expression (1-1) is satisfied, which is represented by $$0.55 < DDG1STw/f1 < 1.1 \qquad (1\text{-}1).$$

67. The zoom lens according to claim 1, wherein Conditional Expression (1-2) is satisfied, which is represented by $$0.6 < DDG1STw/f1 < 0.99 \qquad (1\text{-}2).$$

68. The zoom lens according to claim 1, wherein Conditional Expression (1-3) is satisfied, which is represented by $$0.7 < DDG1STw/f1 < 0.95 \qquad (1\text{-}3).$$

69. The zoom lens according to claim 2, wherein Conditional Expression (2-1) is satisfied, which is represented by $$1.5 < f1/fB < 4.5 \qquad (2\text{-}1).$$

70. The zoom lens according to claim 2, wherein Conditional Expression (2-2) is satisfied, which is represented by $$2.5 < f1/fB < 4.5 \qquad (2\text{-}2).$$

71. The zoom lens according to claim 2, wherein Conditional Expression (2-3) is satisfied, which is represented by $$2.5 < f1/fB < 4 \qquad (2\text{-}3).$$

72. The zoom lens according to claim 3, wherein Conditional Expression (3-1) is satisfied, which is represented by $$-0.7 < fAw/fB < -0.3 \qquad (3\text{-}1).$$

73. The zoom lens according to claim 3, wherein Conditional Expression (3-2) is satisfied, which is represented by $$-0.67 < fAw/fB < -0.3 \qquad (3\text{-}2).$$

74. The zoom lens according to claim 3, wherein Conditional Expression (3-3) is satisfied, which is represented by $$-0.67 < fAw/fB < -0.4 \qquad (3\text{-}3).$$

75. The zoom lens according to claim 1, wherein assuming that
 a curvature radius of an object side surface of the first lens is R1f, and
 a curvature radius of an image side surface of the second lens is R2r,
 Conditional Expression (55) is satisfied, which is represented by $$-35 < (R2r+R1f)/(R2r-R1f) < -1 \qquad (55).$$

76. The zoom lens according to claim 1, wherein assuming that
 a group consisting of all lenses in the front group on the image side closer than the longest air spacing on the optical axis in the front group in a state in which the infinite distance object is in focus at the wide angle end is an Aw subgroup, and
 an average value of Abbe numbers based on a d line of all negative lenses in the Aw subgroup is vAwnave,
 Conditional Expression (56) is satisfied, which is represented by $$55 < vAwnave < 102 \qquad (56).$$

77. The zoom lens according to claim 1, wherein assuming that
 a group consisting of all lenses in the front group on the image side closer than the longest air spacing on the optical axis in the front group in a state in which the infinite distance object is in focus at a telephoto end is an At subgroup,
 an air lens in the At subgroup having a focal length whose absolute value is larger than an absolute value of a focal length of the At subgroup is a specific air lens,
 among convex surfaces, in the At subgroup, which have a convex shape directed toward the image side and come into contact with air, a curvature radius of a convex surface that does not constitute the specific air lens and has the smallest absolute value of curvature radius is Rp, and
 among concave surfaces, in the At subgroup, which have a convex shape directed toward the image side and come into contact with air, a curvature radius of a concave surface that does not constitute the specific air lens and has the smallest absolute value of curvature radius is Rn,
 Conditional Expression (57) is satisfied, which is represented by $$1 < (Rp+Rn)/(Rp-Rn) < 10 \qquad (57).$$

78. The zoom lens according to claim 1, wherein assuming that
 a group consisting of all lenses in the front group on the image side closer than the longest air spacing on the optical axis in the front group in a state in which the infinite distance object is in focus at a telephoto end is an At subgroup,
 an air lens in the At subgroup having a focal length whose absolute value is larger than an absolute value of a focal length of the At subgroup is a specific air lens,
 among convex surfaces, in the At subgroup, which have a convex shape directed toward the image side and come into contact with air, a convex surface that does not constitute the specific air lens and has the smallest absolute value of curvature radius is an Ap surface,
 a distance on the optical axis between the Ap surface and an object point for the Ap surface in a case where a light ray parallel to the optical axis is incident on the zoom lens from the object side at the telephoto end to perform paraxial ray tracing is Dobjp,
 a sign of the Dobjp is negative if the object point is on the object side closer than the Ap surface, and positive if on the image side,
 a curvature radius of the Ap surface is Rp,
 a refractive index of a medium on the object side of the Ap surface at a d line is Npf,
 a refractive index of a medium on the image side of the Ap surface at the d line is Npr,
 among concave surfaces, in the At subgroup, which have a convex shape directed toward the image side and come into contact with air, a concave surface that does not constitute the specific air lens and has the smallest absolute value of curvature radius is an An surface,
 a distance on the optical axis between the An surface and an object point for the An surface in a case where a light ray parallel to the optical axis is incident on the zoom lens from the object side at the telephoto end to perform paraxial ray tracing is Dobjn, a sign of the Dobjn is negative if the object point for the An surface is on the object side closer than the An surface, and positive if on the image side, a curvature radius of the An surface is Rn, a refractive index of the medium on the object side of the An surface at the d line is Nnf, a refractive index of the medium on the image side of the An surface at the d line is Nnr, $APLp = Dobjp/Rp - (1 + Npr/Npf)$, and $APLn = Dobjn/Rn - (1 + Nnr/Nnf)$, Conditional Expression (58) is satisfied, which is represented by $-1.4 < (APLp + APLn)/2 < 0$ \hfill (58).

79. An imaging apparatus comprising the zoom lens according to claim 1.

* * * * *